United States Patent
Kramar et al.

(10) Patent No.: US 10,999,158 B2
(45) Date of Patent: May 4, 2021

(54) USER INTERFACES FOR CONTROLLING OR PRESENTING INFORMATION ABOUT MULTIPLE CELLULAR IDENTIFIERS ON AN ELECTRONIC DEVICE

(71) Applicant: Apple Inc., Cupertino, CA (US)

(72) Inventors: Vitalii Kramar, Mountain View, CA (US); Marcel Van Os, San Francisco, CA (US); Patrick L. Coffman, San Francisco, CA (US); Eric Lance Wilson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/375,464

(22) Filed: Apr. 4, 2019

(65) Prior Publication Data

US 2020/0084117 A1 Mar. 12, 2020

Related U.S. Application Data

(60) Provisional application No. 62/729,973, filed on Sep. 11, 2018.

(51) Int. Cl.
*H04L 12/24* (2006.01)
*G06F 3/0484* (2013.01)
*H04W 8/22* (2009.01)

(52) U.S. Cl.
CPC ............ *H04L 41/22* (2013.01); *G06F 3/0484* (2013.01); *H04W 8/22* (2013.01)

(58) Field of Classification Search
CPC ... G06F 3/0484; H04L 41/22; H04L 63/0853; H04W 12/00405; H04W 12/00503; H04W 12/00514; H04W 12/00522; H04W 8/22
See application file for complete search history.

(56) References Cited

U.S. PATENT DOCUMENTS

| 5,483,261 A | 1/1996 | Yasutake |
| 5,488,204 A | 1/1996 | Mead et al. |

(Continued)

FOREIGN PATENT DOCUMENTS

| JP | 2000-163031 A | 6/2000 |
| JP | 2002-342033 A | 11/2002 |

(Continued)

OTHER PUBLICATIONS

International Search Report received for PCT Patent Application No. PCT/US2019/049005, dated Mar. 11, 2020, 6 pages.

(Continued)

*Primary Examiner* — Andrea N Long
(74) *Attorney, Agent, or Firm* — Kubota & Basol LLP

(57) ABSTRACT

In some embodiments, an electronic device presents settings user interfaces associated with cellular identifiers. In some embodiments, a first electronic device accesses a first cellular identifier regardless of the first electronic device's connection to a second electronic device and accesses a second cellular identifier when the first electronic device is connected to the second electronic device. In some embodiments, an electronic device presents visual indications of cellular identifiers in relation to communication functions. In some embodiments, an electronic device presents visual indications of the status of cellular identifiers active on the electronic device. In some embodiments, an electronic device presents alerts associated with one or more cellular identifiers that have been removed from the electronic device.

54 Claims, 194 Drawing Sheets

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,570,557 | B1 | 5/2003 | Westerman et al. |
| 6,677,932 | B1 | 1/2004 | Westerman |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,614,008 | B2 | 11/2009 | Ording |
| 7,633,076 | B2 | 12/2009 | Huppi et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,239,784 | B2 | 8/2012 | Hotelling et al. |
| 8,279,180 | B2 | 10/2012 | Hotelling et al. |
| 8,381,135 | B2 | 2/2013 | Hotelling et al. |
| 8,479,122 | B2 | 7/2013 | Hotelling et al. |
| 9,348,458 | B2 | 5/2016 | Hotelling et al. |
| 9,933,937 | B2 | 4/2018 | Lemay et al. |
| 2002/0015024 | A1 | 2/2002 | Westerman et al. |
| 2005/0190059 | A1 | 9/2005 | Wehrenberg |
| 2006/0017692 | A1 | 1/2006 | Wehrenberg et al. |
| 2006/0033724 | A1 | 2/2006 | Chaudhri et al. |
| 2006/0197753 | A1 | 9/2006 | Hotelling |
| 2009/0029736 | A1* | 1/2009 | Kim .................. H04W 8/183 455/558 |
| 2011/0314374 | A1* | 12/2011 | Chae ................ H04M 1/72522 715/702 |
| 2012/0135715 | A1* | 5/2012 | Kang ................. H04W 8/183 455/412.1 |
| 2014/0228039 | A1 | 8/2014 | Zhao et al. |
| 2014/0248922 | A1 | 9/2014 | Josso et al. |
| 2015/0017962 | A1* | 1/2015 | Howard ........... H04M 1/72519 455/418 |
| 2015/0065197 | A1* | 3/2015 | Wu .................. H04M 1/72519 455/558 |
| 2015/0092611 | A1* | 4/2015 | Ponukumati ...... H04W 36/0022 370/259 |
| 2016/0014579 | A1 | 1/2016 | Kasilya Sudarsan et al. |
| 2016/0029204 | A1 | 1/2016 | Lalwaney |
| 2016/0149605 | A1* | 5/2016 | Vecera ............... H04B 1/3816 455/558 |
| 2017/0048645 | A1* | 2/2017 | Yerrabommanahalli .................... H04W 8/205 |
| 2017/0251359 | A1 | 8/2017 | Lin |
| 2020/0007675 | A1* | 1/2020 | Khanukaev ........... H04M 17/10 |
| 2020/0137229 | A1* | 4/2020 | Wang ................. H04W 60/005 |

FOREIGN PATENT DOCUMENTS

| | | | | |
|---|---|---|---|---|
| WO | WO-2013093555 | A1 * | 6/2013 | ............. H04W 8/18 |
| WO | WO-2013093559 | A1 * | 6/2013 | ........ H04M 1/72519 |
| WO | 2013/169849 | A2 | 11/2013 | |
| WO | 2014/105276 | A1 | 7/2014 | |

OTHER PUBLICATIONS

Invitation to Pay Additional Fees received for PCT Patent Application No. PCT/US2019/049005, dated Dec. 11, 2019, 16 pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

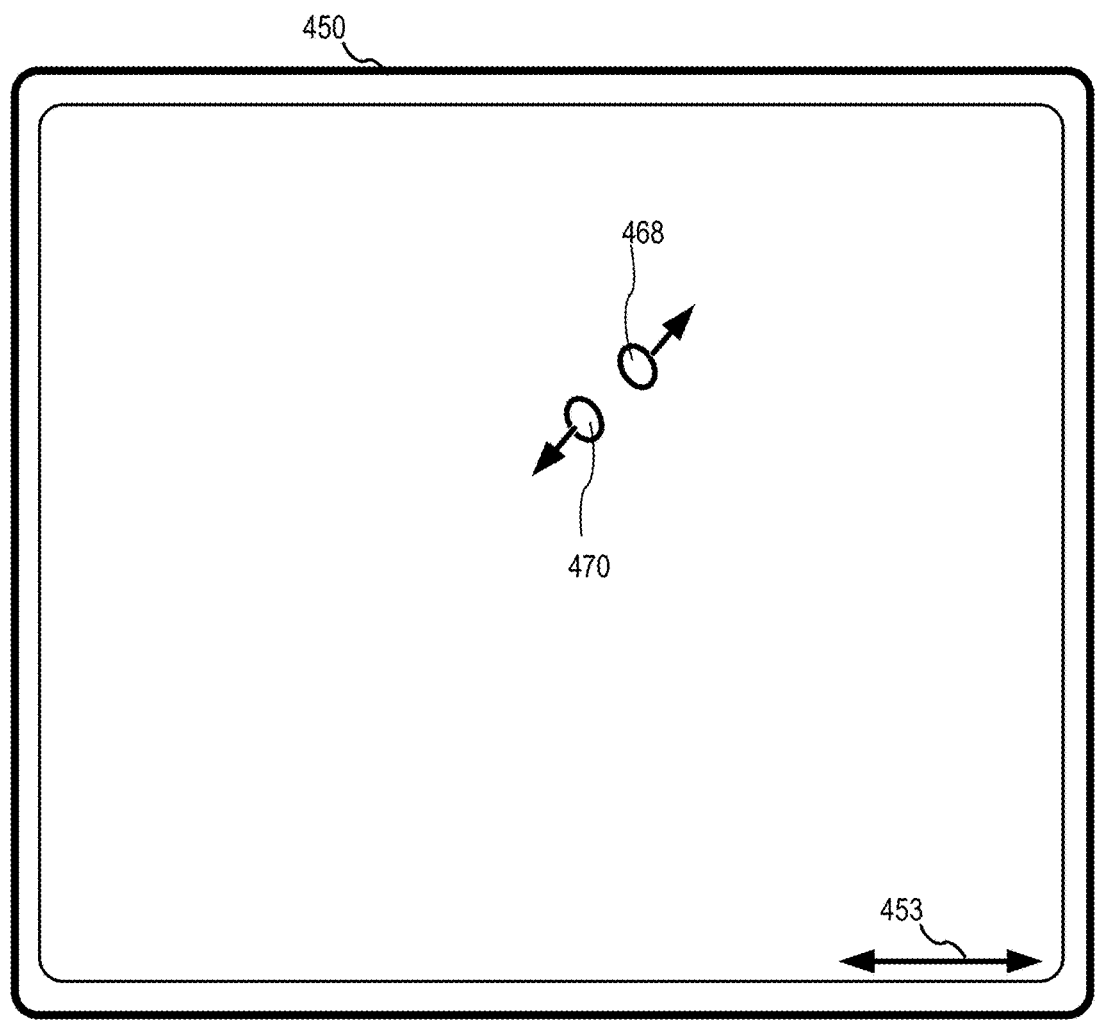
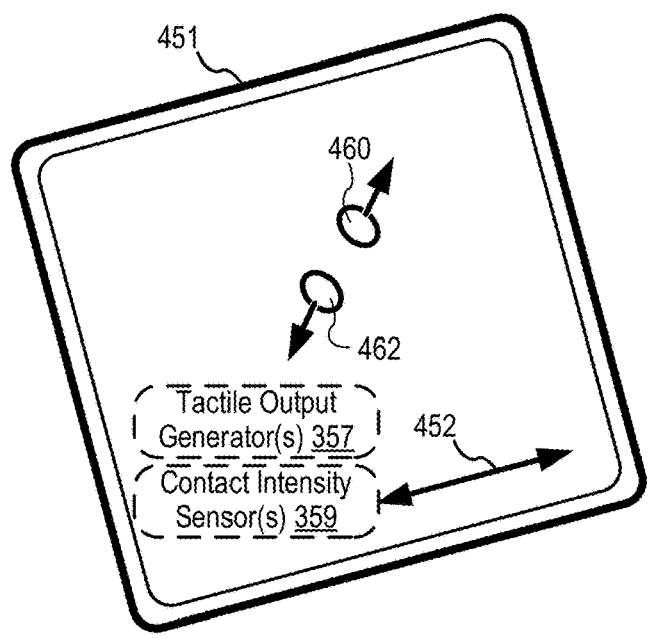
FIG. 4B

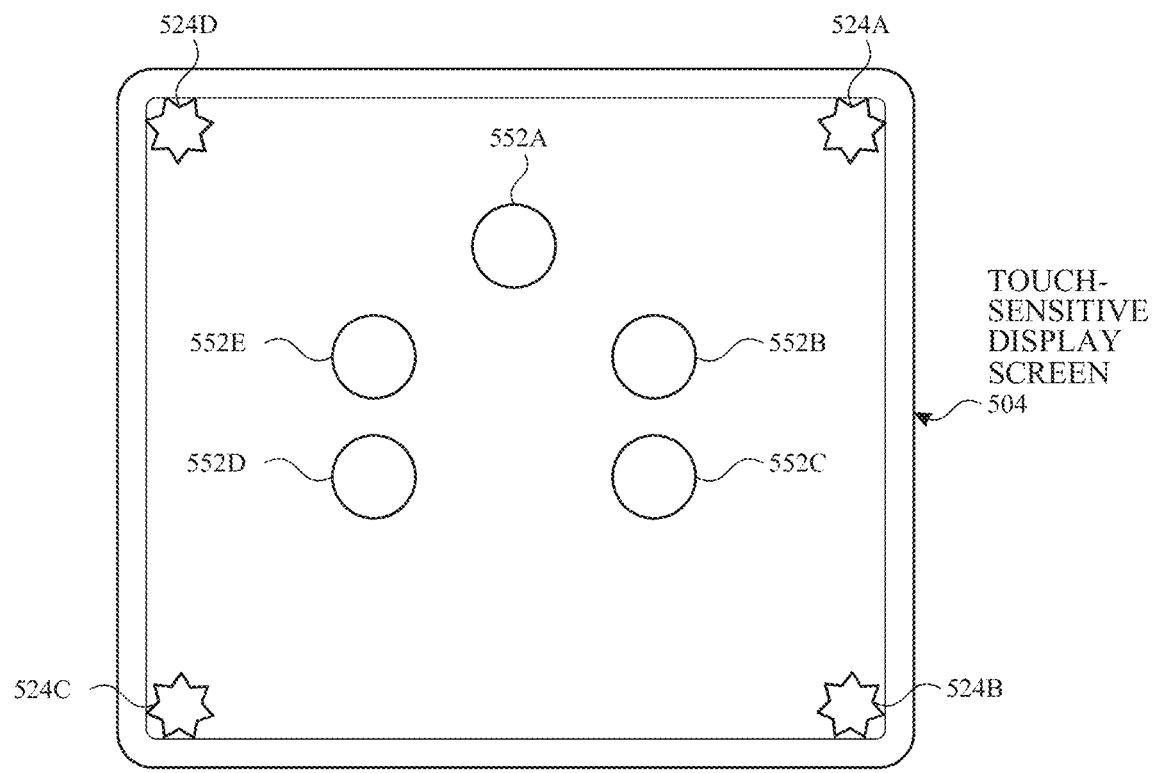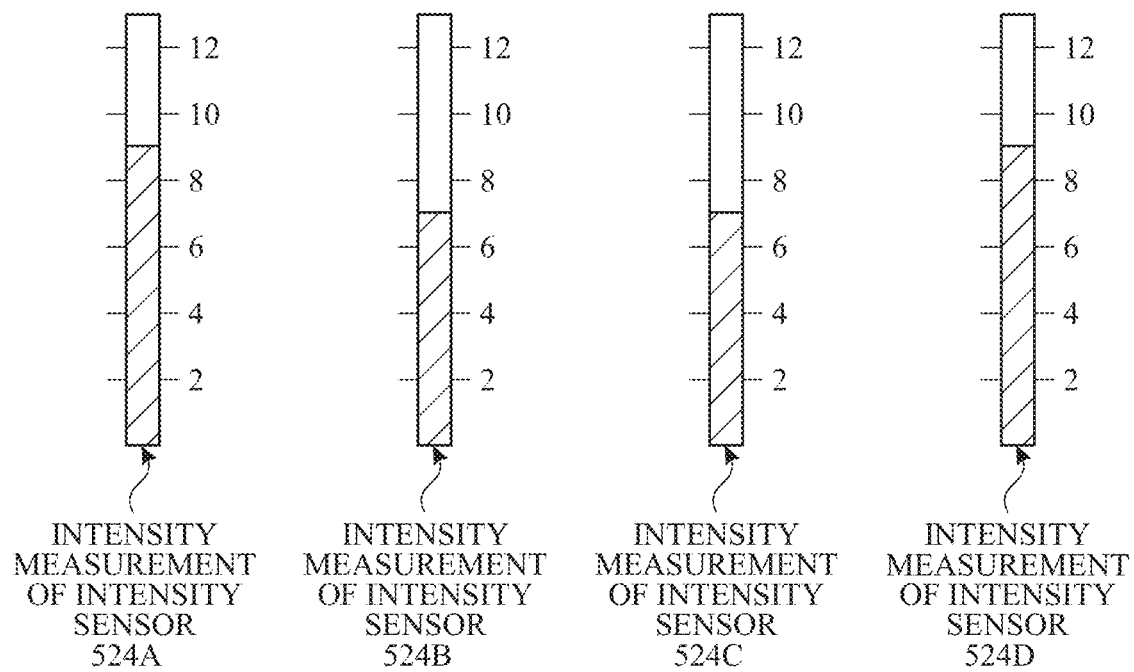
FIG. 5C

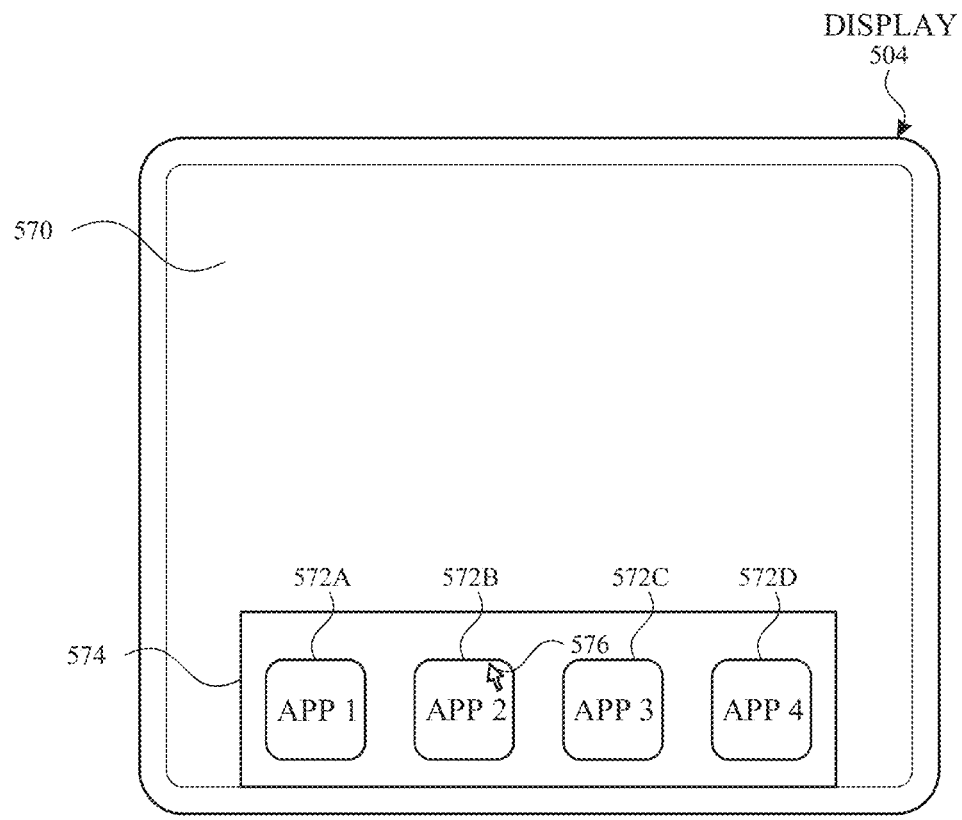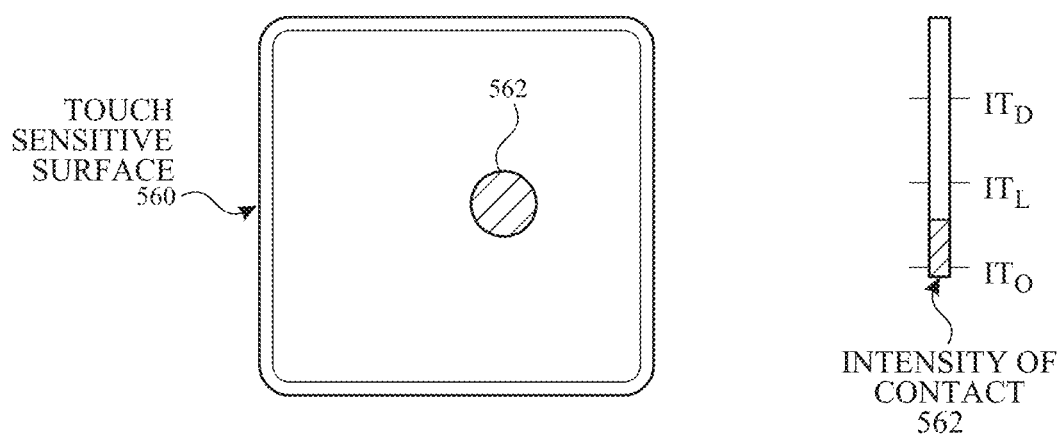
FIG. 5E

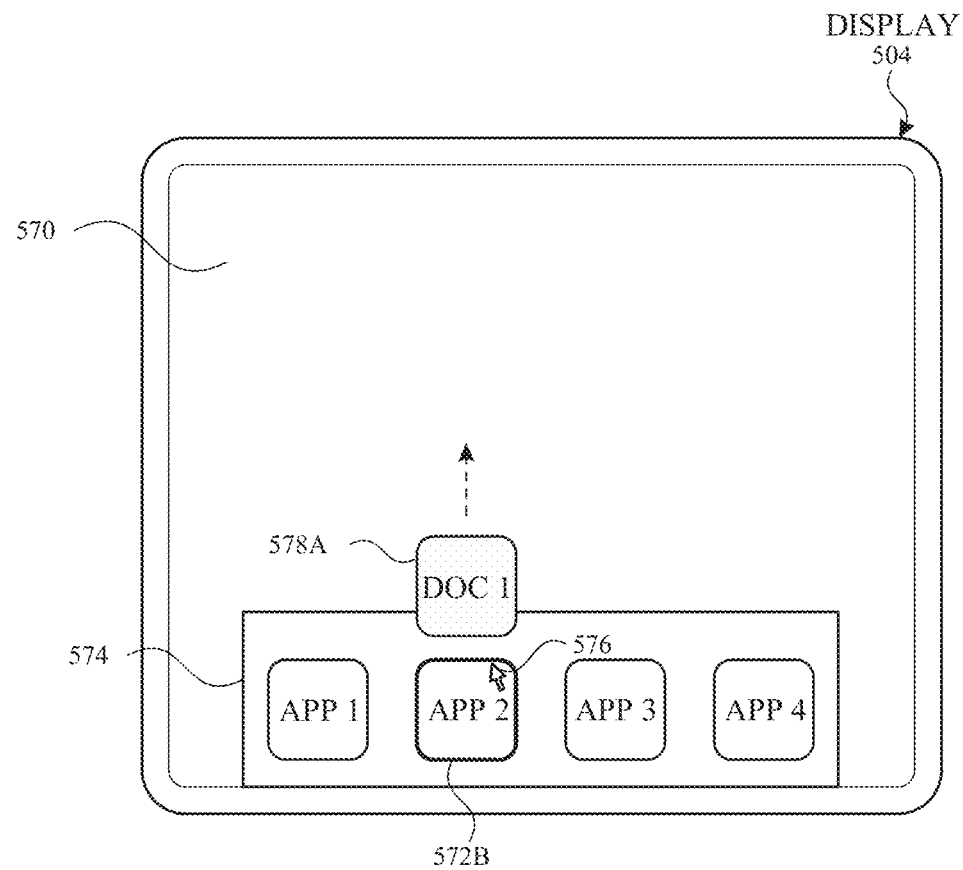
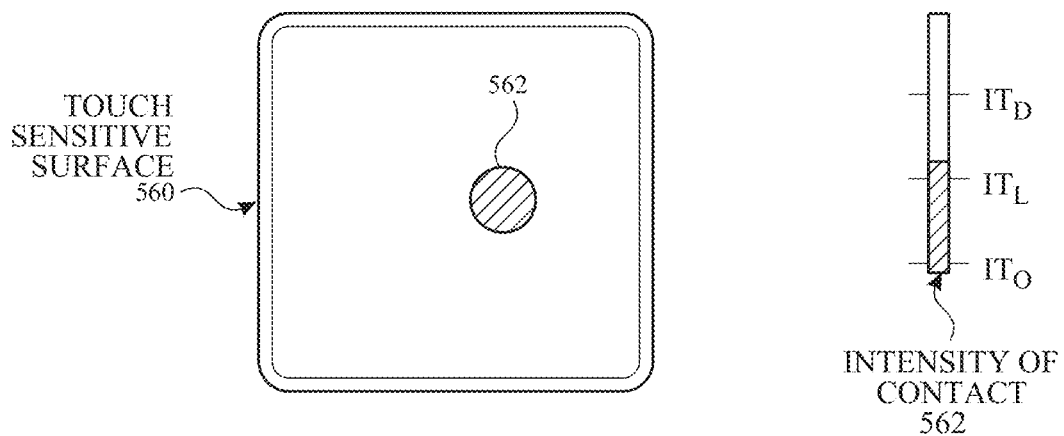
FIG. 5F

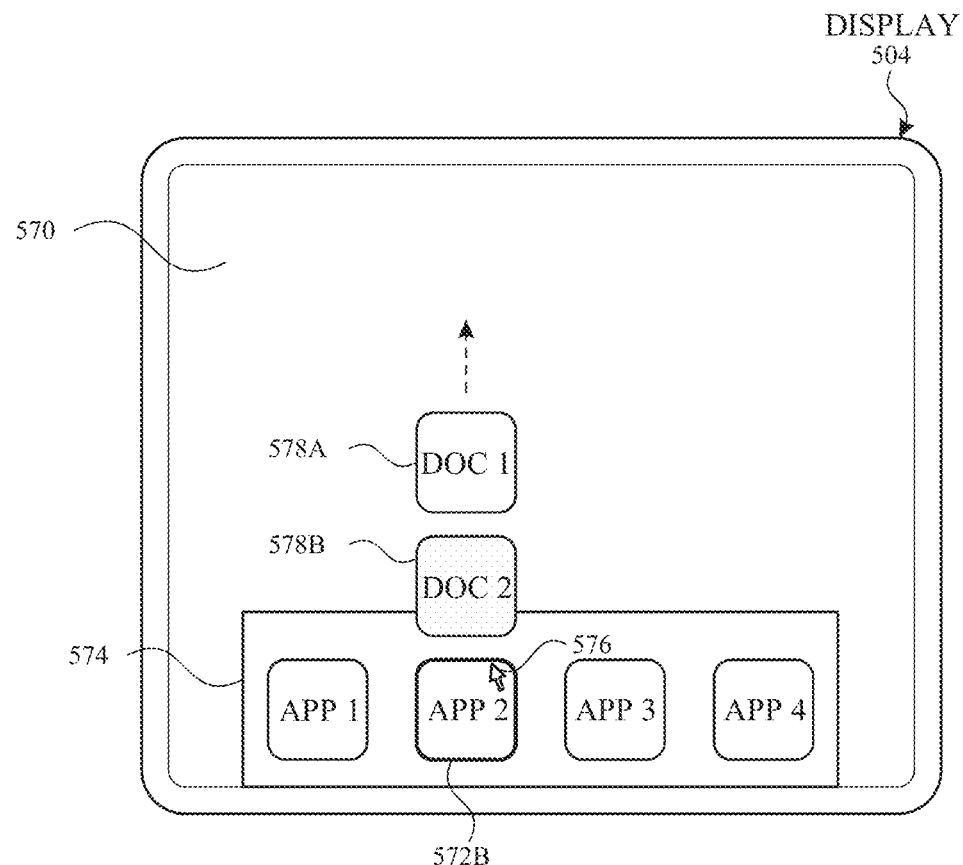
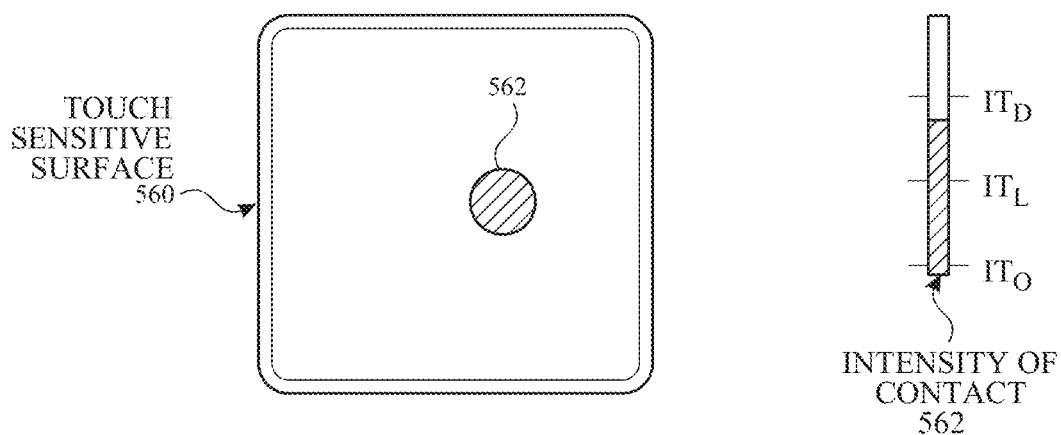
FIG. 5G

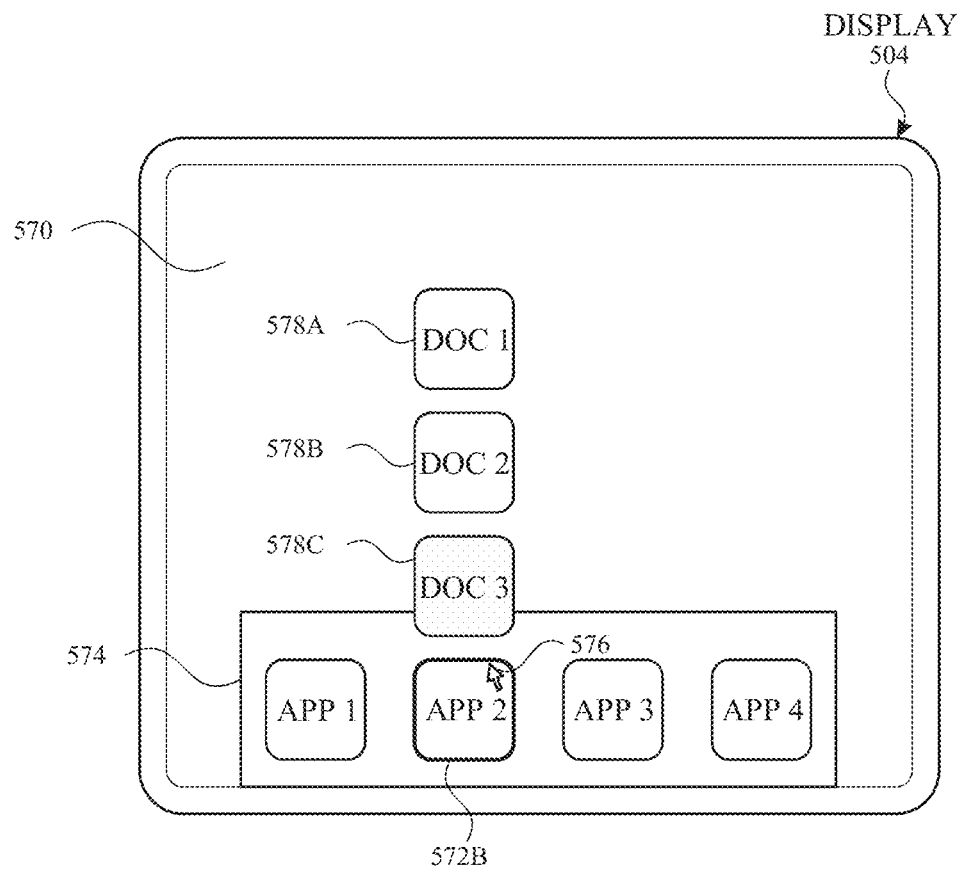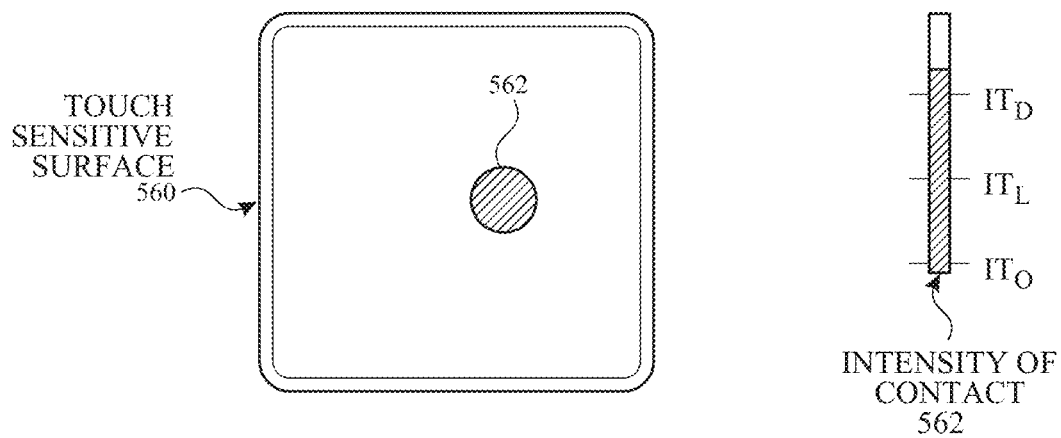
FIG. 5H

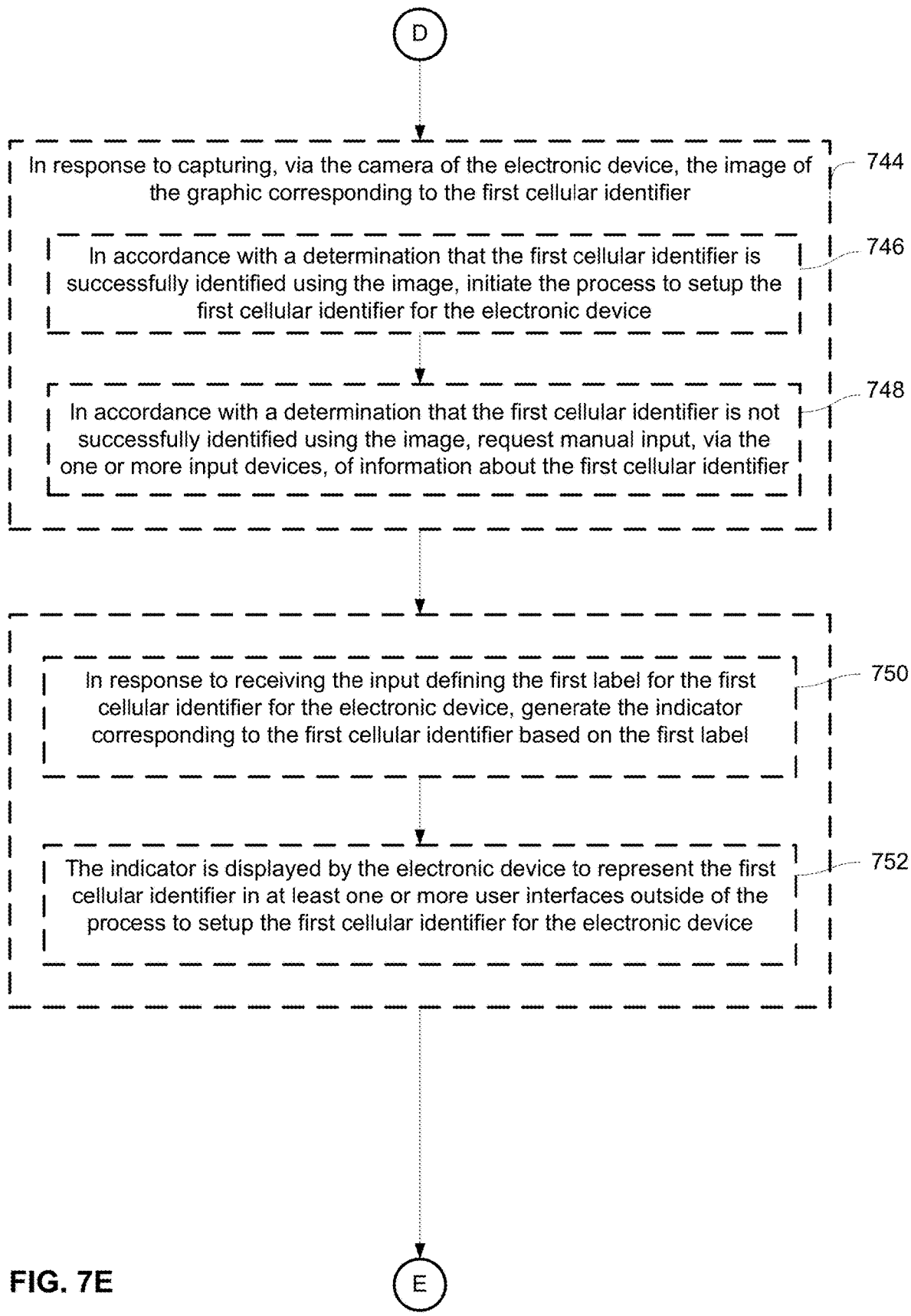

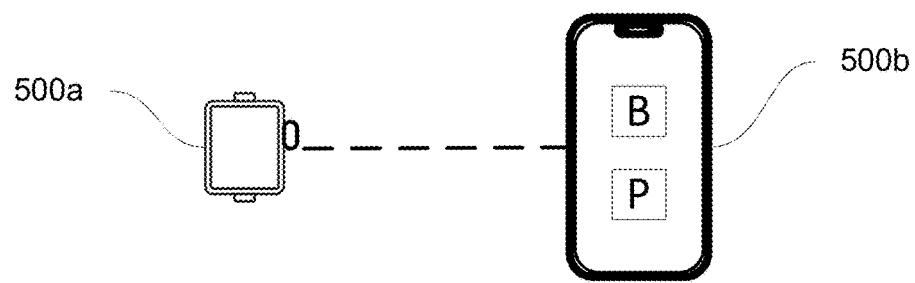
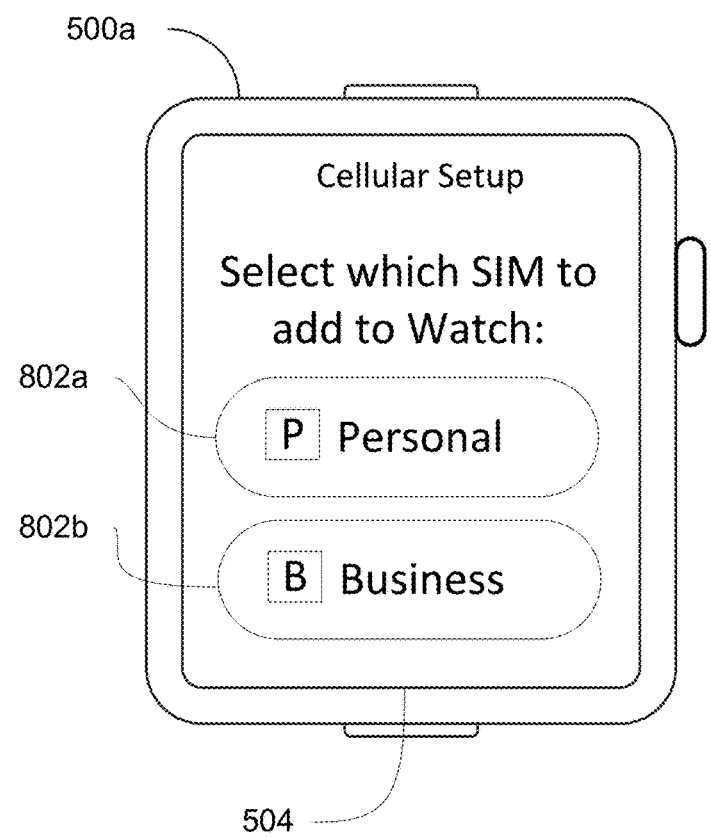
FIG. 8A

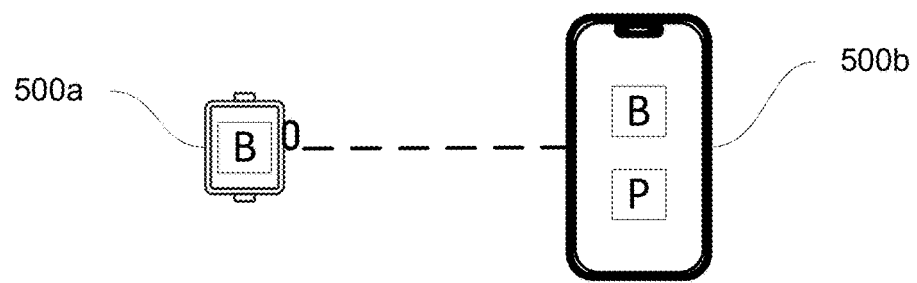
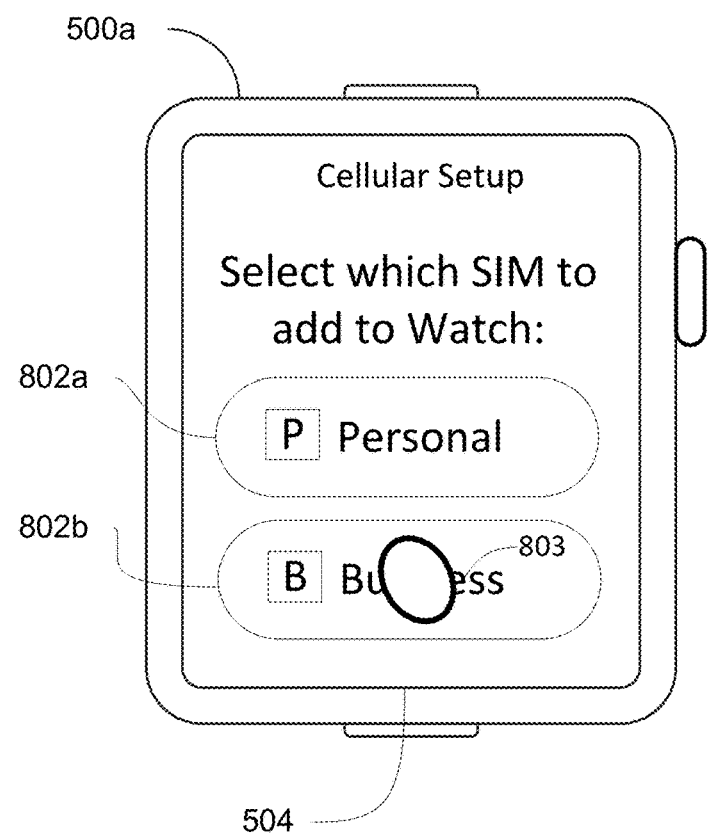
FIG. 8B

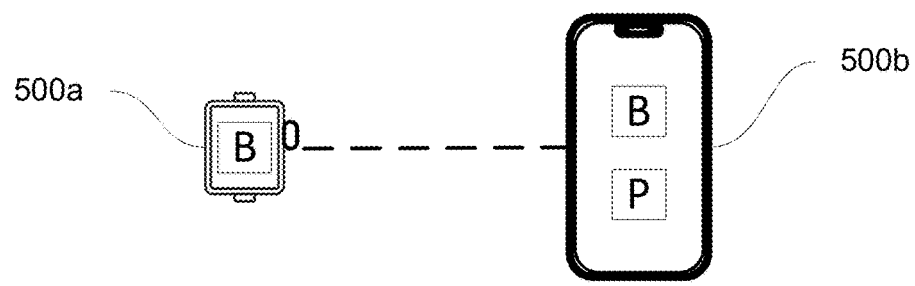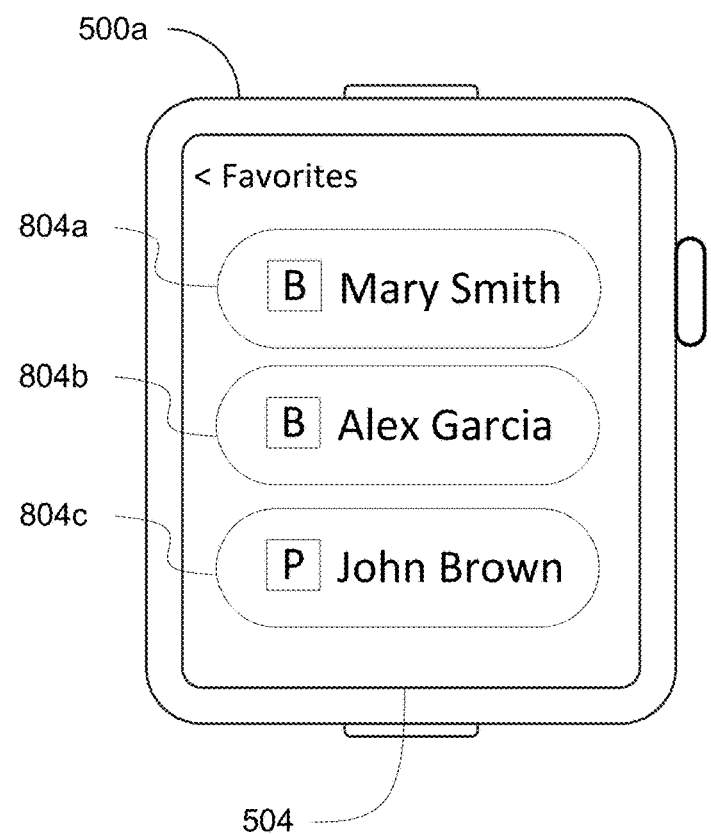
FIG. 8C

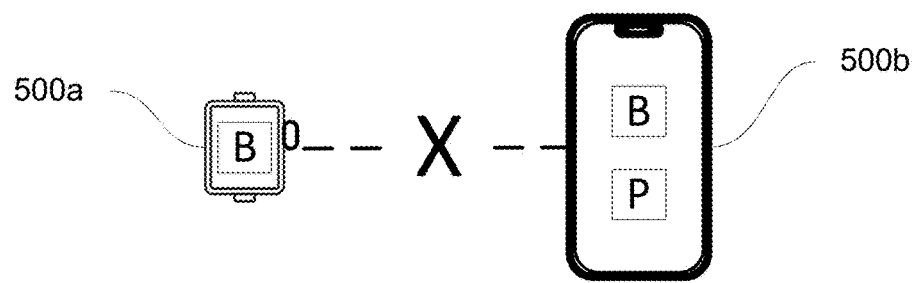
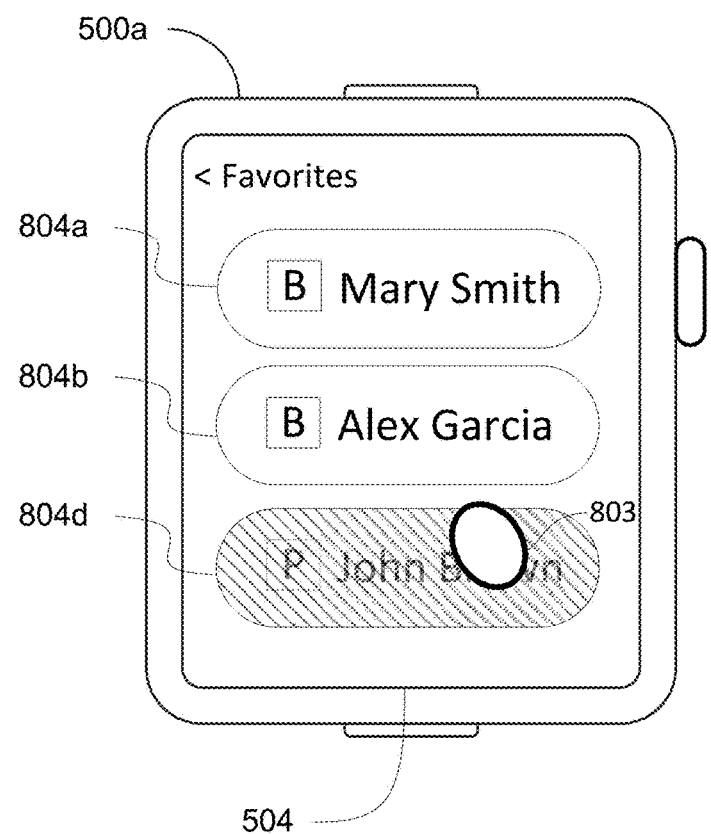
FIG. 8D

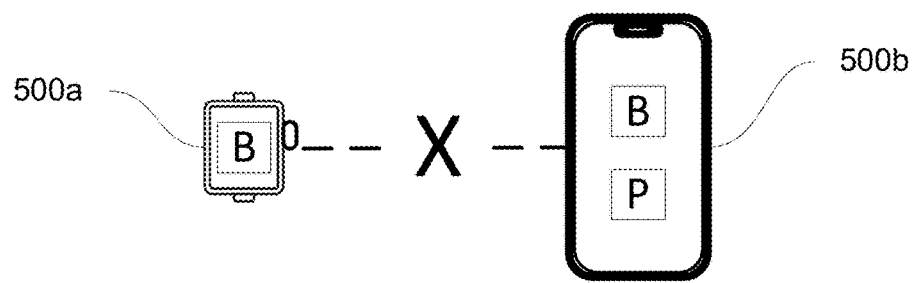
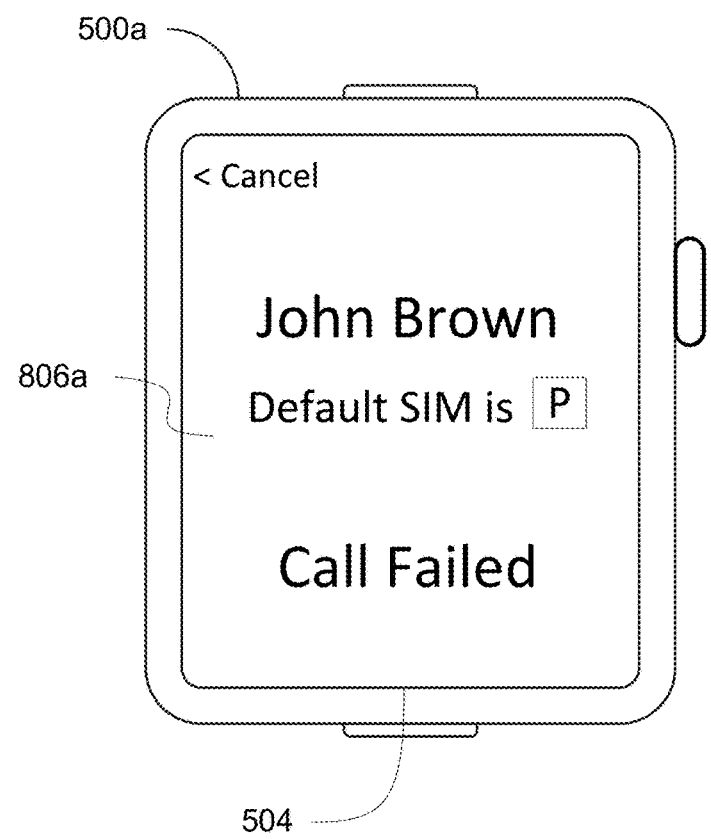
FIG. 8E

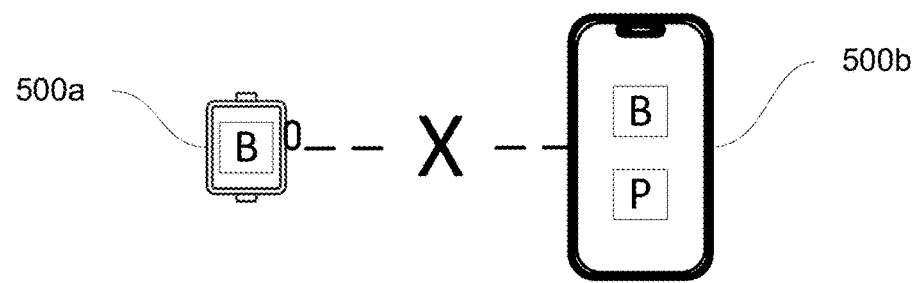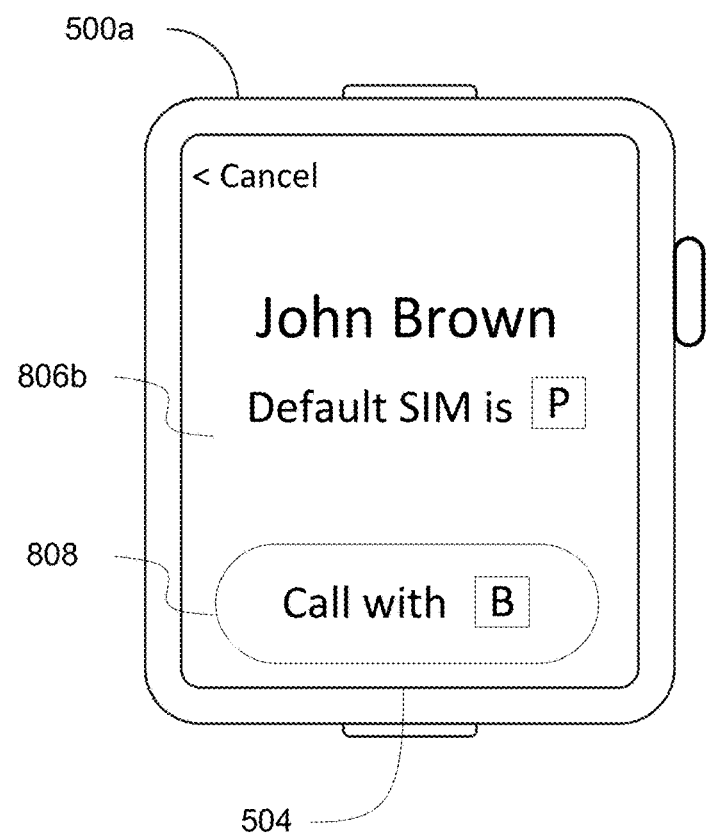
FIG. 8F

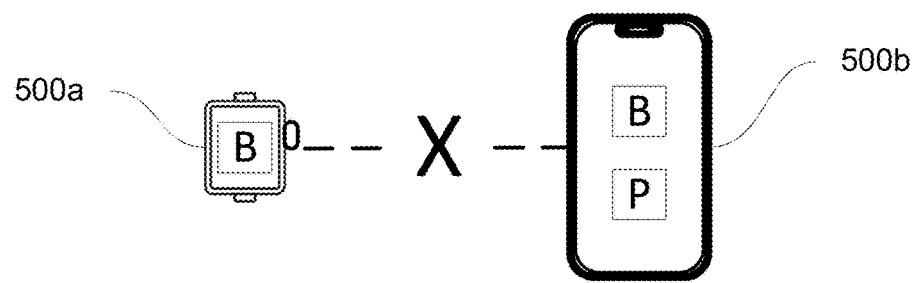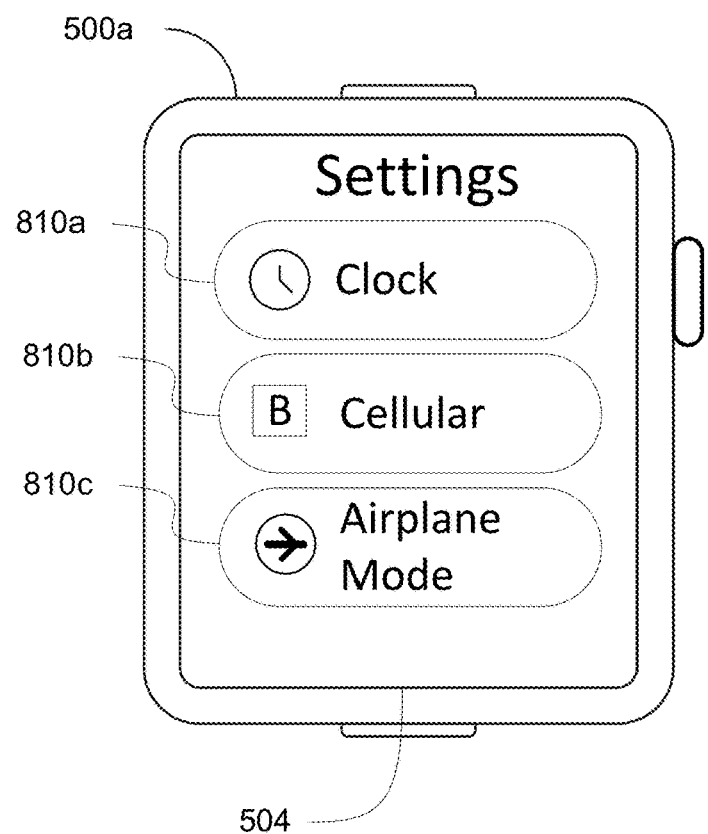
FIG. 8G

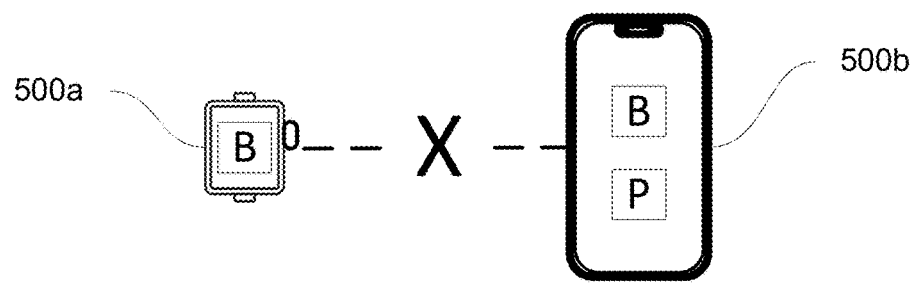
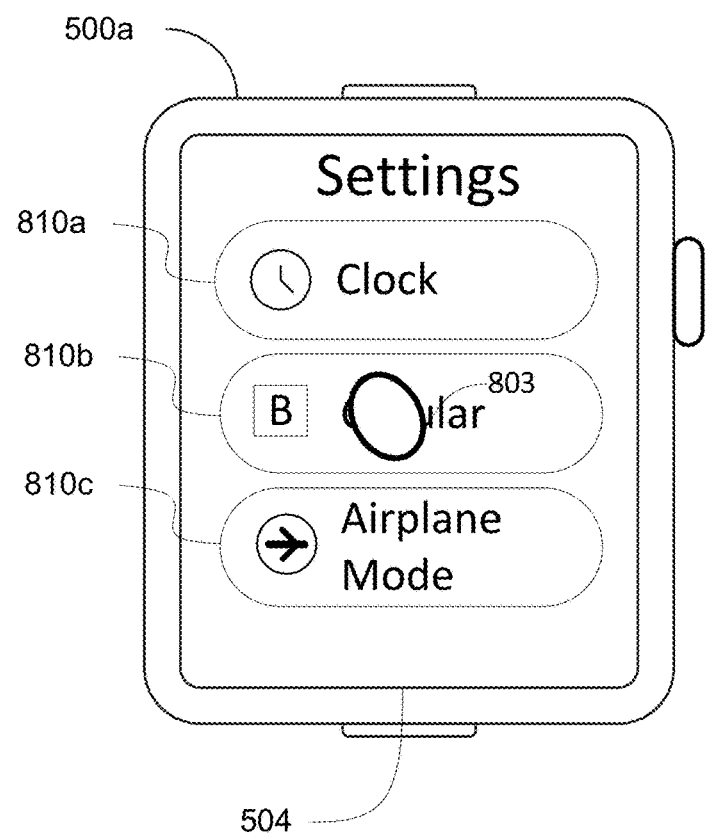
FIG. 8H

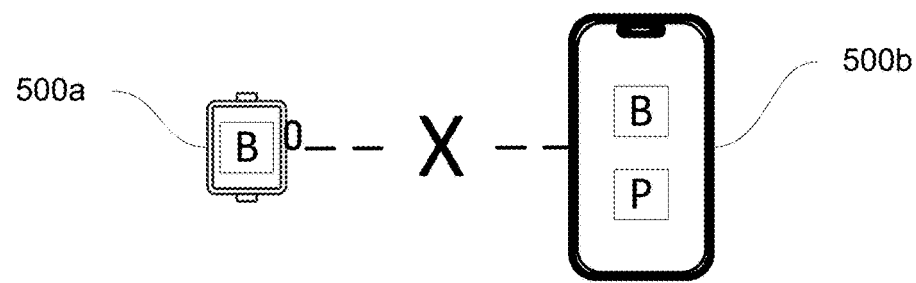
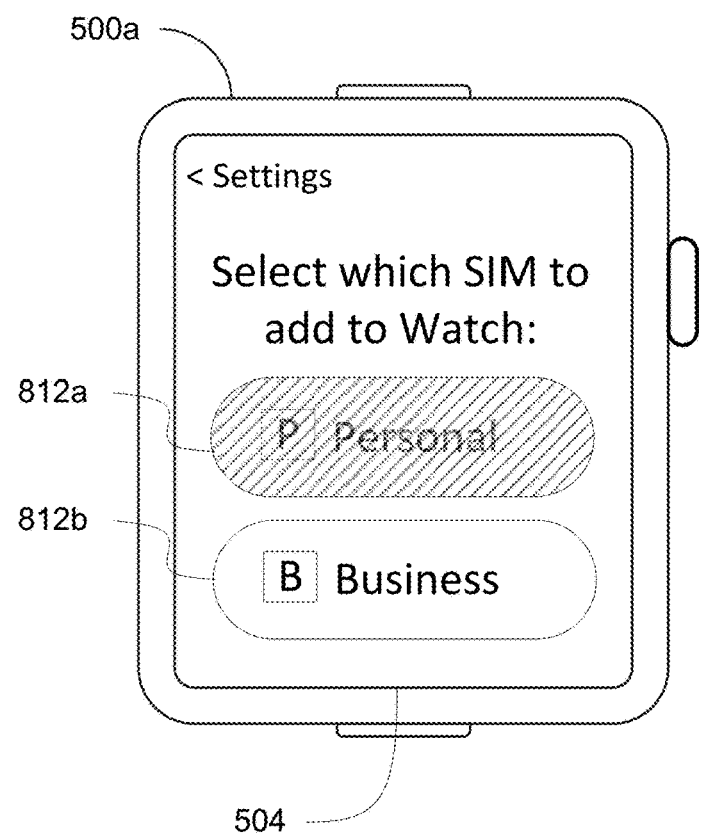
FIG. 8I

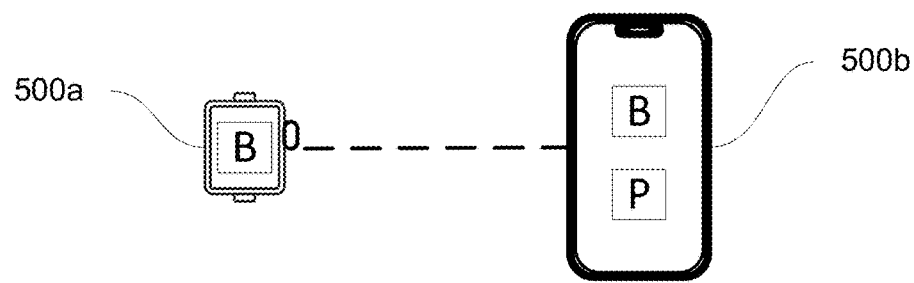
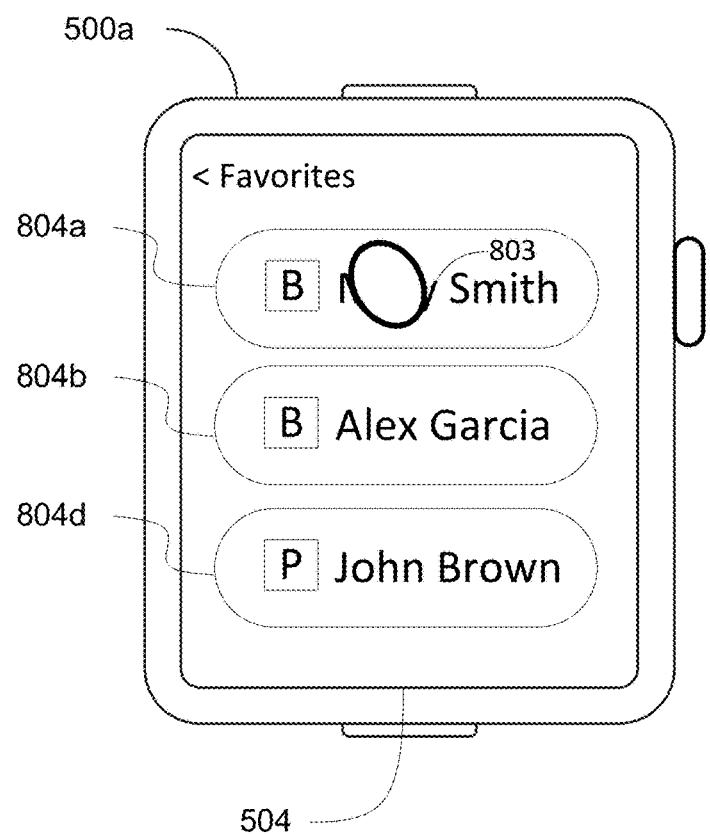
FIG. 8J

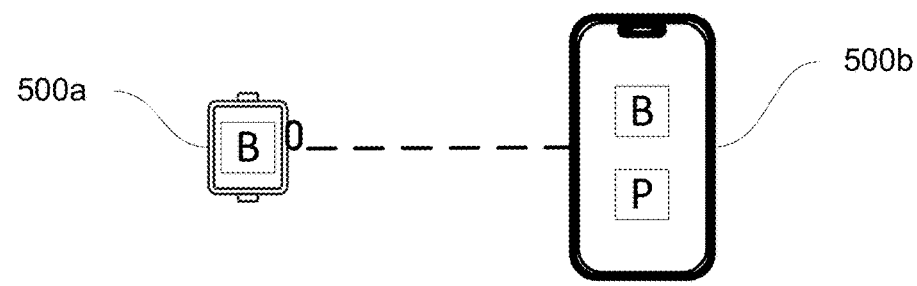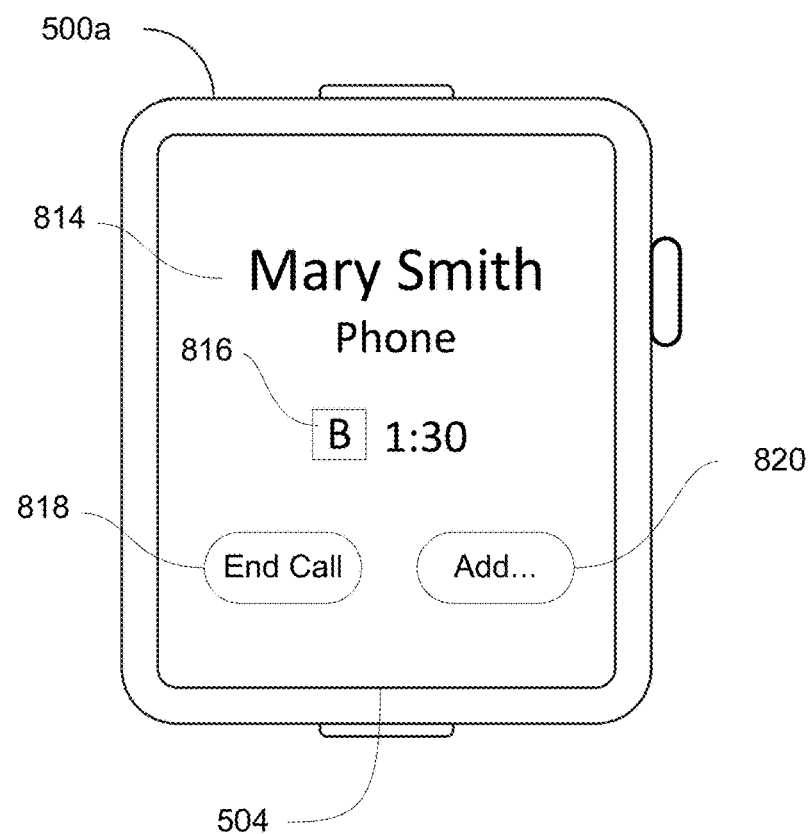
FIG. 8K

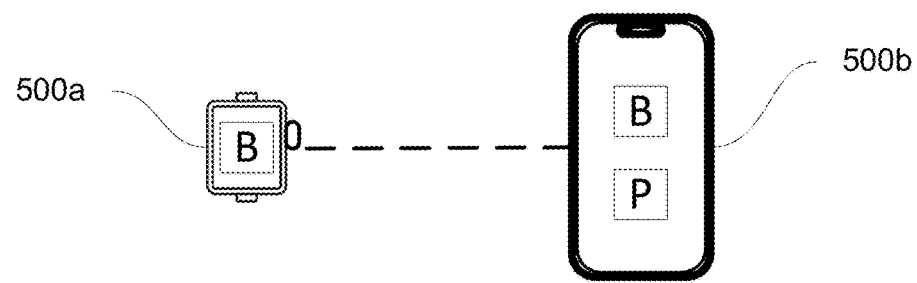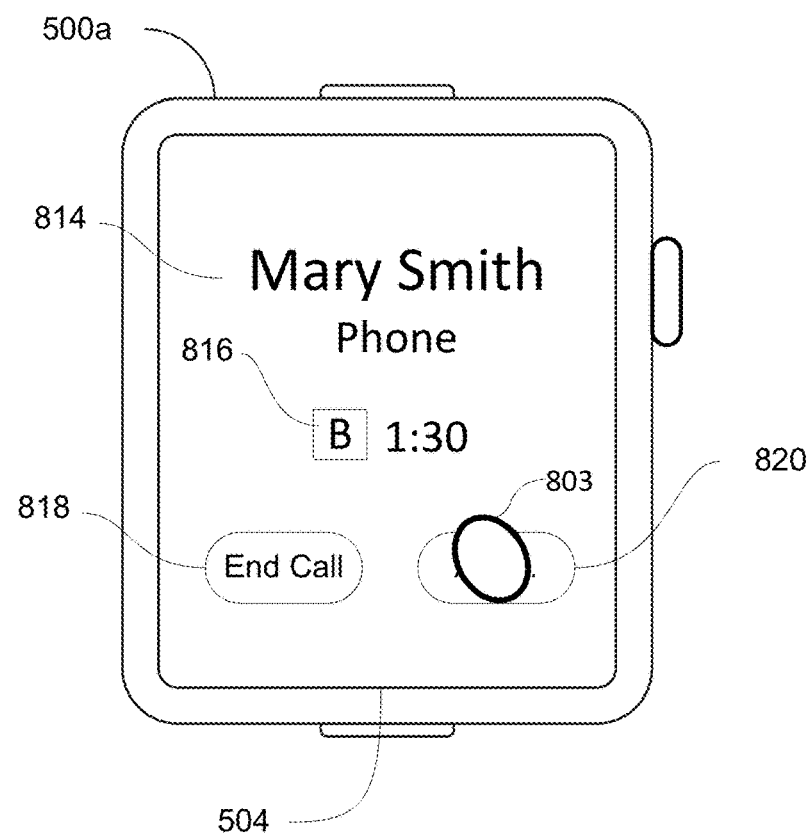
FIG. 8L

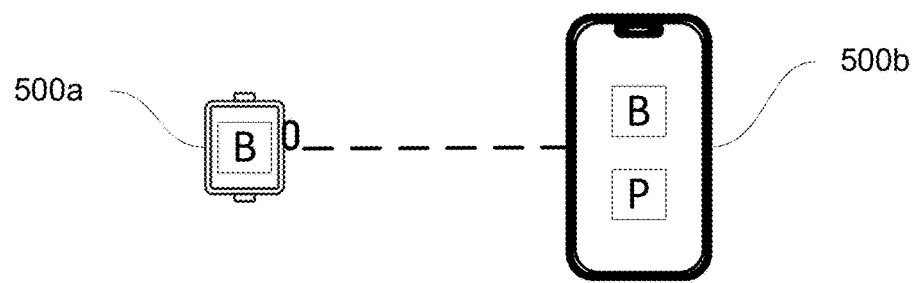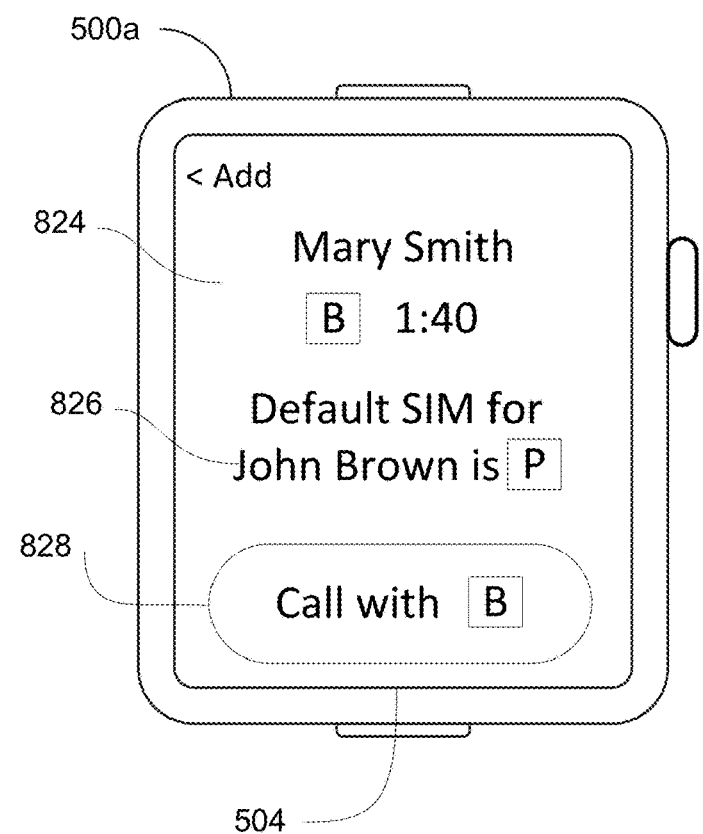
FIG. 8N

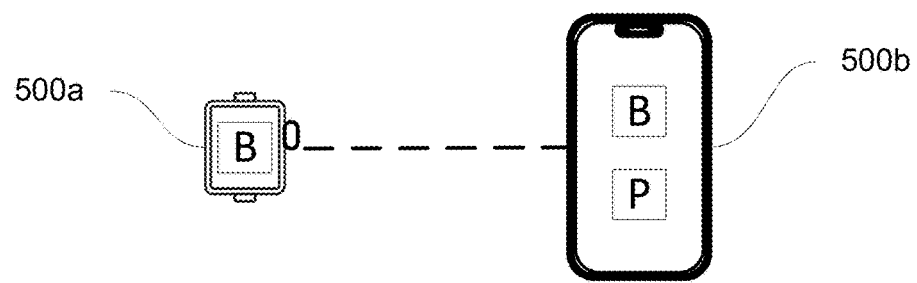
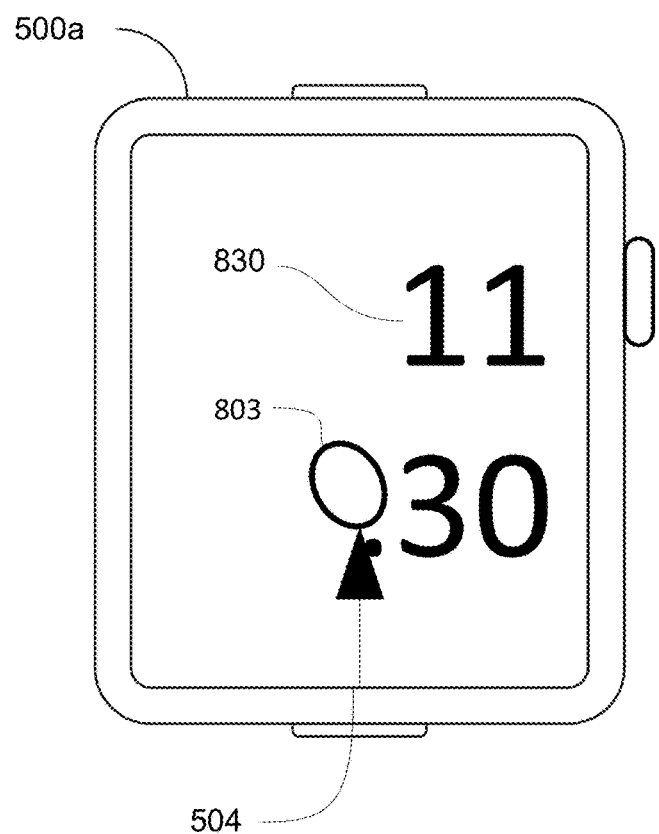
FIG. 8O

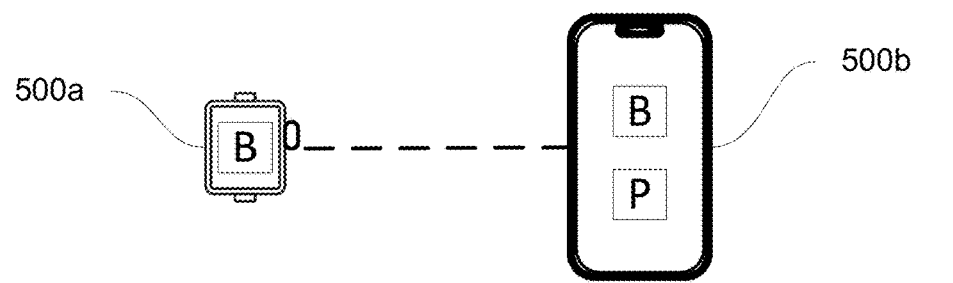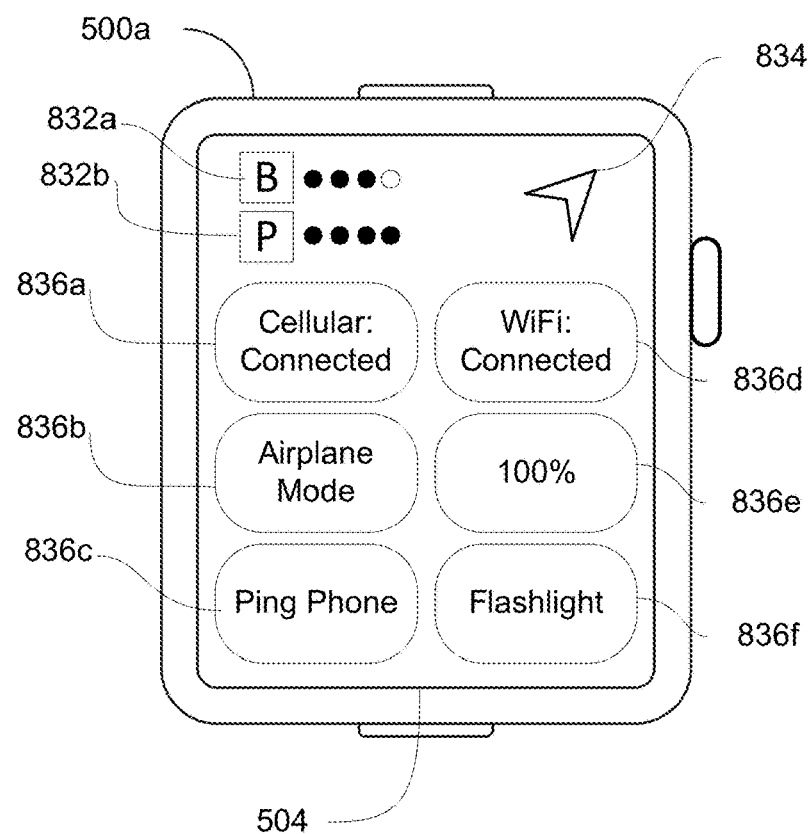
FIG. 8P

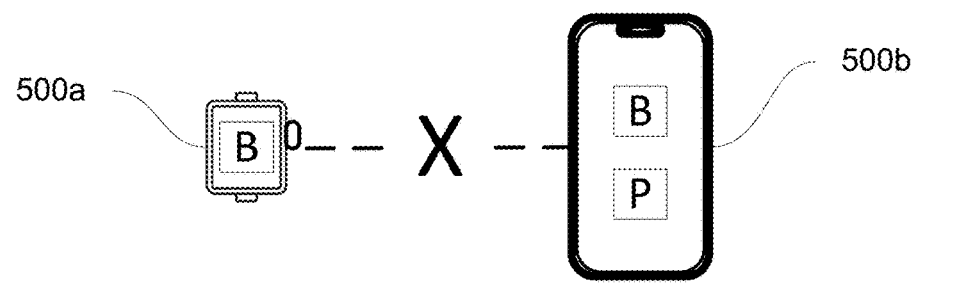
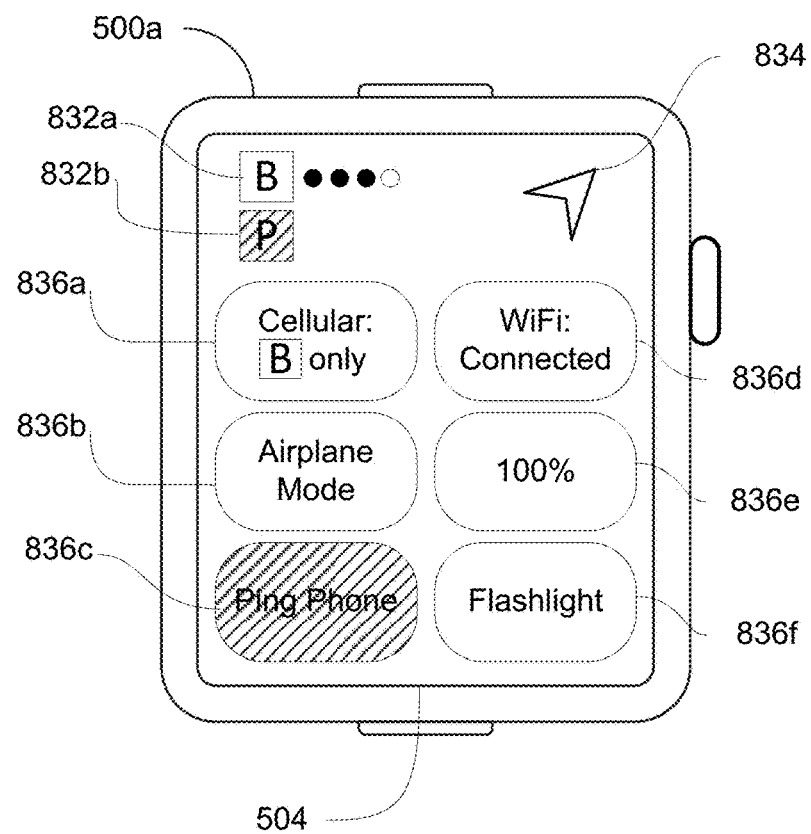
FIG. 8Q

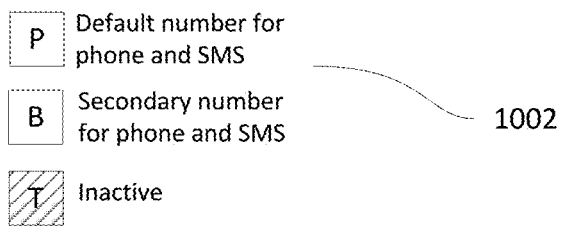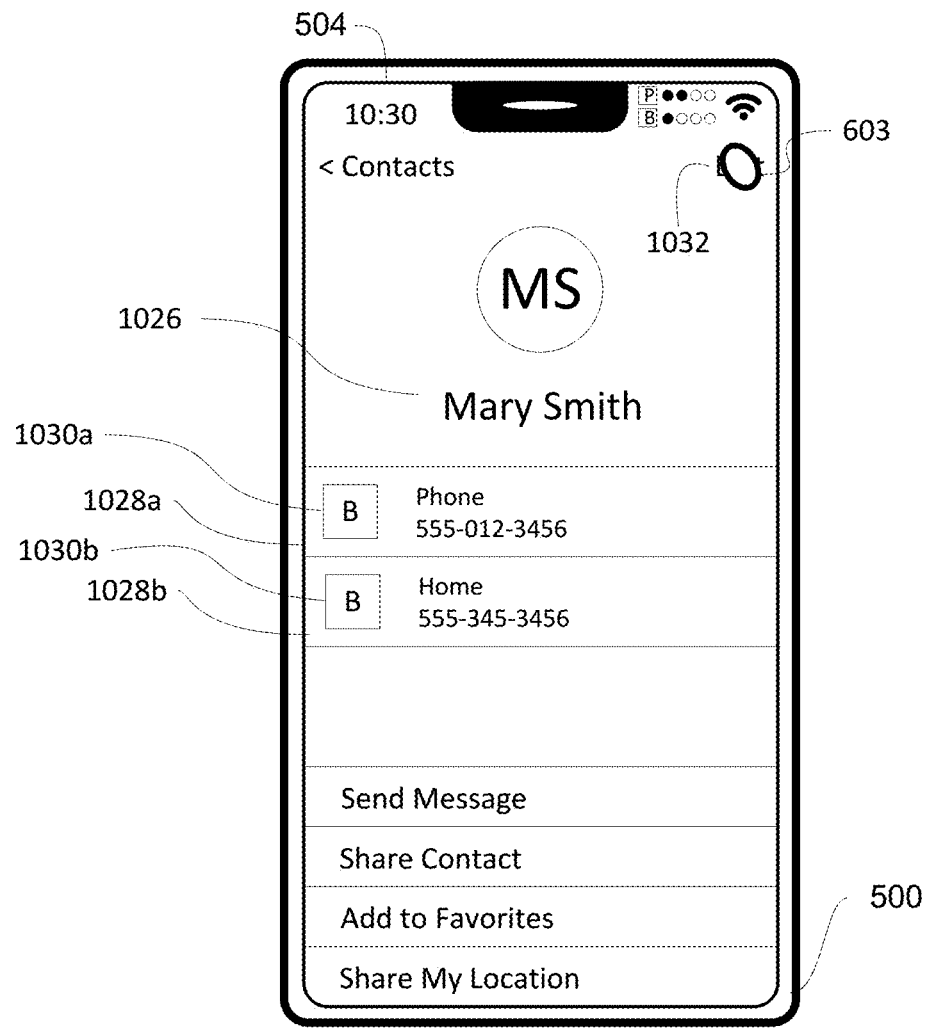
FIG. 10I

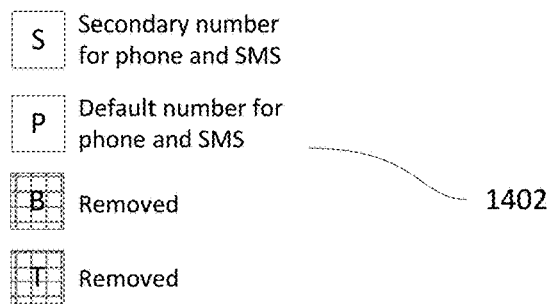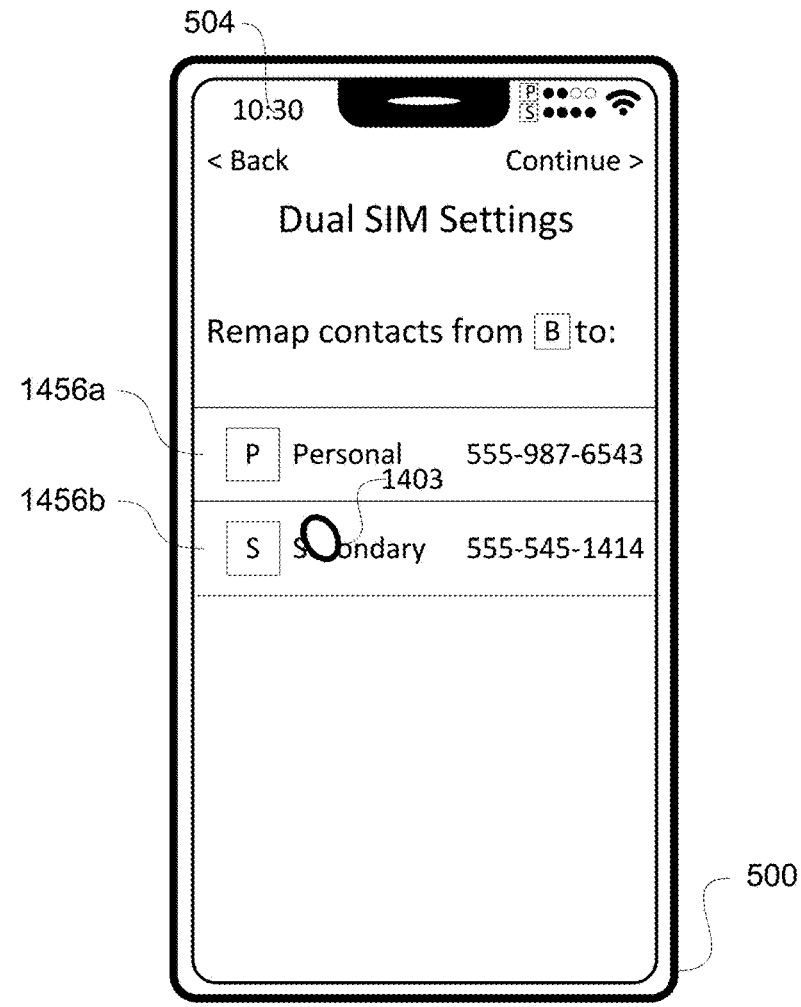
FIG. 14CC

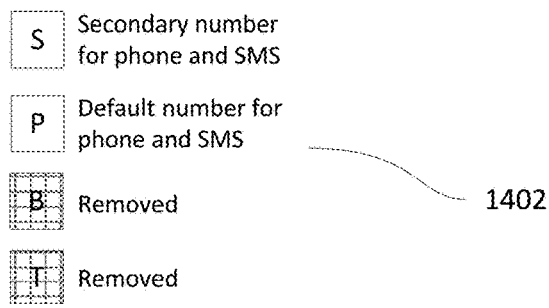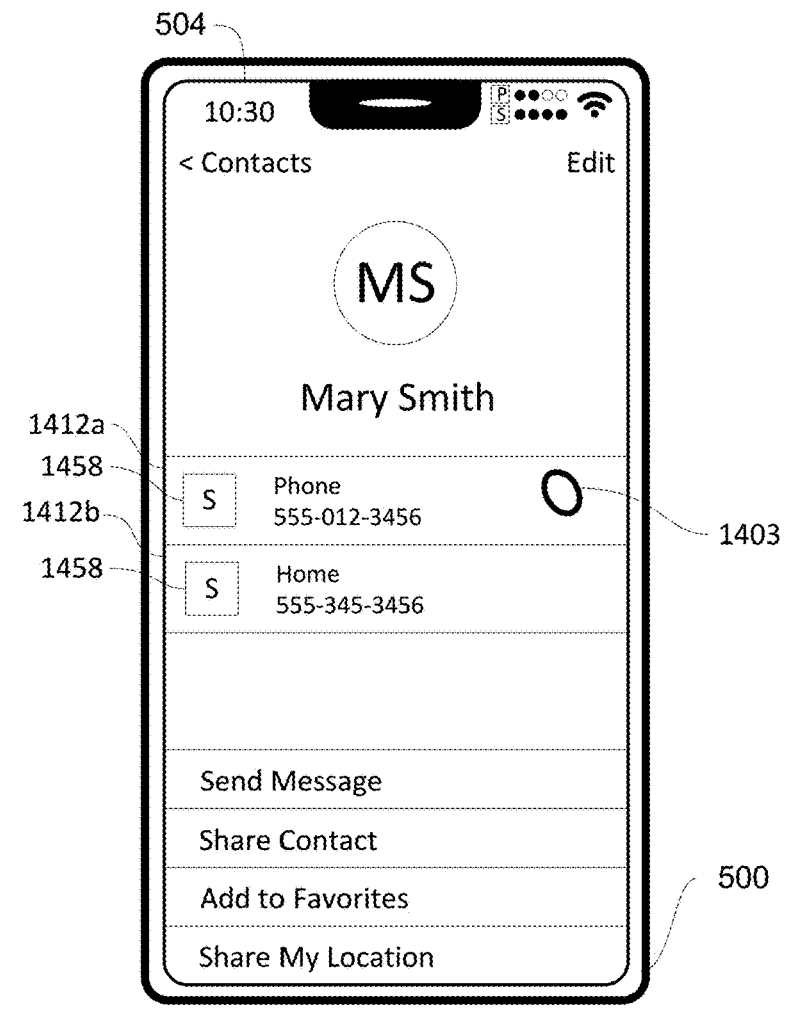
FIG. 14DD

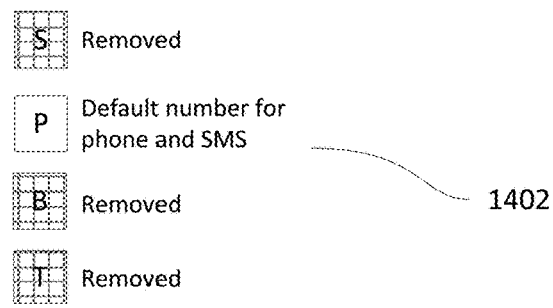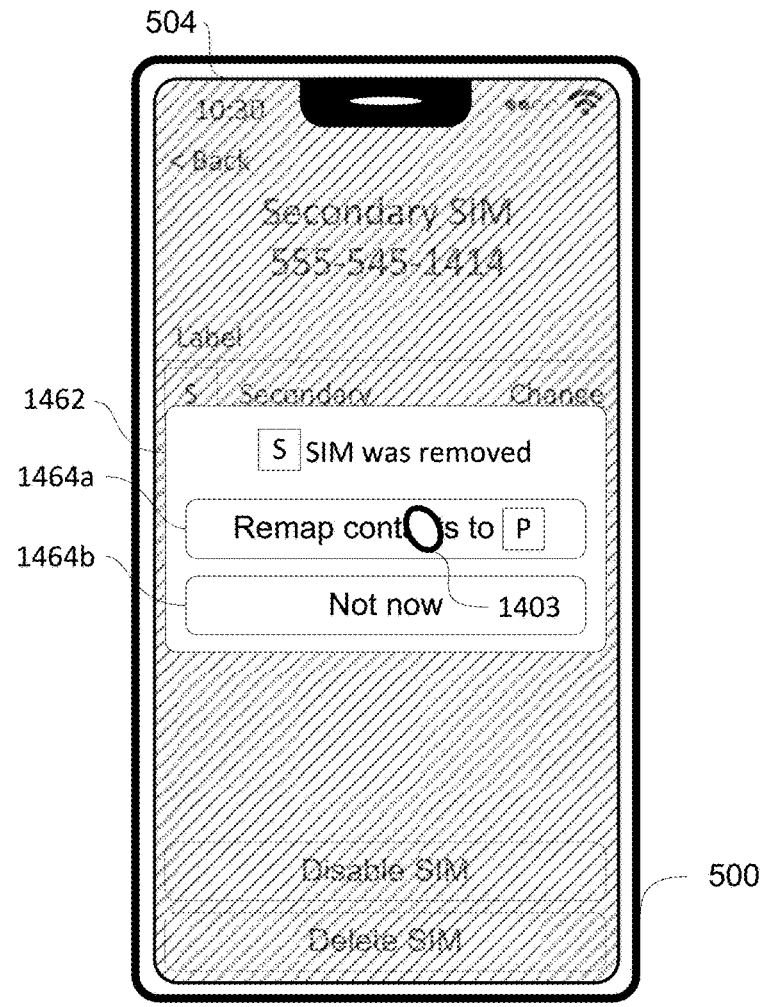
FIG. 14FF

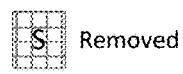 Removed
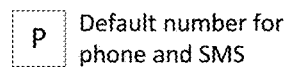 Default number for phone and SMS — 1402
 Removed
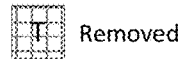 Removed
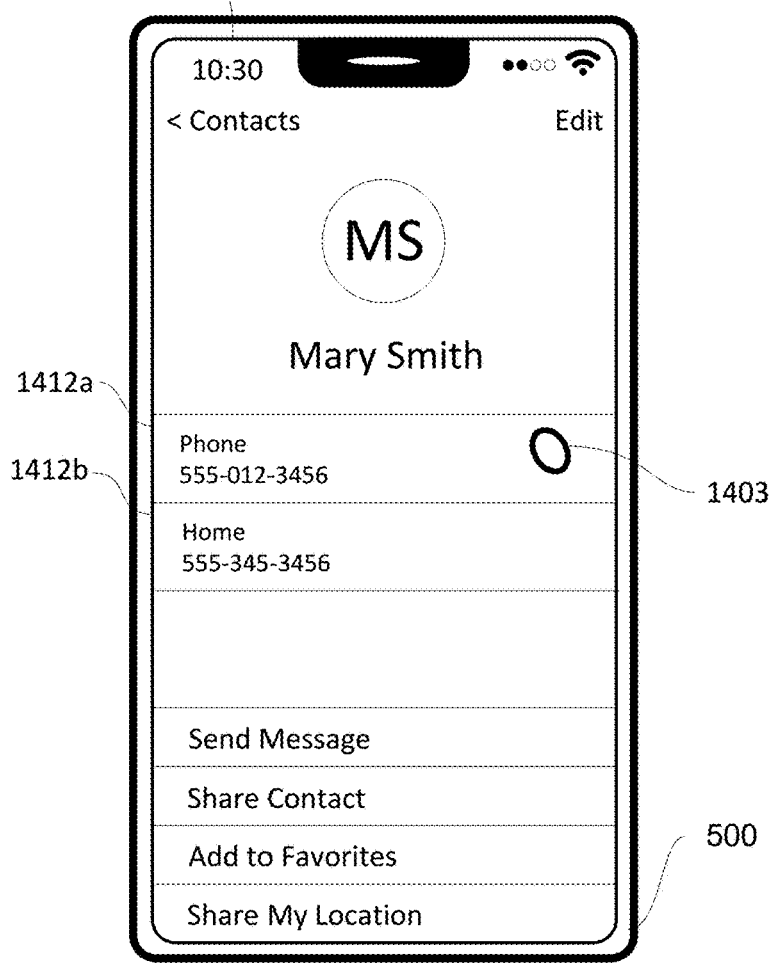
FIG. 14GG

 Removed
 Default number for phone and SMS – in use
 Removed
 Removed
1402
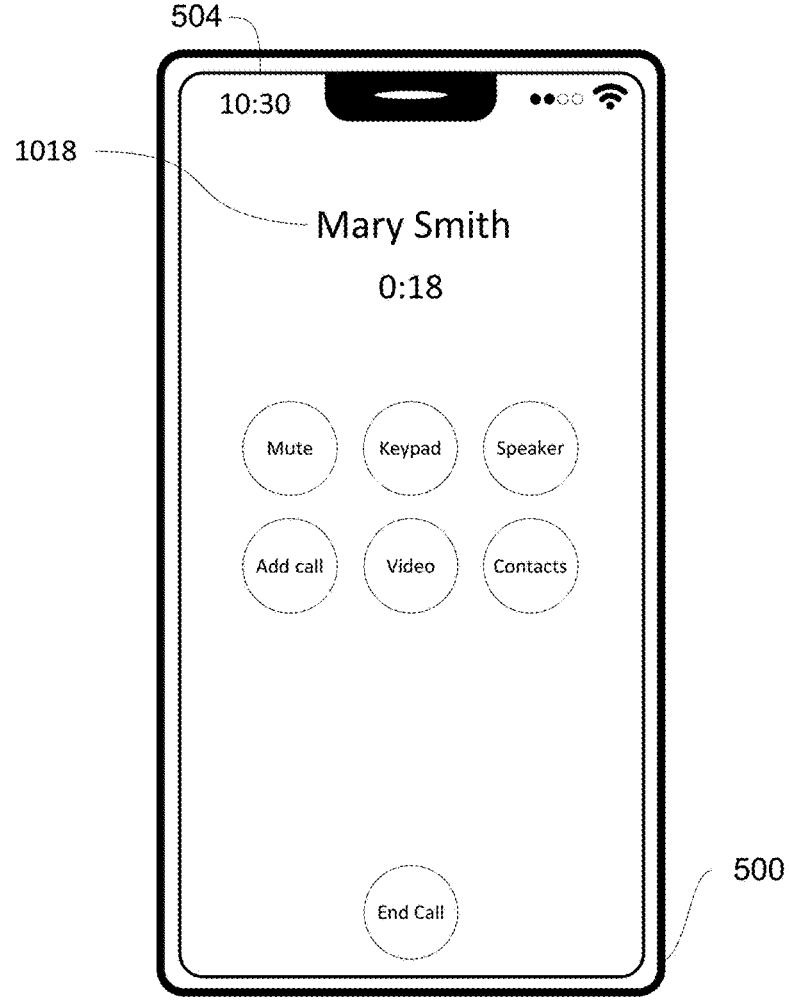
FIG. 14HH

1500

1502
While the electronic device is enabled to communicate using either a first cellular identifier that is associated with a first set of users or a second cellular identifier that is associated with a second set of users, different from the first set of users, detect a change in configuration of the device with respect to one or more cellular identifiers 1504
In response to detecting the change in configuration of the device with respect to the one or more cellular identifiers 1506
In accordance with a determination that the change in configuration of the device includes removal of the first cellular identifier from the electronic device, display, on the display, a first alert with a selectable option that, when selected, causes the first set of users to be associated with the second cellular identifier instead of being associated with the first cellular identifier 1508
In accordance with a determination that the change in configuration of the device includes removal of the second cellular identifier from the electronic device, display, on the display, a second alert with a selectable option that, when selected, causes the second set of users to be associated with the first cellular identifier instead of being associated with the second cellular identifier

FIG. 15A (A)

USER INTERFACES FOR CONTROLLING OR PRESENTING INFORMATION ABOUT MULTIPLE CELLULAR IDENTIFIERS ON AN ELECTRONIC DEVICE

CROSS REFERENCE TO RELATED APPLICATIONS

This application claims the benefit under 35 USC 119(e) of U.S. Provisional Patent Application No. 62/729,973, filed Sep. 11, 2018 the contents of which are incorporated herein by reference in their entirety for all purposes.

FIELD OF THE DISCLOSURE

This relates generally to electronic devices that control or present information about multiple cellular identifiers of the device, and user interactions with such devices.

BACKGROUND

User interaction with electronic devices has increased significantly in recent years. These devices can be devices such as computers, tablet computers, televisions, multimedia devices, mobile devices, and the like.

In some circumstances, users wish to view information about the cellular identifiers (e.g., SIM cards, eSIMS, etc.) of an electronic device, such as which operations are performed using the cellular identifiers of the electronic device. Enhancing these interactions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY

Some embodiments described in this disclosure are directed to one or more electronic devices that present settings user interfaces associated with cellular identifiers. Some embodiments described in this disclosure are directed to one or more first electronic devices that access a first cellular identifier regardless of the one or more first electronic devices' connection to one or more second electronic devices, and ways in which the one or more first electronic devices access a second cellular identifier when the one or more first electronic devices are connected to the one or more second electronic devices. Some embodiments described in this disclosure are directed to one or more electronic devices that present visual indications of cellular identifiers in relation to communication functions. Some embodiments described in this disclosure are directed to one or more electronic devices that present visual indications of the status of the cellular identifiers active on the electronic device. Some embodiments described in this disclosure are directed to one or more electronic devices that present alerts related to cellular identifiers that have been removed from the one or more electronic devices.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIGS. 7A-7I are flow diagrams illustrating a method of presenting settings user interfaces associated with cellular identifiers in accordance with some embodiments of the disclosure.

DETAILED DESCRIPTION

Description of Embodiments

Figure 1A:
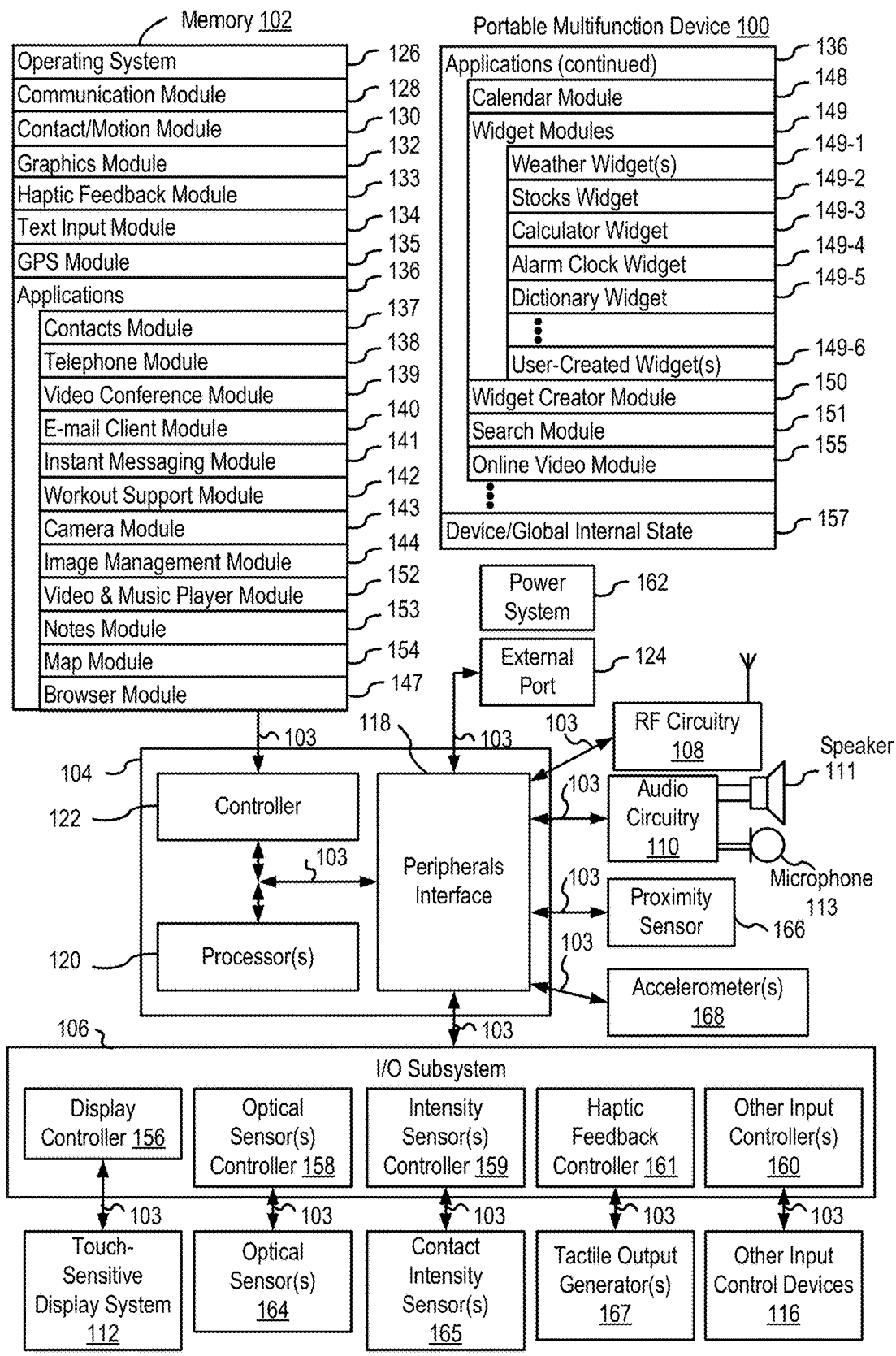
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for presenting information about device cellular identifiers (e.g., SIM cards, eSIMs, etc). Such techniques can reduce the cognitive burden on a user who uses such devices and/or wishes to control their use of such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al), U.S. Pat. No. 6,570,557 (Westerman et al), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions)

Figure 3:
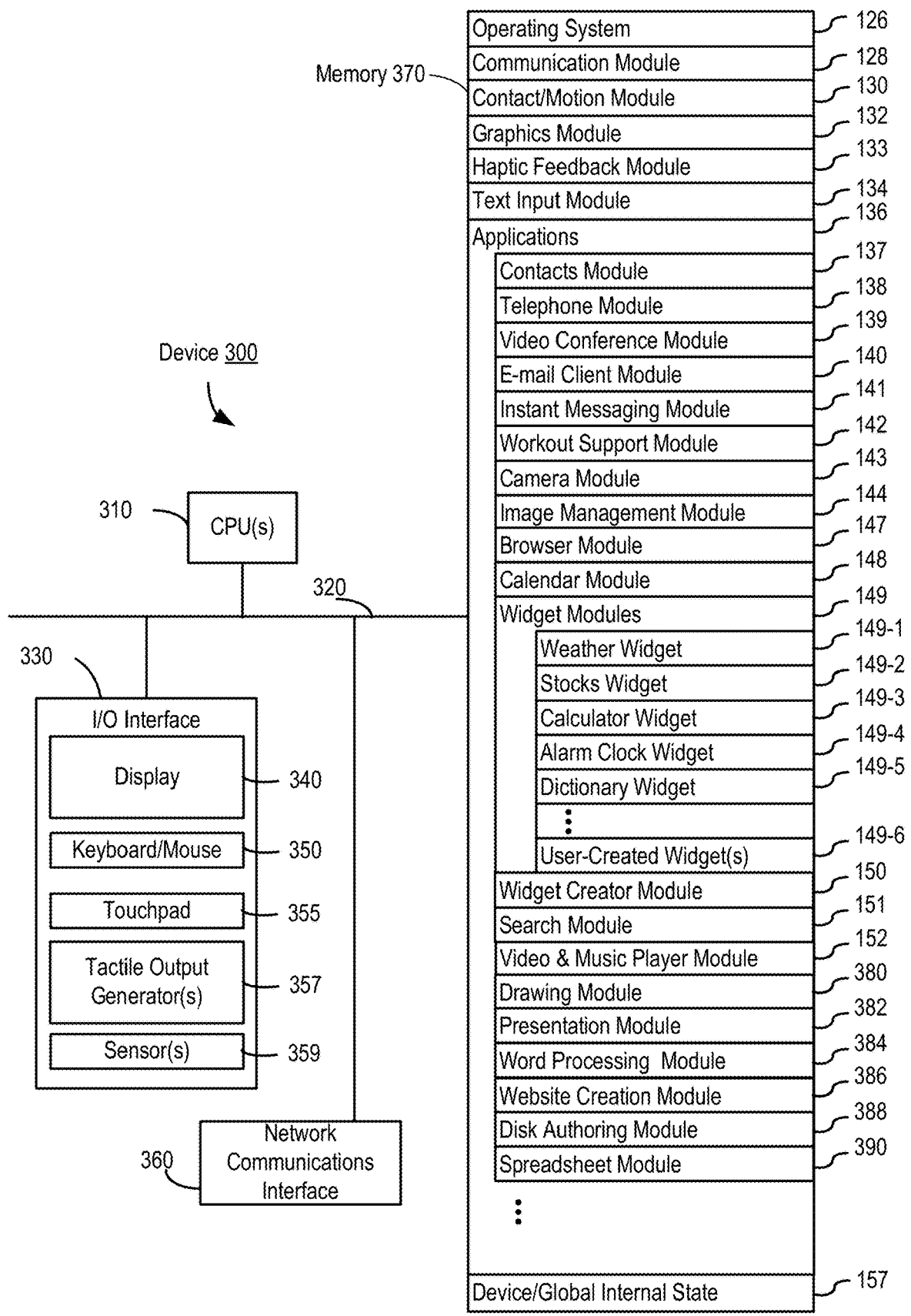
FIG. 3 is a block diagram of an exemplary multifunction device with a display and a touch-sensitive surface in accordance with some embodiments.

136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;

Calendar module 148;

Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
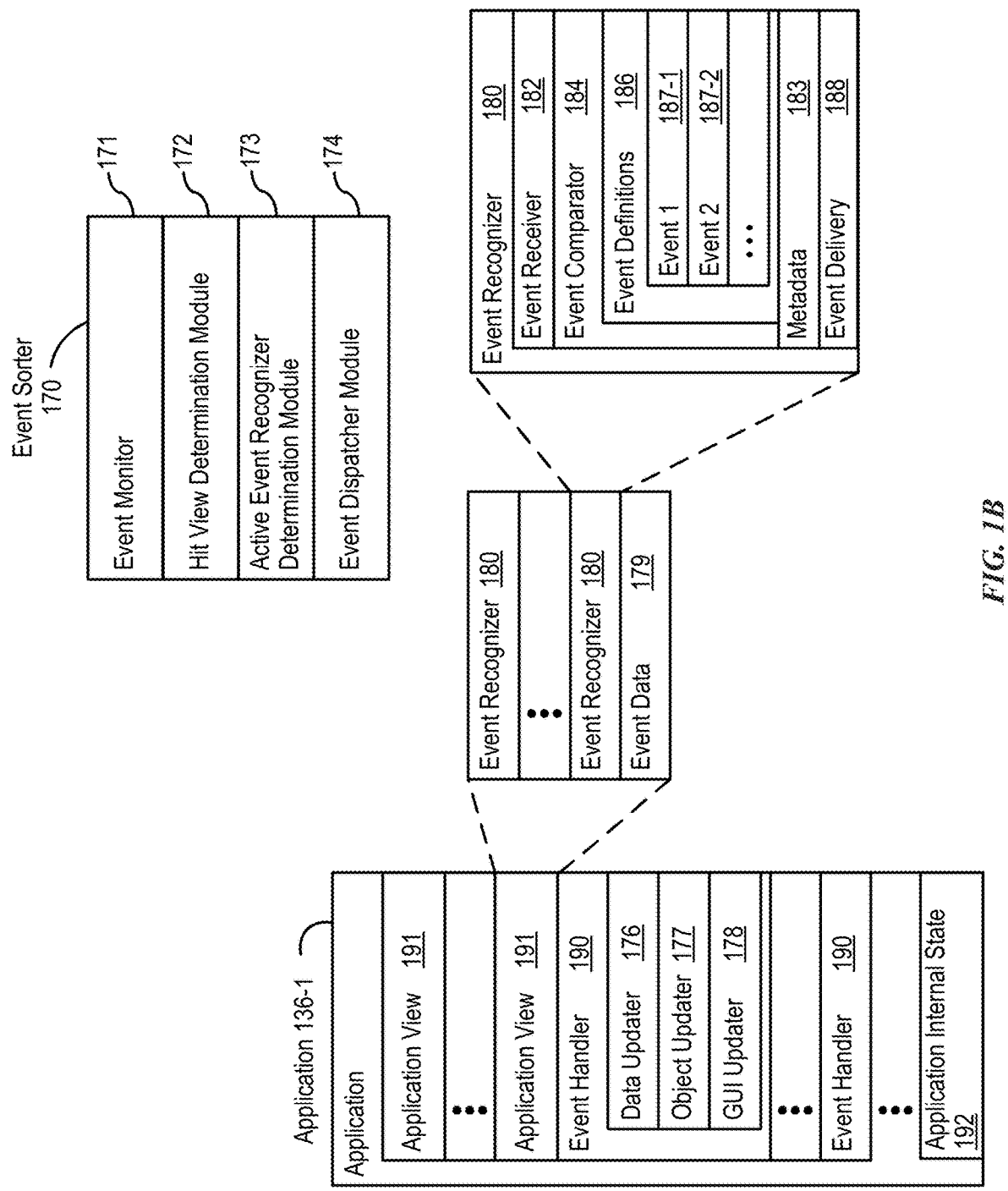
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
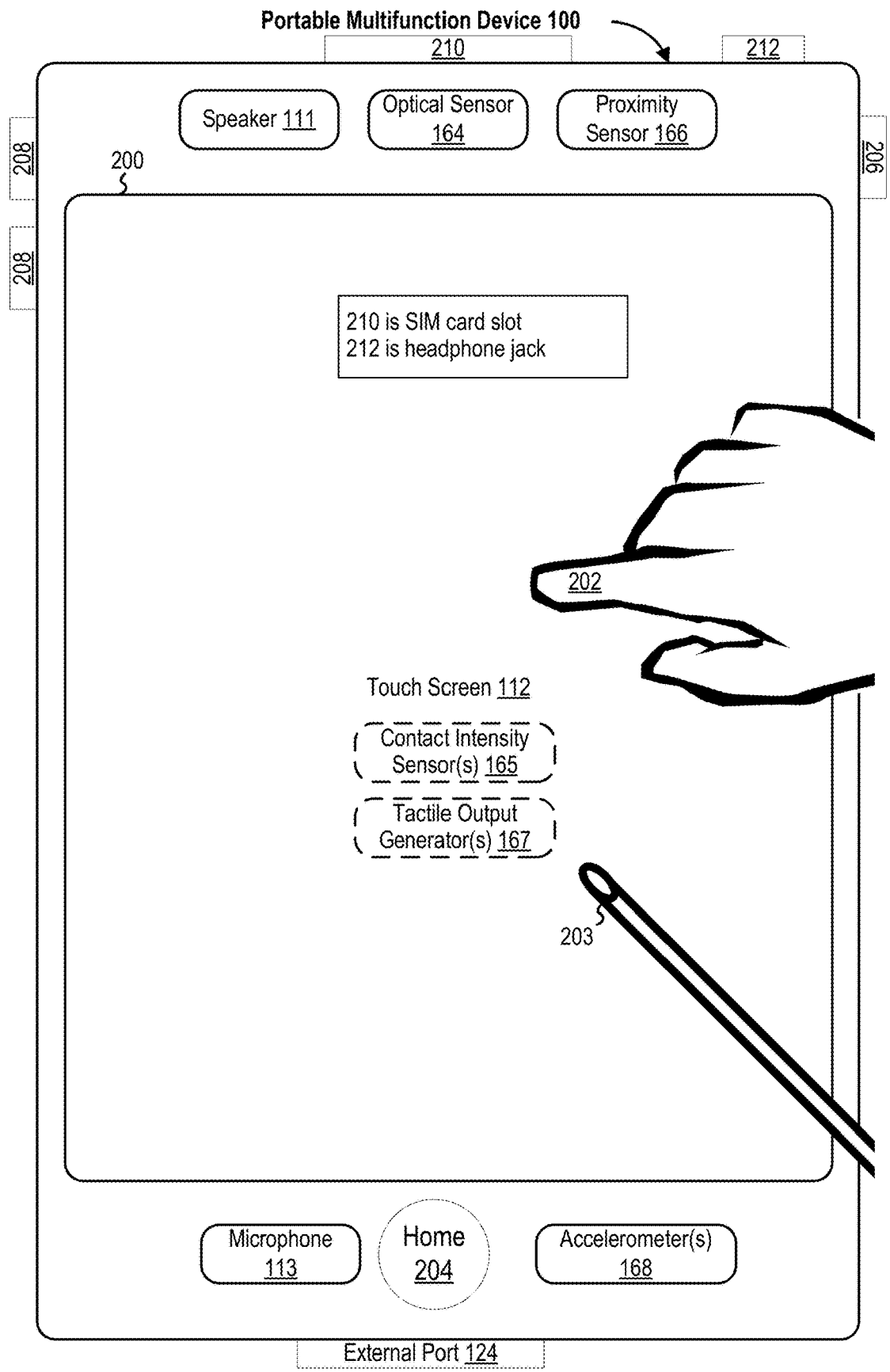
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
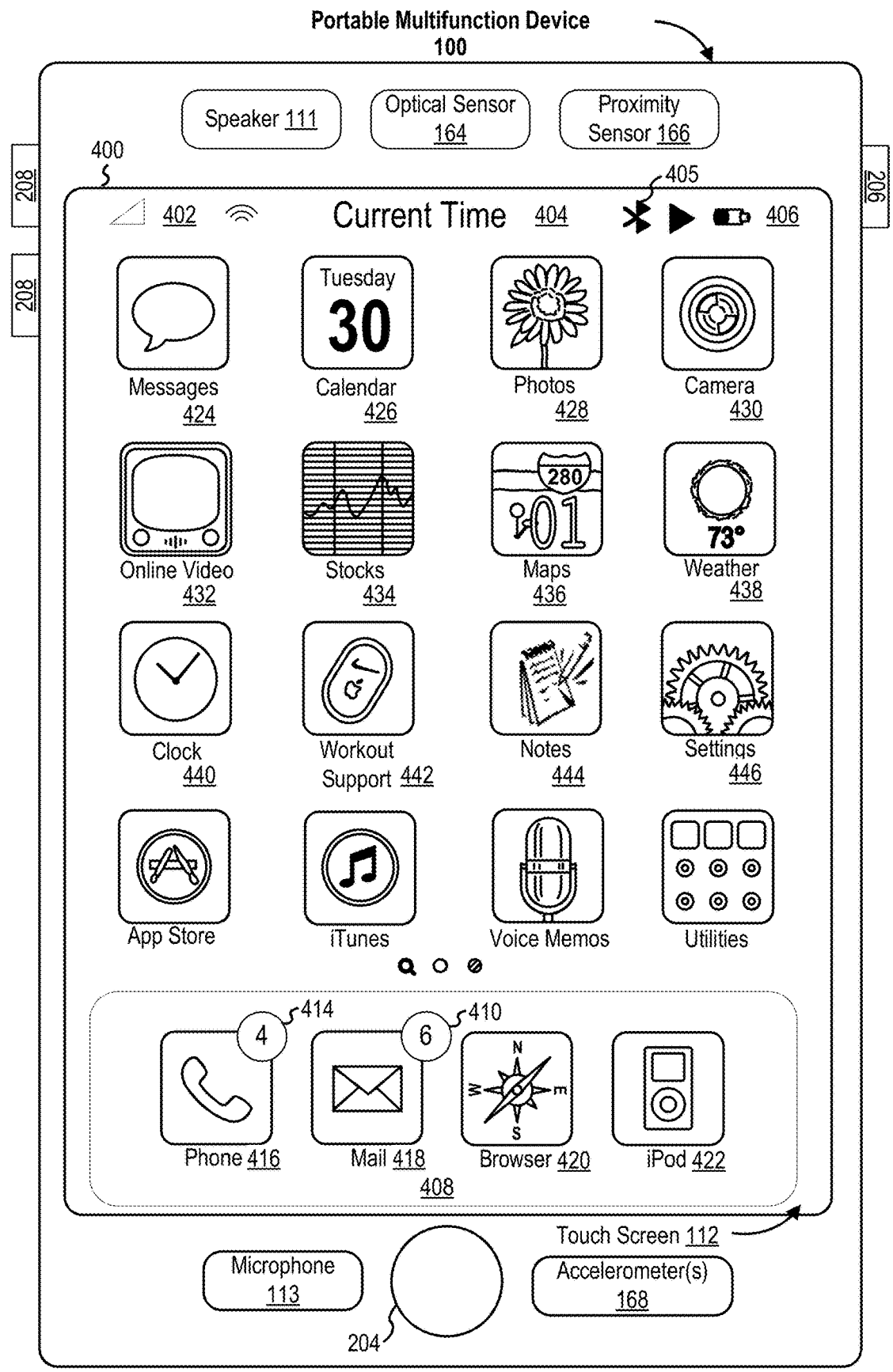
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
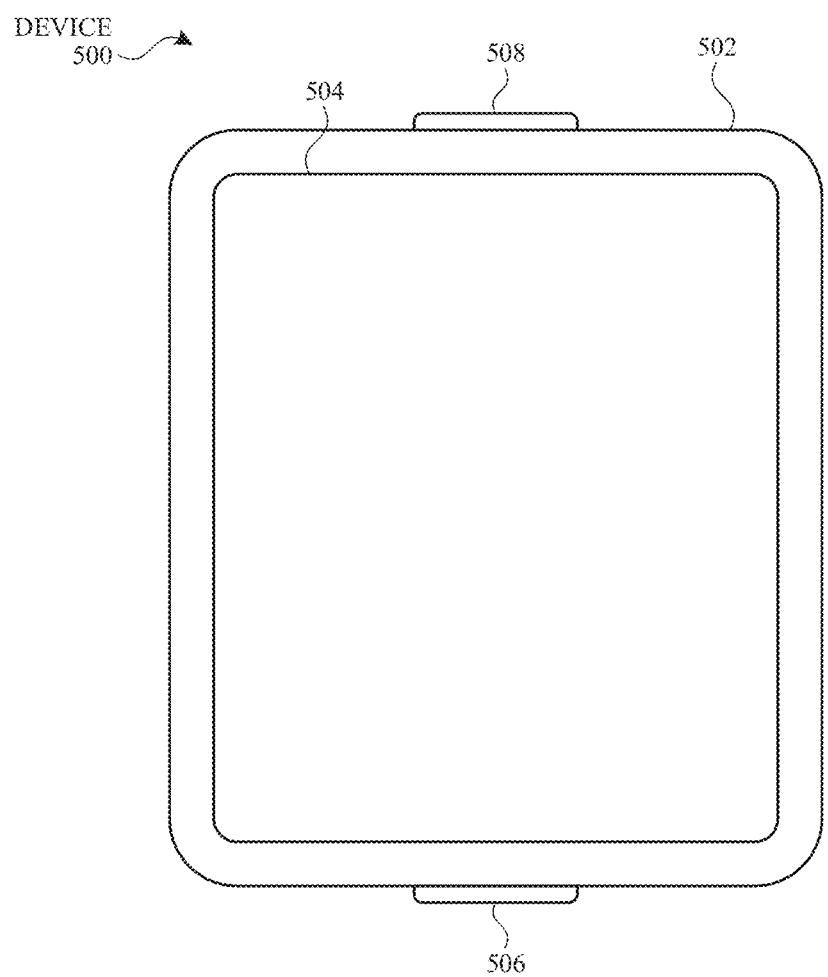
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
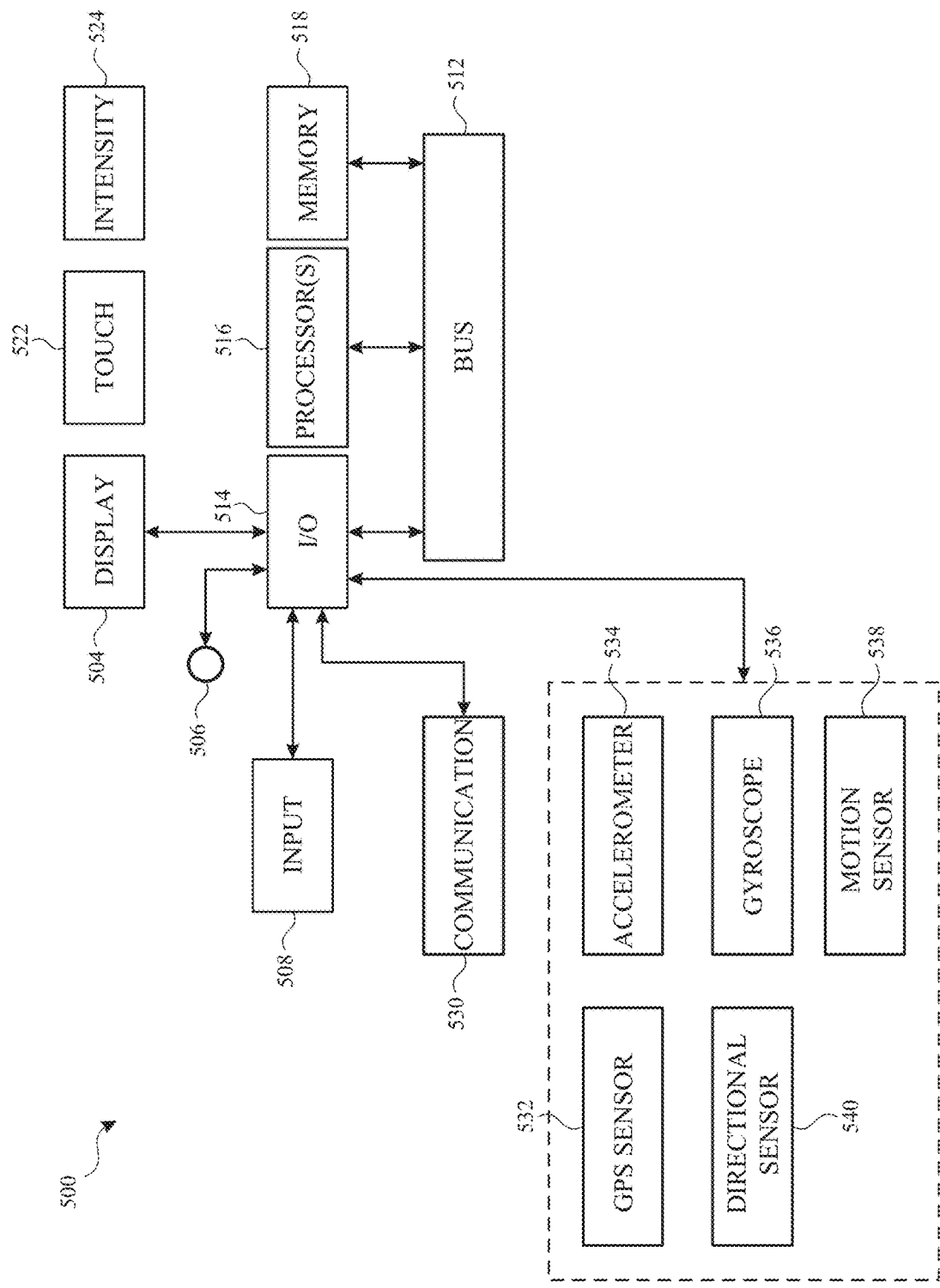
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100 and 1300 (FIGS. 7, 9, 11 and 13). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5D:
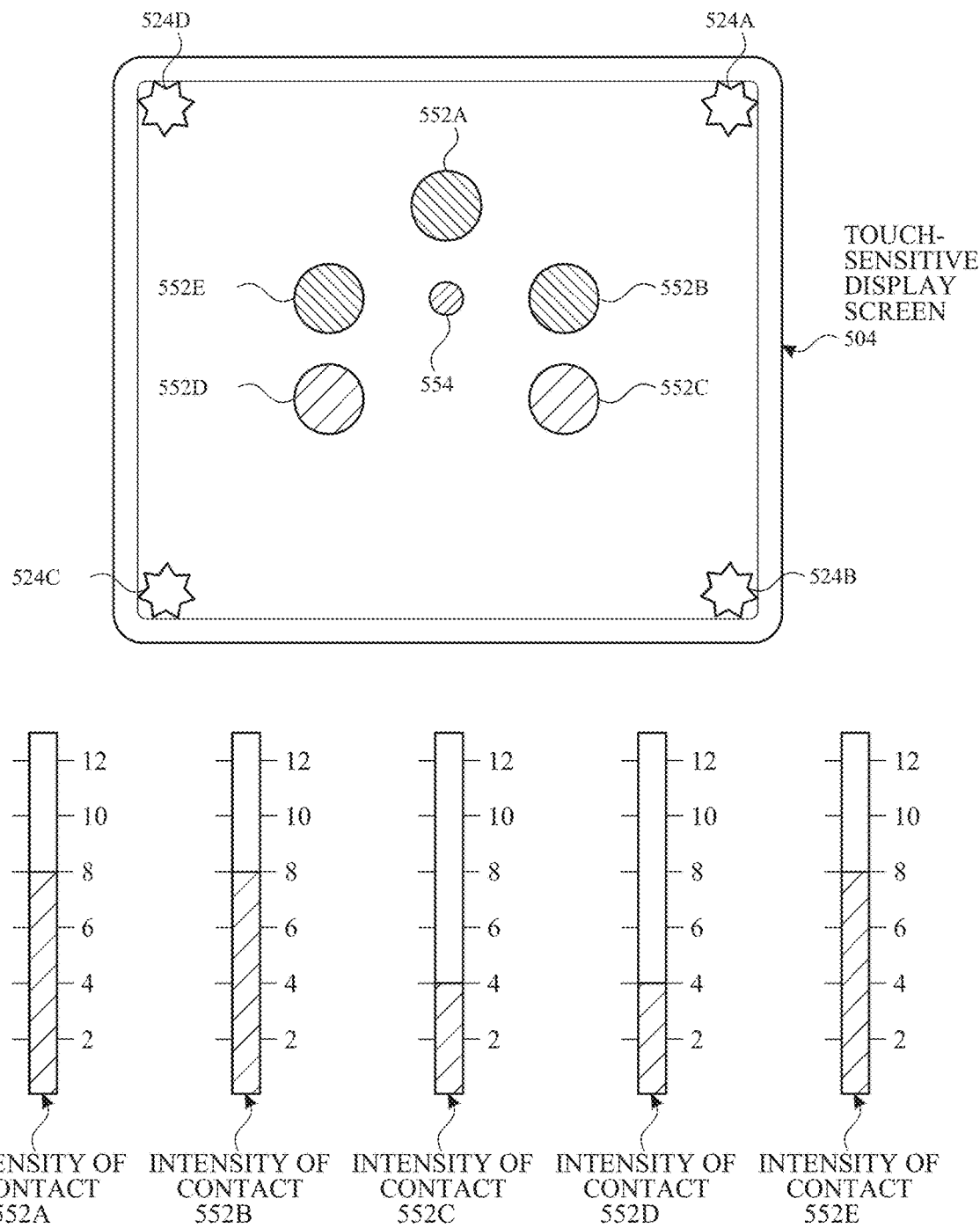

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity $Ij$ that is a portion of the aggregate intensity, A, in accordance with a predefined mathematical function, $Ij=A\cdot(Dj/\Sigma Di)$, where $Dj$ is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:
- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Cellular Identifier Settings User Interfaces

Users interact with electronic devices in many different manners, including viewing information about the electronic device and/or usage of the electronic device. In some embodiments, the electronic device displays a settings user interface for configuring one or more cellular identifiers (e.g., SIM cards or eSIMs) available to the electronic device, thereby allowing the user to view and edit one or more settings of the one or more cellular identifiers available to the electronic device. The embodiments described below provide ways in which an electronic device presents a settings user interface for viewing and changing how the electronic device utilizes one or more cellular identifiers available to the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6A:
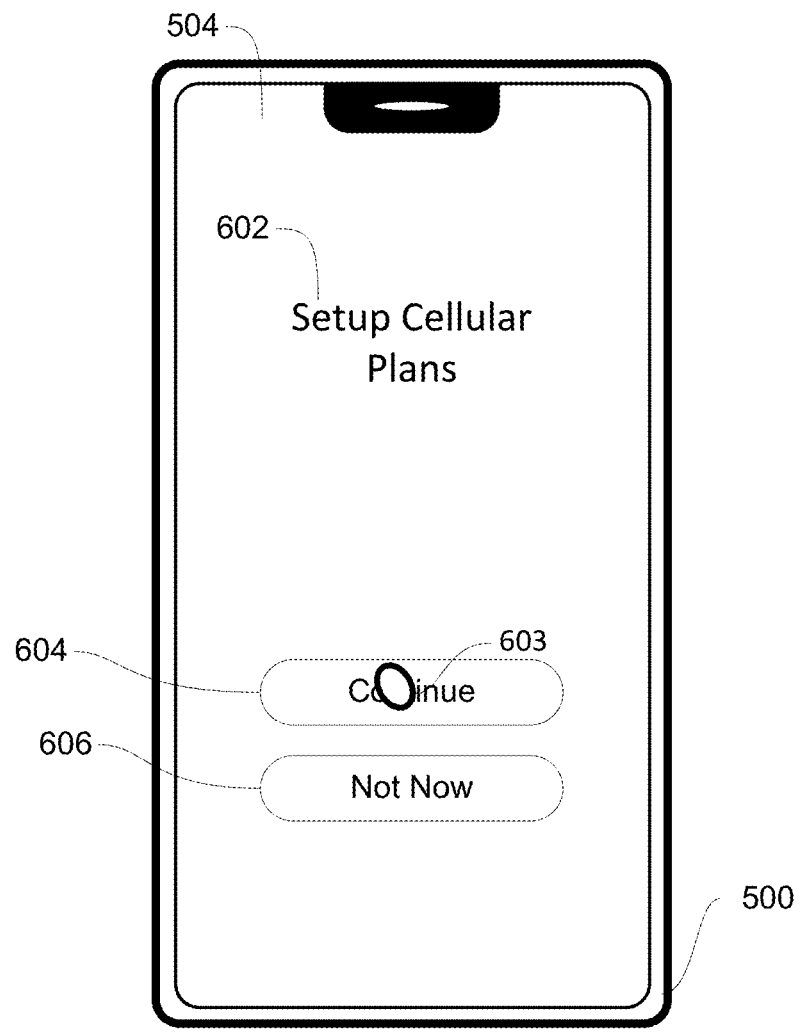
FIGS. 6A-6R illustrate exemplary ways in which an electronic device presents settings user interfaces associated with cellular identifiers in accordance with some embodiments of the disclosure.
Figure 6B:
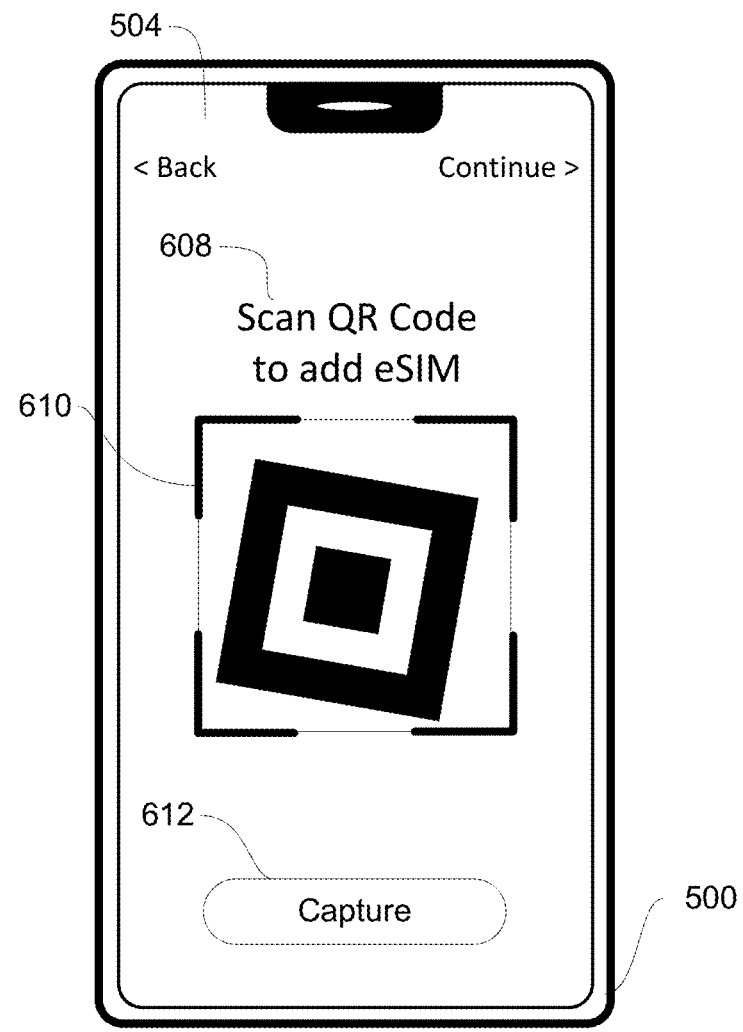
Figure 6C:
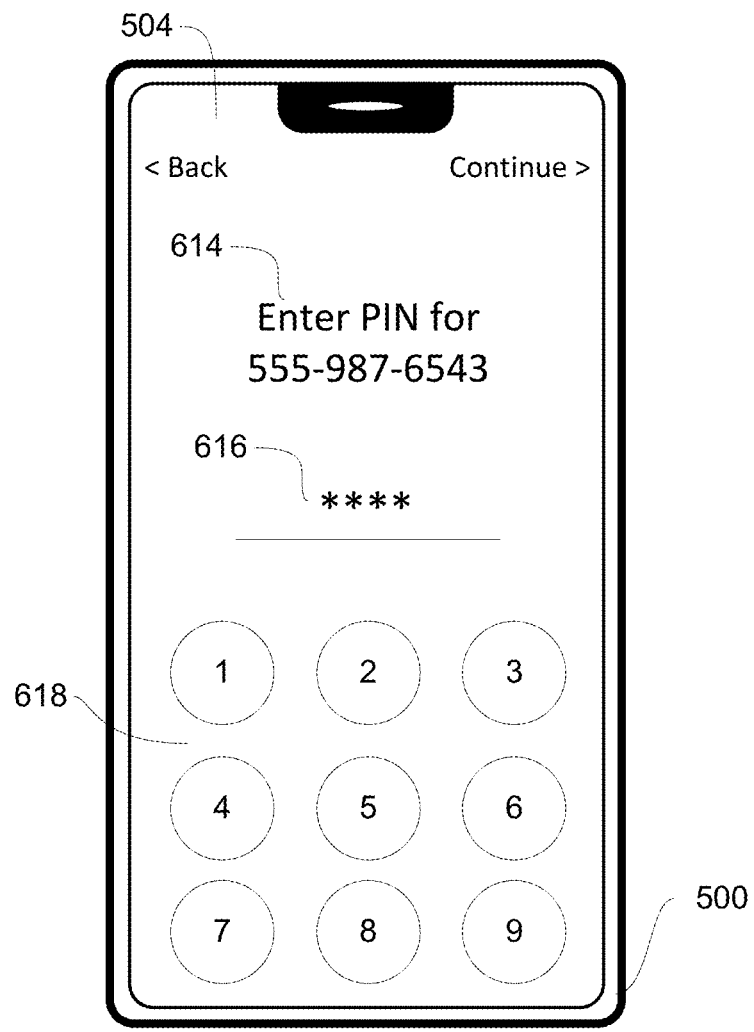
Figure 6D:
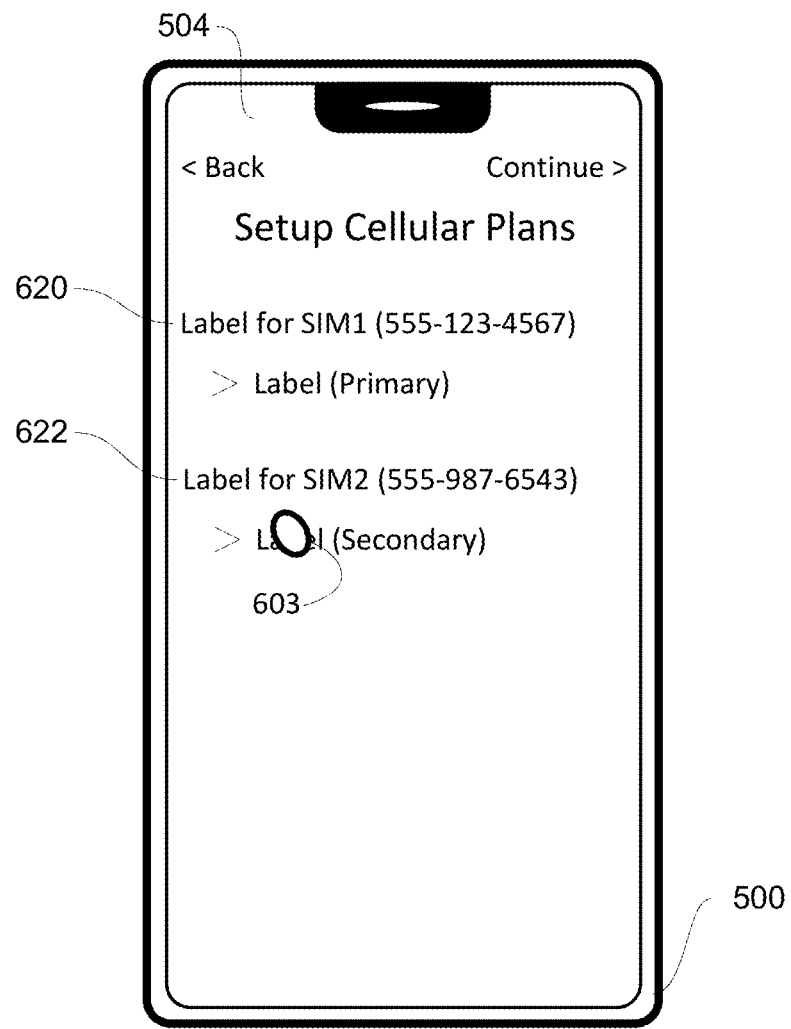
Figure 6E:
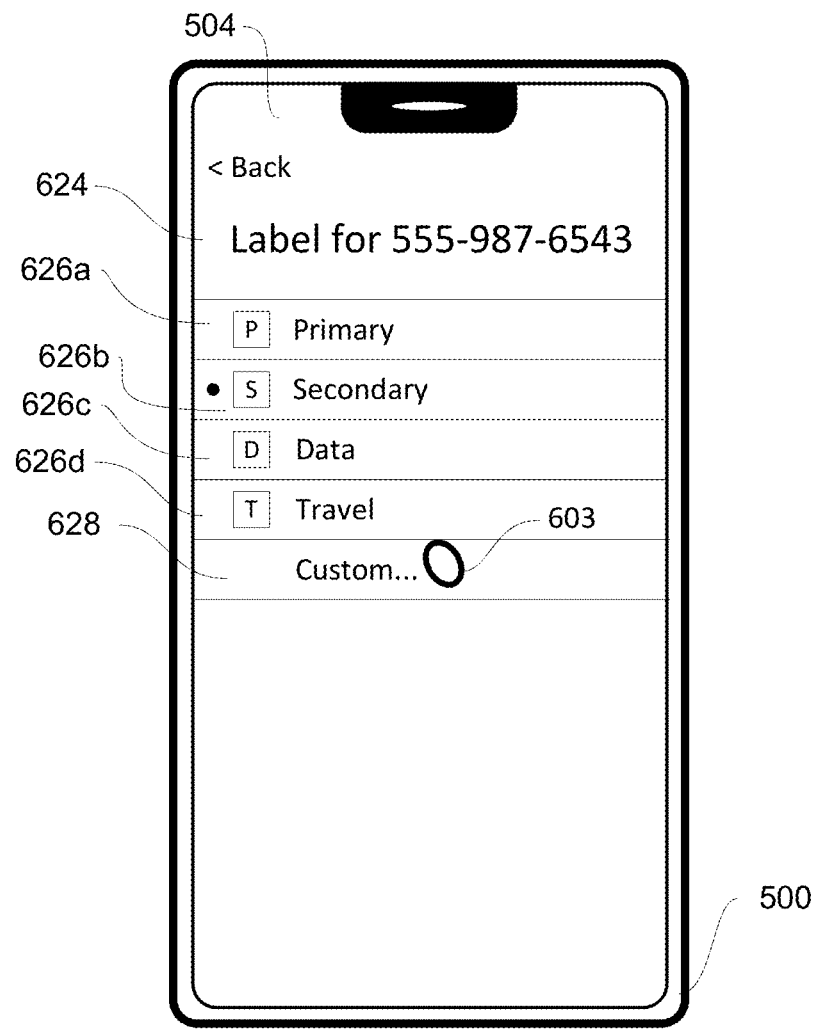
Figure 6F:
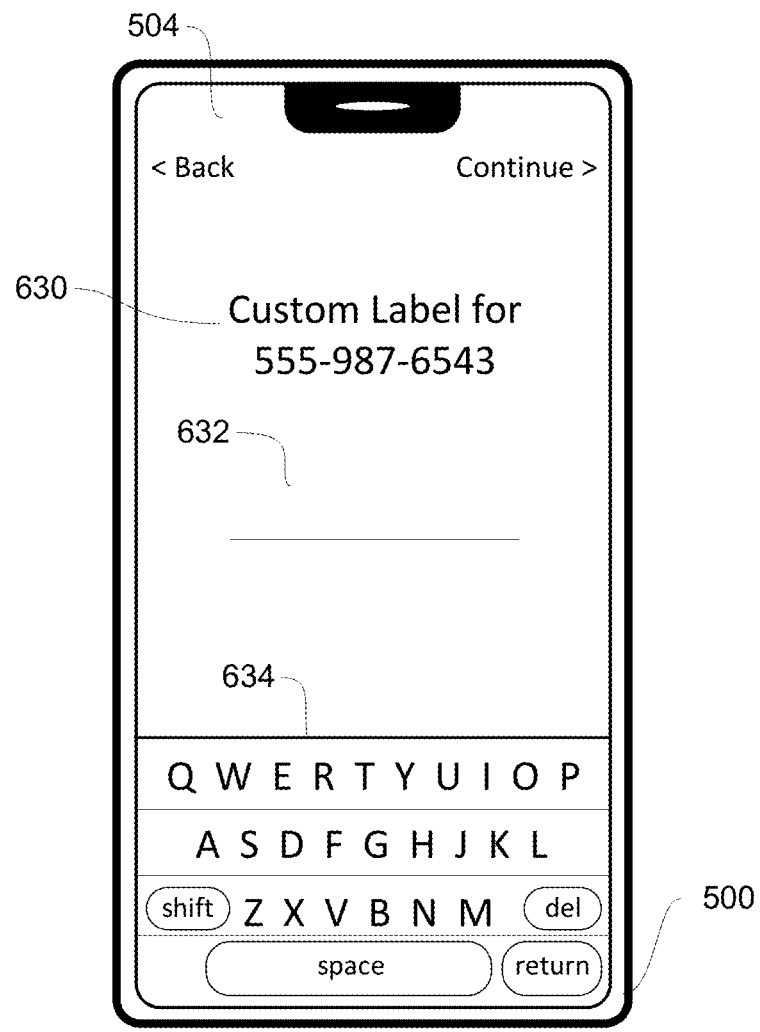
Figure 6G:
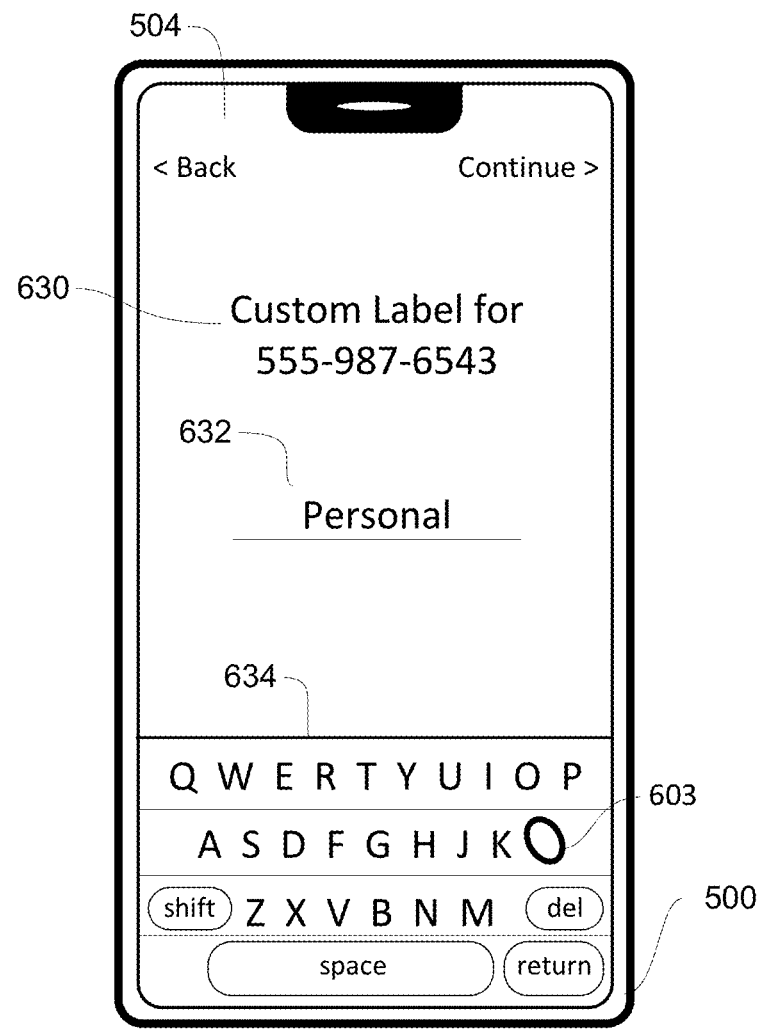
Figure 6H:
Figure 6I:
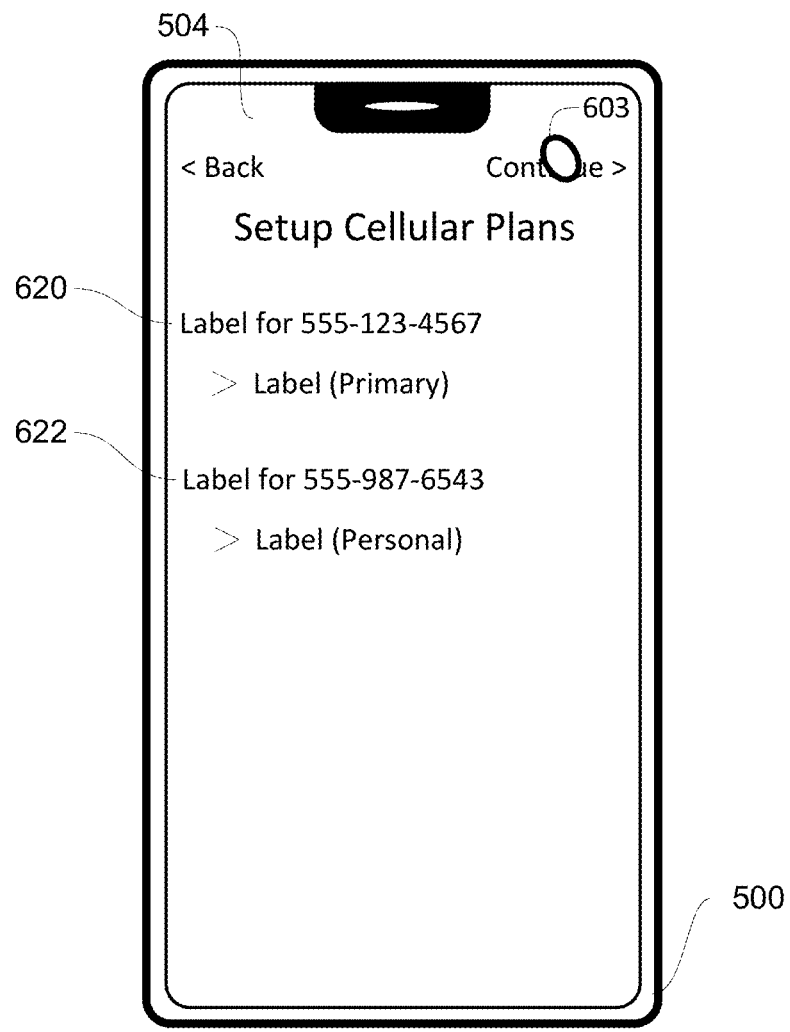
Figure 6J:
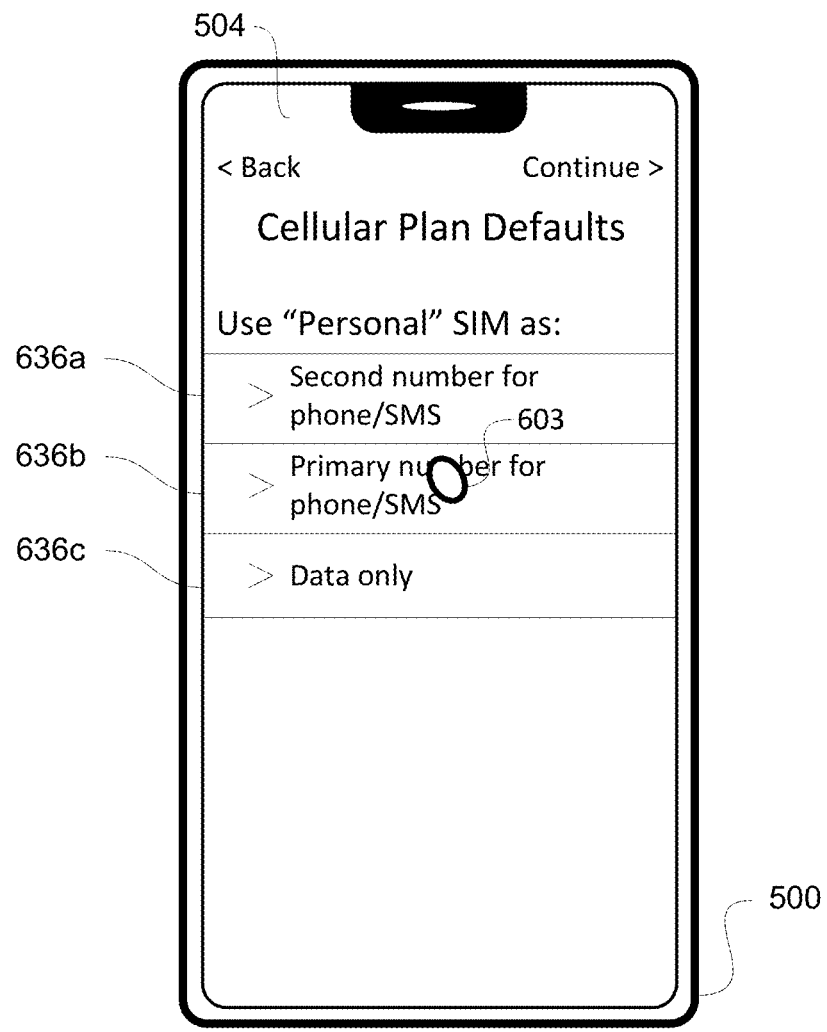
Figure 6K:
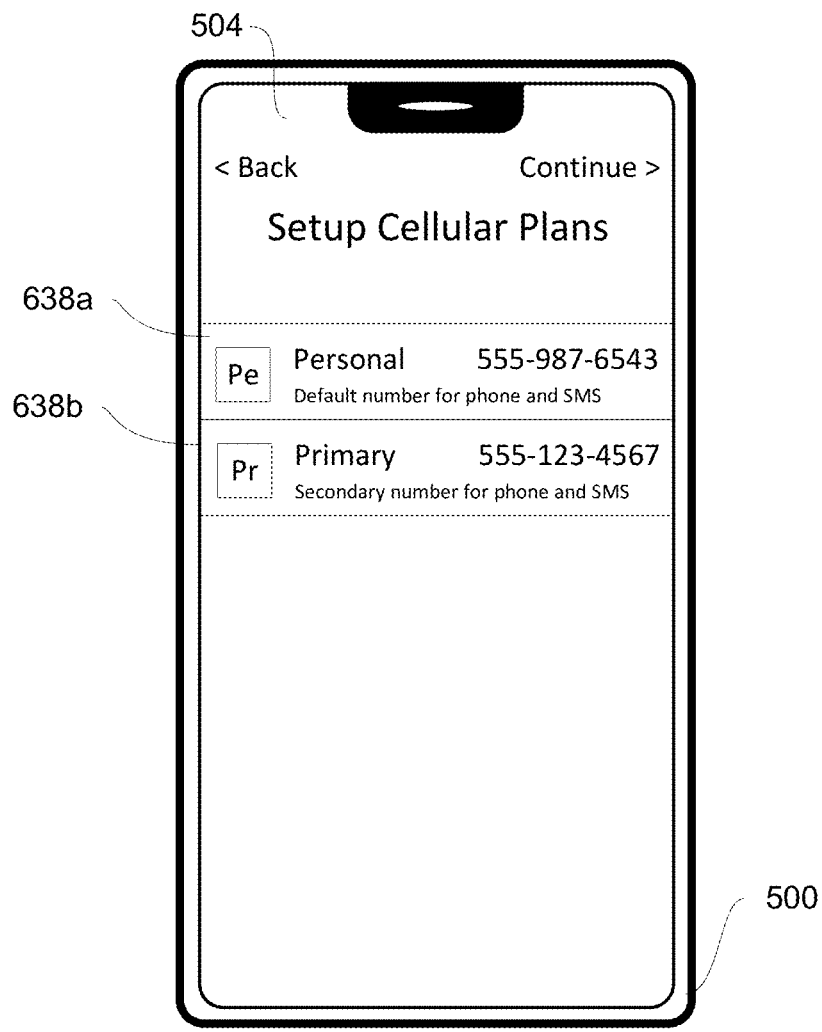
Figure 6L:
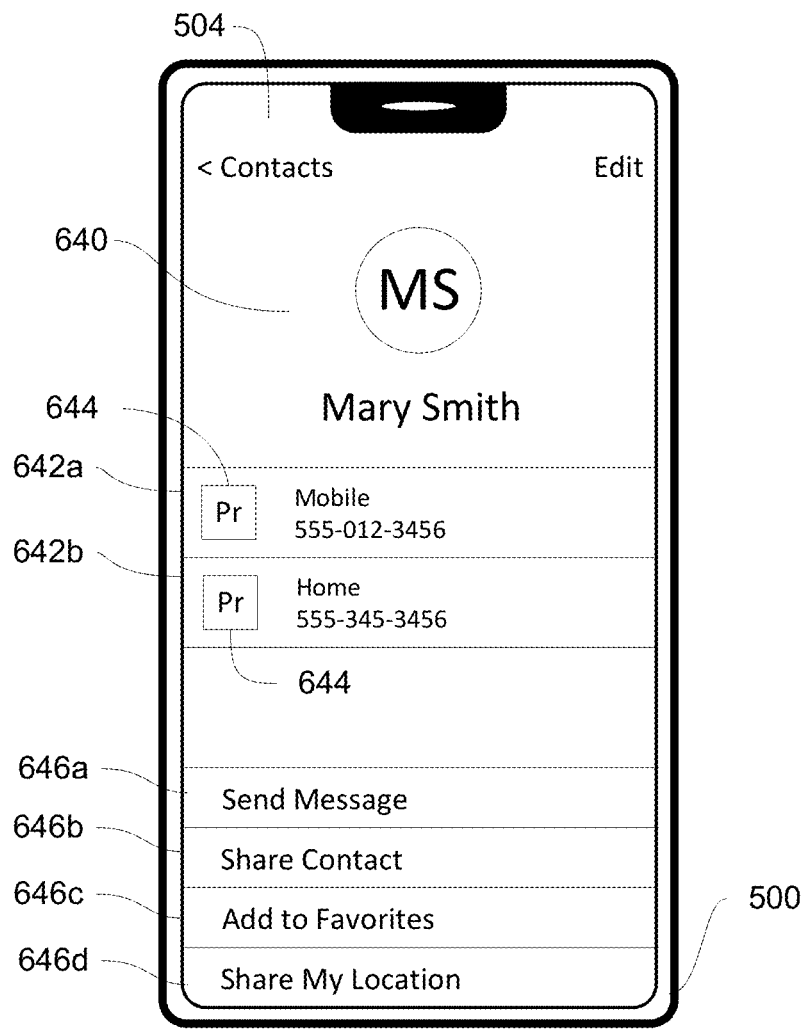
Figure 6M:
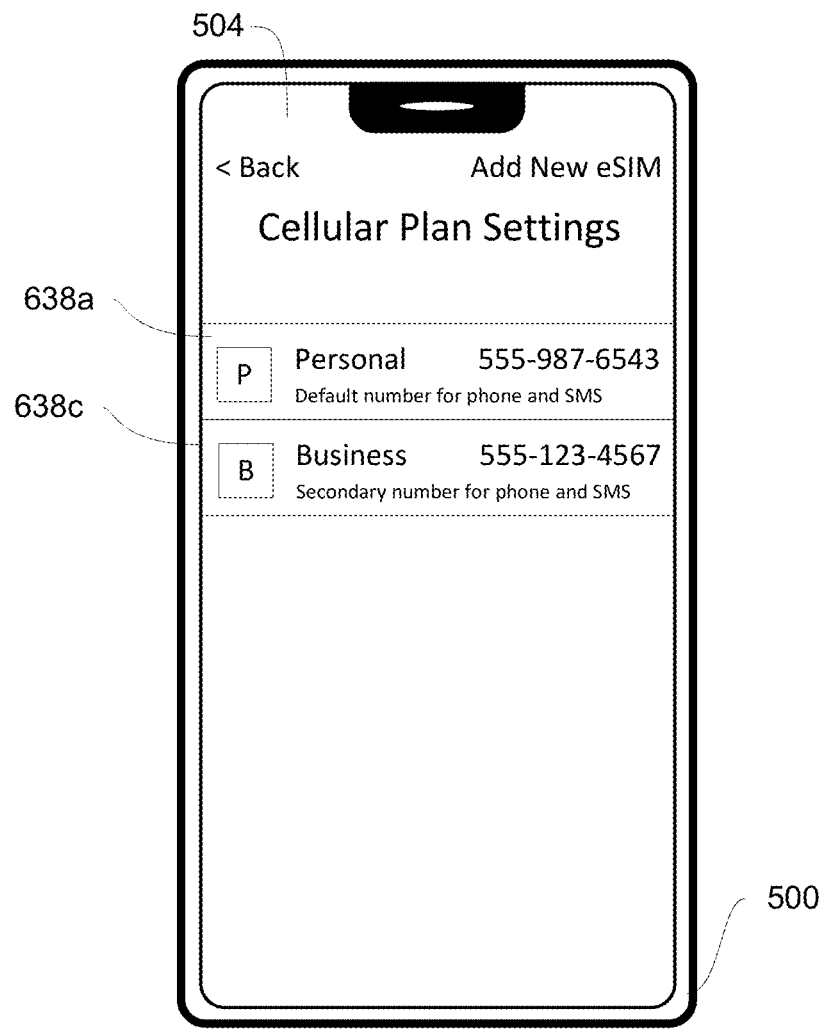
Figure 6N:
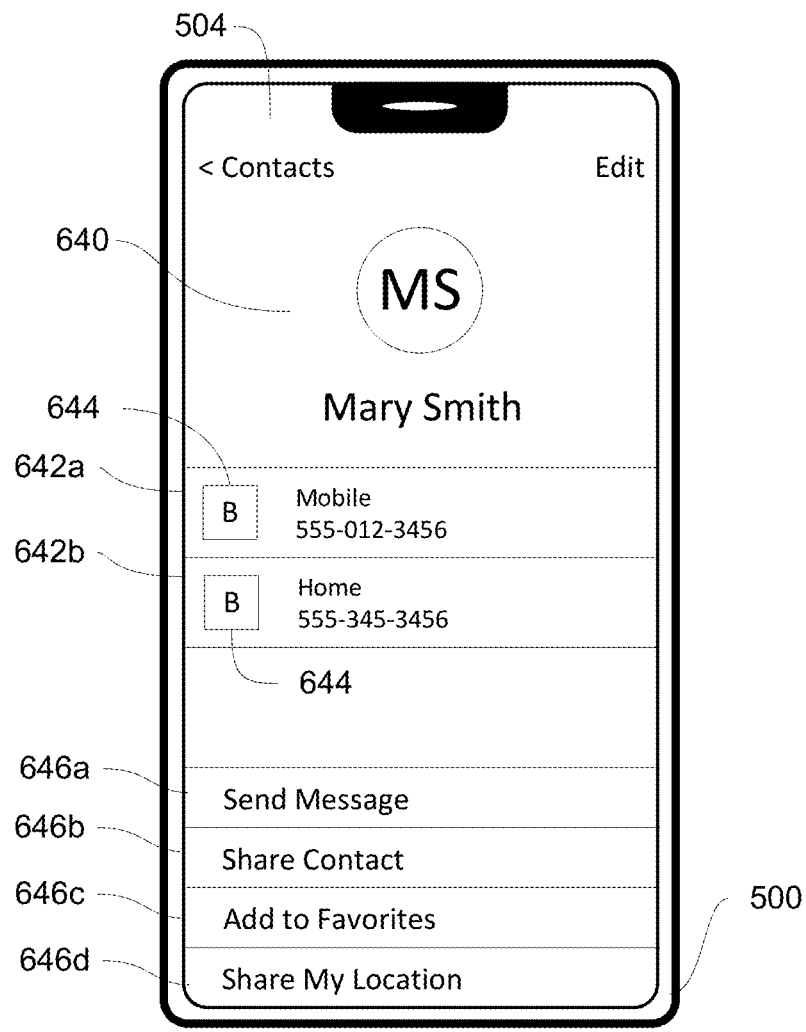
Figure 6O:
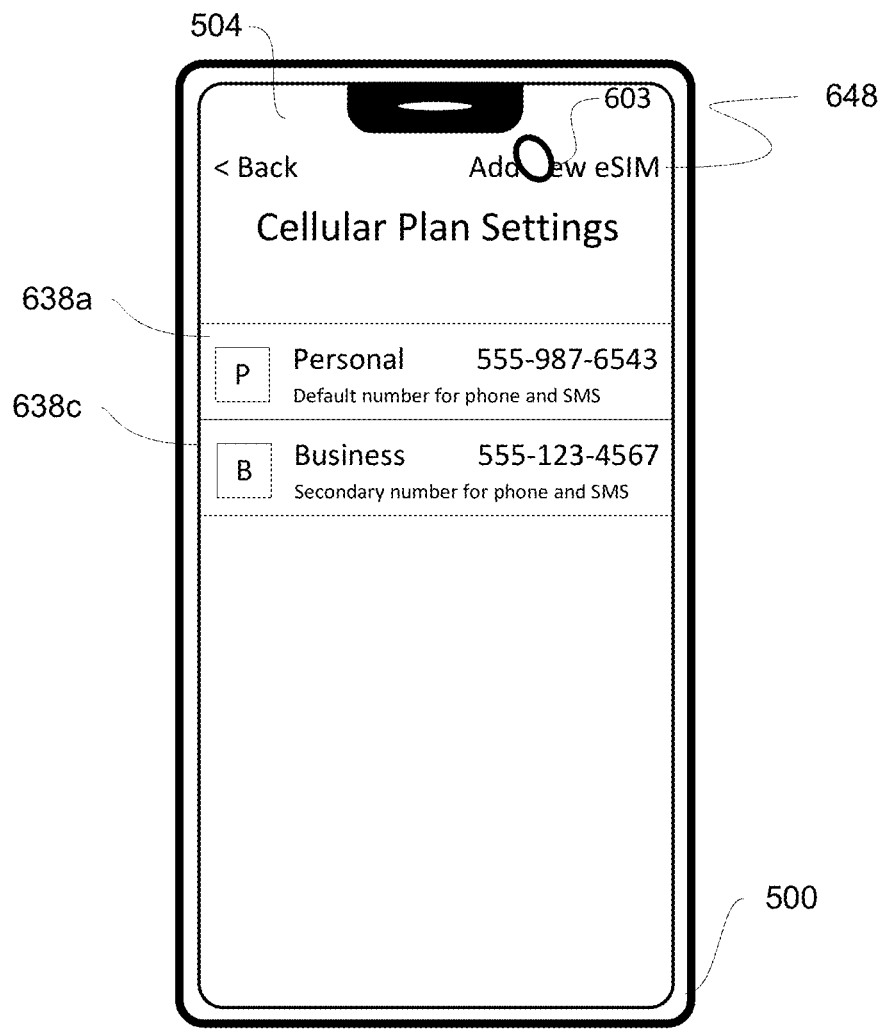
Figure 6P:
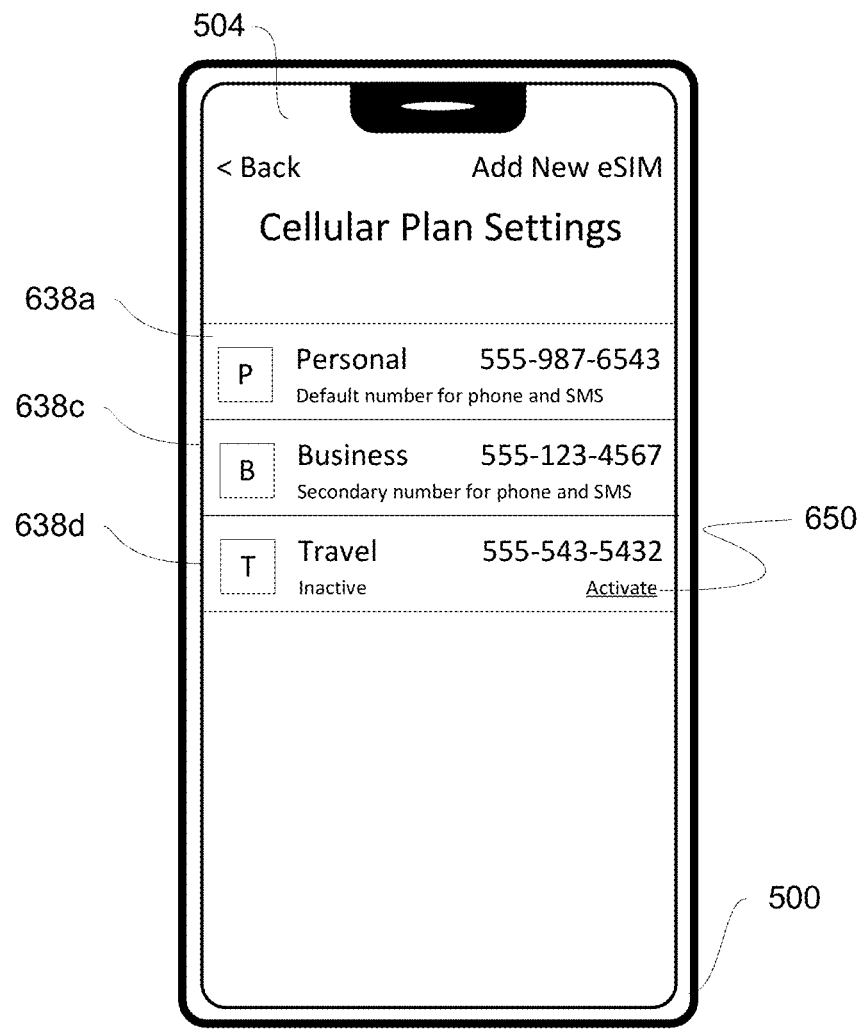
Figure 6Q:
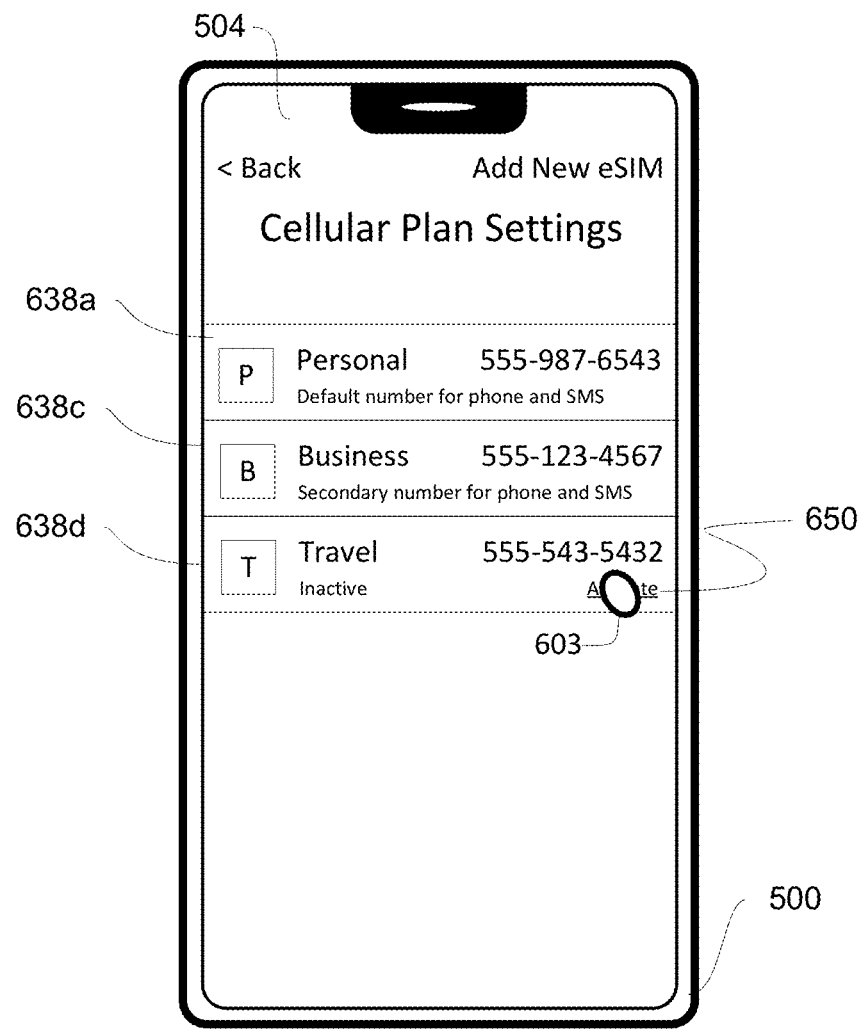
Figure 6R:
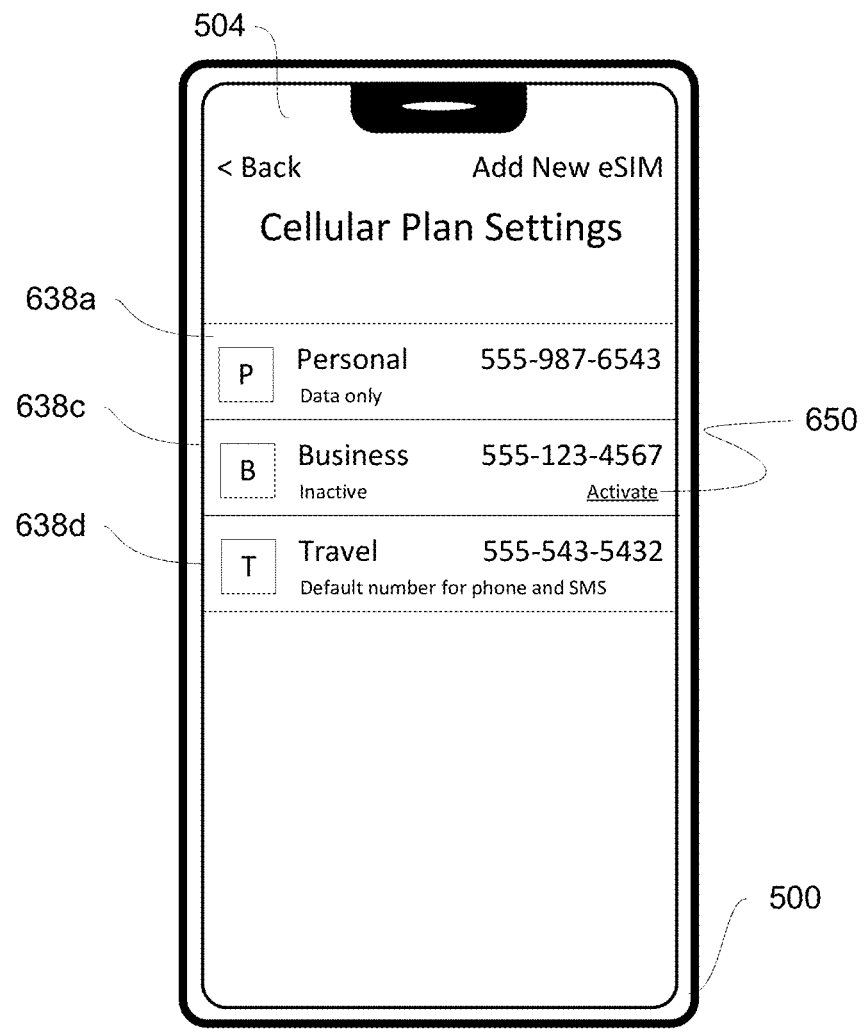
Figure 7A:
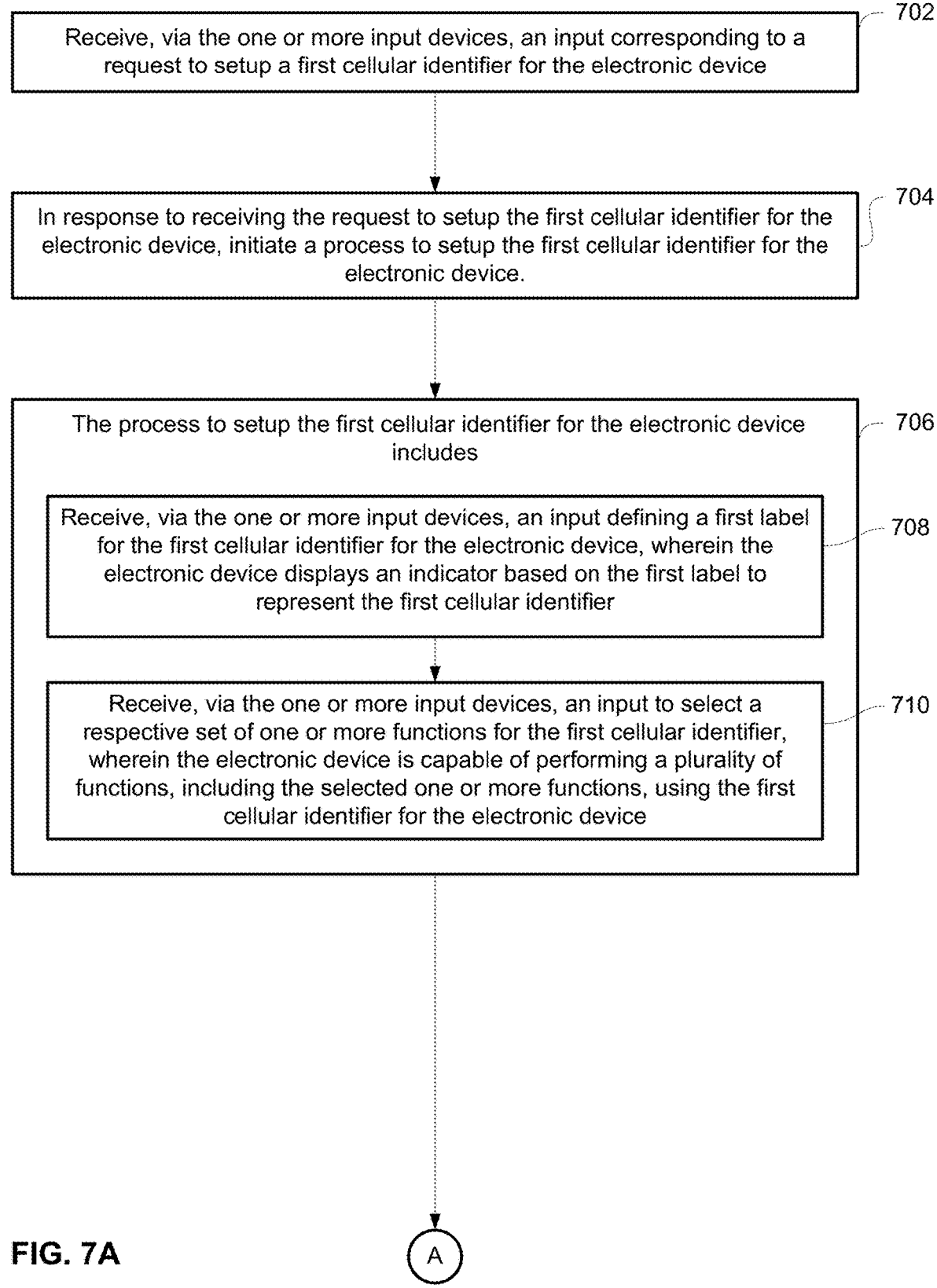
Figure 7B:
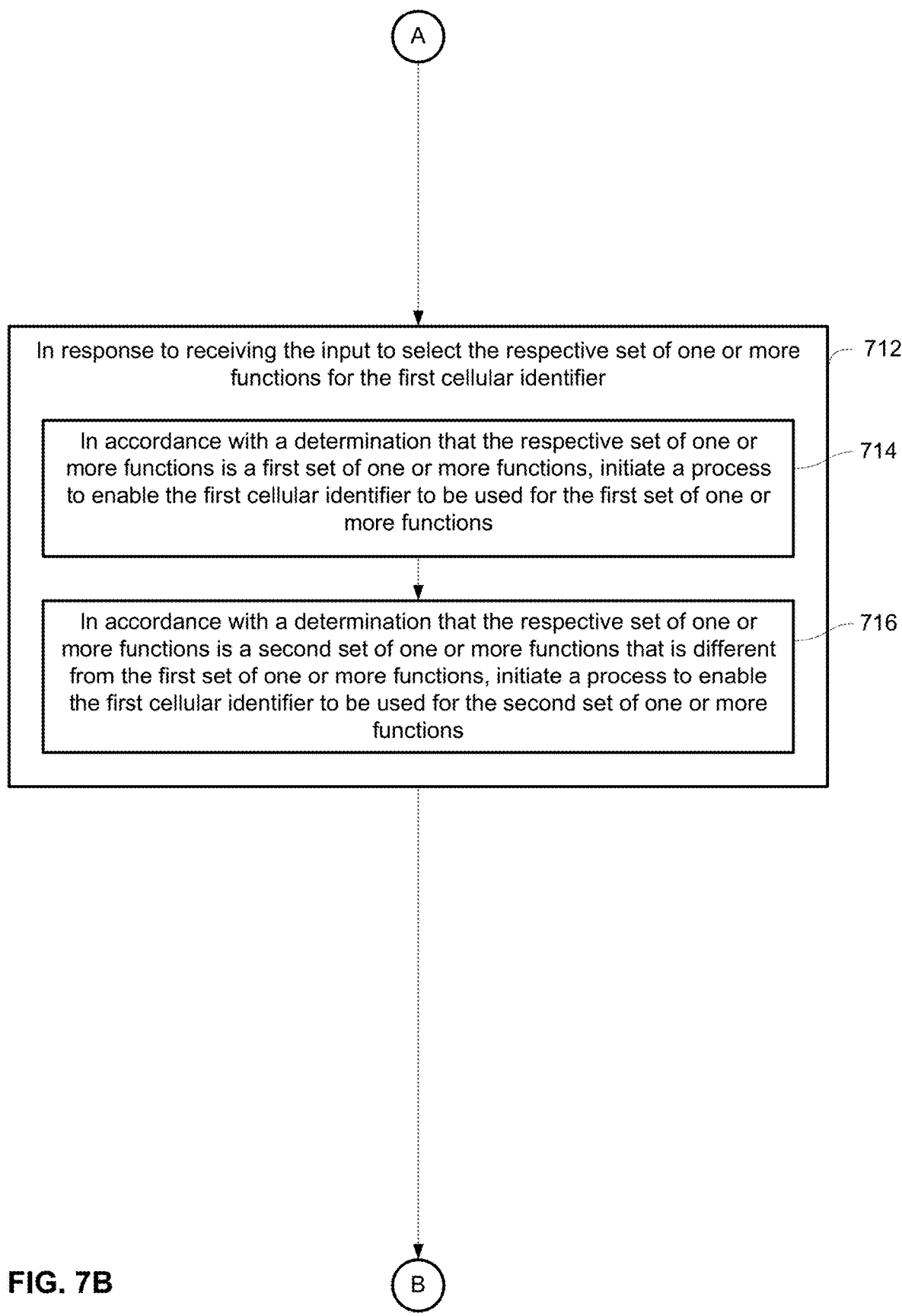
Figure 7C:
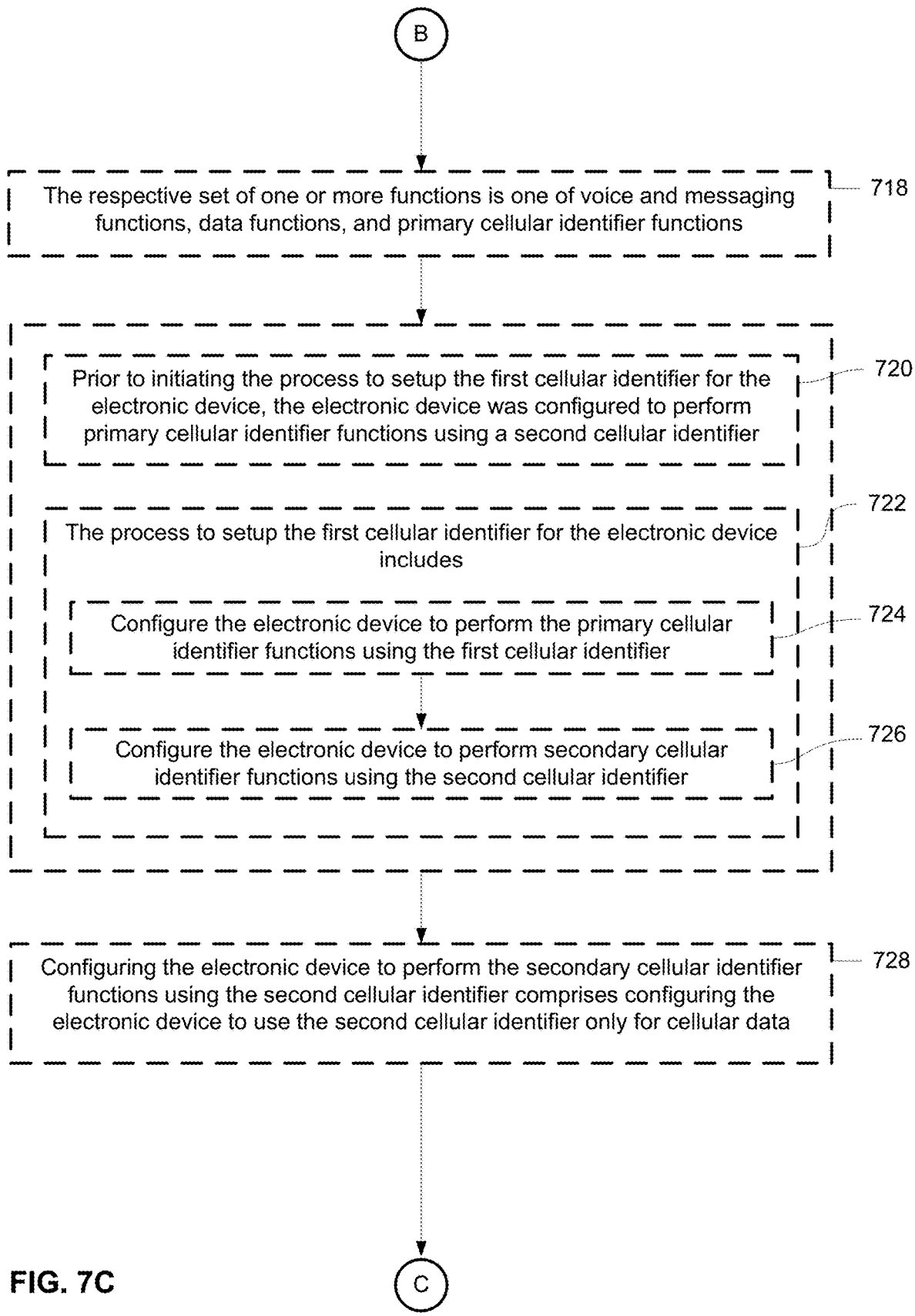
Figure 7D:
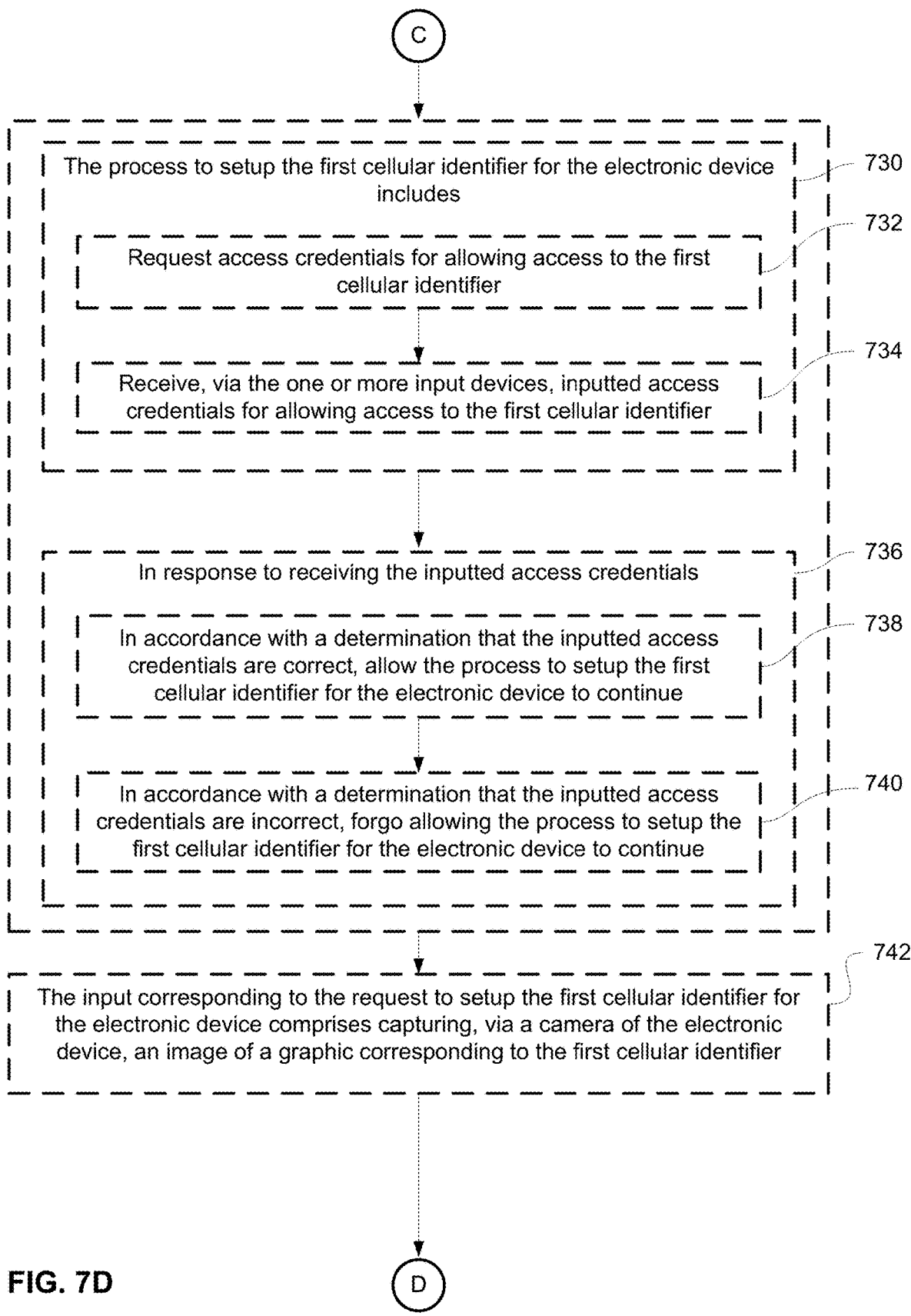
Figure 7F:
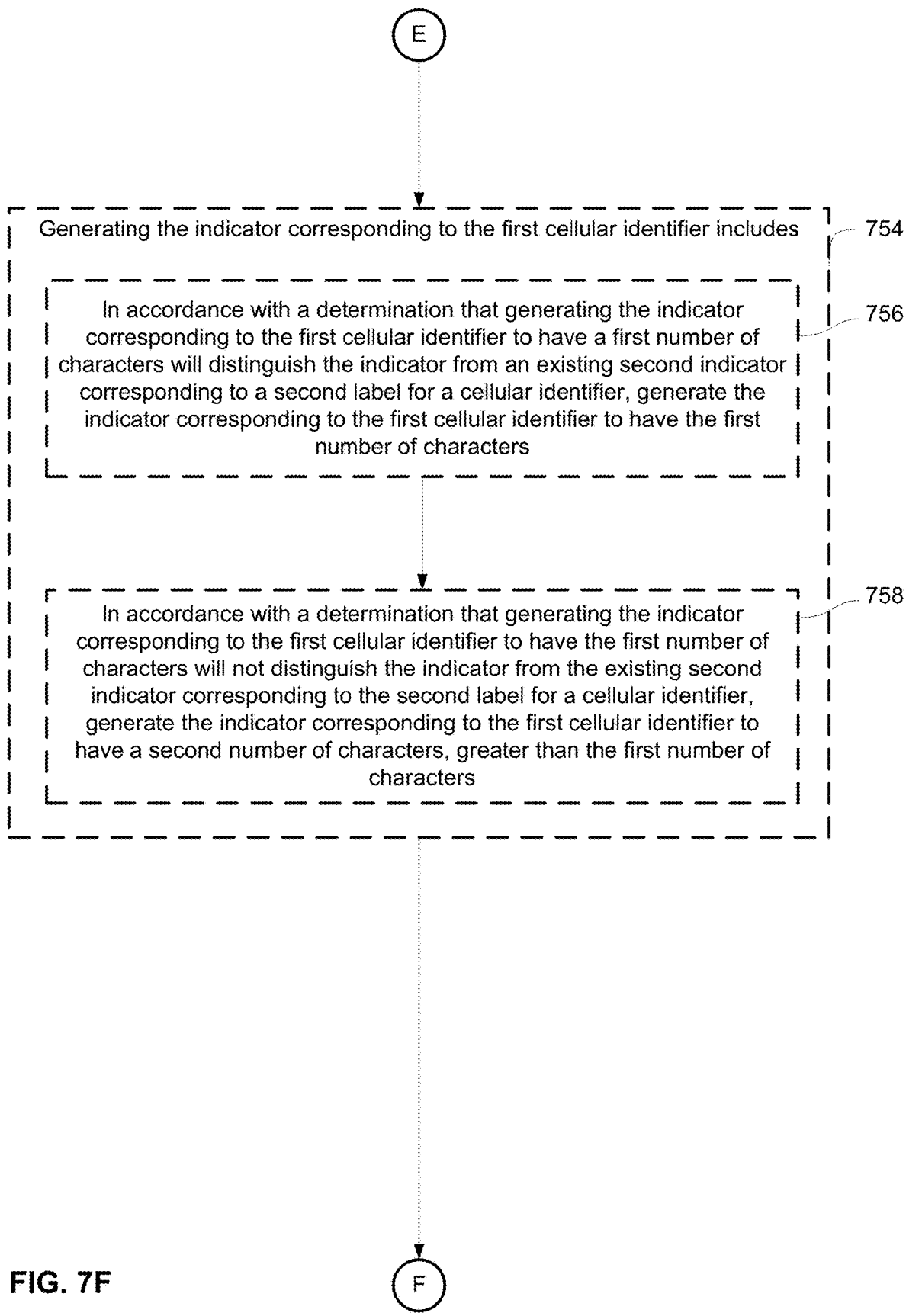
Figure 7G:
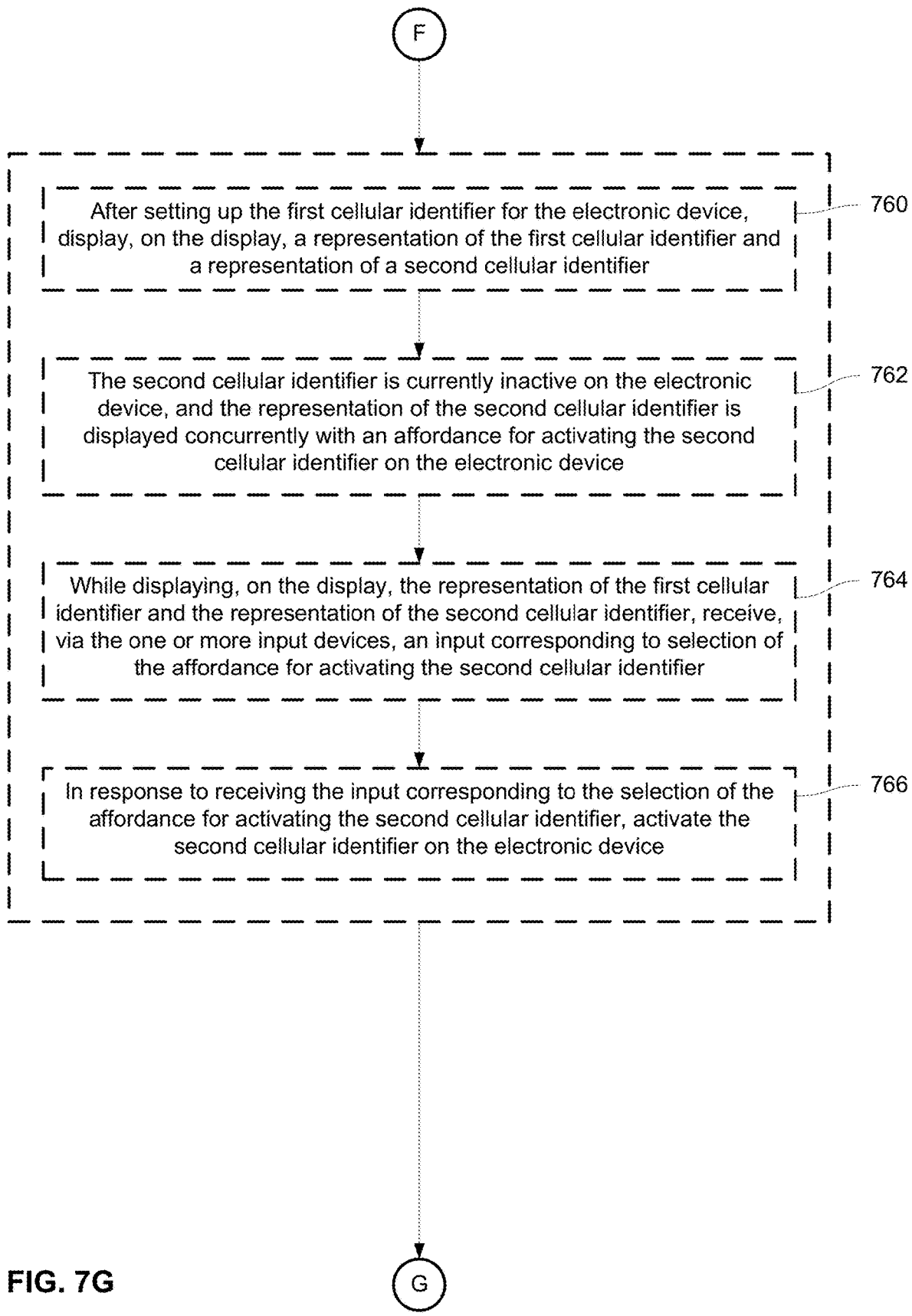
Figure 7H:
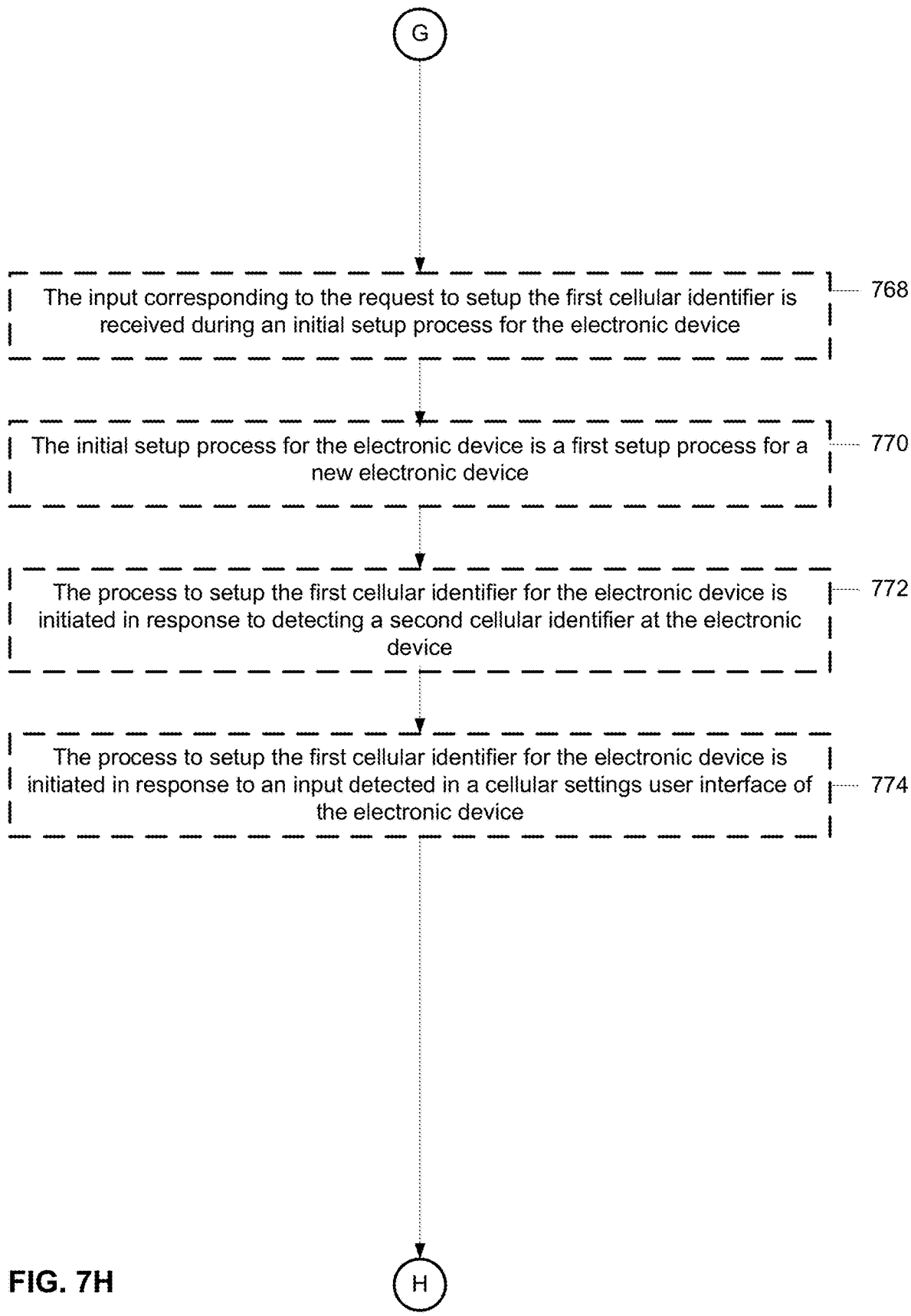
Figure 71:
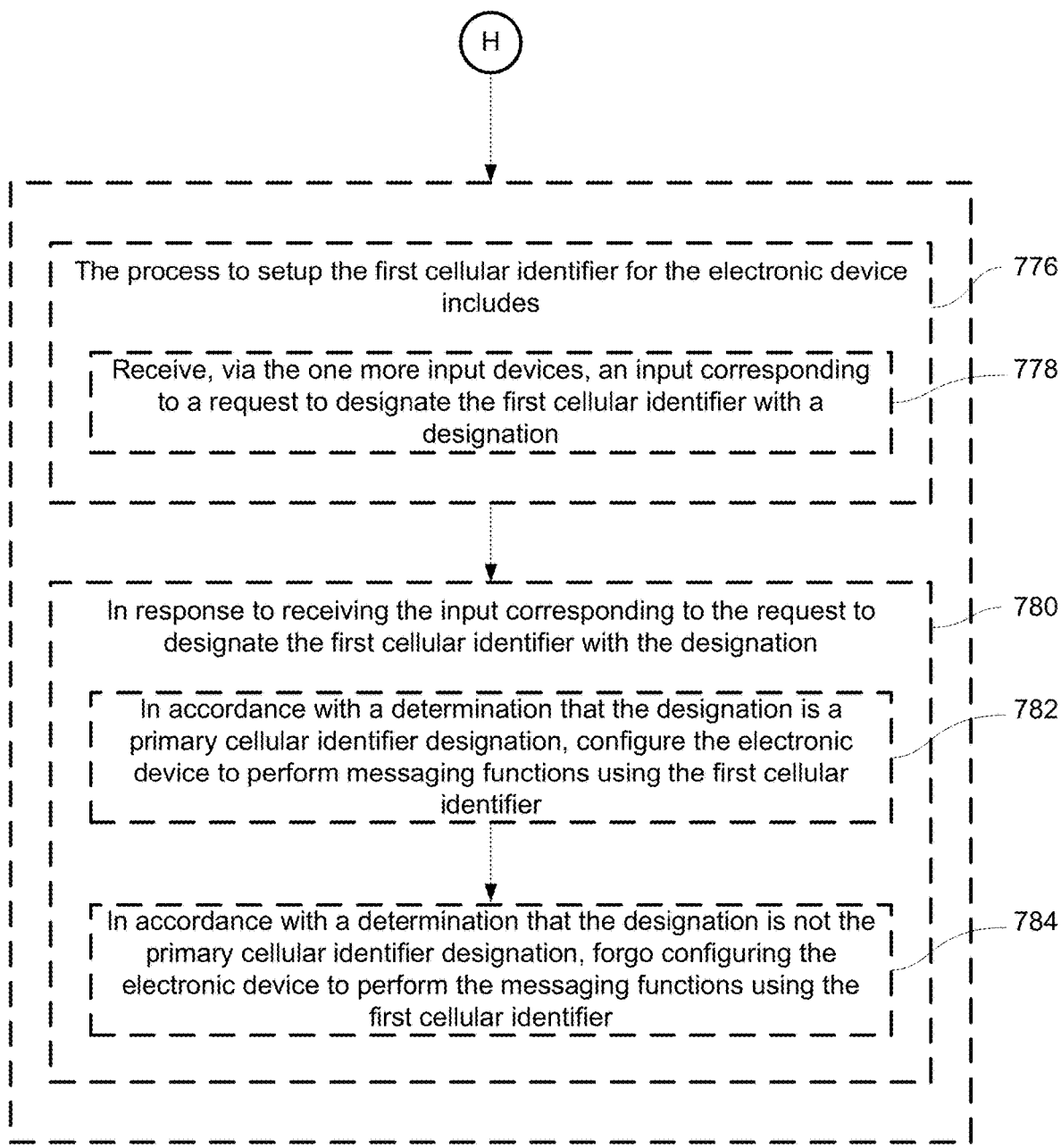

FIGS. 6A-6R illustrate exemplary ways in which an electronic device presents settings user interfaces associated with cellular identifiers in accordance with some embodiments of the disclosure. The embodiments in these figures are used to illustrate the processes described below, including the processes described with reference to FIGS. 7A-7I.

FIG. 6A illustrates exemplary device 500 with touch screen 504, such as described with reference to FIGS. 5A-5H. Touch screen 504 optionally displays one or more user interfaces that include various content. In the example illustrated in FIG. 6A, touch screen 504 displays an indication 602 of a process for setting up cellular plans on the electronic device. In some embodiments, this indication 602 is presented in response to a cellular identifier (e.g., a SIM, an eSIM, etc.) being introduced to the electronic device 500 or in response to a user selection of an affordance for setting up a new cellular identifier (e.g., in a settings user interface). In some embodiments, device 500 displays indication 602 as part of an initial setup process of device 500. In some embodiments, device 500 displays indication 602 in response to a second cellular identifier being introduced to device 500 at a time when the device 500 was already configured to use a first cellular identifier. The touch screen 504 in FIG. 6A optionally displays a "Continue" affordance 604 selectable to initiate the process for configuring the new cellular identifier and a "Not Now" affordance 606 selectable to forgo initiating the process for configuring the new cellular identifier. As shown in FIG. 6A, the user optionally selects (e.g., with contact 603) the "Continue" affordance 604.

In some embodiments, in response to the selection of the "Continue" affordance 604, the electronic device presents a user interface for adding a cellular identifier to the electronic device 500 (or configuring the added cellular identifier) based on a captured image. For example, as shown in FIG. 6B, the touch screen 504 presents an instruction 608 to the user to capture an image (e.g., of a QR code) associated with the cellular identifier (e.g., "Scan QR Code to add eSIM"). The electronic device 504 concurrently presents a viewfinder 610 and an image capture affordance 612 with the instructions 608 to capture the image. In some embodiments, the electronic device 500 is able to access or add a cellular identifier, such as an eSIM, based on a captured image of a QR code associated with the eSIM. If the electronic device 500 is successful in identifying the eSIM based on a captured QR code, the electronic device optionally presents a user interface for changing one or more settings associated with the cellular identifiers accessible to the electronic device, such as the user interface described below with reference to FIG. 6D.

If the electronic device 500 is unsuccessful in identifying an eSIM based on a captured image (e.g., the image is blurry, the QR code is not valid, etc), or if the successfully-identified eSIM using the captured image requires a passcode or other authentication credential to be added to device 500, the electronic device 500 optionally presents a different user interface for adding a SIM to the electronic device, such as the user interface illustrated in FIG. 6C. As shown in FIG. 6C, the electronic device 500 presents a user interface for authenticating an added cellular identifier using a passcode. The user interface in FIG. 6C includes an indication of the cellular identifier's associated phone number 614, a text entry field 616, and a keypad 618 (or keyboard) at which the user is able to enter a passcode (or other authentication credentials) associated with the cellular identifier to authenticate access to the cellular identifier on the electronic device 500. In response to a correct passcode, the electronic device 500 is optionally enabled to perform functions using the cellular identifier—in response to an incorrect passcode, the electronic device 500 is optionally not enabled to perform functions using the cellular identifier, and adding the cellular identifier to device 500 is optionally unsuccessful. In some embodiments, prior to entering the passcode, the user is able to enter identifying information of the cellular identifier, such as the phone number associated with the cellular identifier.

Once the electronic device 500 successfully identifies the cellular identifier and/or is granted access to the cellular identifier, it is optionally enabled to present a settings user interface for changing the settings associated with the cellular identifiers accessible to the electronic device. For example, FIG. 6D illustrates a cellular identifier settings user interface for setting a label associated with each cellular identifier of the electronic device 500. As shown in FIG. 6D, the electronic device 500 presents an affordance 620 for changing a label identifying a first cellular identifier of the electronic device and an affordance 622 for changing a label identifying a second cellular identifier of the electronic device (e.g., the cellular identifier added to device 500 in FIGS. 6A-6C was optionally the second cellular identifier added to device 500). The newly-added cellular identifier is optionally labeled "Secondary" by default and the existing cellular identifier is optionally labeled "Primary" by default, though in some embodiments, the newly-added cellular identifier is labeled "Primary" by default and the existing cellular identifier is labeled "Secondary" by default when the new cellular identifier is added to the electronic device 500. The affordance 620 for changing the label identifying the first cellular identifier includes an indication of the phone number associated with the first cellular identifier and the label of the first cellular identifier (e.g., "Primary"). The affordance 622 for changing the label identifying the second cellular identifier includes an indication of the phone number associated with the second cellular identifier and the label of the second cellular identifier (e.g., "Secondary"). As shown in FIG. 6D, the user selects (e.g., with contact 603) the second affordance 622 to edit the label of the second cellular identifier.

In response to the user's selection of affordance 622, the electronic device 500 presents a user interface for editing the label associated with the second cellular identifier, as illustrated in FIG. 6E. The user interface includes an indication 624 of the second cellular identifier, a plurality of selectable affordances for setting the label to one of a plurality of predefined cellular identifier labels (e.g., "Primary" 626a, "Secondary" 626b, "Data" 626c, and "Travel" 626d), and an affordance 628 selectable for the user to enter a custom label for the cellular identifier. Each affordance 626a-d in FIG. 6E includes the name of the label of the cellular identifier (e.g., "Primary," "Secondary," "Data," and "Travel") and a representative indication of the cellular identifier. The indication of the cellular identifier is optionally presented in user interfaces of the electronic device 500 in association with a function of a cellular identifier, as will be described in more detail with reference to FIGS. 10A-11Q. The indication of the cellular identifier is optionally based on the text of the label of the cellular identifier, such as including the first letter of the label of the cellular identifier, such as using an indication with a "D" for the "Data" label 626c. As shown in FIG. 6E, the user selects (e.g., with contact 603) the affordance 628 for creating a custom label for the cellular identifier.

In response to the user's selection in FIG. 6E, the electronic device 500 presents a user interface for creating a custom label for a cellular identifier, as shown in FIG. 6F. The user interface includes an indication 630 of the cellular identifier, a text entry field 632, and a soft keyboard 634. As shown in FIG. 6G, the user enters the label "Personal," such as via one or more contacts 603 at soft keyboard 634.

FIG. 6H illustrates a user interface presented by the electronic device 500 after the user created the custom "Personal" label for the second cellular identifier in FIG. 6F, including an affordance 634 associated with the customized cellular identifier label "Personal." As shown in FIG. 6H, the indicator associated with the label "Personal" and the indicator associated with the label "Primary" include the first two letters of these labels, rather than just the first letter of the labels so that the user is able to differentiate between these labels, which have the same first letter. In some embodiments, device 500 utilizes sufficient letters of the conflicting labels until the indicators of the conflicting labels are not the same. The remaining labels "Secondary," "Data," and "Travel" continue to be indicated with indicators including the first letters of these labels as long as there are no labels in use that have the same first letter. In some embodiments, when two displayed labels have the same first three letters, the indicators are updated to include the first letter of the label followed by a number (e.g., P1 and P2 for "Primary" and "Private"). In some embodiments, multi-word labels are possible and the indicators are updated to include the first letters of the words of the label (e.g., DR for "Data Roaming").

After configuring the label for the second cellular identifier to be "Personal," as shown in FIG. 6H, the user optionally navigates back to the settings user interface for updating the labels associated with each cellular identifier, as shown in FIG. 6I. As shown in FIG. 6I, the affordance 622 associated with the second cellular identifier is updated to indicate that the second cellular identifier is labeled "Personal."

In response to detecting selection of "Continue" in FIG. 6I (e.g., via contact 603), the electronic device 500 optionally presents settings user interfaces for setting the functions to be performed with each cellular identifier associated with the device. As shown in FIG. 6J, the electronic device 500 presents a user interface for setting the functions to be performed using the "Personal" cellular identifier. The user is able to select among affordances such as "Second number for phone/SMS" 636*a*, "Primary number for phone/SMS" 636*b*, and "Data only" 636*c*. As shown in the figure, the user selects (e.g., with contact 603) "Primary number for phone/SMS" 636*b*, which makes the "Personal" cellular identifier the primary cellular identifier for phone and messaging functions on device 500.

In some embodiments, the "primary number for phone/SMS" is the cellular identifier that the electronic device 500 uses by default for phone calls and SMS messaging, the "secondary number for phone/SMS" is configured for performing phone and SMS operations in non-default situations (e.g., the user requests to use the secondary cellular identifier, the primary cellular identifier is unavailable, the user requests to initiate communication with a contact that is associated with the secondary cellular identifier), and a "data only" cellular identifier is configured for performing cellular data operations only and is optionally the default cellular identifier for performing data operations on the electronic device 500. As shown in FIG. 6J, "Second number for phone/SMS" is listed as the first option because the "Personal" SIM is currently set as the "second number for phone/SMS," because the existing cellular identifier is the "primary number for phone/SMS" by default. In some embodiments, other default configurations and list orders are possible. In some embodiments, the electronic device configures one cellular identifier as the primary number for phone/SMS and another cellular identifier as the secondary number for phone/SMS. In some embodiments, rather than configuring a cellular identifier as the secondary number for phone/SMS, the electronic device configures one of the cellular identifiers for data only.

After setting the functions to be performed on device 500 using the "Personal" cellular identifier, device 500 displays a user interface that presents the function settings of a plurality of cellular identifiers available to the electronic device 500, such as in FIG. 6K. As shown in FIG. 6K, the user interface includes an indication 638*a* of the functions associated with the "Personal" cellular identifier. The indication 638*a* includes the text of the label identifying the cellular identifier (e.g., "Personal"), the visual indication of the cellular identifier (e.g., the icon with the letters "Pe"), an indication of the phone number associated with the cellular identifier (e.g., "555-987-6543"), and text indicating the function settings of the cellular identifier (e.g., "Default number for phone and SMS"). In some embodiments, the electronic device 500 is configured to communicate using an enhanced data-based messaging service optionally associated with a user account of the electronic device 500. The electronic device 500 optionally uses the cellular identifier designated as the "Default number for phone and SMS" for sending messages using the enhanced data-based messaging service, even when sending messages using the enhanced data-based messaging service to contacts associated with a different cellular identifier. The user interface further includes an indication 638*b* of the functions associated with a "Primary" cellular identifier. The indication 638*b* includes the text of the label identifying the cellular identifier (e.g., "Primary"), the visual indication of the cellular identifier (e.g., the icon with the letters "Pr"), an indication of the phone number associated with the cellular identifier (e.g., "555-123-4567"), and text indicating the function settings of the cellular identifier (e.g., "Secondary number for phone and SMS"). As discussed above, because "Personal" and "Primary" both begin with the letter "P," the indications of the cellular identifiers include the first two letters of the labels of the cellular identifiers (e.g., "Pe" and "Pr").

As mentioned previously, the indications of the cellular identifiers of device 500 are optionally used in other user interfaces presented by the electronic device 500 to indicate one or more functions to be performed by the respective cellular identifier associated with the visual indications. For example, FIG. 6L illustrates a contacts user interface for a contact associated with the "Primary" cellular identifier. As shown in FIG. 6L, the contacts user interface includes an indication 640 of the name of the contact (e.g., "Mary Smith"), a first phone number affordance 642*a* of a first phone number associated with the contact, a second phone number affordance 642*b* of a second phone number associated with the contact, and a plurality of affordances 646*a*-*d* selectable to perform various actions with respect to the contact (e.g., "Send Message" 646*a*, "Share Contact" 646*b*, "Add to Favorites" 646*c*, "Share My Location" 646*d*). The phone number affordances 642*a*-*b* each include an indication 644 of the cellular identifier associated with the contact (e.g., the "Primary" cellular identifier indicated by the "Pr" indication). The phone number affordances 642*a*-*b* are selectable to initiate a phone call to the respective phone number indicated by the affordance using the cellular identifier associated with the contact as indicated by the indication 644 by default.

When the user changes the label (e.g., "Primary," "Personal," etc.) of a cellular identifier, the visual indication of that cellular identifier (e.g., icon including "Pr," "Pe," etc.) is optionally updated across multiple user interfaces of the electronic device to match the new label of that cellular identifier. For example, as shown in FIG. 6M, when the user renames the "Primary" cellular identifier (associated with phone number 555-123-4567) to "Business," the indication of that cellular identifier in the settings user interface is updated to reflect the change. The user interface illustrated in FIG. 6M is substantially the same as the user interface illustrated in FIG. 6K, except the "Primary" cellular identifier has been renamed "Business." In accordance with the updated label for this cellular identifier, the electronic device 500 presents the "Business" label in the user interface and updates the indication of the cellular identifier to include a "B" (rather than "Pr"). Because "Business" and "Personal" start with different letters, the indication of the "Primary" cellular identifier has been updated from "Pr" to "B," because indicating the cellular identifiers with the first letters of the labels of the cellular identifiers is sufficient to distinguish the cellular identifiers from one another.

Similarly, FIG. 6N illustrates a contacts user interface for a contact associated with the "Business" cellular identifier, which was previously labeled as the "Primary" cellular identifier. The contacts user interface illustrated in FIG. 6N is substantially similar to the contacts user interface illustrated in FIG. 6L, except indication 644 is updated to reflect that the "Primary" cellular identifier has been renamed "Business". Likewise, indication 644 includes a "B," rather than "Pr," which was illustrated in FIG. 6L.

FIG. 6O illustrates the electronic device 500 presenting a cellular identifier settings user interface via which a new cellular identifier is able to be added to device 500. In some embodiments, the cellular identifier settings user interface is accessible from a settings user interface of the electronic device that includes affordances selectable to navigate to various other settings user interfaces (e.g., notifications settings, general settings, display settings, sounds settings, passcode and authentication settings, and others) of the electronic device. As shown in FIG. 6O, the user selects (e.g., with contact 603) an affordance 648 for adding a new cellular identifier to the electronic device (e.g., "Add New eSIM"). In response to the user's selection, the electronic device presents a user interface for adding a new cellular identifier, such as the camera user interface illustrated in FIG. 6B and/or the passcode user interface illustrated in FIG. 6C.

FIG. 6P illustrates the electronic device 500 presenting the cellular identifier settings user interface after the user has added and labeled a new cellular identifier "Travel," indicated by indication 638d. As shown in FIG. 6P, the electronic device 500 optionally does not enable the "Travel" cellular identifier for performing any actions, because in some embodiments, only two cellular identifiers are able to be active on device 500 at any given moment in time, and therefore indicates that it is "Inactive." Accordingly, the cellular identifier settings user interface optionally includes an "Activate" affordance 650 selectable to activate the "Travel" cellular identifier, which enables the electronic device 500 to perform one or more functions with the "Travel" cellular identifier.

As shown in FIG. 6Q, the user selects (e.g., with contact 603) the "Activate" affordance 650. In response, device 500 activates the "Travel" cellular identifier to allow the electronic device 500 to use the "Travel" cellular identifier to perform operations, as shown in FIG. 6R. As shown in FIG. 6R, the "Travel" cellular identifier becomes the default number for phone and SMS (e.g., because it is the most recently-activated cellular identifier), the "Personal" cellular identifier becomes a "data only" cellular identifier (e.g., because it was previously the primary number for phone/SMS), and the "Business" cellular identifier is deactivated (e.g., because it was the secondary number for phone/SMS). The indications 638a, 638c, and 638d are updated in accordance with these new functions settings of the cellular identifiers. Additionally, the indication 638c of the "Business" cellular identifier is updated to include an "Activate" affordance 650 selectable to activate the "Business" cellular identifier for performing operations with the electronic device.

FIGS. 7A-7I are flow diagrams illustrating a method 700 of presenting settings user interfaces associated with cellular identifiers in accordance with some embodiments of the disclosure. The method 700 is optionally performed at an electronic device such as device 100, device 300, device 500 as described above with reference to FIGS. 1A-1B, 2-3, 4A-4B and 5A-5H. Some operations in method 700 are, optionally, combined and/or order of some operations is, optionally, changed.

As described below, the method 700 provides ways to present settings user interfaces associated with cellular identifiers. The method reduces the cognitive burden on a user when interaction with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., electronic device 500) is in communication with a display and one or more input devices (e.g., a mobile device (e.g., a tablet, a smartphone, a media player, or a wearable device) including a touch screen or a computer including one or more of a keyboard, mouse, trackpad, and touch screen). In some embodiments, the electronic device has cellular communication capabilities, such as a cellular transmitting/receiving hardware and the ability to communicate with a cellular network. The electronic device optionally receives (702), via the one or more input devices, an input corresponding to a request to setup a first cellular identifier for the electronic device (e.g., a physical SIM (subscription identity module) card, an eSIM (e.g., embedded SIM), etc. for the electronic device), such as selection of the "Add new eSIM" button 648 illustrated in FIG. 6O. In some embodiments, the electronic device is capable of having more than one cellular identifier (e.g., SIM card, eSIM, etc), such as in FIGS. 6A-6C. In some embodiments, the input corresponding to a request to set up the first cellular identifier is the introduction of the cellular identifier to the electronic device (e.g., installing a new SIM or eSIM). In some embodiments, the input corresponding to the request to set up the first cellular identifier is the selection of an affordance or button that when activated causes the electronic device to display a cellular identifier settings or setup user interface. In some embodiments, the setup of the first cellular identifier is not initiated until two cellular identifiers are added to the electronic device.

In some embodiments, in response to receiving the request to setup the first cellular identifier for the electronic device, the electronic device initiates (704) a process (e.g., the process illustrated in FIGS. 6A-6J) to setup the first cellular identifier for the electronic device (e.g., a process to configure the first cellular identifier for use at the electronic device, such as naming the cellular identifier, identifying functions to be performed by the electronic device using the first cellular identifier, etc). In some embodiments, the process to set up the first cellular identifier is performed when the first cellular identifier is first introduced to the device or at a later time (e.g., to update one or more settings of the first cellular identifier), such as in FIG. 6O.

In some embodiments, the process to setup the first cellular identifier for the electronic device includes: receiving (708), via the one or more input devices, an input defining a first label (e.g., a text nickname for the cellular identifier such as "primary", "secondary", "data", "phone", "work", "personal", "domestic", "international", etc.) for the first cellular identifier for the electronic device, such as the input (e.g., with contact 603) at the soft keyboard 634 illustrated in FIG. 6G, wherein the electronic device displays an indicator, such as indicator 644 in FIG. 6L (e.g., text or an image derived from the label of the first cellular identifier, such as an icon including the first one or more letters of the label of the cellular identifier) based on the first label to represent the first cellular identifier. In some embodiments, the electronic device presents a user interface including one or more of a plurality of selectable pre-defined labels, such as labels 626a-d in FIG. 6E (e.g., "primary", "secondary", "data", "phone", "work", "personal", "domestic", "international", etc), and/or a text entry user interface (e.g., a textbox and optionally a soft keyboard), as shown in FIGS. 6F-G. The label is optionally displayed proximate to an indicator (e.g., an icon, thumbnail, text, or image) of the first cellular identifier and optionally proximate to an indication of the phone number associated with the cellular identifier. In some embodiments, the indicator (e.g., an icon) is automatically generated based on the label (e.g., a user-defined nickname for the cellular identifier) that represents the first cellular identifier. For example, a "primary" cellular identifier label is optionally indicated by an indicator such as an icon with the text "P", "Pr", or "P2". The electronic device optionally presents the indicator in one or more user interfaces when the electronic device performs a function (e.g., makes a call, sends a message, downloads or uploads data, interacts with a contact) with the first cellular identifier.

The electronic device optionally receives (710), via the one or more input devices, an input (e.g., contact 603 in FIG. 6J) to select a respective set of one or more functions (e.g., making and receiving phone calls, sending text messages, downloading or uploading data, storing and recalling contact information of one or more contacts, etc.) for the first cellular identifier, such as the functions represented by affordances 636a-c in FIG. 6J, wherein the electronic device is capable of performing a plurality of functions, including the selected one or more functions, using the first cellular identifier for the electronic device. The user optionally selects which functions of the electronic device are to be performed by default with the first cellular identifier. In some embodiments, the electronic device includes two or more cellular identifiers with different functions selected for each cellular identifier. For example, the electronic device optionally includes a "primary" cellular identifier and a "data" cellular identifier. During setup, the user optionally selects "data upload and download" as a function of the "data" cellular identifier and optionally selects functions such as phone calls, and text messages as functions of the "primary" cellular identifier. When the electronic device is used to upload and download data (e.g., web browsing, e-mailing, accessing cloud storage, etc), the data uploading and downloading is optionally performed using the "data" cellular identifier by default. When the electronic device is used to make a phone call, the phone call is optionally performed using the "primary" cellular identifier by default. In some embodiments, the electronic device is able to perform a given function with a cellular identifier different from the default cellular identifier selected for that function. For example, if reception is poor or unavailable at the "data" cellular identifier, the electronic device is able to use the "primary" cellular identifier to upload or download data. Further, in some embodiments, individual contacts are associated with one of the cellular identifiers such that communications with that individual are performed using their associated cellular identifier and not the default cellular identifier for such communications.

In some embodiments, in response to receiving the input to select the respective set of one or more functions for the first cellular identifier (712), such as detecting contact 603 in FIG. 6J, in accordance with a determination that the respective set of one or more functions is a first set of one or more functions (e.g., primary number for phone/SMS 636b), the electronic device initiates (712) a process to enable the first cellular identifier to be used for the first set of one or more functions, as indicated by the indication 638a of the "Personal" cellular identifier in FIG. 6K, and in accordance with a determination that the respective set of one or more functions is a second set of one or more functions that is different from the first set of one or more functions (e.g., secondary number for phone/SMS 636a, as shown in FIG. 6J), the electronic device initiates (714) a process to enable the first cellular identifier to be used for the second set of one or more functions, as indicated by the indication 638b of the "Primary" cellular identifier in FIG. 6K. In some embodiments the first set of one or more functions includes at least one function not included in the second set of one or more functions. In some embodiments, the second set of one or more functions includes at least one function not included in the first set of one or more functions. In some embodiments, the first set of one or more functions and the second set of one or more functions include one or more functions in common. In some embodiments, the first set of one or more functions and the second set of one or more functions are mutually exclusive.

The above-described manner of setting up a first cellular identifier at an electronic device allows the electronic device to be set to perform a plurality of functions with the first cellular identifier, which simplifies interactions between the user and the device and enhances the operability of the device (e.g., by performing the selected functions with the first cellular identifier without express user input to use the first cellular identifier for the selected functions each time the selected functions are to be performed), which, additionally, reduces power usage and improves battery life of the device by enabling the user to use the device more quickly and efficiently.

In some embodiments, the respective set of one or more functions is one of voice and messaging functions, data functions, and primary cellular identifier functions (718), as indicated by indications 636a-c in FIG. 6J. Primary cellular identifier functions optionally include voice, messaging, and data functions and the cellular identifier selected to perform primary cellular identifier functions is optionally the default cellular identifier for performing those functions. In some embodiments, the primary cellular identifier is used by default for voice, messaging, and data functions unless those functions are unavailable (e.g., the primary cellular identifier has a poor signal or no service). When the primary cellular identifier is unavailable to perform a respective function, a different cellular identifier configured for the respective function optionally performs the respective function. For example, a primary cellular identifier is optionally used to make a phone call by default when it is able to make the phone call. When the primary cellular identifier is unavailable, a secondary cellular identifier that is configured for voice communication is optionally used to make the phone call.

The above-described manner of selecting a function of the first cellular identifier among voice, messaging, data, and primary cellular identifier functions allows the electronic device to be set to perform a plurality of functions with the first cellular identifier, which simplifies interactions between the user and the device and enhances the operability of the device (e.g., by performing the selected functions with the first cellular identifier without express user input to use the first cellular identifier for the selected functions each time the selected functions are to be performed), which, additionally, reduces power usage and improves battery life of the device by enabling the user to use the device more quickly and efficiently.

In some embodiments, prior to initiating the process to setup the first cellular identifier (e.g., the "Travel" cellular identifier indicated by indication 638d in FIG. 6P) for the electronic device, the electronic device was configured to perform primary cellular identifier functions using a second cellular identifier (e.g., the "Personal" cellular identifier indicated by indication 638a in FIG. 6P) (720). For example, only the second cellular identifier was configured on the electronic device or both the first cellular identifier and the second cellular identifier were configured on the electronic device and the first cellular identifier was configured as for secondary cellular identifier functions.

In some embodiments, the process to setup the first cellular identifier for the electronic device includes (722) configuring (724) the electronic device to perform the primary cellular identifier functions using the first cellular identifier (e.g., as indicated by indication 638d in FIG. 6R). In some embodiments, the user changes a setting to set the functions of the first cellular identifier to be primary cellular identifier functions (e.g., the default cellular identifier for performing voice, messaging, and/or data functions). The setup process for the first cellular identifier optionally includes configuring (726) the electronic device to perform secondary cellular identifier functions (e.g., data only) using the second cellular identifier (e.g., as indicated by indication 638a of FIG. 6R). In some embodiments, the electronic device automatically updates the functions of the second cellular identifier to be secondary (e.g., non-default) cellular functions (e.g., voice, messaging, and/or data functions) when the functions of the first cellular identifier are updated to be the primary cellular identifier functions. In some embodiments, the user is able to update the functions of the secondary cellular identifier. For example, while the functions of the first cellular identifier remain the primary cellular identifier functions, the second cellular identifier functions are optionally updated to be data only (e.g., the second cellular identifier becomes the default cellular identifier for data functions, while the first cellular identifier remains the default cellular identifier for voice and messaging functions) or to be the default cellular identifier for one or more contacts stored on the electronic device (e.g., the electronic device performs voice and messaging functions using the second cellular identifier by default for one or more specified contacts and uses the first cellular identifier by default for voice and messaging operations for all other contacts and phone numbers).

The above-described manner of configuring the second cellular identifier to perform secondary cellular identifier functions in response to configuring the first cellular identifier to perform primary cellular identifier functions allows the electronic device to continue to use the second cellular identifier as a secondary cellular identifier when the first cellular identifier is configured as the primary cellular identifier, which simplifies interactions between the user and the device and enhances the operability of the device (e.g., by updating the setting of the second cellular identifier when the setting of the first cellular identifier is updated without requiring the user to enter further inputs to configure the second cellular identifier as the secondary cellular identifier), which, additionally, reduces power usage and improves battery life of the device by enabling the user to use the device more quickly and efficiently.

In some embodiments, configuring the electronic device to perform the secondary cellular identifier functions using the second cellular identifier comprises configuring the electronic device to use the second cellular identifier (e.g., the "Personal" cellular identifier indicated by indication 638a in FIG. 6R) only for cellular data (728). In some embodiments, the electronic device automatically updates the functions of the second cellular identifier to be data functions only when the functions of the first cellular identifier are updated to be the primary cellular identifier functions, and the electronic device optionally performs voice and messaging functions using the first cellular identifier and optionally performs data operations using the second cellular identifier).

The above-described manner of configuring the second cellular identifier to perform cellular data functions in response to configuring the first cellular identifier to perform primary cellular identifier functions allows the electronic device to continue to use the second cellular identifier for data functions when the first cellular identifier is configured as the primary cellular identifier, which simplifies interactions between the user and the device and enhances the operability of the device (e.g., by updating the setting of the second cellular identifier when the setting of the first cellular identifier is updated without requiring the user to enter further inputs to configure the second cellular identifier for cellular data functions), which, additionally, reduces power usage and improves battery life of the device by enabling the user to use the device more quickly and efficiently.

In some embodiments, the process to setup the first cellular identifier for the electronic device includes (730): requesting (732) access credentials (e.g., a PIN, passcode, password, QR code authentication, or other authentication) for allowing access to the first cellular identifier, such as in FIGS. 6B-C. In some embodiments, the electronic device presents a user interface for entering the access credentials. For example, the electronic device presents a keypad to accept a PIN, a soft keyboard to accept a passcode or password, a camera user interface to accept a QR code, or a user interface suitable to accept another form of authentication. The process optionally includes receiving (734), via the one or more input devices, inputted access credentials (e.g., image 610 in FIG. 6B or passcode 616 in FIG. 6C) for allowing access to the first cellular identifier (e.g., the electronic device detects entry of access credentials by the user), and in response to receiving the inputted access credentials (736), in accordance with a determination that the inputted access credentials are correct, allowing (738) the process to setup the first cellular identifier for the electronic device to continue, such as in FIG. 6D. In some embodiments, when the correct access credentials are provided, the electronic device is able to use the first cellular identifier to perform one or more functions and the setup process continues. In accordance with a determination that the inputted access credentials are incorrect, the electronic device forgoes (740) allowing the process to setup the first cellular identifier for the electronic device to continue. In some embodiments, when incorrect access credentials are provided, the electronic device is not able to use the first cellular identifier to perform one or more functions and the setup process halts. In some embodiments, when incorrect access credentials are provided, the electronic device presents a message indicating that the credentials are incorrect. The electronic device optionally presents an affordance selectable to display the user interface for accepting the credentials again so that the user is able to attempt to enter the access credentials another time.

The above-described manner of authenticating the first cellular identifier allows the electronic device to use the first cellular identifier in a secure manner, which simplifies interactions between the user and the device and enhances the operability of the device (e.g., by ensuring the user of the electronic device is authorized to access the first cellular identifier prior to configuring the settings of the first cellular identifier), which, additionally, reduces power usage and improves battery life of the device by enabling the user to use the device more quickly and efficiently.

In some embodiments, the input corresponding to the request to setup the first cellular identifier for the electronic device comprises capturing, via a camera of the electronic device, an image (610) of a graphic corresponding to the first cellular identifier (742) such as in FIG. 6B (e.g., a QR code). A QR code optionally comprises access credentials for installing an eSIM on the electronic device, allowing the eSIM to be used as the first cellular identifier.

The above-described manner of enabling the user to authenticate the first cellular identifier by capturing an image allows the electronic device to authenticate the first cellular identifier without manual authentication input from the user, which simplifies interactions between the user and the device and enhances the operability of the device, which, additionally, reduces power usage and improves battery life of the device by enabling the user to use the device more quickly and efficiently.

In some embodiments, in response to capturing, via the camera of the electronic device, the image (610) of the graphic corresponding to the first cellular identifier (744) (e.g., the user captures an image of the QR code associated with an eSIM or another type of cellular identifier), such as in FIG. 6B: in accordance with a determination that the first cellular identifier is successfully identified using the image, the electronic device initiates (746) the process to setup the first cellular identifier for the electronic device, such as in FIG. 6D, and in accordance with a determination that the first cellular identifier is not successfully identified using the image (e.g., the image is not an image of a graphic corresponding to a cellular identifier, the image does not clearly capture the graphic corresponding to the cellular identifier, or the graphic corresponding to the first cellular identifier is not valid), the electronic device requests (748) manual input, such as in FIG. 6C, via the one or more input devices (e.g., via interaction with soft keypad 618 presented on touch screen 504), of information about the first cellular identifier (e.g., the electronic device presents a user interface for entering access credentials such as a PIN, passcode, password, or other authentication). In some embodiments, the user interface includes a field for entering text associated with the identity of the cellular identifier (e.g., a serial number or some other identifying name, number, or code) and a field for entering the access credentials. That is to say, the text associated with the identity of the cellular identifier and the access credentials are not necessarily the same. In some embodiments, the electronic device also presents an affordance selectable to capture another image of the graphic corresponding to the first cellular identifier.

The above-described manner of allowing the user to manually enter information about the first cellular identifier when authentication by image capture is unsuccessful allows the electronic device to provide a an alternative way for the user to authenticate the first cellular identifier when authenticating with an image does not work, which simplifies interactions between the user and the device and enhances the operability of the device (e.g., by allowing the user to use an alternative manner of authentication when camera authentication fails), which, additionally, reduces power usage and improves battery life of the device by enabling the user to use the device more quickly and efficiently.

In some embodiments, in response to receiving the input defining the first label (e.g., a text nickname for the cellular identifier such as "primary", "secondary", "data", "phone", "work", "personal", "domestic", "international", etc.) for the first cellular identifier for the electronic device, the electronic device generates (750) the indicator (e.g., text, an image, or an icon) corresponding to the first cellular identifier based on the first label (e.g., the contents of the indicator are selected based on the text of the label, such as including the first letter of the label (e.g., the indicator includes a "P" or "P1" based on the label "primary"), the first two letters of the label (e.g., the indicator includes the text "Pr" based on the label "primary", or the first letters of the first two words of the label (e.g., the indicator includes the text "UD" based on the label "unlimited data"), An example of generating an indicator corresponding to a first cellular identifier is descrbed in greater detail above with reference to in FIG. 6H.

In some embodiments, the indicator (e.g., indicator 644 illustrated in FIG. 6L) is displayed by the electronic device to represent the first cellular identifier in at least one or more user interfaces outside of the process to setup the first cellular identifier for the electronic device (752), such as in the contact card user interface illustrated in FIG. 6L. In some embodiments, the indicator is displayed in one or more communications user interfaces to indicate which cellular identifier is being used to perform the communication function of the communications user interface. In some embodiments, the indicator is displayed in one or more of a messaging user interface, a phone user interface, a voicemail user interface, etc. For example, the indicator is displayed next to a visual indication of a communication (e.g., an indication of a message, an indication of a voicemail, an indication of an incoming or outgoing phone call, etc.) that was executed using the first cellular identifier, such as in FIG. 6L. In some embodiments, the contact user interface presents multiple phone numbers for a respective contact and includes a single indication of the cellular identifier associated with the contact, as opposed to including multiple indicators 644 as illustrated in FIG. 6L. The indicator of the associated cellular identifier is optionally selectable to cause the electronic device to present selectable options to change which cellular identifier the respective contact is associated with.

The above-described manner of generating an indicator corresponding to a user-defined label for the first cellular identifier and presenting the indicator in one or more other user interfaces of the electronic device allows the electronic device to communicate to the user which cellular identifier is used to perform a respective operation with the electronic device, which simplifies interactions between the user and the device and enhances the operability of the device (e.g., by informing the user which cellular identifier is used to perform a respective operation without requiring the user to enter an input to display cellular identifier information), which, additionally, reduces power usage and improves battery life of the device by enabling the user to use the device more quickly and efficiently.

In some embodiments, generating the indicator corresponding to the first cellular identifier includes (754) in accordance with a determination that generating the indicator corresponding to the first cellular identifier (e.g., the "Business" cellular identifier indicated by indication 638c in FIG. 6M) to have a first number of characters (e.g., starting with the first character of the first label) will distinguish the indicator from an existing second indicator corresponding to a second label for a cellular identifier (e.g., the "Personal" cellular identifier indicated by indication 638a in FIG. 6M), the electronic device generates (756) the indicator corresponding to the first cellular identifier to have the first number of characters (e.g., one character). In some embodiments, the label of the second cellular identifier and the label for the first cellular identifier start with different letters, therefore, using the first letters of the labels as the indicators of the cellular identifiers distinguishes them. For example, if the labels of the first and second cellular identifiers are "Primary" and "Secondary," respectively, then the respective indications of the labels are optionally "P" and "S" respectively. In accordance with a determination that generating the indicator corresponding to the first cellular identifier (e.g., the "Primary" cellular identifier indicated by indication 638b in FIG. 6K) to have the first number of characters will not distinguish the indicator from the existing second indicator corresponding to the second label for a cellular identifier (e.g., the label of the second cellular identifier and the label of the first cellular identifier start with the same letter, therefore, using only the first letters of the labels as the indicators will not result in distinct labels), the electronic device generates (758) the indicator corresponding to the first cellular identifier to have a second number of characters (e.g., two), greater than the first number of characters, such as in FIG. 6K. In some embodiments, the electronic device uses the first two or more characters of the labels as indicators or uses the first letter and a unique number for the labels. For example, if the labels of the first and second cellular identifiers are "Primary" and "Personal," then the respective indicators of the labels are optionally "Pr" and "Pe." As another example, if the labels of the first and second cellular identifiers are "Primary" and "Prorated," then the respective indicators of the labels are optionally "Pri" and "Pro". In some embodiments, when a maximum number of characters (e.g., 3) are the same at the front of each of the labels, the electronic device uses numbers to distinguish the indicators from one another. For example, if the labels of the first and second cellular identifiers are "Primary" and "Private," then the respective indicators of the labels are optionally "P1" and "P2." In this way, the electronic device is able to provide a unique indicator of each cellular identifier for use in various user interfaces of the electronic device associated with one or more functions of the cellular identifier. These unique indicators of the cellular identifiers enable the electronic device to communicate to the user which cellular identifier is being used to perform various functions as the user interface associated with the function is presented.

The above-described manner of generating unique indicators of the first cellular identifier and the second cellular identifier allows the electronic device to provide differentiating information to the user, which simplifies interactions between the user and the device and enhances the operability of the device (e.g., by presenting unambiguously an indication of which cellular identifier is being used to perform a respective function at the electronic device so the user is able to use the cellular identifier they intended to use to perform functions), which, additionally, reduces power usage and improves battery life of the device by enabling the user to use the device more quickly and efficiently).

In some embodiments, after setting up the first cellular identifier for the electronic device, the electronic device displays (760), on the display, a representation of the first cellular identifier (e.g., indication 638c of the "Business" cellular identifier in FIG. 6P) and a representation of a second cellular identifier (e.g., indication 638d of the "Travel" cellular identifier in FIG. 6P) (e.g., in a cellular settings user interface).

In some embodiments, the second cellular identifier (e.g., the "Travel cellular identifier indicated by indication 638d in FIG. 6P) is currently inactive on the electronic device (e.g., the second cellular identifier is not configured for performing functions on the electronic device), and the representation of the second cellular identifier is displayed concurrently with an affordance (650) for activating the second cellular identifier on the electronic device (762) (e.g., the electronic device optionally also presents an indication of the inactive status of the second cellular identifier), such as in FIG. 6P.

In some embodiments, while displaying, on the display, the representation (638c) of the first cellular identifier and the representation (638d) of the second cellular identifier, the electronic device receives (764), via the one or more input devices, an input (e.g., contact 603 illustrated in FIG. 6Q) corresponding to selection (e.g., a tap or touch received at a touch screen, a click received by a mouse or trackpad, a shortcut entered at a keyboard, keypad, or soft keyboard, a voice input, etc.) of the affordance (650) for activating the second cellular identifier, such as in FIG. 6Q.

In some embodiments, in response to receiving the input corresponding to the selection of the affordance for activating the second cellular identifier (e.g., the "Travel" cellular identifier indicated by indication 638d), the electronic device activates (766) the second cellular identifier on the electronic device, such as in FIG. 6R (e.g., configuring the second cellular identifier to perform one or more functions on the electronic device). In some embodiments, activating the second cellular identifier configures the second cellular identifier to perform primary cellular identifier functions (e.g., the second cellular identifier is used by default for voice, messaging, and data operations). In some embodiments, activating the second cellular identifier configures the second cellular identifier to perform secondary cellular functions (e.g., the second cellular identifier is used for voice, messaging, and data operations when the primary cellular identifier is not available). In some embodiments, activating the second cellular identifier configures the second cellular identifier to perform the functions it was previously configured to perform the last time it was activated on the electronic device.

The above-described manner of presenting an indication of an available, but inactive, cellular identifier allows the electronic device to provide the user with the ability to change which cellular identifiers are activated on the electronic device which simplifies interactions between the user and the device and enhances the operability of the device (e.g., by saving information related to inactive cellular identifiers rather than requiring the user to undergo the setup process from the beginning for the inactive cellular identifiers), which, additionally, reduces power usage and improves battery life of the device by enabling the user to use the device more quickly and efficiently).

In some embodiments, the input corresponding to the request to setup the first cellular identifier is received during an initial setup process for the electronic device (768) (e.g., when the electronic device is configured for use for the first time, the initial setup process guides the user through various device settings and user account logins, including the process for configuring one or more cellular identifiers available to the electronic device). An example of an initial setup process is described in greater detail above with reference to FIGS. 6A-6K.

The above-described manner of presenting a user interface for configuring the cellular identifier during an initial setup process for the electronic device allows the electronic device to provide the user with the ability set the cellular identifier settings prior to using the electronic device, which, additionally, reduces power usage and improves battery life of the device by enabling the user to use the device more quickly and efficiently).

In some embodiments, the initial setup process for the electronic device is a first setup process for a new electronic device (770). The initial setup process is optionally displayed when the electronic device is setup for the first time or after its memory has been erased. An example of an initial setup process for a new electronic device is described in greater detail above with reference to FIGS. 6A-6K.

The above-described manner of presenting a user interface for configuring the cellular identifier during an initial setup process for the electronic device allows the electronic device to provide the user with the ability set the cellular identifier settings prior to using the electronic device for the first time, which, additionally, reduces power usage and improves battery life of the device by enabling the user to use the device more quickly and efficiently.

In some embodiments, the process to setup the first cellular identifier for the electronic device is initiated in response to detecting a second cellular identifier at the electronic device (772) (e.g., when a second cellular identifier is introduced to the electronic device) In some embodiments, when a SIM card is inserted into the mobile device or an eSIM is activated on the electronic device, the electronic device presents the cellular identifier setup user interface to configure the second cellular identifier and an existing cellular identifier (e.g., the first cellular identifier). When the electronic device operates with one cellular identifier, the electronic device is optionally configured to perform all cellular identifier functions (e.g., voice, messaging, data) with the cellular identifier. When the electronic device operates with two or more cellular identifiers, the electronic device is configured to perform various cellular identifier functions with various cellular identifiers available to the electronic device). An example of a process to setup a cellular identifier is described in more detail above with reference to FIGS. 6A-6J.

The above-described manner of initiating the setup process of the first cellular identifier in response to detecting the first cellular identifier allows the electronic device to present the ability to setup a cellular identifier when the cellular identifier is first introduced to the electronic device, which simplifies interactions between the user and the device and enhances the operability of the device (e.g., by presenting the cellular identifier setup user interface without requiring the user navigate to the cellular identifier user interface manually), which, additionally, reduces power usage and improves battery life of the device by enabling the user to use the device more quickly and efficiently.

In some embodiments, the process to setup the first cellular identifier for the electronic device is initiated in response to an input (e.g., selection of affordance 648 with contact 603 in FIG. 6O) detected in a cellular settings user interface of the electronic device (774). The user optionally selects a cellular settings user interface to setup the first cellular identifier. In some embodiments, the first cellular identifier is set up for the first time from the settings user interface. In some embodiments, the first cellular identifier is already set up and the user is able to go to the settings user interface to update one or more settings related to the setup of the cellular identifier (e.g., activating or deactivating the first cellular identifier, selecting one or more functions to perform with the first cellular identifier, changing the label of the first cellular identifier, etc).

The above-described manner of presenting the cellular identifier setup user interface in a settings user interface allows the electronic device to present the cellular identifier setup user interface to the user in response to a user request to do so, which simplifies interactions between the user and the device and enhances the operability of the device (e.g., by allowing the user to setup the first cellular identifier or to change one or more settings associated with the first cellular identifier at the user's convenience), which, additionally, reduces power usage and improves battery life of the device by enabling the user to use the device more quickly and efficiently.

In some embodiments, the process to setup the first cellular identifier for the electronic device includes (776) receiving (778), via the one more input devices, an input corresponding to a request to designate the first cellular identifier with a designation, such as selection of the "Primary number for phone/SMS" option 636*b* with contact 603 in FIG. 6J (e.g., a primary cellular identifier designation, a secondary cellular identifier designation, or another designation). In some embodiments, designating a cellular identifier as the primary cellular identifier causes the electronic device to use that cellular identifier to perform voice, messaging, and/or data functions by default. In some embodiments, designating a cellular identifier as the secondary cellular identifier causes the electronic device to use that cellular identifier to perform voice, messaging, and/or data functions when the primary cellular identifier is unable (e.g., no signal, deactivated, etc.) to perform the function.

In some embodiments, in response to receiving the input (e.g., selection of option 636*b* with contact 603 in FIG. 6J) corresponding to the request to designate the first cellular identifier with the designation (780), in accordance with a determination that the designation is a primary cellular identifier designation, the electronic device is configured (782) to perform messaging functions using the first cellular identifier, as indicated by indication 638*a* of FIG. 6K. In some embodiments, the primary cellular identifier is used by the electronic device to send and receive messages using a messaging service or platform, such as a messaging platform associated with the electronic device, associated with a user account of the electronic device, etc. For example, the electronic device uses the primary cellular identifier to send and receive messages using an enhanced messaging service. In accordance with a determination that the designation is not the primary cellular identifier designation, configuring the electronic device includes forgoing (784) to perform the messaging functions using the first cellular identifier, as indicated by indication 638*b* in FIG. 6K. The electronic device optionally does not use the secondary cellular identifier for sending and receiving messages using a messaging service or platform, such as a messaging platform associated with the electronic device, associated with a user account of the electronic device, etc. In some embodiments, when the primary cellular identifier is unavailable, the electronic device uses the secondary cellular identifier to send a message to a contact using a different messaging service (e.g., SMS).

The above-described manner of using the primary cellular identifier for to perform messaging functions allows the electronic device to associate a user account of the messaging service with the primary cellular identifier, which simplifies interactions between the user and the device and enhances the operability of the device (e.g., by using the primary cellular identifier to log in to the user account of the messaging service), which, additionally, reduces power usage and improves battery life of the device by enabling the user to use the device more quickly and efficiently).

It should be understood that the particular order in which the operations in FIGS. 7A-7I have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, 1300, and 1500) are also applicable in an analogous manner to method 700 described above with respect to FIGS. 7A-7I. For example, the cellular identifier settings described above with reference to method 700 optionally have one or more of the characteristics of the cellular identifier settings of electronic devices in communication with other electronic devices, indications of cellular identifiers, operations performed with cellular identifiers, etc., described herein with reference to other methods described herein (e.g., methods 900, 1100, 1300, and 1500). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 7A-7I are, optionally, implemented by components depicted in FIGS. 1A-1B. For example, displaying operations 708, 752, and 760 and receiving operations 702, 708, 710, 734, 764, 766, 768, and 778, are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Wearable Device Cellular Identifier Settings

Users interact with electronic devices in many different manners, including viewing information about the electronic device and/or usage of the electronic device. In some embodiments, a first electronic device (e.g., a wearable device, such as a smart watch) is able to perform operations with a first cellular identifier regardless of a connection to a second electronic device (e.g., a mobile device) and is able to perform operations with a second cellular identifier when the first electronic device is connected to the second electronic device. The embodiments described below provide ways in which the first electronic device presents indications of operations using a first and second cellular identifier depending on the status of a connection to a second electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 8M:
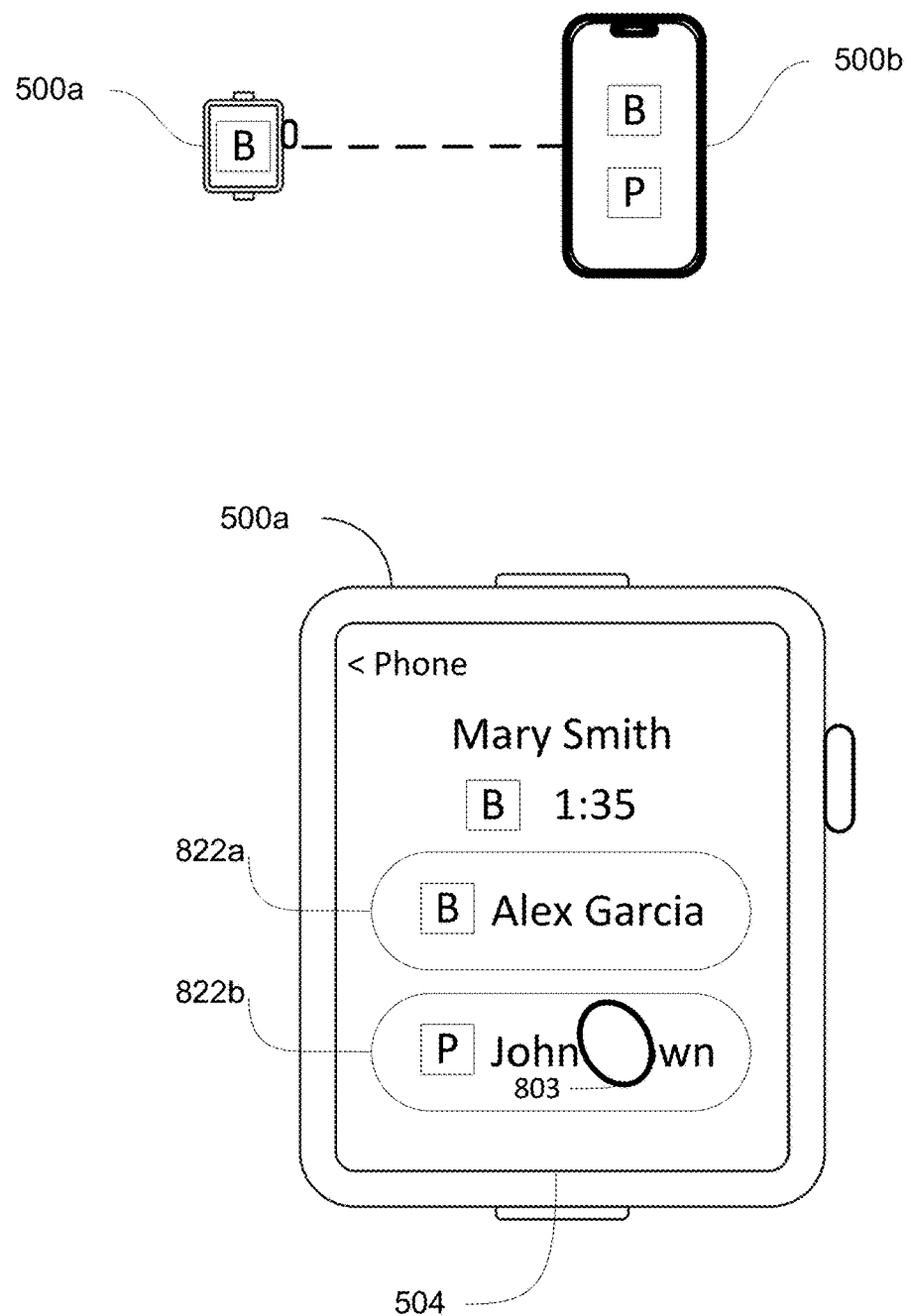
FIGS. 8A-8U illustrate exemplary ways in which a first electronic device accesses a first cellular identifier regardless of the first electronic device's connection to a second electronic device and ways in which the first electronic device accesses a second cellular identifier when the first electronic device is connected to the second electronic device in accordance with some embodiments of the disclosure.
Figure 8R:
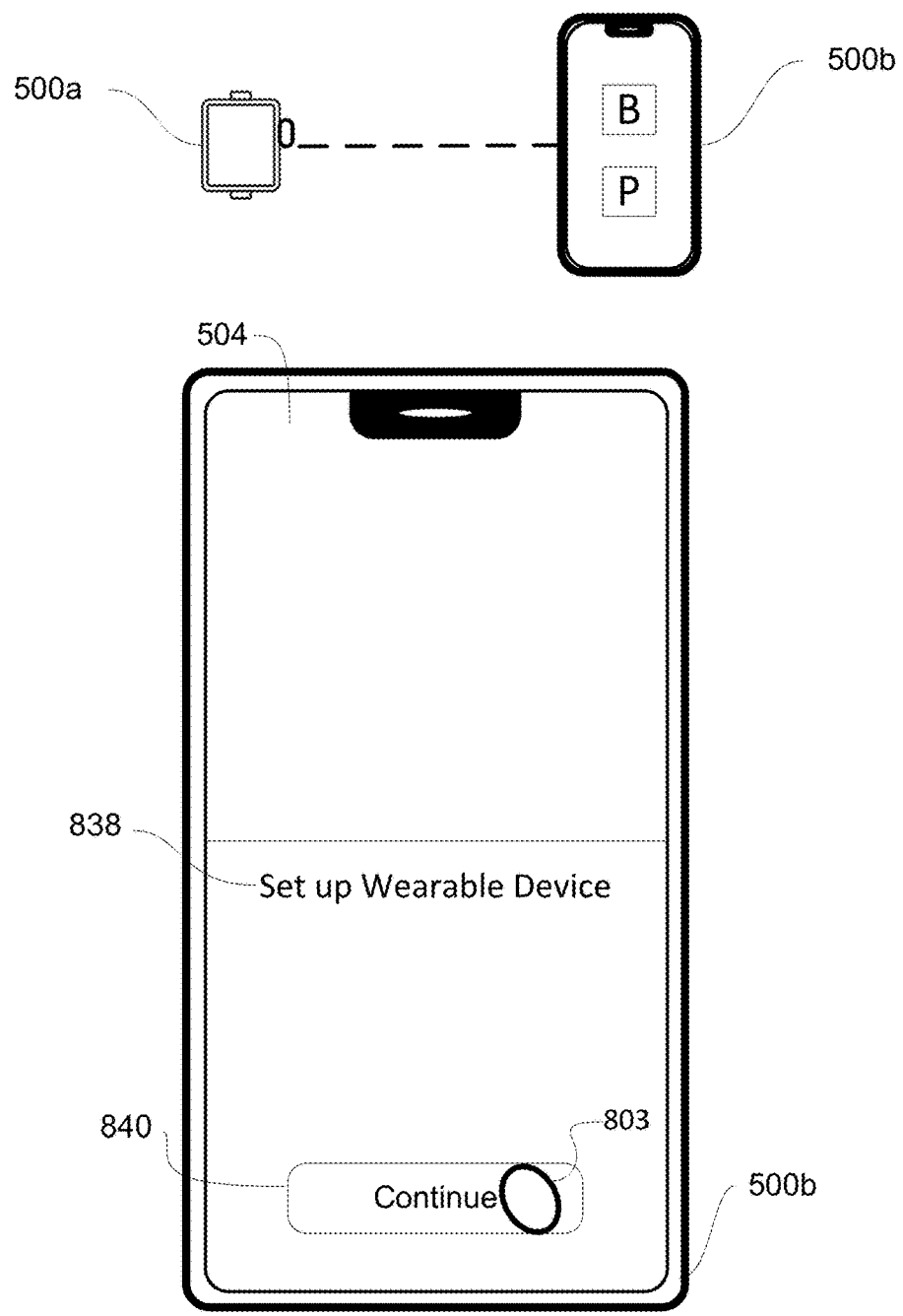
Figure 8S:
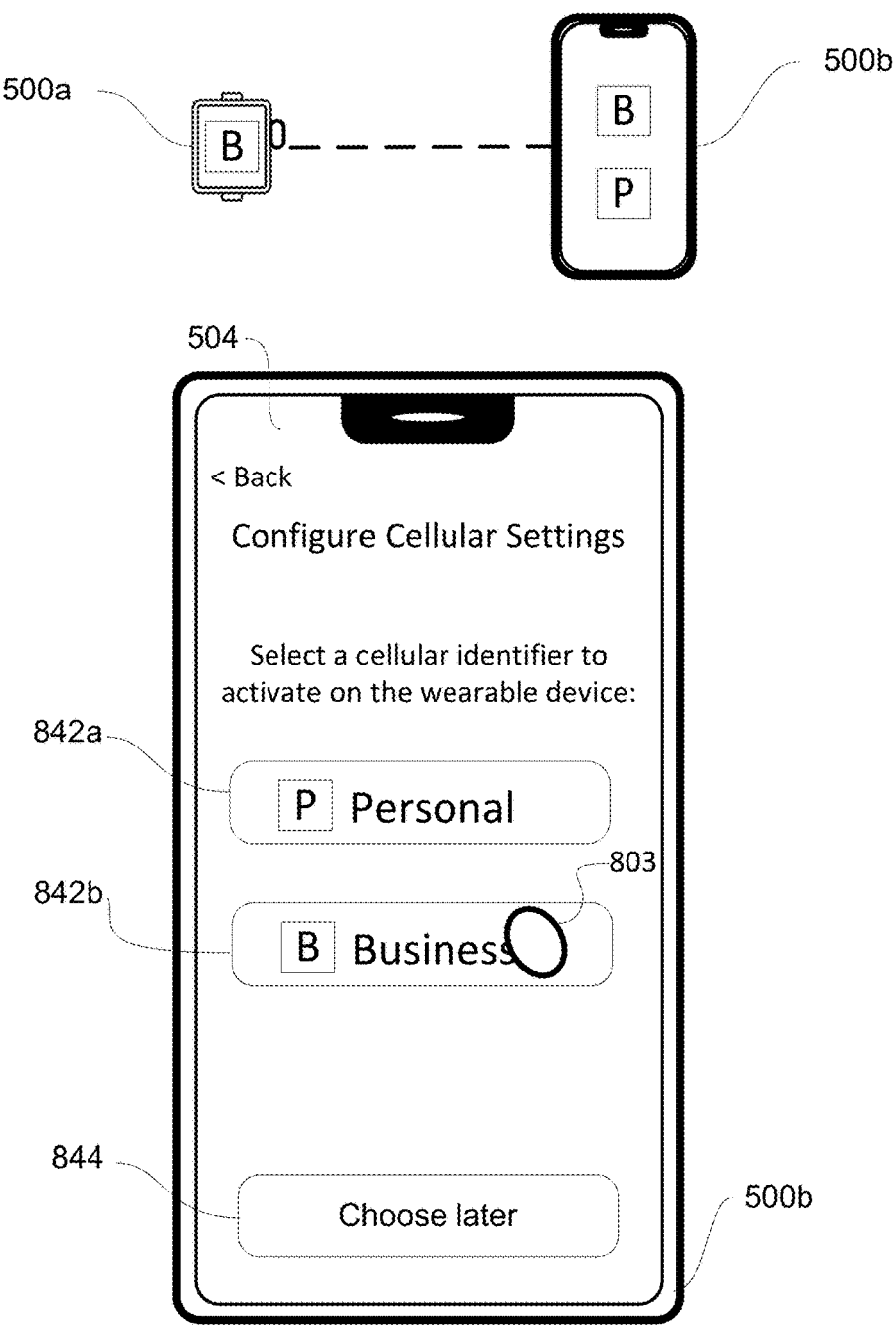
Figure 8T:
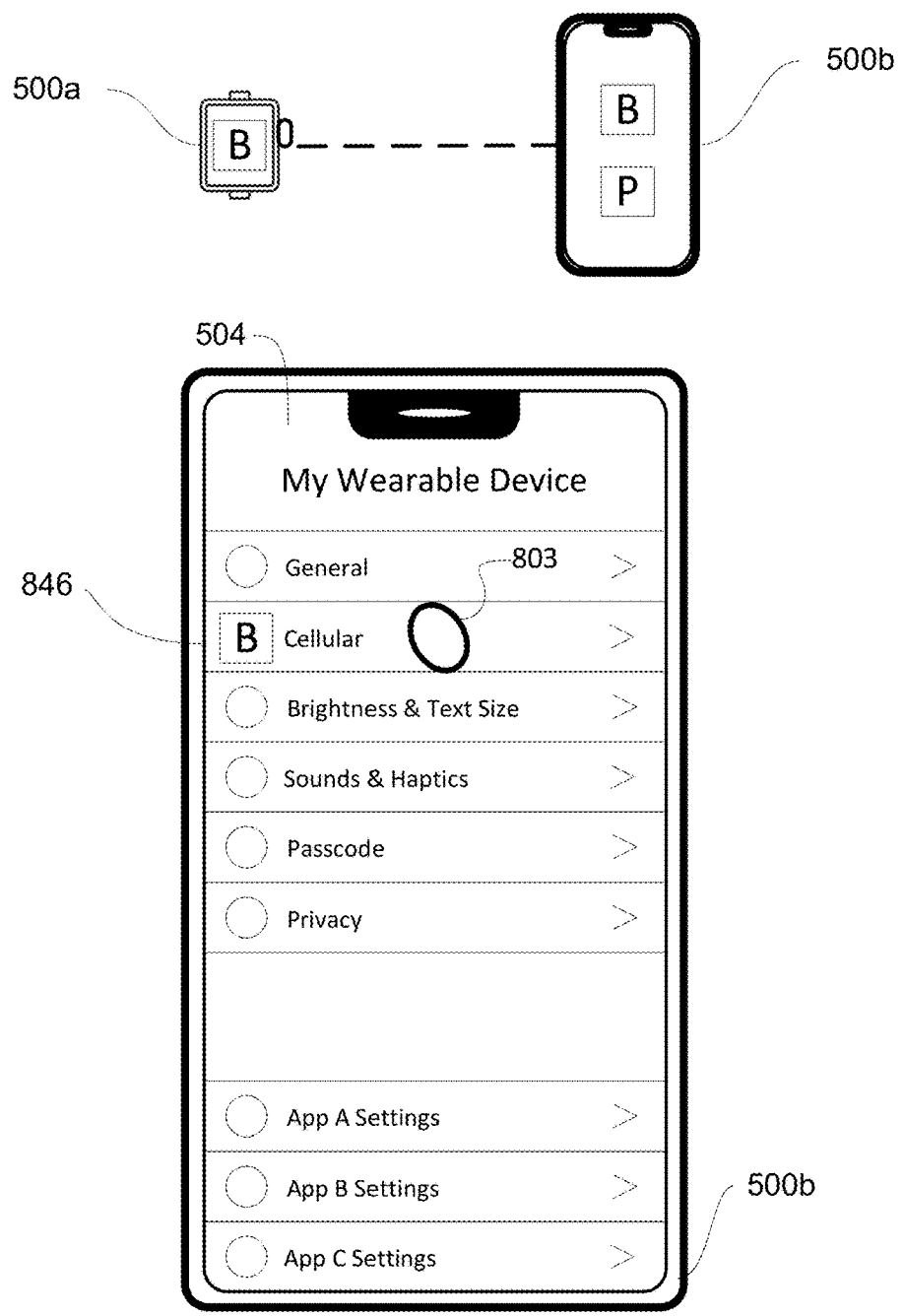
Figure 8U:
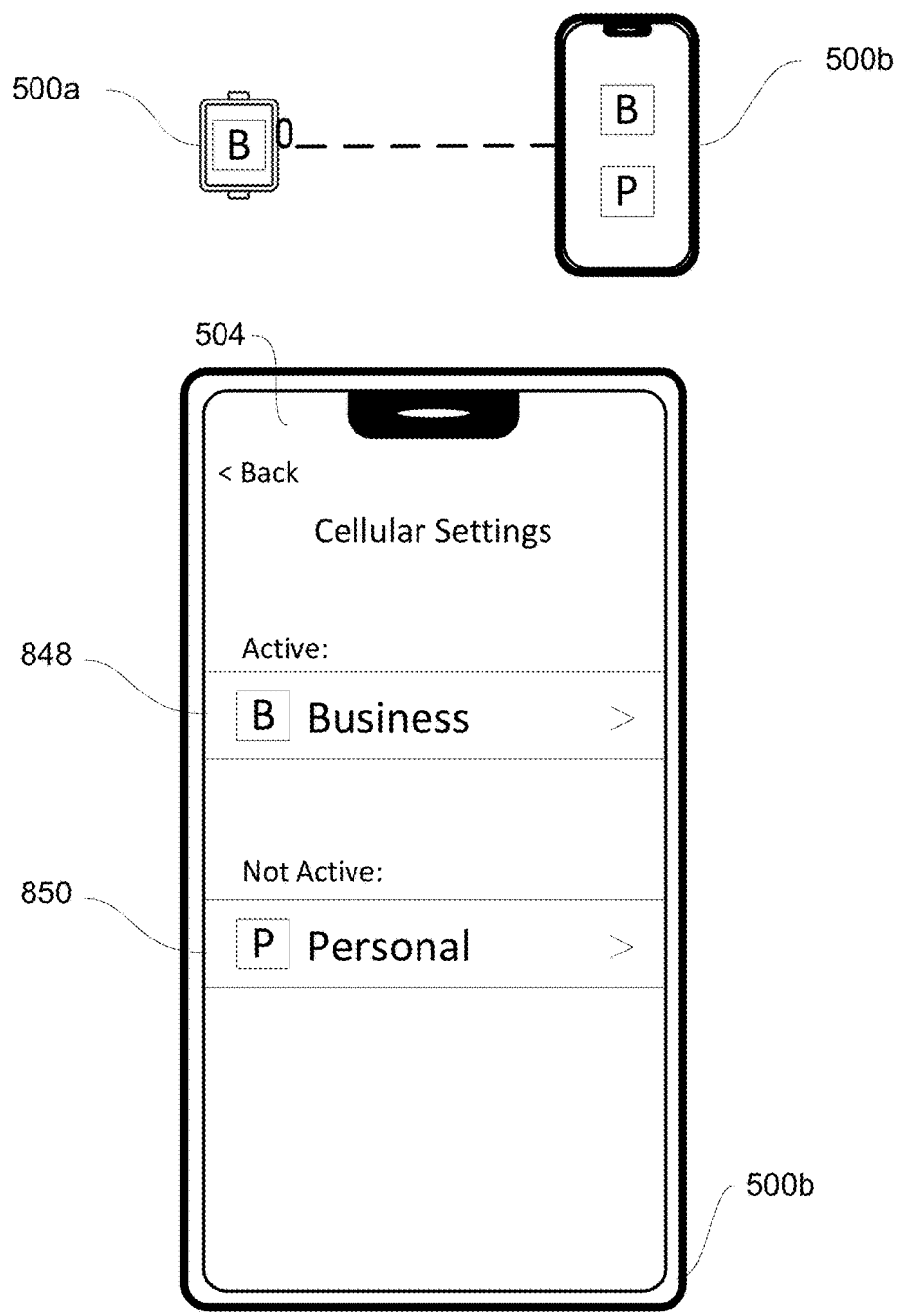
Figure 9A:
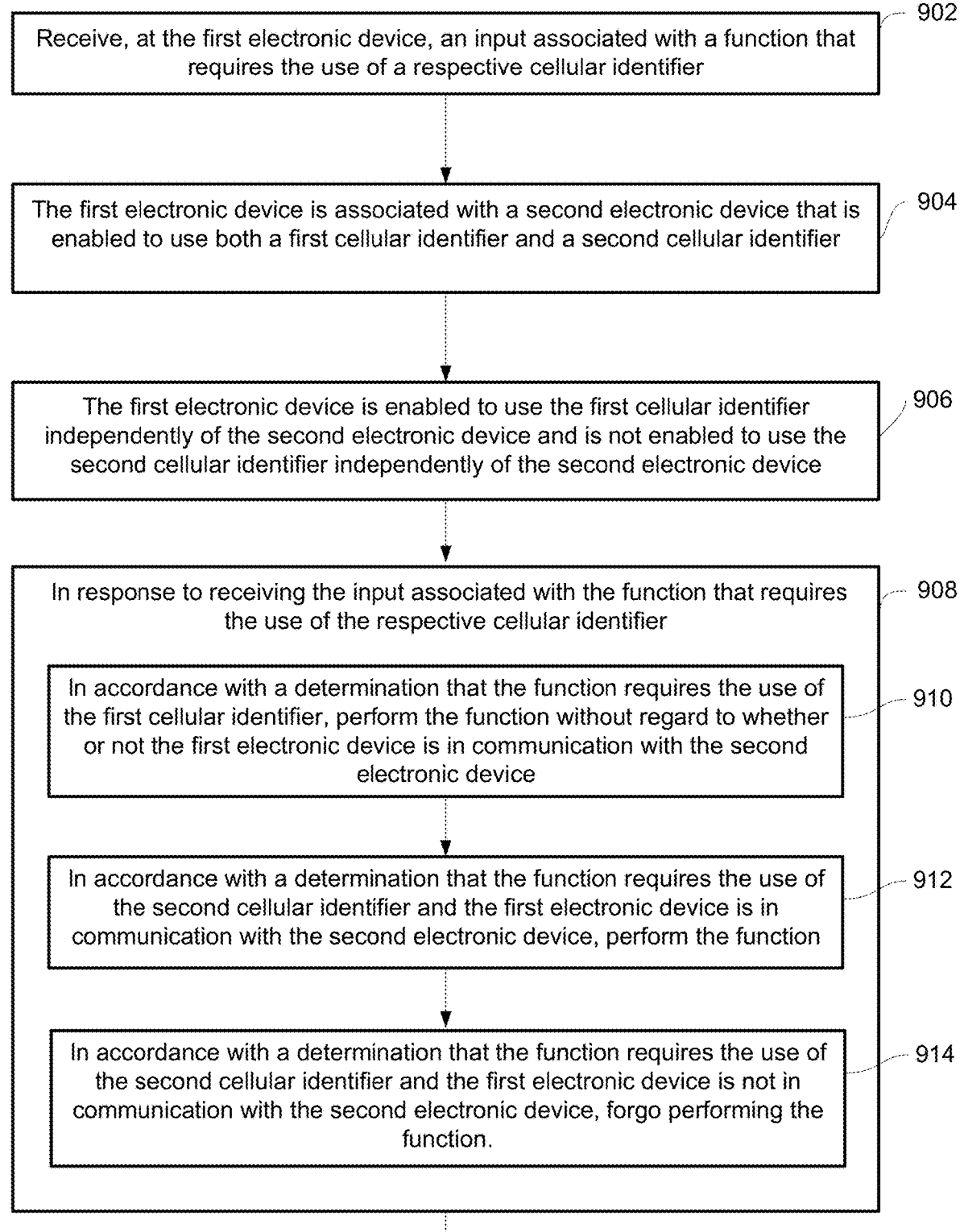
FIGS. 9A-9H are flow diagrams illustrating a method of accessing, on a first electronic device, a first cellular identifier regardless of the first electronic device's connection to a second electronic device and of accessing, on the first electronic device, a second cellular identifier when the first electronic device is connected to the second electronic device in accordance with some embodiments of the disclosure.
Figure 9B:
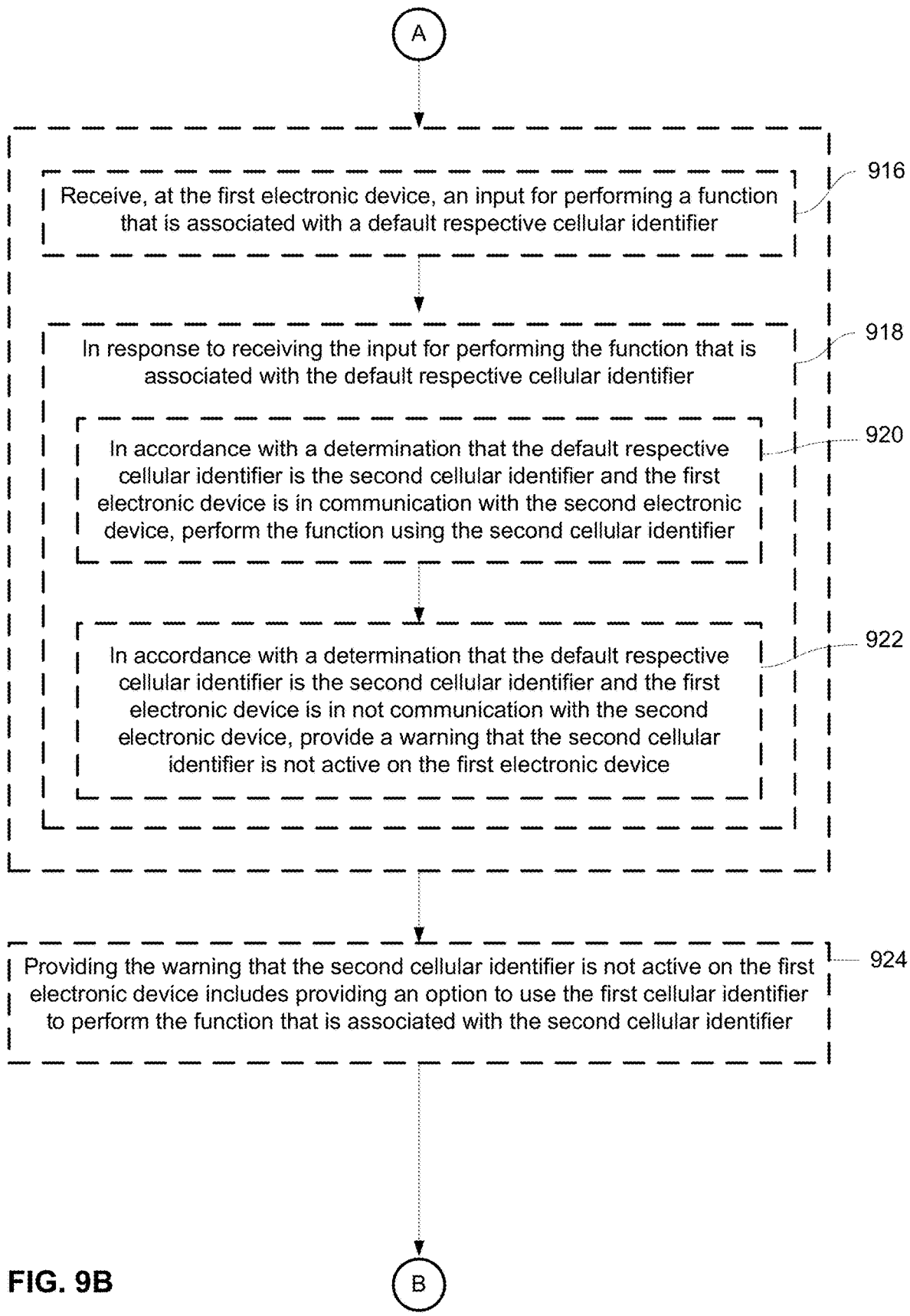
Figure 9C:
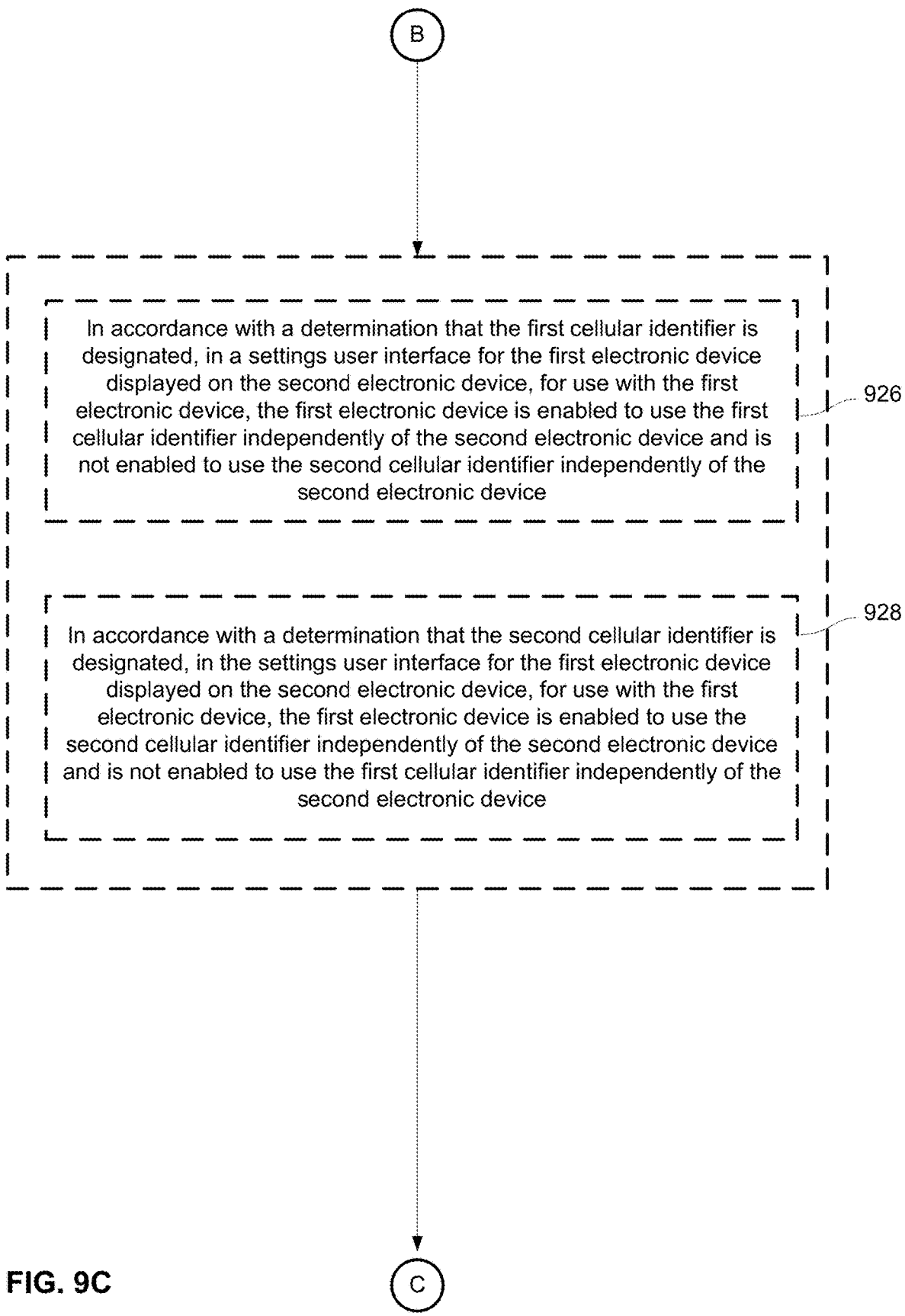
Figure 9D:
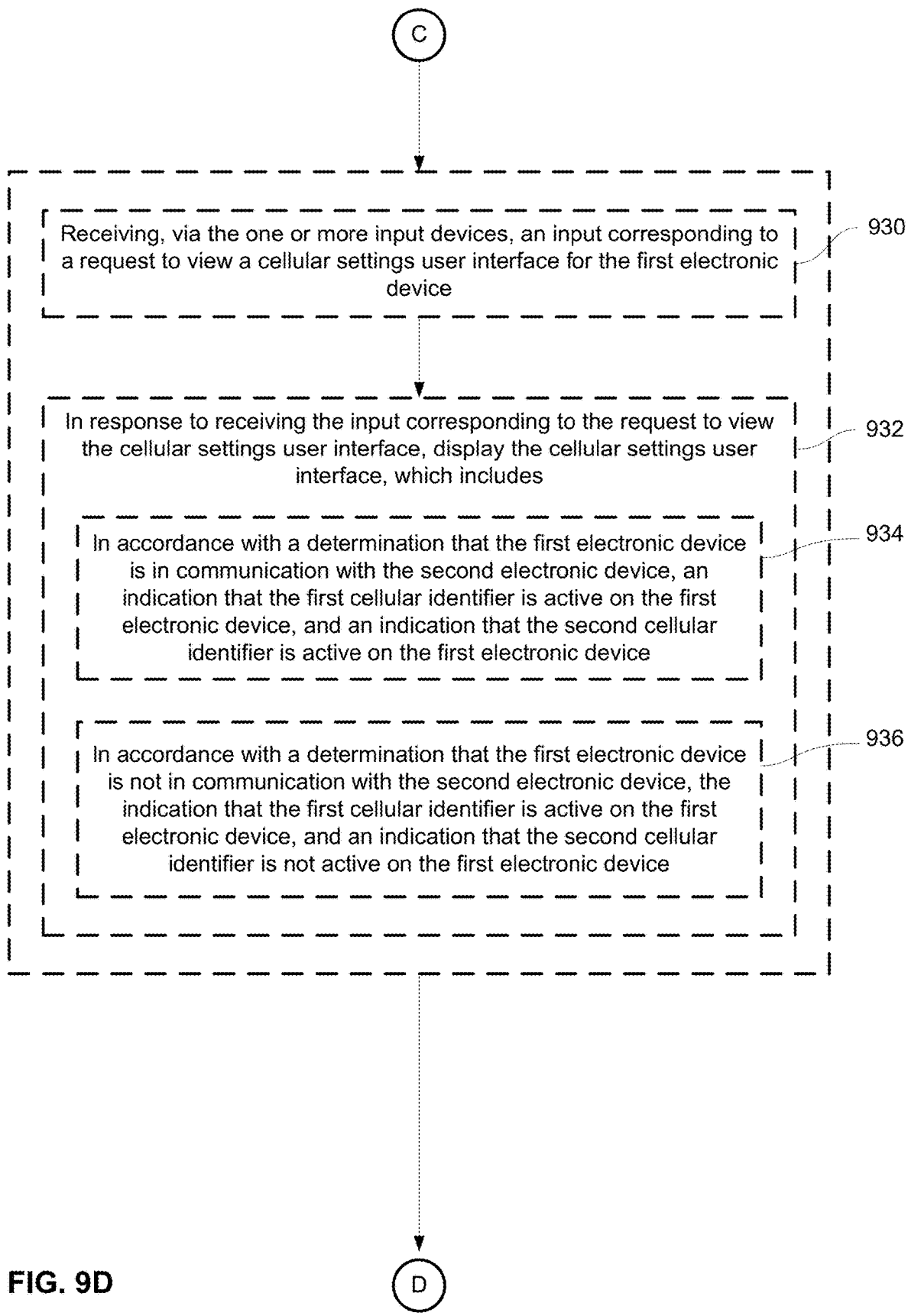
Figure 9E:
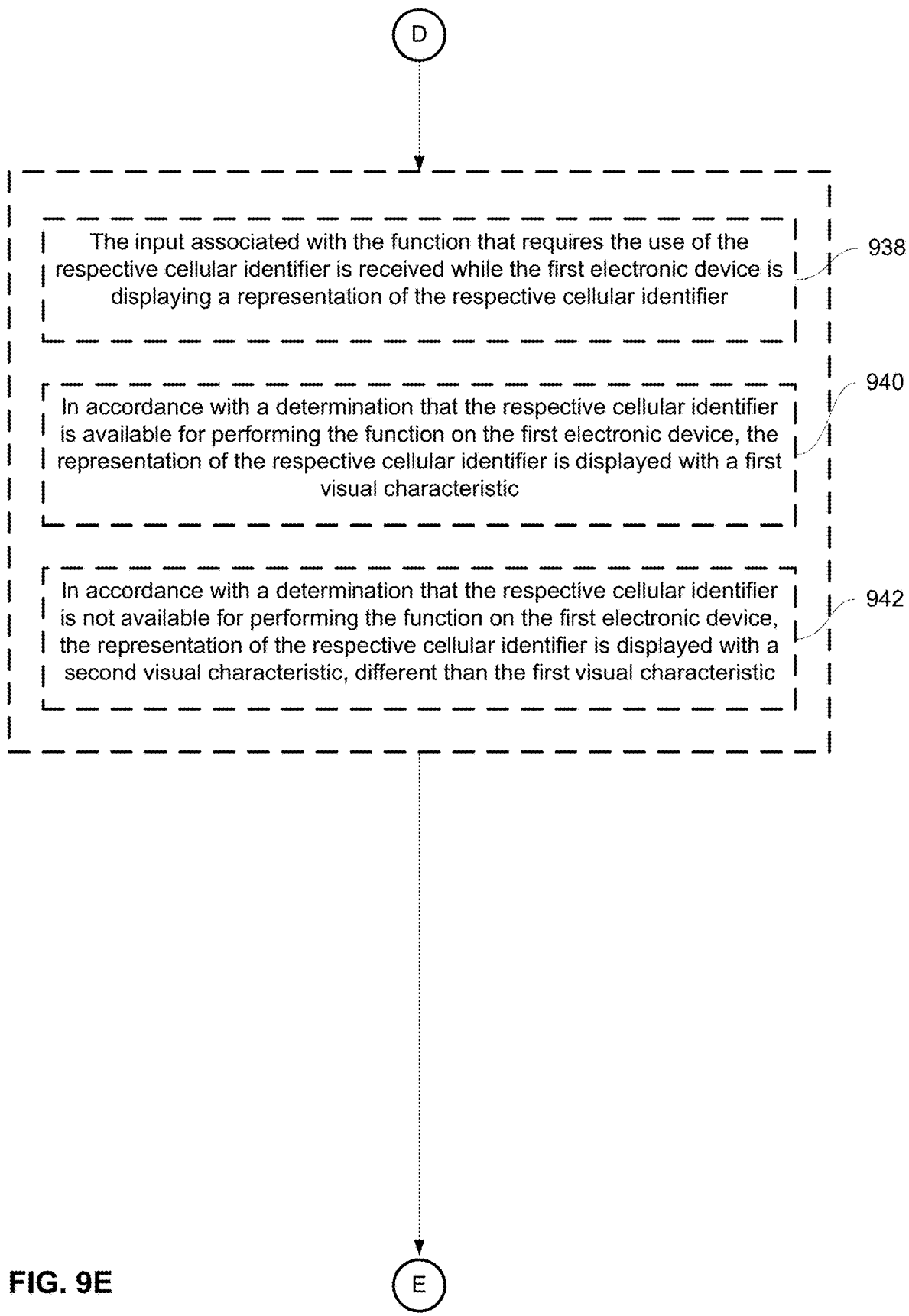
Figure 9F:
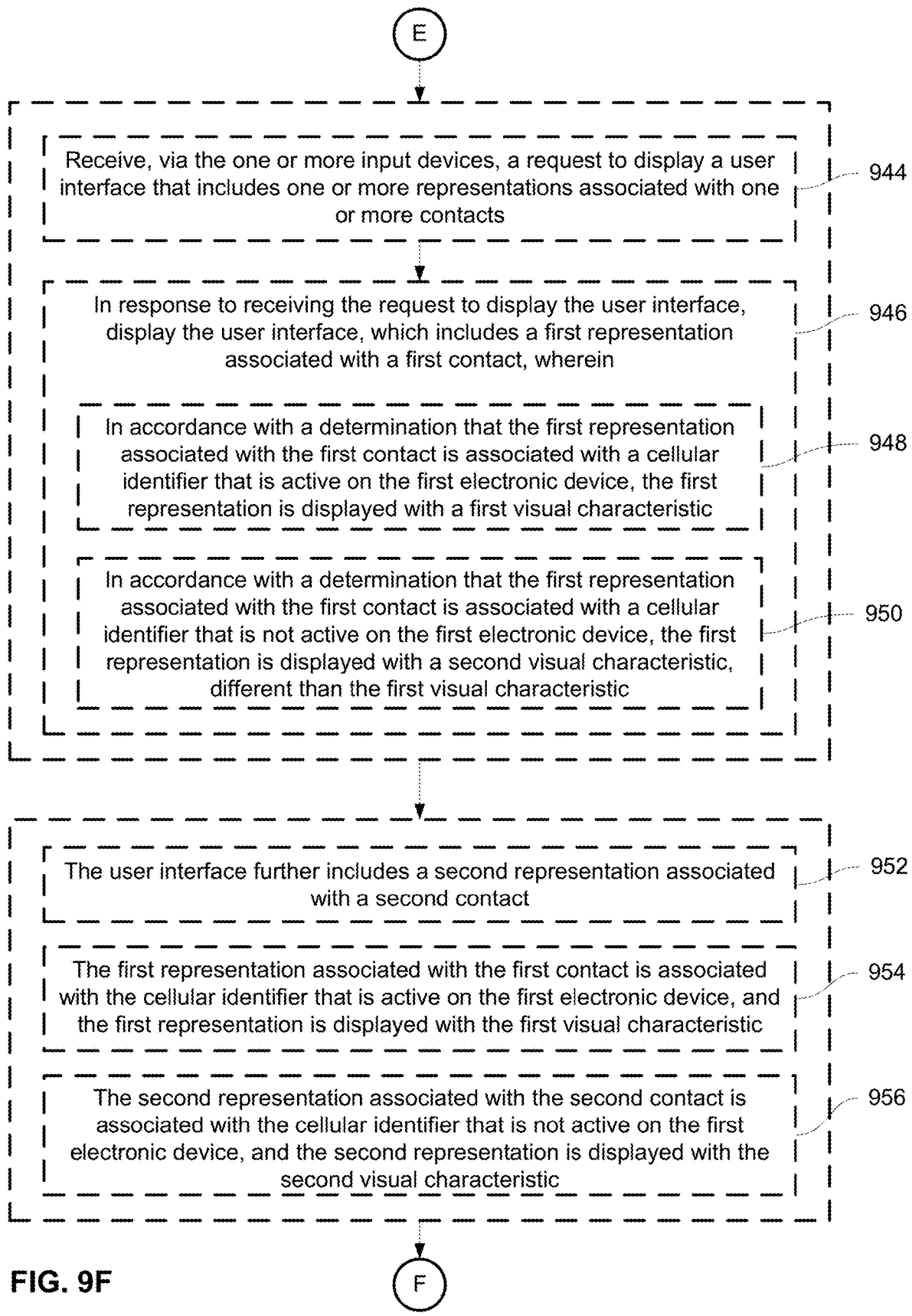
Figure 9G:
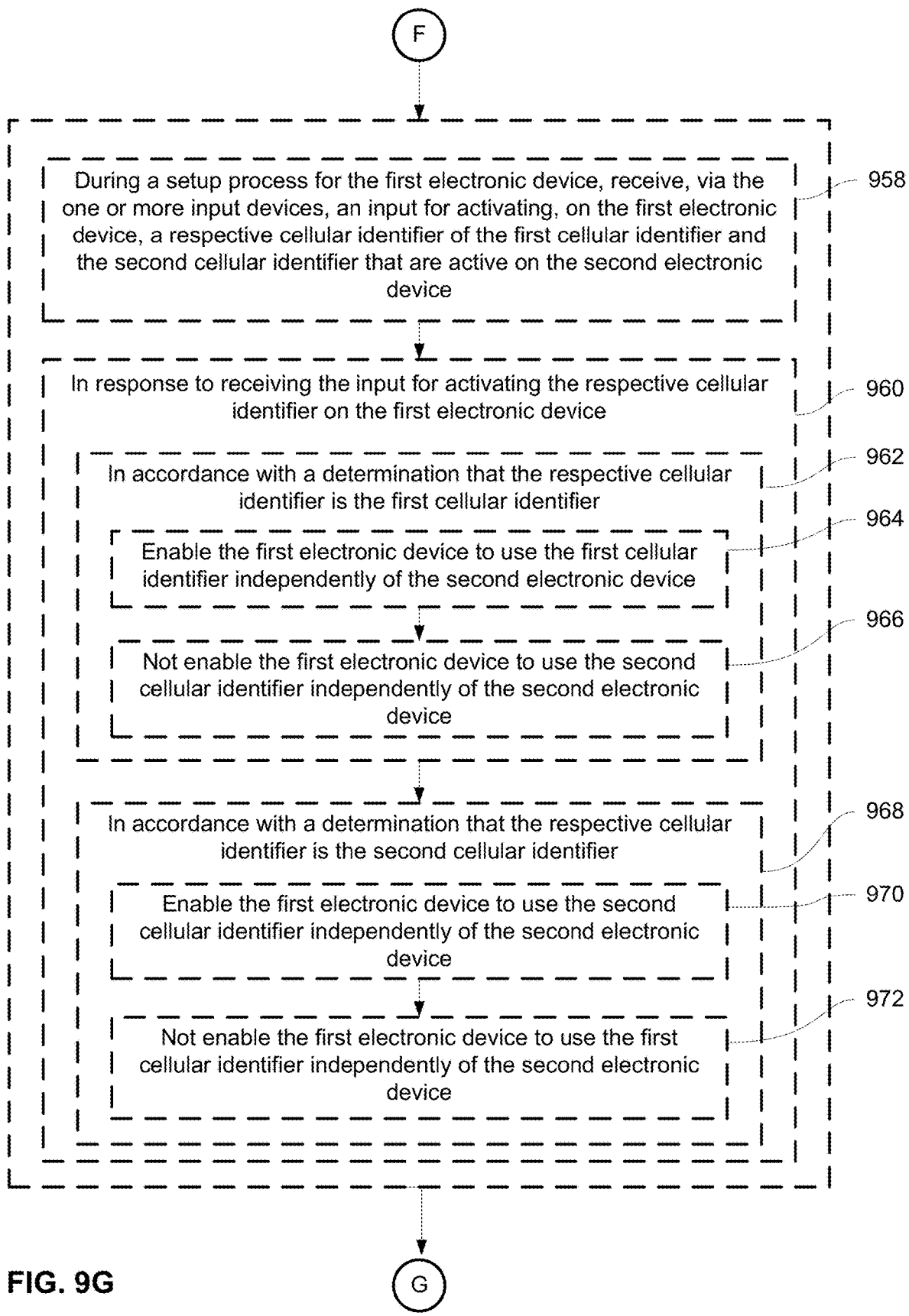
Figure 9H:
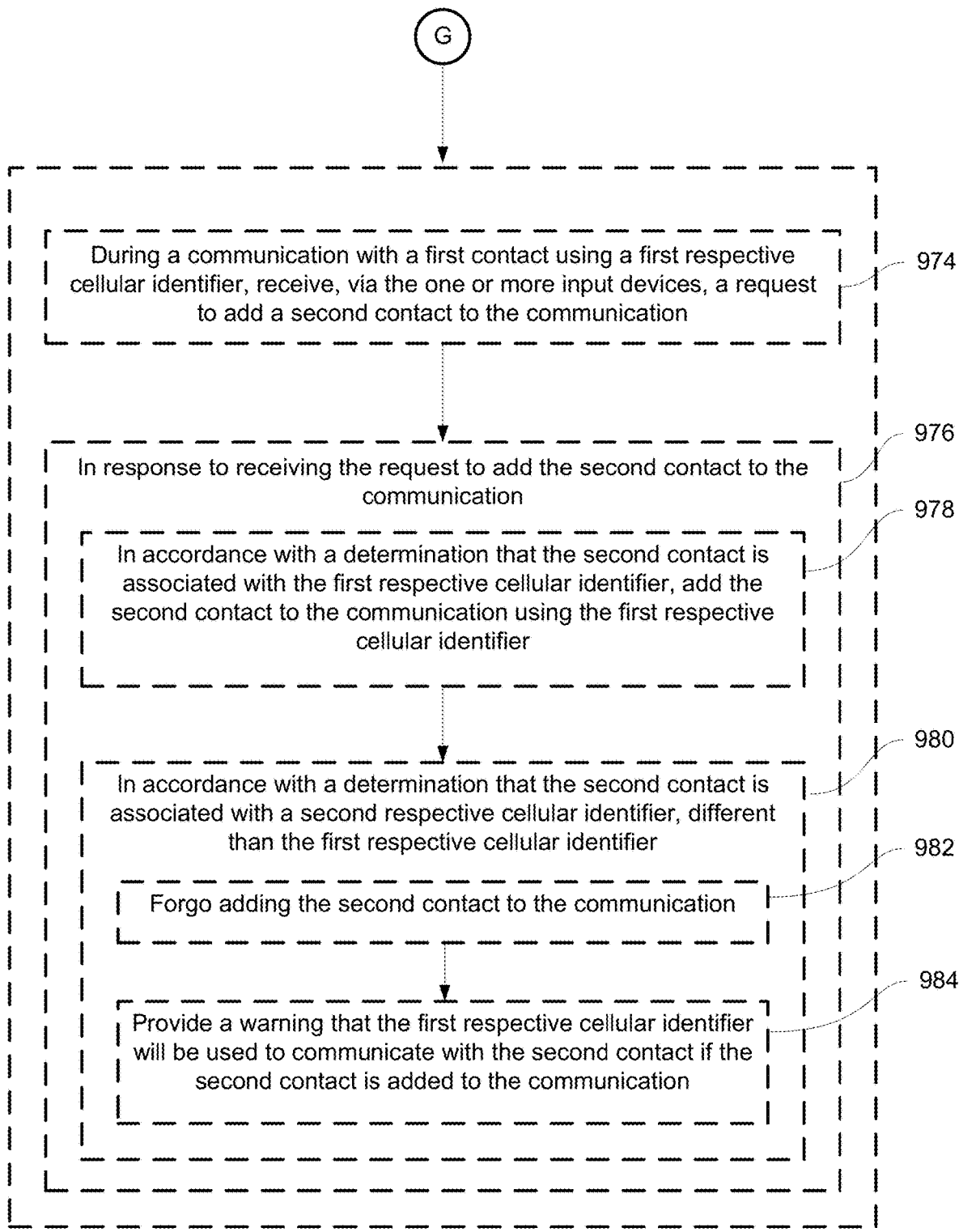

FIGS. 8A-8U illustrate exemplary ways in which a first electronic device accesses a first cellular identifier regardless of the first electronic device's connection to a second electronic device and ways in which the first electronic device accesses a second cellular identifier when the first electronic device is connected to the second electronic device in accordance with some embodiments of the disclosure. The embodiments in these figures are used to illustrate the processes described below, including the processes described with reference to FIGS. 9A-9H.

FIG. 8A illustrates exemplary device 500a with touch screen 504, such as described with reference to FIGS. 5A-5H. Touch screen 504 optionally displays one or more user interfaces that include various content. As illustrated in the figures, electronic device 500a is a wearable device, such as a smart watch. In the example illustrated in FIG. 8A, the touch screen 504 displays a user interface for associating a cellular identifier with the electronic device 500a. The user interface includes a first affordance 802a selectable to associate a "Personal" cellular identifier with the electronic device 500a and a second affordance 802b selectable to associate a "Business" cellular identifier with the electronic device 500a (e.g., cellular identifiers as described with reference to method 700). The electronic device 500a will optionally be enabled to perform functions with the selected cellular identifier even when it is not in communication with a second electronic device 500b. In some embodiments, the second electronic device is a smart phone, and is a device that is enabled to utilize multiple cellular identifiers, such as described with reference to method 700. In some embodiments, device 500a is an accessory to device 500b. As shown in FIG. 8A, when the illustrated user interface is presented at the first electronic device 500a, the first electronic device 500a is in communication with the second electronic device 500b. The second electronic device 500b has access to both the "Personal" and "Business" cellular identifiers. As shown in FIG. 8B, the user selects (e.g., with contact 803) the second affordance 802b for enabling the first electronic device 500a to perform operations with the "Business" cellular identifier even when the first electronic device 500a is not in communication with the second electronic device 500b. In some embodiments, device 500a is only able to utilize a single cellular identifier (e.g., the "Business" cellular identifier, one of the cellular identifiers that device 500b is configured to use) when it is not in communication with device 500b, and is able to utilize multiple cellular identifiers when it is in communication with device 500a (e.g., both cellular identifiers that device 500b is configured to use), as will be described further below.

FIG. 8C illustrates the first electronic device 500a presenting a user interface for initiating a phone call with one of a plurality of contacts whose contact information is stored on the first electronic device 500a, after the "Business" cellular identifier was selected for device 500a in FIG. 8B. As shown in FIG. 8C, while the first electronic device 500a presents the user interface illustrated in FIG. 8C, the first electronic device 500a is in communication with the second electronic device 500b. The touch screen 504 displays a first affordance 804a selectable to communicate with a first contact (e.g., "Mary Smith") associated with the "Business" cellular identifier, a second affordance 804b selectable to communicate with a second contact (e.g., "Alex Garcia") associated with the "Business" cellular identifier, and a third affordance 804c selectable to communicate with a third contact (e.g., "John Brown") associated with the "Personal" cellular identifier. While the first electronic device 500a is in communication with the second electronic device 500b, all of the affordances 804a-c are optionally selectable to initiate a phone call with the associated contact regardless of which cellular identifier the contact is associated with.

FIG. 8D illustrates the first electronic device 500a presenting a user interface for initiating a phone call with one of a plurality of contacts whose contact information is stored on the first electronic device 500a. As shown in FIG. 8D, while the first electronic device 500a presents the user interface illustrated in FIG. 8D, the first electronic device 500a is not in communication with the second electronic device 500b. The touch screen 504 displays a first affordance 804a selectable to communicate with a first contact (e.g., "Mary Smith") associated with the "Business" cellular identifier and a second affordance 804b selectable to communicate with a second contact (e.g., "Alex Garcia") associated with the "Business" cellular identifier. The third affordance 804d that was previously selectable to communicate with the third contact (e.g., "John Brown"), who is associated with the "Personal" cellular identifier, has a deactivated (e.g., greyed out) appearance. While the first electronic device 500a is not in communication with the second electronic device 500b, the "Personal" cellular identifier is optionally unavailable to the first electronic device 500a. As shown in FIG. 8D, the user selects (e.g., with contact 803) the third affordance 804d associated with the third contact.

In some embodiments, in response to the user's selection of a contact associated with a cellular identifier that is presently unavailable to the first electronic device 500a, the first electronic device presents a warning user interface 806a as illustrated in FIG. 8E. The warning user interface 806a optionally includes a message indicating which cellular identifier the selected contact is associated with and an indication that the phone call cannot be initiated (e.g., indicating that the default cellular identifier for the selected contact is "Personal", but that device 500a is currently only able to communicate using the "Business" cellular identifier). In some embodiments, in response to the user's selection of a contact associated with a cellular identifier that is presently unavailable to the first electronic device 500a, the first electronic device instead presents a warning user interface 806b as illustrated in FIG. 8F. The warning user interface 806b in FIG. 8F includes a message indicating which cellular identifier the selected contact is associated with, and affordance 808 selectable to use a different cellular identifier to call the selected contact (e.g., using the cellular identifier that is currently active on device 500a, different than the cellular identifier associated with the selected contact).

FIGS. 8G-H illustrate the first electronic device 500a presenting a settings user interface. The settings user interface includes a first affordance 810a selectable to present clock settings, a second affordance 810b selectable to present cellular settings, and a third affordance 810c selectable to transition the first electronic device 500a into airplane mode (e.g., a mode in which the cellular identifier configured on device 500a is disabled). The second affordance 810b includes an indication (e.g., the icon with the "B") of the cellular identifier active on the first electronic device 500a. As shown in FIG. 8H, the user selects (e.g., with contact 803) the second affordance 810b for presenting the cellular settings for device 500a.

FIG. 8I illustrates the first electronic device 500a presenting a cellular settings user interface in response to the selection in FIG. 8H. As shown in FIG. 8I, while the first electronic device 500a presents the cellular settings user interface, the first electronic device 500a is not connected to the second electronic device 500b. The cellular settings user interface optionally presents an option to change which cellular identifier the first electronic device 500a has access to when it is not connected to the second electronic device 500b. The user interface includes a first affordance 812a selectable to use a first cellular identifier ("Personal") with the first electronic device 500a and a second affordance 812b selectable to use a second cellular identifier ("Business") with the first electronic device 500a. However, while the first electronic device 500a is not connected to the second electronic device 500b, the first affordance 812a associated with the first cellular identifier ("Personal") is deactivated, as indicated by a greyed out appearance.

FIG. 8J illustrates the first electronic device 500a presenting the user interface for initiating a phone call, which includes the same content as the user interface described above with reference to FIG. 8D. While device 500a is presenting the user interface in FIG. 8J, device 500a is in communication with device 500b. As shown in FIG. 8J, the user selects (e.g., with contact 803) the first affordance 804a associated with the first contact ("Mary Smith"). The first contact is associated with the "Business" cellular identifier, which is available to the first electronic device 500a even when the first electronic device 500a is not connected to the second electronic device 500b, meaning the first electronic device 500a would be able to complete the phone call even if the first electronic device 500a was not connected to the second electronic device 500b.

In response to the selection of the first affordance 804a, the first electronic device 500a initiates a phone call with the first contact ("Mary Smith") using the "Business" cellular identifier. While on the phone call with the first contact, the first electronic device 500a presents the phone user interface illustrated in FIG. 8K. The phone user interface includes an indication 814 of the contact that is being called, an indication 816 of the cellular identifier being used by the first electronic device 500a to make the phone call, an affordance 818 selectable to end the phone call, and an affordance 820 selectable to add another contact to the phone call. As shown in FIG. 8L, the user selects (e.g., with contact 803) the affordance 820 for adding another contact to the phone call.

In response to the selection, the first electronic device 500a presents a first affordance 822a selectable to add a first contact ("Alex Garcia") to the phone call and a second affordance 822b selectable to add a second contact ("John Brown") to the phone call, as illustrated in FIG. 8M. As shown in FIG. 8M, the first contact is associated with the "Business" cellular identifier and the second contact is associated with the "Personal" cellular identifier. The user selects (e.g., with contact 803) the second affordance 822b for adding the second contact to the phone call—a contact associated with the "Personal" cellular identifier while the call that is currently in progress is being performed using the "Business" cellular identifier.

In response to the selection in FIG. 8M, the first electronic device 500a presents a user interface for confirming the user's selection, as shown in FIG. 8N. The user interface includes an indication 824 of the current phone call, which lists the contact being called, the cellular identifier being used for the phone call ("B"), and the duration of the phone call. The user interface further includes a message 826 informing the user that the default cellular identifier for the selected contact is not the same as the cellular identifier being used for the phone call (e.g., the cellular identifier for the call is "B", while the default cellular identifier for the desired contact to be added to the phone call is "P"), and an affordance 828 selectable to add the selected contact to the ongoing call with the cellular identifier being used for the phone call rather than the cellular identifier associated with the selected contact.

FIG. 8O illustrates the first electronic device 500a presenting a home screen user interface (e.g., a wake screen user interface, such as a watch face user interface that is displayed by device 500a when it first exits a low power/display-off mode). The home screen user interface includes an indication 830 of the current time. While presenting the home screen user interface, the first electronic device 500a detects an upward swipe from the bottom edge of touch screen 504 towards the middle of touch screen 504 (e.g., with contact 803).

In response to the upward swipe, the first electronic device 500*a* presents a control user interface, as illustrated in FIG. 8P. The control user interface includes an indication 832*a* of a signal strength of the "Business" cellular identifier, an indication 832*b* of a signal strength of the "Personal" cellular identifier, a location services indication 834, a cellular settings affordance 836*a*, an airplane mode affordance 836*b*, a ping phone affordance 836*c*, a Wi-Fi affordance 836*d*, a battery affordance 836*e*, and a flashlight affordance 836*f*. The first electronic device 500*a* is able to perform a number of operations (e.g., navigating to a cellular settings user interface, configuring the Wi-Fi, activating airplane mode, viewing battery status and settings, generating an indication of the second electronic device 500*b*, and launching a flashlight application) in response to user selection of one of the affordances presented in the control user interface. As shown in FIG. 8P, the first electronic device 500*a* is connected to the second electronic device 500*b* while presenting the user interface illustrated in FIG. 8P. The cellular settings affordance 836*a* indicates that the first electronic device 500*a* is in communication with the second electronic device 500*b*. The ping phone affordance 836*c* is selectable to generate an indication (e.g., a sound or a tactile indication) on the second electronic device 500*b*.

FIG. 8Q illustrates the control center user interface while the first electronic device 500*a* is in communication with the second electronic device 500*b*. The control center user interface illustrated in FIG. 8Q is substantially the same as the control center user interface illustrated in FIG. 8P, except as otherwise noted here. The indication 832*b* of the "Personal" cellular identifier indicates that the first electronic device 500*a* does not have access to the "Personal" cellular identifier, and the indication 832*b* does not include an indication of the signal level of the "Personal" cellular identifier. The cellular settings affordance 836*a* indicates that the first electronic device 500*a* has access to the "Business" cellular identifier only. The ping phone affordance 836*c* is inactive and has a greyed out appearance.

FIGS. 8R-8U illustrate user interfaces of the second electronic device 500*b* for setting up and changing cellular identifier settings of the first electronic device 500*a* according to some embodiments of the disclosure. FIG. 8R illustrates a user interface for configuring the first electronic device 500*a* using the second electronic device 500*b*. The user interface includes a set up message 838 and an affordance 840 selectable to continue the process of setting up the first electronic device 500*a* on the second electronic device 500*b*. The user interface in FIG. 8R is optionally a user interface of an application on device 500*b* that is an application for controlling various aspects of the device 500*a*, including cellular identifier settings for device 500*a*, power settings for device 500*a*, time settings for device 500*a*, etc. In response to the selection in FIG. 8R, the second electronic device 500*b* presents one or more user interfaces for setting up the first electronic device 500*a*, such as the user interface shown in FIG. 8S.

FIG. 8S illustrates the second electronic device 500*b* presenting a user interface for associating a cellular identifier with the first electronic device 500*a*. The user interface includes a first affordance 842*a* selectable to add a first cellular identifier ("Personal") to the first electronic device 500*a*, a second affordance 842*b* selectable to add a second cellular identifier ("Business") to the first electronic device 500*b*, and a third affordance 844 selectable to forgo selecting a cellular identifier for the first electronic device 500*a* for the time being. As shown in FIG. 8S, the user selects (e.g., with contact 803) the second affordance 842*b* for adding the "Business" cellular identifier to the first electronic device 500*a*.

FIG. 8T illustrates a first electronic device 500*a* settings user interface presented on the second electronic device 500*b*. As shown in FIG. 8T, the user interface includes a plurality of affordances selectable to view or change various settings of the first electronic device 500*a* on the second electronic device 500*b*, including an affordance 846 for viewing and changing the cellular identifier settings of the first electronic device 500*a*. The affordance 846 includes an indication (e.g. the icon with the "B") of the cellular identifier (e.g., the "Business" cellular identifier) that is active on the first electronic device 500*a*. As shown in FIG. 8T, the user selects (e.g., with contact 803) the affordance 846 for viewing and changing the cellular identifier settings of the first electronic device 500*a*.

In response to the user's selection in FIG. 8T, the second electronic device 500*b* presents a cellular settings user interface, as illustrated in FIG. 8U. The user interface includes an indication 848 of the cellular identifier that is active on the first electronic device 500*a* (e.g., the "Business" cellular identifier) and an indication 850 of a cellular identifier that is not currently active on the first electronic device 500*b* (e.g., the "Personal" cellular identifier). The indications 848 and 850 are selectable to present more information about the respective cellular identifiers, such as the carrier associated with the cellular identifiers and the cellular usage of the cellular identifiers over a predetermined amount of time (e.g., one billing cycle) and settings of the cellular identifiers, such as an affordance for activating the "Personal" cellular identifier on the first electronic device 500*a*.

FIGS. 9A-9H are flow diagrams illustrating a method 900 of accessing, on a first electronic device, a first cellular identifier regardless of the first electronic device's connection to a second electronic device and of accessing, on the first electronic device, a second cellular identifier when the first electronic device is connected to the second electronic device in accordance with some embodiments of the disclosure. The method 900 is optionally performed at an electronic device such as device 100, device 300, device 500 as described above with reference to FIGS. 1A-1B, 2-3, 4A-4B and 5A-5H. Some operations in method 900 are, optionally combined and/or order of some operations is, optionally, changed.

As described below, the method 900 provides ways to access, on a first electronic device, a first cellular identifier regardless of the first electronic device's connection to a second electronic device and to access, on the first electronic device, a second cellular identifier when the first electronic device is connected to the second electronic device. The method reduces the cognitive burden on a user when interaction with a user interface of the device of the disclosure, thereby creating a more efficient human-machine interface. For battery-operated electronic devices, increasing the efficiency of the user's interaction with the user interface conserves power and increases the time between battery charges.

In some embodiments, a first electronic device (e.g., electronic device 500*a*) in communication with one or more input devices (e.g., a mobile device, such as a wearable device, having a touch screen) receives (902), at the first electronic device, an input (e.g., selection of affordance 804*d* with contact 803 in FIG. 8D) associated with a function (e.g., a request to compose or send a text message or initiate a phone call) that requires the use of a respective cellular identifier, wherein the first electronic device is associated with a second electronic device (e.g., electronic device 500b) that is enabled to use both a first cellular identifier and a second cellular identifier (904). The second electronic device is optionally a mobile device (e.g., a tablet, a smartphone, a media player, or a wearable device) or a computer with which the first electronic device is paired and is in communication range. For example, the first electronic device (e.g., a smart watch) is optionally in communication with the second electronic device (e.g., a smart phone) when the first electronic device is paired with the second electronic device and is able to maintain a communication channel with the second electronic device (e.g., is within Bluetooth range, within Wi-Fi range, etc). In some embodiments, the first electronic device is enabled to use the first cellular identifier independently of the second electronic device and is not enabled to use the second cellular identifier independently of the second electronic device (906). The first cellular identifier is optionally affiliated with or installed on the first electronic device and the second cellular identifier is affiliated with or installed on the second electronic device. When the first electronic device is in communication with the second electronic device (e.g., via Bluetooth, Wi-Fi, etc), the first electronic device is able to perform functions with the second cellular identifier via the connection between the first electronic device and the second electronic device.

In some embodiments, in response to receiving the input associated with the function that requires the use of the respective cellular identifier (908), such as selection of affordance 804a with contact 803 in FIG. 8J, in accordance with a determination that the function requires the use of the first cellular identifier (e.g., the "Business" cellular identifier) (e.g., performing a function that the first cellular identifier is setup to perform), the first electronic device performs (910) the function without regard to whether or not the first electronic device is in communication with the second electronic device, such as in FIG. 8K. In some embodiments, the first electronic device is able to perform the function with the first cellular identifier without the use of the second electronic device. For example, if a contact stored on the first electronic device is associated with the first cellular identifier, calling the contact requires the use of the first cellular identifier. In accordance with a determination that the function (e.g., initiating a phone call with "John Brown" in response to selection of affordance 804d in FIG. 8D) requires the use of the second cellular identifier (e.g., the "Personal" cellular identifier) and the first electronic device is in communication with the second electronic device, the first electronic device performs (912) the function. In the example shown in FIG. 8D, the first electronic device 500a and second electronic device 500b are not in communication with one another. If, instead, the first electronic device 500a and the second electronic device 500b were in communication with each other, in response to the selection (e.g., with contact 1003) of the affordance 804d, the second electronic device 500a initiates the communication in a manner similar to the example illustrated in FIGS. 8J-K, for example. In some embodiments, both the first cellular identifier and the second cellular identifier are available to the first electronic device when the first electronic device is in communication with the second electronic device. In some embodiments, the first electronic device is able to perform one or more functions using the second cellular identifier by communicating with the second electronic device (e.g., via Bluetooth, Wi-Fi, etc). For example, if the second cellular identifier is configured for performing voice and messaging functions and the first cellular identifier is configured for performing data functions only, making a phone call requires the use of the second cellular identifier. In accordance with a determination that the function (e.g., initiating a phone call with "John Brown" in response to selection of affordance 804a) requires the use of the second cellular identifier (e.g., the "Personal" cellular identifier) and the first electronic device is not in communication with the second electronic device (e.g., the second electronic device is off, in airplane mode, out of wireless communication range), such as in FIG. 8D, the first electronic device forgoes (914) performing the function, such as in FIG. 8E. In some embodiments, the first electronic device optionally presents a visual indication (e.g., text, an image, etc.) that it is unable to perform the desired function while it is not in communication with the second electronic device. In some embodiments, the first electronic device presents an option to perform the function using the first cellular identifier instead. For example, if a contact stored on the first electronic device is affiliated with the second cellular identifier and the user attempts to call the contact, the first electronic device presents a message that the contact cannot be called or presents the option to call the contact using the first cellular identifier instead.

The above-described manner performing a function at the first electronic device with the first cellular identifier regardless of whether or not the first electronic device is in communication with the second electronic device and performing a function with the second cellular identifier when the first electronic device is in communication with the second electronic device allows the first electronic device to perform functions using the second cellular identifier while communicating with the second electronic device, which simplifies interactions between the user and the device and enhances the operability of the device (e.g., by performing operations associated with both cellular identifiers without express user input to switch between cellular identifiers), which, additionally, reduces power usage and improves battery life of the device by enabling the user to use the device more quickly and efficiently.

In some embodiments, the first electronic device receives (916), at the first electronic device, an input (e.g., selection of affordance 804d with contact 803) for performing a function (e.g., a request to compose or send a text message or initiate a phone call) that is associated with a default respective cellular identifier. One of the first cellular identifier and the second cellular identifier is optionally configured to perform the function by default. For example, the function is calling a particular contact stored in a contacts list on the first electronic device and, when the user initiates a phone call with the particular contact, the first electronic device places the phone call using the respective cellular identifier by default.

In some embodiments, in response to receiving the input (e.g., selection of affordance 804d with contact 803 in FIG. 8D) for performing the function that is associated with the default respective cellular identifier (918) (e.g., a touch input received at the touch screen of the first electronic device, a voice input received at a microphone of the first electronic device, or another input), in accordance with a determination that the default respective cellular identifier is the second cellular identifier (e.g., the "Personal" cellular identifier) and the first electronic device is in communication with the second electronic device, the first electronic device performs (920) the function using the second cellular identifier (e.g., the first electronic device is able to perform the function using the second cellular identifier via its connection to the second electronic device.) In the example illustrated in FIG. 8D, the first electronic device 500*a* and the second electronic device 500*b* are not in communication with each other. If, instead, the first electronic device 500*a* and the second electronic device 500*b* were in communication with each other, selection of the affordance 804*d* would optionally cause the first electronic device 500*a* to initiate the communication, in a manner similar to the example illustrated in FIGS. 8J-K. In accordance with a determination that the default respective cellular identifier is the second cellular identifier and the first electronic device is in not communication with the second electronic device, such as in FIG. 8D, the first electronic provides (922) a warning that the second cellular identifier is not active on the first electronic device, such as in FIG. 8E. In some embodiments, the first electronic device is not able to perform the function with the second cellular identifier without being connected to the second electronic device. In some embodiments, after displaying the warning that the second cellular identifier is not active on the first electronic device, the first electronic device presents an affordance selectable to perform the function with the first cellular identifier.

The above-described manner of warning the user when the second cellular identifier is not available on the first electronic device allows the first electronic device to communicate to the user why a function that is normally performed with the second cellular identifier is not being performed which simplifies interactions between the user and the device and enhances the operability of the device (e.g., by providing the user with a specific error message so the user is able to avoid using a particular cellular identifier when they do not intend to use that cellular identifier), which, additionally, prevents the electronic device from revealing information about the particular cellular identifier (e.g., allowing a contact to know the phone number associated with the particular cellular identifier which is not the cellular identifier associated with the contact) and prevents the electronic device from using a particular cellular identifier when the user does not intend to, which in some instances incurs a usage fee from the service provider of the cellular identifier.

In some embodiments, providing the warning that the second cellular identifier is not active on the first electronic device includes providing an option (e.g., button 808 in FIG. 8F) to use the first cellular identifier to perform the function that is associated with the second cellular identifier (924). The first electronic device optionally presents a message indicating that the second cellular identifier is unavailable and an option to perform the function with the first cellular identifier instead. In some situations, the user may not want to perform the function with the first cellular identifier for privacy reasons (e.g., the user does not want a particular contact to know the phone number of the first cellular identifier so they choose not place a phone call to that contact using the first cellular identifier).

The above-described manner of providing the user the option to perform a function with the first cellular identifier when the second cellular identifier is not available allows the first electronic device to provide a way for the user to perform functions associated with the second cellular identifier even when it is not available, which simplifies interactions between the user and the device and enhances the operability of the device (e.g., by presenting the option to perform the function with the first cellular identifier within the user interface for performing the function, rather than requiring the user change the cellular identifier settings to configure the first cellular identifier to perform the function), which, additionally, reduces power usage and improves battery life of the device by enabling the user to use the device more quickly and efficiently.

In some embodiments, in accordance with a determination that the first cellular identifier is designated, in a settings user interface for the first electronic device displayed on the second electronic device, such as in FIG. 8U, for use with the first electronic device, the first electronic device is enabled to use the first cellular identifier independently of the second electronic device and is not enabled to use the second cellular identifier independently of the second electronic device (926). The user is optionally able to control one or more settings of the first electronic device from the second electronic device, including designating a cellular identifier that the first electronic device is able to use independently from the second electronic device. In some embodiments, when the first cellular identifier is designated to be used by the first electronic device independently from the second electronic device, the first electronic device is automatically configured not to use the second cellular identifier independently from the second electronic device. In accordance with a determination that the second cellular identifier is designated, in the settings user interface for the first electronic device displayed on the second electronic device, such as in FIG. 8U, for use with the first electronic device, the first electronic device is enabled to use the second cellular identifier independently of the second electronic device and is not enabled to use the first cellular identifier independently of the second electronic device (928). In some embodiments, when the second cellular identifier is designated to be used by the first electronic device independently from the second electronic device, the first electronic device is automatically configured not to use the first cellular identifier independently from the second electronic device.

The above-described manner of providing an indication of which cellular identifier is activated on the first electronic device within a user interface of the second electronic device allows the first electronic device to be configured by the user from the second electronic device, which simplifies interactions between the user and the device and enhances the operability of the device (e.g., the user may prefer to perform functions on the second electronic device), which, additionally, reduces power usage and improves battery life of the device by enabling the user to use the device more quickly and efficiently.

In some embodiments, the first electronic device receives (930), via the one or more input devices, an input (e.g., a selection with a touch screen, a voice input, etc. such as selection of option 810*b* with contact 803 in FIG. 8H) corresponding to a request to view a cellular settings user interface for the first electronic device. The cellular settings user interface for the first electronic device is optionally included in a settings application or user interface that includes other settings for the first electronic device, such as date and time settings, display settings, sound settings, etc.

In some embodiments, in response to receiving the input corresponding to the request to view the cellular settings user interface, the first electronic device displays (932) the cellular settings user interface, such as in FIG. 8I, which includes: in accordance with a determination that the first electronic device is in communication with the second electronic device (e.g., via Wi-Fi, Bluetooth, etc), an indication that the first cellular identifier is active on the first electronic device (e.g., the indication 812*a* of the "Personal"

cellular identifier is presented with the active appearance of the indication 812*b* of the "Business" cellular identifier), and an indication that the second cellular identifier is active on the first electronic device (e.g., indication 812*b*) (934). In the example illustrated in FIG. 8I, the first electronic device 500*a* and the second electronic device 500*b* are not in communication with one another and the indication 812*a* of the "Personal" cellular identifier is greyed out. If, instead, the first electronic device 500*a* and the second electronic device 500*b* were in communication with one another, the indication 812*a* of the "Personal" cellular identifier would have the same non-greyed out appearance that the indication 812*b* of the "Business" cellular identifier has, for example. In some embodiments, the indication that the first cellular identifier is active on the first electronic device and the indication that the second cellular identifier is active on the first electronic device optionally include text or an image indicating the active status of the respective cellular identifier and optionally include an indication of the signal strength of the respective cellular identifier. In accordance with a determination that the first electronic device is not in communication with the second electronic device, as illustrated in FIG. 8I (e.g., the second electronic device is off, is in airplane mode, or is a distance from the first electronic device that exceeds the range of the communication channel between the first electronic device and the second electronic device), the cellular settings user interface includes the indication (812*b*) that the first cellular identifier is active on the first electronic device (e.g., text or an image that indicates the active status of the first cellular identifier). In some embodiments, the indication further includes an indication of a signal strength of the first cellular identifier. The cellular settings user interface optionally includes an indication (812*a*) that the second cellular identifier is not active on the first electronic device (936) (e.g., text or an image indicating the inactive status of the second cellular identifier), as shown in FIG. 8I. In some embodiments, the first electronic device further displays a separate indication that the second electronic device is not in communication with the first electronic device. In some embodiments, the user pays for access to one cellular identifier on the first electronic device 500*a* and is able to change which cellular identifier is associated with the first electronic device 500*a* when the first electronic device 500*a* is in communication with the second electronic device 500*b*, but not when the first electronic device 500*a* is not in communication with the second electronic device. In some embodiments, the user pays for access to two cellular identifiers on the first electronic device 500*a* and is able to change which cellular identifier is associated with the first electronic device 500*a* regardless of whether or not the first electronic device 500*a* is in communication with the second electronic device 500*b*.

The above-described manner of indicating the active or inactive statuses of the first cellular identifier and the second cellular identifier in a cellular settings user interface allows the first electronic device to communicate to the user which cellular identifiers are available for performing functions on the first electronic device, which simplifies interactions between the user and the device and enhances the operability of the device (e.g., presenting the active or inactive statuses of the cellular identifiers in a settings user interface allows the user to know the statuses of the cellular identifiers before making changes to the settings), which, additionally, reduces power usage and improves battery life of the device by enabling the user to use the device more quickly and efficiently.

In some embodiments, the input associated with the function that requires the use of the respective cellular identifier is received while the first electronic device is displaying a representation of the respective cellular identifier (938) (e.g., a selectable affordance for performing the function includes or is displayed proximate to a representation of the respective cellular identifier, such as an indication of the respective cellular identifier similar to the indication described above with reference to method 700), such as the "P" indication of the "Personal" cellular identifier included in indication 804*d* in FIG. 8D, in accordance with a determination that the respective cellular identifier is available for performing the function on the first electronic device, such as in FIG. 8C the representation of the respective cellular identifier (e.g., the "P" indication of the "Personal" cellular identifier included in the indication 804*c* in FIG. 8C) is displayed with a first visual characteristic (940) (e.g., with text, an icon, a color scheme, etc. that indicates that the respective cellular identifier is available). For example, the representation of the respective cellular identifier is optionally displayed in color. In accordance with a determination that the respective cellular identifier is not available for performing the function on the first electronic device, such as in FIG. 8D the representation of the respective cellular identifier (e.g., included in indication 804*d*) is displayed with a second visual characteristic, different than the first visual characteristic (942) (e.g., with text, an icon, a color scheme, etc. that indicates that the respective cellular identifier is not available). For example, the representation of the respective cellular identifier is optionally displayed in gray.

The above-described manner of changing a visual characteristic of the respective cellular identifier when it is not available while the first electronic device receives an input for performing a function with the respective cellular identifier allows the first electronic device to convey to the user whether or not the respective cellular identifier is available in a user interface for performing a function with the respective cellular identifier, which simplifies interactions between the user and the device and enhances the operability of the device (e.g., by presenting the indication of the status of the respective cellular identifier in a situation where the user may wish to use the respective cellular identifier), which, additionally, reduces power usage and improves battery life of the device by enabling the user to use the device more quickly and efficiently).

In some embodiments, the first electronic device receives (944), via the one or more input devices, a request to display a user interface that includes one or more representations associated with one or more contacts (e.g., a recent communications user interface that includes representations of recent communications with contacts, such as phone calls or text messages, or a contacts user interface that includes representations of contacts on the first electronic device), such as the use interface illustrated in FIG. 8D.

In some embodiments, in response to receiving the request to display the user interface, the first electronic device displays (946) the user interface, such as the user interface illustrated in FIG. 8D, which includes a first representation (e.g., 804*a*, *b*, or *d*) associated with a first contact (e.g., a representation of a message or a call sent to or received from the first contact). For example, a messages user interface includes a representation of a messaging conversation with the first contact. In accordance with a determination that the first representation (e.g., 804*a* or 804*b*) associated with the first contact is associated with a cellular identifier that is active on the first electronic device (e.g., the "Business" cellular identifier), the first representation is displayed with a first visual characteristic (948). In some embodiments, the first representation associated with the first contact is displayed with a visual characteristic (e.g., color, pattern, text, or an image) that indicates that the cellular identifier associated with the first contact is active on the first electronic device. For example, the representation associated with the first contact is displayed in full color. In accordance with a determination that the first representation (e.g., 804*d*) associated with the first contact is associated with a cellular identifier that is not active on the first electronic device (e.g., the "Personal" cellular identifier), the first representation is displayed with a second visual characteristic, different than the first visual characteristic (950). In some embodiments, the first representation associated with the first contact is displayed with a visual characteristic (e.g., color, pattern, text, or an image) that indicates that the cellular identifier associated with the first contact is not active on the first electronic device. For example, the representation associated with the first contact is displayed in gray.

The above-described manner of changing the appearance of a representation of a contact depending on the active or inactive status of a cellular identifier associated with the contact allows the first electronic device to convey to the user whether it is able to perform a communication operation with the contact using the cellular identifier associated with the contact, which simplifies interactions between the user and the device and enhances the operability of the device (e.g., by presenting the status of the cellular identifier in the user interface for using the cellular identifier to communicate with a contact, rather than requiring the user figure out the status of the cellular identifier in some other way), which, additionally, reduces power usage and improves battery life of the device by enabling the user to use the device more quickly and efficiently.

In some embodiments, the user interface further includes a second representation (804*d*) associated with a second contact (952) (e.g., a representation of a message or a call sent to or received from the first contact). For example, a messages user interface includes a representation of a messaging conversation with the first contact. The first representation (804*a*) associated with the first contact is associated with the cellular identifier (e.g., "Business") that is active on the first electronic device, and the first representation is displayed with the first visual characteristic (954) (e.g., a color, shape, image, or text that indicates the active status of the cellular identifier that is active on the first electronic device). For example, the first representation (804*a*) associated with the first contact is displayed in color. The second representation (804*d*) associated with the second contact is associated with the cellular identifier (e.g., "Personal") that is not active on the first electronic device, and the second representation (804*d*) is displayed with the second visual characteristic (956) (e.g., a color, shape, image, or text that indicates the inactive status of the cellular identifier that is not active on the first electronic device). For example, the second representation associated with the second contact is displayed in gray.

The above-described manner of changing the appearance of a representation of a contact depending on the active or inactive status of a cellular identifier associated with the contact allows the first electronic device to convey to the user whether it is able to perform a communication operation with the contact using the cellular identifier associated with the contact, which simplifies interactions between the user and the device and enhances the operability of the device (e.g., by presenting the status of the cellular identifier in the user interface for using the cellular identifier to communicate with a contact, rather than requiring the user figure out the status of the cellular identifier in some other way), which, additionally, reduces power usage and improves battery life of the device by enabling the user to use the device more quickly and efficiently.

In some embodiments, during a setup process for the first electronic device, the first electronic device receives (958), via the one or more input devices, an input (e.g., contact 803 in FIG. 8B) for activating, on the first electronic device, a respective cellular identifier of the first cellular identifier and the second cellular identifier that are active on the second electronic device. While setting up the first electronic device for subsequent use, the user is prompted to select one of the first cellular identifier and the second cellular identifier to activate on the first electronic device for use on the first electronic device even when the first electronic device and the second electronic device are not in communication with each other.

In some embodiments, in response to receiving the input (e.g., detecting contact 803 in FIG. 8B) for activating the respective cellular identifier on the first electronic device (960), in accordance with a determination that the respective cellular identifier is the first cellular identifier (962), the first electronic device enables (964) the first electronic device to use the first cellular identifier (e.g., the "Business" cellular identifier) independently of the second electronic device, such as in FIGS. 8J-8K. The first electronic device is optionally configured to use the first cellular identifier even when the first electronic device is not in communication with the second electronic device. The first electronic device optionally does not enable (966) the first electronic device to use the second cellular identifier (e.g., the "Personal" cellular identifier) independently of the second electronic device, as shown in FIGS. 8D-8F. The first electronic device is optionally able to use the second cellular identifier when the first electronic device and the second electronic device are in communication with each other, but not when the first electronic device and the second electronic device are not in communication with each other. In accordance with a determination that the respective cellular identifier is the second cellular identifier (968), the first electronic device enables (970) the first electronic device to use the second cellular identifier independently of the second electronic device. The first electronic device is optionally configured to use the second cellular identifier even when the first electronic device is not in communication with the second electronic device. The first electronic device optionally does not enable (972) the first electronic device to use the first cellular identifier independently of the second electronic device. In some embodiments, the first electronic device is able to use the first cellular identifier when the first electronic device and the second electronic device are in communication with each other, but not when the first electronic device and the second electronic device are not in communication with each other. Although the first electronic device 500*a* is able to use the "Business" cellular identifier independent of its connection to the second electronic device 500*b* in the example illustrated with reference to FIGS. 8A-8U, if, instead of selecting the "Business" cellular identifier, in some embodiments, the "Personal" cellular identifier is selected for use by the first electronic device 500*a* independent of its connection to the second electronic device 500*b*.

The above-described manner of presenting a user interface on the second electronic device for selecting a cellular identifier to activate on the first electronic device allows the first electronic device to be configured from the second electronic device, which simplifies interactions between the user and the device and enhances the operability of the device (e.g., the user may prefer to use the second electronic device for changing settings), which, additionally, reduces power usage and improves battery life of the device by enabling the user to use the device more quickly and efficiently.

In some embodiments, during a communication with a first contact using a first respective cellular identifier (e.g., during a phone call with a first contact using the first respective cellular identifier), the first electronic device receives (974), via the one or more input devices, a request (e.g., selection of the "add" option 820 with contact 803) in FIG. 8L) to add a second contact to the communication (e.g., a request to join the second contact to the phone call). In some embodiments, the first respective cellular identifier is the default cellular identifier of the first electronic device, the default cellular identifier for voice and messaging functions, the default cellular identifier for the first contact, or was selected by the user to be used to make the phone call. As another example, the user adds the second contact to a messaging conversation with the first contact.

In some embodiments, in response to receiving the request to add the second contact to the communication (976), in accordance with a determination that the second contact is associated with the first respective cellular identifier (e.g., the first respective cellular identifier is the default cellular identifier of the first electronic device, the default cellular identifier for voice and messaging functions, or the default cellular identifier for the second contact), the first electronic device adds (978) the second contact to the communication using the first respective cellular identifier (e.g., calling the second contact to add them to a conference phone call with the user and the first contact or adding the second contact to a messaging conversation between the first contact and the user). Although in the example illustrated in FIG. 8M, the use selects (e.g., with contact 803) the option 822b to add "John brown" to the call, the user is also able to select the option 822a to add "Alex Garcia" to the call. If the user were to select the option 822a to add "Alex Garcia" to the call, in response to the selection the first electronic device 500a optionally initiates a phone call to "Alex Garcia" to add the contact to the phone call with "Mary Smith" without presenting the warning illustrated in FIG. 8N because "Alex Garcia" and "Mary Smith" are both associated with the "Business" cellular identifier. In accordance with a determination that the second contact is associated with a second respective cellular identifier (e.g., the second respective cellular identifier is the default cellular identifier of the first electronic device, the default cellular identifier for voice and messaging functions, or the default cellular identifier for the second contact) different than the first respective cellular identifier (980), such as in FIG. 8N, the first electronic device forgoes (982) adding the second contact to the communication, and the first electronic device provides (984) a warning that the first respective cellular identifier will be used to communicate with the second contact if the second contact is added to the communication (e.g., displaying text or an image, presenting a sound or a haptic, etc. indicating that, although the second cellular identifier is the default cellular identifier for communicating with the second contact, the first cellular identifier will be used for the communication), such as in FIG. 8N. In some situations, the user will not want to use the first cellular identifier to communicate with the second contact for privacy reasons, such as not wanting the second contact to know the phone number associated with the first cellular identifier.

The above-described manner of warning the user when the user requests to add a contact to a communication that is being executed using a cellular identifier not associated with the contact allows the first electronic device to inform the user how the first electronic device is performing communication functions with various contacts, which simplifies interactions between the user and the device and enhances the operability of the device (e.g., by providing the user with a specific warning message so the user is able to avoid using a particular cellular identifier to call a contact that is not associated with the particular cellular identifier), which, additionally, prevents the electronic device from revealing information about the particular cellular identifier (e.g., allowing a contact to know the phone number associated with the particular cellular identifier which is not the cellular identifier associated with the contact) and prevents the electronic device from using a particular cellular identifier when the user does not intend to, which in some instances incurs a usage fee from the service provider of the cellular identifier.

It should be understood that the particular order in which the operations in FIGS. 9A-9H have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1100, 1300, and 1500) are also applicable in an analogous manner to method 900 described above with respect to FIGS. 9A-9H. For example, the ways the first electronic device interacts with the cellular identifiers associated with the second electronic device described above with reference to method 900 optionally have one or more of the characteristics of the cellular identifier settings user interfaces, indications of cellular identifiers, operations performed with cellular identifiers, etc., described herein with reference to other methods described herein (e.g., methods 700, 1100, 1300, and 1500). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 9A-9H are, optionally, implemented by components depicted in FIGS. 1A-1B. For example, displaying operations 932 and 946 and receiving operations 902, 916, 930, 944, 958, and 974, are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Presenting Visual Indications of Cellular Identifiers in Communication-Related User Interfaces Users interact with electronic devices in many different manners, including communicating with other electronic devices using network connections. In some embodiments, the electronic device displays an indication of which cellular identifier has been used or will be used to complete a communication function. The embodiments described below provide ways in which an electronic device presents a visual indication of a cellular identifier in communication-related user interfaces. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 10A-10MM illustrate exemplary ways in which an electronic device presents visual indications of cellular identifiers in relation to communication functions in accordance with some embodiments of the disclosure. The embodiments in these figures are used to illustrate the processes described below, including the processes described with reference to FIGS. 11A-11Q.

Figure 10A:
FIGS. 10A-10MM illustrate exemplary ways in which an electronic device presents visual indications of cellular identifiers in relation to communication functions in accordance with some embodiments of the disclosure.

FIG. 10A illustrates exemplary device 500 with touch screen 504, such as described with reference to FIGS. 5A-5H. Touch screen 504 optionally displays one or more user interfaces that include various content. In the example illustrated in FIG. 10A, touch screen 504 displays a user interface for configuring the electronic device 500 to present voicemails associated with the cellular identifiers available to device 500. As shown in legend 1002 of FIG. 10A, while the electronic device 500 presents the user interface for configuring the electronic device to present voicemails, a "Personal" cellular identifier denoted by an indicator with a "P" is configured as the default number for phone and SMS, a "Business" cellular identifier denoted by an indicator with a "B" is configured as the secondary number for phone and SMS, and a "Travel" cellular identifier denoted by an indicator with a "T" is inactive.

The user interface illustrated in FIG. 10A includes a first affordance 1004a selectable to initiate a process to set up voicemail associated with a first cellular identifier (e.g., a "Personal" cellular identifier denoted by an indicator with a "P") and a second affordance 1004b selectable to initiate a process to set up voicemail associated with a second cellular identifier (e.g., a "Business" cellular identifier denoted by an indicator with a "B"). As shown in FIG. 10A, the user selects (e.g., with contact 1003) the second affordance 1004 to initiate the process to set up the voicemail associated with the second cellular identifier.

Figure 10B:
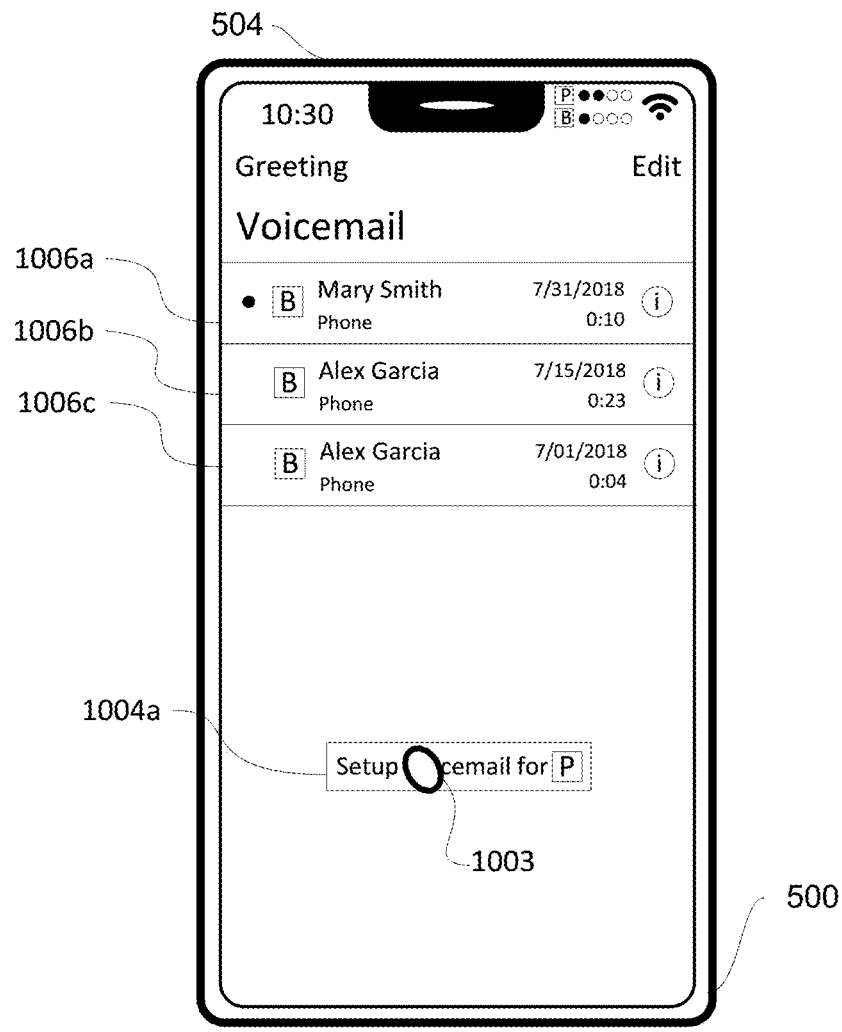

FIG. 10B illustrates the voicemail user interface after the voicemail associated with the second cellular identifier (e.g., the "Business" cellular identifier) has been set up. The voicemail user interface includes a plurality of affordances 1006a-c associated with voicemails received by the electronic device using the "Business" cellular identifier and an affordance 1004a selectable to additionally set up the voicemail for another cellular identifier (e.g., the "Personal" cellular identifier) that is active on the electronic device 500. The affordances 1006a-c associated with the voicemails received by the electronic device using the "Business" cellular identifier include a visual indication of the "Business" cellular identifier (e.g., the icon with the "B"), which enables the user to recognize that these voicemails were received with the "Business" cellular identifier. Each affordance 1006a-c is selectable to play the respective voicemail indicated by the respective affordance. As shown in FIG. 10B, the user selects (e.g., with contact 1003) the affordance 1004a for setting up the voicemail associated with the "Personal" cellular identifier.

Figure 10C:
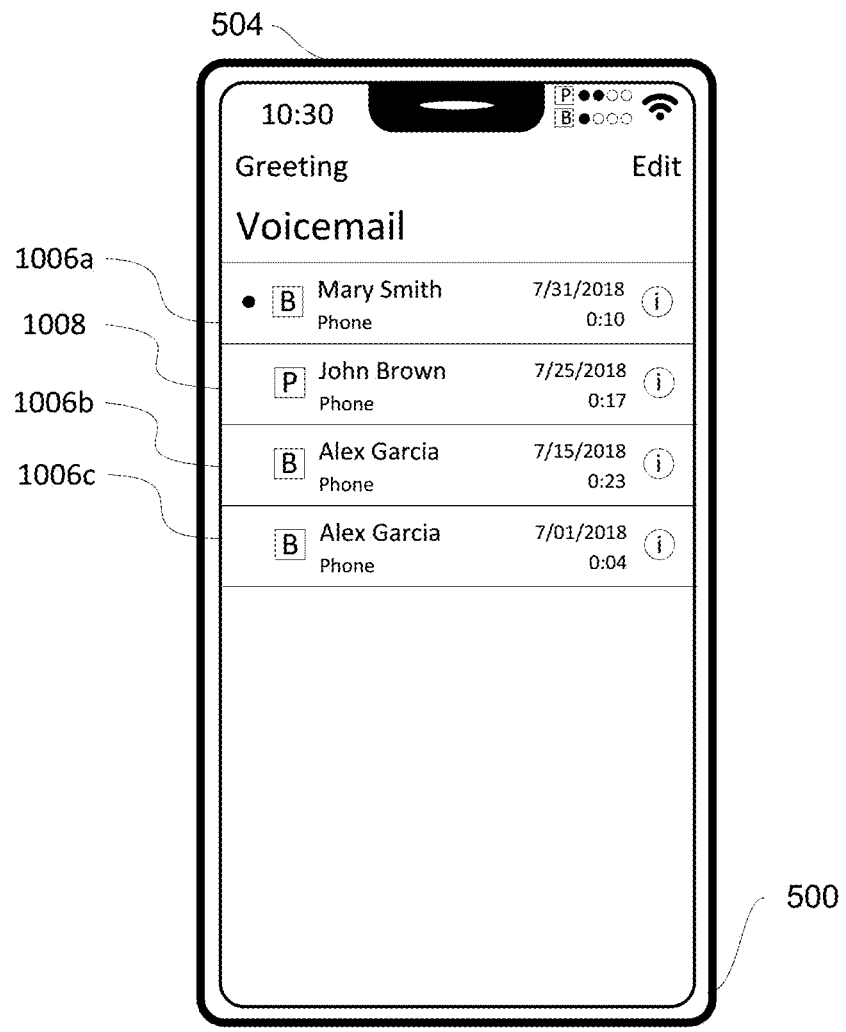

FIG. 10C illustrates the voicemail user interface after the voicemail associated with the first cellular identifier (e.g., the "Personal" cellular identifier) and the voicemail associated with the second cellular identifier (e.g., the "Business" cellular identifier) have been set up. The voicemail user interface includes a plurality of affordances 1006a-c associated with voicemails received by the electronic device using the "Business" cellular identifier, and an affordance 1008 associated with a voicemail received by the electronic device using the "Personal" cellular identifier. The affordances 1006a-c associated with the voicemails received by the electronic device using the "Business" cellular identifier include a visual indication of the "Business" cellular identifier (e.g., the icon with the "B"), which enables the user to recognize that these voicemails were received with the "Business" cellular identifier. Likewise, in the example illustrated in FIG. 10C, the affordance 1008 associated with the voicemail received by the electronic device using the "Personal" cellular identifier includes an indication of the "Personal" cellular identifier (e.g., the icon with the "P"), which enables the user to recognize that this voicemail was received with the "Personal" cellular identifier. In some embodiments, however, no indication of the "Personal" cellular identifier is displayed next to voicemails associated with the "Personal" cellular identifier because the "Personal" cellular identifier is configured as the default number for phone and SMS, and it is expected that the user would understand that, by default, the voicemails are associated with the default number for phone and SMS (e.g., the "Personal" cellular identifier) unless indicated as being associated with the "Business" cellular identifier. Each affordance 1006a-c and 1008 is selectable to play the respective voicemail indicated by the respective affordance.

Figure 10D:
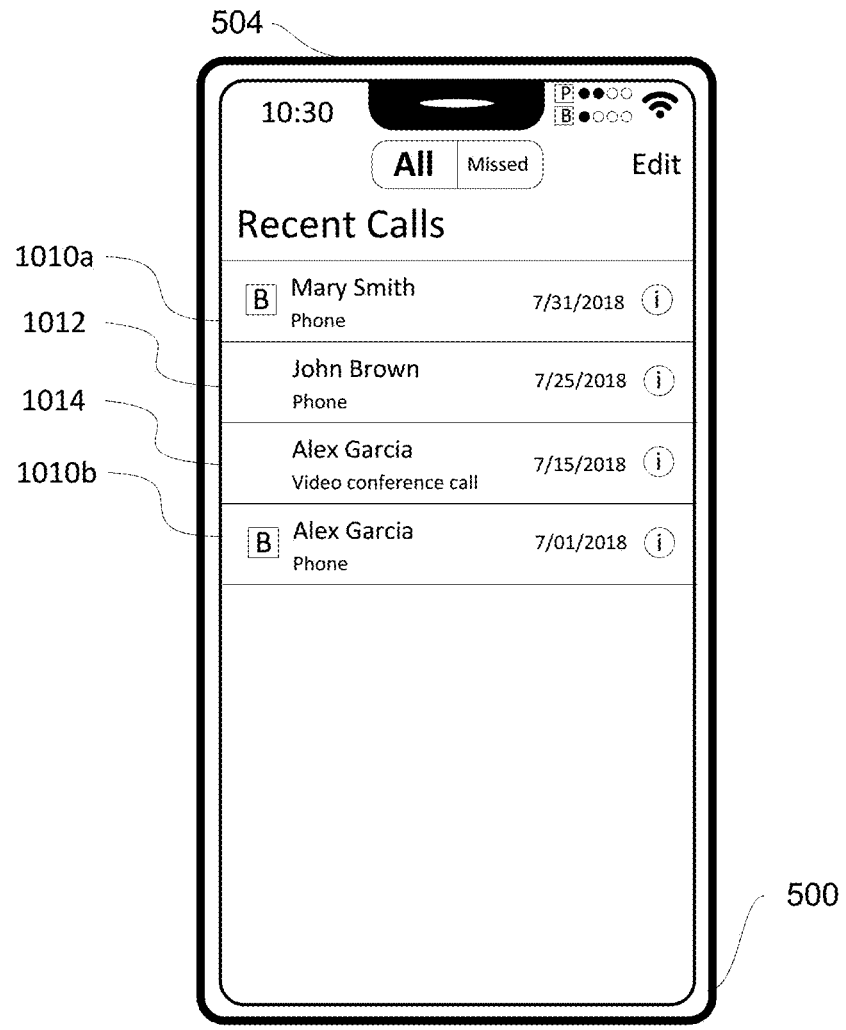

FIG. 10D illustrates a recent calls user interface on device 500 according to some embodiments of the disclosure. As illustrated in FIG. 10D, the recent calls user interface includes a plurality of affordances 1010a-b associated with recent calls made or received with the "Business" cellular identifier, an affordance 1012 associated with a recent call made using the "Personal" cellular identifier, and an affordance 1014 associated with a recent video conference call that had been made with the "Personal" cellular identifier. The affordances 1010a and 1010b associated with recent calls made or received with the "Business" cellular identifier include indications of the "Business" cellular identifier (e.g., the icons with the letter "B"). In the example shown in FIG. 10D, the affordance 1012 associated with the recent call made or received using the "Personal" cellular identifier and the affordance 1014 associated with the recent video conference call made or received with the "Personal" cellular identifier do not include an indication of the "Personal" cellular identifier, because the "Personal" cellular identifier is the default number for phone and SMS. In some embodiments, the cellular identifier that is the default number for phone and SMS is the cellular identifier used for these operations by default and the default cellular identifier for videoconferencing. The electronic device 500 optionally does not present an indication of the default cellular identifier for phone and SMS with indications of communications performed with the default cellular identifier because it is expected that the user understands that the default cellular identifier is used for phone and SMS unless otherwise noted.

Figure 10E:
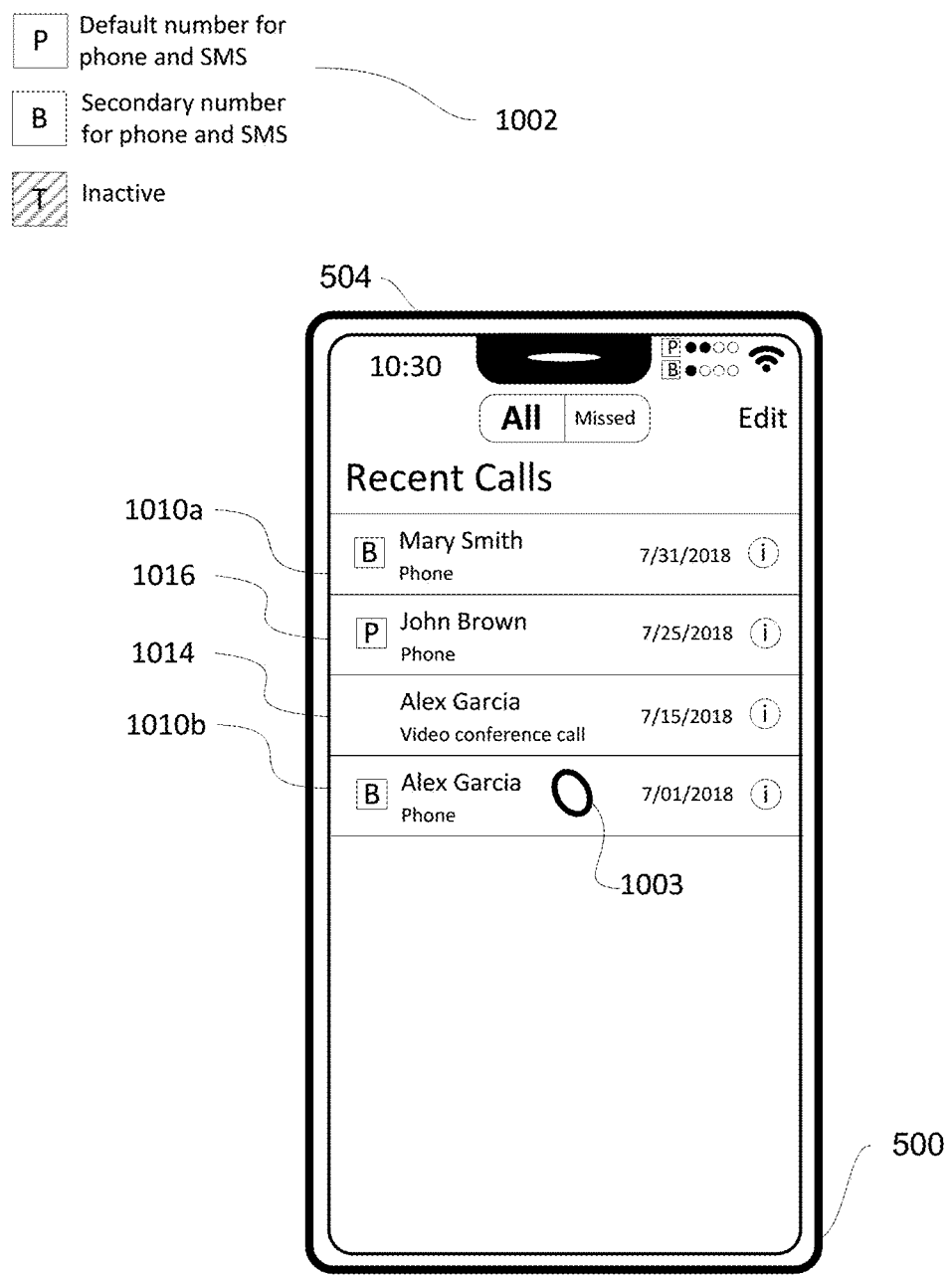

FIG. 10E illustrates a recent calls user interface according to some embodiments of the disclosure. The user interface illustrated in FIG. 10E is substantially similar to the user interface illustrated in FIG. 10D, except the affordance 1016 associated with a phone call made or received using the "Personal" cellular identifier includes an indication of the "Personal" cellular identifier (e.g., the icon with the letter "P"). As illustrated in FIG. 10E, the affordance 1014 associated with the recent video conference call made or received with the "Personal" cellular identifier does not include an indication of the "Personal" cellular identifier. In some embodiments, the cellular identifier that is the default number for phone and SMS is always used for video conference calls, so there is no indication of the cellular identifier in the affordance 1014 associated with the video conference call, because it is expected the user understands which cellular identifier is used for video conference calls. In some embodiments, the indication of the cellular identifier (e.g., an icon with a "P") is included in the affordance 1014 associated with the video conference call. As shown in FIG. 10E, the user selects (e.g., with contact 1003) the affordance 1010*b* associated with a phone call made or received with the "Business" cellular identifier. In response to the selection, the electronic device 500 initiates a phone call with the contact (e.g., "Alex Garcia") that the phone call was with, as shown in FIG. 10F.

Figure 10F:

FIG. 10F illustrates a phone call user interface on device 500 according to some embodiments of the disclosure. The phone call user interface is presented while the electronic device 500 is used for a phone call. As indicated by the legend 1002 of FIG. 10F, during the phone call, the "Business" cellular identifier is in use for the phone call and the "Personal" cellular identifier is disabled because, in some embodiments, while one cellular identifier is used for a phone call, the other cellular identifiers active on the electronic device are temporarily disabled until the phone call ends. In some embodiments, cellular identifiers not being used for the phone call remain enabled on the electronic device to perform other operations (e.g., sending or receiving a message, downloading or uploading cellular data, receiving another phone call, etc).

The phone call user interface includes an indication 1018 of the contact that the phone call is with, an indication 1020 of the cellular identifier being used for the phone call, and an affordance 1022 for initiating a video conference call with the contact on the phone call. In some embodiments, if the user chooses to initiate a video conference call, the electronic device 500 initiates the video conference call using the cellular identifier that is configured as the default number for phone and SMS (e.g., the "Personal" cellular identifier) regardless of which cellular identifier is being used for the telephone call and/or regardless of which cellular identifier is associated with the contact that the video conference call is with. As shown in FIG. 10F, the user selects (e.g., with contact 1003) the affordance 1022 for initiating a video conference call with the contact.

Figure 10G:
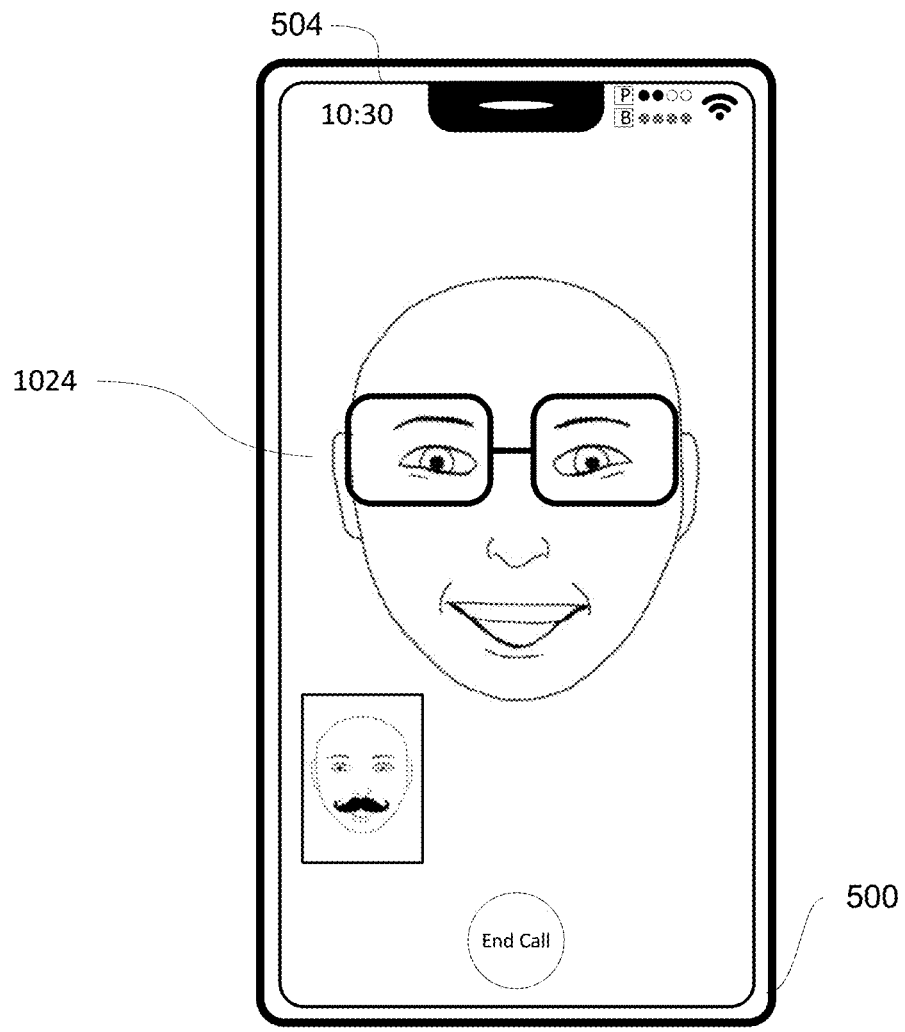

FIG. 10G illustrates a video conference call user interface according to some embodiments of the disclosure. The video conference call user interface is presented while the electronic device 500 is used for a video conference call. As indicated by the legend 1002 of FIG. 10G, during the video conference call, the "Personal" cellular identifier is in use for the video conference call and the "Business" cellular identifier is disabled because, in some embodiments, while one cellular identifier is used for a video conference call, the other cellular identifiers active on the electronic device are disabled. In some embodiments, cellular identifiers not being used for the video conference call remain enabled on the electronic device to perform other operations (e.g., sending or receiving a message, downloading or uploading cellular data, receiving a phone call, etc).

Although the phone call was conducted using the "Business" cellular identifier as indicated in FIG. 10F, in the example illustrated in FIG. 10G, the "Personal" cellular identifier is used to conduct the video conference call. In some embodiments, the cellular identifier that is the default number for phone and SMS is always used by the electronic device to conduct video conference calls, regardless of which cellular identifier is associated with the contact with whom the electronic device has the video conference call. In some embodiments, the electronic device is able to use any active cellular identifier to conduct video conference calls.

Figure 10H:
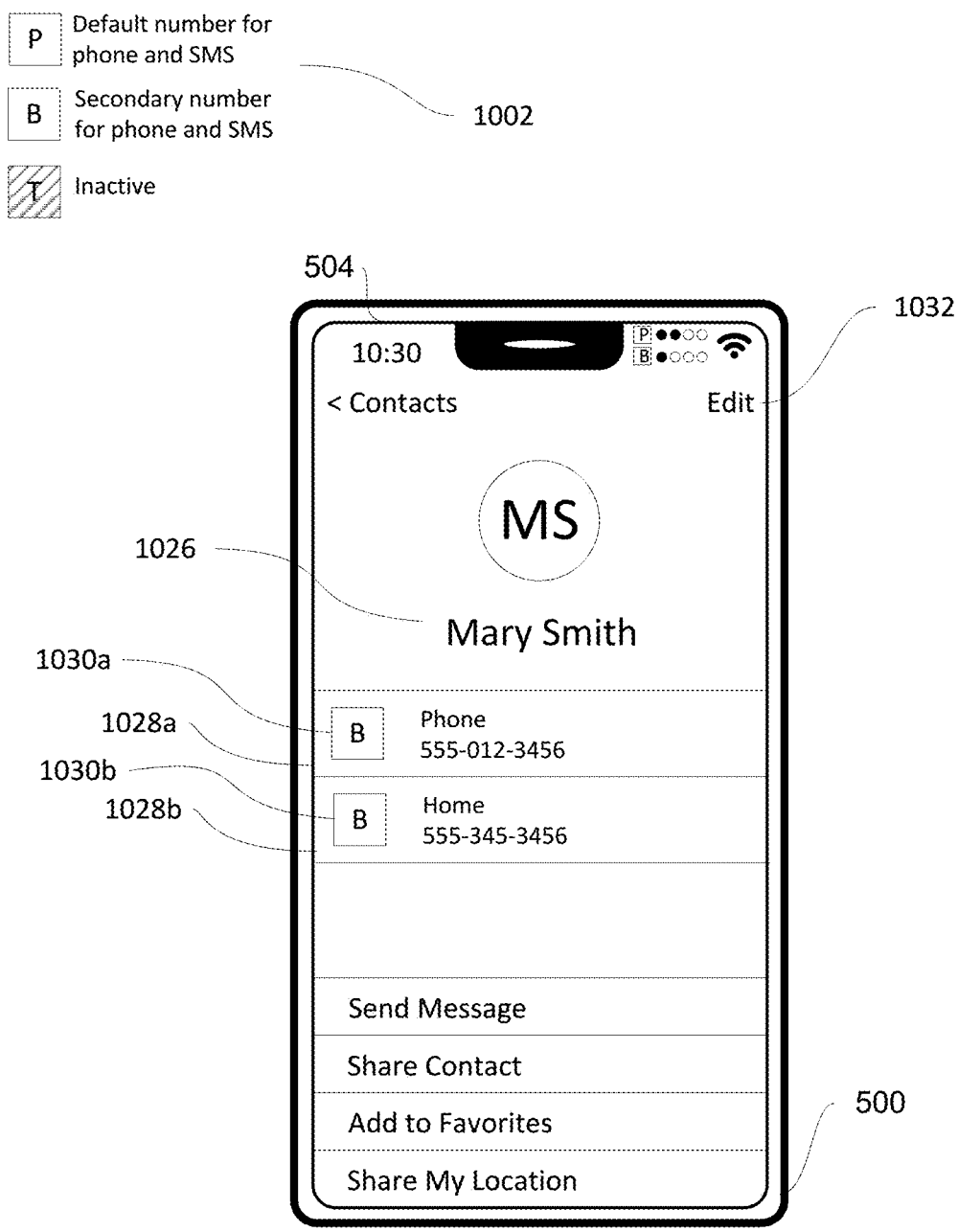
Figure 10J:
Figure 10K:
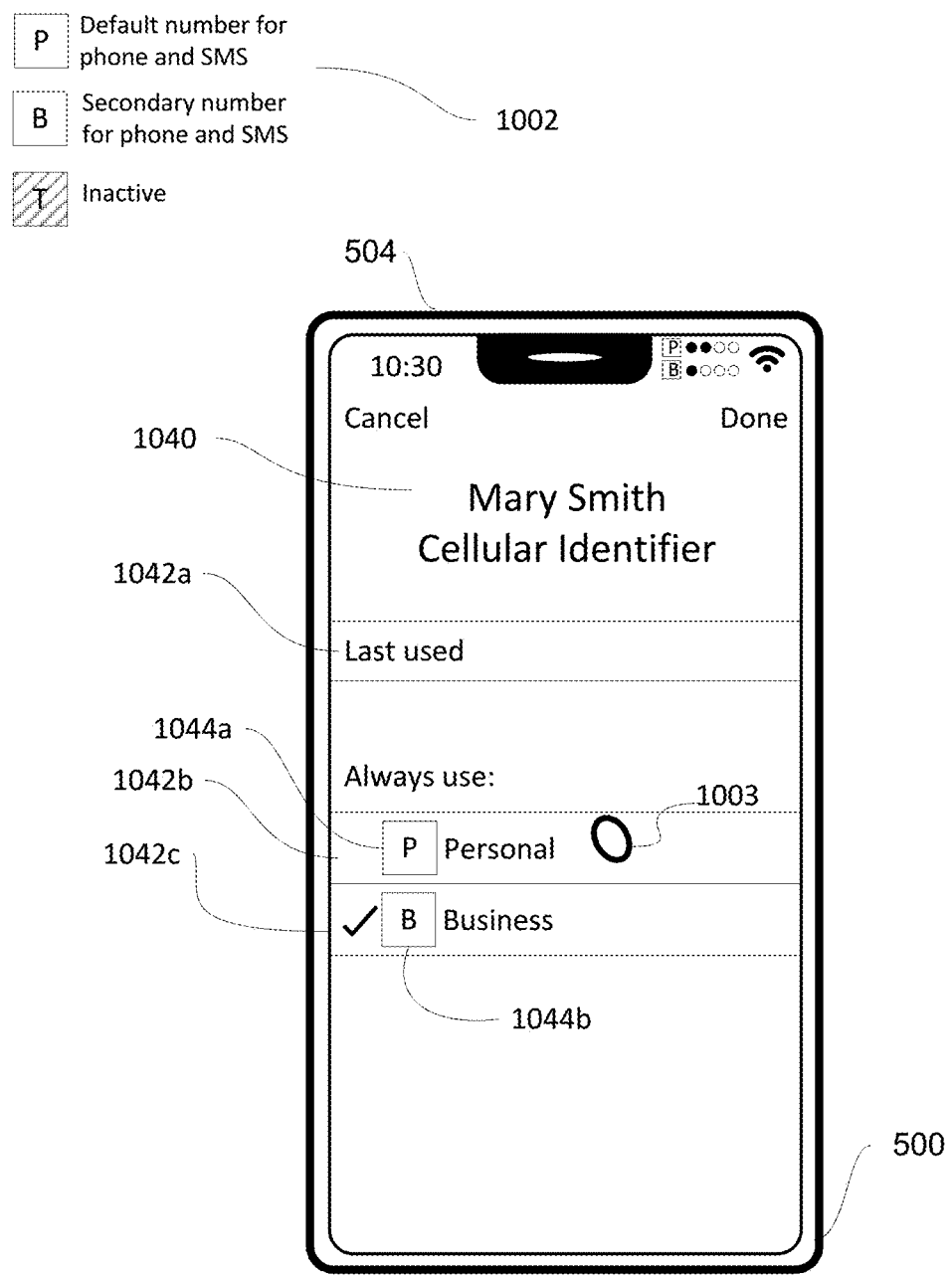
Figure 10L:
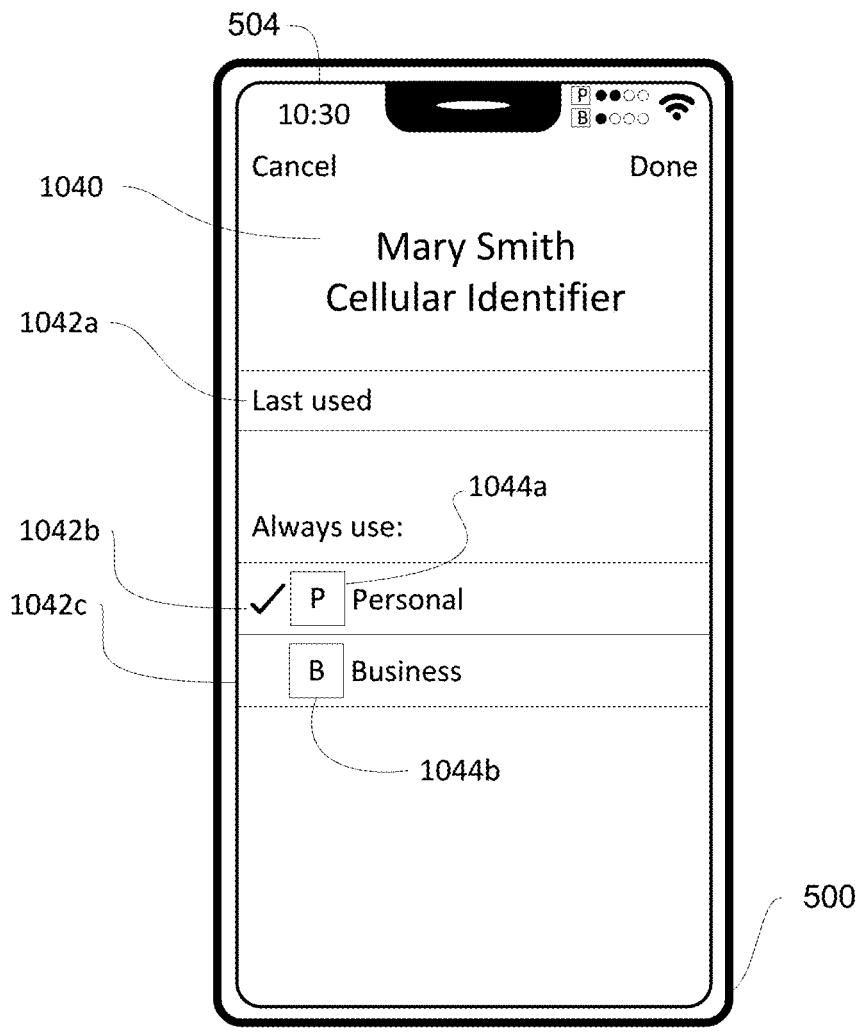
Figure 10M:
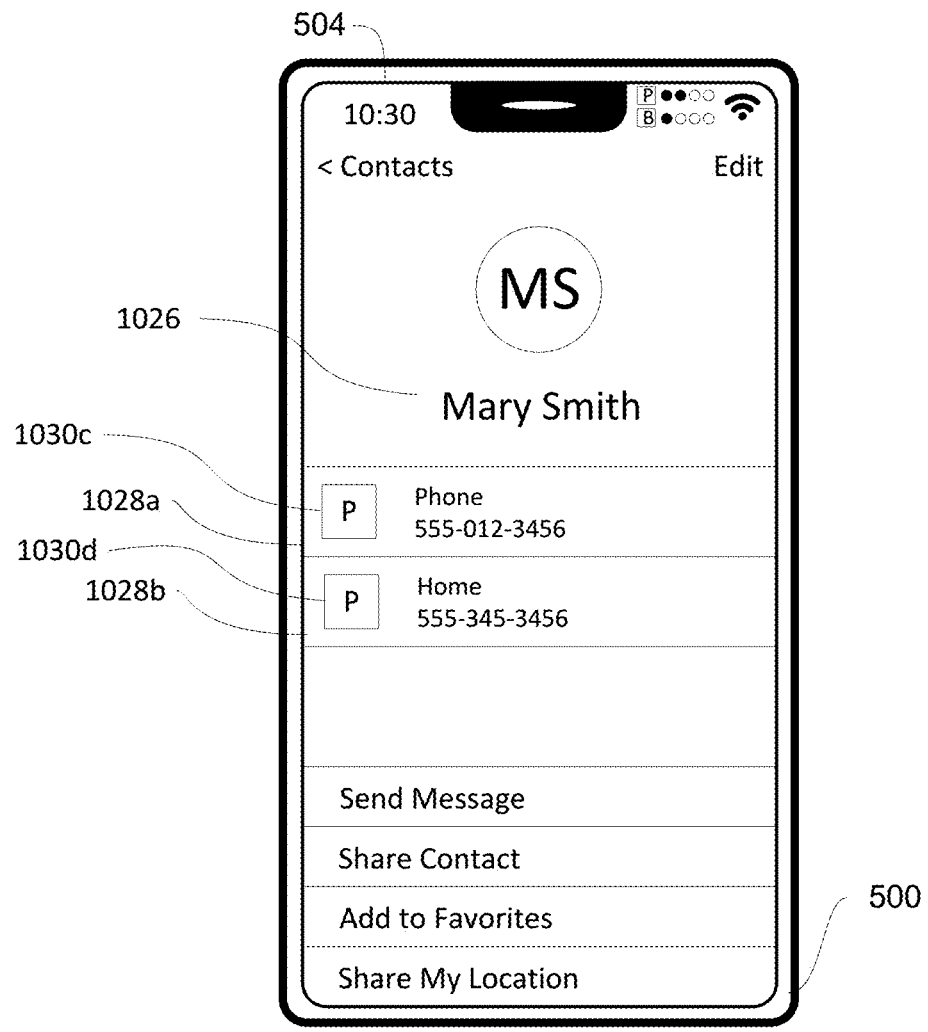
Figure 10N:
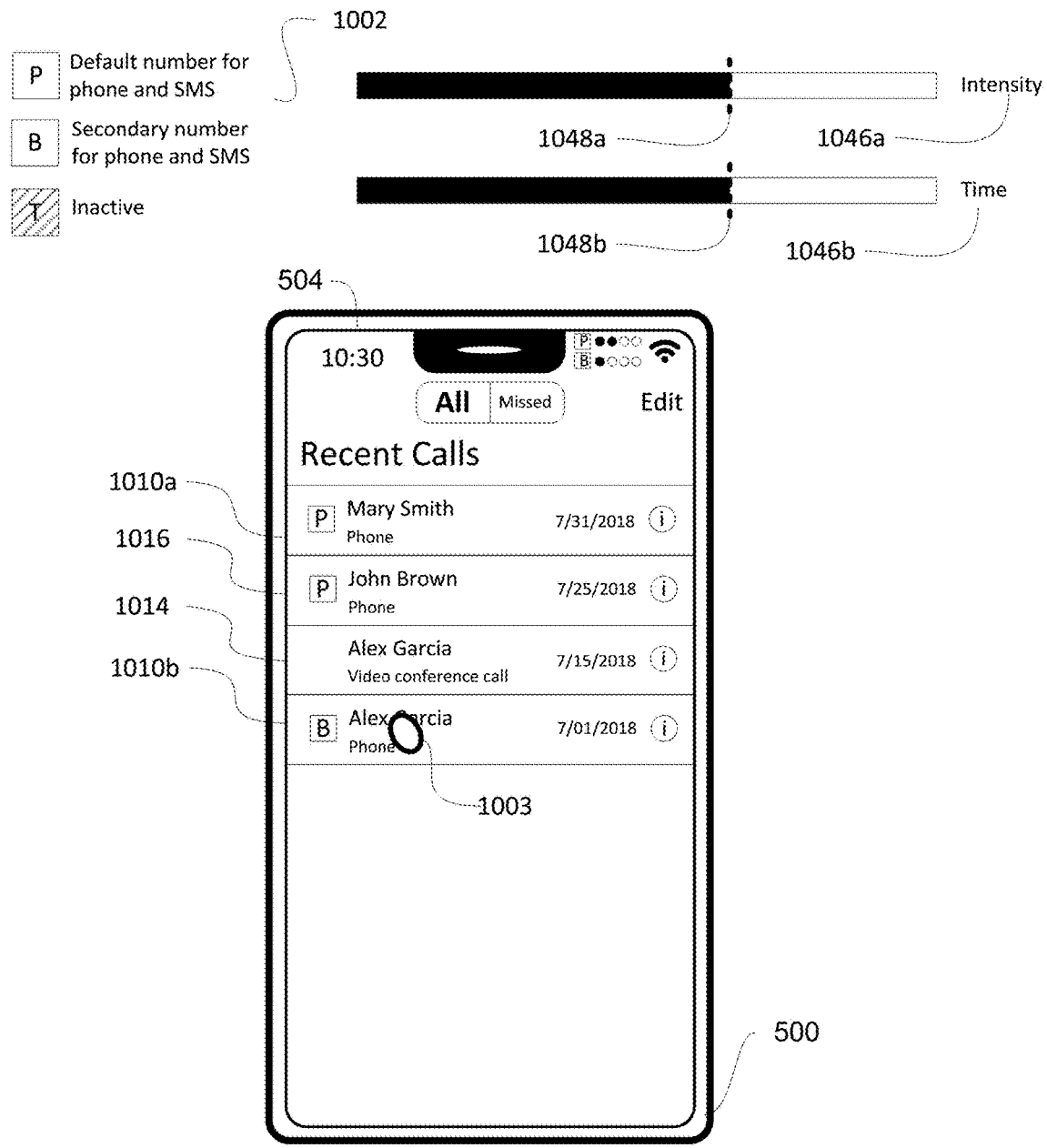
Figure 10O:
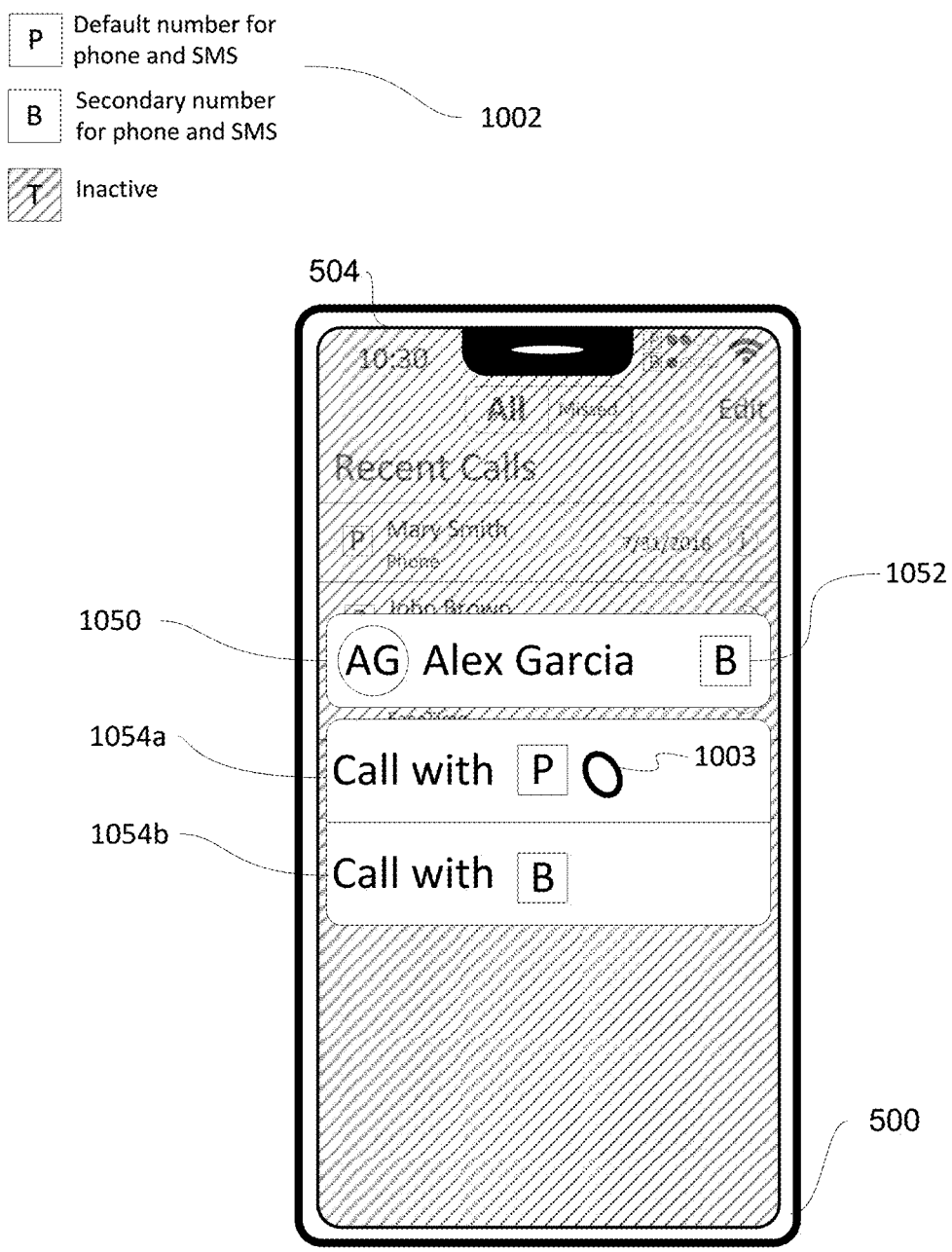
Figure 10P:
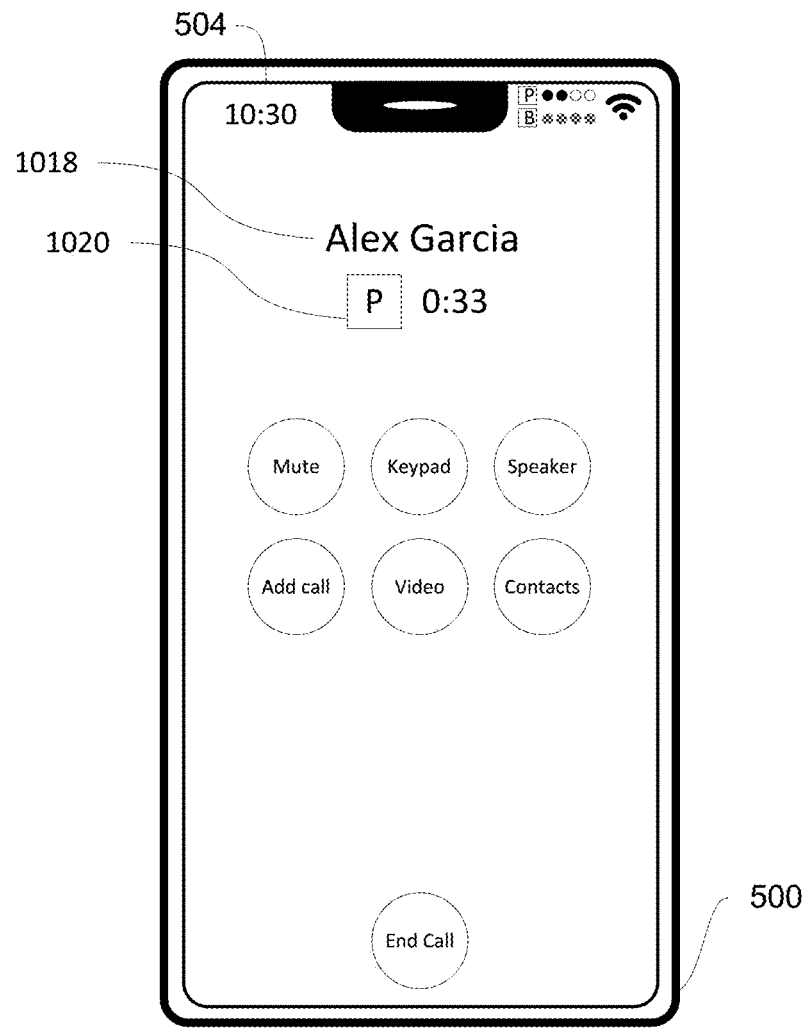
Figure 10Q:
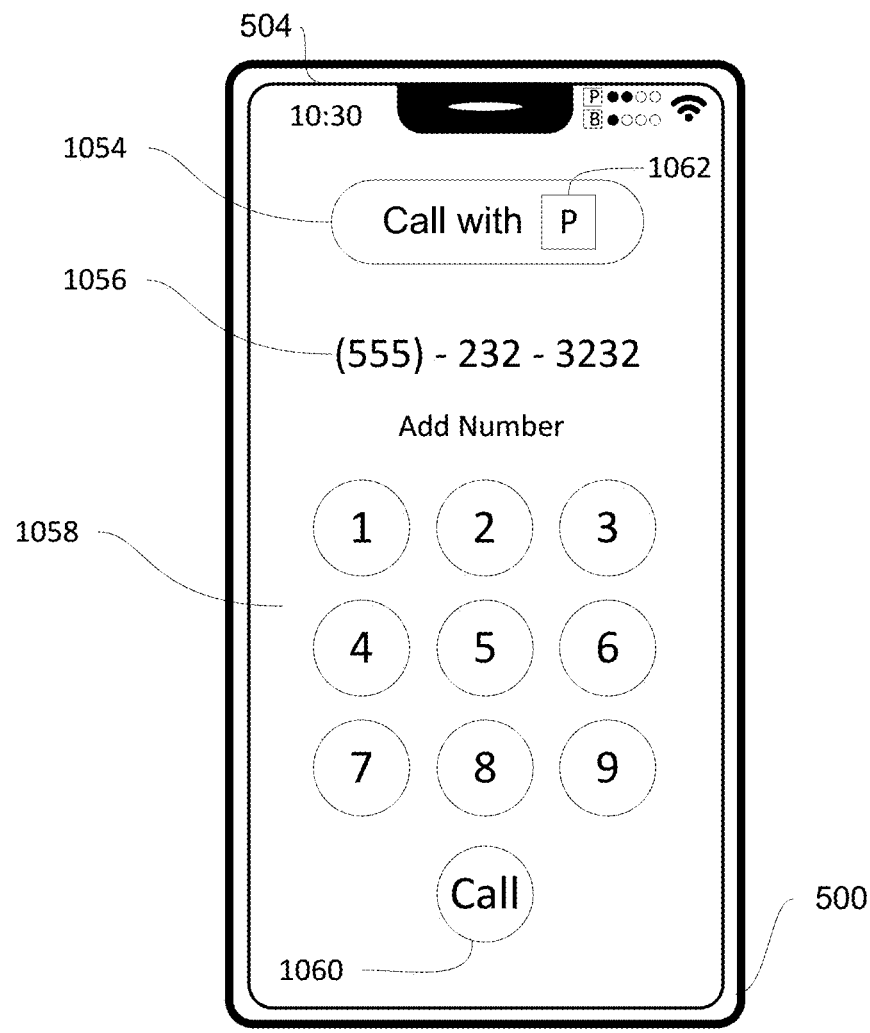
Figure 10R:
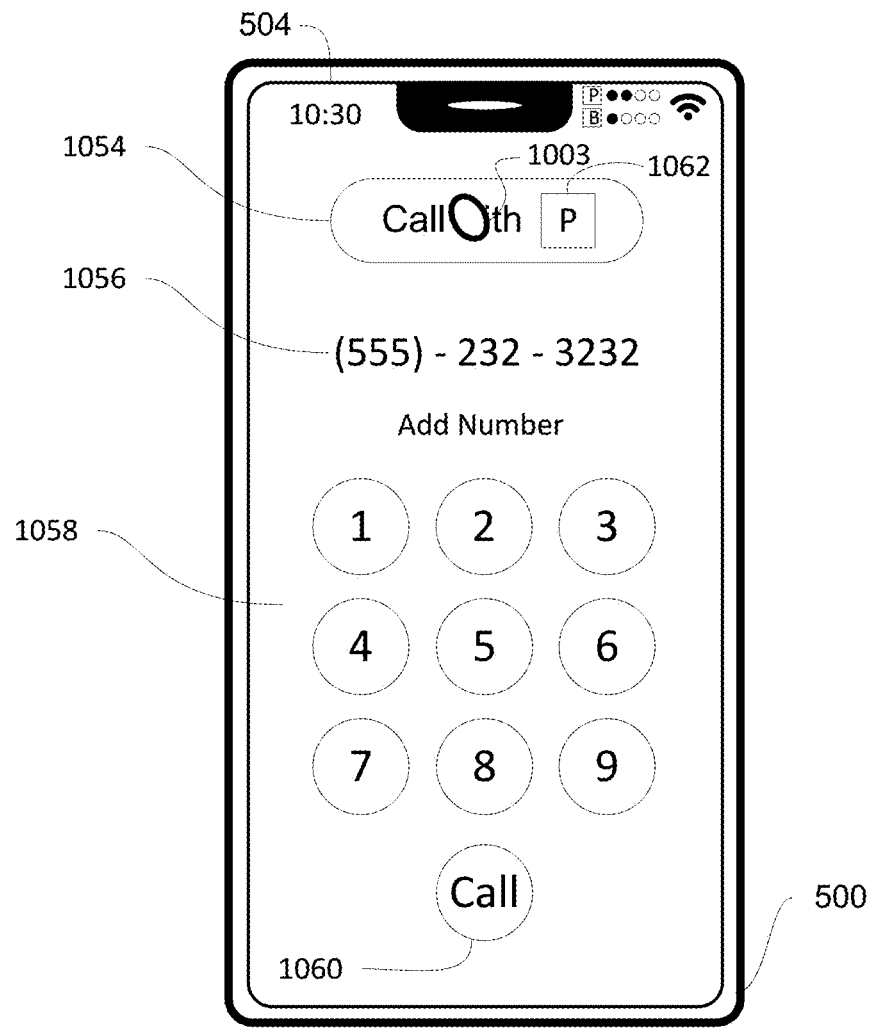
Figure 10S:
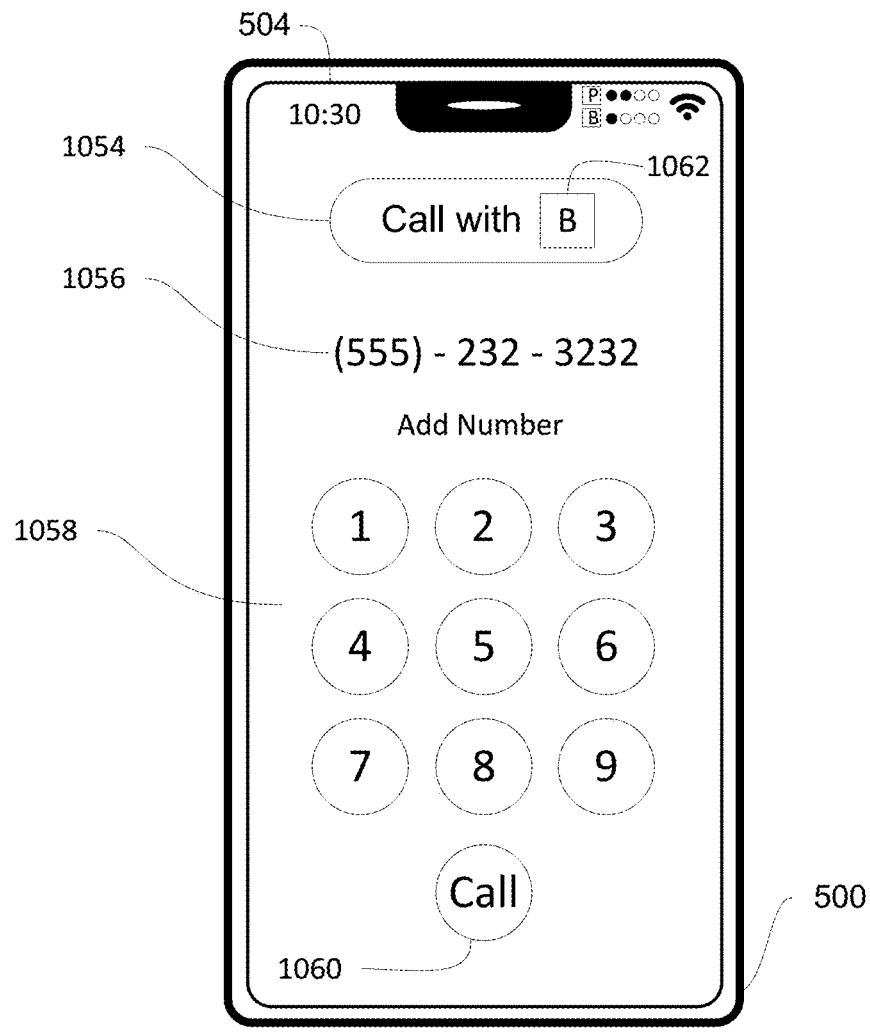
Figure 10T:
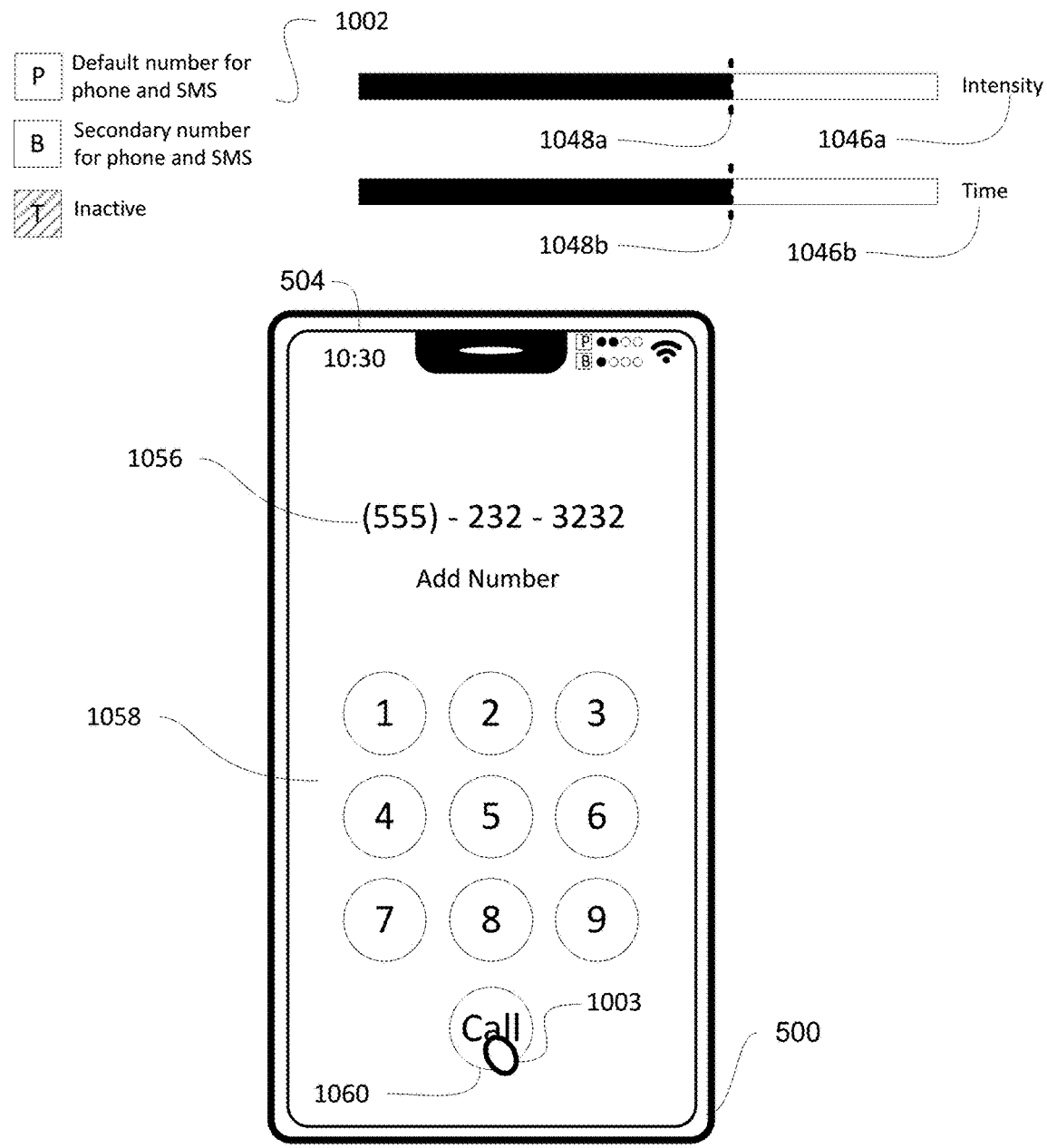
Figure 10U:
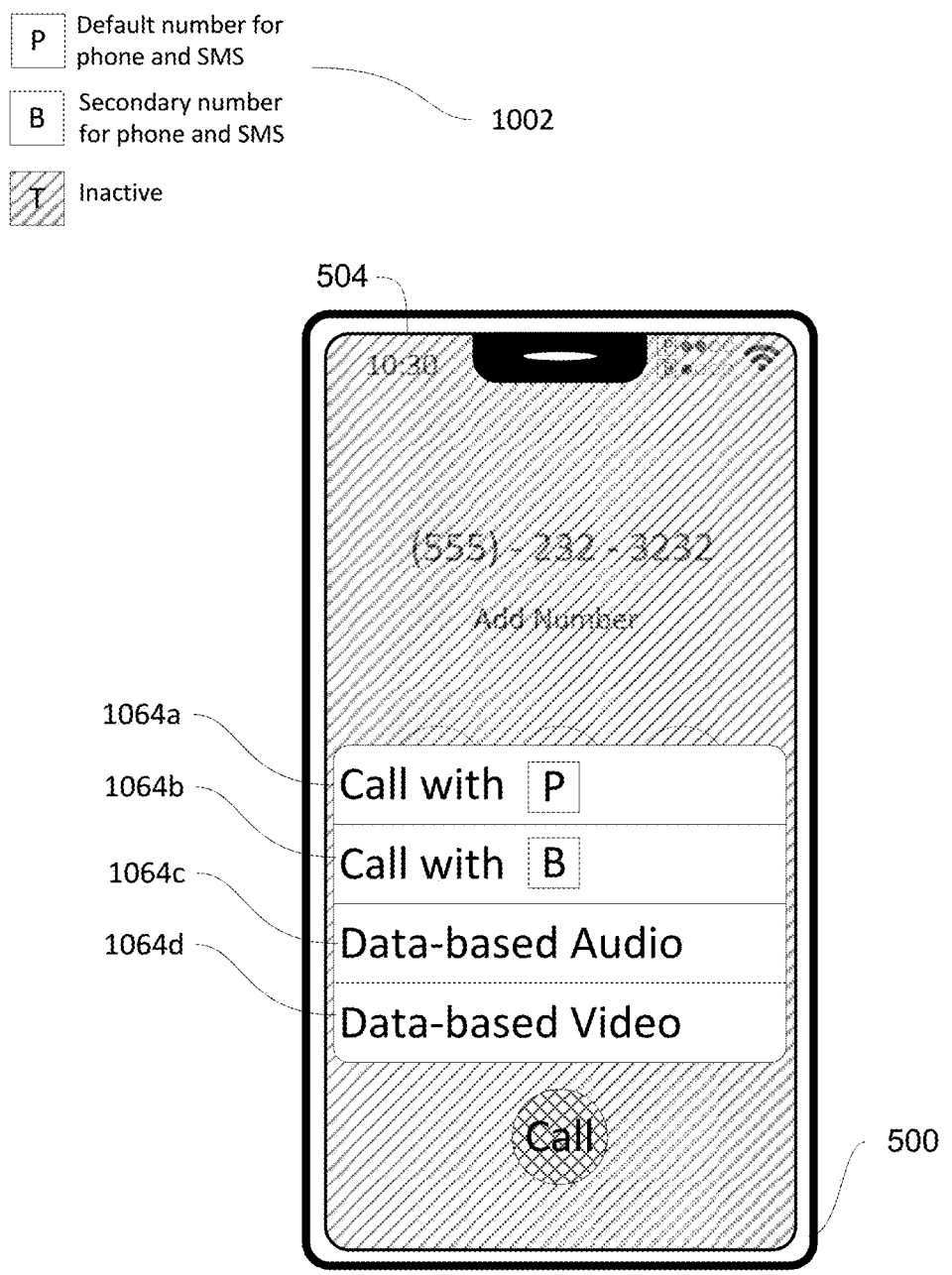
Figure 10V:
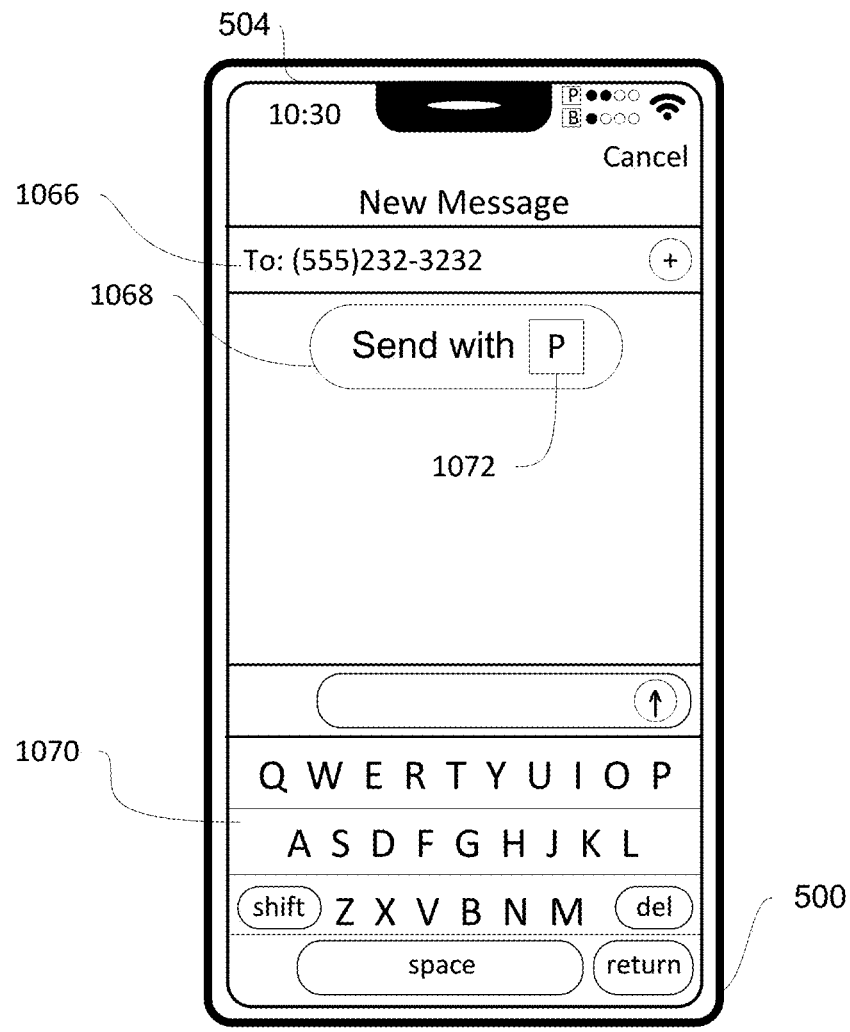
Figure 10W:
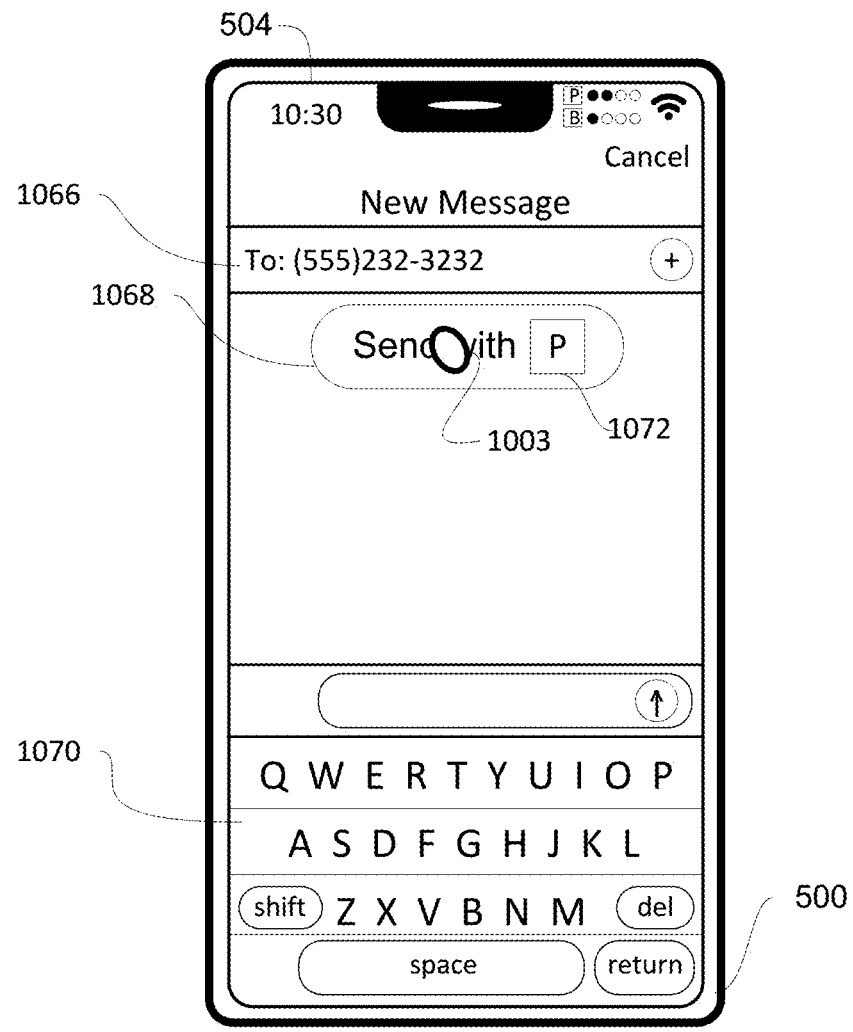
Figure 10X:
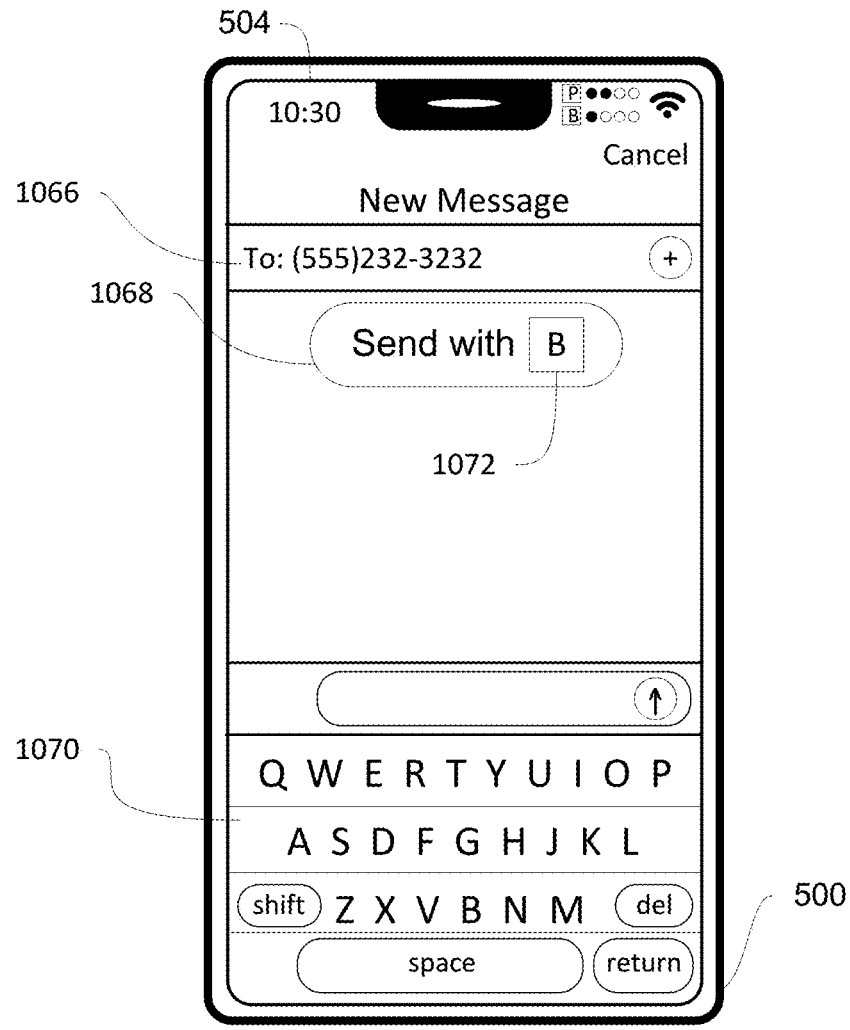
Figure 10Y:
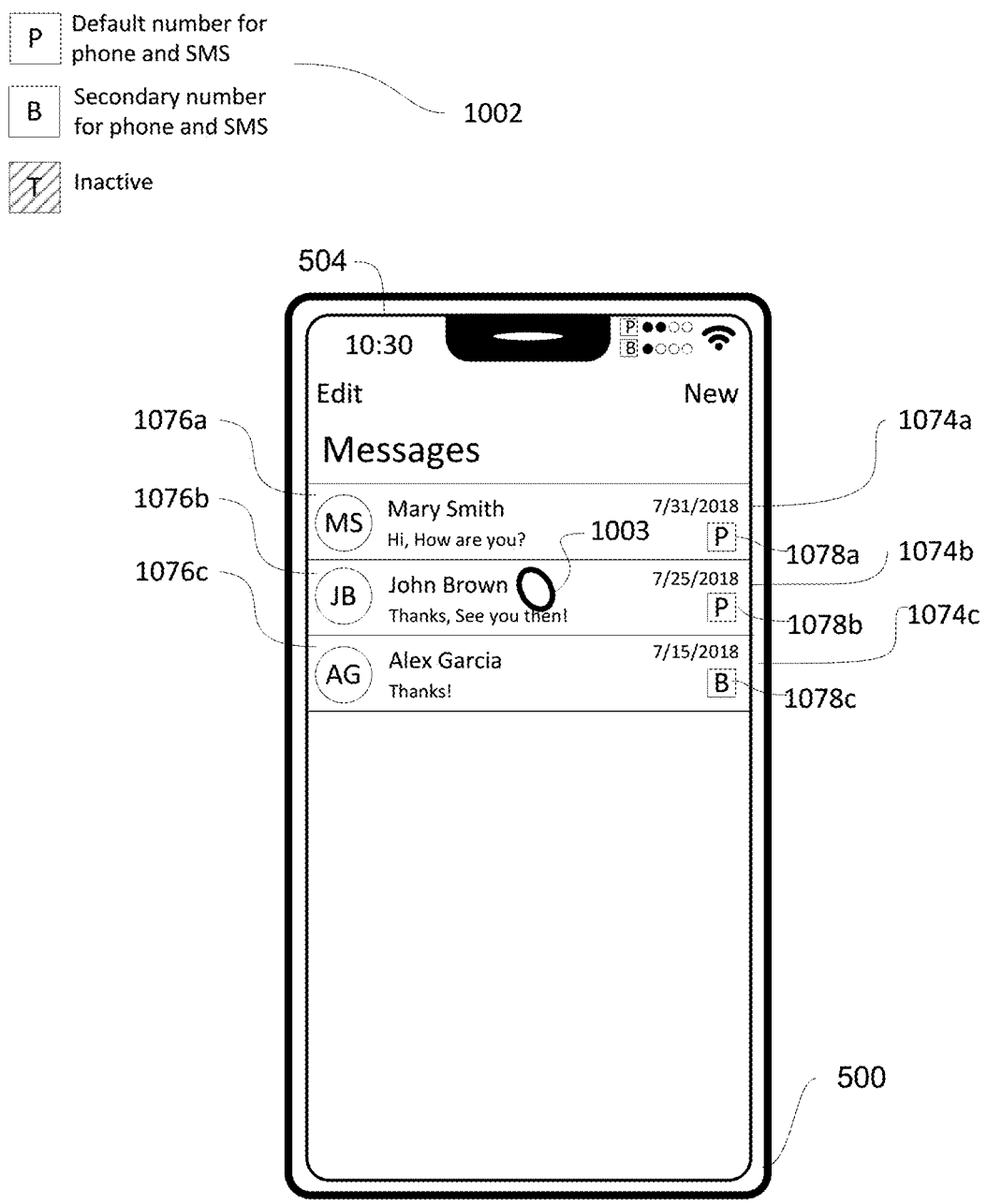
Figure 10Z:
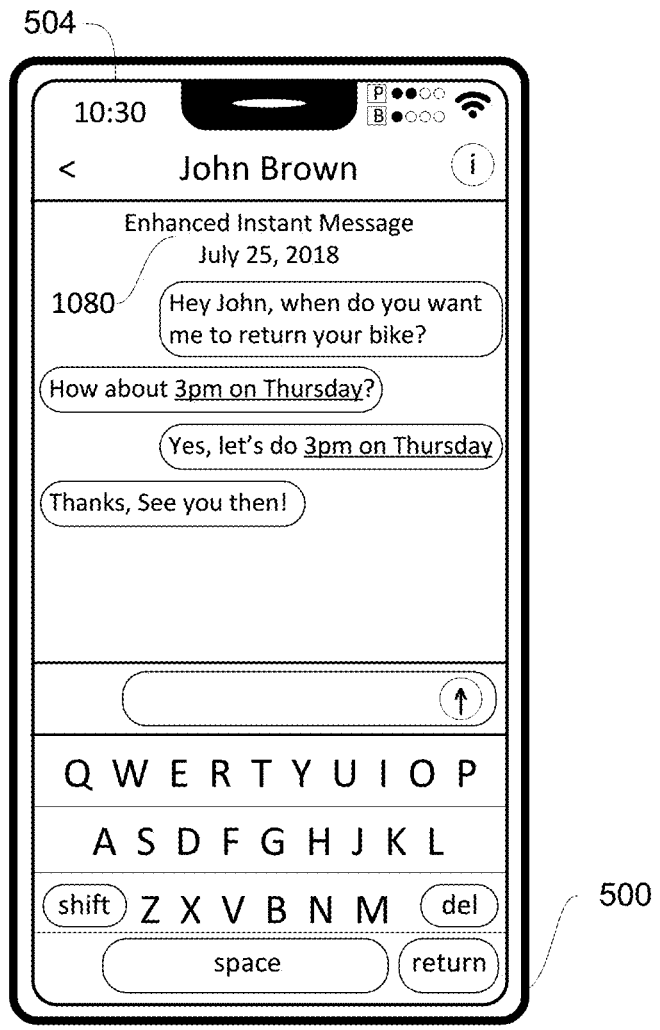
Figure 10A:
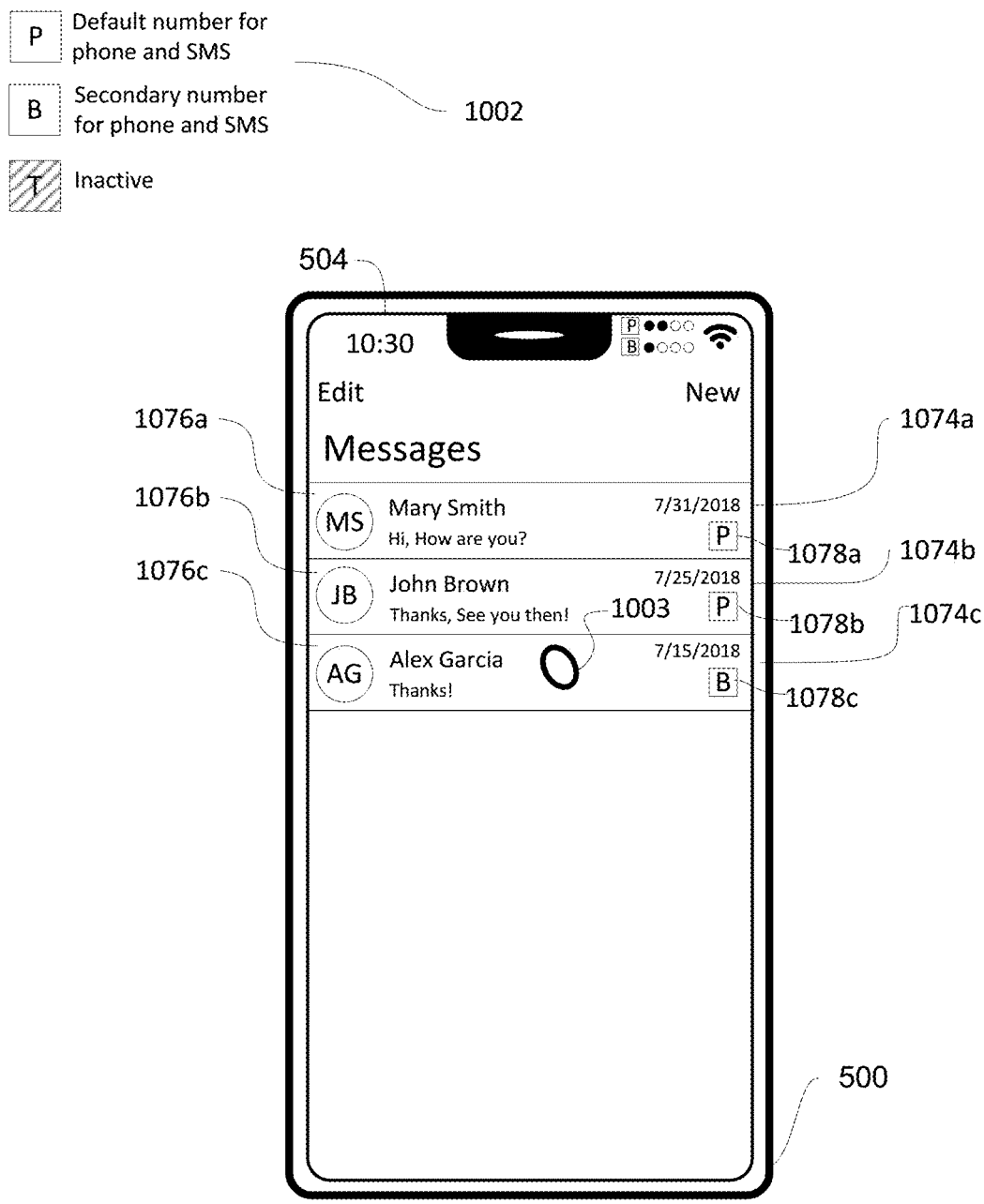
Figure 10B:
Figure 10C:
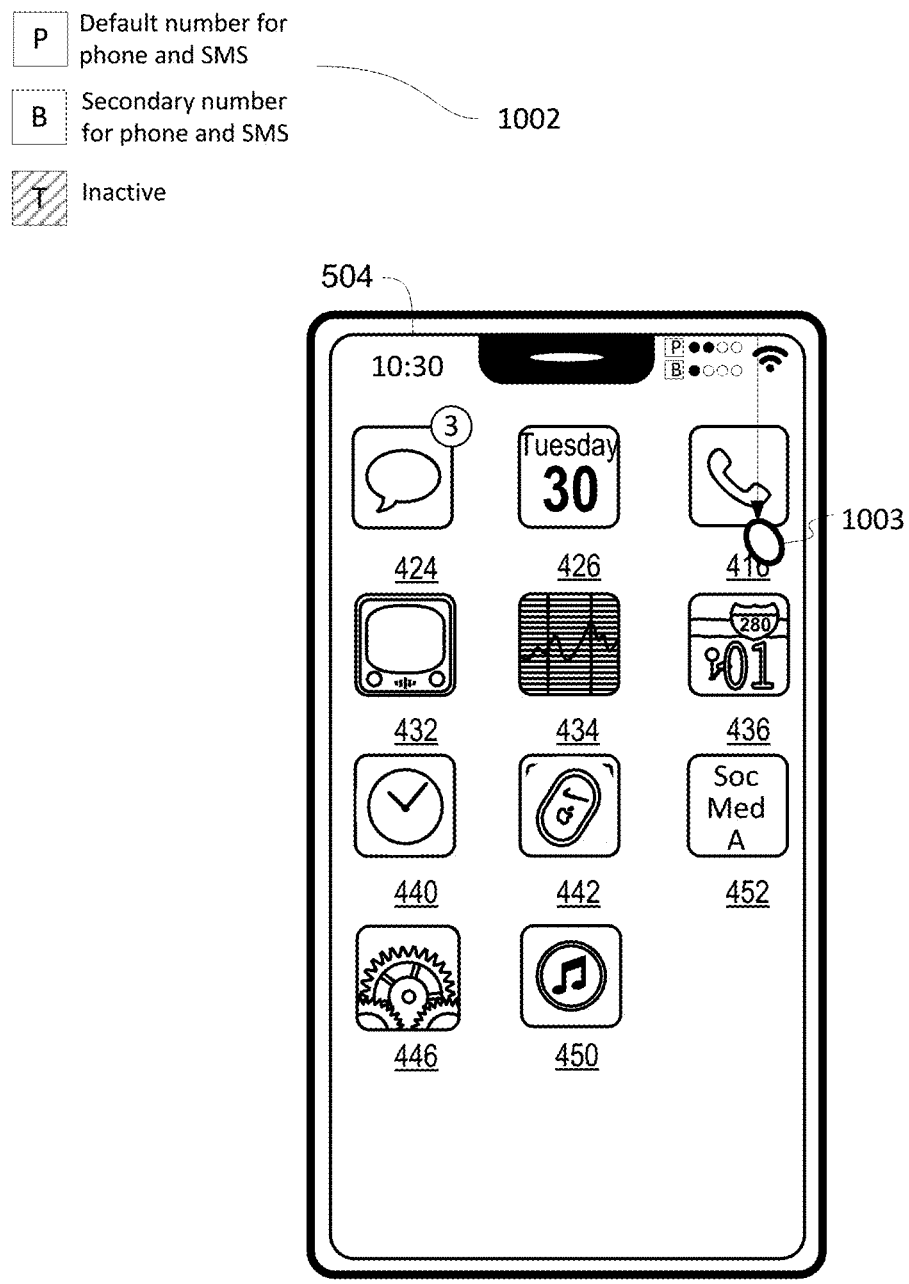
Figure 10D:
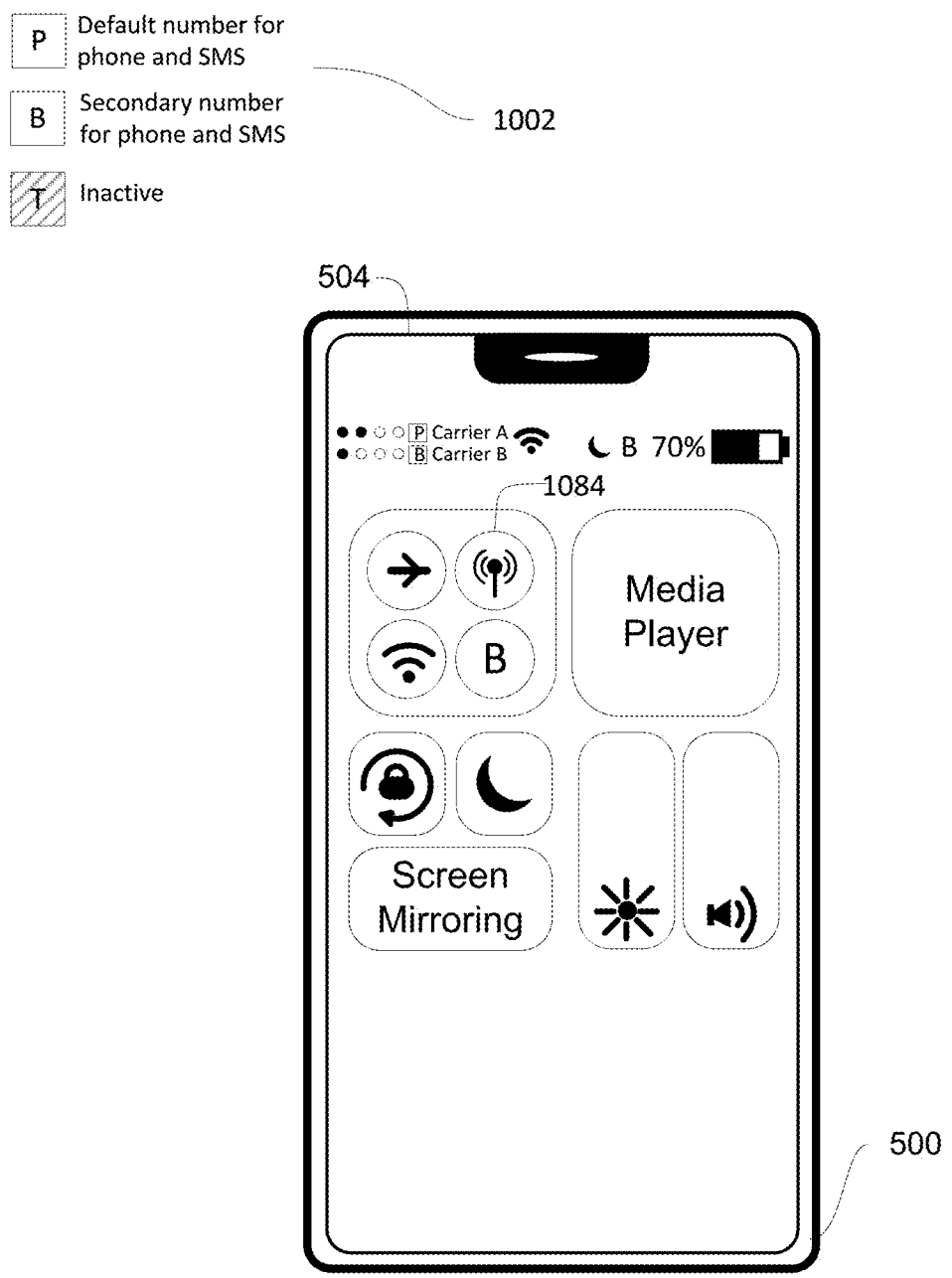
Figure 10E:
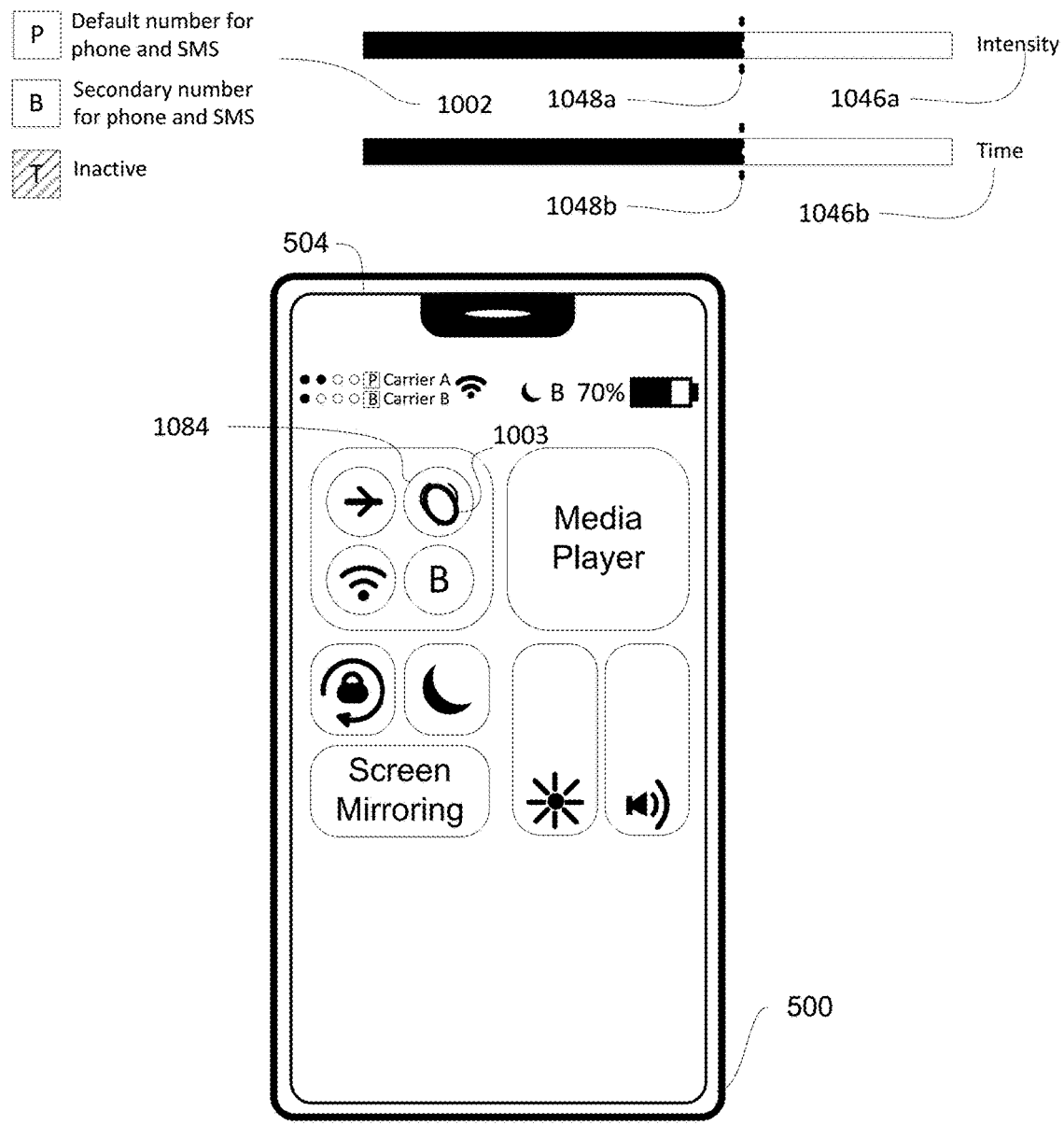
Figure 10F:
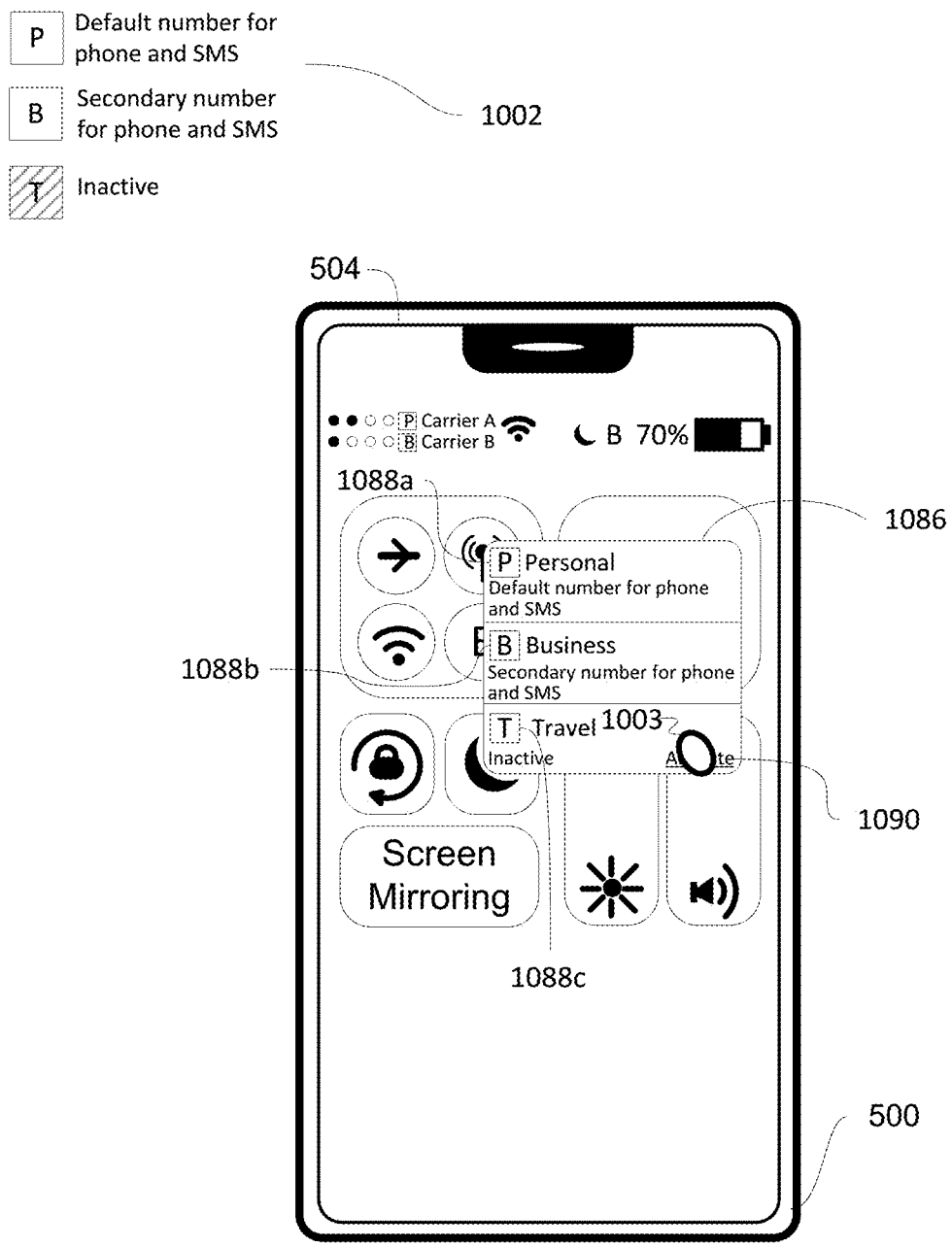
Figure 10G:
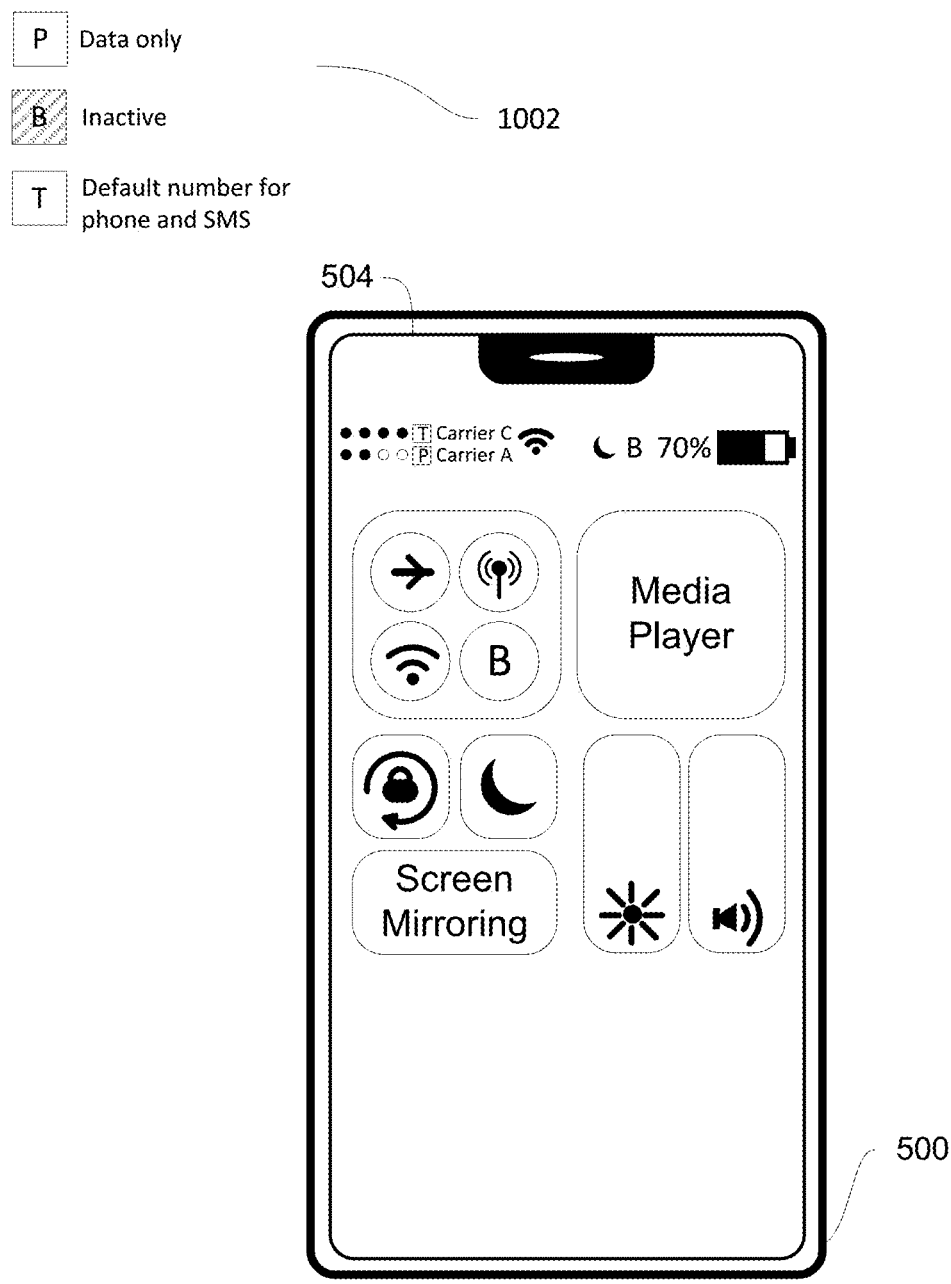
Figure 10H:
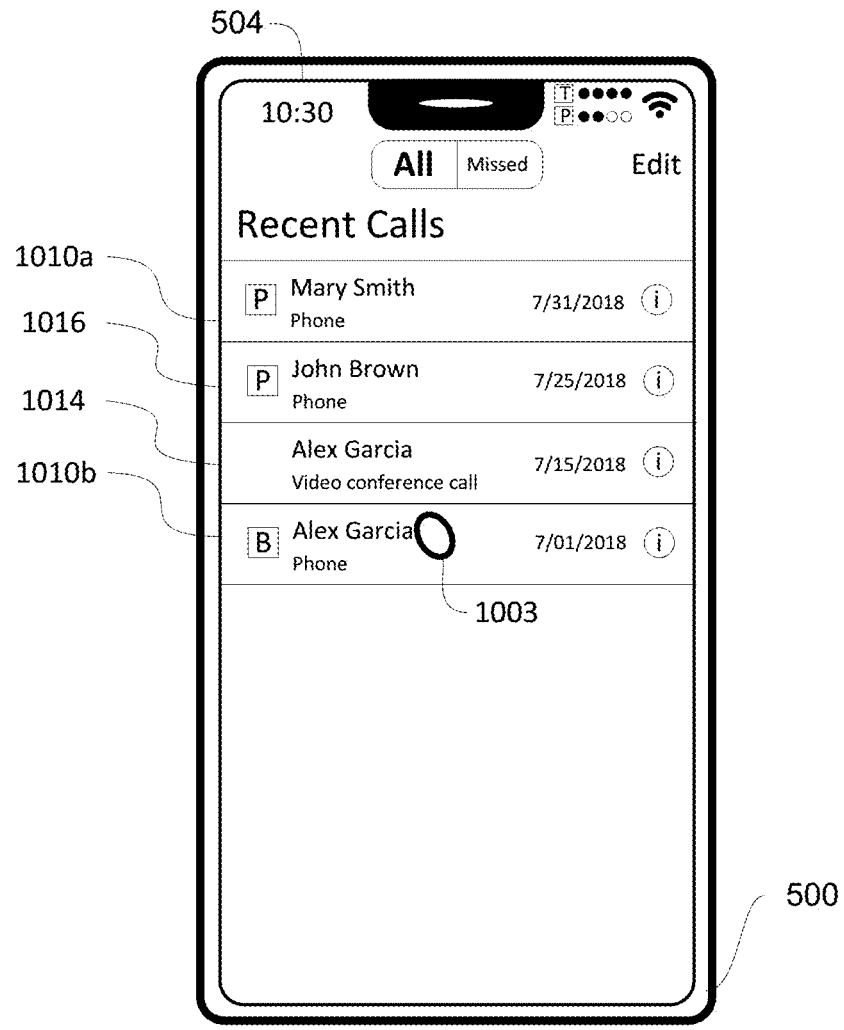
Figure 10I:
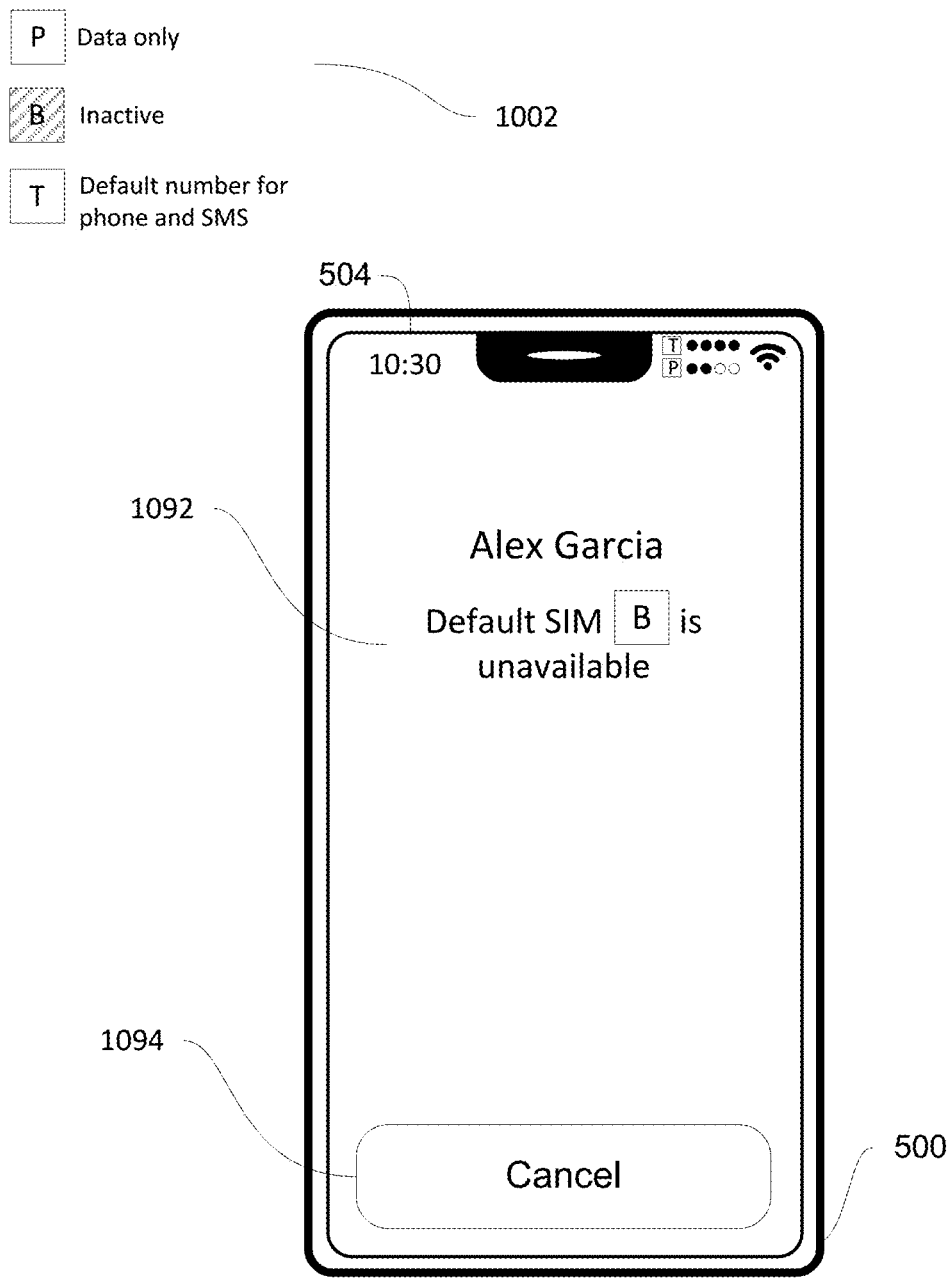
Figure 10J:
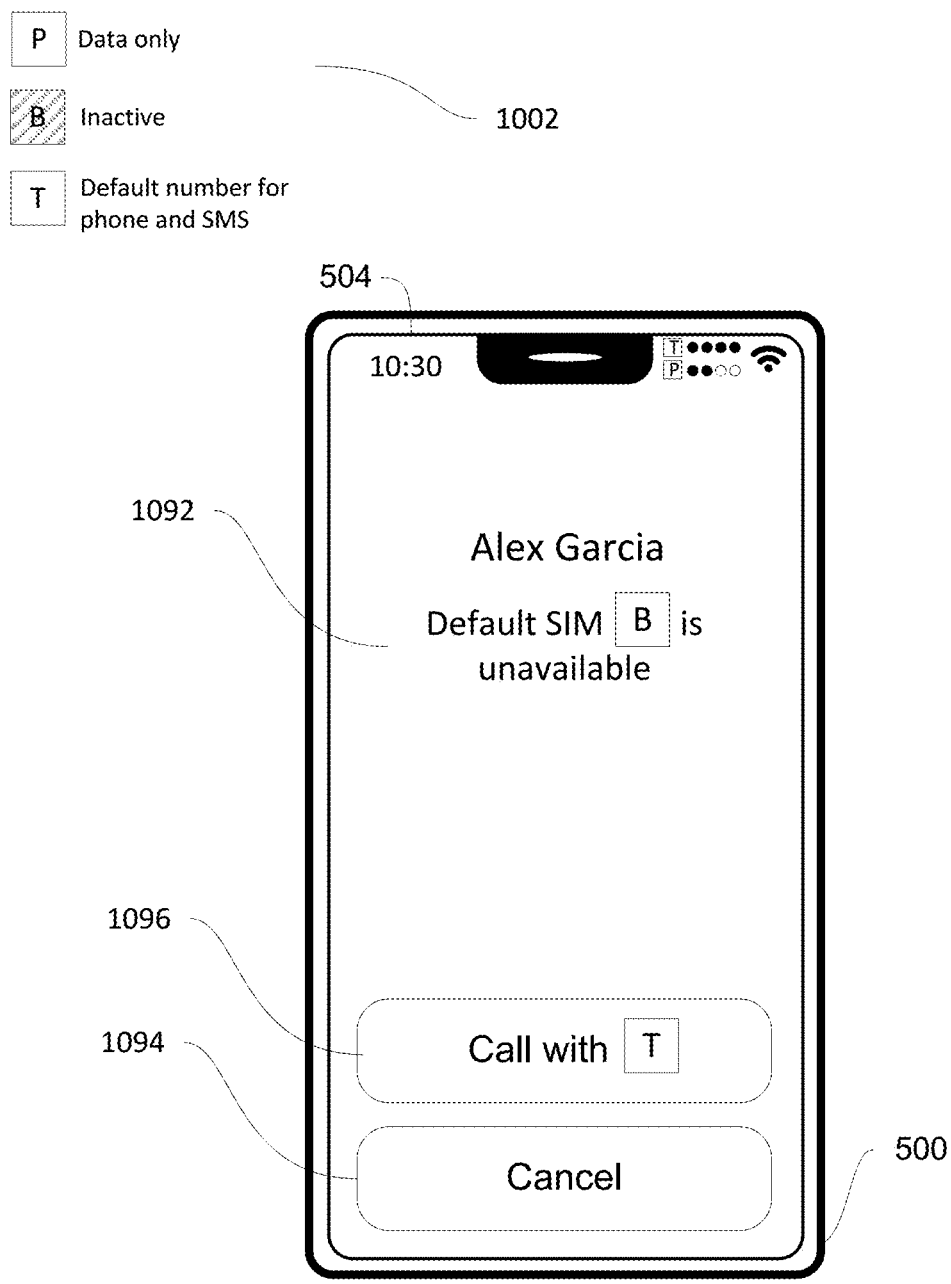
Figure 10K:
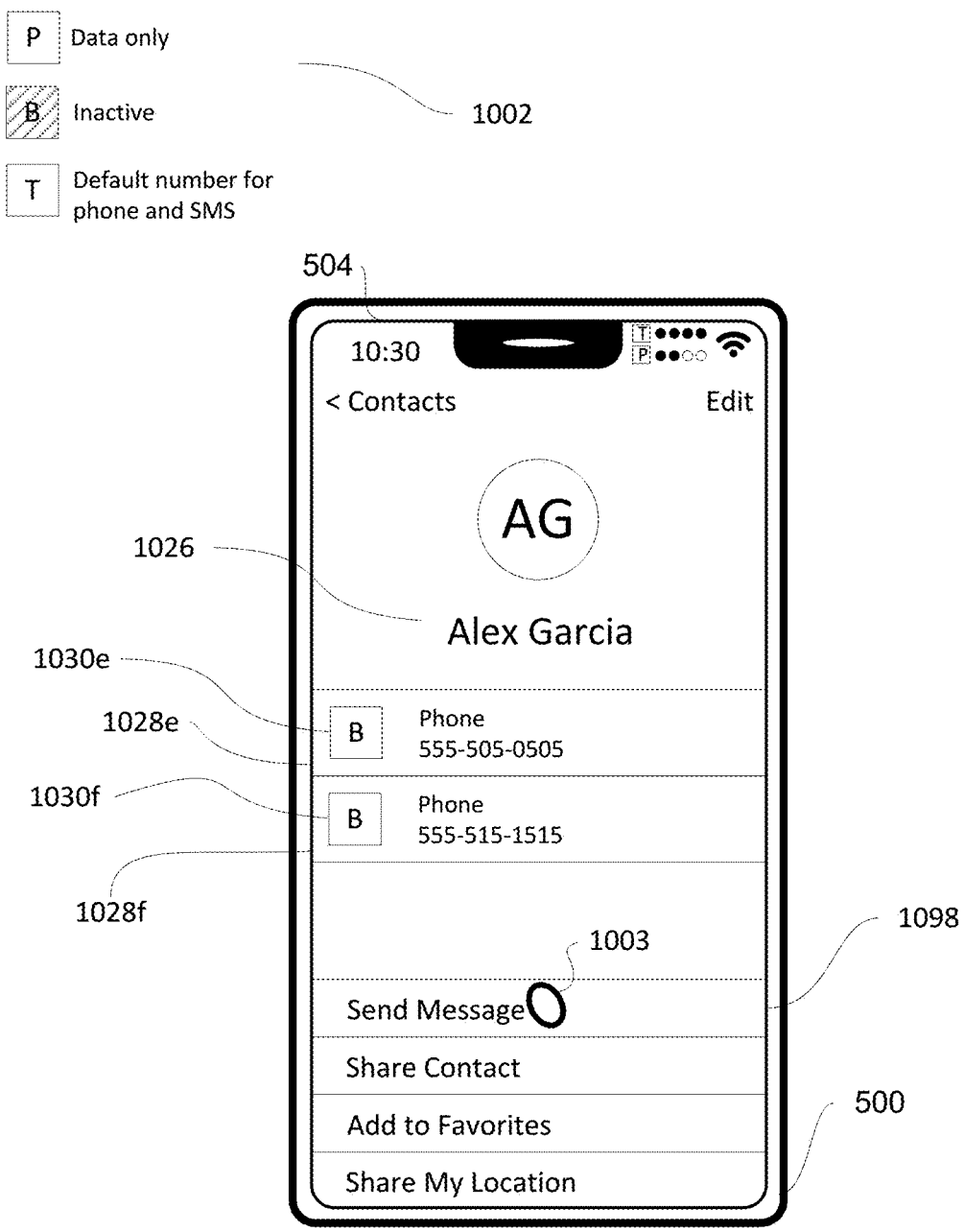
Figure 10L:
Figure 10M:
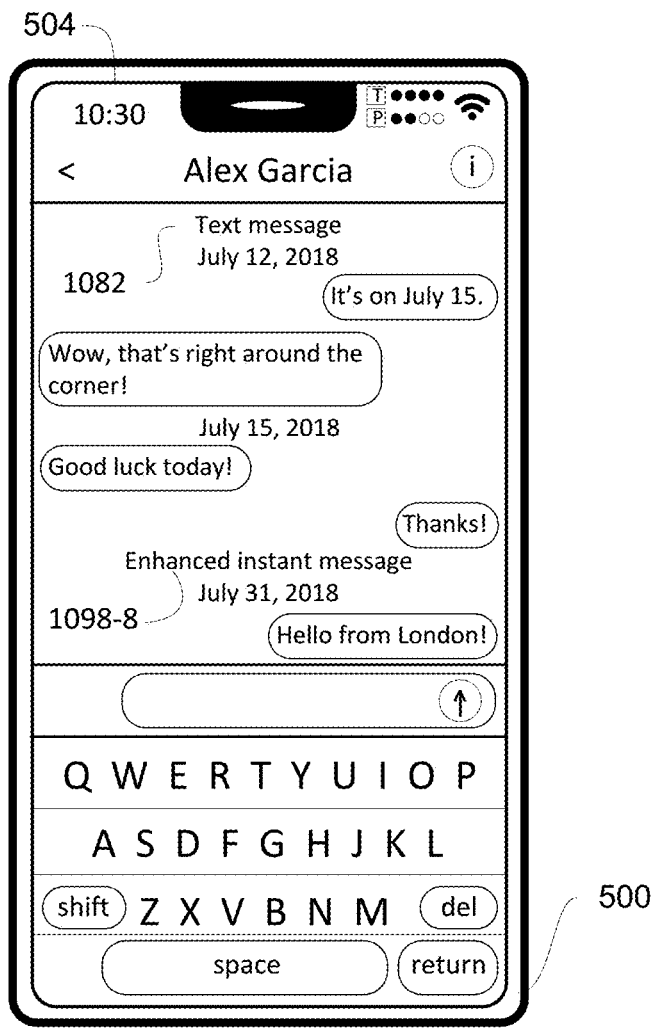

FIGS. 10H-I illustrate a contact user interface on device 500 according to some embodiments of the disclosure. The contact user interface includes an indication 1026 of the contact's name ("Mary Smith"), a first phone number 1028*a* of the contact, a first indication 1030*a* of the cellular identifier associated with the contact, a second phone number 1028*b* of the contact, a second indication 1030*b* of the cellular identifier associated with the contact and an affordance 1032 for editing the information associated with the contact. Because the "Business" cellular identifier is associated with the contact, including both phone number associated with the contact, the indications 1028*a-b* of both phone numbers each include an indication 1030*a-b* of the "Business" cellular identifier. The cellular identifier associated with the contact is optionally the cellular identifier that the electronic device 500 uses to initiate a communication with the contact unless otherwise specified by the user. As shown in FIG. 10I, the user selects (e.g., with contact 1003) the affordance 1032 for editing the information associated with the contact.

In response to the user's selection in FIG. 10I, the electronic device 500 presents a user interface for editing the information associated with the contact ("Mary Smith"), as shown in FIG. 10J. The user interface includes, among other settings for the contact, an indication 1034 of the contact whose information is to be edited and an affordance 1036 selectable to change which cellular identifier is associated with the contact. The affordance 1036 for changing the cellular identifier associated with the contact includes a visual indication 1038 of the cellular identifier that is currently set as the default for the contact (e.g., the "Business" cellular identifier). As shown in FIG. 10J, the user selects (e.g., with contact 1003) the affordance 1036 for changing the cellular identifier that is set as the default for the contact. In response to the user's selection in FIG. 10J, the electronic device 500 presents a user interface for changing the cellular identifier associated with the contact, as will be described in more detail below with reference to FIG. 10K.

FIG. 10K illustrates a user interface for changing the cellular identifier associated with a contact according to some embodiments of the disclosure. The user interface includes an indication 1040 of the contact whose information is being edited, an affordance 1042*a* selectable to use the last-used cellular identifier when initiating communication with the contact, an affordance 1042b selectable to set a first cellular identifier (e.g., the "Personal" cellular identifier) as the default cellular identifier for the contact, and an affordance 1042c selectable to set a second cellular identifier (e.g., the "Business" cellular identifier) as the default cellular identifier for the contact. The second affordance 1042b includes a visual indication 1044a of the first cellular identifier and the third affordance 1042c includes a visual indication 1044b of the second cellular identifier. As shown in FIG. 10K, the third affordance 1042c includes a check mark indicating that the electronic device 500 is presently configured to, by default, use the second cellular identifier (e.g., the "Business" cellular identifier) to initiate communication with the contact. That is to say, the electronic device 500 will use the "Business" cellular identifier to communicate with the contact except in certain situations, such as when the user requests that a different cellular identifier be used, when the type of communication is associated with a different cellular identifier (e.g., the electronic device always uses the "data only" cellular identifier for enhanced data-based messages and video conference calls), or when the cellular identifier associated with the contact is unavailable (e.g., deactivated, no service, etc). If the user were to select the "last used" affordance 1042a, then the electronic device 500 would optionally initiate communication with the contact using the cellular identifier last used by the electronic device 500 for communication with that contact. As shown in FIG. 10K, the user selects (e.g., with contact 1003) the second affordance 1042b for setting the "Personal" cellular identifier as the cellular identifier associated with the contact. Changing the setting in this way causes the electronic device 500 to initiate communication with the contact using the "Personal" cellular identifier by default, unless the user enters an input for using a different cellular identifier when initiating the communication.

As illustrated in FIG. 10L, in response to the user's selection, the electronic device 500 presents a check mark in the second affordance 1042b to indicate that the electronic device 500 is configured to initiate communication with the contact using the first cellular identifier (e.g., the "Personal" cellular identifier). FIG. 10M illustrates the contact user interface after the electronic device 500 has been configured to use the "Personal" cellular identifier when initiating communication with the contact. The contact user interface illustrated in FIG. 10M is substantially similar to the contact user interface illustrated in FIG. 10I except as noted here. The indications 1030a-b of the cellular identifier associated with the contact is updated to reflect that the cellular identifier associated with the contact is the "Personal" cellular identifier.

FIG. 10N illustrates a recent calls user interface of device 500 according to some embodiments of the disclosure. The user interface illustrated in FIG. 10N is substantially similar to the user interface illustrated in FIGS. 10D-E. As shown in FIG. 10N, the user selects (e.g., with contact 1003) affordance 1010b associated with a contact (e.g., "Alex Garcia"). The contact 1003 has an intensity 1046a exceeding a predetermined intensity threshold 1048a, and is detected for a time 1046b exceeding a predetermined time threshold 1048b. In response to the contact 1003 having these characteristics, the electronic device 500 presents the user interface illustrated in FIG. 10O. In contrast, as discussed above with reference to FIGS. 10E-F, in response to a contact that does not have the intensity 1046a and/or time 1056b characteristics, the electronic device initiates a phone call with the contact associated with the selected affordance. As shown in FIG. 10O, the electronic device 500 presents an indication 1050 of the contact to be called, an indication 1052 of the default cellular identifier for the contact (e.g., the "Business" cellular identifier), a first affordance 1054a for calling the contact with a first cellular identifier (e.g., the "Personal" cellular identifier) and a second affordance 1054b for calling the contact with a second cellular identifier (e.g., the "Business" cellular identifier). As shown in FIG. 10O, the user selects (e.g., with contact 1003) the first affordance 1054a to call the contact using the "Personal" cellular identifier, which is not the cellular identifier associated with the contact.

In response to the user's selection in FIG. 10O, the electronic device 500 makes the phone call using the selected cellular identifier. FIG. 10P illustrates a phone user interface according to some embodiments of the disclosure. The phone user interface illustrated in FIG. 10P is substantially similar to the phone user interface illustrated in FIG. 10F, except the visual indication 1020 of the cellular identifier being used for the phone call is an indication of the "Personal" cellular identifier, because that is the cellular identifier the user selected for use to complete the phone call. As shown in FIG. 10P, the legend 1002 indicates that the "Personal" cellular identifier is in use and the "Business" cellular identifier is disabled. As discussed above, in some embodiments, during a phone call, other cellular identifiers not used for the phone call are disabled on the electronic device 500. In some embodiments, the other cellular identifiers remain enabled during the phone call.

FIGS. 10Q-S illustrate a dialer user interface according to some embodiments of the disclosure. The dialer user interface includes an affordance 1054 selectable to toggle the cellular identifier to be used to place the phone call, a text entry field 1056, a keypad 1058, and an affordance 1060 for placing the phone call. The affordance 1054 for toggling the cellular identifier to be used to place the phone call includes an indication 1062 of the cellular identifier (e.g., the "Personal" cellular identifier) that will be used to place the call when the user selects the affordance 1060 for placing the phone call. In some embodiments, the electronic device 500 first presents the indication 1062 of the cellular identifier that is the default number for phone and SMS when the phone number entered into the text entry field 1056 is not associated with a contact with which a different cellular identifier is associated. If, for example, the user enters the phone number for a contact associated with the "Business" cellular identifier, the affordance 1054 would be updated to include the indication of the "Business" cellular identifier in response to the entry of the phone number, and absent any further user input for using the "Business" cellular identifier to place the phone call. As shown in FIG. 10Q, a phone number is entered into the text entry field 1056. In some embodiments, the user is able to enter the phone number using keypad 1058 or paste the phone number into the text entry field 1056 with a user input. As shown in FIG. 10R, the user selects (e.g., with contact 1003) the affordance 1054 for toggling the cellular identifier to be used to place the phone call. In response to the user input, the user interface is updated as illustrated in FIG. 10S to display an indication 1062 of a different cellular identifier (e.g., the "Business" cellular identifier) to be used to place the phone call when the user selects the "call" affordance 1060.

FIG. 10T illustrates another dialer user interface according to some embodiments of the disclosure. The dialer user interface illustrated in FIG. 10T is substantially similar to the user interface illustrated in FIGS. 10Q-S, except it does not include the same affordance for toggling which cellular identifier will be used to place the phone call. After entering the phone number into the text entry field 1056, such as with keypad 1058, the user selects (e.g., with contact 1003) the "call" affordance 1060. The contact 1003 that selects the "call" affordance has an intensity 1046a that exceeds a predetermined intensity threshold 1048a, and is detected for a time 1046b that exceeds a predetermined time threshold 1048b. In response to the selection with the contact 1003 having one or more of these characteristics, the electronic device 500 presents the user interface illustrated in FIG. 10U. If, instead, the electronic device 500 detects a contact at the "call" affordance 1060 that does not have the intensity 1046a and/or time 1056b characteristics (e.g., the electronic device detects a tap), the electronic device 500 places the phone call using the default number for phone and SMS (e.g., the "Personal" cellular identifier) without presenting the user interface illustrated in FIG. 10U.

As illustrated in FIG. 10U, in response to the selection of the "call" affordance 1060 with the contact 1003 having the time and/or intensity characteristics in FIG. 10T, the electronic device 500 presents a plurality of affordances 1064a-d for various ways of calling the phone number. The first affordance 1064a is selectable to place the phone call using a first cellular identifier (e.g., the "Primary" cellular identifier), the second affordance 1064b is selectable to place the phone call using a second cellular identifier (e.g., the "Business" cellular identifier), the third affordance 1064c is selectable to place the phone call using cellular data (e.g., "data-based Audio"), and the fourth affordance 1064d is selectable to place the phone call as a video conference call (e.g., "data-based Video") using cellular data. In some embodiments, the phone call placed with cellular data and the video conference call are conducted using the cellular identifier that is the default number for phone and SMS, such as the "Personal" cellular identifier, as indicated in legend 1002. Alternatively, in some embodiments, when a cellular identifier is set as a "data" cellular identifier, data-based calls and video conference calls are conducted with the data cellular identifier.

FIGS. 10V-X illustrate a messaging user interface according to some embodiments of the disclosure. In some embodiments, the user interface illustrated in FIGS. 10V-X is presented when the user creates a new thread with a phone number or a group of phone numbers that the electronic device 500 does not have an existing messaging thread with. The messaging user interface includes a text entry field 1066 for entering a phone number to send the message to, an affordance 1068 selectable to toggle the cellular identifier for sending the message, and a keypad 1070. The affordance 1068 for toggling the cellular identifier to be used to send the message includes an indication 1072 of the cellular identifier (e.g., the "Personal" cellular identifier) that will be used to send the message. As shown in FIG. 10V, a phone number is entered into the text entry field 1066. In some embodiments, the user is able to enter the phone number using the keyboard 1070 which optionally includes numeric soft keys, or paste the phone number into the text entry field 1066 with a user input. In some embodiments, the electronic device 500 first presents the indication 1042 of the cellular identifier that is the default number for phone and SMS when the phone number entered into the text entry field 1066 is not associated with a contact with which a different cellular identifier is associated. If, for example, the user enters the phone number for a contact associated with the "Business" cellular identifier with whom there is no existing messaging thread, the affordance 1068 would be updated to include the indication of the "Business" cellular identifier in response to the entry of the phone number, and absent any further user input for using the "Business" cellular identifier to send the message. As shown in FIG. 10W, the user selects (e.g., with contact 1003) the affordance 1068 for toggling the cellular identifier to be used to send the message. In response to the user input, the user interface is updated as illustrated in FIG. 10X to display an indication 1072 of a different cellular identifier (e.g., the "Business" cellular identifier) to be used to send the message.

FIG. 10Y illustrates a message inbox user interface. The message inbox user interface includes a plurality of indications 1074a-c of messaging conversations on the electronic device 500. Each indication 1074a-c includes an indication of a contact 1076a-c that the conversation is with and an indication 1078a-c of the cellular identifier used for the messaging conversation. As shown in FIG. 10Y, the user selects (e.g., with contact 1003) an affordance 1074b associated with a messaging conversation with "John Brown" that is being conducted with the "Personal" cellular identifier. In response to the selection, the electronic device presents a messaging user interface illustrated in FIG. 10Z.

As shown in FIG. 10Z, the messaging user interface includes an indication of the type of message being sent 1080, which is a data-based enhanced message (e.g., an enhanced instant message). As indicated by the legend 1002 of FIG. 10Z, the "Personal" cellular identifier is in use to send and receive messages in the displayed conversation. Because the contact "John Brown" is associated with the "Personal" cellular identifier and because the "Personal" cellular identifier is the default number used for phone and SMS, the message conversation is conducted using the data-based enhanced messaging service. In some embodiments, the cellular identifier that is the default number for phone and SMS is always used for sending and receiving data-based enhanced messages, even for contacts that are associated with a different cellular identifier.

FIG. 10AA illustrates the message inbox user interface, which is substantially similar to the message inbox user interface illustrated in FIG. 10Y. As shown in FIG. 10AA, the user selects (e.g., with contact 1003) an affordance 1074c associated with a messaging conversation with "Alex Garcia" that is being conducted with the "Business" cellular identifier. In response to the selection, the electronic device presents a messaging user interface illustrated in FIG. 10BB.

As shown in FIG. 10BB, the messaging user interface includes an indication of the type of message being sent 1082, which is a text message (e.g., as opposed to a data-based enhanced message, as in FIG. 10Z). As indicated by the legend 1002 of FIG. 10BB, the "Business" cellular identifier is in use to send and receive messages in the displayed conversation. Because the contact "Alex Garcia" is associated with the "Business" cellular identifier and because the "Personal" cellular identifier is the default number used for phone and SMS, the message conversation is conducted using text messages rather than data-based enhanced messages. In some embodiments, the cellular identifier that is the default number for phone and SMS is always used for sending and receiving data-based enhanced messages. When a contact is associated with a cellular identifier that is not the default number for phone and SMS, the electronic device 500 sends and receives messages to the contact using text messages in the absence of a user input to instead send a data-based enhanced message with the cellular identifier that is the default number for phone and SMS.

FIG. 10CC illustrates a home screen user interface of device 500 according to some embodiments of the disclosure, such as in FIG. 4A. The home screen includes a plurality of icons 424-450 selectable to launch various applications on the electronic device 500. As illustrated in FIG. 10CC, the electronic device 500 detects an input (e.g., downward swipe of contact 1203 from the upper-right border of touch screen 504) for presenting a control user interface on device 500, as illustrated in FIGS. 10DD-10GG.

FIGS. 10DD-10GG illustrate a control user interface according to some embodiments of the disclosure. The control user interface includes a plurality of affordances for controlling operation of device 500. The control user interface includes affordances for activating various operation modes of the electronic device, such as an airplane mode affordance for activating or deactivating airplane mode, a Wi-Fi affordance for activating or deactivating Wi-Fi on the electronic device, a Bluetooth affordance for activating or deactivating Bluetooth on the electronic device, Do Not Disturb affordance for activating or deactivating a Do Not Disturb mode on the electronic device, and a rotation lock affordance for preventing or allowing the image displayed on the electronic device 500 to rotate in response to rotation of the electronic device. The control user interface further includes a number of affordances for changing a setting of the electronic device, such as a brightness affordance for changing the display brightness and a volume affordance for changing the volume of the electronic device. The control user interface further includes a media player affordance selectable to launch a plurality of media player controls on the electronic device 500.

As illustrated in FIG. 10DD, the control user interface further includes a cellular settings affordance 1084. As shown in FIG. 10EE, the user selects (e.g., with contact 1003) the cellular settings affordance 1084. The contact 1003 has an intensity 1046a that exceeds a predetermined intensity threshold 1048a, and is detected for a time 1046b that exceeds a predetermined intensity threshold 1048b. If, alternatively, the electronic device 500 detects a contact at affordance 1084 that does not have the intensity 1046a and/or the time 1046b illustrated in FIG. 10EE, the electronic device deactivates cellular data on all cellular identifiers in response to the selection if the cellular identifiers are active when the input is detected. In some embodiments, if the selection is detected when cellular data is turned off on all cellular identifiers, the electronic device 500 activates cellular data in response to the selection. In response to the input having the characteristic(s) described, the electronic device presents a list 1086 of the cellular identifiers available to the electronic device 500. The list 1086 includes the label of each cellular identifier (e.g., "Personal," "Business," and "Travel"), an indication 1088a-c of each cellular identifier, and an indication of the status of each cellular identifier. As shown in FIG. 10FF, the status of the "Personal" cellular identifier is "default number for phone and SMS", the status of the "Business" cellular identifier is "secondary number for phone and SMS," the status of the "Travel" cellular identifier is "Inactive". The list also includes an affordance 1090 selectable to activate the "Travel" cellular identifier.

The user selects (e.g., with contact 1003) the affordance 1090 for activating the "Travel" cellular identifier. As shown in the legend 1002 of FIG. 10GG, in response to the selection, the "Travel" cellular identifier is set as the "Default number for phone and SMS," the "Personal" cellular identifier is set as "Data only," and the "Business" cellular identifier is "Inactive." In some embodiments, when a cellular identifier is newly-activated (e.g., such as the "Travel" cellular identifier), it is automatically configured as the default number for phone and SMS. In some embodiments, the cellular identifier that was previously the primary number for phone and SMS (e.g., the "Personal" cellular identifier) becomes configured as "data only." In some embodiments, the cellular identifier that was previously the secondary number for phone and SMS (e.g., the "Business" cellular identifier) becomes inactive.

FIG. 10HH illustrates a recent calls user interface that is substantially similar to the recent calls user interfaces described above with reference to FIGS. 10D, 10E, and 10N. As indicated by the legend 1002 of FIG. 10HH, the "Business" cellular identifier, which is associated with the contact "Alex Garcia", is inactive on the electronic device 500. The user selects (e.g., with contact 1003) the affordance 1010b associated with a recent call from "Alex Garcia." In some embodiments, in response to the selection, the electronic device presents the user interface illustrated in FIG. 10II. The user interface includes a warning 1092 that the default cellular identifier for the contact is unavailable on the electronic device, and a "Cancel" affordance 1094 selectable to navigate back to the previously-displayed user interface (e.g., the recent calls user interface). In some embodiments, in response to the selection in FIG. 10HH, the electronic device 500 instead presents the user interface illustrated in FIG. 10JJ. The user interface includes a warning 1092 that the default cellular identifier for the contact is unavailable on the electronic device, a "Cancel" affordance 1094 selectable to navigate back to the previously-displayed user interface (e.g., the recent calls user interface), and an affordance 1096 selectable to place the phone call using a different cellular identifier (e.g., the "Travel" cellular identifier) that is active on the electronic device.

FIG. 10KK illustrates a contacts user interface that is substantially similar to the contacts user interfaces illustrated in FIGS. 10H, 10I, and 10M. The contacts user interface includes an indication 1026 of the name of the contact, an indication 1028e of a first phone number of the contact, an indication 1028f of a second phone number of the contact, a first indication 1030e of the cellular identifier (e.g., "Business") associated with the contact, and a second indication 1030f of the cellular identifier (e.g., "Business") associated with the contact. Because the contact is associated with the "Business" cellular identifier, both phone numbers of the contact are associated with the "Business" cellular identifier and the indications 1028e-f of both phone numbers each include an indication 1030e-f of the "Business" cellular identifier. The user interface further includes an affordance 1098 selectable to send a message to the contact. As shown in FIG. 10KK, the user selects (e.g., with contact 1003) the affordance 1098. In response to the selection, the electronic device 500 presents a plurality of affordances 1098-2, 1098-4, and 1098-6 selectable to send the message to the contact. The first affordance 1098-2 is selectable to send an SMS to the contact. The second affordance 1098-4 is selectable to send a data-based enhance message (e.g., an enhanced instant message) to the contact. The third affordance 1098-6 is selectable to send an e-mail to the contact. As shown in FIG. 10LL, the user selects (e.g., with contact 1003) the second affordance to send a data-based enhanced message to the contact.

FIG. 10MM illustrates a messaging user interface that is substantially similar to the messaging user interface illustrated in FIG. 10BB and this is displayed in response to the selection detected in FIG. 10LL. As indicated by the legend 1002 of FIG. 10MM, the "Personal" cellular identifier is in use to send and receive messages in the displayed conversation. Although the contact "Alex Garcia" is associated with the "Business" cellular identifier, because the user entered an input to send a data-based enhanced message to "Alex Garcia", the message is sent with the "data only" cellular identifier. The user interface displays previous messages that were sent and received as text messages, as indicated by indication 1082. These text messages were sent and received using the "Business" cellular identifier while it was active, because it is the default cellular identifier for the contact. The user interface also displays an indication 1098-8 that the recently-sent message is a data-based enhanced message (e.g., an enhanced instant message) in accordance with the user's input in FIG. 10LL.

Figure 11A:
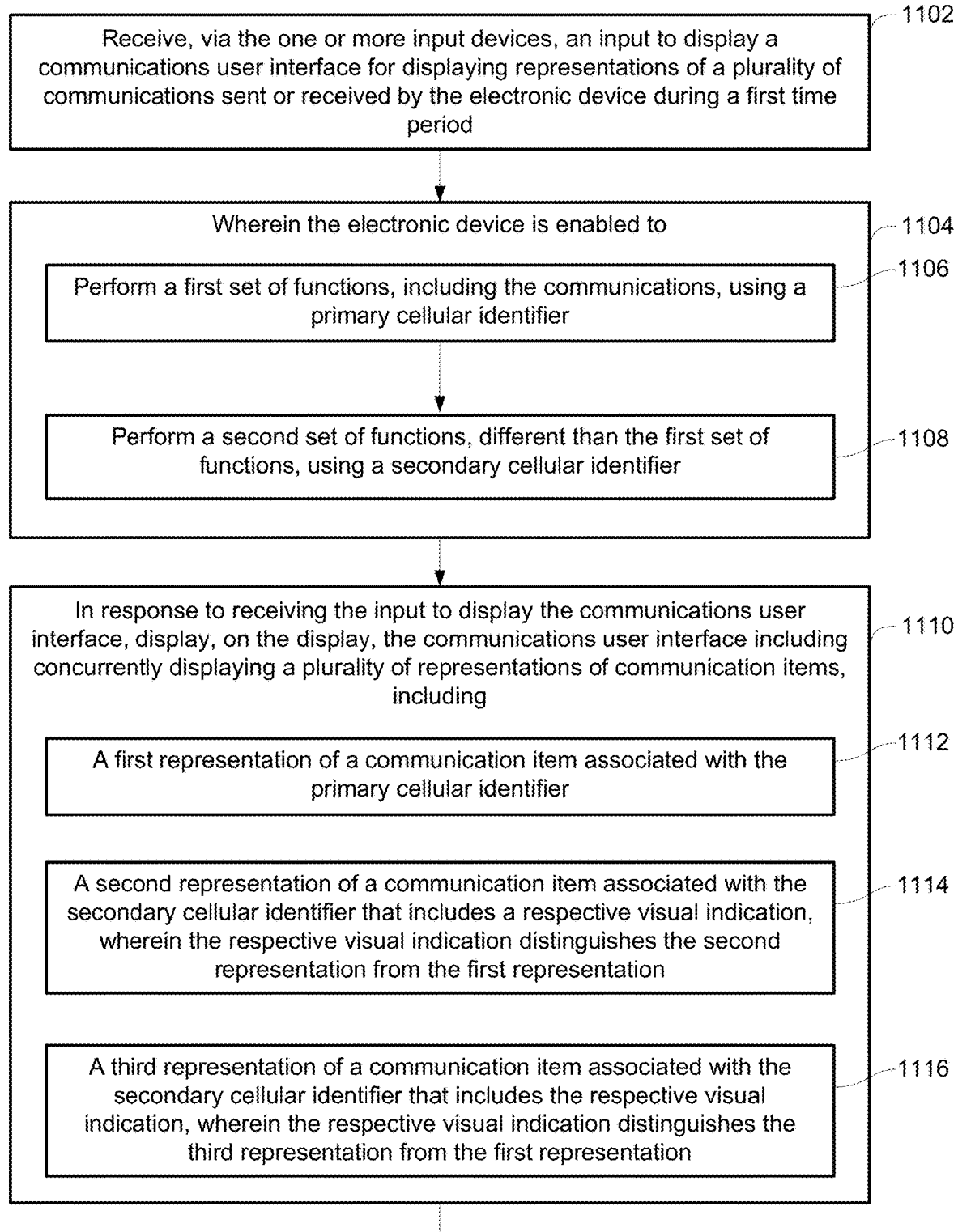
FIGS. 11A-11Q are flow diagrams illustrating a method of presenting visual indications of cellular identifiers in relation to communication functions in accordance with some embodiments of the disclosure.
Figure 11B:
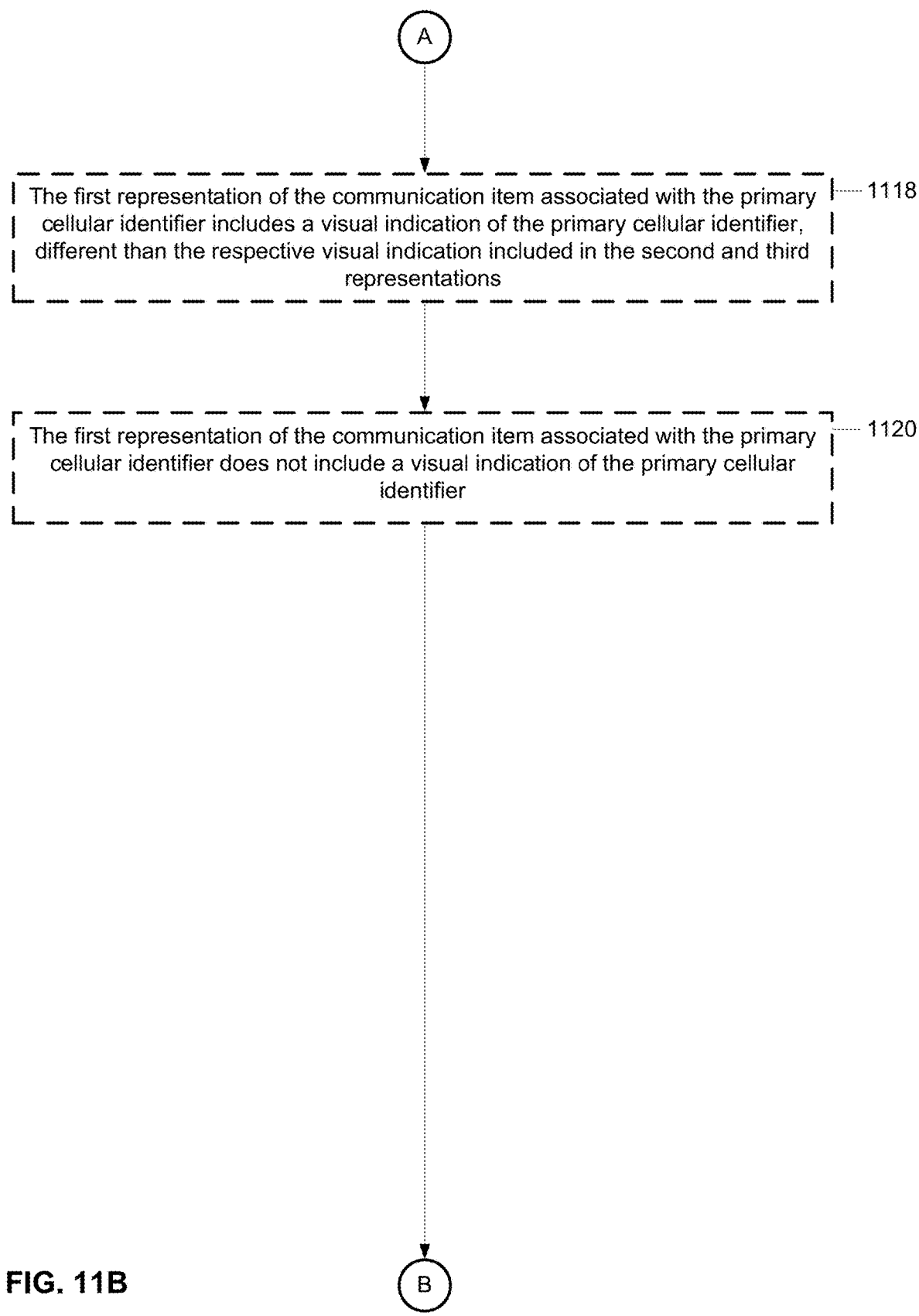
Figure 11C:
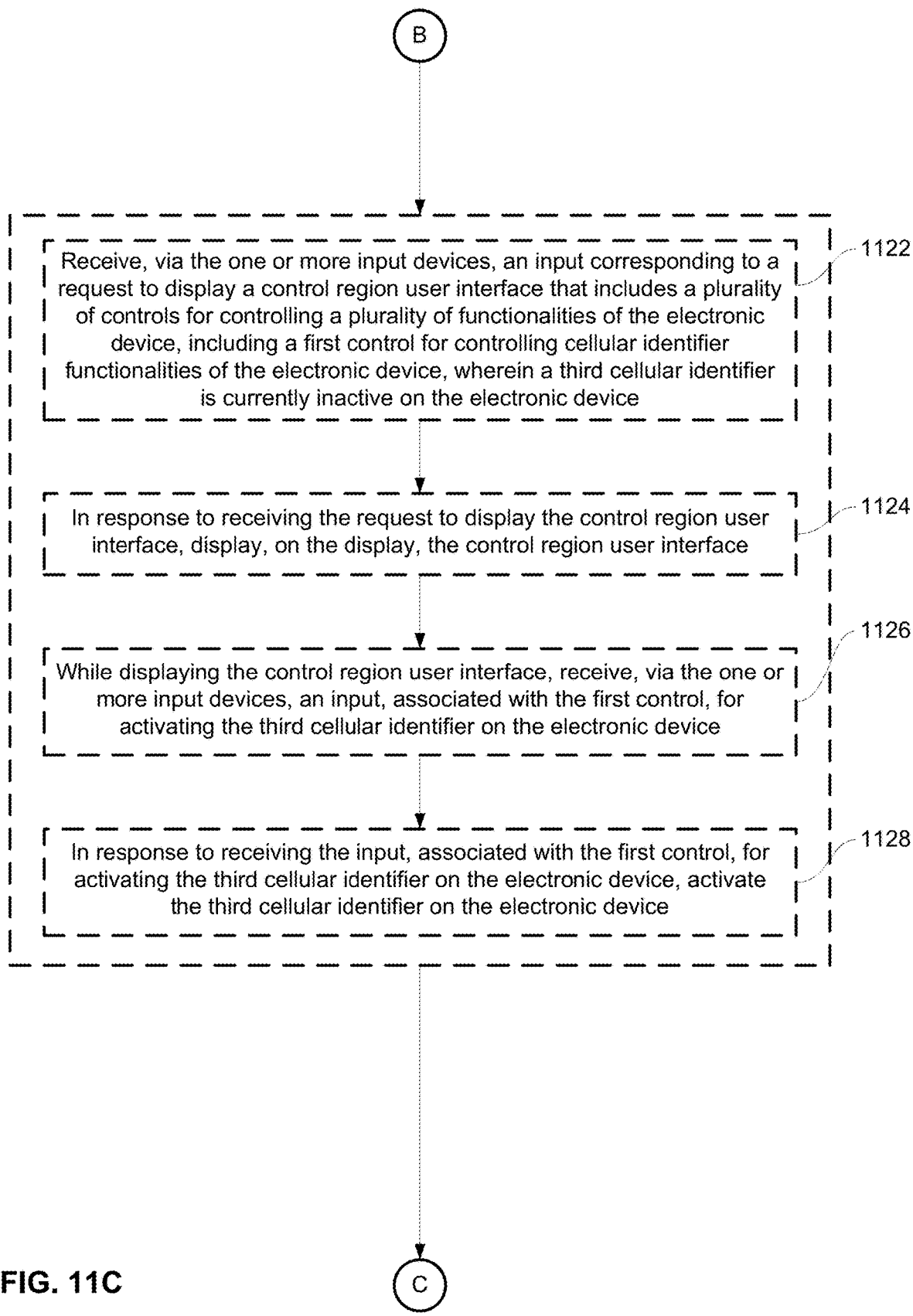
Figure 11D:
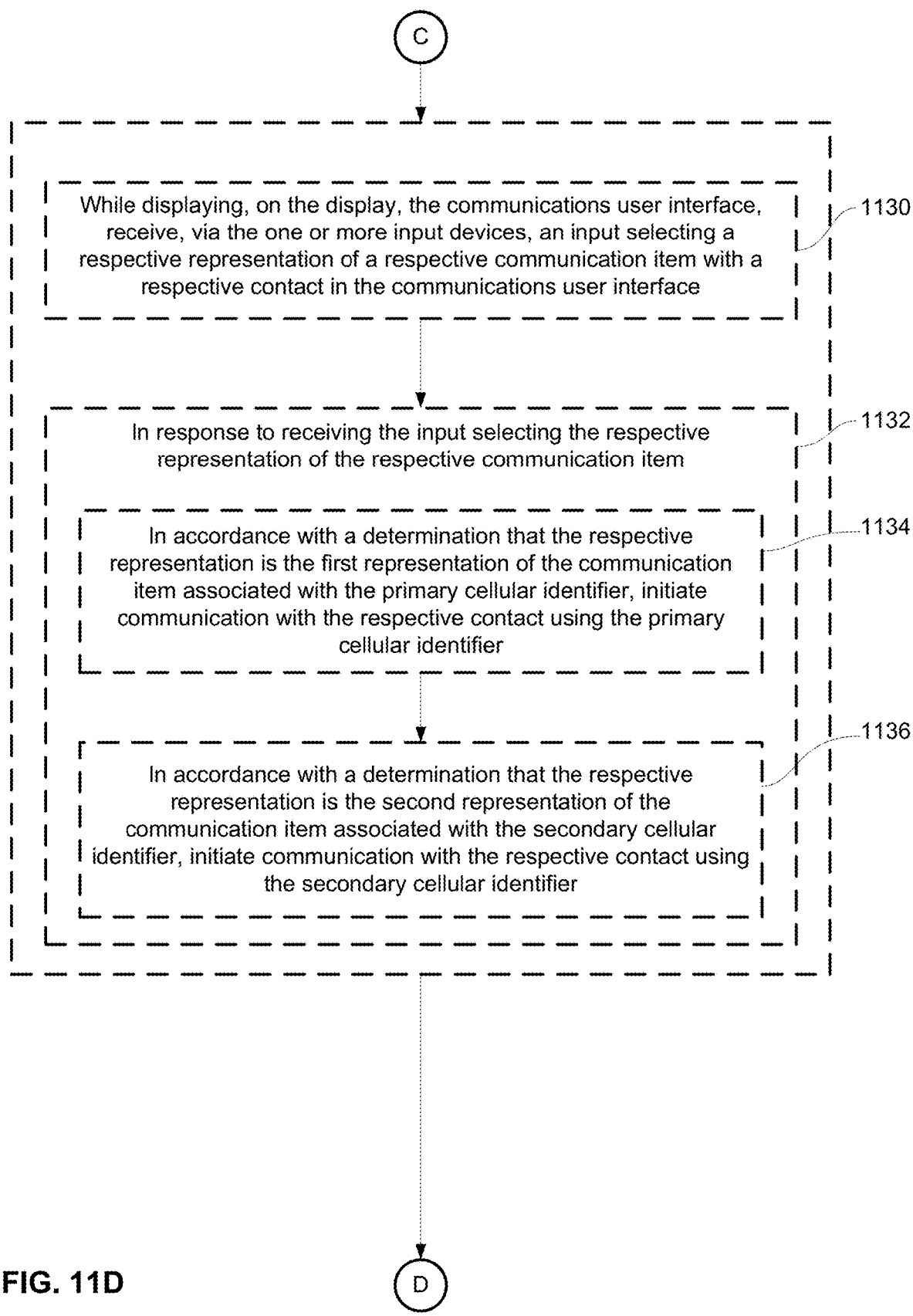
Figure 11E:
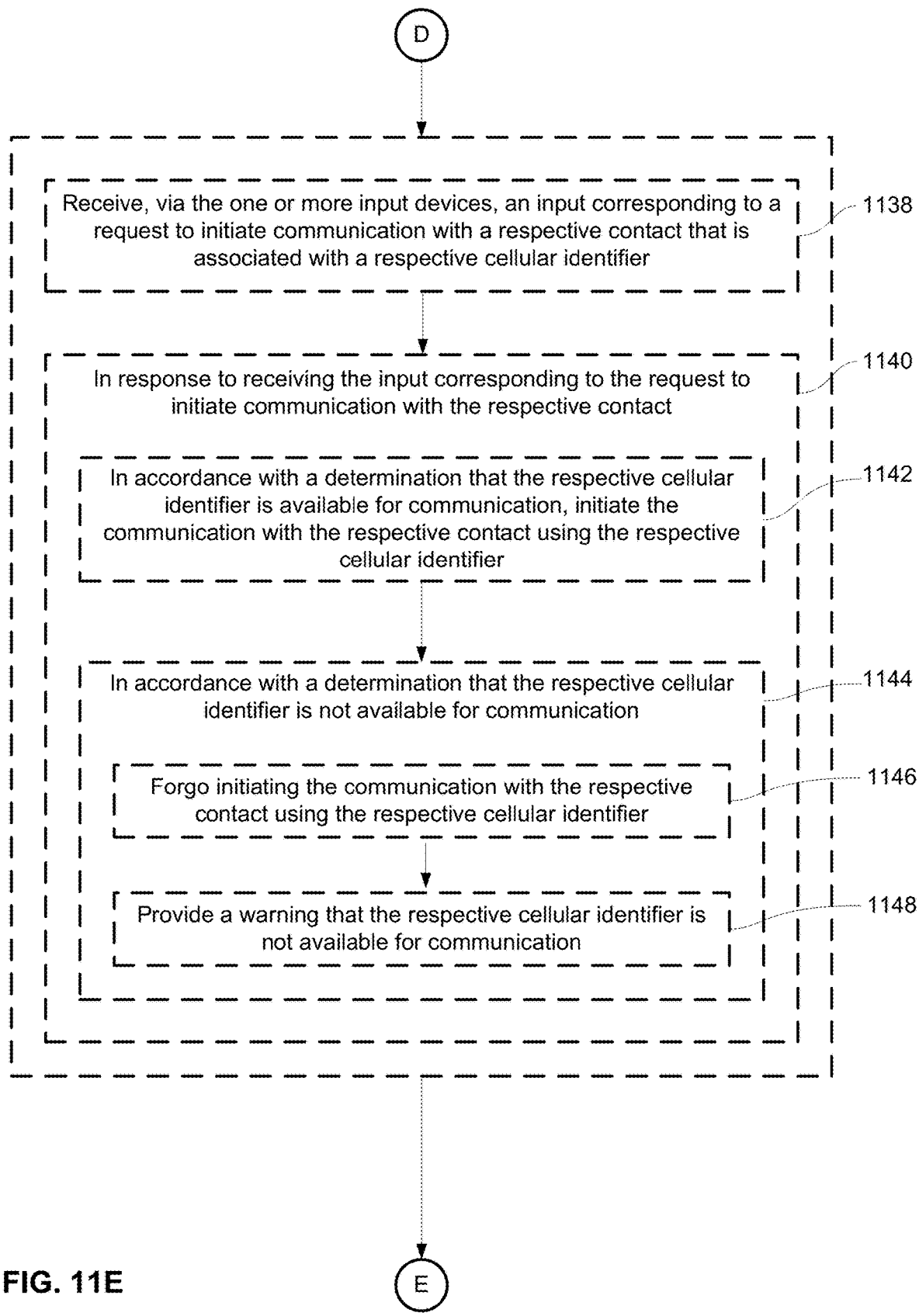
Figure 11F:
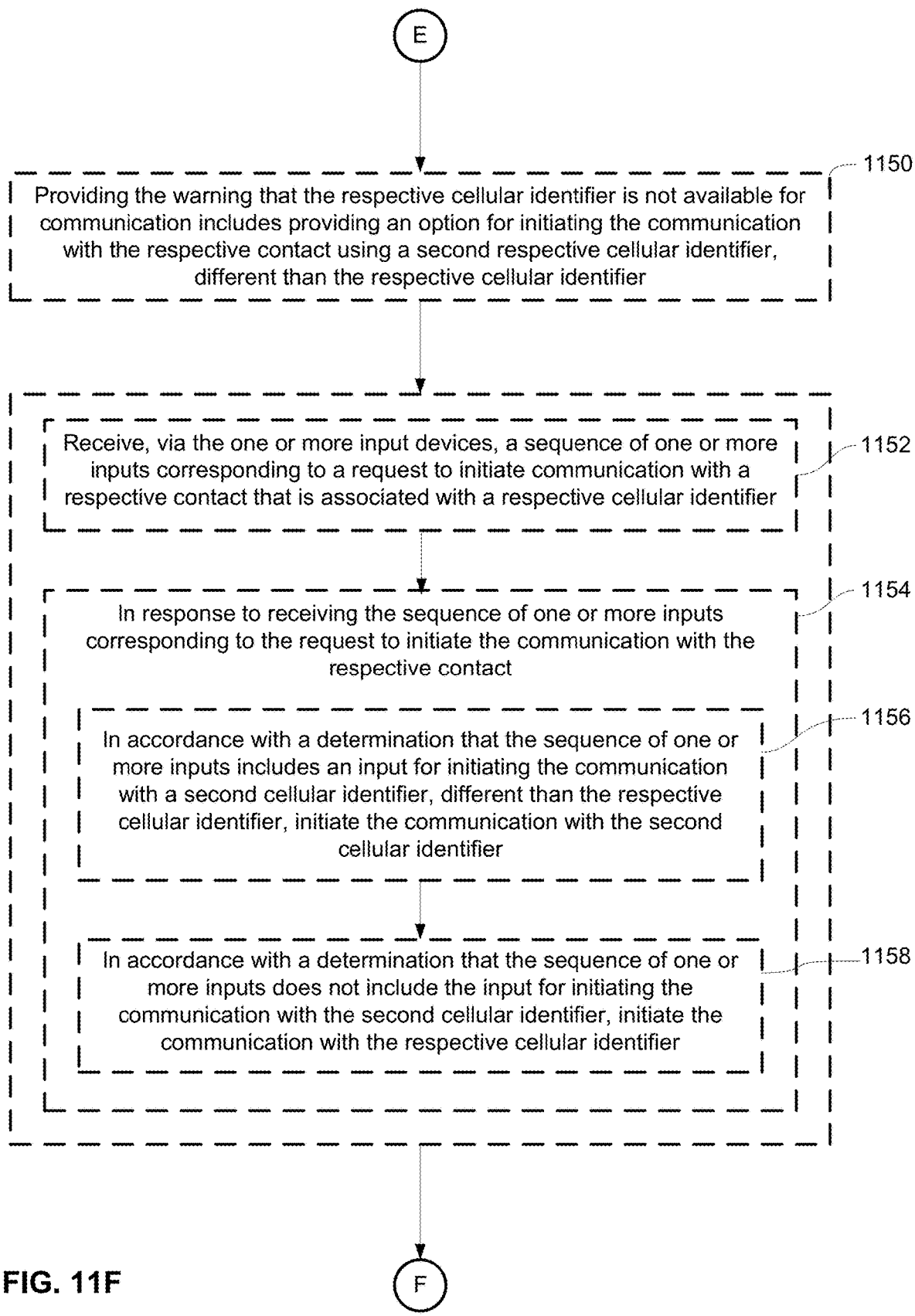
Figure 11G:
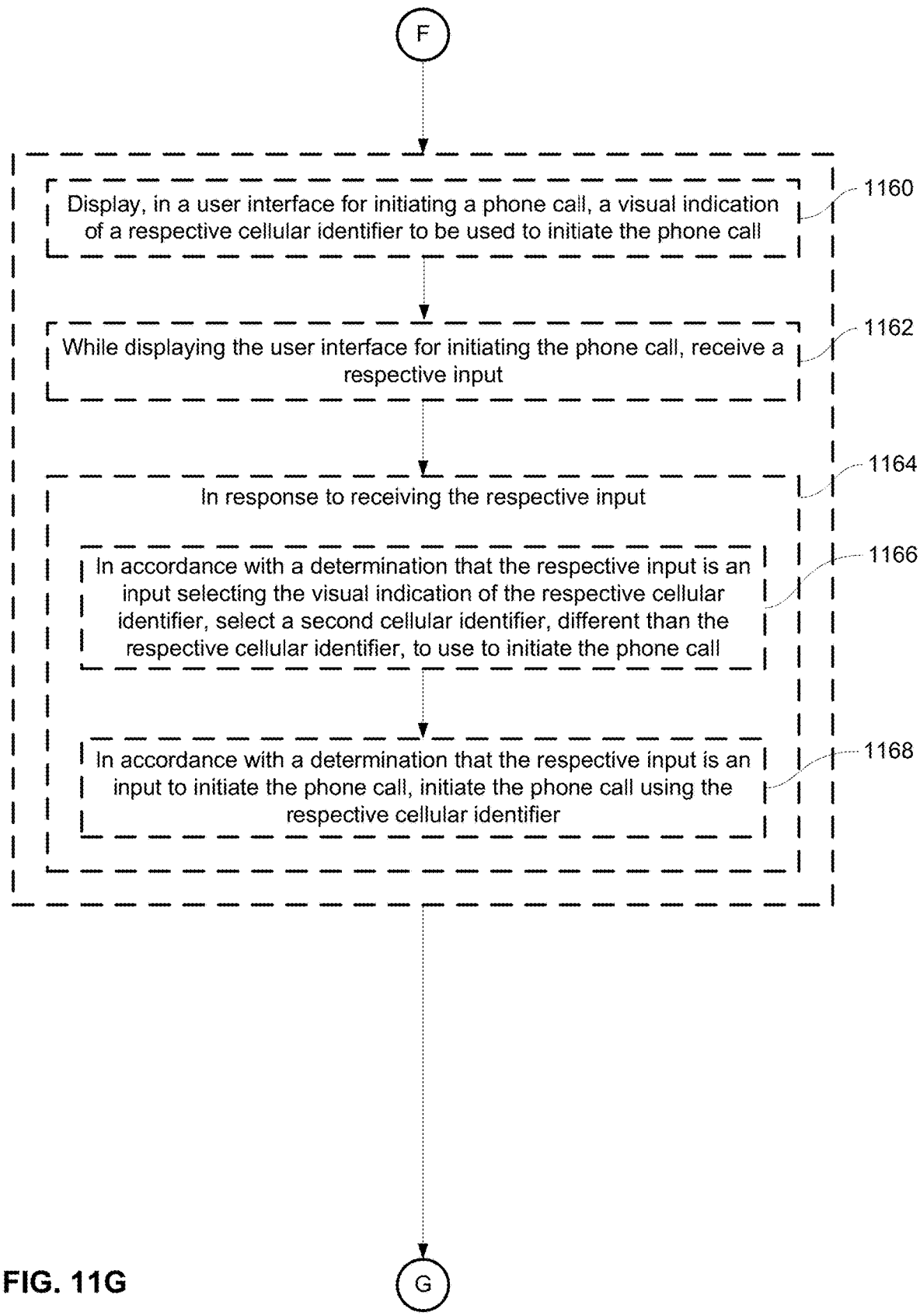
Figure 11H:
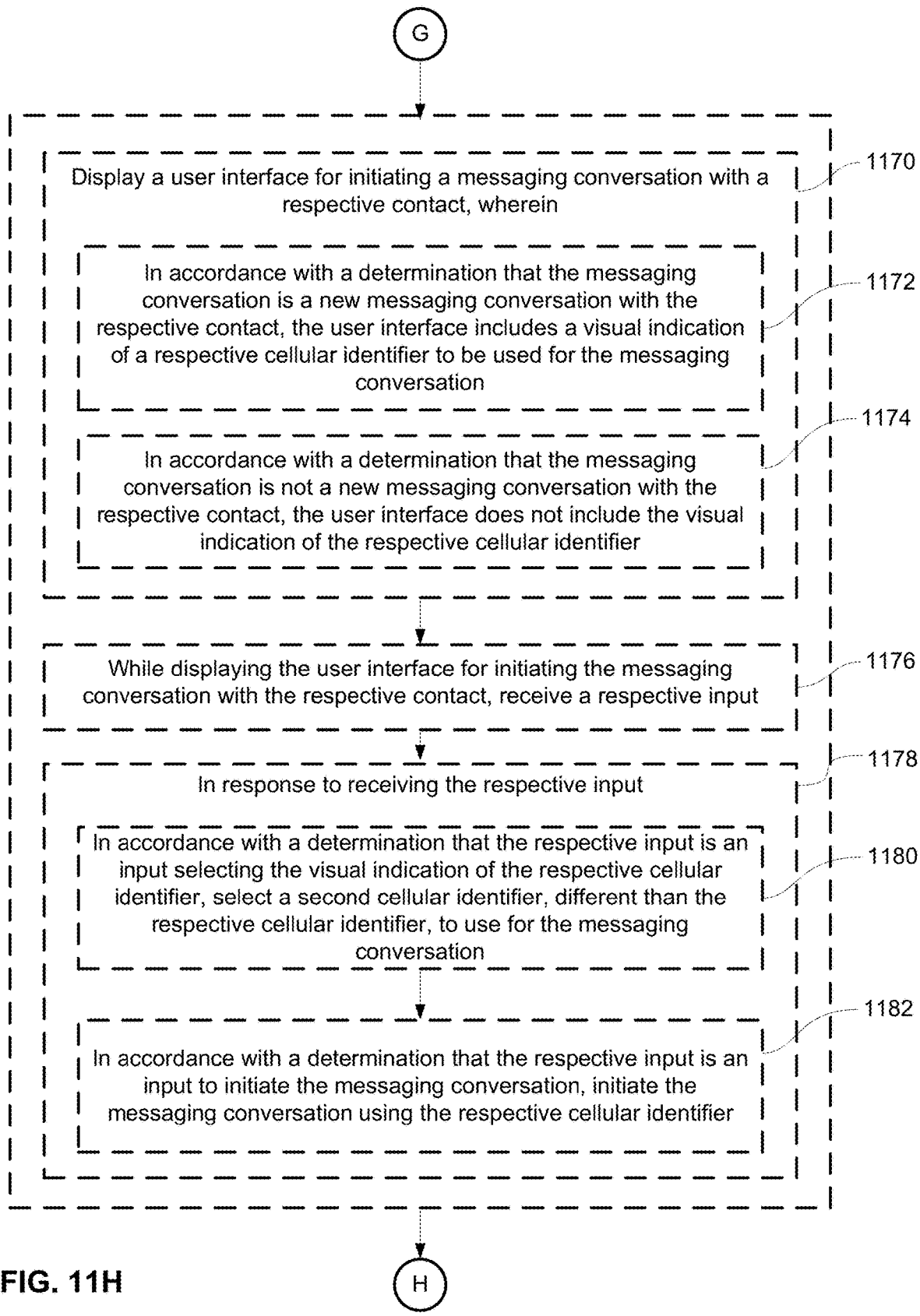
Figure 11I:
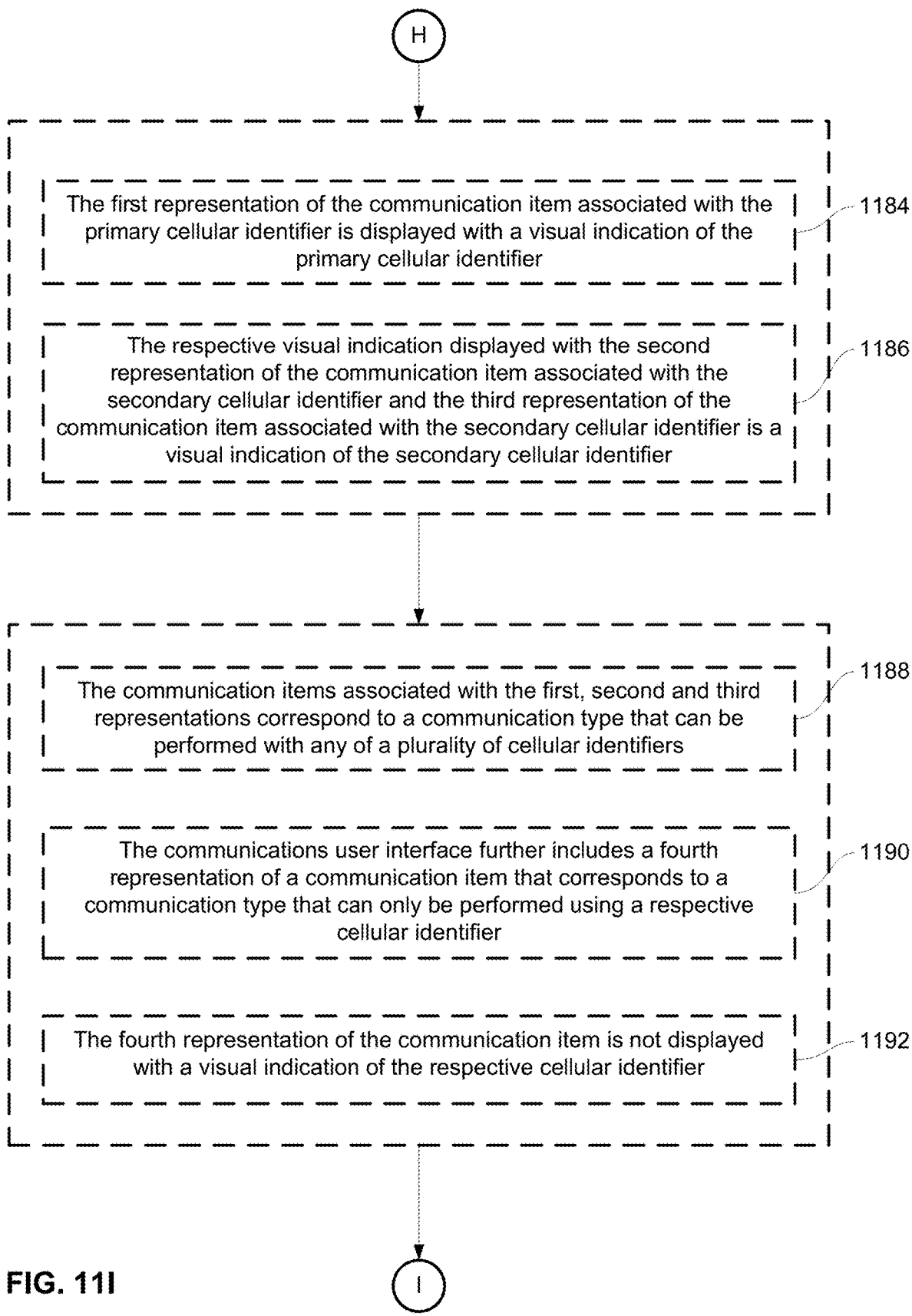
Figure 11J:
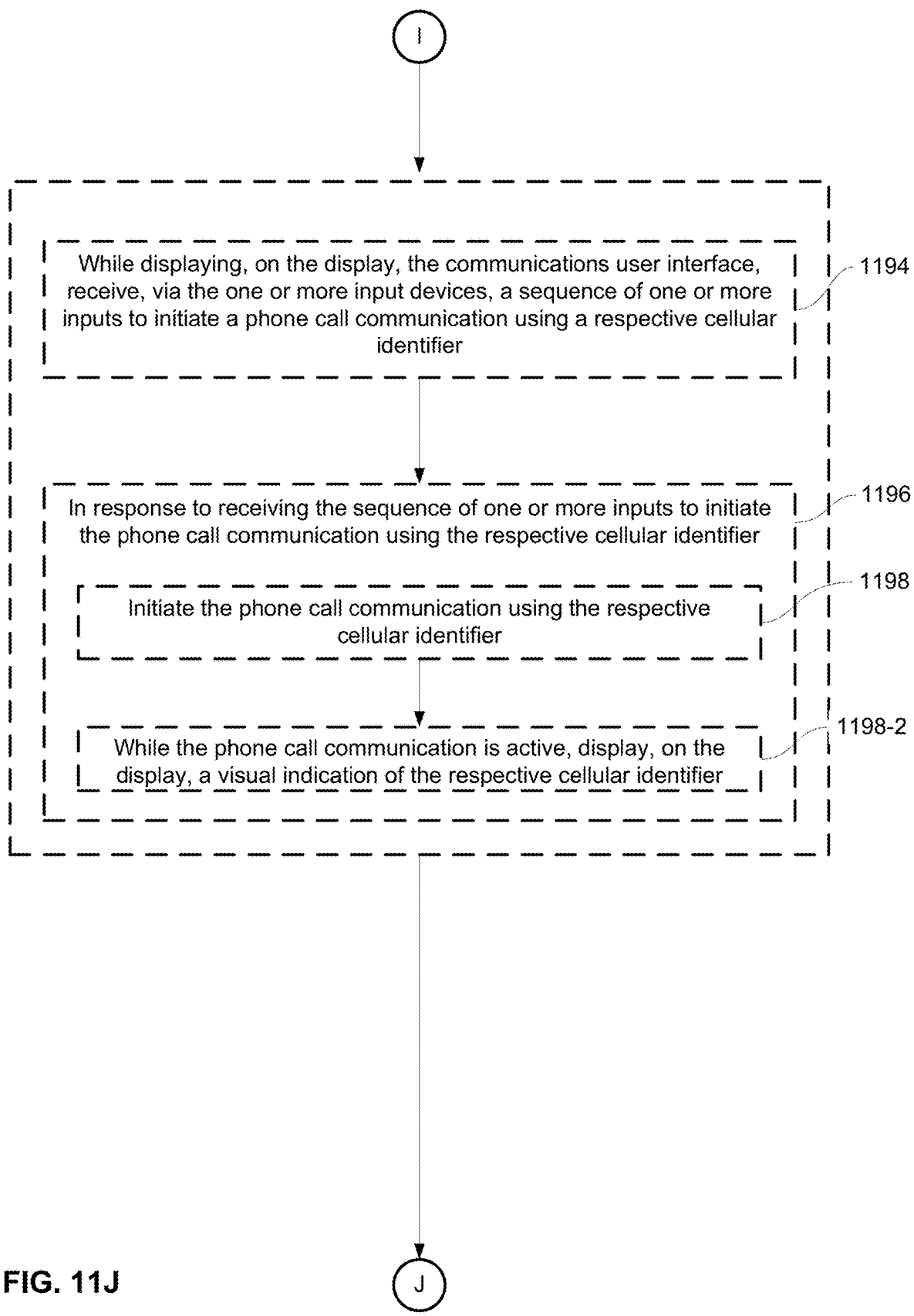
Figure 11K:
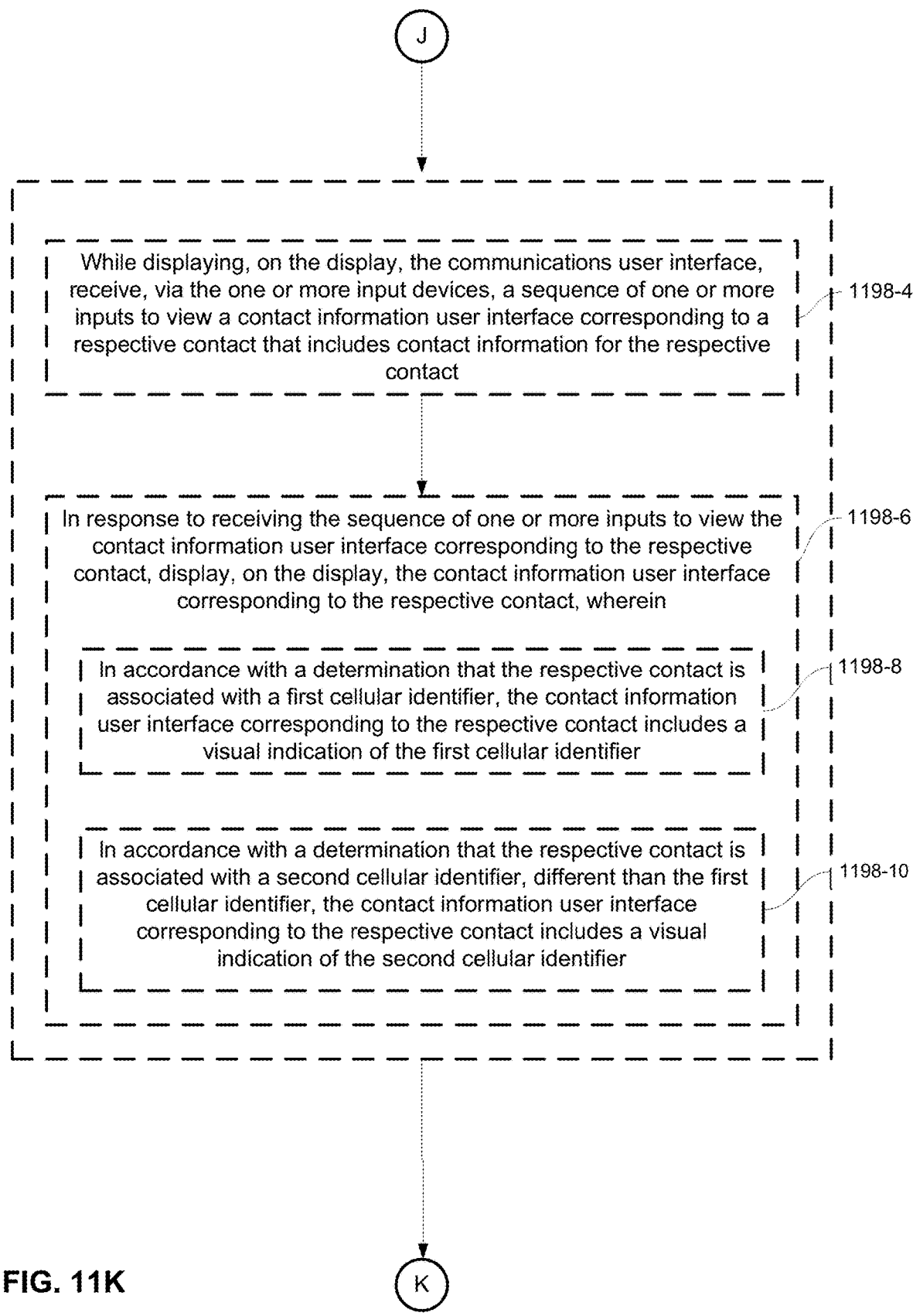
Figure 11L:
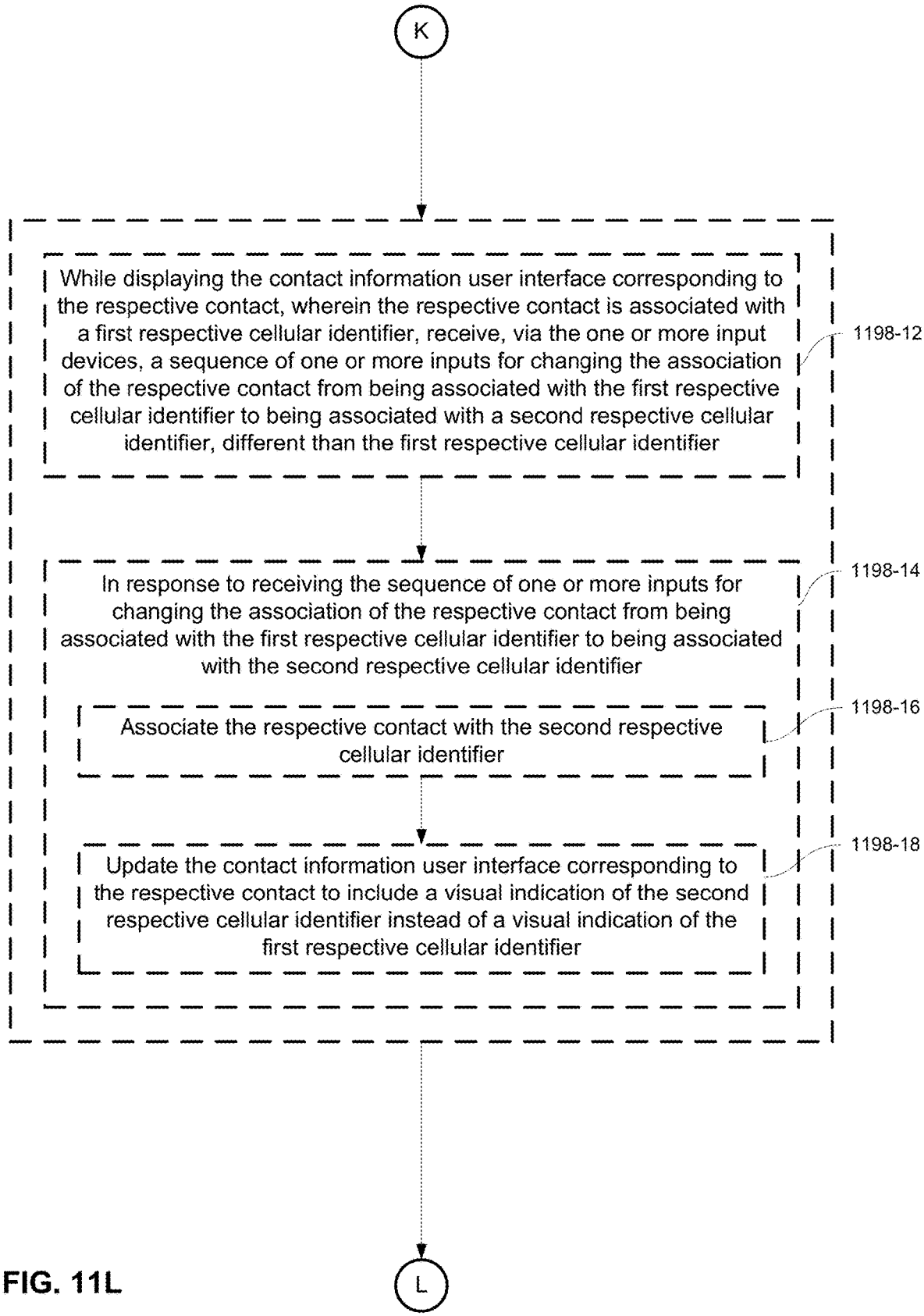
Figure 11M:
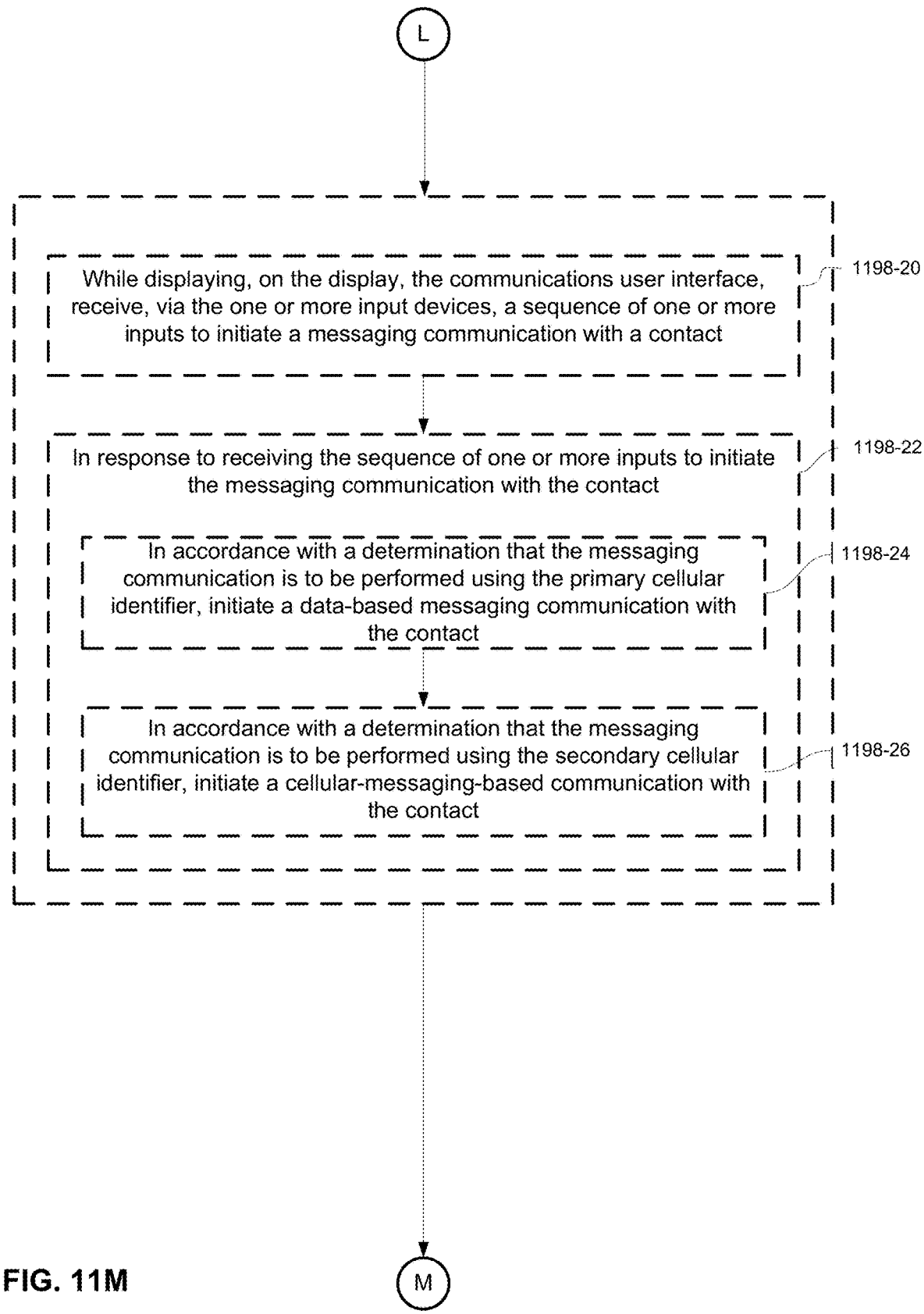
Figure 11N:
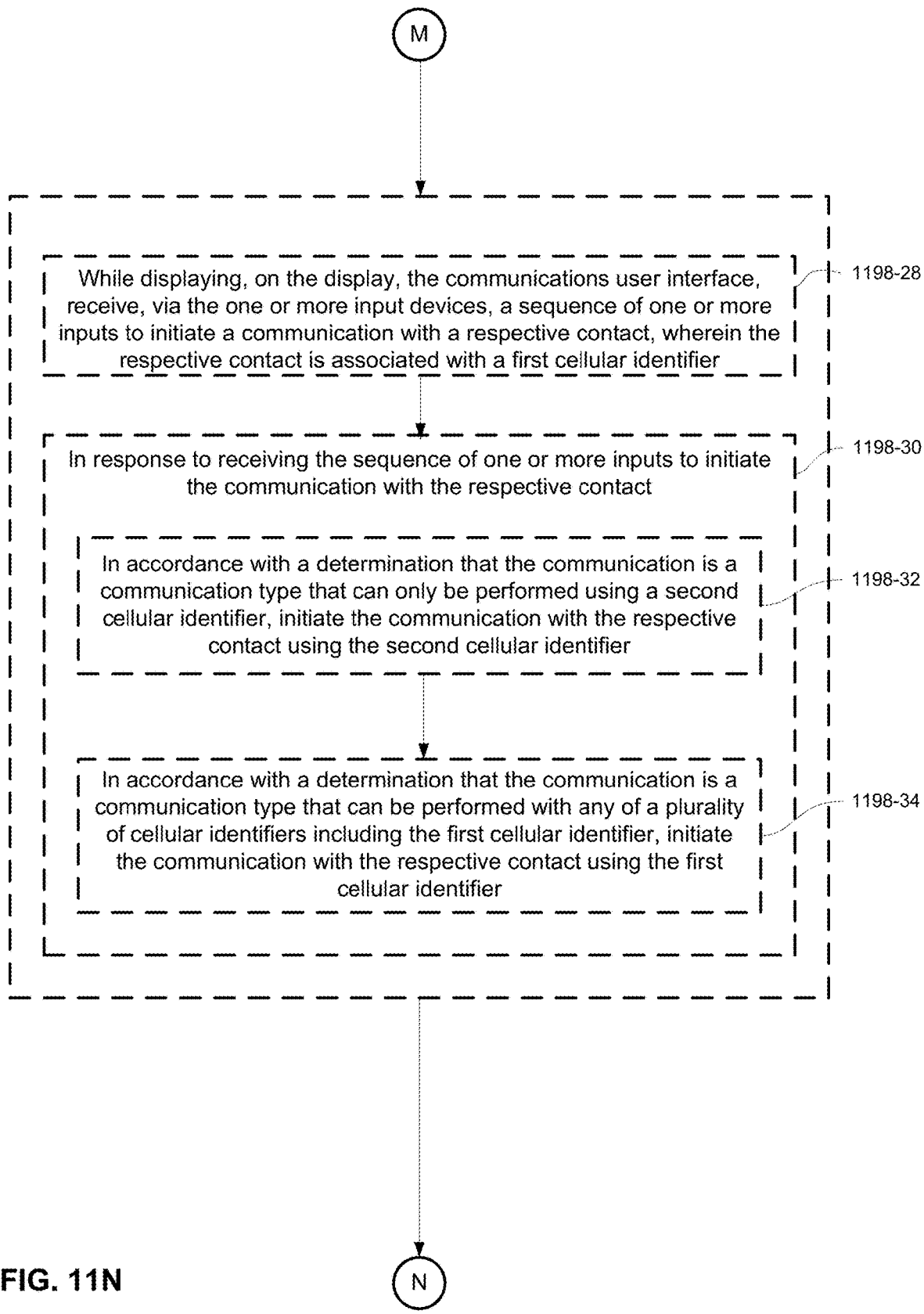
Figure 11O:
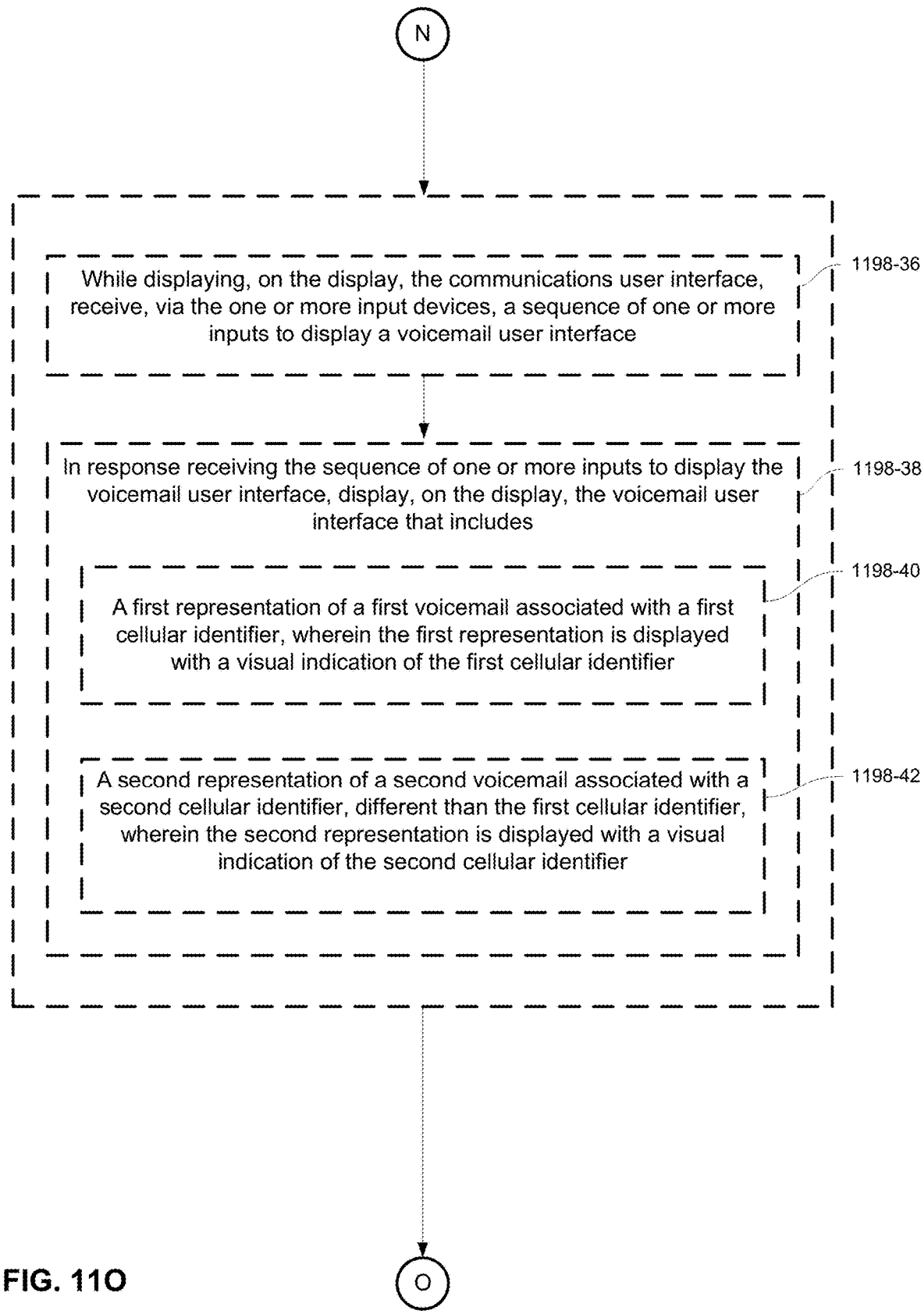
Figure 11P:
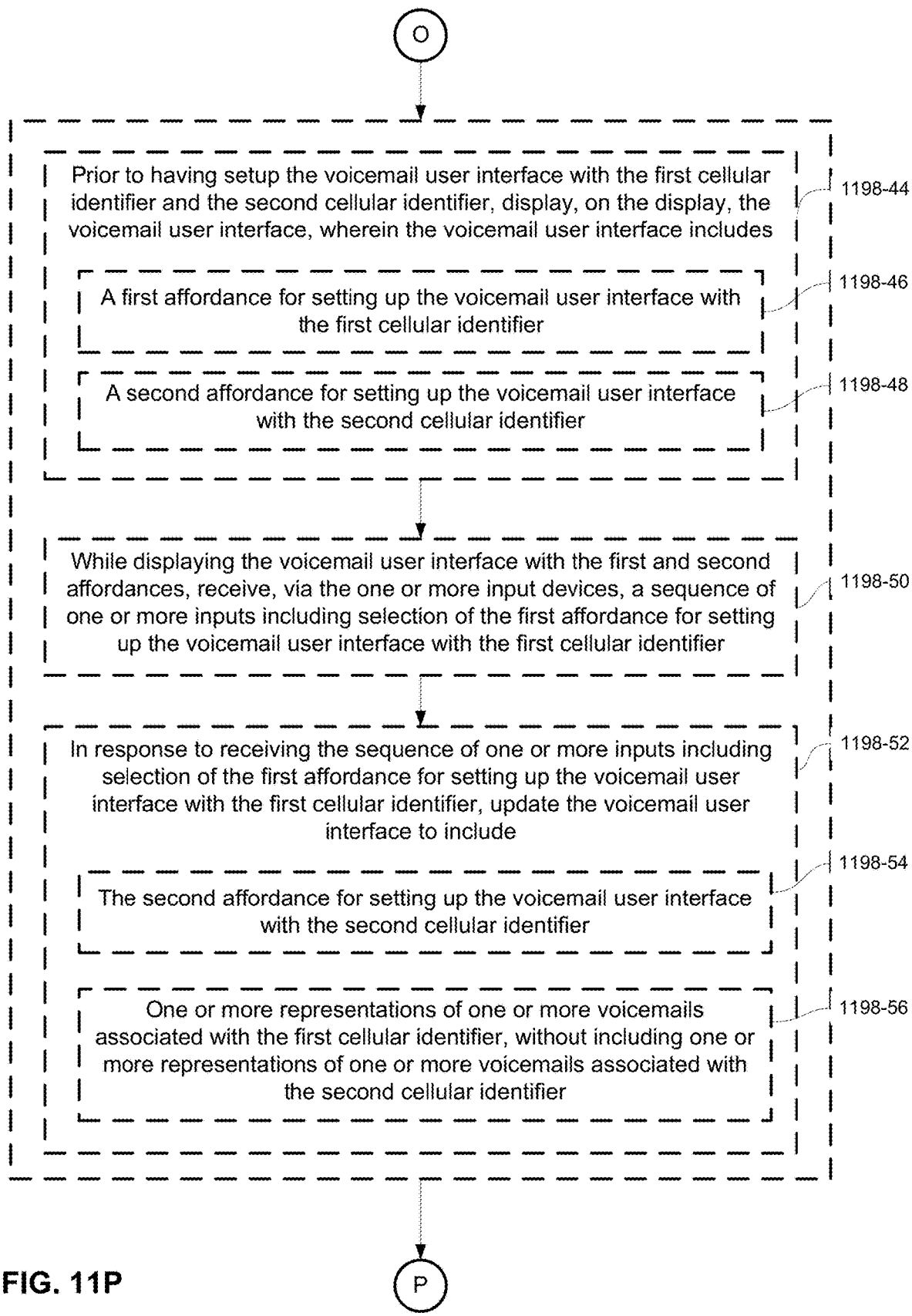
Figure 11Q:
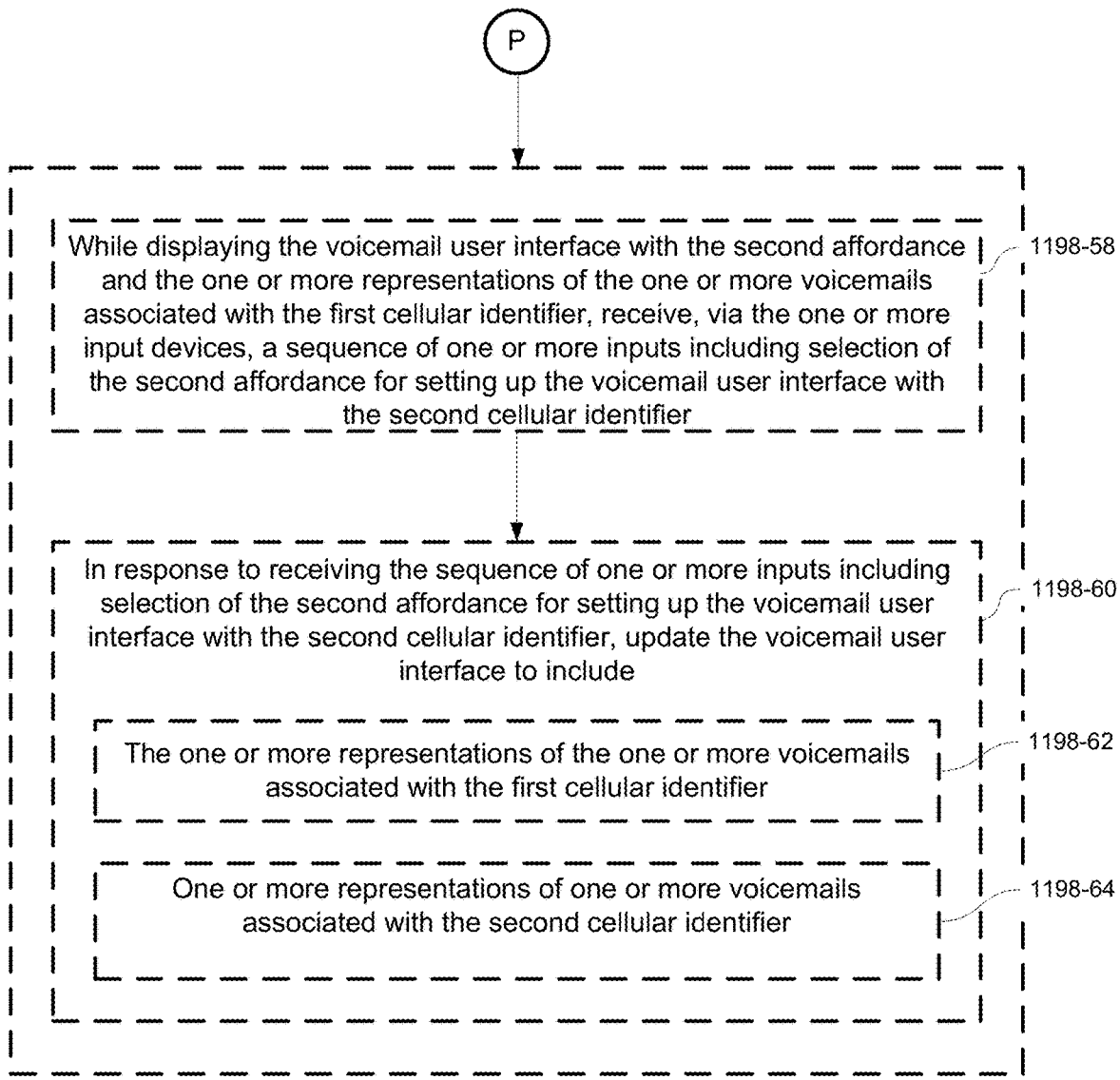

FIGS. 11A-11Q are flow diagrams illustrating a method 1100 of presenting visual indications of cellular identifiers in relation to communication functions in accordance with some embodiments of the disclosure. The method 1100 is optionally performed at an electronic device such as device 100, device 300, device 500, as described above with reference to FIGS. 1A-1B, 2-3, 4A-4B and 5A-5H. Some operations in method 1100 are, optionally combined and/or order of some operations is, optionally, changed.

As described below, the method 1100 provides ways to present visual indications of cellular identifiers in relation to communication functions. The method reduces the cognitive burden on a user when interaction with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., electronic device 500) in communication with a display and one or more input devices (e.g., a mobile device (e.g., a tablet, a smartphone, a media player, or a wearable device) including a touch screen or a computer including one or more of a keyboard, mouse, trackpad, and touch screen) receives (1102), via the one or more input devices, an input to display a communications user interface, such as the user interface illustrated in FIG. 10D, for displaying representations (1010a, 1010b, 1012, and 1014) of a plurality of communications sent or received by the electronic device during a first time period (e.g., a messaging user interface displaying representations of messaging conversations with one or more other electronic devices, a phone user interface displaying representations of recent phone calls, etc). The electronic device is optionally enabled to (1104) perform (1106) a first set of functions, including the communications, using a primary cellular identifier, as indicated in legend 1002 of FIG. 10D. In some embodiments, the default cellular identifier used for the communications in question (e.g., phone calls, text messaging, video calling, etc.) is the primary cellular identifier. In some embodiments, if the communication is with a contact for which the communications are specified to occur with a different cellular identifier, then those communications are optionally performed by default using the different cellular identifier instead. The electronic device optionally performs (1108) a second set of functions, different than the first set of functions, using a secondary cellular identifier, as indicated by legend 1002 of FIG. 10D. In some embodiments, the electronic device is configured to utilize, by default, the second cellular identifier for functions other than the communications shown in the communications user interface. For example, the electronic device optionally uses the secondary cellular identifier by default for data upload and download, or to perform a communication operation in certain, non-default situations (e.g., communicating with a contact that is associated with the secondary cellular identifier, performing a communication function when the primary cellular identifier is not available).

In some embodiments, in response to receiving the input to display the communications user interface, the electronic device displays (1110), on the display, the communications user interface including concurrently displaying a plurality of representations (1010a, 1010b, 1012, and 1014) of communication items (e.g., communications performed by the device (e.g., previous phone calls, messages, voicemails, etc.) or representations of users who can be communicated with via one of the cellular identifiers), including a first representation (1012) of a communication item associated with the primary cellular identifier (1112) (e.g., a communication item that was performed with the primary cellular identifier (e.g., a previous phone call, a voicemail, or a previously-received message)). In some embodiments, initiating a reply communication (e.g., a phone call or message) causes the electronic device to initiate the reply communication with the primary cellular identifier. The communications user interface optionally includes a second representation (1010a) of a communication item associated with the secondary cellular identifier (1114) (e.g., a communication item that was performed with the secondary cellular identifier (e.g., a previous phone call, a voicemail, or a previously-received message)). In some embodiments, initiating a reply communication (e.g., a phone call or message) causes the electronic device to initiate the reply communication with the secondary cellular identifier. The second representation optionally includes a respective visual indication (e.g., an indicator of the secondary cellular identifier, such as the "B" icon included in the indication 1010a), wherein the respective visual indication distinguishes the second representation from the first representation (e.g., the first representation does not include the visual indication). In some embodiments, the first representation includes a different visual indication than the visual indication included in the second representation, such as an indicator of the primary cellular identifier. The communications user interface optionally includes a third representation (1010b) of a communication item associated with the secondary cellular identifier (1116) (e.g., a communication item that was performed with the secondary cellular identifier (e.g., a previous phone call, a voicemail, or a previously-received message)). In some embodiments, initiating a reply communication (e.g., a phone call or message) causes the electronic device to initiate the reply communication with the secondary cellular identifier. The third representation (1010b) optionally includes the respective visual indication (e.g., an indicator of the secondary cellular identifier, such as the "B" indication of indication 1010b), wherein the respective visual indication distinguishes the third representation from the first representation (e.g., the first representation does not include the visual indication). In some embodiments, the first representation includes a different visual indication than the visual indication included in the third representation, such as an indicator of the primary cellular identifier.

The above-described manner of displaying a representation of a communication performed using the secondary cellular identifier with a visual indication that distinguishes it from a communication performed using the primary cellular identifier allows the electronic device to indicate to the user that it has used the secondary cellular identifier for a communication operation during the first time period, which simplifies interactions between the user and the device and enhances operability of the device (e.g., by presenting indications of communication functions performed with the secondary cellular identifier in an intuitive way in the communications user interface), which, additionally, reduces power usage and improves battery life of the device by enabling the user to use the device more quickly and efficiently.

In some embodiments, the first representation of the communication item associated with the primary cellular identifier includes a visual indication of the primary cellular identifier, different than the respective visual indication included in the second and third representations (1118) (e.g., an indicator of the primary cellular identifier. In some embodiments, the indicator is automatically generated from a user-defined label for the primary cellular identifier. For example, if the primary cellular identifier is labeled "Communication" and the secondary cellular identifier is labeled "Data", the indicator of the primary cellular identifier includes a "C" and the indicator of the secondary cellular identifier includes a "D"), such as in FIG. 10E.

The above-described manner of including an indication of the primary cellular identifier within the representation of the communication item associated with the primary cellular identifier allows the electronic device to confirm in the communication user interface that the communication item associated with the primary cellular identifier is associated with the primary cellular identifier, which simplifies interactions between the user and the device and enhances operability of the device (e.g., by including indications of the primary cellular identifier in the communication user interface rather than requiring the user to confirm which communications were performed with the primary cellular identifier in a different way), which, additionally, reduces power usage and improves battery life of the device by enabling the user to use the device more quickly and efficiently.

In some embodiments, the first representation (e.g., representation 1012 illustrated in FIG. 10D) of the communication item associated with the primary cellular identifier does not include a visual indication of the primary cellular identifier (1120). The second and third representations optionally include the visual indication of the secondary cellular identifier to distinguish them from the first representation, which does not include the visual indication.

The above-described manner of displaying a representation of the communication item associated with the primary cellular identifier without an indication of the primary cellular identifier allows the electronic device to differentiate between communications associated with the secondary cellular identifier and the primary cellular identifier with reduced visual clutter, which simplifies interactions between the user and the device and enhances operability of the device (e.g., by differentiating the representations based on whether or not they include an indication of the secondary cellular identifier which allows the user to confirm within the communication user interface which cellular identifier was used for each communication shown), which, additionally, reduces power usage and improves battery life of the device by enabling the user to use the device more quickly and efficiently.

In some embodiments, the electronic device receives (1122), via the one or more input devices, an input (e.g., detection of contact 1003 in FIG. 10CC) corresponding to a request to display a control region user interface (e.g., the user interface illustrated in FIG. 10DD) that includes a plurality of controls for controlling a plurality of functionalities of the electronic device. In some embodiments, the control region includes selectable affordances for toggling various settings (e.g., airplane mode, Wi-Fi, Do Not Disturb, volume), performing various functions (e.g., flashlight, media player control, etc), or launching various applications (e.g., calculator, camera, etc). In some embodiments, the control region user interface is accessible while the electronic device displays a user interface associated with the operating system (e.g., the home screen) or a user interface associated with an application in response to detecting a gesture (e.g., swipe from a particular corner or edge of a display of the electronic device). The control region user interface optionally includes a first control 1084 for controlling cellular identifier functionalities of the electronic device, wherein a third cellular identifier is currently inactive on the electronic device, as indicated by the legend 1002 of FIG. 10CC. In some embodiments, the third cellular identifier has previously been configured on the electronic device but is not presently active to perform one or more operations.

In some embodiments, in response to receiving the request (e.g., detection of contact 1003 in FIG. 10CC) to display the control region user interface (e.g., a voice command, a gesture (e.g., a swipe from a particular edge or corner of a touch screen of the electronic device), or another input), the electronic device displays (1124), on the display, the control region user interface, such as in FIG. 10DD. While displaying the control region user interface, the electronic device optionally receives (1126), via the one or more input devices, an input (e.g., detection of contact 1003 to select control 1090 in FIG. 10FF), associated with the first control (e.g., an input selecting the first control). In some embodiments, selecting the first control causes the electronic device to display a number of settings associated with the cellular identifier functions. The input is optionally for activating the third cellular identifier (e.g., the "Travel" cellular identifier) on the electronic device (e.g., configuring the third cellular identifier such that the electronic device is able to perform one or more functions using the third cellular identifier), such as in FIG. 10FF. In response to receiving the input, associated with the first control, for activating the third cellular identifier on the electronic device, the first electronic device activates (1128) the third cellular identifier on the electronic device (e.g., configuring the third cellular identifier such that the electronic device is able to perform one or more functions using the third cellular identifier), as indicated by the legend 1002 in FIG. 10GG.

The above-described manner of changing which cellular identifiers are active on the electronic device allows the electronic device to activate the third cellular identifier to perform functions with the third cellular identifier, which simplifies interactions between the user and the device and enhances operability of the device (e.g., by allowing the user to activate the third cellular identifier without repeating a setup process for the third cellular identifier, if it has previously been completed), which, additionally, reduces power usage and improves battery life of the device by enabling the user to use the device more quickly and efficiently.

In some embodiments, while displaying, on the display, the communications user interface, such as the messaging inbox user interface illustrated in FIG. 10Y, the first electronic device receives (1130), via the one or more input devices, an input (e.g., contact 1003) selecting a respective representation 1076*b* of a respective communication item with a respective contact in the communications user interface (e.g., a touch input including a tap on the representation of the respective communication item, a click using a mouse or trackpad, a voice input, a shortcut entered with a keyboard or soft keyboard, etc).

In some embodiments, in response to receiving the input selecting the respective representation 1076b of the respective communication item (1132), such as in FIG. 10Y, in accordance with a determination that the respective representation is the first representation of the communication item associated with the primary cellular identifier (e.g., the "Personal" cellular identifier), the electronic device initiates (1134) communication with the respective contact using the primary cellular identifier, as indicated by legend 1002 of FIG. 10Z. For a communication previously sent or received with the primary cellular identifier, the electronic device optionally initiates a subsequent communication to the same contact in the same manner (e.g., phone call, SMS message, other messaging service, etc.) with the primary cellular identifier. For example, if the respective representation is a representation of a previous outgoing phone call completed using the primary cellular identifier, in response to selection of the respective representation, the electronic device initiates a phone call using the primary cellular identifier. In accordance with a determination that the respective representation is the second representation (e.g., representation 1076c illustrated in FIG. 10AA) of the communication item associated with the secondary cellular identifier (e.g., the "Business" cellular identifier), the electronic device initiates (1136) communication with the respective contact using the secondary cellular identifier, as indicated by legend 1002 of FIG. 10BB. For a communication previously sent or received with the secondary cellular identifier, the electronic device optionally initiates a subsequent communication to the same contact in the same manner (e.g., phone call, SMS message, other messaging service, etc.) with the secondary cellular identifier. For example, if the respective representation is a representation of a previously-received message, in response to the selection of the respective representation, the electronic device initiates a message using the secondary cellular identifier.

The above-described manner of initiating communications with the cellular identifier associated with a previously-executed communication allows the electronic device to consistently use respective cellular identifiers for communications associated with a particular cellular identifier, which simplifies interactions between the user and the device and enhances operability of the device (e.g., by tracking associated cellular identifiers automatically without the need for user intervention), which, additionally, reduces power usage and improves battery life of the device by enabling the user to use the device more quickly and efficiently.

In some embodiments, the electronic device receives (1138), via the one or more input devices, an input (e.g., selection of representation 1010b with contact 1003 in FIG. 10E) corresponding to a request to initiate communication with a respective contact that is associated with a respective cellular identifier (e.g., selection of a representation of a communication item that was performed with the respective cellular identifier or another input for initiating a communication with the respective cellular identifier).

In some embodiments, in response to receiving the input (e.g., selection of representation 1010b with contact 1003 in FIG. 10E) corresponding to the request to initiate communication with the respective contact (1140), in accordance with a determination that the respective cellular identifier (e.g., the "Business" cellular identifier) is available for communication, such as indicated in legend 1002 of FIG. 10E (e.g., the respective cellular identifier is active on the electronic device and is currently connected to a network), the electronic device initiates (1142) the communication with the respective contact using the respective cellular identifier (e.g., by default, the communication is initiated with the respective cellular identifier), such as in FIG. 10F as indicated by the legend 1002 of FIG. 10F. In accordance with a determination that the respective cellular identifier is not available for communication (1144) (e.g., the respective cellular identifier is not active on the electronic device and/or is not currently connected to a network), such as in FIG. 10HH as indicated by the legend 1002 of FIG. 10HH, the electronic device forgoes (1146) initiating the communication with the respective contact using the respective cellular identifier, and the electronic device provides (1148) a warning 1092 that the respective cellular identifier is not available for communication (e.g., the electronic device presents text, an image, audio, etc. indicating that the communication cannot be performed with the respective cellular identifier because the respective cellular identifier is not available), such as in FIG. 10II-JJ as indicated by the legends 1002 of FIGS. 10II-JJ.

The above-described manner of providing a warning when a communication cannot be initiated with the cellular identifier associated with a respective contact allows the electronic device to communicate to the user why a communication is not initiated, which simplifies interactions between the user and the device and enhances operability of the device (e.g., by automatically informing the user why the communication is not initiated, rather than requiring the user to enter a series of additional inputs to determine the reason), which, additionally, reduces power usage and improves battery life of the device by enabling the user to use the device more quickly and efficiently.

In some embodiments, providing the warning that the respective cellular identifier (e.g., the "Business" cellular identifier) is not available for communication includes providing an option 1096 for initiating the communication with the respective contact using a second respective cellular identifier (e.g., the "Travel" cellular identifier), different than the respective cellular identifier (1150), such as in FIG. 10JJ. In some embodiments, the electronic device also presents text, an image, audio, etc. indicating the ability to use a different cellular identifier to initiate the communication. In some embodiments, the device displays a selectable affordance for initiating the communication with the other cellular identifier and/or is configured to accept a voice input for initiating the communication with the other cellular identifier.

The above-described manner of providing the option to initiate a communication with a cellular identifier other than the cellular identifier associated with a respective contact allows the electronic device to provide a way for the user to perform a desired function even when the default cellular identifier for performing the function is not available, which simplifies interactions between the user and the device and enhances operability of the device (e.g., by providing the user the option to initiate the communication with a different cellular identifier without requiring further user inputs to configure the electronic device to initiate the communication with the different cellular identifier), which, additionally, reduces power usage and improves battery life of the device by enabling the user to use the device more quickly and efficiently.

In some embodiments, the electronic device receives (1154), via the one or more input devices, a sequence of one or more inputs (e.g., detection of contact 1003 selecting representation 1010*b*, such as in FIG. 10E or FIG. 10N) corresponding to a request to initiate communication with a respective contact that is associated with a respective cellular identifier. The user optionally selects an affordance associated with making a phone call, sending a message, or sending a videoconferencing request to a contact stored on the electronic device. The contact is optionally associated with a respective cellular identifier and, by default, communications with the contact are initiated with the respective cellular identifier.

In some embodiments, in response to receiving the sequence of one or more inputs (e.g., detection of contact 1003 selecting representation 1010*b*, such as in FIG. 10E or FIG. 10N) corresponding to the request to initiate the communication with the respective contact (1154), in accordance with a determination that the sequence of one or more inputs includes an input (e.g., selection of option 1054*a* with contact 1003 in FIG. 10O) for initiating the communication with a second cellular identifier (e.g., the "Personal" cellular identifier), different than the respective cellular identifier, the electronic device initiates (1156) the communication with the second cellular identifier, as indicated by the legend 1002 of FIG. 10P. The user optionally enters an input for using a cellular identifier different than the cellular identifier associated with the contact to communicate with the contact prior to initiating the communication and, in response to the input for initiating the communication, the electronic device initiates the communication with the second cellular identifier. In some embodiments, the electronic device detects a user input for displaying a menu for selecting a cellular identifier to use to initiate the communication. For example, the device detects a hard press (e.g., the device detects a touch input with an intensity exceeding a predetermined intensity threshold that is above an intensity threshold at which a tap or swipe gesture would be detected) or detects a long press (e.g., the device detects a touch input with a duration exceeding a predetermined duration threshold that is above a duration threshold at which a tap or swipe gesture would be detected) on an affordance for initiating the communication (e.g., an affordance for making a call, sending a message, or initiating a videoconference) to invoke the menu including the option to initiate the communication with the second cellular identifier. In some embodiments, the user is able to select an affordance for displaying a menu including options for initiating the communication with the respective cellular identifier or with the second cellular identifier. In accordance with a determination that the sequence of one or more inputs does not include the input for initiating the communication with the second cellular identifier, the electronic device optionally initiates (1158) the communication with the respective cellular identifier. By default, the electronic device optionally initiates the communication with the respective cellular identifier in response to a user input for initiating the communication such as a tap input on the affordance associated with making a phone call.

The above-described manner of initiating the communication with a cellular identifier other than the default cellular identifier for a respective contact in response to a user input to do so allows the electronic device to perform operations with the second cellular identifier, which simplifies interactions between the user and the device and enhances operability of the device (e.g., by allowing the user to indicate which cellular identifier to use while entering the sequence of inputs for initiating the communication), which, additionally, reduces power usage and improves battery life of the device by enabling the user to use the device more quickly and efficiently.

In some embodiments, the electronic device displays (1160), in a user interface for initiating a phone call, such as the dialer user interface illustrated in FIG. 10Q, a visual indication 1062 of a respective cellular identifier to be used to initiate the phone call. The electronic device optionally displays an affordance selectable for toggling which cellular identifier to use to initiate the call, wherein the affordance is updated to include a representation of the cellular identifier that will be used to initiate the call when the user toggles the affordance or presenting a menu including options for initiating the phone call with one of multiple cellular identifiers available to the electronic device. In some embodiments, the visual indication of the respective cellular identifier is an indication generated based on a user-defined label for the cellular identifier (e.g., a "Business" cellular identifier is optionally indicated by an icon including a "B").

In some embodiments, while displaying the user interface for initiating the phone call, the electronic device receives (1162) a respective input (e.g., selection of option 1054 with contact 1003 in FIG. 10R), and in response to receiving the respective input (1164), in accordance with a determination that the respective input is an input selecting the visual indication 1054 of the respective cellular identifier, the electronic device selects (1166) a second cellular identifier, different than the respective cellular identifier, to use to initiate the phone call, such as in FIG. 10S. In response to a subsequent user input for placing the phone call (e.g., selection of a "make call" affordance or another affordance for making the phone call), the electronic device optionally initiates the phone call with the second cellular identifier. In accordance with a determination that the respective input is an input to initiate the phone call (e.g., selection of the "call" affordance 1060), the electronic device initiates (1168) the phone call using the respective cellular identifier. In response to a user input for placing the phone call (e.g., selection of a "make call" affordance or another affordance for making the phone call) in the absence of a user input for selecting the second cellular identifier for use for placing the phone call, the electronic device optionally initiates the phone call with the respective cellular identifier.

The above-described manner of providing a way for the user to select the second cellular identifier for placing the phone call allows the electronic device to make a phone call using either the respective cellular identifier or the second cellular identifier, which simplifies interactions between the user and the device and enhances operability of the device (e.g., by presenting the setting for selecting a cellular identifier to use to place a phone call in a user interface for placing the phone call), which, additionally, reduces power usage and improves battery life of the device by enabling the user to use the device more quickly and efficiently.

In some embodiments, the electronic device displays (1170) a user interface for initiating a messaging conversation with a respective contact, such as in FIGS. 10V-BB, wherein in accordance with a determination that the messaging conversation is a new messaging conversation with the respective contact, the user interface includes a visual indication 1068 of a respective cellular identifier to be used for the messaging conversation (1172). The electronic device optionally displays an affordance selectable for toggling which cellular identifier to use to send the message, wherein the affordance is updated to include a representation of the cellular identifier that will be used to send the message when the user toggles the affordance or presenting a menu including options for sending the message with one of multiple cellular identifiers available to the electronic device. In some embodiments, the visual indication of the respective cellular identifier is an indication generated based on a user-defined label for the cellular identifier (e.g., a "Business" cellular identifier is optionally indicated by an icon including a "B"). In accordance with a determination that the messaging conversation is not a new messaging conversation with the respective contact, the user interface, such as the messaging user interface illustrated in FIG. 10Z, does not include the visual indication of the respective cellular identifier (1174). The electronic device optionally sends the message using the cellular identifier last used for the messaging conversation, such as a default cellular identifier for the contact.

In some embodiments, while displaying the user interface for initiating the messaging conversation with the respective contact, the electronic device receives (1176) a respective input (e.g., selection of indication 1068 with contact 1003 as shown in FIG. 10W), and in response to receiving the respective input (1178), in accordance with a determination that the respective input is an input selecting the visual indication 1068 of the respective cellular identifier, the electronic device selects (1180) a second cellular identifier, different than the respective cellular identifier, to use for the messaging conversation. In response to a subsequent user input for sending the message (e.g., selection of a "send message" affordance or another affordance for sending the message), the electronic device optionally sends the message with the second cellular identifier. In accordance with a determination that the respective input is an input to initiate the messaging conversation (e.g., selection of a button that when activated causes the electronic device to send a message), the electronic device initiates (1182) the messaging conversation using the respective cellular identifier. In response to a user input for sending the message (e.g., selection of a "send message" affordance or another affordance for sending the message) in the absence of a user input for selecting the second cellular identifier for use for sending the message, the electronic device optionally sends the message with the respective cellular identifier.

The above-described manner of providing a way for the user to select the second cellular identifier for sending the message allows the electronic device to send a message using either the respective cellular identifier or the second cellular identifier, which simplifies interactions between the user and the device and enhances operability of the device (e.g., by presenting the setting for selecting a cellular identifier to use to send a message in a user interface for messaging), which, additionally, reduces power usage and improves battery life of the device by enabling the user to use the device more quickly and efficiently.

In some embodiments, the first representation 1016 of the communication item associated with the primary cellular identifier (e.g., the "Personal" cellular identifier) is displayed with a visual indication (e.g., the "P" indication) of the primary cellular identifier (1184) (e.g., a visual indication generated from a user-defined label of the primary cellular identifier), such as in FIG. 10E. For example, if the label of the primary cellular identifier is "Personal", the visual indication includes a "P". The respective visual indication displayed with the second representation 1010a of the communication item associated with the secondary cellular identifier (e.g., the "Business" cellular identifier) and the third representation 1010b of the communication item associated with the secondary cellular identifier is a visual indication of the secondary cellular identifier (1186) (e.g., a visual indication generated from a user-defined label of the secondary cellular identifier). For example, if the label of the secondary cellular identifier is "Business", the visual indication includes a "B".

The above-described manner of displaying an indication of a cellular identifier associated with a respective communication item allows the electronic device to convey to the user which cellular identifiers were previously used to perform each communication, which simplifies interactions between the user and the device and enhances operability of the device (e.g., by presenting the cellular identifier information in the communication user interface, rather than requiring the user to enter additional inputs to obtain the information), which, additionally, reduces power usage and improves battery life of the device by enabling the user to use the device more quickly and efficiently.

In some embodiments, the communication items associated with the first (1016), second (1010a) and third (1010b) representations correspond to a communication type that can be performed with any of a plurality of cellular identifiers (1188) (e.g., phone calls, SMS, etc), as shown in FIG. 10E. In some embodiments, it is possible to configure the electronic device to communicate with these communication types with any of the cellular identifiers active on the electronic device. The communications user interface further includes a fourth representation 1014 of a communication item that corresponds to a communication type that can only be performed using a respective cellular identifier (1190) (e.g., videoconferencing or messaging associated with a user account of the electronic device). In some embodiments, the user account associated with the electronic device is associated with one of the cellular identifiers and not with other cellular identifiers available to the electronic device. Regardless of the settings for a particular contact, these types of communications are always performed using the respective cellular identifier. The fourth representation 1014 of the communication item is not displayed with a visual indication of the respective cellular identifier (1192), such as in FIG. 10E. Although the communication item was performed using the respective cellular identifier, the fourth representation does not include an indication of the first cellular identifier.

The above-described manner of displaying a representation of a communication that the electronic device is only able to perform with a respective cellular identifier without displaying an indication of the respective cellular identifier allows the electronic device to present a concise representation of the communication, which simplifies interactions between the user and the device and enhances operability of the device (e.g., by forgoing presenting the indication of the respective cellular identifier and avoiding implying that the electronic device is able to be configured to perform the communication with a different cellular identifier), which, additionally, reduces power usage and improves battery life of the device by enabling the user to use the device more quickly and efficiently.

In some embodiments, while displaying, on the display, the communications user interface, such as the recent calls user interface illustrated in FIG. 10E, the electronic device receives (1194), via the one or more input devices, a sequence of one or more inputs (e.g., selection of indication 1010b with contact 1003 in FIG. 10E) to initiate a phone call communication using a respective cellular identifier (e.g., the "Business" cellular identifier). Selection of a representation of a phone call optionally causes the electronic device to initiate a phone call to the same contact of the representation. In some embodiments, other inputs, such as voice input or touch input for dialing a phone number or selecting a contact to call, are possible. In response to receiving the sequence of one or more inputs to initiate the phone call communication using the respective cellular identifier (1196), the electronic device initiates (1198) the phone call communication using the respective cellular identifier, and while the phone call communication is active, the electronic device displays (1198-2), on the display, a visual indication 1020 of the respective cellular identifier, such as in FIG. 10F. The visual indication is optionally displayed within a phone call user interface. The indication is optionally generated from a user-defined label for the respective cellular identifier. For example, if the respective cellular identifier is labeled "Phone", the indication optionally includes a "P".

The above-described manner of displaying an indication of a cellular identifier being used to make a phone call during the phone call allows the electronic device to communicate to the user which cellular identifier is being used to make the phone call, which simplifies interactions between the user and the device and enhances operability of the device (e.g., by presenting the information about which cellular identifier is being used to make the phone call from the phone call user interface, rather than requiring the user enter one or more user inputs for obtaining the information in another way), which, additionally, reduces power usage and improves battery life of the device by enabling the user to use the device more quickly and efficiently.

In some embodiments, while displaying, on the display, the communications user interface, the electronic device receives (1198-4), via the one or more input devices, a sequence of one or more inputs to view a contact information user interface corresponding to a respective contact that includes contact information for the respective contact. The contact information user interface optionally includes one or more items of information about the respective contact, such as a phone number, email address, physical address, website, or other ways of contacting the respective contact. In response to receiving the sequence of one or more inputs to view the contact information user interface corresponding to the respective contact, the electronic device displays (1198-6), on the display, the contact information user interface, such as the contact user interface illustrated in FIG. 10H, corresponding to the respective contact, wherein in accordance with a determination that the respective contact is associated with a first cellular identifier, the contact information user interface corresponding to the respective contact includes a visual indication 1030a of the first cellular identifier (1198-8). The visual indication of the first cellular identifier is optionally generated from a user-defined label for the first cellular identifier. For example, if the label for the first cellular identifier is "Primary", then the visual indication optionally includes a "P". In accordance with a determination that the respective contact is associated with a second cellular identifier, different than the first cellular identifier, the contact information user interface corresponding to the respective contact includes a visual indication 1030c of the second cellular identifier (1198-10), such as in FIG. 10M. The visual indication of the second cellular identifier is optionally generated from a user-defined label for the second cellular identifier. For example, if the label for the second cellular identifier is "Secondary", then the visual indication optionally includes a "S". In some embodiments, the contacts user interface includes a single indication of which cellular identifier the contact is associated with, even when the contact is associated with multiple phone numbers. The indication is optionally selectable to cause the electronic device to present a settings user interface to change which cellular identifier is associated with the respective contact.

The above-described manner of displaying an indication of the cellular identifier associated with a respective contact allows the electronic device to present to the user information about which cellular identifier is associated with the respective contact while displaying other information about the contact, which simplifies interactions between the user and the device and enhances operability of the device (e.g., by presenting the cellular identifier information along with other information about the contact, rather than requiring the user to enter additional inputs to obtain the information), which, additionally, reduces power usage and improves battery life of the device by enabling the user to use the device more quickly and efficiently.

In some embodiments, while displaying the contact information user interface corresponding to the respective contact, wherein the respective contact is associated with a first respective cellular identifier, the electronic device receives (1198-12), via the one or more input devices, a sequence of one or more inputs (e.g., including selection of indication 1042b with contact 1003 in FIG. 10K) for changing the association of the respective contact from being associated with the first respective cellular identifier to being associated with a second respective cellular identifier, different than the first respective cellular identifier. The user is optionally able to enter an input for editing the respective contact and, while the electronic device displays a user interface for editing the respective contact, the electronic device receives an input for editing the cellular identifier associated with the respective contact. In response to receiving the sequence of one or more inputs for changing the association of the respective contact from being associated with the first respective cellular identifier to being associated with the second respective cellular identifier (1198-14), such as in FIG. 10K, the electronic device associates (1198-16) the respective contact with the second respective cellular identifier (e.g., when the electronic device receives an input for initiating a communication with the respective contact, the communication is initiated by default with the second respective cellular identifier), as indicated by indications 1030c and 1030d in FIG. 10L, and the electronic device updates (1198-18) the contact information user interface corresponding to the respective contact to include a visual indication 1030c and 1030d of the second respective cellular identifier instead of a visual indication of the first respective cellular identifier. The visual indication of the second respective cellular identifier is generated from a user-defined label for the second respective cellular identifier. For example, if the label for the second respective cellular identifier is "Secondary", then the visual indication optionally includes a "S".

The above-described manner of providing a way for the user to change the cellular identifier associated with a respective contact from the contacts user interface allows the electronic device to present the option for changing the cellular identifier associated with the respective contact while presenting additional information and settings associated with the contact, which simplifies interactions between the user and the device and enhances operability of the device (e.g., by presenting cellular identifier information with other contact information rather than requiring the user enter additional inputs to obtain the cellular identifier information or change the associated cellular identifier), which, additionally, reduces power usage and improves battery life of the device by enabling the user to use the device more quickly and efficiently.

In some embodiments, while displaying, on the display, the communications user interface, such as the messaging user interface illustrated in FIG. 10Y, the electronic device receives (1198-20), via the one or more input devices, a sequence of one or more inputs (e.g., selection of indication 1076*b*) to initiate a messaging communication with a contact. The electronic device optionally detects a user input for displaying a messaging user interface and a user input selecting a contact to send a message to. The electronic device optionally further detects user inputs entering text, graphics, or other content into the message and an input for transmitting the message to the contact. In response to receiving the sequence of one or more inputs (e.g., selection of indication 1076*b*) to initiate the messaging communication with the contact (1198-22), such as in FIG. 10Y, in accordance with a determination that the messaging communication is to be performed using the primary cellular identifier, the electronic device initiates (1198-24) a data-based messaging communication (e.g., an enhanced messaging service) with the contact, as indicated by indication 1080. In some embodiments, the data-based messaging communication is executed using cellular data services or other data services (e.g., WiFi) and is associated with a user account for a particular messaging service. In some embodiments, both the sender of the message and the receiver of the message have user accounts for the particular messaging service. The user account for the particular messaging service is optionally associated with a user account for the electronic device. In accordance with a determination that the messaging communication is to be performed using the secondary cellular identifier, such as in FIG. 10BB, the electronic device initiates (1198-26) a cellular-messaging-based communication (e.g., SMS) with the contact, as indicated by indication 1082. In some embodiments, the cellular-messaging-based communication is executed using a cellular messaging service different from cellular data and is associated with the cellular account of the cellular identifier. In some embodiments, the sender of the message and the receiver of the message have user accounts with different providers (e.g., different cellular carriers).

The above-described manner of performing cellular messaging-based communication when a communication is to be performed with the secondary cellular identifier allows the electronic device to use the selected cellular identifier to perform the communication, which simplifies interactions between the user and the device and enhances operability of the device (e.g., by using the correct cellular identifier without requiring the user enter an input selecting the cellular identifier and the type of communication), which, additionally, reduces power usage and improves battery life of the device by enabling the user to use the device more quickly and efficiently.

In some embodiments, while displaying, on the display, the communications user interface, such as the contact user interface illustrated in FIG. 10KK, the electronic device receives (1198-28), via the one or more input devices, a sequence of one or more inputs (e.g., including selection of button 1098-4 with contact 1003 illustrated in FIG. 10LL) to initiate a communication with a respective contact, wherein the respective contact is associated with a first cellular identifier, as indicated by indications 1030*e* and 1030*f* in FIG. 10KK. When the electronic device detects a user input for initiating communication with the respective contact, the communication is optionally initiated with the first cellular identifier by default. In response to receiving the sequence of one or more inputs (e.g., selection of button 1098-4) to initiate the communication with the respective contact (1198-30), in accordance with a determination that the communication is a communication type that can only be performed using a second cellular identifier (e.g., a cellular data-based communication, such as a data-based messaging service or a cellular data-based videoconference), the electronic device initiates (1198-32) the communication with the respective contact using the second cellular identifier, as indicated by legend 1002 of FIG. 10MM. In some embodiments, the user account for communicating with the cellular data-based communications is associated with a user account of the electronic device. The user account of the electronic device is optionally associated with the second cellular identifier and not with the first cellular identifier. Although the respective contact is optionally associated with the first cellular identifier, the electronic device initiates the communication with the second cellular identifier. In accordance with a determination that the communication is a communication type that can be performed with any of a plurality of cellular identifiers including the first cellular identifier (e.g., a cellular messaging-based messaging service such as SMS or placing a phone call), the electronic device initiates (1198-34) the communication with the respective contact using the first cellular identifier, as indicated by legend 1002 in FIG. 10BB (e.g., the electronic device initiates the communication with the cellular identifier that is associated with the respective contact).

The above-described manner of sending a data-based message with the first cellular identifier to a contact associated with the second cellular identifier allows the electronic device to perform the requested communication operation (e.g., sending a data-based message), which simplifies interactions between the user and the device and enhances operability of the device (e.g., by performing the requested operation without additional input from the user to re-configure which cellular identifier is associated with the respective contact), which, additionally, reduces power usage and improves battery life of the device by enabling the user to use the device more quickly and efficiently.

In some embodiments, while displaying, on the display, the communications user interface, the electronic device receives (1198-36), via the one or more input devices, a sequence of one or more inputs to display a voicemail user interface, such as the voicemail user interface illustrated in FIG. 10C (e.g., a user interface including representations of one or more voicemails received at the electronic device). In some embodiments, the representations 1006*a-c* and 1008 of the one or more voicemails each include an indication of a contact from which the voicemail was received. In response to selection of one of the representations of a voicemail, the electronic device optionally plays the voicemail. In response receiving the sequence of one or more inputs to display the voicemail user interface, the electronic device displays (1198-38), on the display, the voicemail user interface that includes a first representation 1008 of a first voicemail associated with a first cellular identifier (e.g., the voicemail was received via the first cellular identifier). For example, the voicemail was left by someone who called the phone number of the first cellular identifier to leave the voicemail. The first representation is displayed with a visual indication of the first cellular identifier (1198-40). The visual indication of the first cellular identifier is optionally generated from a user-defined label for the first cellular identifier. For example, if the label of the first cellular identifier is "Personal", the indication of the first cellular identifier optionally includes a "P". The voicemail user interface optionally includes a second representation 1006*a* of a second voicemail associated with a second cellular identifier, different than the first cellular identifier (e.g., the voicemail was received via the second cellular identifier). For example, the voicemail was left by someone who called the phone number of the second cellular identifier to leave the voicemail. The second representation is optionally displayed with a visual indication (e.g., the "B" indication) of the second cellular identifier (1198-42). In some embodiments, the visual indication of the second cellular identifier is generated from a user-defined label for the second cellular identifier. For example, if the label of the second cellular identifier is "Business", the indication of the first cellular identifier optionally includes a "B".

The above-described manner of displaying indications of the cellular identifier associated with each voicemail in the voicemail user interface allows the electronic device to communicate to the user which cellular identifier was used to receive each respective voicemail, which simplifies interactions between the user and the device and enhances operability of the device (e.g., by presenting information about which cellular identifier was used for each voicemail without requiring the user enter one or more further inputs to obtain the information), which, additionally, reduces power usage and improves battery life of the device by enabling the user to use the device more quickly and efficiently.

In some embodiments, prior to having setup the voicemail user interface with the first cellular identifier and the second cellular identifier (e.g., before the electronic device is configured to display indications of voicemails or to play voicemails), the electronic device displays (1198-44), on the display, the voicemail user interface, such as in FIG. 10A. The voicemail user interface optionally includes a first affordance 1004*b* for setting up the voicemail user interface with the first cellular identifier (1198-46). In response to selection of the first affordance, the electronic device optionally presents a user interface for setting up the voicemail account of the first cellular identifier. The voicemail user interface optionally includes a second affordance 1004*a* for setting up the voicemail user interface with the second cellular identifier (1198-48). In some embodiments, in response to selection of the second affordance, the electronic device presents a user interface for setting up the voicemail account of the second cellular identifier.

In some embodiments, while displaying the voicemail user interface with the first and second affordances, the electronic device receives (1198-50), via the one or more input devices, a sequence of one or more inputs (e.g., contact 1003) including selection of the first affordance 1004*b* for setting up the voicemail user interface with the first cellular identifier, such as in FIG. 10A.

In some embodiments, in response to receiving the sequence of one or more inputs including selection of the first affordance for setting up the voicemail user interface with the first cellular identifier (e.g., one or more inputs for setting up the voicemail account of the first cellular identifier) the electronic device updates (1198-52) the voicemail user interface to include the second affordance 1004*a* for setting up the voicemail user interface with the second cellular identifier (1198-54), such as in FIG. 10B. In some embodiments, setting up the voicemail account of the first cellular identifier includes entering a password, passcode, PIN, or other authentication for accessing the voicemail account of the first cellular identifier. The voicemail account for the second cellular identifier is optionally not yet set up and the electronic device continues to display the affordance for setting up the voicemail account for the second cellular identifier. The voicemail user interface optionally includes one or more representations 1006*a-c* of one or more voicemails associated with the first cellular identifier (e.g., representations of voicemails received by the first cellular identifier) without including one or more representations of one or more voicemails associated with the second cellular identifier (1198-56). In some embodiments, the representations of the one or more voicemails associated with the first cellular identifier include indications of the first cellular identifier. In some embodiments, the representations of the one or more voicemails associated with the first cellular identifier do not include indications of the first cellular identifier when the first cellular identifier is the only cellular identifier for which voicemail has been set up. In some embodiments, the voicemail account for the second cellular identifier is not yet set up on the electronic device. Although there may be voicemails associated with the voicemail account of the second cellular identifier, the electronic device optionally does not present any representations of voicemails received by the second cellular identifier.

In some embodiments, while displaying the voicemail user interface with the second affordance and the one or more representations of the one or more voicemails associated with the first cellular identifier, the electronic device receives (1198-58), via the one or more input devices, a sequence of one or more inputs including selection (e.g., with contact 1003) of the second affordance 1004*a* for setting up the voicemail user interface with the second cellular identifier (e.g., one or more inputs for setting up the voicemail account of the second cellular identifier), as shown in FIG. 10B. In some embodiments, setting up the voicemail account of the second cellular identifier includes entering a password, passcode, PIN, or other authentication for accessing the voicemail account of the second cellular identifier.

In some embodiments, in response to receiving the sequence of one or more inputs including selection of the second affordance 1004*a* for setting up the voicemail user interface with the second cellular identifier, such as in FIG. 10B, the electronic device updates (1198-60) the voicemail user interface to include the one or more representations 1008 of the one or more voicemails associated with the first cellular identifier (1198-62) (e.g., the one or more representations of the one or more voicemails associated with the first cellular identifier include indications of the first cellular identifier), such as in FIG. 10C, and one or more representations 1006*a-c* of one or more voicemails associated with the second cellular identifier (1198-64) (e.g., the one or more representations of the one or more voicemails associated with the second cellular identifier include indications of the second cellular identifier), such as in FIG. 10C.

The above-described manner of displaying affordances for configuring voicemail for each of the primary cellular identifier and the secondary cellular identifier allows the electronic device to provide the user with distinct voicemail setup processes, which simplifies interactions between the user and the device and enhances operability of the device (e.g., by mimicking the voicemail setup process that occurs for electronic devices operating with one cellular identifier, thus expanding voicemail to multiple cellular identifiers in a manner that is familiar to the user), which, additionally, reduces power usage and improves battery life of the device by enabling the user to use the device more quickly and efficiently.

It should be understood that the particular order in which the operations in FIGS. 11A-11Q have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1300, and 1500) are also applicable in an analogous manner to method 1100 described above with respect to FIGS. 11A-11Q. For example, the operations performed with cellular identifiers described above with reference to method 1100 optionally have one or more of the characteristics of the cellular identifier settings user interfaces, the cellular identifier settings of electronic devices in communication with other electronic devices, and indications of cellular identifiers, etc., described herein with reference to other methods described herein (e.g., methods 700, 900, 1300, and 1500). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 11A-11Q are, optionally, implemented by components depicted in FIGS. 1A-1B. For example, displaying operations 1110, 1124, 1160, 1170, 1198-2, 1198-6, 1198-38, and 1198-44, and receiving operations 1102, 1122, 1126, 1130, 1138, 1152, 1162, 1176, 1194, 1198-4, 1198-12, 1198-20, 1198-28, 1198-36, 1198-50, and 1198-58, are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Presenting Visual Indications of Cellular Identifier Status

Users interact with electronic devices in many different manners, including communicating with other electronic devices using network connections. In some embodiments, the electronic device displays an indication of the status of the cellular identifiers that are active on the electronic device. The embodiments described below provide ways in which an electronic device presents the visual indications of the status of the cellular identifiers in various user interfaces presented on the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 12A-12K illustrate exemplary ways in which an electronic device presents visual indications of the status of the cellular identifiers active on the electronic device in accordance with some embodiments of the disclosure. The embodiments in these figures are used to illustrate the processes described below, including the processes described with reference to FIGS. 13A-13F.

Figure 12A:
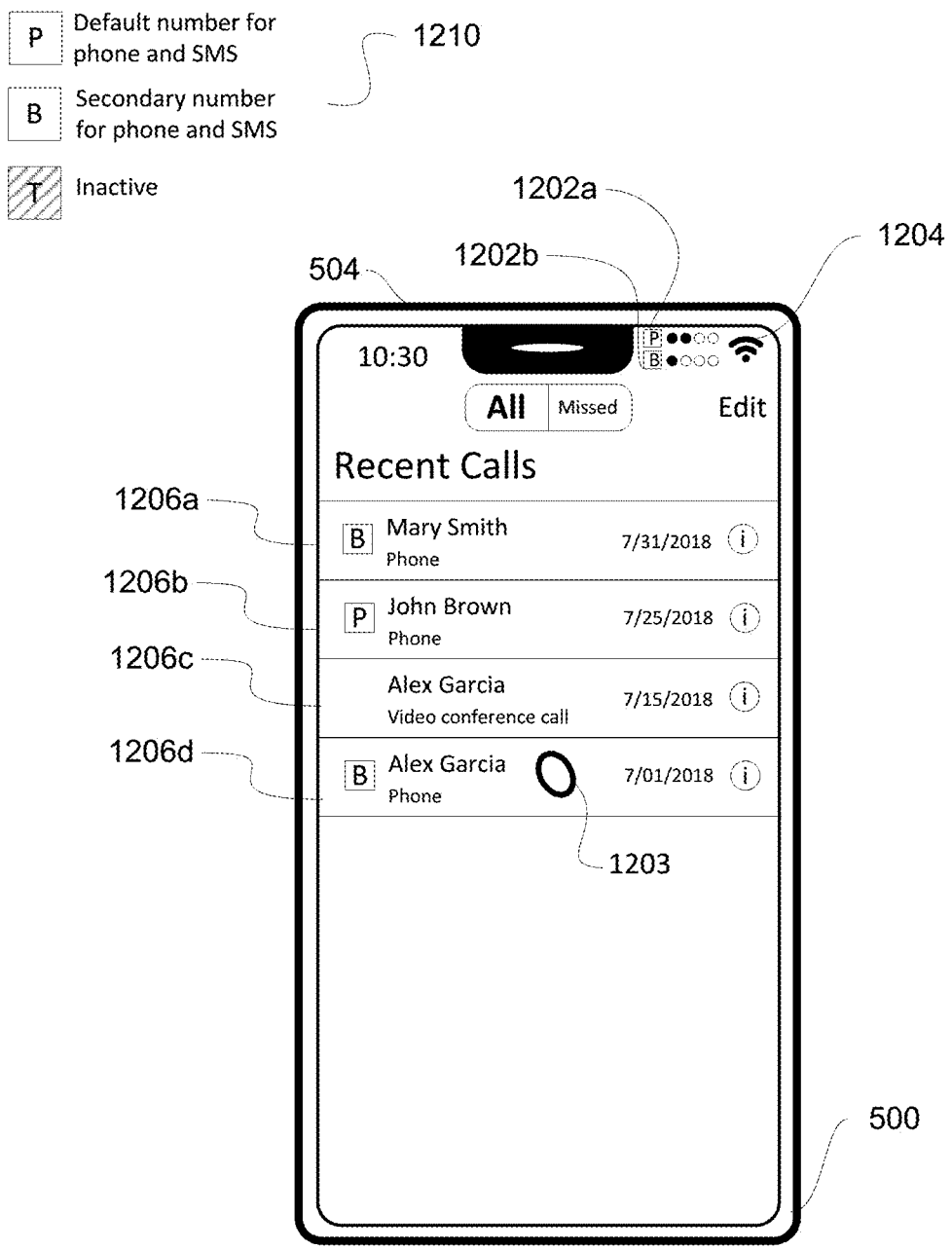
FIGS. 12A-12K illustrate exemplary ways in which an electronic device presents visual indications of the status of the cellular identifiers active on the electronic device in accordance with some embodiments of the disclosure.

FIG. 12A illustrates exemplary device 500 with touch screen 504, such as described with reference to FIGS. 5A-5H. Touch screen 504 optionally displays one or more user interfaces that include various content. In the example illustrated in FIG. 12A, touch screen 504 displays a recent calls user interface according to some embodiments of the disclosure. The recent calls user interface includes an indication 1202a of a signal strength of a first cellular identifier (e.g., a "Personal" cellular identifier), an indication 1202b of a signal strength of a second cellular identifier (e.g., a "Business" cellular identifier), a wireless network (e.g., Wi-Fi) indication 1204, and a plurality of indications 1206a-d of recent telephone calls performed by the electronic device 500. As shown in the legend 1210 of FIG. 12A, the "Personal" cellular identifier is active on the electronic device 500 and configured as the default number for phone and SMS, the "Business" cellular identifier is active on the electronic device 500 and configured as the secondary number for phone and SMS, and the "Travel" cellular identifier is inactive on the electronic device 500. Because the "Personal" and "Business" cellular identifiers are active on the electronic device 500, the electronic device 500 presents indications 1202a-b of the signal strengths of these cellular identifiers.

The indications 1202a-b of the first and second cellular identifiers include visual indications identifying the cellular identifiers and indications of the signal strength (e.g., of the cellular service) of the cellular identifiers. The wireless network indication 1204 is presented when the electronic device 500 is connected to a network via a wireless connection (e.g., Wi-Fi) not facilitated by a cellular identifier. In FIG. 12A, each indication 1206a-d of recent telephone calls includes an indication of the cellular identifier used for the phone call, a contact with which the phone call was conducted, and a date of the phone call. In the example shown in FIG. 12A, the affordance 1206c associated with the recent video conference call made or received with the "Personal" cellular identifier does not include an indication of the "Personal" cellular identifier because the "Personal" cellular identifier is the default number for phone and SMS. In some embodiments, the cellular identifier that is the default number for phone and SMS is the cellular identifier used for these operations by default and the default cellular identifier for video conference calls. The electronic device 500 optionally does not present an indication of the cellular identifier used for video conference calls because it is expected that the user understands that the default cellular identifier is used for video conference calls. The indications 1206a-d of the recent telephone calls are selectable to initiate a phone call with the respective contact using the respective cellular identifier. As shown in FIG. 12A, the user selects (e.g., with contact 1203) an indication 1206d of a telephone call with "Alex Garcia" that was conducted with the "Business" cellular identifier.

Figure 12B:

In response to the user's selection, the electronic device 500 presents a telephone user interface, as shown in FIG. 12B. The telephone user interface includes the indications 1202a-b of the cellular identifiers active on the electronic device 500, the wireless network indication 1204, an indication 1212 of the contact with which the phone call is being conducted, and an indication 1214 of the cellular identifier (e.g., the "Business" cellular identifier) being used to conduct the phone call. As shown in the legend 1210 of FIG.

12B, while the "Business" cellular identifier is being used to conduct the phone call, the "Personal" cellular identifier is temporarily disabled (e.g., because in some embodiments only a single cellular identifier is able to be actively used for communication on device 500 at any one moment in time). The indication 1202*a* of the "Personal" cellular identifier includes an indication of cellular service that has an inactive (e.g., greyed out) appearance. Other inactive appearances are possible. The indication 1202*b* of the "Business" cellular identifier indicates the signal level of the "Business" cellular identifier and/or that the "Business" cellular identifier remains active on device 500.

Figure 12C:
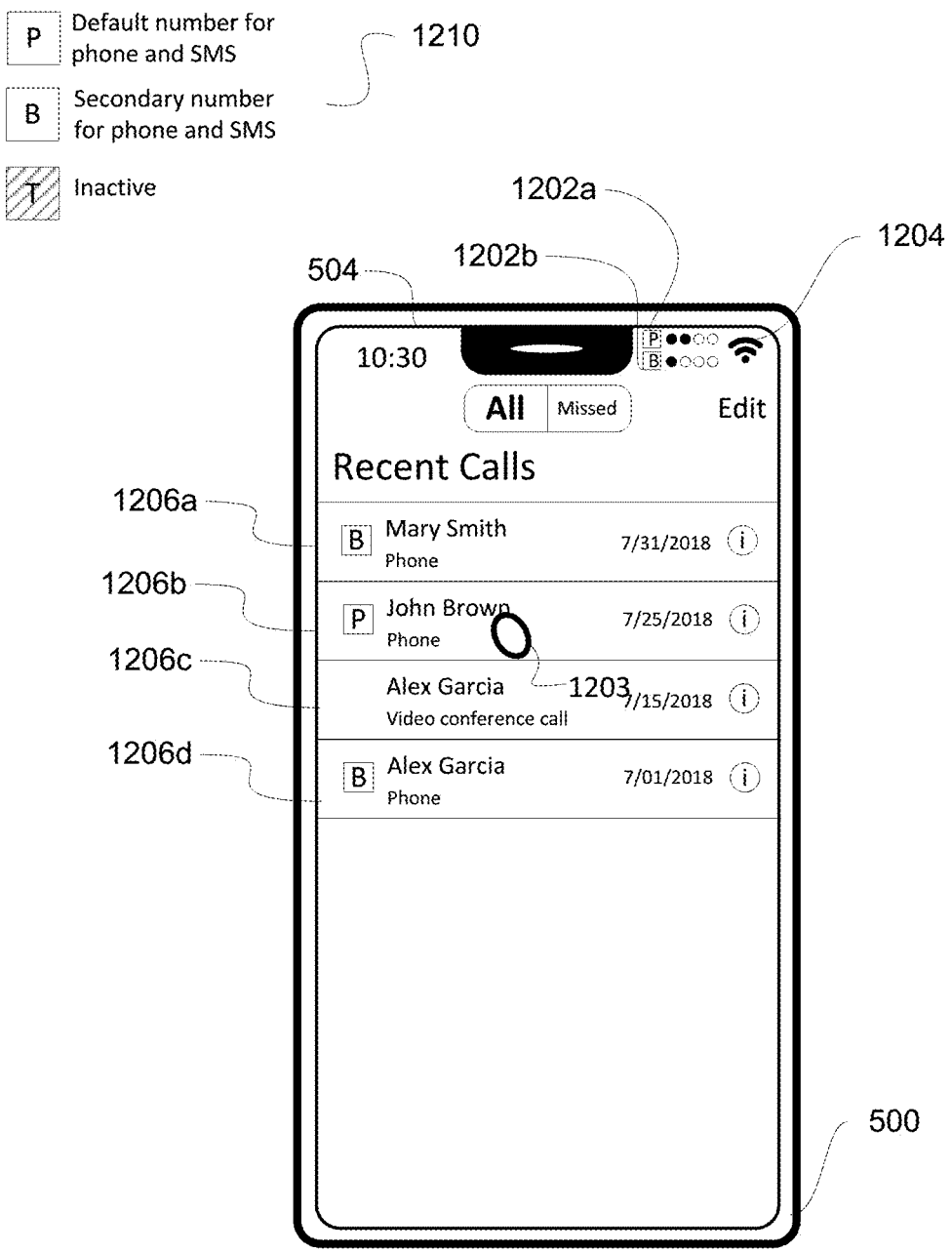

FIG. 12C illustrates a recent calls user interface that is substantially similar to the recent calls user interface illustrated in FIG. 12A. As shown in FIG. 12C, the user selects (e.g., with contact 1203) an affordance 1206*b* associated with a recent phone call with "John Brown" using the "Personal" cellular identifier.

Figure 12D:
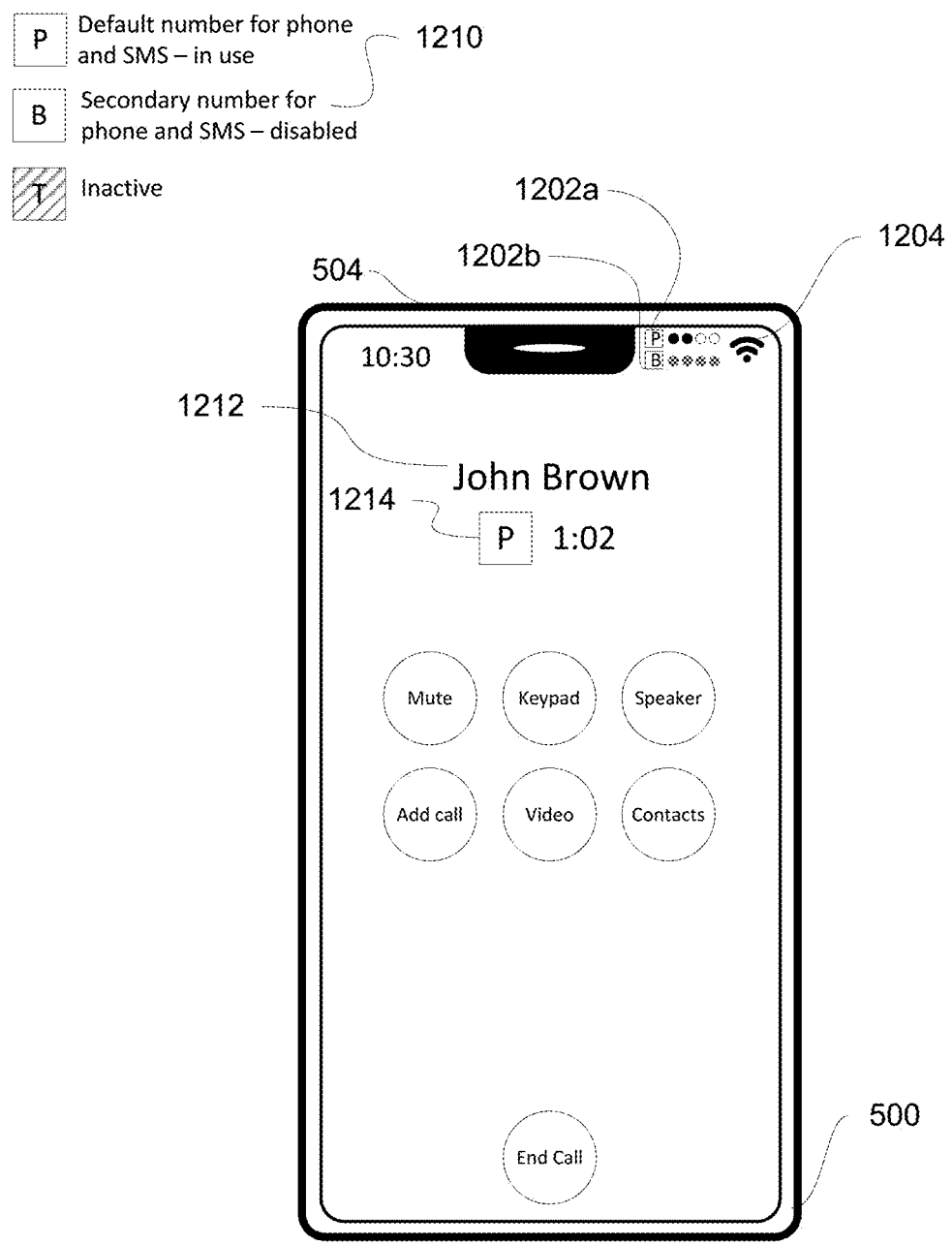

In response to the selection, the electronic device presents a telephone user interface as shown in FIG. 12D that is substantially similar to the telephone user interface illustrated in FIG. 12B. As shown in FIG. 12D, the electronic device presents an indication 1214 that the "Personal" cellular identifier is being used to conduct the telephone call. The legend 1210 of FIG. 12D indicates that while the "Personal" cellular identifier is in use to conduct the telephone call, the "Business" cellular identifier is temporarily disabled. The indication 1202*b* of the "Business" cellular identifier includes an indication of cellular service that has an inactive (e.g., greyed out) appearance. Other inactive appearances are possible. The indication 1202*a* of the "Personal" cellular identifier indicates the signal level of the "Personal" cellular identifier and/or that the "Business" cellular identifier remains active on device 500.

Figure 12E:
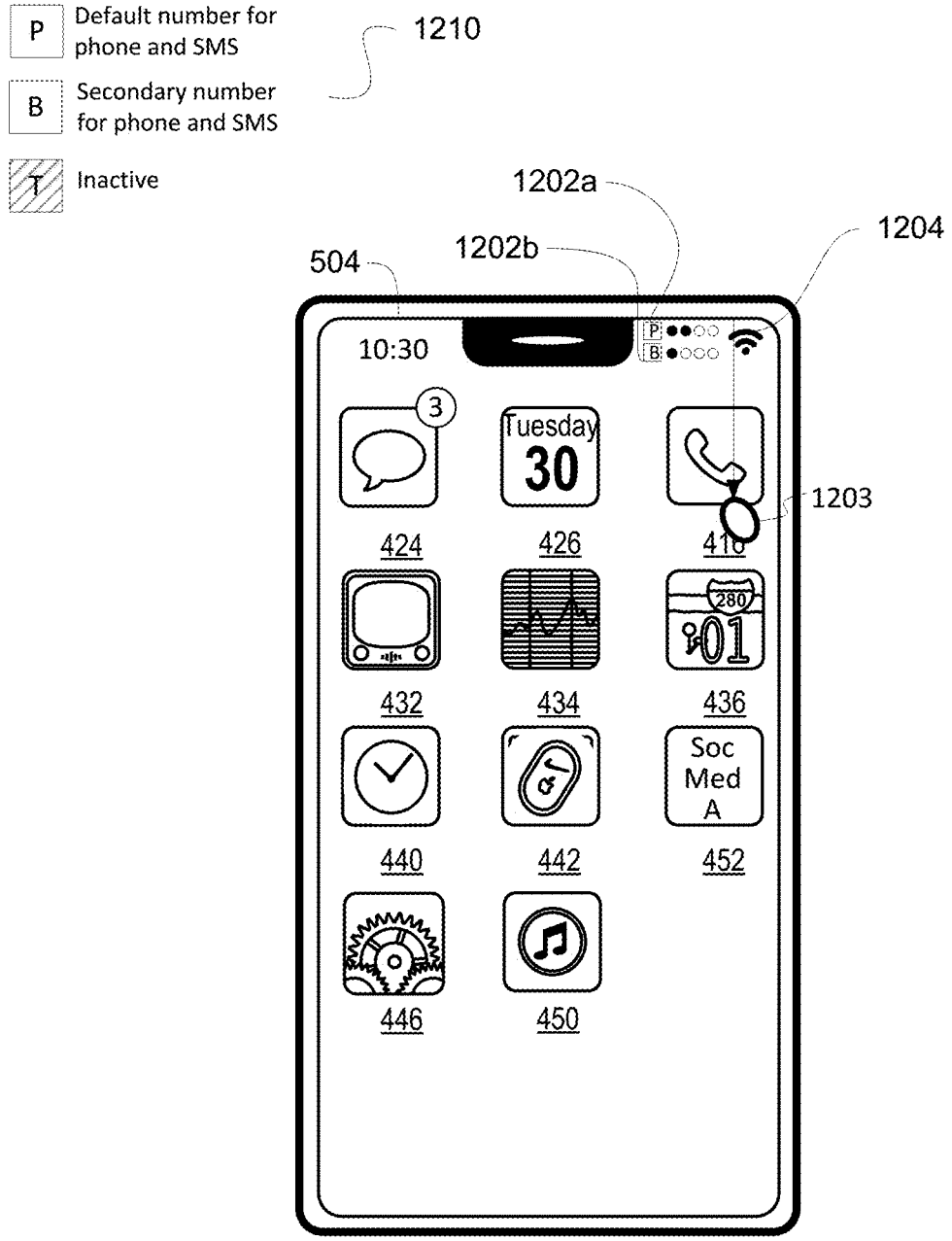

FIG. 12E illustrates a home screen user interface of device 500 according to some embodiments of the disclosure. The home screen user interface (e.g., as described with reference to FIG. 4A) includes a plurality of icons 416-452 selectable to launch respective applications on the electronic device 500, the indications 1202*a*-*b* of the cellular identifiers active on the electronic device, and the wireless network indication 1204. The indications 1202*a*-*b* of the cellular identifiers include visual indications of which cellular identifiers are active on the electronic device (e.g., the "P" and "B" icons) and indications of the signal level of each cellular identifier. As shown in FIG. 12E, the electronic device 500 detects an input (e.g., downward swipe of contact 1203 from the upper-right border of touch screen 504) for presenting a control user interface on device 500.

Figure 12F:
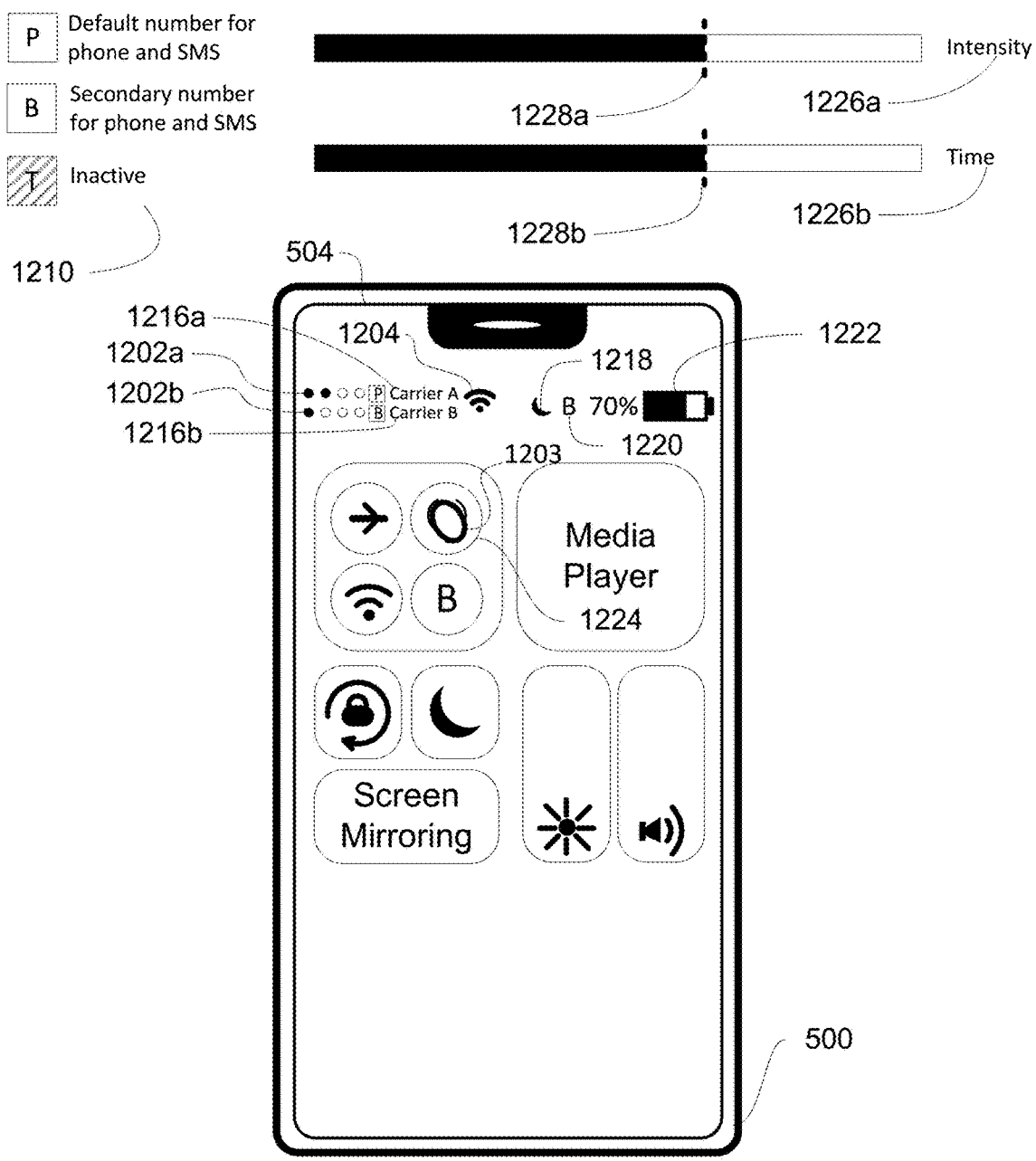

In response to the input, the electronic device 500 presents the control user interface, as illustrated in FIG. 12F. The control user interface includes the indications 1202*a*-*b* of the cellular identifiers that are active on the electronic device, indications 1216*a*-*b* of the names of the cellular carriers of the cellular identifiers, the wireless network indication 1204, an indication 1218 of an operation mode (e.g., "Do Not Disturb" mode) of the electronic device 500, an indication 1220 of a short-range wireless (e.g., Bluetooth) connection, and a battery level indication 1222. The control user interface also includes a number of affordances for controlling the operation of device 500. The control user interface includes affordances for activating various operation modes of the electronic device, such as an airplane mode affordance for activating or deactivating airplane mode, a Wi-Fi affordance for activating or deactivating Wi-Fi on the electronic device, a Bluetooth affordance for activating or deactivating Bluetooth on the electronic device, Do Not Disturb affordance for activating or deactivating a Do Not Disturb mode on the electronic device, and a rotation lock affordance for preventing or allowing the image displayed on the electronic device 500 to rotate in response to rotation of the electronic device. The control user interface further includes a number of affordances for changing a setting of the electronic device, such as a brightness affordance for changing the display brightness and a volume affordance for changing the volume of the electronic device. The control user interface further includes a media player affordance selectable to launch a plurality of media player controls on the electronic device 500.

The control center user interface further includes an affordance 1224 selectable to present cellular identifier settings of the electronic device. As shown in FIG. 12F, the user selects (e.g., with contact 1003) the affordance 1224 for presenting cellular identifier settings of the electronic device 500. In particular, in FIG. 12F, contact 1003 has an intensity 1226*a* exceeding a predetermined intensity threshold 1228*a* and is detected for a time 1226*b* exceeding a predetermined time threshold 1228*b*. If, alternatively, the electronic device 500 detects a contact at affordance 1203 that does not have the intensity 1226*a* and/or the time 1226*b* illustrated in FIG. 12F, the electronic device deactivates cellular data on all cellular identifiers in response to the selection if the cellular identifiers are active when the input is detected. In some embodiments, if the selection is detected when cellular data is turned off on all cellular identifiers, the electronic device 500 activates cellular data in response to the selection.

Figure 12G:
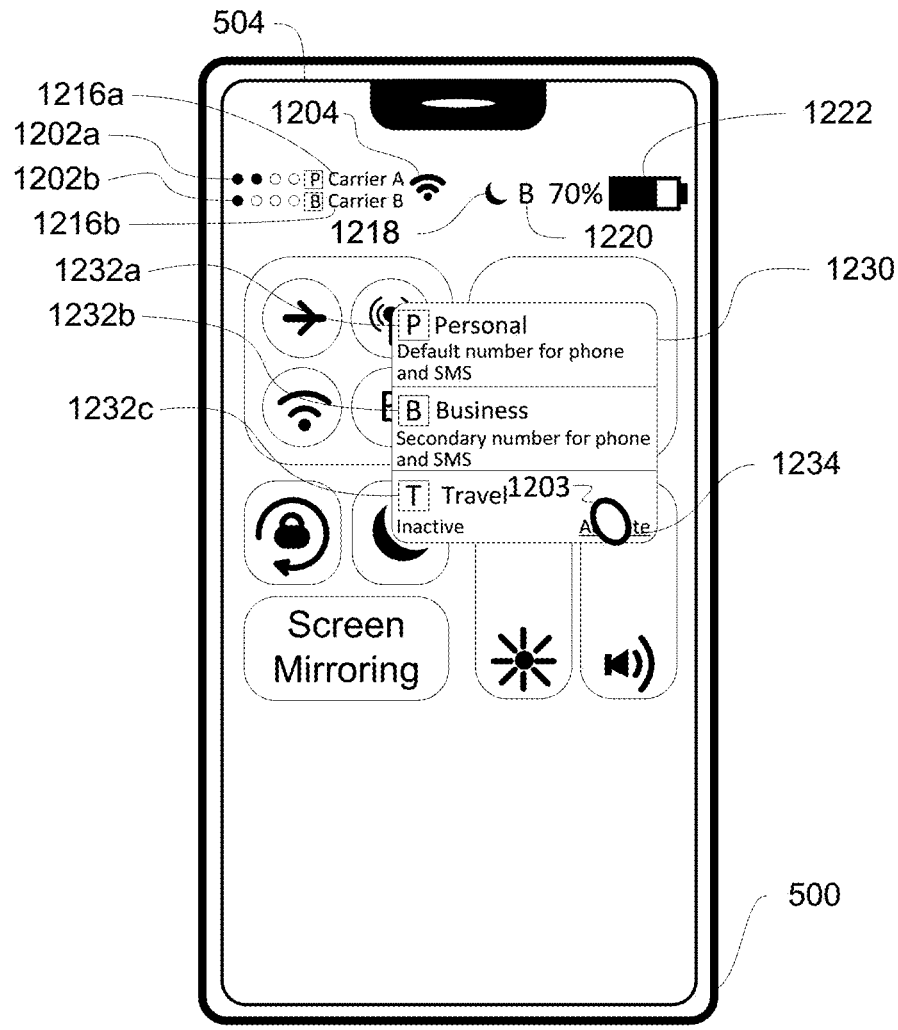

In response to the input having the characteristic(s) described above, the electronic device 500 presents the user interface illustrated in FIG. 12G. The electronic device 500 presents a list 1230 of the cellular identifiers available to the electronic device 500. The list 1230 includes the label of each cellular identifier (e.g., "Personal," "Business," and "Travel"), an indication 1232*a*-*c* of each cellular identifier, and an indication of the status of each cellular identifier. As shown in FIG. 12G, the status of the "Personal" cellular identifier is "default number for phone and SMS", the status of the "Business" cellular identifier is "secondary number for phone and SMS," the status of the "Travel" cellular identifier is "Inactive". The list also includes an affordance 1234 selectable to activate the "Travel" cellular identifier. The user selects (e.g., with contact 1203) the affordance 1234 for activating the "Travel" cellular identifier.

Figure 12H:
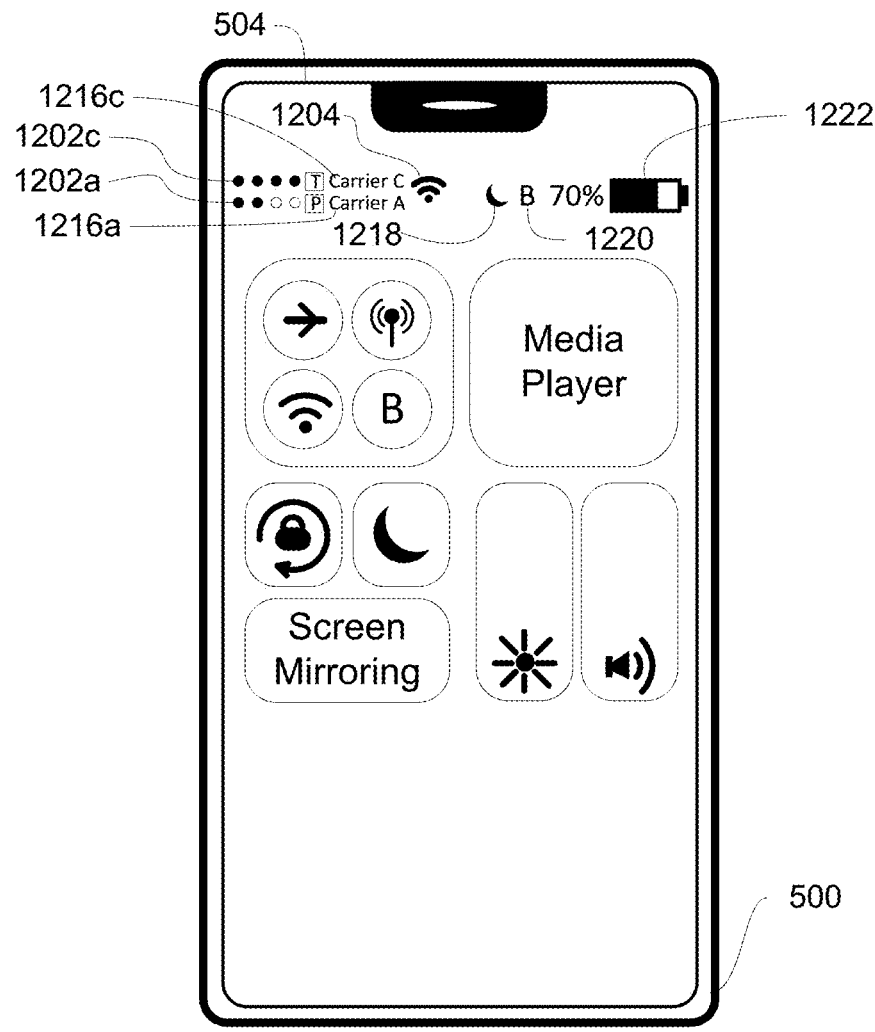

FIG. 12H illustrates the control center user interface after receiving the user input illustrated in FIG. 12G. In response to the user's selection of the affordance 1234 for activating the "Travel" cellular identifier, the electronic device 500 configures the cellular identifiers according to legend 1210 of FIG. 12H. The "Travel" cellular identifier is activated as the default number for phone and SMS, the "Personal" cellular identifier is configured for data only, and the "Business" cellular identifier is inactive. The electronic device 500 no longer presents an indication of the "Business" cellular identifier or an indication of the carrier associated with the "Business" cellular identifier because it is inactive on the electronic device 500. The electronic device 500 instead presents an indication 1202*c* of the "Travel" cellular identifier and an indication 1216*c* of the "Travel" cellular identifier including the name of the cellular carrier (e.g., "carrier C") of the "Travel" cellular identifier and continues to display the indication 1202*a* of the "Personal" cellular identifier and an indication 1202*a* of the "Personal" cellular identifier including the name of the cellular carrier (e.g., "carrier A") of the "Personal" cellular identifier.

Figure 12I:
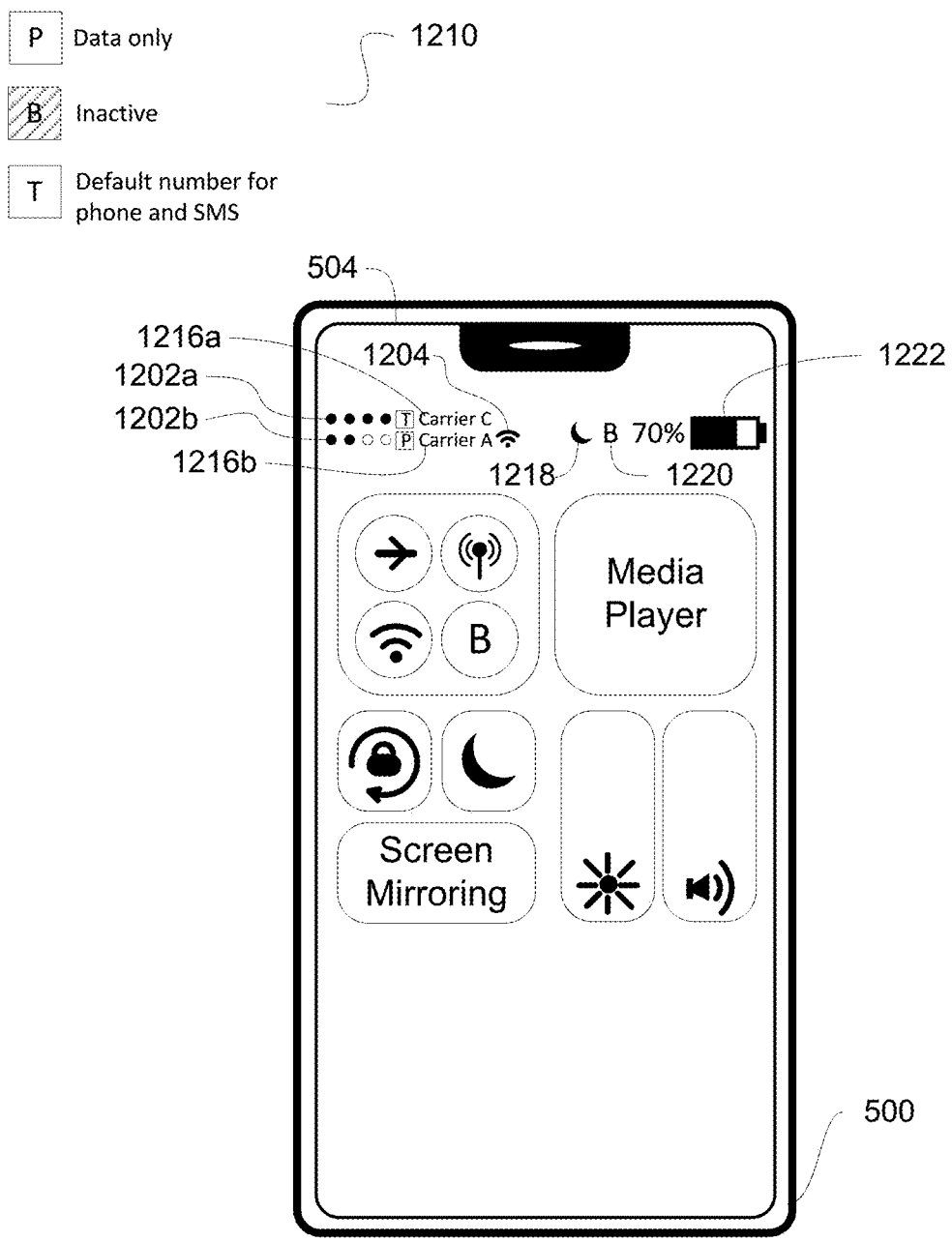

In some embodiments, the wireless network indication 1204 is displayed next to the indication of the cellular identifier that is configured as the "data only" cellular identifier on device 500. As shown in FIG. 12I, the wireless indication 1204 is displayed next to the indication 1202*b* of the "Personal" cellular identifier, which is configured as the "data only" cellular identifier. In some embodiments, the wireless network indication is displayed next to the indication of the cellular identifier that is configured as the default number for phone and SMS if there is no cellular identifier configured for data only.

Figure 12J:
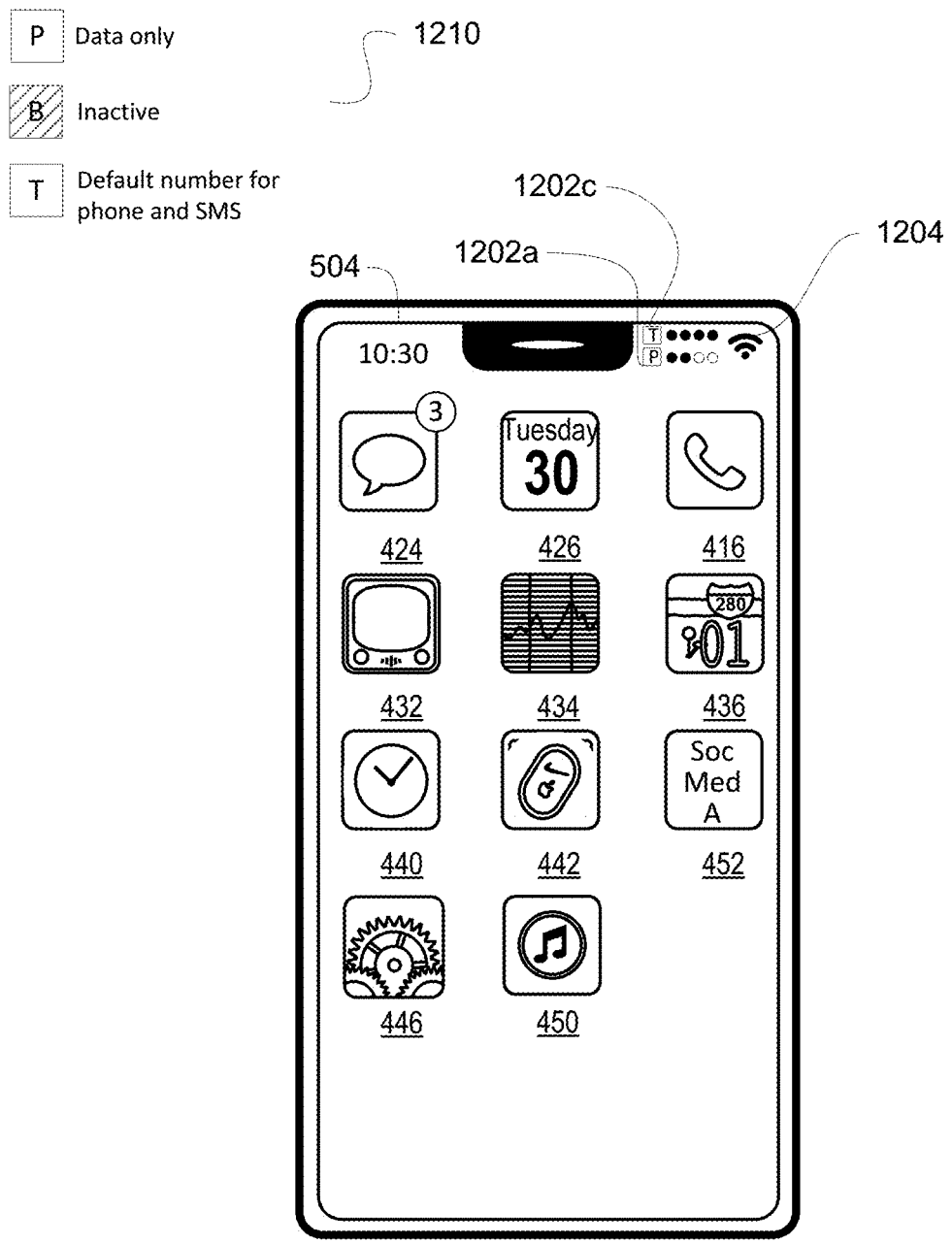
Figure 12K:
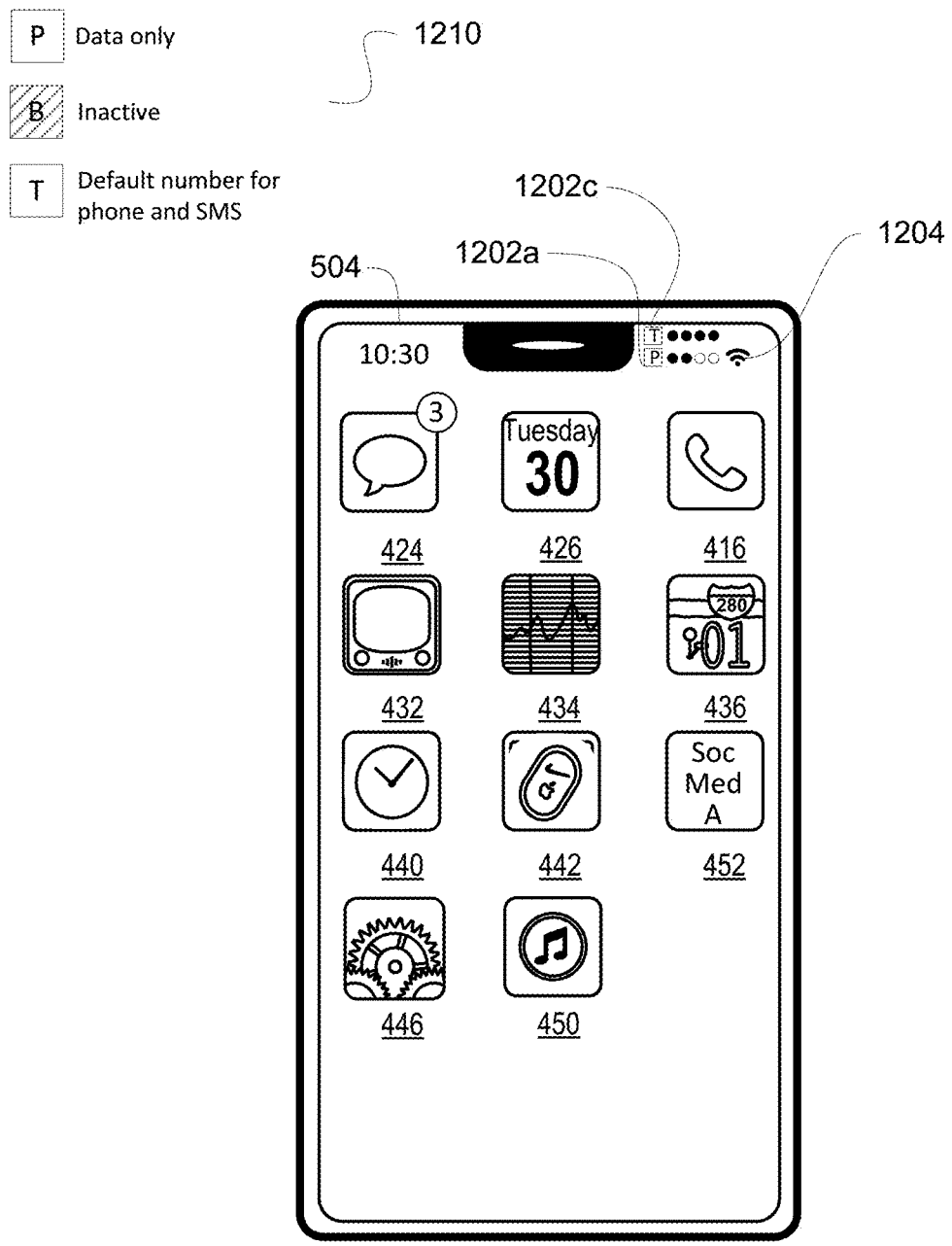
Figure 13A:
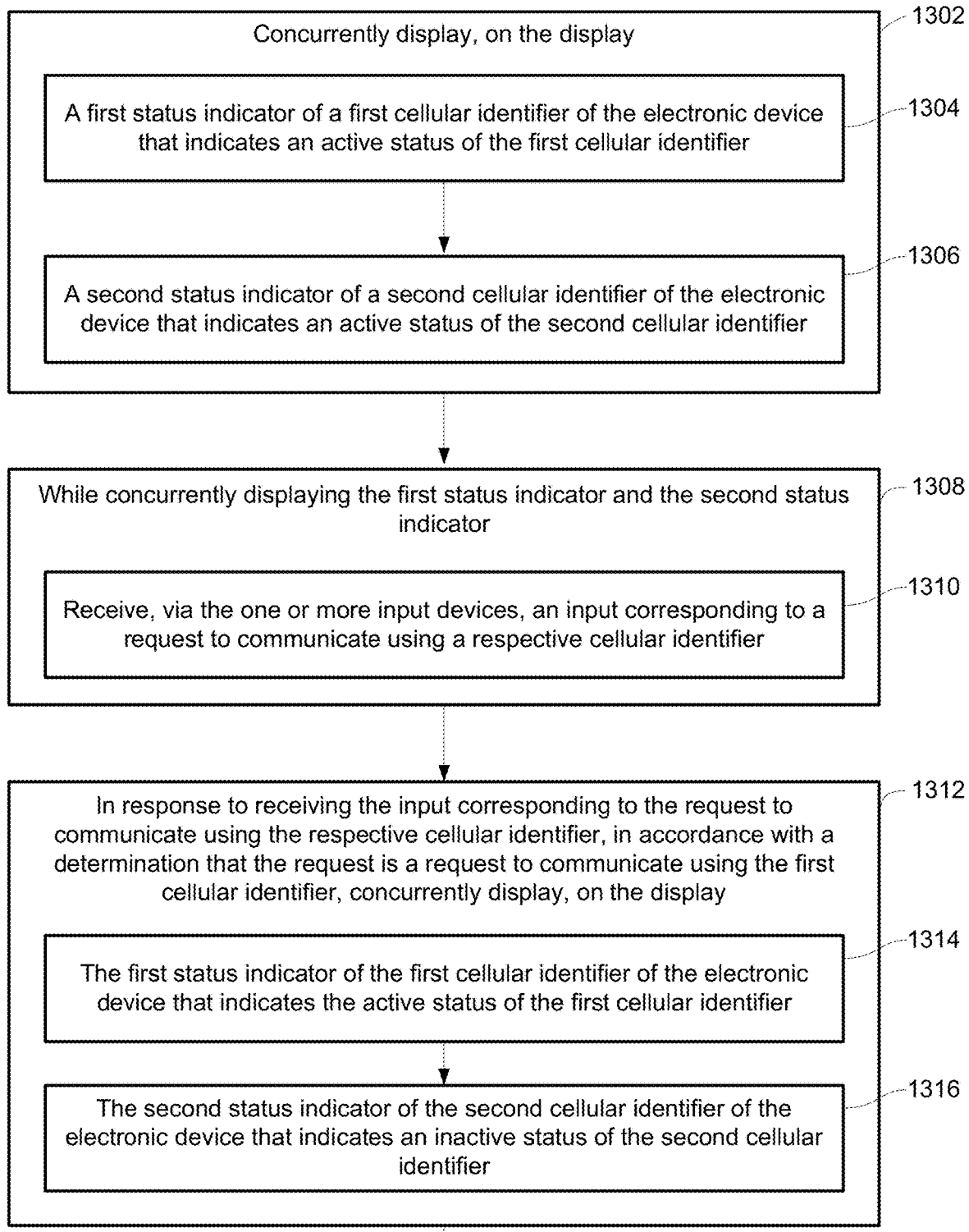
FIGS. 13A-13F are flow diagrams illustrating a method of presenting visual indications of the status of the cellular identifiers active on the electronic device in accordance with some embodiments of the disclosure.
Figure 13B:
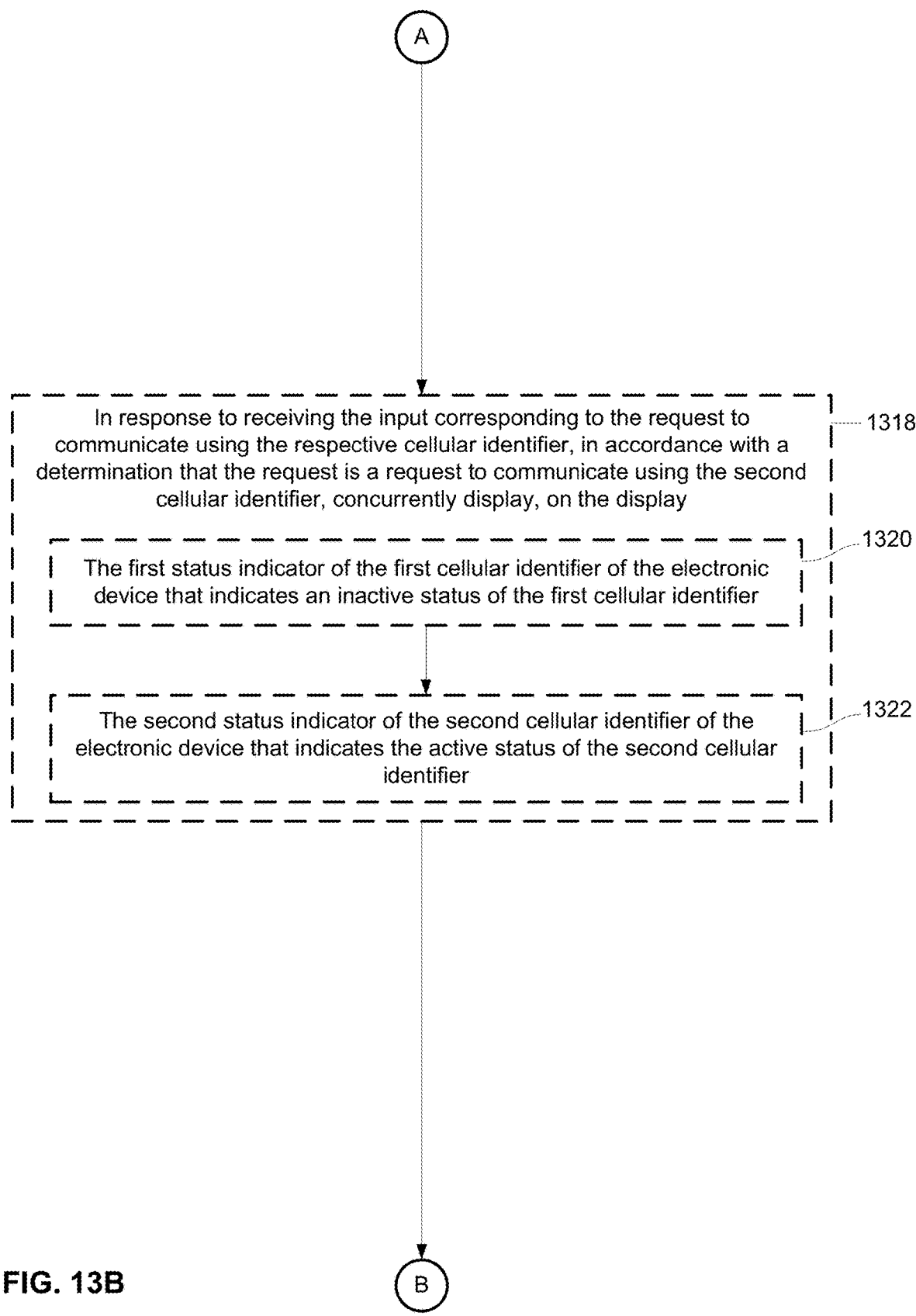
Figure 13C:
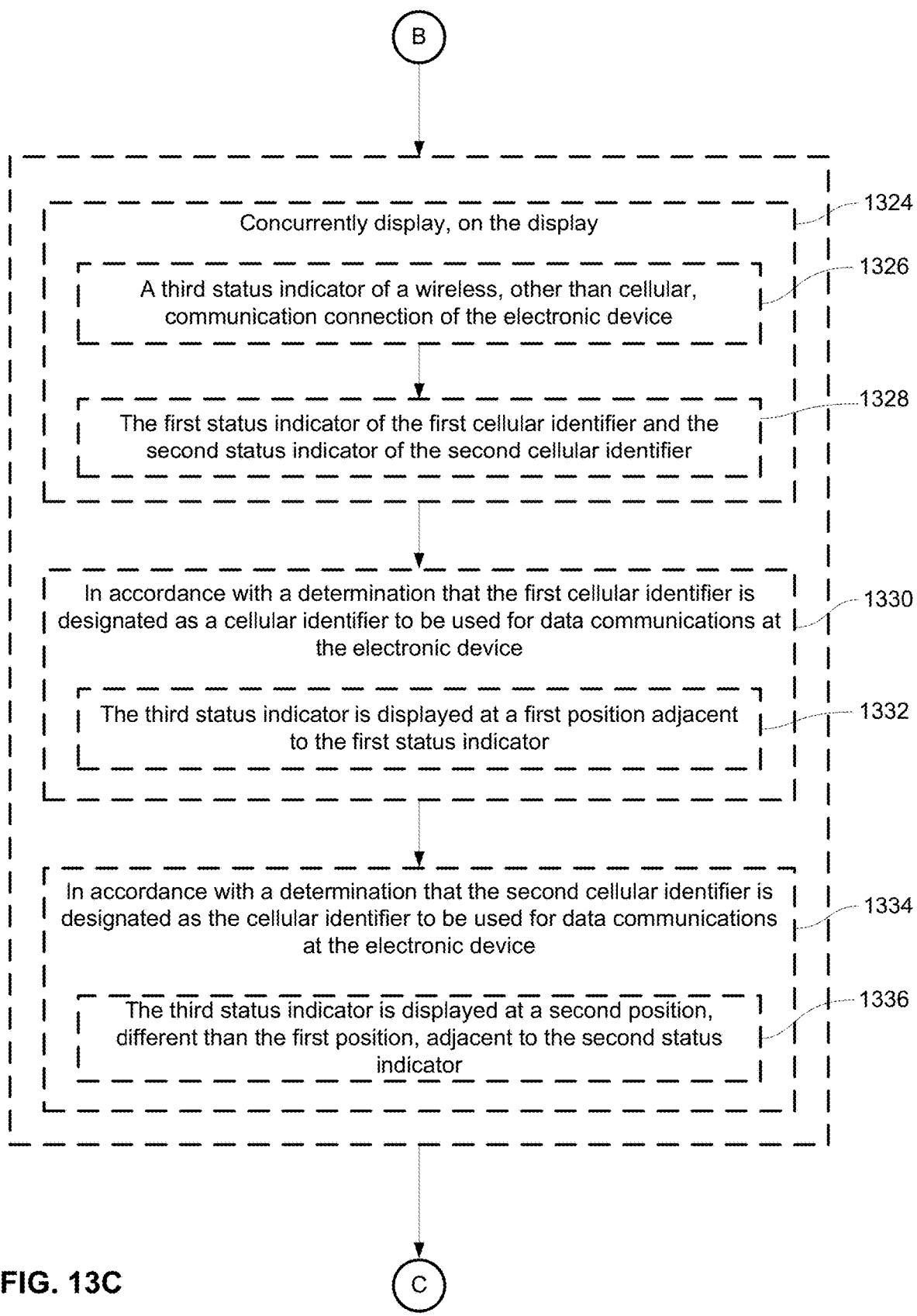
Figure 13D:
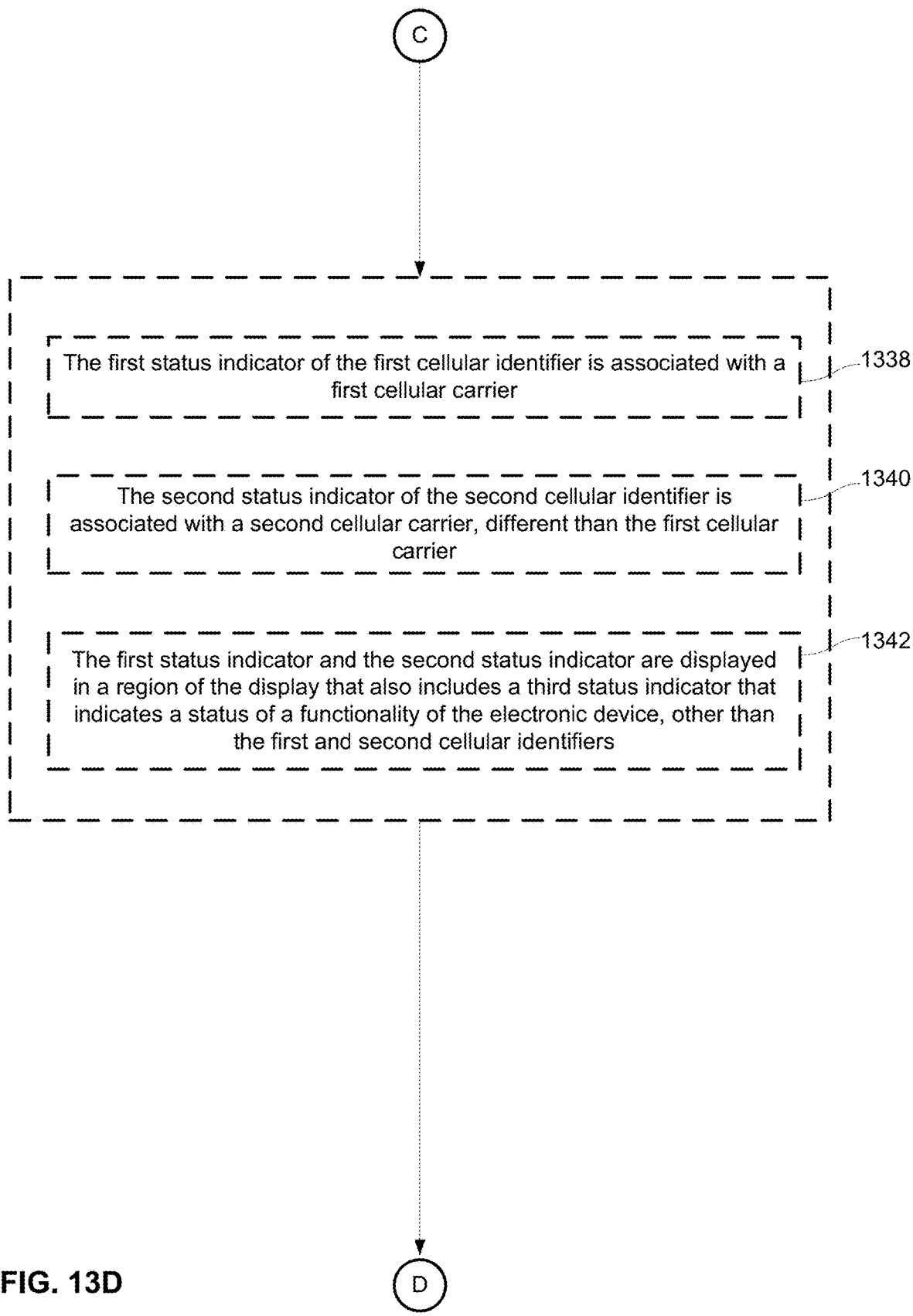
Figure 13E:
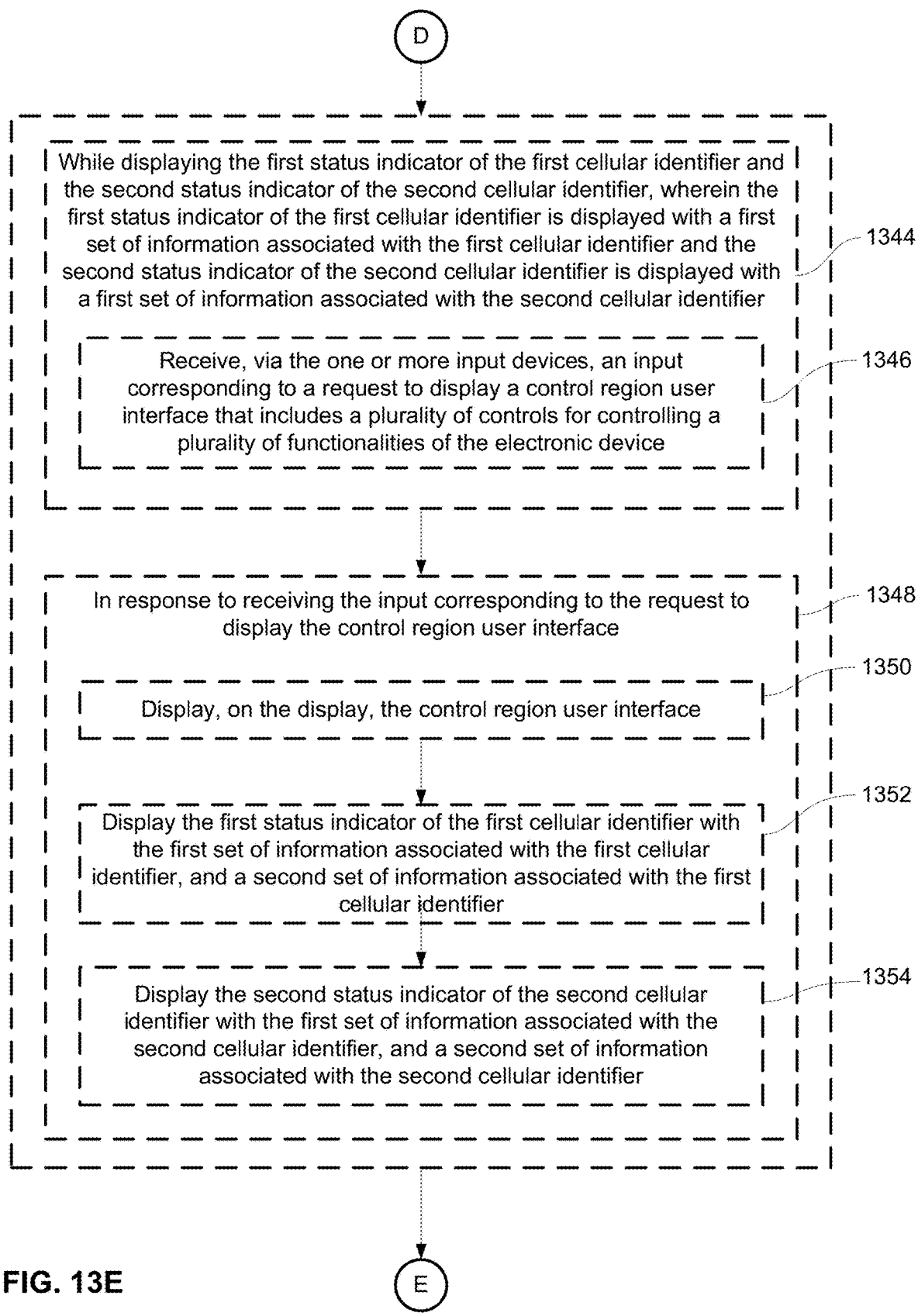
Figure 13F:
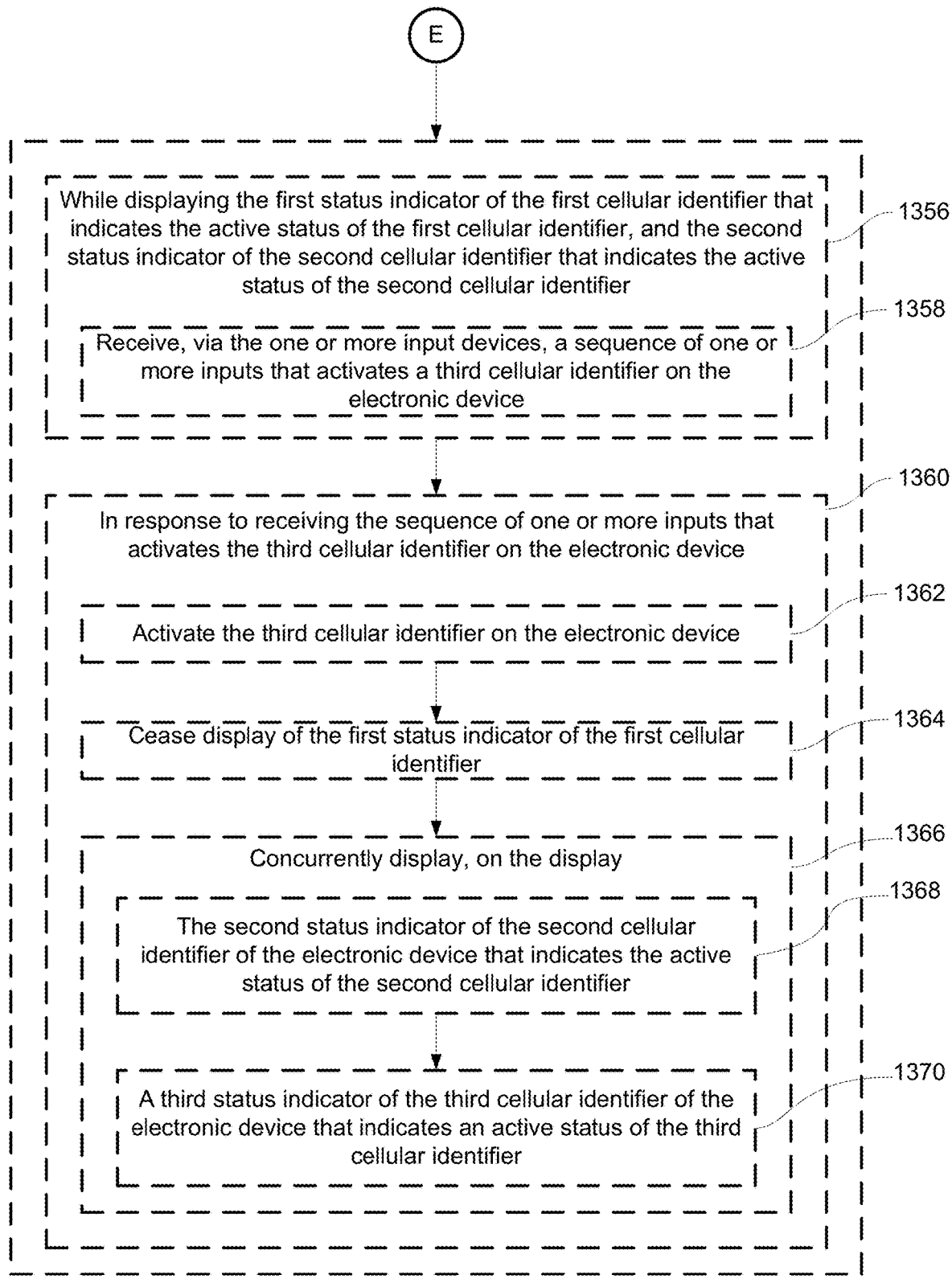

FIG. 12J illustrates the home screen user interface of device 500, which is substantially similar to the home screen user interface illustrated in FIG. 12E. As shown in illustrated in FIG. 12J, the electronic device 500 presents an indication 1202*a* of the "Personal" cellular identifier and an indication 1202*c* of the "Travel" cellular identifier. The indications 1202*a* and 1202*c* of the cellular identifiers include indications of the cellular signal of each cellular identifier. The wireless network indication 1204 is displayed next to both indications 1202*a* and 1202*c* of the cellular identifiers. As shown in FIG. 12K, in some embodiments, the wireless network indication 1204 is instead displayed next to the indication of the cellular identifier that is configured as the data only cellular identifier. The wireless network indication 1204 in FIG. 12K is displayed next to the indication 1202*a* of the "Personal" cellular identifier.

FIGS. 13A-13F are flow diagrams illustrating a method 1300 of presenting visual indications of the status of the cellular identifiers active on the electronic device in accordance with some embodiments of the disclosure. The method 1300 is optionally performed at an electronic device such as device 100, device 300, device 500, as described above with reference to FIGS. 1A-1B, 2-3, 4A-4B and 5A-5H. Some operations in method 1300 are, optionally, combined and/or order of some operations is, optionally, changed.

As described below, the method 1300 provides ways to present visual indications of the status of the cellular identifiers active on the electronic device. The method reduces the cognitive burden on a user when interaction with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., electronic device 500) in communication with a display and one or more input devices (e.g., a mobile device (e.g., a tablet, a smartphone, a media player, or a wearable device) including a touch screen or a computer including one or more of a keyboard, mouse, trackpad, and touch screen), concurrently displays (1302), on the display, such as in FIG. 12A, a first status indicator of a first cellular identifier of the electronic device that indicates an active status of the first cellular identifier (1304) (e.g., the status indicator includes text or an image that indicates that the first cellular identifier is active and optionally further includes an indication that the first cellular identifier is not presently being used to perform a communication operation. In some embodiments, the first status indicator further includes an indication of signal strength of the first cellular identifier. In some embodiments, the status indicator is displayed in a toolbar of the user interface of the electronic device that is displayed concurrently with another user interface, such as a home screen or a user interface of an application accessible to the electronic device. In some embodiments, the status indicator is displayed in a control region user interface that includes information about the electronic device such as network connections, battery life, etc. and/or one or more affordances selectable to perform functions at the electronic device (e.g., change a setting (e.g., speaker volume, display brightness, operation modes, etc), open a camera application, open a calculator application, activate one or more media player controls (e.g., play, pause, next, previous, etc), activate a flashlight, etc)), such as in FIG. 12A, and a second status indicator of a second cellular identifier of the electronic device that indicates an active status of the second cellular identifier (1306) (e.g., the status indicator includes text or an image that indicates that the second cellular identifier is active and optionally further includes an indication that the second cellular identifier is not presently being used to perform a communication operation. In some embodiments, the second status indicator further includes an indication of signal strength of the second cellular identifier. In some embodiments, the mobile device activates two cellular identifiers at a time, thereby deactivating any additional cellular identifiers (e.g., a third cellular identifier) when the first cellular identifier and the second cellular identifier are selected for use (e.g., using process 700). For example, when the third cellular identifier is not selected for use, the electronic device does not use it to perform operations and does not display a status indicator indicating the status of the third cellular identifier until it is selected for use), such as in FIG. 12A.

In some embodiments, while concurrently displaying the first status indicator 1202*a* and the second status indicator 1202*b* (1308), such as in FIG. 12A, the electronic device receives (1310), via the one or more input devices, an input (e.g., selection of affordance 1206*d* with contact 1203 as shown in FIG. 12A) corresponding to a request to communicate using a respective cellular identifier (e.g., an input for making a call, sending a message, or downloading or uploading data using the respective cellular identifier). In some embodiments, the respective cellular identifier is the default cellular identifier used to perform the requested communication and the electronic device performs the communication using the respective cellular identifier automatically. For example, the respective cellular identifier is optionally the default cellular identifier for all operations, for a specific operation (e.g., placing a call) for all contacts, or for all communication with the specified contact. In some embodiments, the respective cellular identifier is not the default cellular identifier for performing the requested communication, and the user enters an input requesting to use the respective cellular identifier to perform the communication.

In some embodiments, in response to receiving the input corresponding to the request to communicate using the respective cellular identifier, in accordance with a determination that the request is a request to communicate using the first cellular identifier (e.g., the first cellular identifier is the respective cellular identifier), the electronic device concurrently displays (1312), on the display, such as in FIG. 12B, the first status indicator 1202*b* of the first cellular identifier of the electronic device that indicates the active status of the first cellular identifier (1314) (e.g., the same first status indicator displayed before the communication operation was performed), and the second status indicator 1202*a* of the second cellular identifier of the electronic device that indicates an inactive status of the second cellular identifier (1316). In some embodiments, the first status indicator is updated to include an indication that the first cellular identifier is currently being used to perform a communication operation, such as being displayed in a different color, at a different size, or a different text or an image indicating the active status and that the first cellular identifier is currently being used to perform a communication operation. In some embodiments, the second status indicator updated to include an indication that the second cellular identifier is not active, such as being displayed in a different color, at a different size, showing no cellular signal, or a different text or an image indicating the inactive status. In some embodiments, the electronic device performs operations using one cellular identifier at a time, thereby deactivating the second cellular identifier while the first cellular identifier is being used to perform a communication operation and vice versa. When the communication operation being performed with the first cellular identifier is complete, the second cellular identifier is optionally activated again.

The above-described manner of displaying status indicators of the first cellular identifier and the second cellular identifier allows the electronic device to convey to the user which cellular identifiers are available for use and/or in use, which simplifies interactions between the user and the device and enhances the operability of the device (e.g., by providing information about which cellular identifiers are available or being used at multiple user interfaces of the electronic device), which, additionally, reduces power usage and improves battery life of the device by enabling the user to use the device more quickly and efficiently.

In some embodiments, in response to receiving the input corresponding to the request to communicate using the respective cellular identifier (e.g., selection of indication 106b with contact 1203 in FIG. 12C), in accordance with a determination that the request is a request to communicate using the second cellular identifier (e.g., the second cellular identifier is the second cellular identifier), the electronic device concurrently displays (1318), on the display, such as in FIG. 12D, the first status indicator 1202b of the first cellular identifier of the electronic device that indicates an inactive status of the first cellular identifier (1320) and the second status indicator 1202a of the second cellular identifier of the electronic device that indicates the active status of the second cellular identifier (1322) (e.g., the same second status indicator displayed before the communication operation was performed). In some embodiments, the first status indicator is updated to include an indication that the first cellular identifier is not active, such as being displayed in a different color, at a different size, showing no cellular signal, or a different text or an image indicating the inactive status. In some embodiments, the electronic device performs operations using one cellular identifier at a time, thereby deactivating the first cellular identifier while the second cellular identifier is being used to perform a communication operation and vice versa. When the communication operation being performed with the second cellular identifier is complete, the first cellular identifier is optionally activated again. In some embodiments, the second status indicator is updated to include an indication that the second cellular identifier is currently being used to perform a communication function, such as being displayed in a different color, at a different size, or a different text or an image indicating the active status and that the second cellular identifier is currently being used to perform a communication function.

The above-described manner of updating the status indicator of the first cellular identifier to show an inactive status while the second cellular identifier is being used to perform a communication function allows the electronic device to communicate to the user that the first cellular identifier is currently not active, which simplifies interactions between the user and the device and enhances operability of the device (e.g., by informing the user when the first cellular identifier is not active, which in turn explains to the user why the electronic device is not able to concurrently perform functions with the first cellular identifier while the second cellular identifier is being used to perform a function), which, additionally, reduces power usage and improves battery life of the device by enabling the user to use the device more quickly and efficiently.

In some embodiments, the electronic device concurrently displays (1324), on the display, a third status indicator 1204 of a wireless, other than cellular, communication connection of the electronic device (1326) (e.g., a WiFi connection indicator, a Bluetooth connection indicator, other than cellular), and the first status indicator 1202a of the first cellular identifier and the second status indicator 1202c of the second cellular identifier (1328), such as in FIG. 12K.

In some embodiments, in accordance with a determination that the first cellular identifier is designated as a cellular identifier to be used for data communications at the electronic device (1330), such as the "Personal" cellular identifier indicated in the legend 1210 of FIG. 12K, the third status indicator 1204 is displayed at a first position adjacent to the first status indicator 1202a (1332). The first cellular identifier is optionally the default cellular identifier to be used for mobile data. The functions of the first cellular identifier are optionally set as "data only" or "primary cellular identifier for voice, messaging, and data." In some embodiments, if the status indicator of the first cellular identifier and the status indicator of the second cellular identifier are displayed in one column, the third status indicator is optionally displayed in the same row as the first status indicator. If the status indicator of the first cellular identifier and the status indicator of the second cellular identifier are displayed in one row, the third status indicator is optionally displayed in the same column as the first status indicator.

In some embodiments, in accordance with a determination that the second cellular identifier is designated as the cellular identifier to be used for data communications at the electronic device (1334), the third status indicator is displayed at a second position, different than the first position, adjacent to the second status indicator (1336). If, as an example referring to FIG. 12K, the "Travel" cellular identifier was configured as the "Data only" cellular identifier and the "Personal" cellular identifier was configured for a different set of functions, the indication 1204 of Wi-Fi would be positioned next to the indication 1202c of the "Travel" cellular identifier rather than being positioned next to the indication of the "Personal" cellular identifier, as shown in FIG. 12K. In some embodiments, the second cellular identifier is the default cellular identifier to be used for mobile data. The functions of the second cellular identifier are optionally set as "data only" or "primary cellular identifier for voice, messaging, and data." If the status indicator of the first cellular identifier and the status indicator of the second cellular identifier are displayed in one column, the third status indicator is optionally displayed in the same row as the second status indicator. If the status indicator of the first cellular identifier and the status indicator of the second cellular identifier are displayed in one row, the third status indicator is optionally displayed in the same column as the second status indicator.

The above-described manner of presenting the third status indicator of the wireless communication connection of the electronic device adjacent to the status indicator of the cellular identifier used for data communications allows the electronic device to communicate to the user which cellular identifier is configured to perform cellular data operations, which simplifies interactions between the user and the device and enhances operability of the device (e.g., by informing the user which cellular identifier will be used for data functions if the non-cellular wireless communication ceases on the electronic device), which, additionally, reduces power usage and improves battery life of the device by enabling the user to use the device more quickly and efficiently.

In some embodiments, the first status indicator 1216b of the first cellular identifier is associated with a first cellular carrier (1338). The first cellular identifier is optionally associated with cellular services provided by a first cellular carrier and the status indicator of the first cellular identifier includes an indication of the first cellular carrier (e.g., text including the cellular carrier's name, an image including the cellular carrier's logo, etc). In some embodiments, the first status indicator includes an indication of the signal strength being provided by the first cellular carrier to the first cellular identifier (e.g., dots, bars, or some other indication of signal strength). The second status indicator 1216a of the second cellular identifier is optionally associated with a second cellular carrier, different than the first cellular carrier (1340). In some embodiments, the second cellular identifier is associated with cellular services provided by a second cellular carrier and the status indicator of the second cellular identifier includes an indication of the second cellular carrier (e.g., text including the cellular carrier's name, an image including the cellular carrier's logo, etc). In some embodiments, the second status indicator includes an indication of the signal strength being provided by the second cellular carrier to the second cellular identifier (e.g., dots, bars, or some other indication of signal strength). The first status indicator and the second status indicator are displayed in a region of the display that also includes a third status indicator 1204 that indicates a status of a functionality of the electronic device, other than the first and second cellular identifiers (1342) (e.g., One or more indications of Wi-Fi connectivity and/or signal strength, battery life, recent use of location services, alarm clock, time, etc). In some embodiments, the indicators are displayed concurrently and proximate to each other. Although FIG. 12I illustrates the indications 1216a and 1216b of the carriers associated with the cellular identifiers in a control area user interface, in some embodiments, the indications 1216a and 1216b of the carriers are displayed in a status region of the display in user interfaces other than the control area user interface (e.g., similar to the presentation of indications 1202a, 1202b, and 1204 in FIG. 12E).

The above-described manner of displaying the first status indicator and the second status indicator in a region of the display that includes a third status indicator allows the electronic device to display information about multiple device functions proximate to one another, which simplifies interactions between the user and the device and enhances operability of the device (e.g., by providing a variety of information to the user at once, rather than requiring further user inputs to access some of the information), which, additionally, reduces power usage and improves battery life of the device by enabling the user to use the device more quickly and efficiently.

In some embodiments, while displaying the first status indicator 1202b of the first cellular identifier and the second status indicator 1202a of the second cellular identifier, such as in FIG. 12E, wherein the first status indicator 1202b of the first cellular identifier is displayed with a first set of information associated with the first cellular identifier and the second status indicator 1202a of the second cellular identifier is displayed with a first set of information associated with the second cellular identifier (1344) (e.g., signal strengths of the respective cellular identifiers), the electronic device receives (1346), via the one or more input devices, an input (e.g., contact 1003) corresponding to a request to display a control region user interface that includes a plurality of controls for controlling a plurality of functionalities of the electronic device. In some embodiments, the control region includes selectable affordances for toggling various settings (e.g., airplane mode, Wi-Fi, Do Not Disturb, volume), performing various functions (e.g., flashlight, media player control, etc), or launching various applications (e.g., calculator, camera, etc). In some embodiments, the control region user interface is accessible while the electronic device displays a user interface associated with the operating system (e.g., the home screen) or a user interface associated with an application in response to detecting a gesture (e.g., swipe from a particular corner or edge of a display of the electronic device).

In some embodiments, in response to receiving the input corresponding to the request to display the control region user interface (1348) (e.g., a swipe from a particular edge or corner of the display, a voice input, or another input), such as in FIG. 12E, the electronic device displays (1350) on the display, the control region user interface, such as in FIG. 12F. The electronic device optionally displays (1352) the first status indicator 1202b of the first cellular identifier with the first set of information associated with the first cellular identifier (e.g., the signal strength of the first cellular identifier), and a second set of information 1216b associated with the first cellular identifier (e.g., the name of the first cellular carrier that provides cellular service to the first cellular identifier), such as in FIG. 12F, and displays (1354) the second status indicator 1202a of the second cellular identifier with the first set of information associated with the second cellular identifier (e.g., the signal strength of the second cellular identifier), and a second set of information 1216a associated with the second cellular identifier (e.g., the name of the second cellular carrier that provides cellular service to the second cellular identifier), such as in FIG. 12F.

The above-described manner of displaying additional information about the first cellular identifier and the second cellular identifier in the control region user interface allows the electronic device to present additional information in the control region user interface that is related to information presented with the status indicators, which simplifies interactions between the user and the device and enhances operability of the device (e.g., by showing the information when the user navigates to the control region user interface), which, additionally, reduces power usage and improves battery life of the device by enabling the user to use the device more quickly and efficiently.

In some embodiments, while displaying the first status indicator 1202b of the first cellular identifier that indicates the active status of the first cellular identifier, and the second status indicator 1202a of the second cellular identifier that indicates the active status of the second cellular identifier (1356), such as in FIG. 12F, the electronic device receives (1358), via the one or more input devices, a sequence of one or more inputs (e.g., selection of affordance 1234 with contact 1203, as shown in FIG. 12G) that activates a third cellular identifier on the electronic device (e.g., selection of the third cellular identifier in a cellular settings user interface presented by the electronic device, completing a setup process for the third cellular identifier, etc), such as in FIG. 12G.

In some embodiments, in response to receiving the sequence of one or more inputs that activates the third cellular identifier on the electronic device (1360), such as in FIG. 12G, the electronic device activates (1362) the third cellular identifier on the electronic device (e.g., enabling the electronic device to perform one or more functions with the third cellular identifier), as indicated by the legend 1210 of FIG. 12H. The electronic device optionally ceases (1364) display of the first status indicator 1202b of the first cellular identifier (e.g., the first cellular identifier is deactivated in response to activating the third cellular identifier), such as in FIG. 12H, and concurrently displays (1366), on the display the second status indicator 1202a of the second cellular identifier of the electronic device that indicates the active status of the second cellular identifier (1368) (e.g., the second cellular identifier remains active on the electronic device), such as in FIG. 12H, and a third status indicator 1202c of the third cellular identifier of the electronic device that indicates an active status of the third cellular identifier (1370) (e.g., the third status indicator indicates the active status of the third cellular identifier). In some embodiments, the third status indicator is associated with a third cellular carrier that provides cellular service to the third cellular identifier. The third status indicator optionally indicates a signal strength of the third cellular identifier.

The above-described manner of presenting a third indication of the third cellular identifier in response to activating the third cellular identifier on the electronic device allows the electronic device to communicate to the user which cellular identifiers are active on the electronic device, which simplifies interactions between the user and the device and enhances operability of the device (e.g., by providing information about which cellular identifiers are active on the electronic device concurrently with additional information about the cellular identifiers (e.g., signal strength)), which, additionally, reduces power usage and improves battery life of the device by enabling the user to use the device more quickly and efficiently.

It should be understood that the particular order in which the operations in FIGS. 13A-13F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, and 1500) are also applicable in an analogous manner to method 1300 described above with respect to FIGS. 13A-13F. For example, the indications of cellular identifiers described above with reference to method 1300 optionally have one or more of the characteristics of the cellular identifier settings user interfaces, the cellular identifier settings of electronic devices in communication with other electronic devices, and operations performed with cellular identifiers, etc., described herein with reference to other methods described herein (e.g., methods 700, 900, 1100, and 1500). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 13A-13F are, optionally, implemented by components depicted in FIGS. 1A-1B. For example, displaying operations 1302, 1312, 1318, 1324, 1350, 1352, 1354, 1364, and 1366 and receiving operations 1310, 1346, and 1358 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Alerts Related to Previously-Removed Cellular Identifiers

Users interact with electronic devices in many different manners, including adding cellular identifiers to electronic devices and removing cellular identifiers from electronic devices. In some embodiments, the electronic device displays an alert when a cellular identifier (e.g., a SIM, eSIM, virtual SIM, etc.) is removed or deleted from the electronic device. The embodiments described below provide ways in which an electronic device presents alerts and options for reconfiguring the electronic device when a cellular identifier is removed or deleted. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 14A-14JJ illustrate exemplary ways in which an electronic device presents alerts related to previously-removed cellular identifiers in accordance with some embodiments of the disclosure. The embodiments in these figures are used to illustrate the processes described below, including the processes described with reference to FIGS. 15A-15O.

Figure 14A:
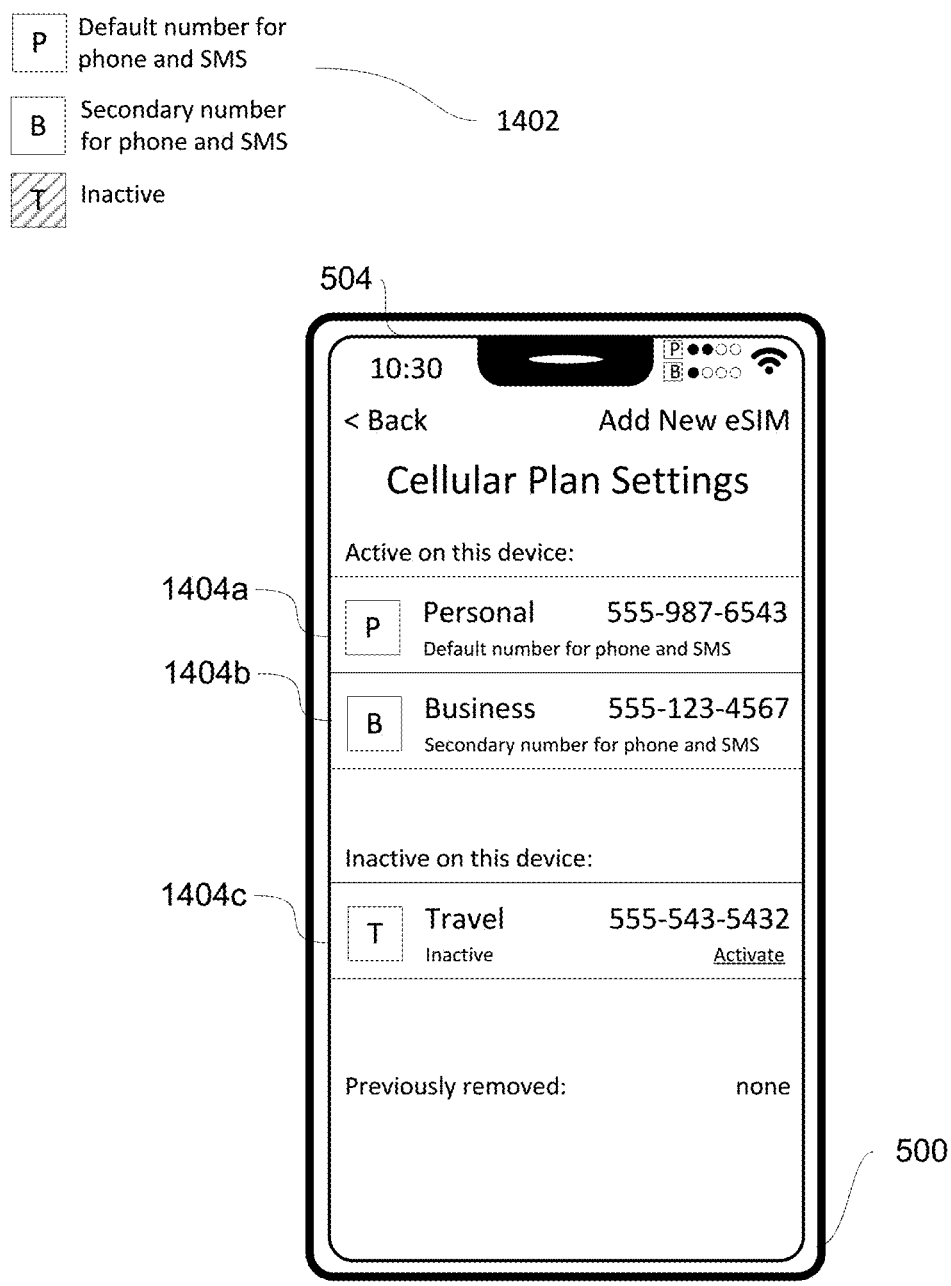
FIGS. 14A-14JJ illustrate exemplary ways in which an electronic device presents alerts related to previously-removed cellular identifiers in accordance with some embodiments of the disclosure.

FIG. 14A illustrates exemplary device 500 with touch screen 504, such as described with reference to FIGS. 5A-5H. Touch screen 504 optionally displays one or more user interfaces that include various content. In the example illustrated in FIG. 14A, touch screen 504 displays a cellular identifier settings user interface. The user interface includes an indication 1404a of a "Personal" cellular identifier that is active on the electronic device 500, an indication 1404b of a "Business" cellular identifier that is active on the electronic device 500, and a "Travel" cellular identifier 1404c that is inactive on the electronic device 500. Each indication 1404a-c includes the label of the cellular identifier (e.g., "Personal," "Business," and "Travel"), an indication of the cellular identifier that is based on the label of the cellular identifier (e.g., "P", "B", and "T"), a phone number of the cellular identifier, and the functions that the electronic device is currently configured to perform with the cellular identifier (e.g., "Default number for phone and SMS" or "Secondary number for phone and SMS"), as described with reference to method 700. FIG. 14A also includes a legend 1402 indicating the current configuration of the cellular identifiers of the electronic device 500.

Figure 14B:
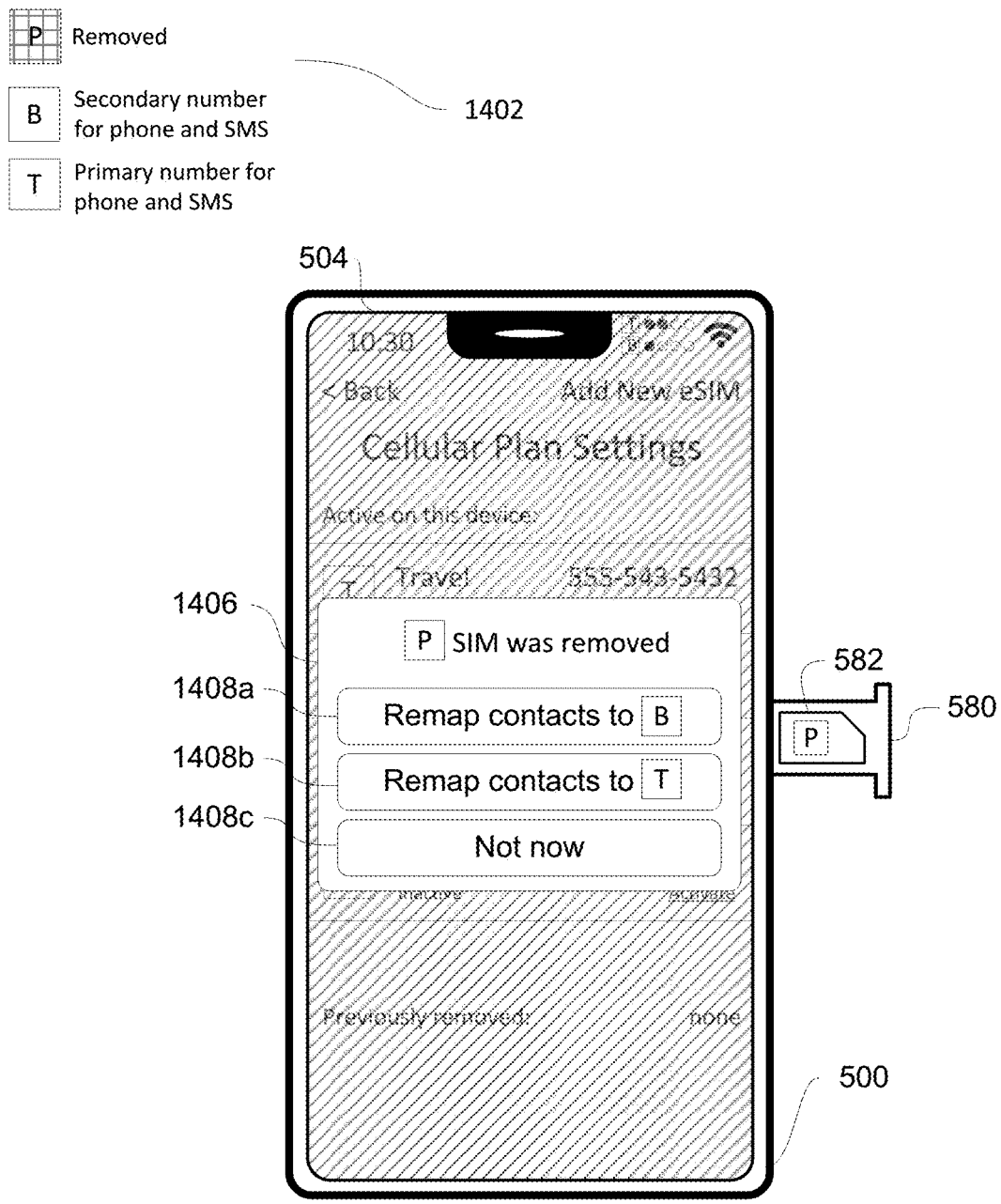

FIG. 14B illustrates removal of a physical SIM card 582 from electronic device 500. Electronic device 500 includes a SIM tray 580 that retains SIM card 582 (e.g., the "Personal" cellular identifier). In response to detecting removal of SIM card 582, the electronic device 500 presents an alert 1406 that the "Personal" cellular identifier has been removed. In some embodiments, the electronic device 500 stores one or more contacts in association with the various cellular identifiers available to the electronic device, as described above with reference to methods 700 and 1100. The alert 1406 includes a selectable option 1408a for associating the contacts that were associated with the "Personal" cellular identifier with the "Business" cellular identifier instead, a selectable option 1408b for associating the contacts there were associated with the "Personal" cellular identifier with the "Travel" cellular identifier, and an option 1408c for dismissing the alert 1406 without remapping the contacts. As shown in the legend 1402 of FIG. 14B, when the physical SIM 582 is removed from the electronic device 500, the status of the "Personal" cellular identifier is "removed".

Figure 14C:
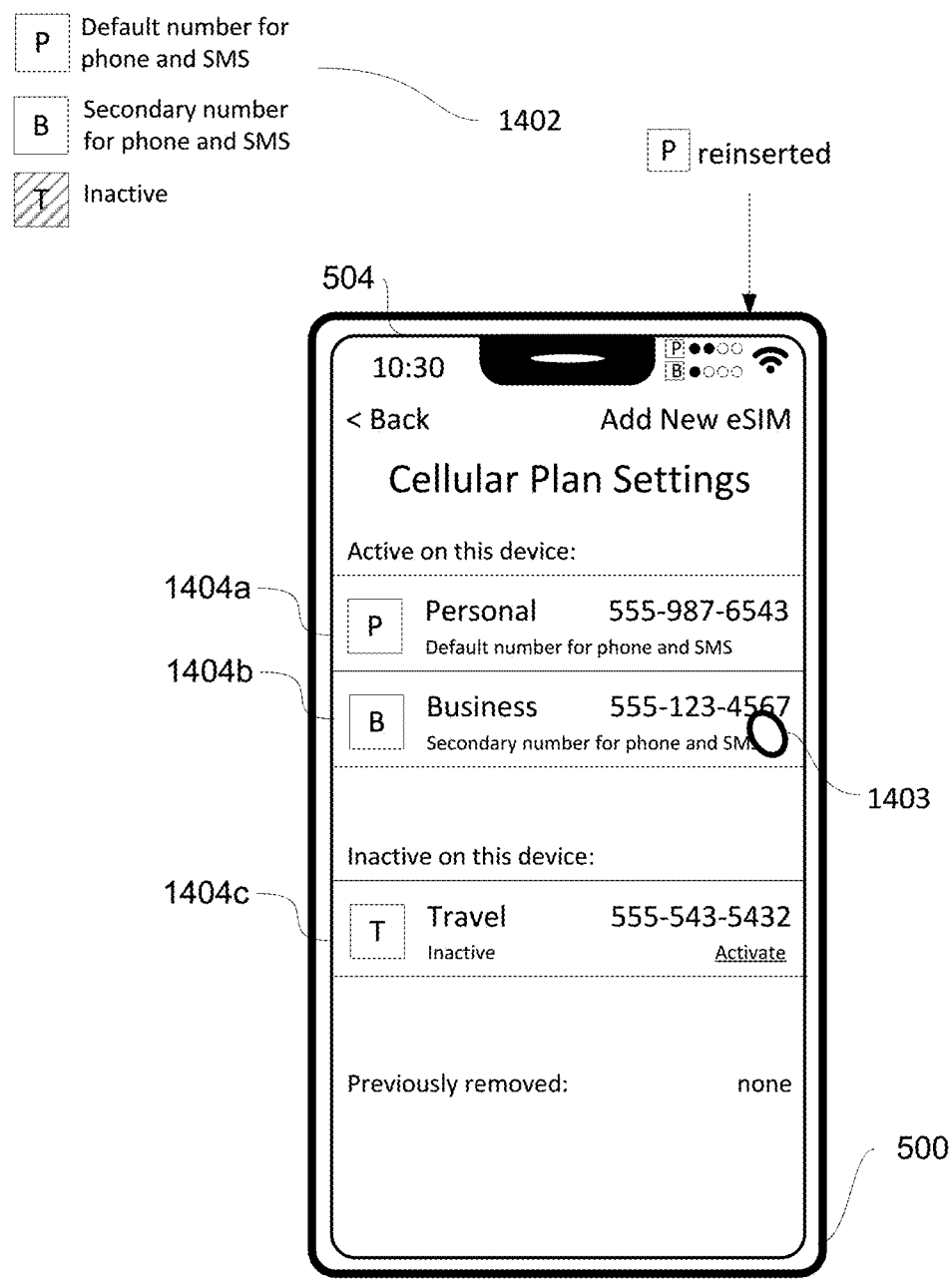

FIG. 14C illustrates the cellular identifier settings user interface after the "Personal" cellular identifier is reinserted into the electronic device 500. As shown in FIG. 14C, the user selects (e.g., with contact 1403) the indication 1404b of the "Business" cellular identifier. In response to detecting the selection of indication 1404b, the electronic device presents a settings user interface for the "Business" cellular identifier.

Figure 14D:
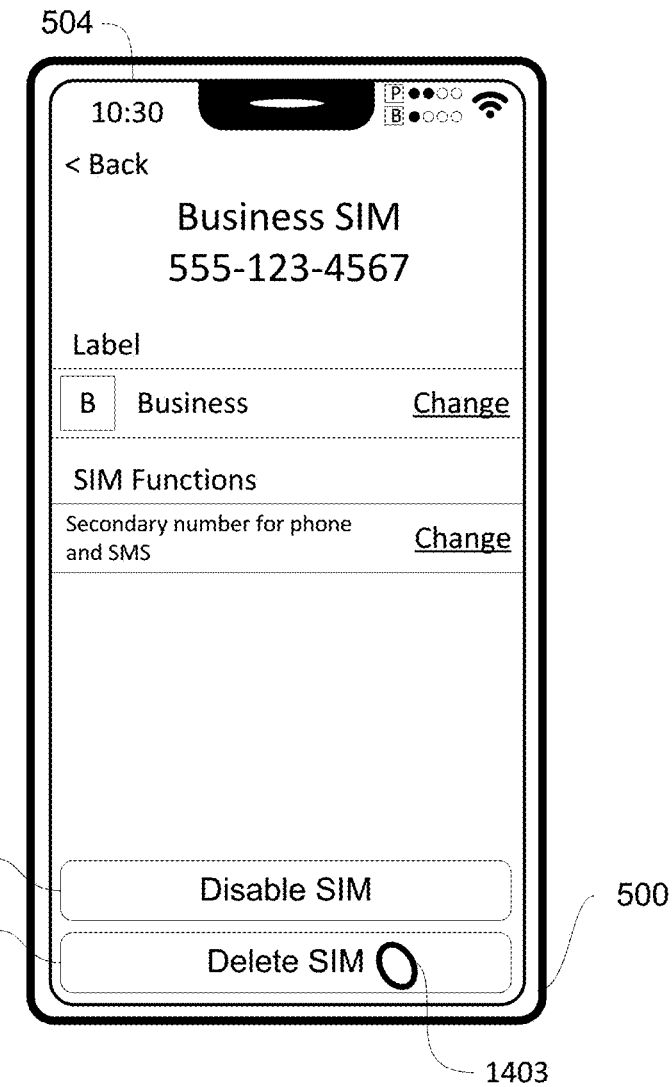

FIG. 14D illustrates the settings user interface for the "Business" cellular identifier. The settings user interface for the "Business" cellular identifier includes a soft button 1410a for disabling the "Business" cellular identifier and a soft button 1410b for deleting the "Business" cellular identifier. As an example, the "Business" cellular identifier is an eSIM or virtual SIM. Disabling a cellular identifier such as a physical SIM, eSIM, or virtual SIM optionally causes the electronic device 500 to be configured not to use the cellular identifier to perform functions. Deleting an eSIM or virtual SIM is optionally similar to removing a physical SIM card from the electronic device 500 and optionally causes the electronic device 500 to no longer have access to the eSIM or virtual SIM. As shown in FIG. 14D, the user selects (e.g., with contact 1403) the soft button 1410b for deleting the "Business" cellular identifier.

Figure 14E:
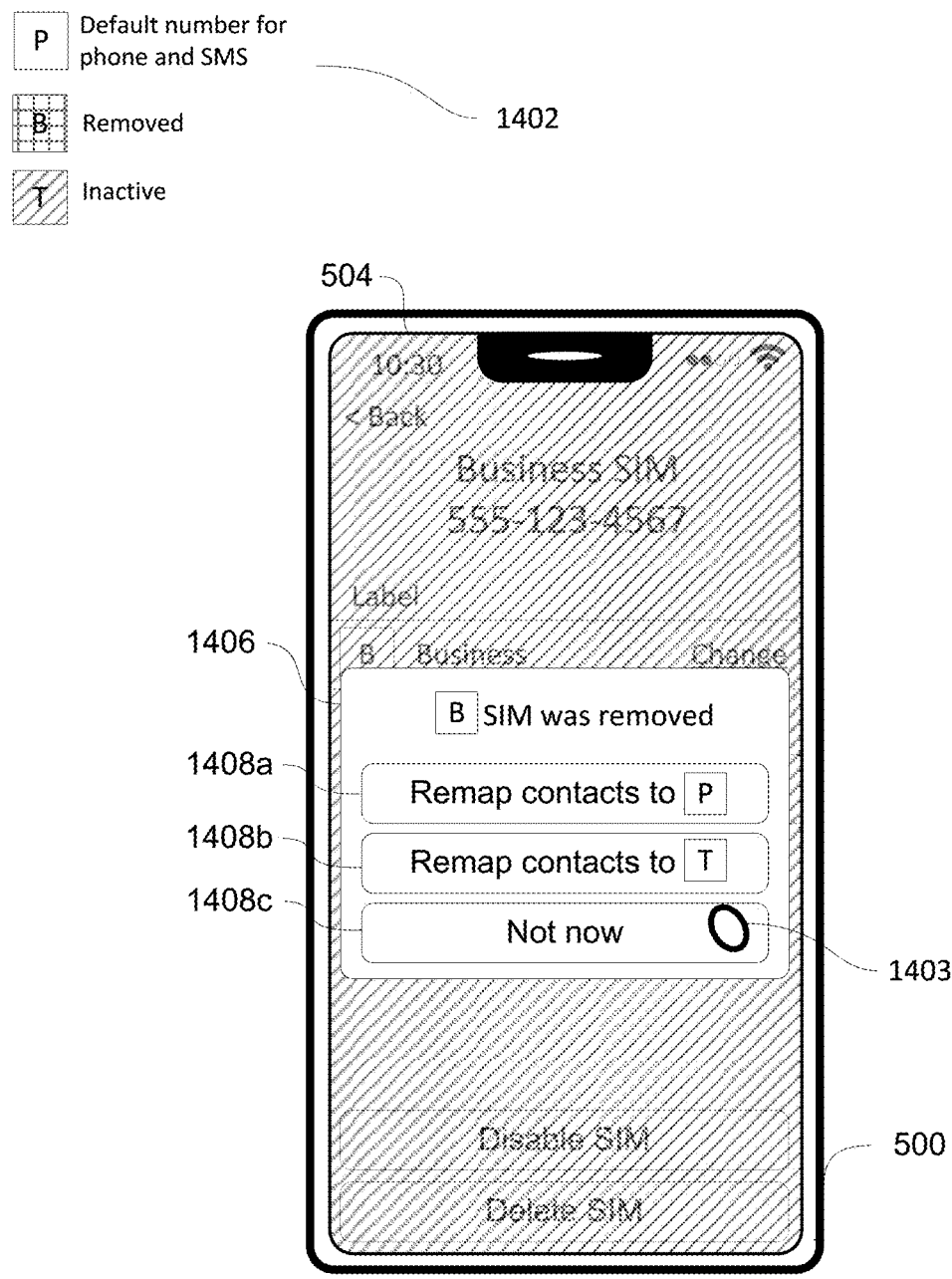

In response to detecting the user's selection, the electronic device 500 presents alert 1406 that the "Business" cellular identifier was removed from the electronic device, as shown in FIG. 14E. As shown in the legend 1402 of FIG. 14E, the "Business" cellular identifier is removed from the electronic device in response the user's selection. Alert 1406 includes a soft button 1408a to remap contacts from the "Business" cellular identifier to the "Personal" cellular identifier, a soft button 1408b to remap contacts from the "Business" cellular identifier to the "Travel" cellular identifier, and a soft button 1408c to dismiss the alert 1406 without remapping the contacts from the "Business" cellular identifier. As shown in FIG. 14E, the user selects (e.g., with contact 1403) the soft button 1408c to dismiss the alert 1406 without remapping the contacts.

Figure 14F:
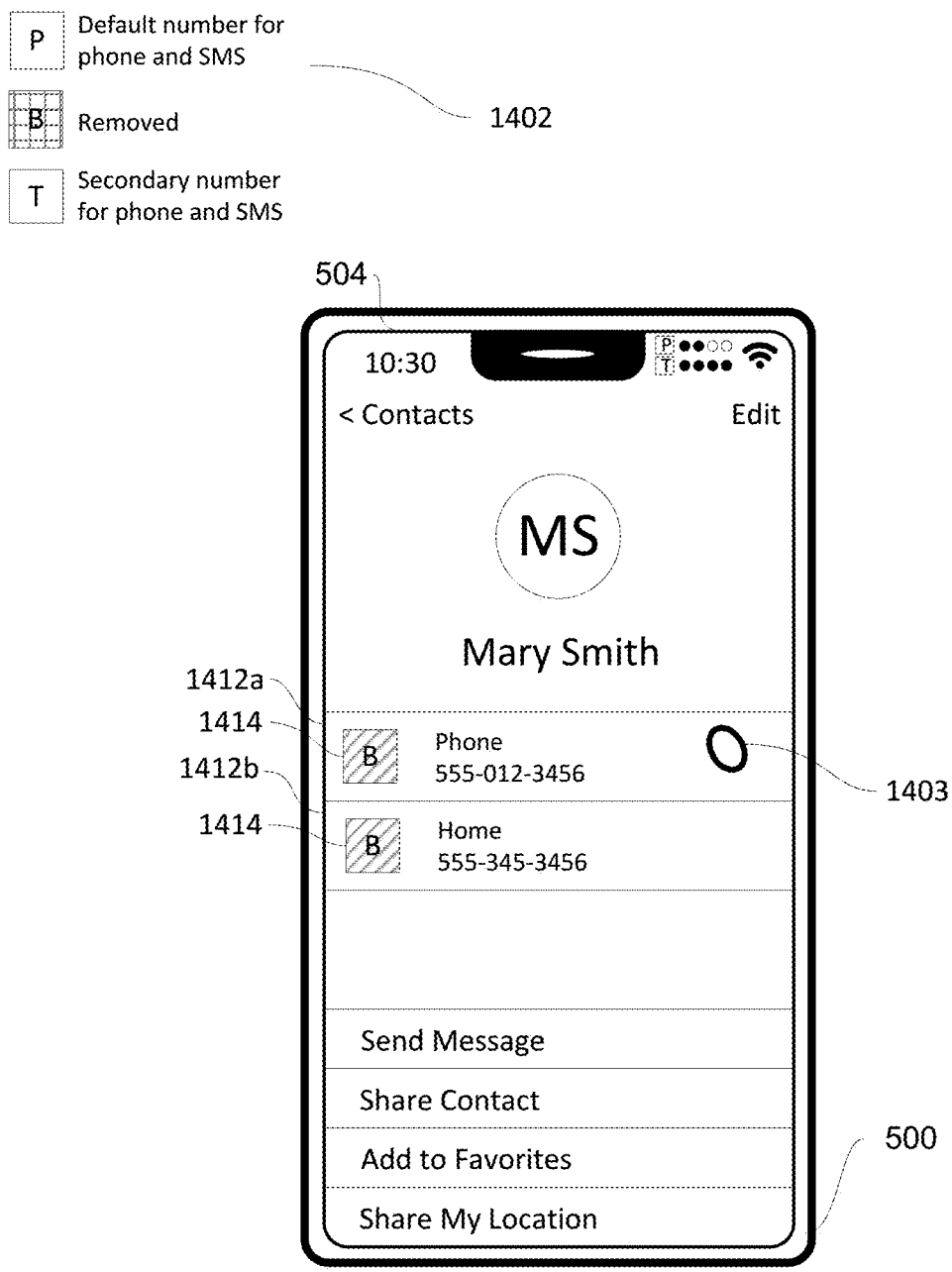

FIG. 14F illustrates a contact card user interface of device 500 that is displayed while the "Business" cellular identifier is removed from device 500. As indicated by legend 1402 of FIG. 14F, while the electronic device 500 presents the contact card user interface, the "Personal" cellular identifier is configured as the default number for phone and SMS, the "Business" cellular identifier is removed from the electronic device 500, and the "Travel" cellular identifier is configured as the secondary number for phone and SMS. The contact card user interface includes an indication 1412a of a "Phone" telephone number for the contact and an indication 1412b of a "Home" telephone number for the contact. The indications 1412a-b of the telephone numbers include indications 1414 of the cellular identifier associated with the contact, which is the "Business" cellular identifier. The user selects (e.g., with contact 1403) the indication 1412a of the "Phone" telephone number. In some embodiments, indications 1412a and 1412b are selectable to initiate a phone call to the respective telephone number. Absent further user input selecting a cellular identifier to use to initiate the phone call, the electronic device 500 uses the cellular identifier associated with the contact (e.g., the "Business" cellular identifier) to initiate the phone call. However, in the example shown in FIG. 14F, the "Business" cellular identifier is removed from the electronic device 500.

Figure 14G:
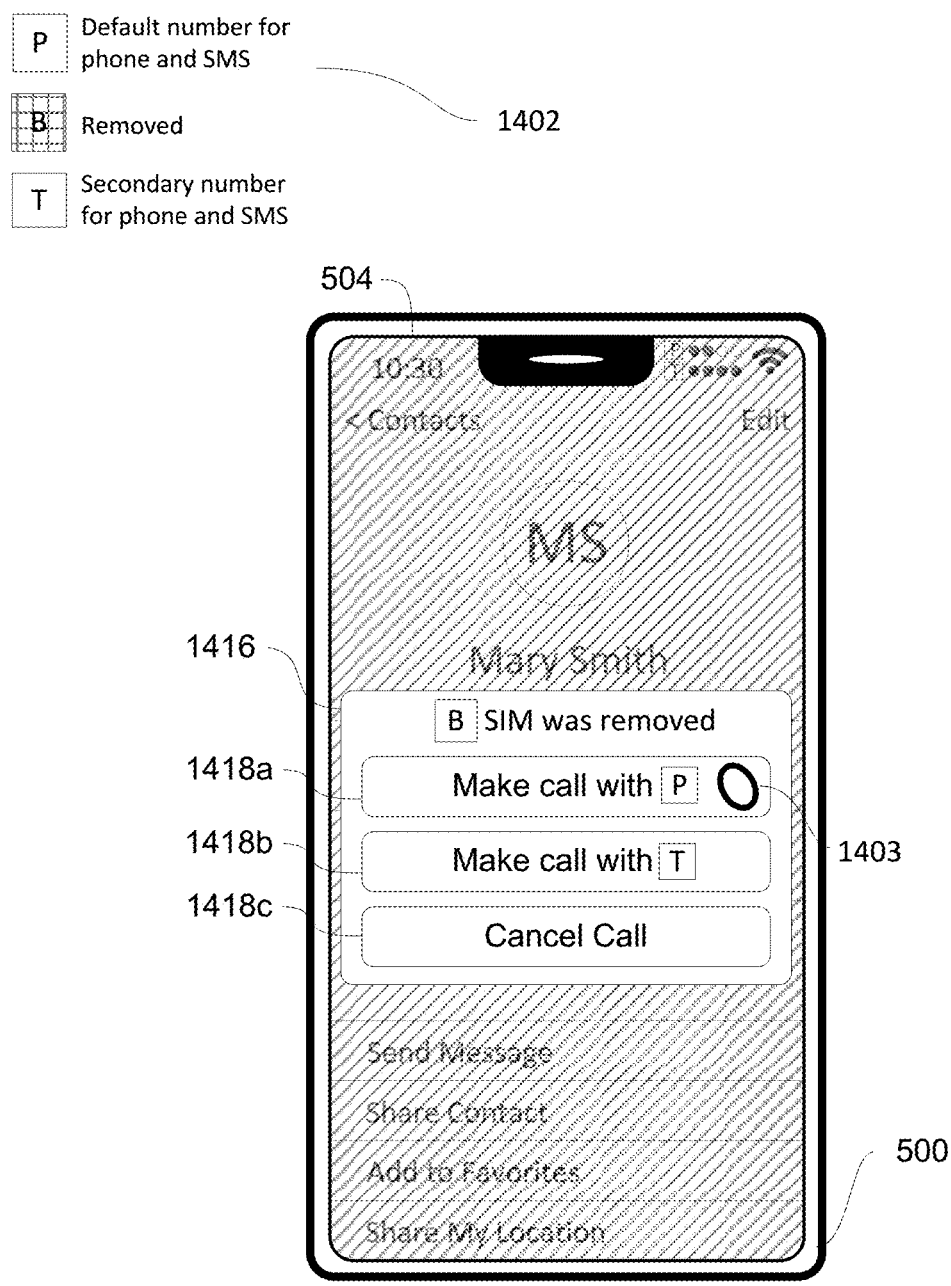

In response to the user's selection, the electronic device 500 presents an alert 1416 that the "Business" cellular identifier has been removed from the electronic device 500, as shown in FIG. 14G. The alert 1416 includes a soft button 1418a to initiate the phone call with the "Personal" cellular identifier, a soft button 1418b to initiate the phone call with the "Travel" cellular identifier, and a soft button 1418c to cancel initiation of the phone call. The user selects (e.g., with contact 1403) the soft button 1418a to initiate the phone call with the "Personal" cellular identifier.

Figure 14H:

As shown in FIG. 14H, in response to the user's selection, the electronic device 500 presents an alert 1420 to indicate that the phone call will be initiated using the "Personal" cellular identifier. The alert 1420 includes a button 1422a to initiate the phone call with the "Personal" cellular identifier and to associate the contact with the "Personal" cellular identifier (e.g., "Always use P to call Mary Smith"), a button 1422b to initiate the phone call with the "Personal" cellular identifier without associating the contact with the "Personal" cellular identifier (e.g., "Use P to call Mary Smith this time only"), and a button 1422c to cancel initiation of the phone call (e.g., "Cancel Call"). As shown in FIG. 14H, the user selects (e.g., with contact 1403) the button 1422b to initiate the phone call with the "Personal" cellular identifier without associating the contact with the "Personal" cellular identifier. In response to the user's selection, the phone call is initiated, as shown in FIG. 14I.

Figure 14I:
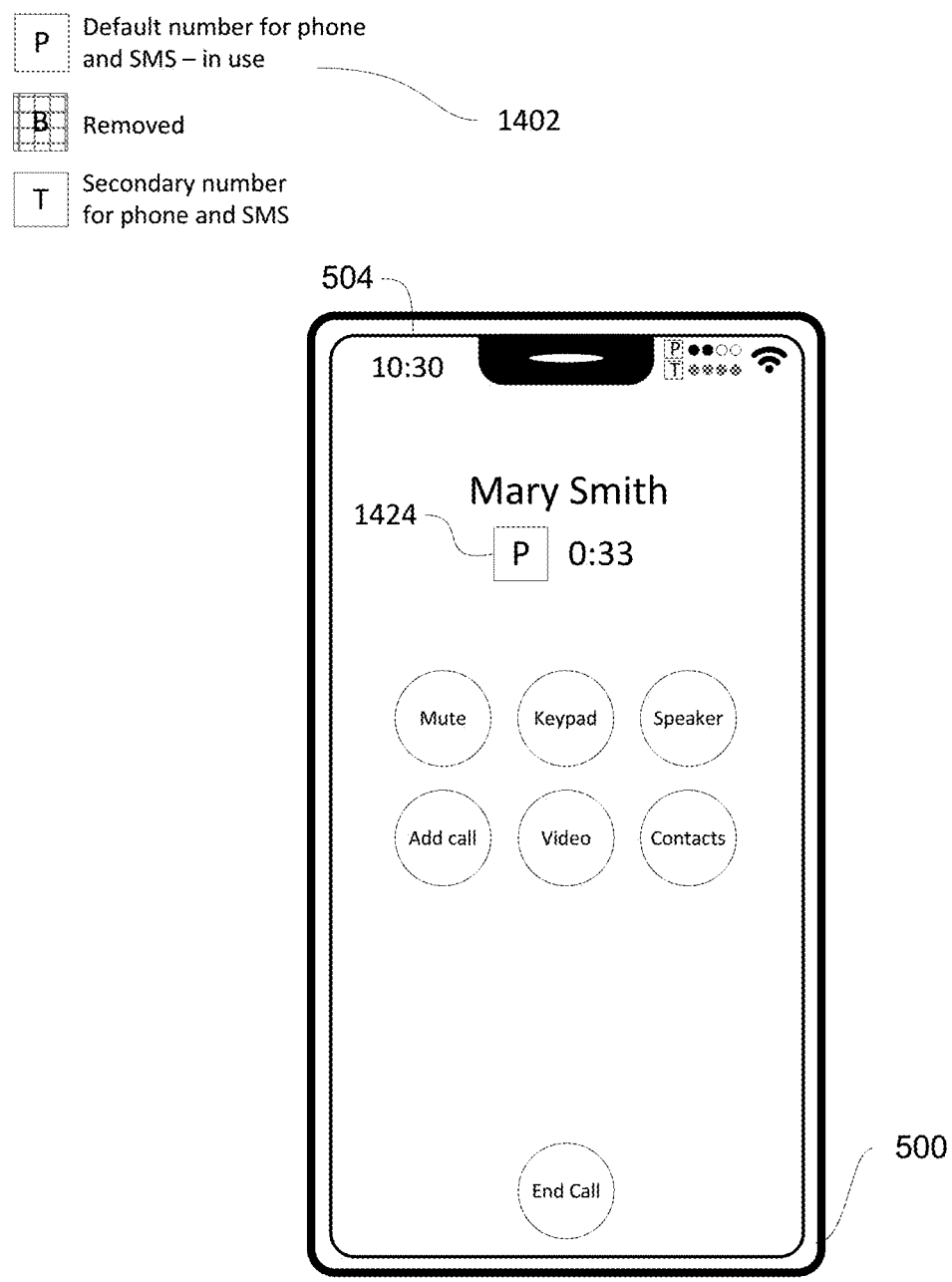

FIG. 14I illustrates the electronic device 500 while it makes the phone call with the contact. As shown in FIG. 14I, the electronic device 500 presents a phone user interface including an indication 1424 of the "Personal" cellular identifier, which is being used by the electronic device 500 for the phone call. As shown in the legend 1402 of FIG. 14I, the "Personal" cellular identifier is in use while the phone call is being made.

Figure 14J:
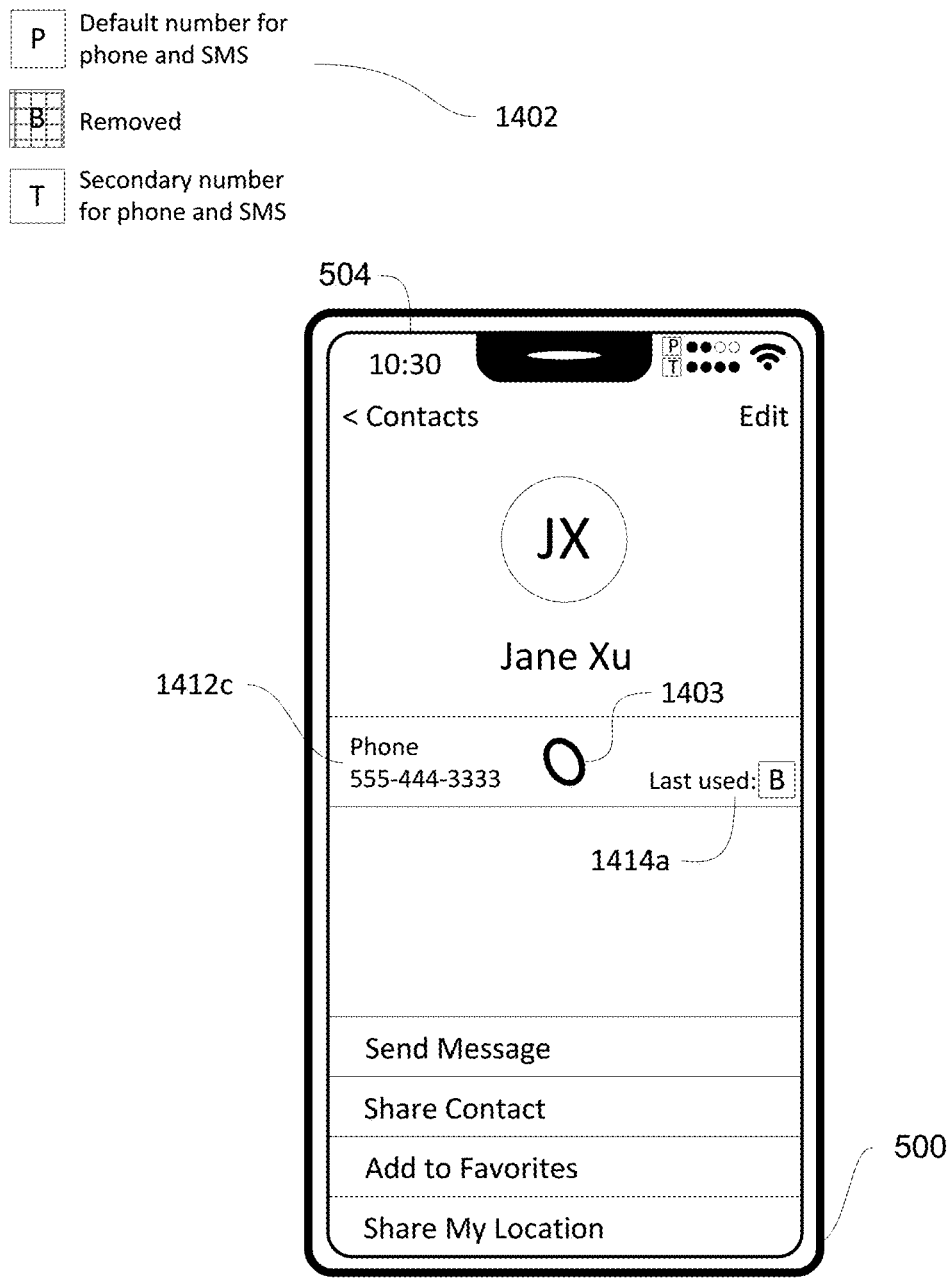

FIG. 14J illustrates a contact card user interface. The contact card user interface includes an indication 1412c of a "Phone" telephone number of the contact and an indication 1414a that the electronic device is configured to initiate communication with the contact using whichever cellular identifier was last used to communicate with the contact. As shown in FIG. 14J, the "Business" cellular identifier was last used to communicate with the contact. The user selects (e.g., with contact 1403) the indication 1412c of the "Phone" telephone number.

Figure 14K:
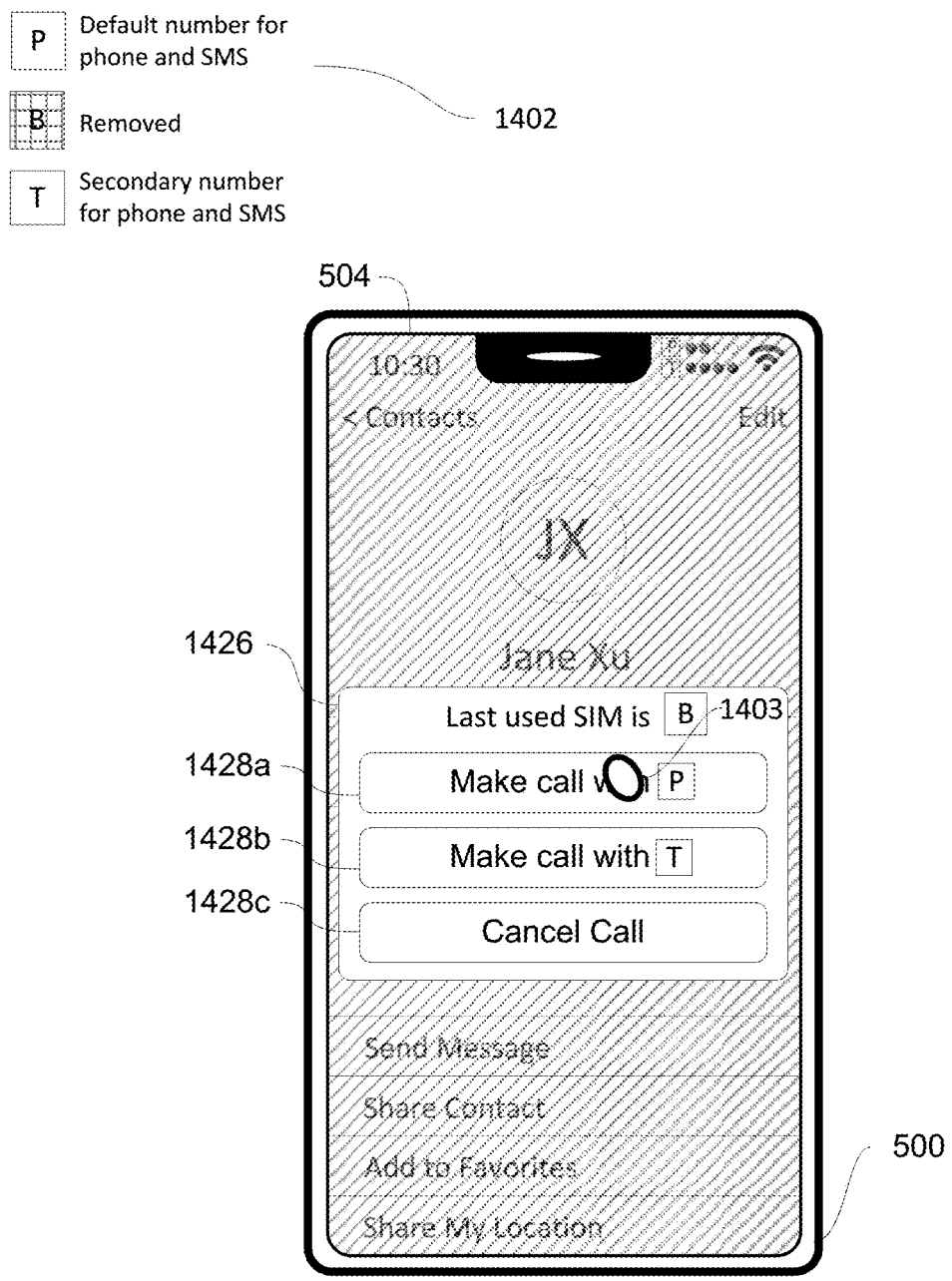

As shown in FIG. 14K, in response to the user's selection, the electronic device presents an alert 1426 that the "Business" cellular identifier is the cellular identifier that was last used to communicate with the contact. The alert 1426 includes a button 1428a to initiate the phone call with the "Personal" cellular identifier, a button 1428b to initiate the phone call with the "Travel" cellular identifier, and a button 1428c to cancel the phone call. The user selects (e.g., with contact 1403) the button 1428a to make the phone call with the "Personal" cellular identifier. In response to the selection, the electronic device 500 initiates the phone call using the "Personal" cellular identifier and associates the contact with the "Personal" cellular identifier (e.g., because the contact is configured to be associated with the cellular identifier last used to communicate with the contact).

Figure 14L:
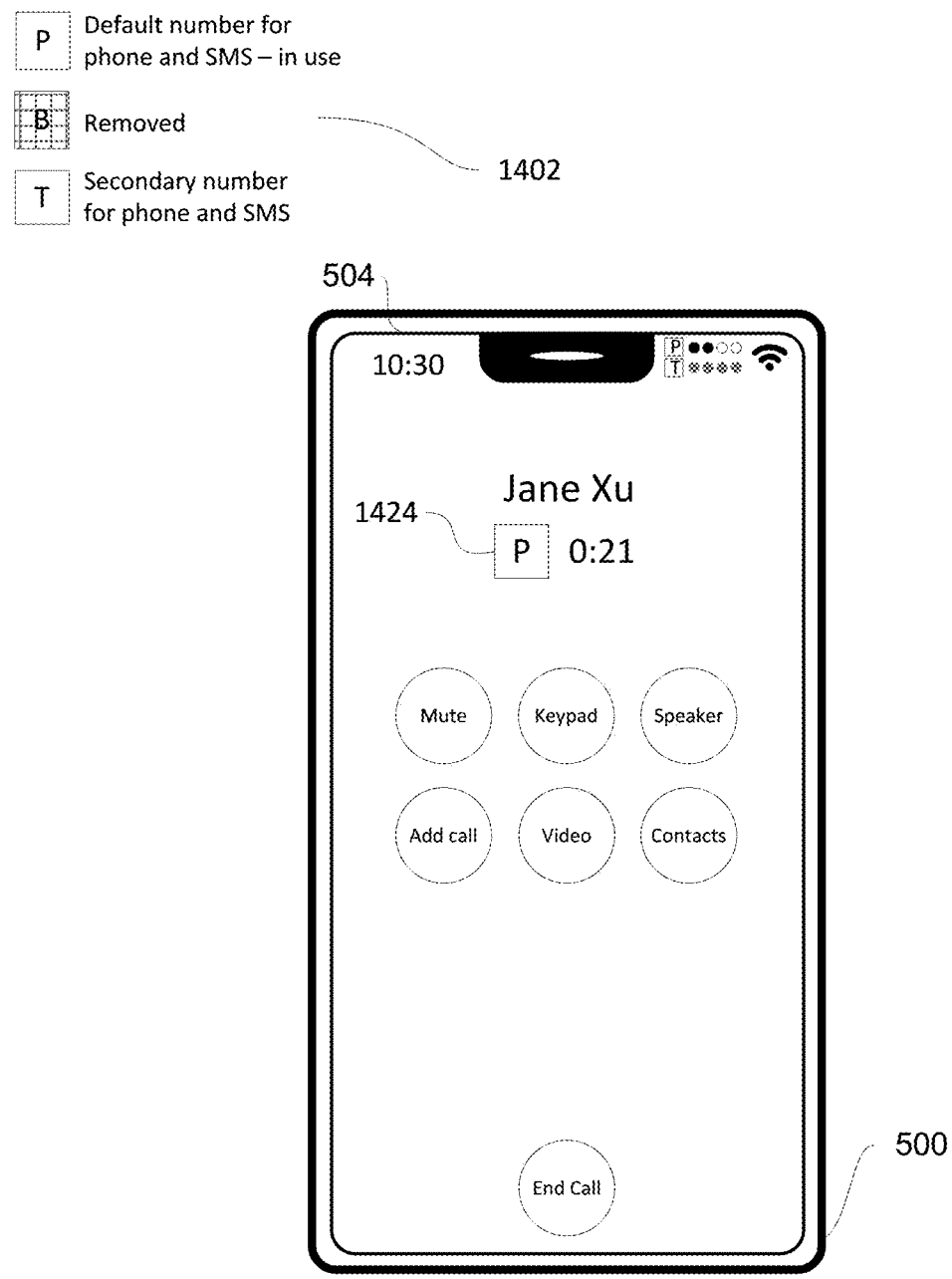

FIG. 14L illustrates the electronic device 500 while it makes the phone call with the contact. As shown in FIG. 14L, the electronic device 500 presents a phone user interface including an indication 1424 of the "Personal" cellular identifier, which is being used by the electronic device 500 for the phone call. As shown in the legend 1402 of FIG. 14L, the "Personal" cellular identifier is in use while the phone call is being made.

Figure 14M:

FIG. 14M illustrates an updated contact card user interface. The contact "Jane Xu" is now associated with the "Personal" cellular identifier as indicated by indication 1414b in response to the user's input to use the "Personal" cellular identifier to initiate the phone call with the contact while the last-used "Business" cellular identifier was removed from the electronic device. In some embodiments, because Jane Xu is configured to be associated with the last cellular identifier used to communicate with her, if another cellular identifier is used to communicate with Jane in the future, Jane will then become associated with that cellular identifier instead of being associated with the "Personal" cellular identifier.

Figure 14N:
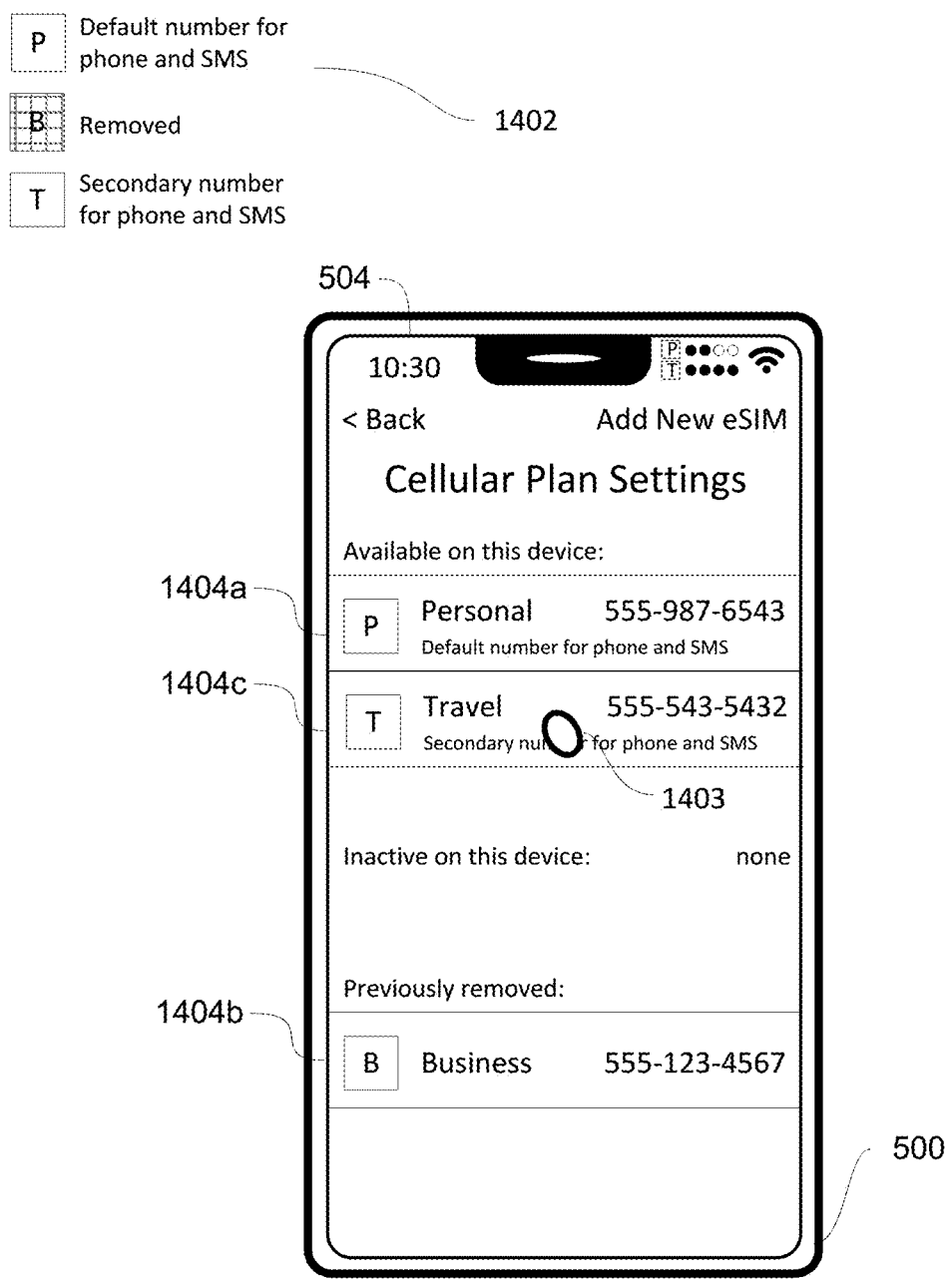

FIG. 14N illustrates the cellular settings user interface. As indicated by the cellular settings user interface and the legend 1402 of FIG. 14N, the "Personal" and "Travel" cellular identifiers are available on the electronic device 500 and the "Business" cellular identifier has been removed from the electronic device. The user selects (e.g., with contact 1403) the indication 1404c of the "Travel" cellular identifier. In response, the electronic device presents a user interface for viewing and/or changing one or more settings of the "Travel" cellular identifier, as shown in FIG. 14O.

Figure 14O:
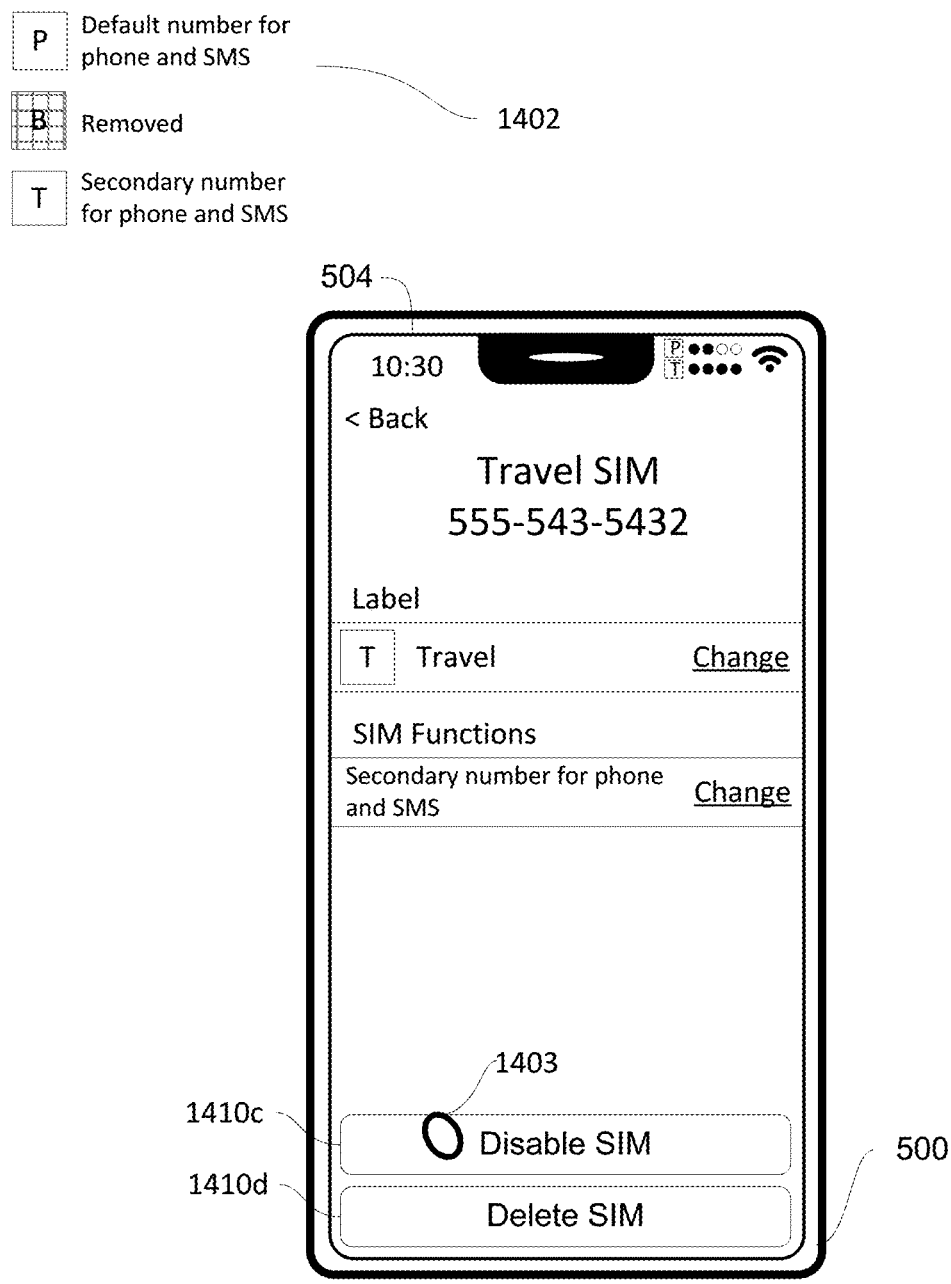

FIG. 14O illustrates the settings user interface for the "Travel" cellular identifier. The settings user interface for the "Travel" cellular identifier includes a soft button 1410c for disabling the "Travel" cellular identifier and a soft button 1410d for deleting the "Travel" cellular identifier. As an example, the "Travel" cellular identifier is an eSIM or virtual SIM. Disabling a cellular identifier such as a physical SIM, eSIM, or virtual SIM optionally causes the electronic device 500 to be configured not to use the cellular identifier to perform functions. Deleting an eSIM or virtual SIM is optionally similar to removing a physical SIM card from the electronic device 500 and optionally causes the electronic device 500 to no longer have access to the eSIM or virtual SIM. As shown in FIG. 14O, the user selects (e.g., with contact 1403) the soft button 1410c for disabling the "Travel" cellular identifier.

In response to the user's selection, the electronic device 500 is no longer configured to use the "Travel" cellular identifier to perform functions (e.g., phone, SMS, data, etc.) unless the "Travel" cellular identifier is re-activated. In some embodiments, it is assumed that deactivating a cellular identifier is a temporary change, while removing or deleting a cellular identifier could be a long-term or permanent change. Because deactivating a cellular identifier could be temporary, the electronic device does not present an alert with the option to associate contacts that are associated with the "Travel" cellular identifier with a different cellular identifier available to the electronic device (e.g., the "Personal" cellular identifier) in response to the disabling of the "Travel" cellular identifier.

Figure 14P:
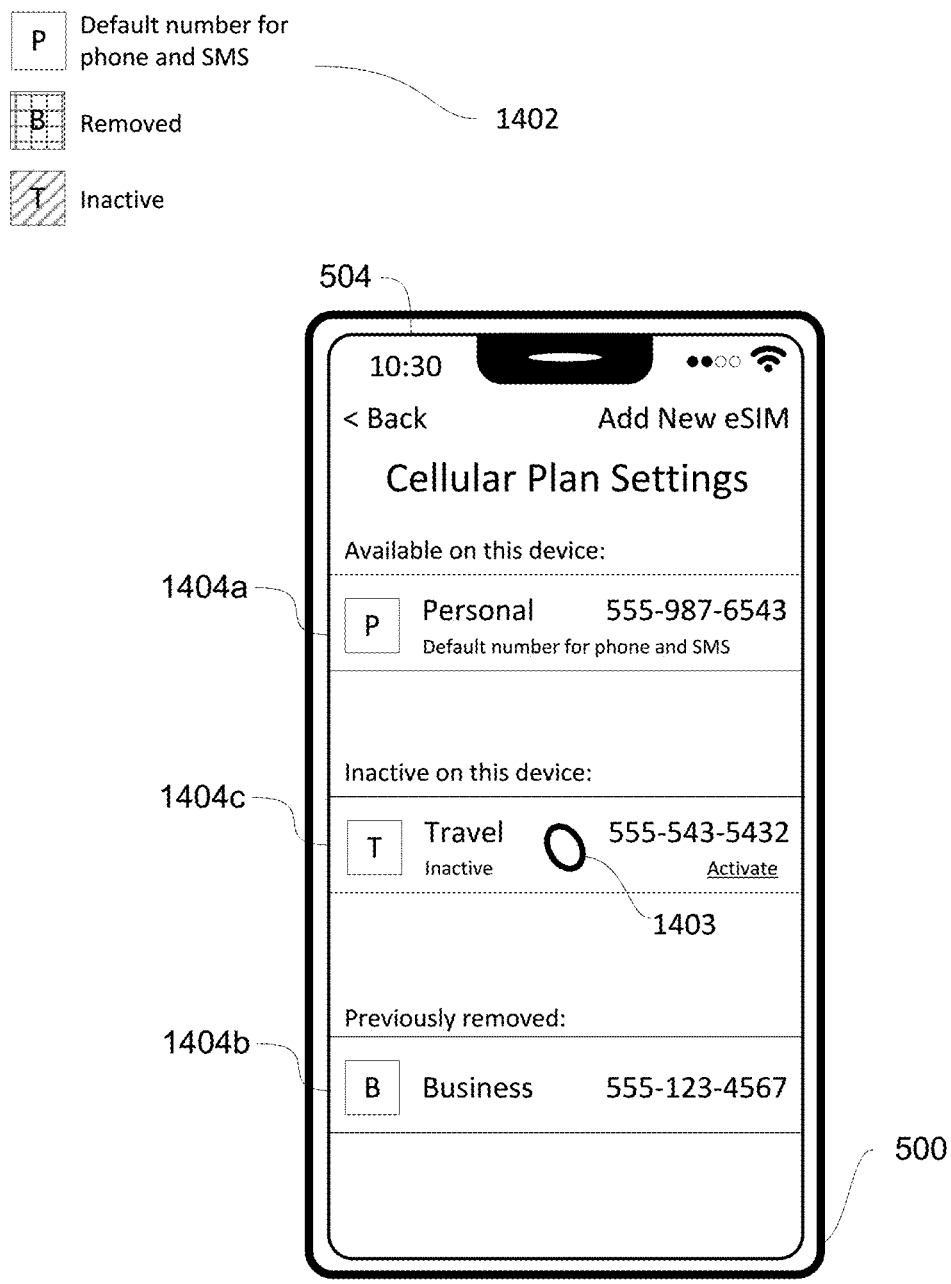

FIG. 14P illustrates the cellular identifier settings user interface after the disabling of the "Travel" cellular identifier. The cellular identifier settings user interface and the legend 1402 of FIG. 14P indicate that the "Travel" cellular identifier is inactive on the electronic device 500. The user selects (e.g., with contact 1403) the indication of the "Travel" cellular identifier. In response to the user's selection, the electronic device presents the settings user interface of the "Travel" cellular identifier, as shown in FIG. 14Q.

Figure 14Q:
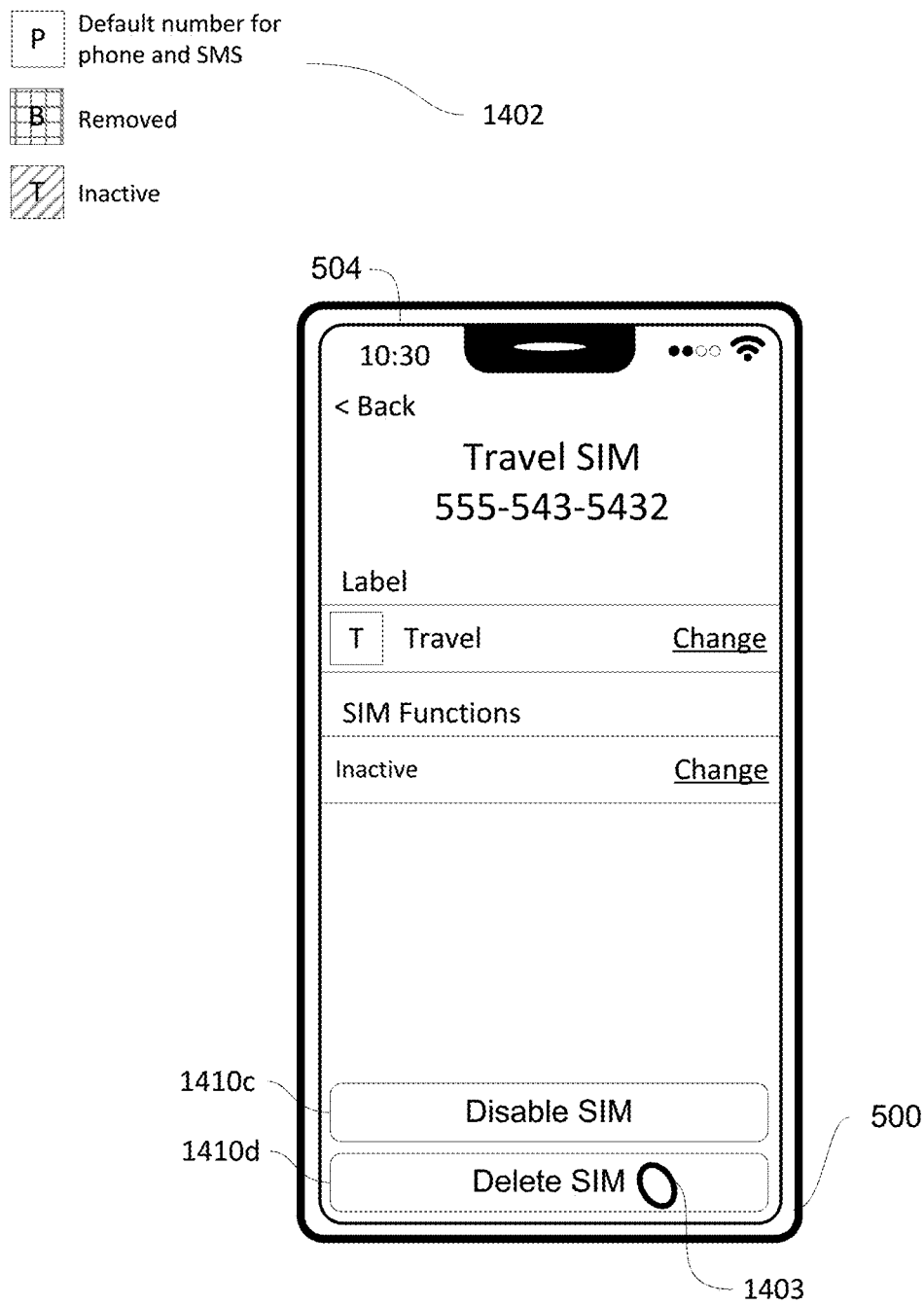

FIG. 14Q illustrates the settings user interface of the "Travel" cellular identifier. The user selects (e.g., with contact 1403) the button 1410 to delete the "Travel" cellular identifier. In response to the user's selection, the electronic device 500 removes the "Travel" cellular identifier from the electronic device 500 and presents an alert that the "Travel" cellular identifier was removed, as shown in FIG. 14R.

Figure 14R:
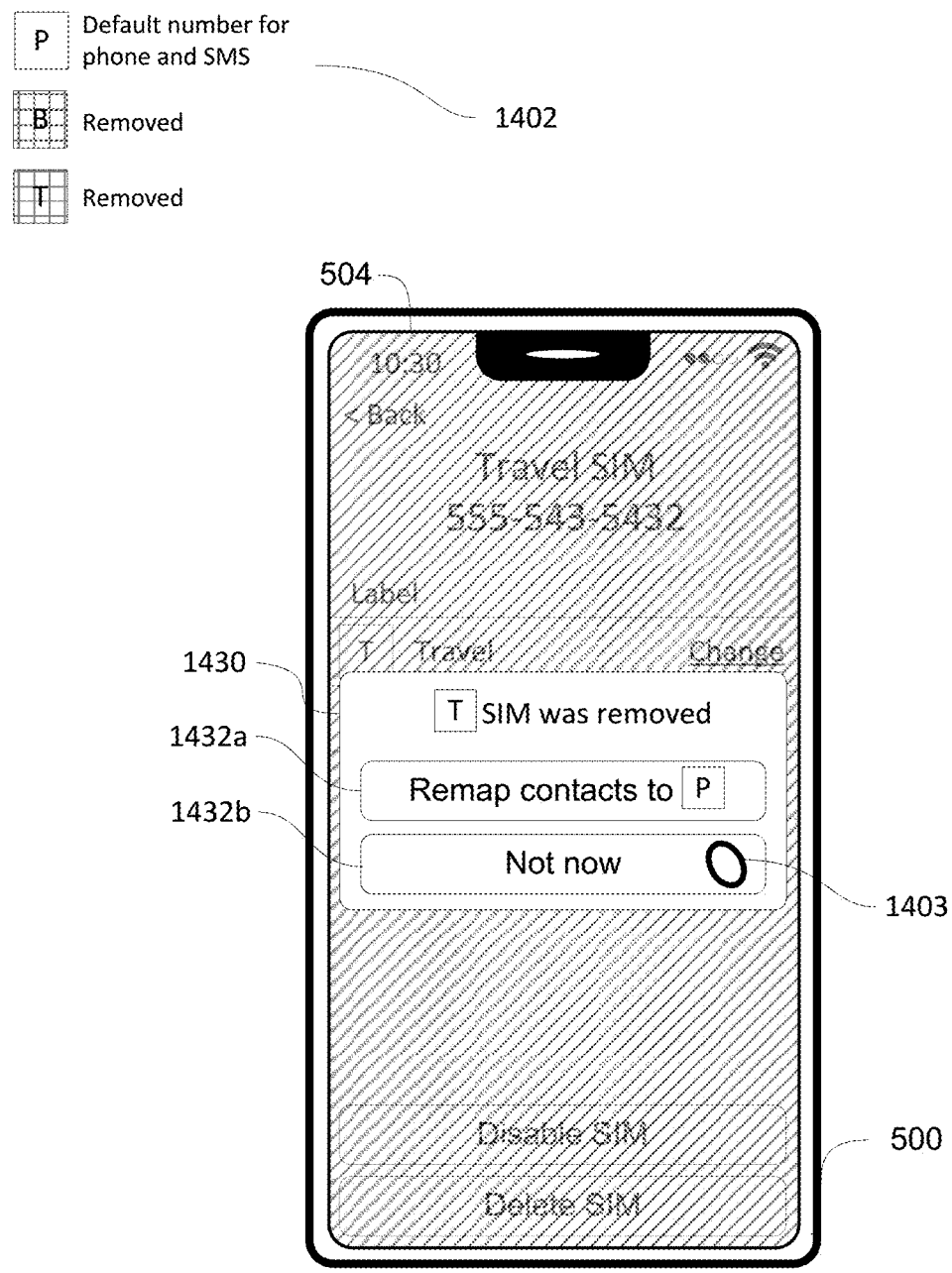

FIG. 14R illustrates the alert 1430 that indicates that the "Travel" cellular identifier was removed. The alert 1430 includes a button 1432a for associating the set of contacts associated with the "Travel" cellular identifier with the "Personal" cellular identifier instead, and a button 1432b for dismissing the alert 1430 without associating the set of contacts with the "Personal" cellular identifier instead of the "Travel" cellular identifier. The user selects (e.g., with contact 1403) the button 1432b to dismiss the alert 1430 without associating the set of contacts with the "Personal" cellular identifier instead of the "Travel" cellular identifier.

Figure 14S:
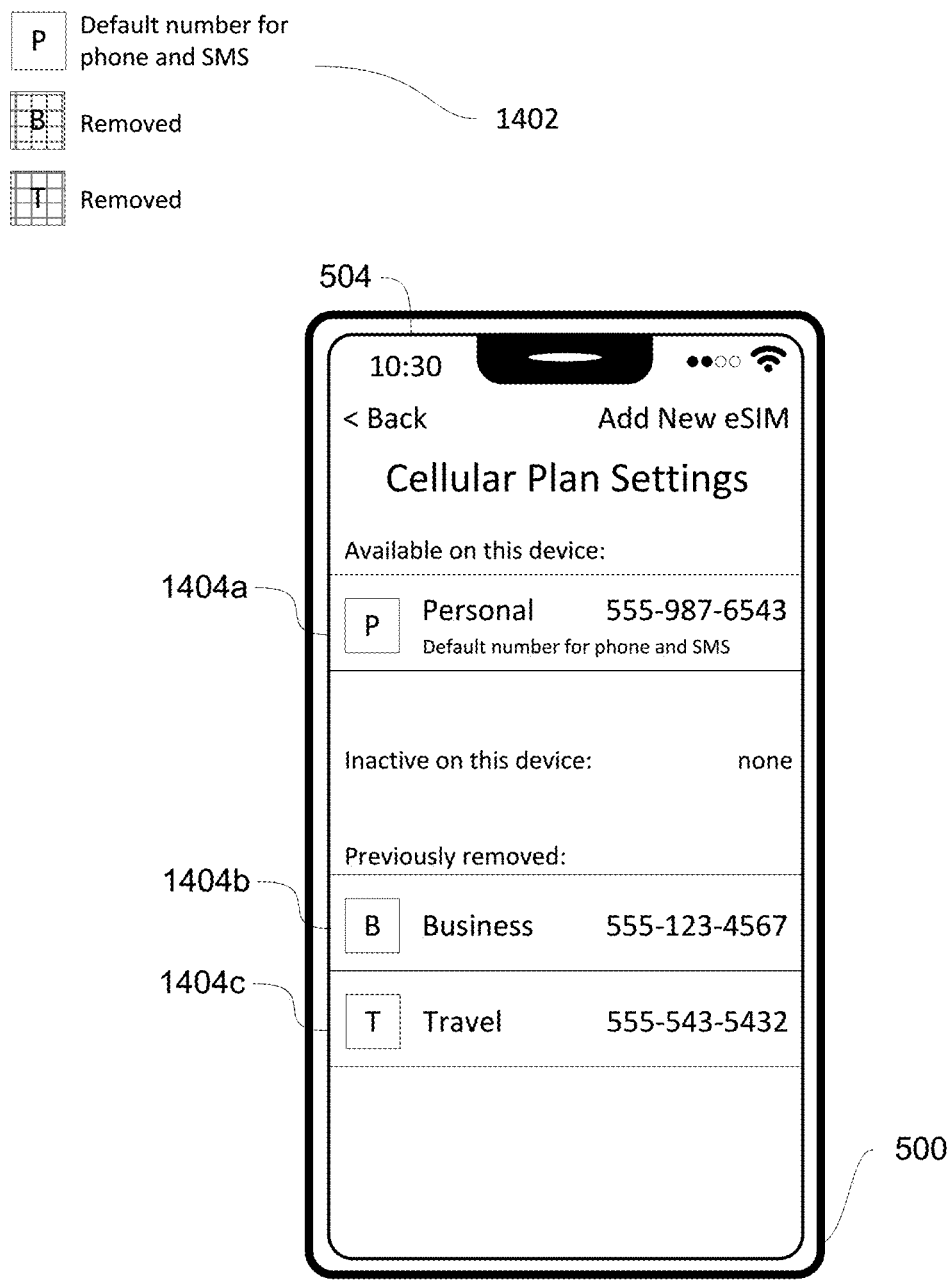

FIG. 14S illustrates the cellular settings user interface after the input detected in FIG. 14R (not necessarily in response to the input detected in FIG. 14R). As shown in the legend 1402 of FIG. 14S and the cellular settings user interface, the "Personal" cellular identifier is active on the electronic device as the default number for phone and SMS, and the "Business" and "Travel" cellular identifiers have been removed from the electronic device. Although the "Bushiness" and "Travel" cellular identifiers have been removed from the electronic device, the electronic device optionally continues to store data associated with these cellular identifiers (e.g., configuration settings such as phone number, functions the cellular identifier was last configured to perform before it was removed, a set of contacts associated with the cellular identifier, etc). The data is stored in a manner to protect user privacy.

Figure 14T:
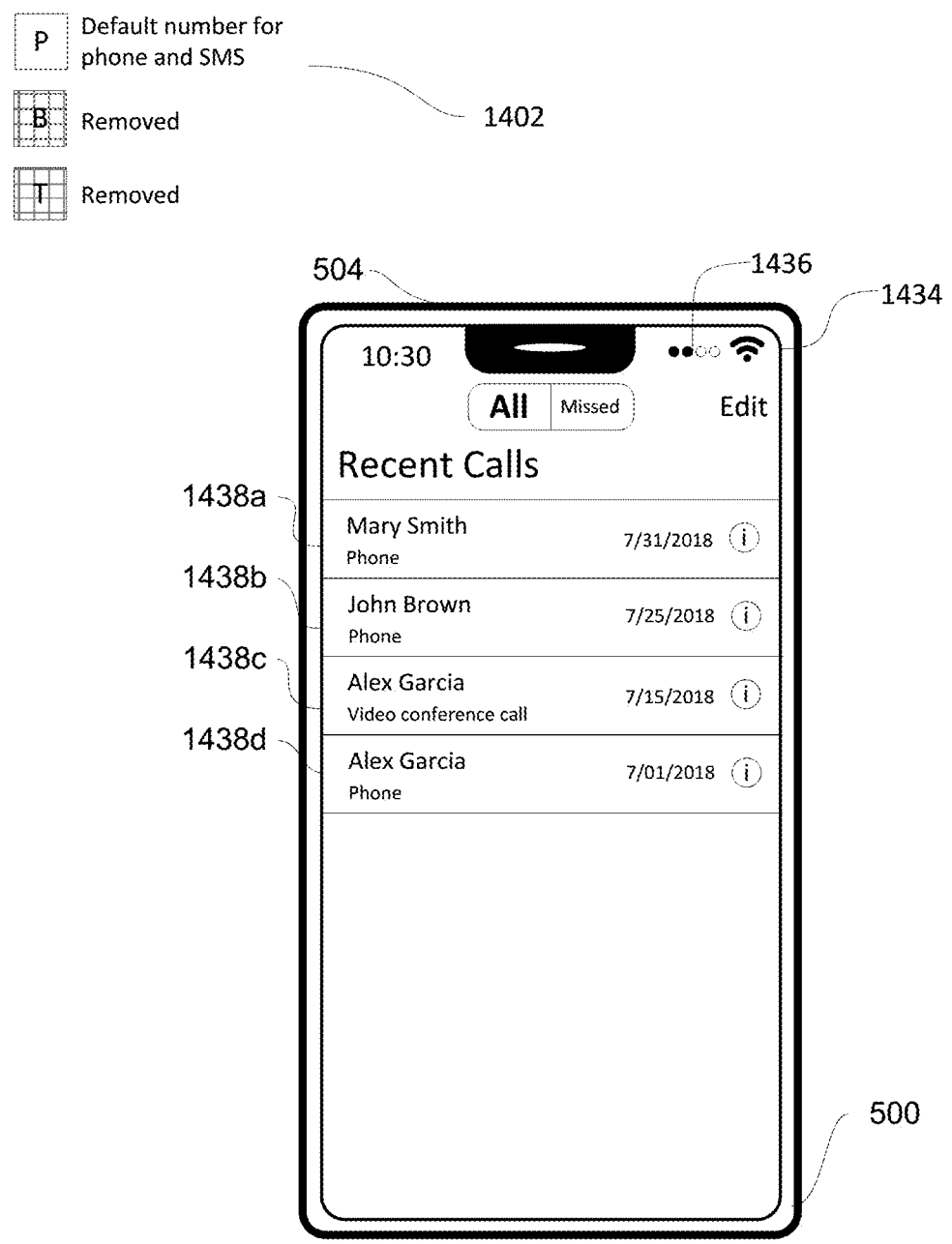

FIG. 14T illustrates a recent calls user interface while the electronic device 500 is configured to operate with one cellular identifier. The recent calls user interface includes a status bar 1434 and a plurality of representations 1438a-d of phone calls and video conference calls recently conducted by the electronic device 500. Unlike the multi-cellular identifier user interfaces described above with reference to FIGS. 7A-13F, the status bar of the single-cellular identifier user interface includes an indication 1436 of the signal level of the "Personal" cellular identifier without including the user-defined indication of the "Personal" cellular identifier (e.g., the "P" icon described herein). In some embodiments, though not illustrated here, the status bar 1434 further includes an indication of the carrier associated with the "Personal" cellular identifier. Unlike the multi-cellular identifier user interfaces described above with reference to FIGS. 7A-13F, the representations 1438*a-d* of the phone calls recently conducted by the electronic device 500 do not include indications of which cellular identifier was used to make the phone calls, because it is assumed that the user understands that the "Personal" cellular identifier is now the only cellular identifier available to initiate a return phone call.

Figure 14U:
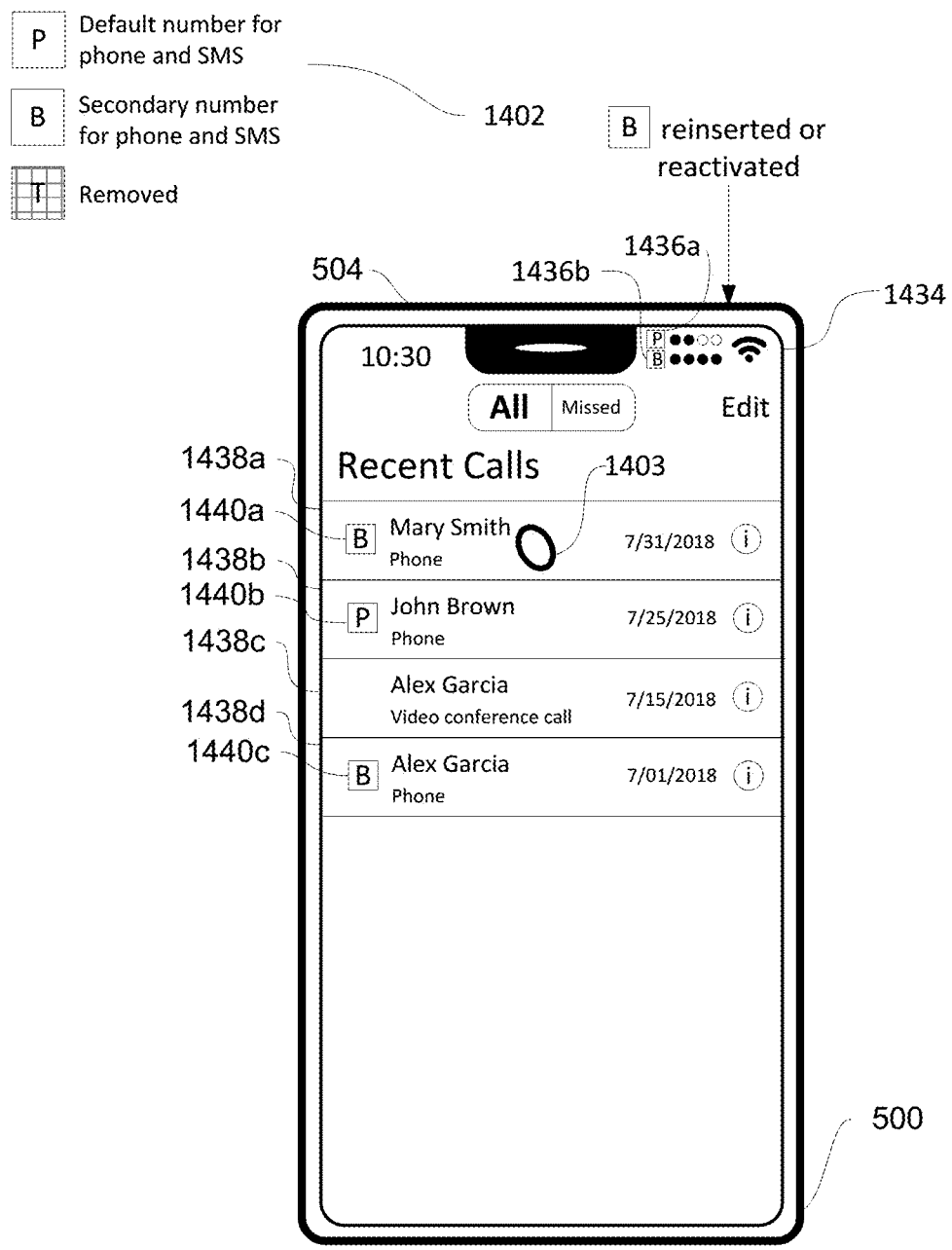

FIG. 14U illustrates a recent calls user interface while the electronic device 500 is configured to operate with multiple cellular identifiers. As shown in the legend 1402 of FIG. 14U, the electronic device 500 is configured to operate with both the "Personal" and "Business" cellular identifiers. The recent calls user interface includes a status bar 1434 and a plurality of representations 1438*a-d* of phone calls and video conference calls recently conducted by the electronic device 500. Unlike the single-cellular identifier user interfaces described above with reference to FIG. 14T, the status bar 1434 of the multi-cellular identifier user interface includes an indication 1436*a* of the signal level of the "Personal" cellular identifier and an indication 1436*b* of the signal level of the "Business" cellular identifier, including visual indications of each cellular identifier (e.g., the "P" icon and the "B" icon) based on the labels of the cellular identifiers. Unlike the single-cellular identifier user interface described above with reference to FIG. 14T, the representations 1438*a-d* of the phone calls recently conducted by the electronic device 500 do include indications 1440*a-c* of which cellular identifier was used to make the phone calls. The user selects (e.g., with contact 1403) a representation 1438*a* of a phone call with "Mary Smith" that was made with the "Business" cellular identifier. In this example, the "Business" cellular identifier is associated with the contact "Mary Smith." In response to the selection, the electronic device 500 initiates a phone call to "Mary Smith" using the "Business" cellular identifier without presenting an alert with options to use a different cellular identifier for the call, as shown in FIG. 14V (e.g., such as the alerts illustrated in FIGS. 14G-H, 14K, and 14Y).

Figure 14V:
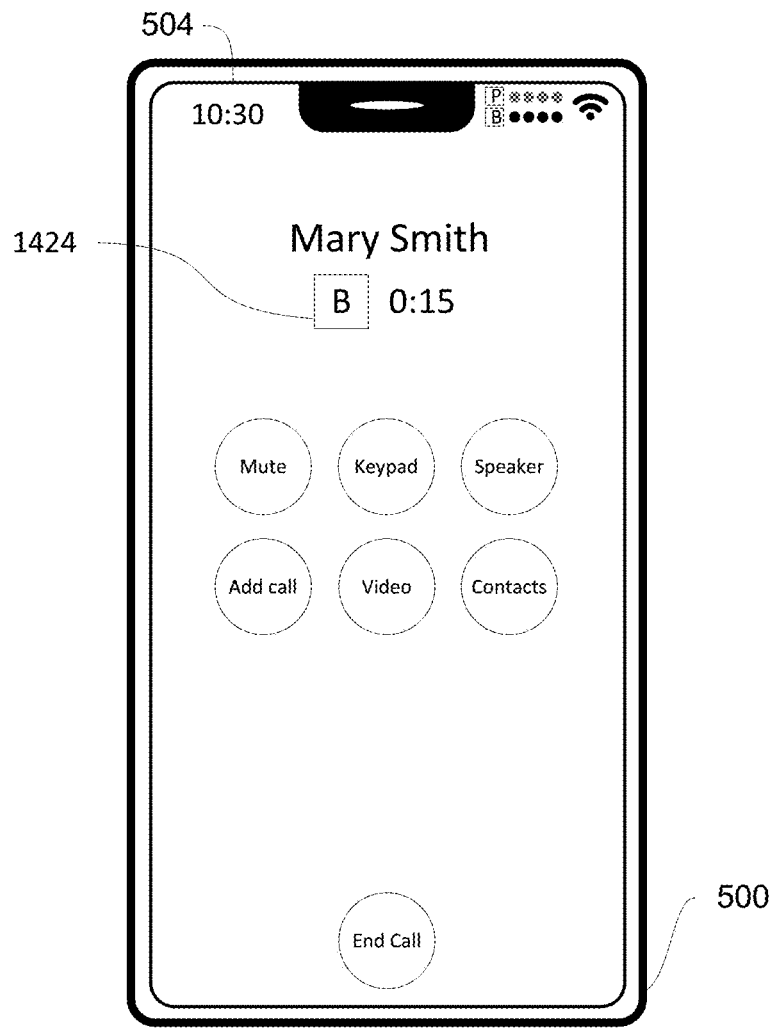

FIG. 14V illustrates a phone user interface while the electronic device 500 conducts a phone call with the contact "Mary Smith." As shown in the legend 1402 of FIG. 14V, the electronic device 500 uses the "Business" cellular identifier to make the phone call. The phone user interface includes an indication 1424 of the "Business" cellular identifier while the phone call is being conducted.

Figure 14W:
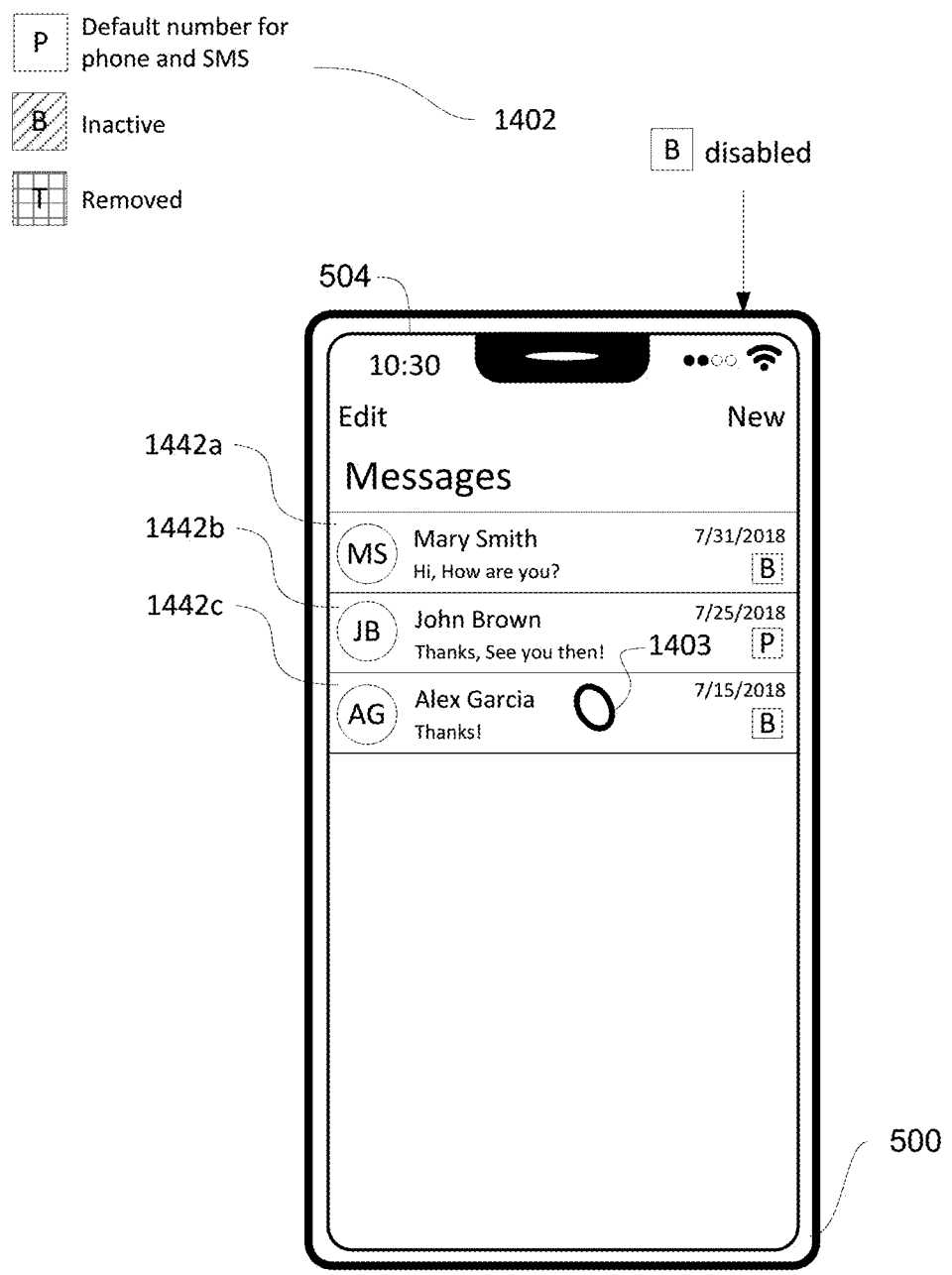

FIG. 14W illustrates a messaging user interface. As shown in the legend 1402 of FIG. 14W, the "Personal" cellular identifier is active on the electronic device 500, the "Business" cellular identifier is currently inactive on the electronic device 500, and the "Travel" cellular identifier has been removed from the electronic device. The messaging user interface includes a plurality of representations 1442*a-c* of messaging conversations of the electronic device 500. The indications 1442*a-c* of the messaging conversations include indications of the contact that the messaging conversation is with and which cellular identifier was used for the conversation. The user selects (e.g., with contact 1403) a representation of a conversation with "Alex Garcia" that was conducted with the "Business" cellular identifier. In response to the selection, the electronic device presents the messaging conversation, as shown in FIG. 14X.

Figure 14X:
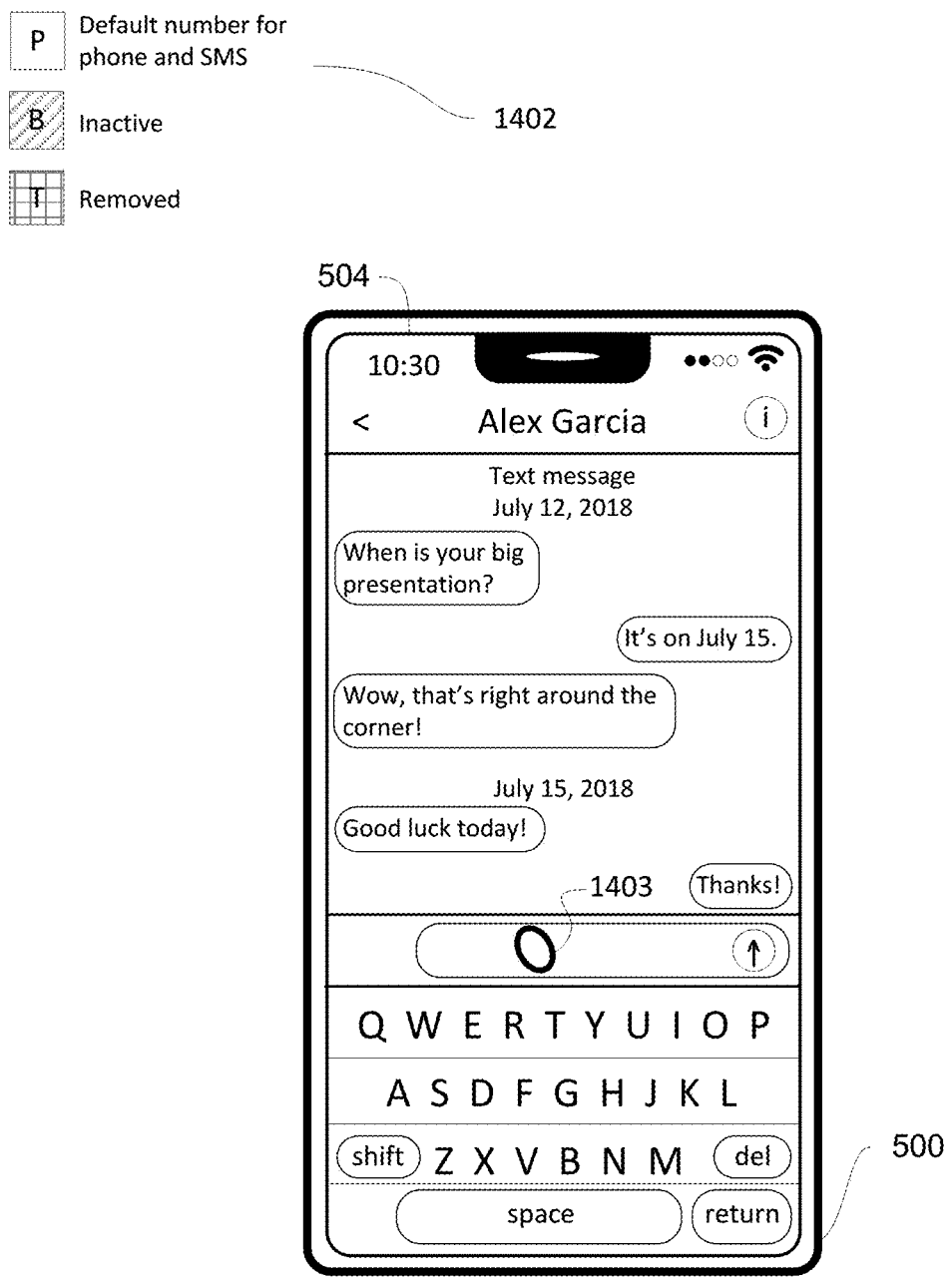
Figure 14Y:
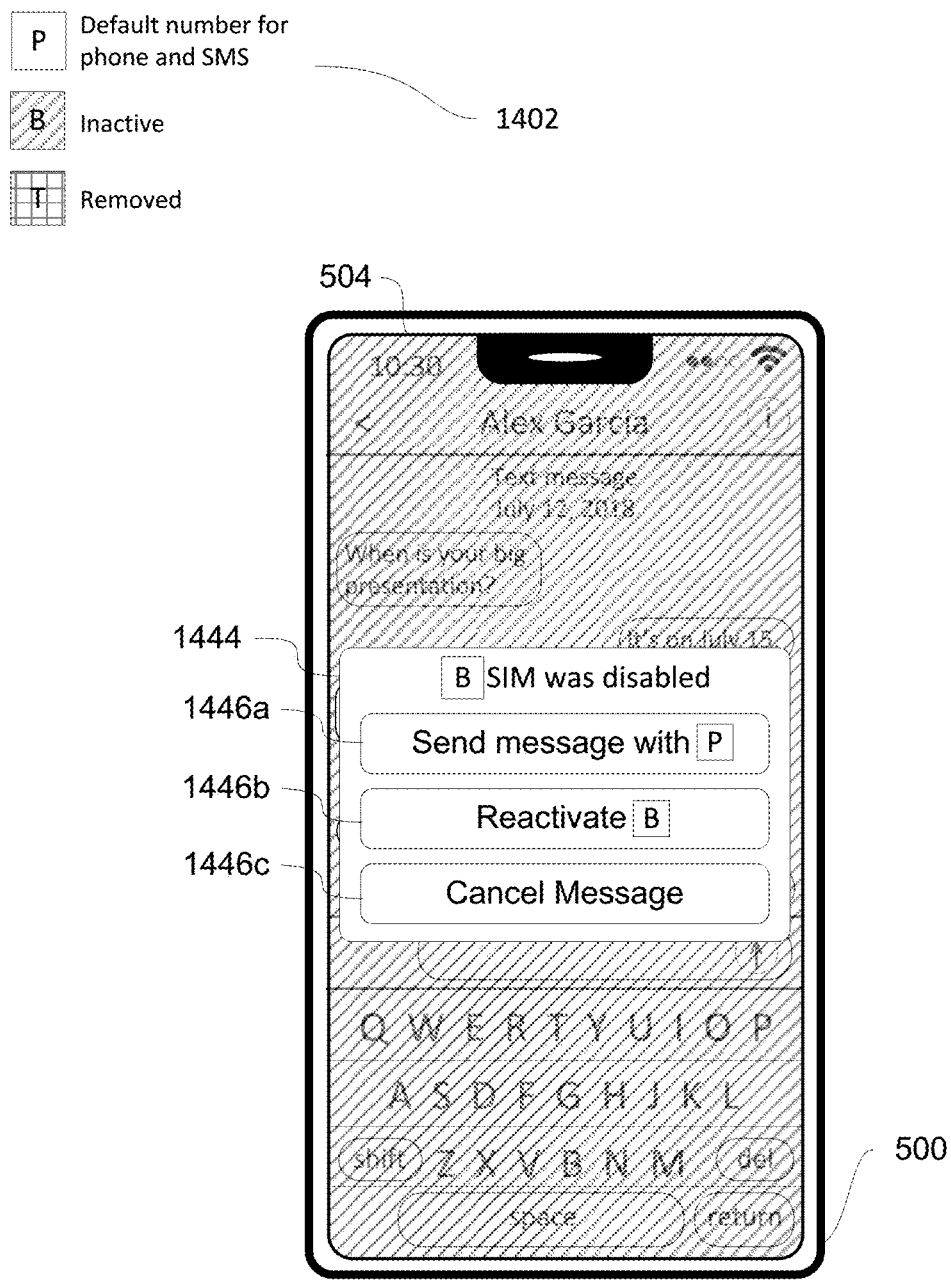

FIG. 14X illustrates a messaging conversation user interface. The messaging conversation user interface includes representations of messages sent from and received at the electronic device 500. Although the "Business" cellular identifier, which was used to conduct the messaging conversation, is inactive on the electronic device, the electronic device 500 presents the messaging conversation which allows the user to view the messages in the conversation. The user selects (e.g., with contact 1403) a text entry field of the messaging conversation user interface. In response to the user's selection, the electronic device presents an alert that the "Business" cellular identifier is inactive on the electronic device, as shown in FIG. 14Y. By presenting the alert in response to the selection of the text entry field, the electronic device enables the user to view the messaging conversation history without interruption by the alert 1444 and warns the user before they type a message that the "Business" cellular identifier is inactive on the electronic device 500.

FIG. 14Y illustrates the alert 1444 that the "Business" cellular identifier is inactive on the electronic device 500. The alert 1444 includes a selectable option 1446*a* to send the message with the "Personal" cellular identifier, a selectable option 1446*b* to reactivate the "Business" cellular identifier, and a selectable option 1446*c* to cancel sending the message. In response to a selection of the option 1446*a* to send the message with the "Personal" cellular identifier, the electronic device 500 optionally presents an option to send the message with the "Personal" cellular identifier and associate the contact with the "Personal" cellular identifier instead of the "Business" cellular identifier, and an option to send the message with the "Personal" cellular identifier without associating the contact with the "Personal" cellular identifier instead of the "Business" cellular identifier. These options are optionally presented in an alert, such as the alert illustrated in FIG. 14H.

Figure 14Z:
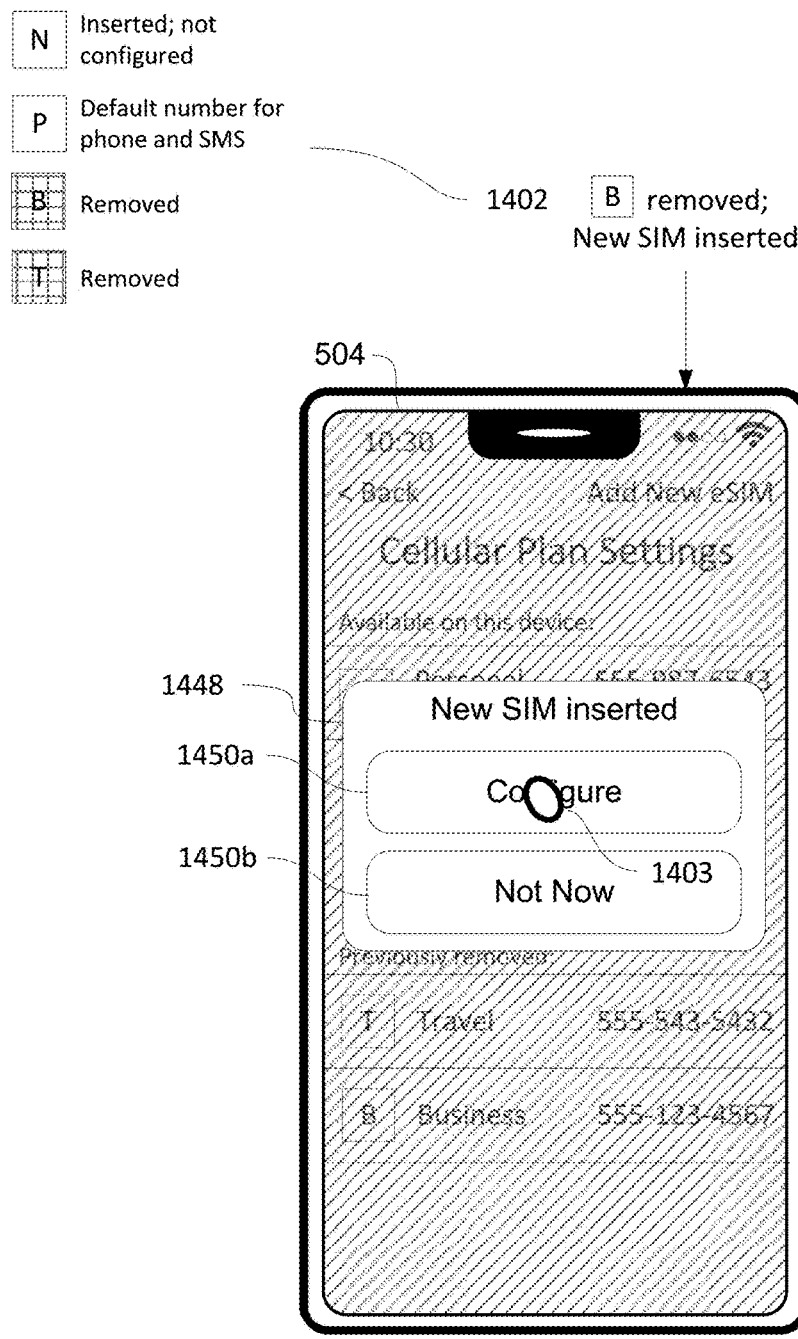
Figure 14A:
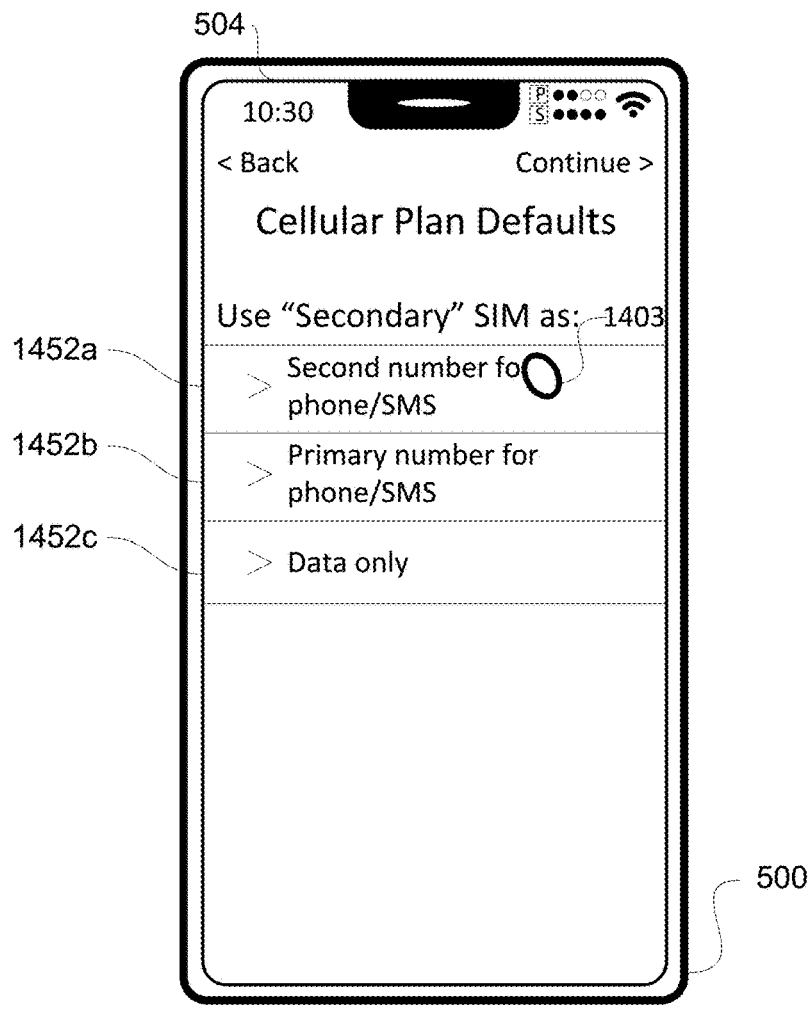
Figure 14B:
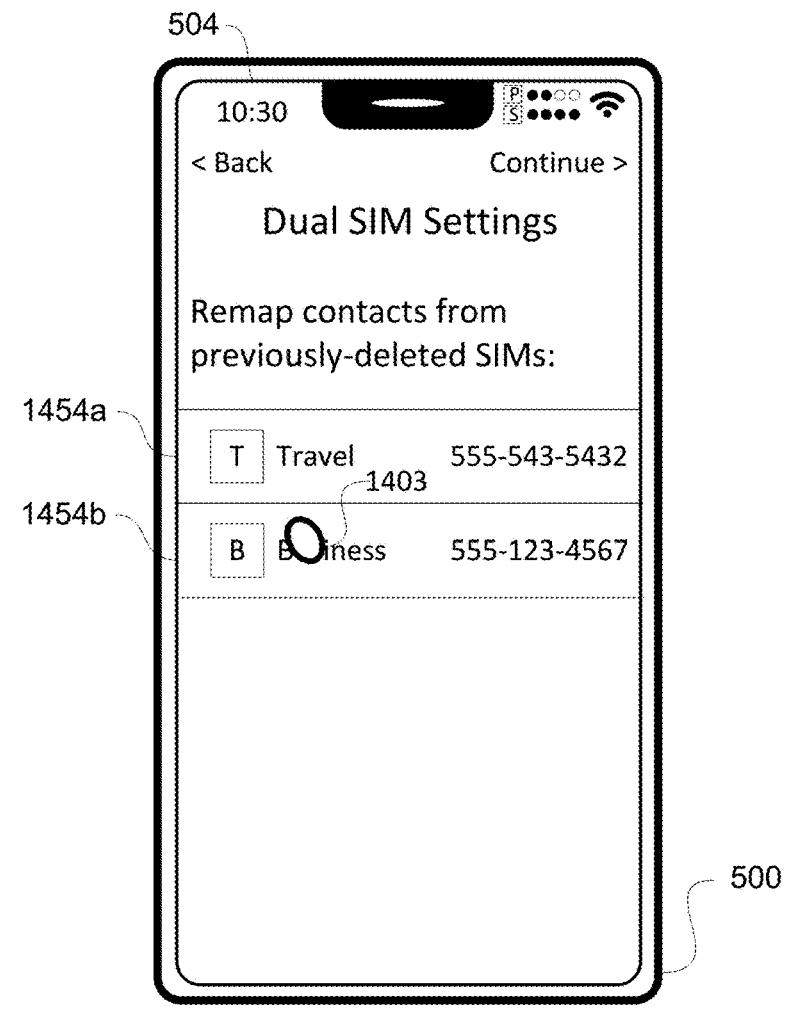
Figure 14E:
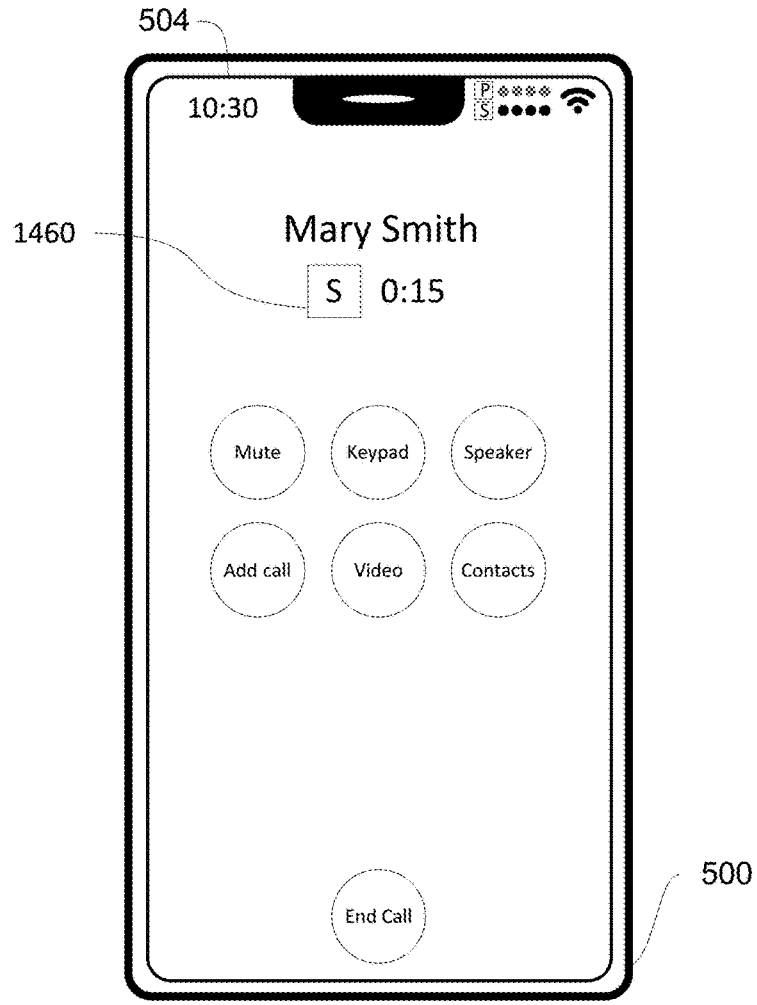
Figure 14I:
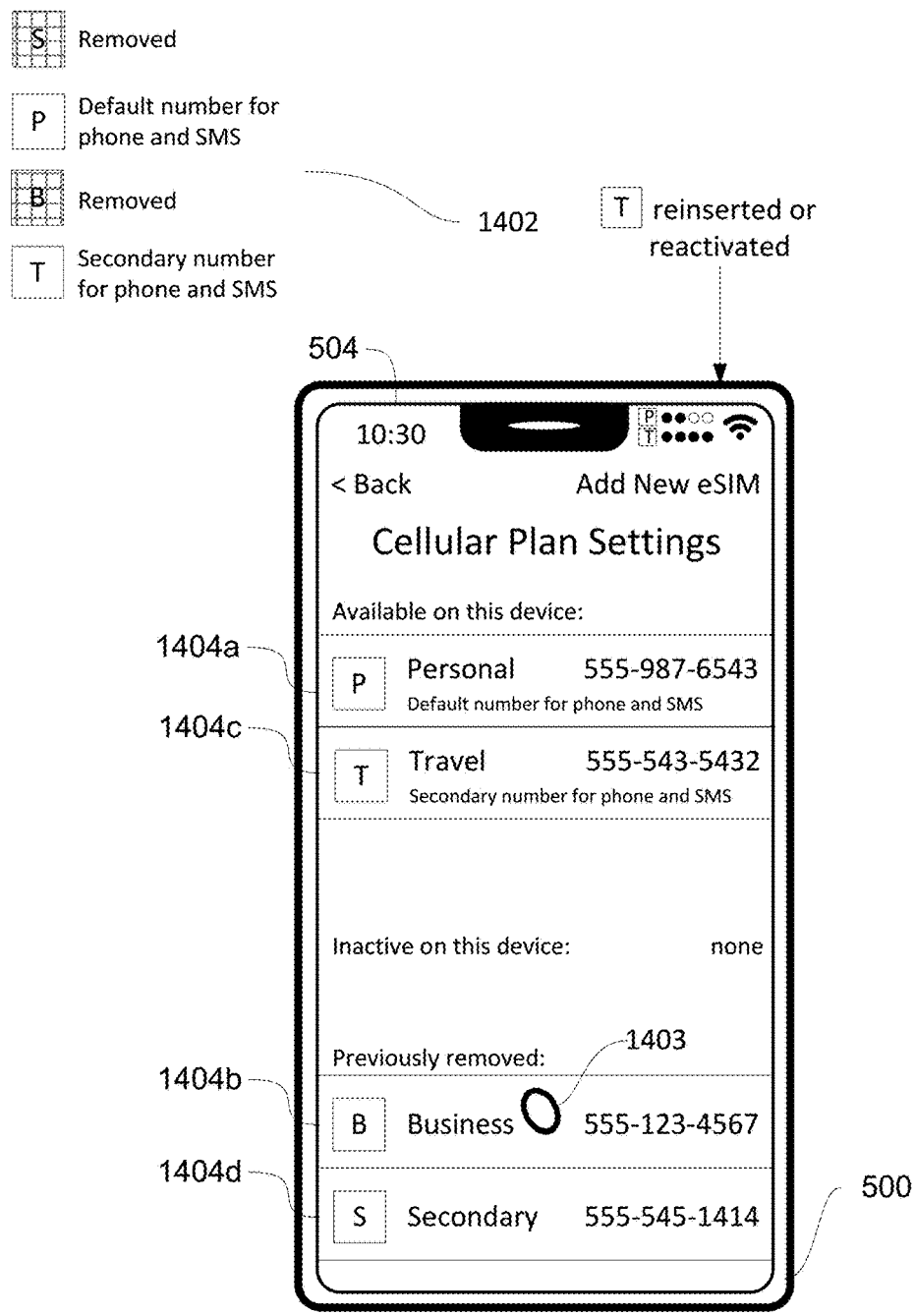
Figure 14J:
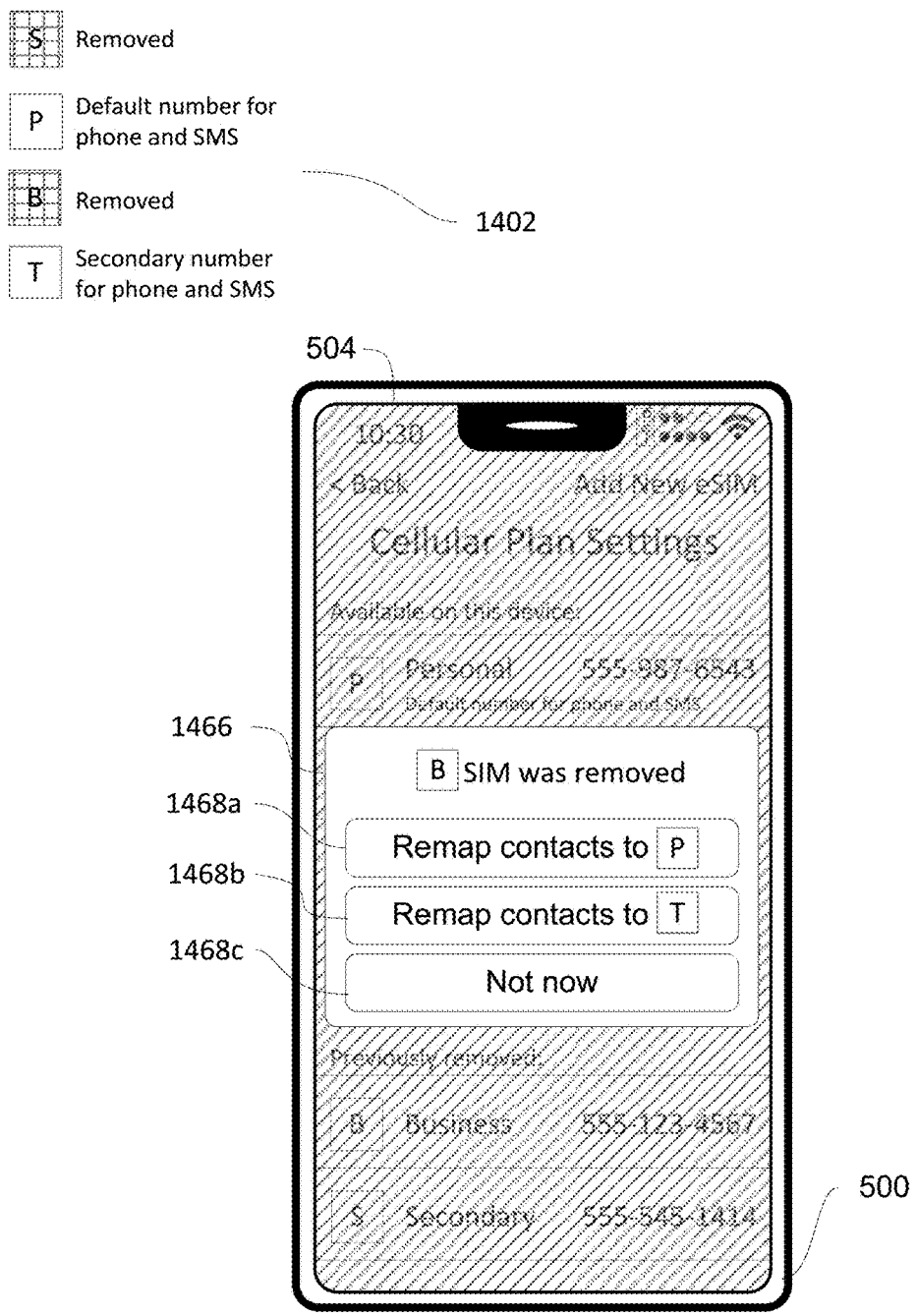

FIG. 14Z illustrates a new cellular identifier alert 1448. The alert 1448 is optionally displayed by device 500 in response to detecting addition of a new cellular identifier to the device (e.g., cellular identifier "N" in FIG. 14Z), and includes a button 1450*a* to configure the new cellular identifier and a button 1450*b* to dismiss the alert 1448 without configuring the cellular identifier. In some embodiments, the alert 1448 is not presented, and the electronic device automatically presents a cellular identifier setup user interface in response to detecting the new cellular identifier. The user selects (e.g., with contact 1403) the option 1450*a* to configure the new cellular identifier. In response to the user's selection, the electronic device presents a cellular identifier setup user interface, such as in FIG. 14AA. Exemplary cellular identifier setup user interfaces are described above with reference to FIGS. 7A-8U.

FIG. 14AA illustrates a user interface for configuring the operations the electronic device 500 will use the new cellular identifier to perform. The user interface illustrated in FIG. 14AA illustrates one of the cellular identifier setup user interfaces that the electronic device is able to present. Additional cellular identifier setup user interfaces are described above with reference to FIGS. 7A-8U. FIG. 14AA illustrates an option 1452*a* to use the "Secondary" cellular identifier (referred to as "N" in FIG. 14Y, because it was not yet configured, but now is configured as "Secondary") as a second number for phone/SMS, an option 1452*b* to use the "Secondary" cellular identifier as the Primary number for phone/SMS, and an option 1452*c* to use the "Secondary" cellular identifier for data only. The user selects (e.g., with contact 1403) the option 1452*a* to use the "Secondary" cellular identifier as the second number for phone and SMS.

FIG. 14BB illustrates a user interface for associating contacts associated with previously-deleted cellular identifiers with a different cellular identifier that is active on the electronic device 500 that is optionally presented as part of the cellular identifier setup procedure of FIG. 14AA (e.g., after the user interface of FIG. 14AA). The user interface includes an option 1454a to associate contacts associated with the "Travel" cellular identifier with a different cellular identifier and an option 1454b to associate contacts associated with the "Business" cellular identifier with a different cellular identifier (e.g., because these two cellular identifiers were removed from device 500 without yet having their contacts associated with a new cellular identifier). In some embodiments, if the "T" or "B" cellular identifiers already had their contacts associated with different cellular identifiers, they would optionally not show up in the user interface of FIG. 14BB. The user selects (e.g., with contact 1403) the option 1454b to associate the contacts associated with the "Business" cellular identifier with a different cellular identifier. In response to the user's selection, the electronic device 500 presents a user interface for selecting which cellular identifier to associate the contacts with, as shown in FIG. 14CC.

FIG. 14CC illustrates a user interface for associating the contacts that were associated with the "Business" cellular identifier with a different cellular identifier active on the electronic device. The user interface includes an option 1456a to associate the contacts with the "Personal" cellular identifier and an option 1456b to associate the contacts with the "Secondary" cellular identifier. In some embodiments, rather than presenting options to associate the contacts with either the "Personal" cellular identifier or the "Secondary" cellular identifier while setting up the "Secondary" cellular identifier, the electronic device 500 only presents an option to associate the contacts with the "Secondary" cellular identifier while setting up the "Secondary" cellular identifier and presents the options to associate the contacts with other cellular identifiers (e.g., the "Personal" cellular identifier) in a different user interface (e.g., the cellular identifier settings user interface), as described with reference to FIGS. 14II-JJ below. The user selects (e.g., with contact 1403) the option 1456b to associate the contacts with the "Secondary" cellular identifier instead of the "Business" cellular identifier, and in response, the device 500 optionally associates the contacts previously associated with the "Business" cellular identifier with the "Secondary" cellular identifier instead.

FIG. 14DD illustrates a contact card user interface shown after the input detected in FIG. 14CC (not necessarily in response to the input detected in FIG. 14CC). The contact card user interface illustrated in FIG. 14DD is similar to the contact card user interface illustrated in FIG. 14F, except the contact "Mary Smith" is now associated with the "Secondary" cellular identifier instead of the "Business" cellular identifier (e.g., because of the remapping initiated in FIG. 14CC). The contact card user interface includes indications 1458 that "Mary Smith" is associated with the "Secondary" cellular identifier. The user selects (e.g., with contact 1403) an indication of the "Phone" telephone number. In response, the electronic device 500 initiates a phone call with "Mary Smith" using the "Secondary" cellular identifier and presents a phone user interface, as shown in FIG. 14EE.

FIG. 14EE illustrates a phone user interface. The phone user interface is presented while the electronic device conducts a phone call. The phone user interface includes an indication 1460 of the "Secondary" cellular identifier, which is being used for the phone call.

FIG. 14FF illustrates an alert 1462 indicating that the "Secondary" cellular identifier was removed from the electronic device 500 (e.g., displayed in response to detecting removal of the "Secondary" cellular identifier from device 500). The alert 1462 includes a selectable option for associating contacts that were associated with the "Secondary" cellular identifier with the "Personal" cellular identifier and an option 1464b to dismiss the alert 1462 without associating the contacts with the "Personal" cellular identifier instead of the secondary cellular identifier. The user selects (e.g., with contact 1403) the option 1464a to associate the contacts with the "Personal" cellular identifier instead of the "Secondary" cellular identifier. In response to the user's selection, the electronic device 500 associates the contacts that were associated with the "Secondary" cellular identifier with the "Personal" cellular identifier.

FIG. 14GG illustrates a contact card user interface shown after the input detected in FIG. 14FF (not necessarily in response to the input detected in FIG. 14FF). The contact card user interface illustrated in FIG. 14GG is similar to the contact card user interface illustrated in FIGS. 14F and 14DD, except the indications 1412a-b of the phone numbers of the contact do not include indications of the cellular identifier associated with the contact because the electronic device is only configured to operate with one cellular identifier (e.g., the "Personal" cellular identifier) due to the removal of the "Secondary" cellular identifier. The contact "Mary Smith" is now associated with the "Personal" cellular identifier in response to the user input to associate all contacts that were associated with the "Secondary" cellular identifier with the "Personal" cellular identifier instead in FIG. 14FF. The user selects (e.g., with contact 1403) the "Phone" telephone number of the contact to initiate a phone call to that phone number with the "Personal" cellular identifier, as shown in FIG. 14HH.

FIG. 14HH illustrates a phone user interface. The phone user interface illustrated in FIG. 14HH is similar to the phone user interface illustrated in FIGS. 14I, 14L, 14V, and 14EE except that the phone user interface does not include an indication of the cellular identifier used for the phone call because the electronic device 500 is configured to operate with only the "Personal" cellular identifier.

FIG. 14II illustrates the cellular identifier settings user interface. As shown in the legend 1402 of FIG. 14II and the cellular identifier settings user interface, the "Personal" and "Travel" cellular identifiers are active on the electronic device 500 and the "Business" and "Secondary" cellular identifiers have been removed from the electronic device 500. The user selects (e.g., with contact 1403) the indication 1404b of the "Business" cellular identifier, which has been removed from the electronic device 500. In the example illustrated in FIGS. 14II-JJ, the contacts associated with the "Business" cellular identifier have not been associated with a different cellular identifier. In response to the user's selection in FIG. 14II, the electronic device presents an alert that the "Business" cellular identifier has been removed and options to associate the contacts associated with the "Business" cellular identifier with a different cellular identifier available to the electronic device, as shown in FIG. 14JJ.

FIG. 14JJ illustrates the alert 1466 that the "Business" cellular identifier has been removed from the electronic device. The alert 1466 includes an option 1468a to associate the contacts associated with the "Business" cellular identifier with the "Personal" cellular identifier, an option 1468b to associate the contacts associated with the "Business" cellular identifier with the "Travel" cellular identifier, and an option 1468c to dismiss the alert without associating the contacts with a different cellular identifier.

Figure 15B:
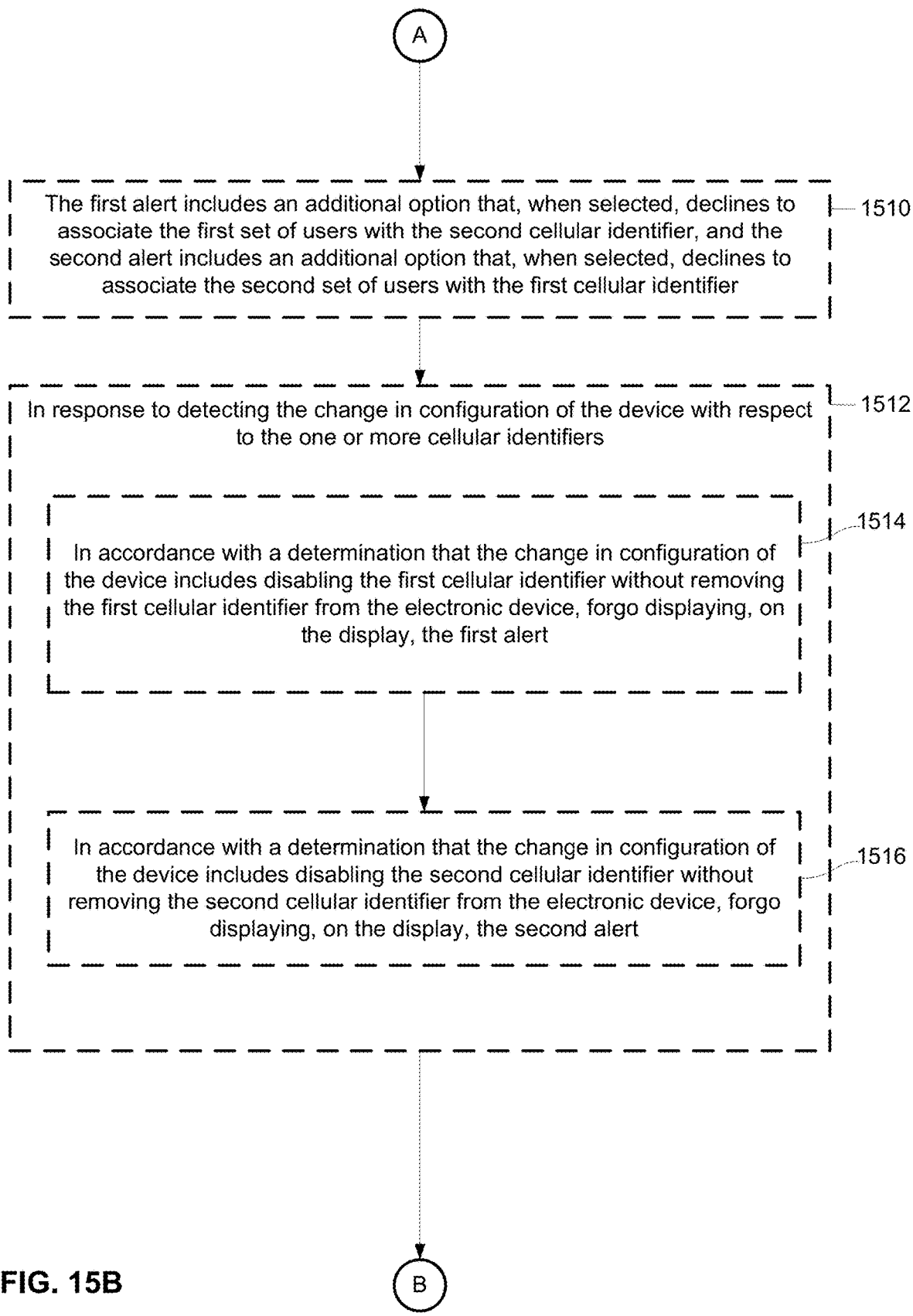
FIGS. 15A-15O are flow diagrams illustrating a method of presenting alerts related to previously-removed cellular identifiers in accordance with some embodiments of the disclosure.
Figure 15C:
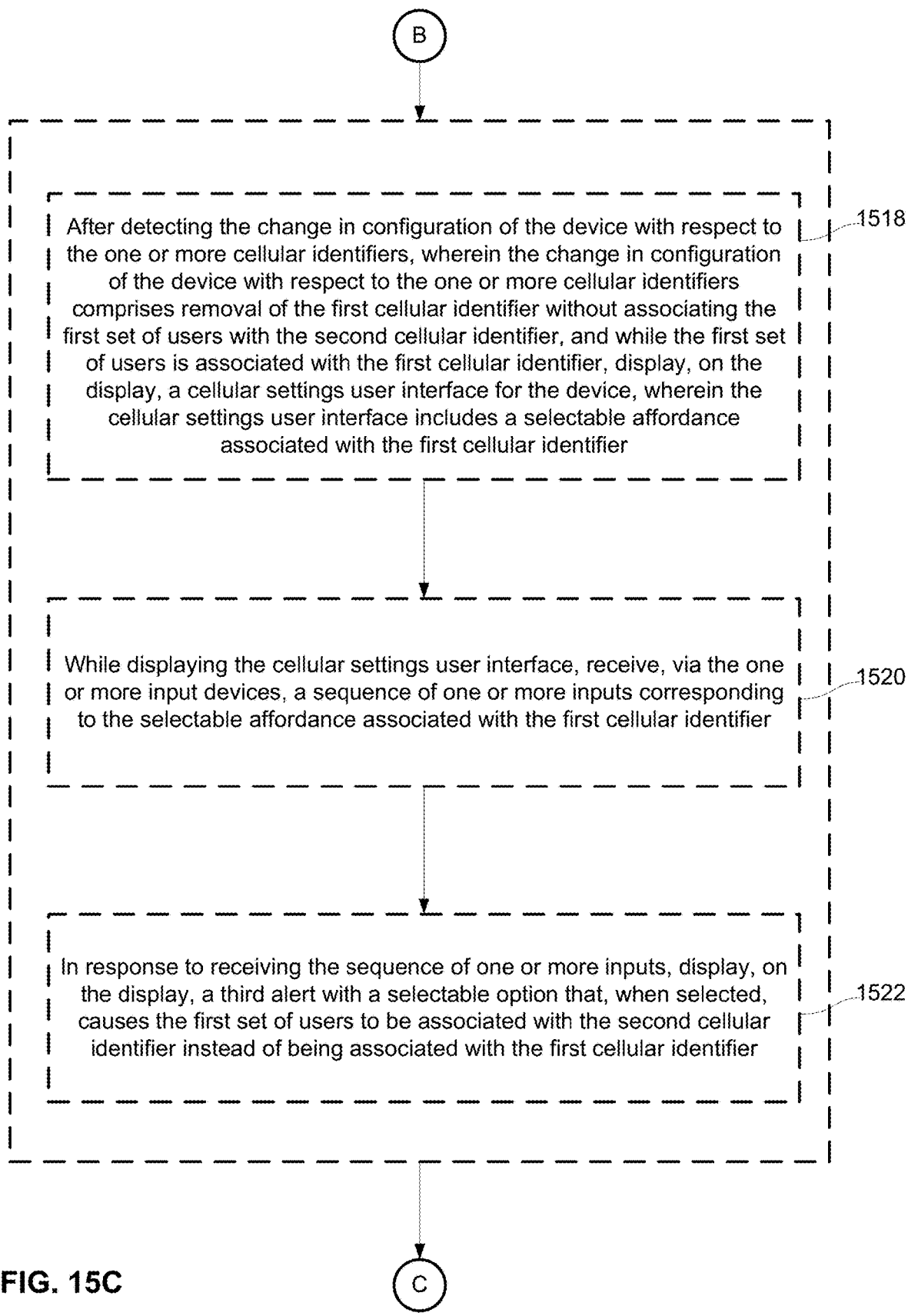
Figure 15D:
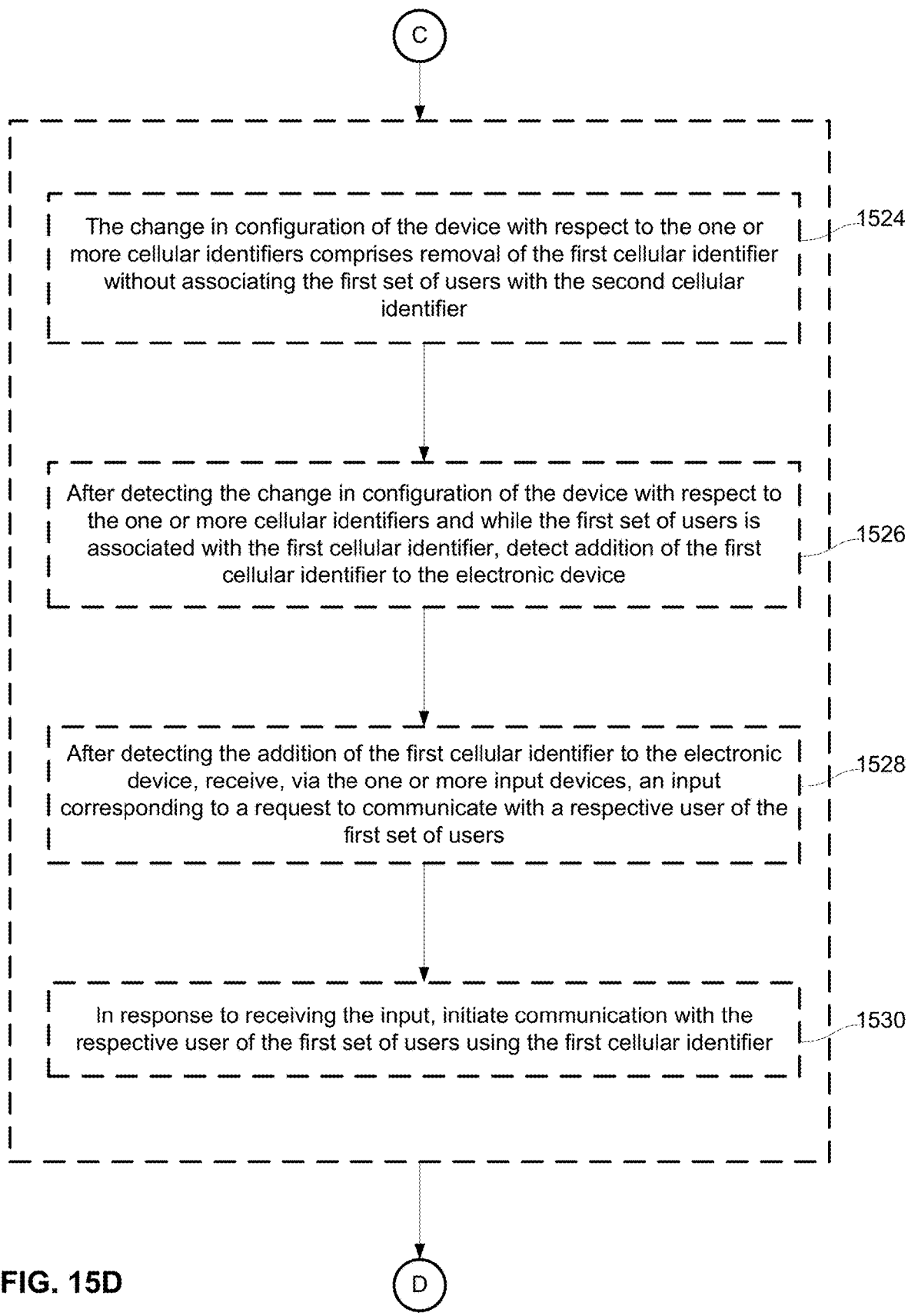
Figure 15E:
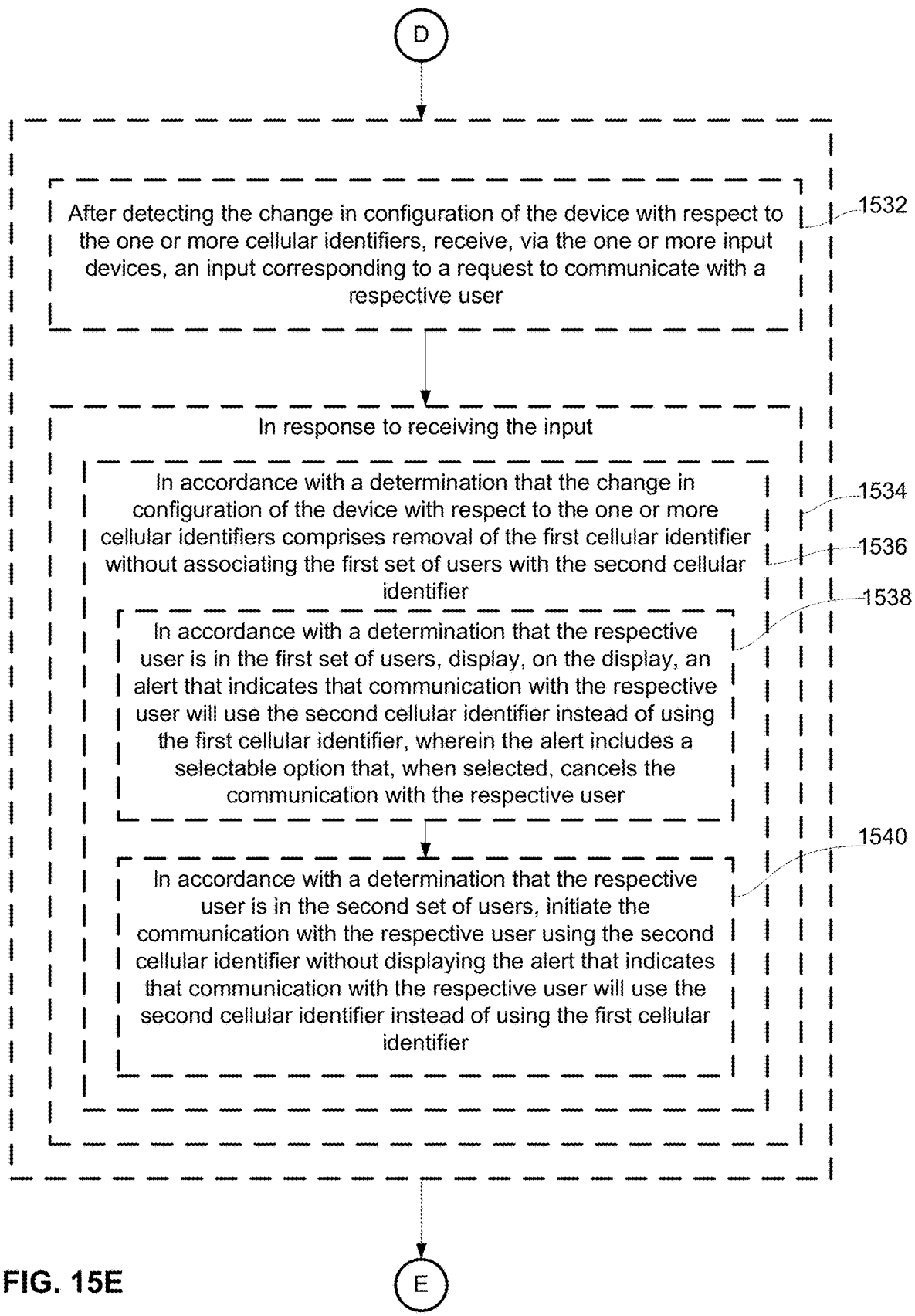
Figure 15F:
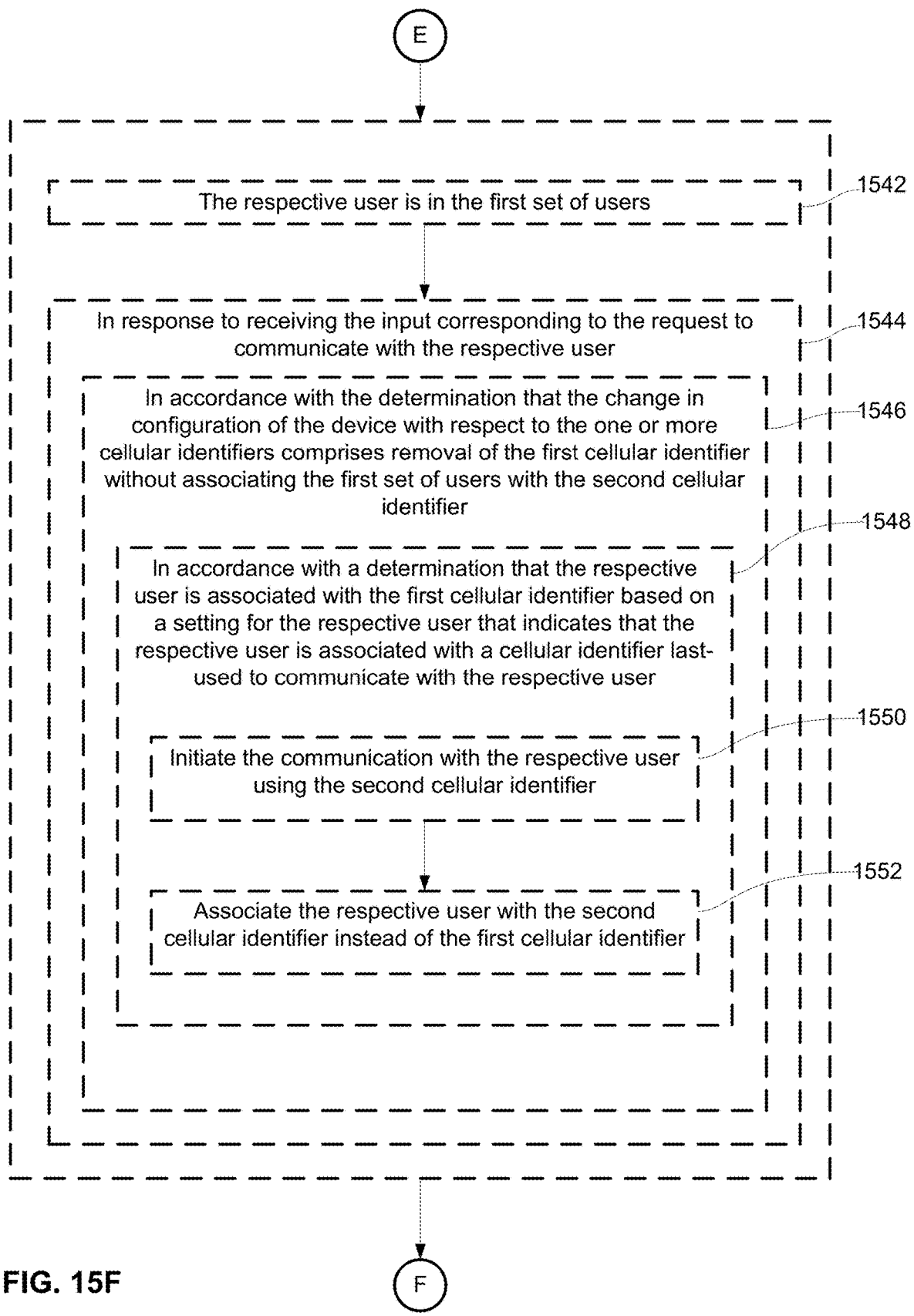
Figure 15G:
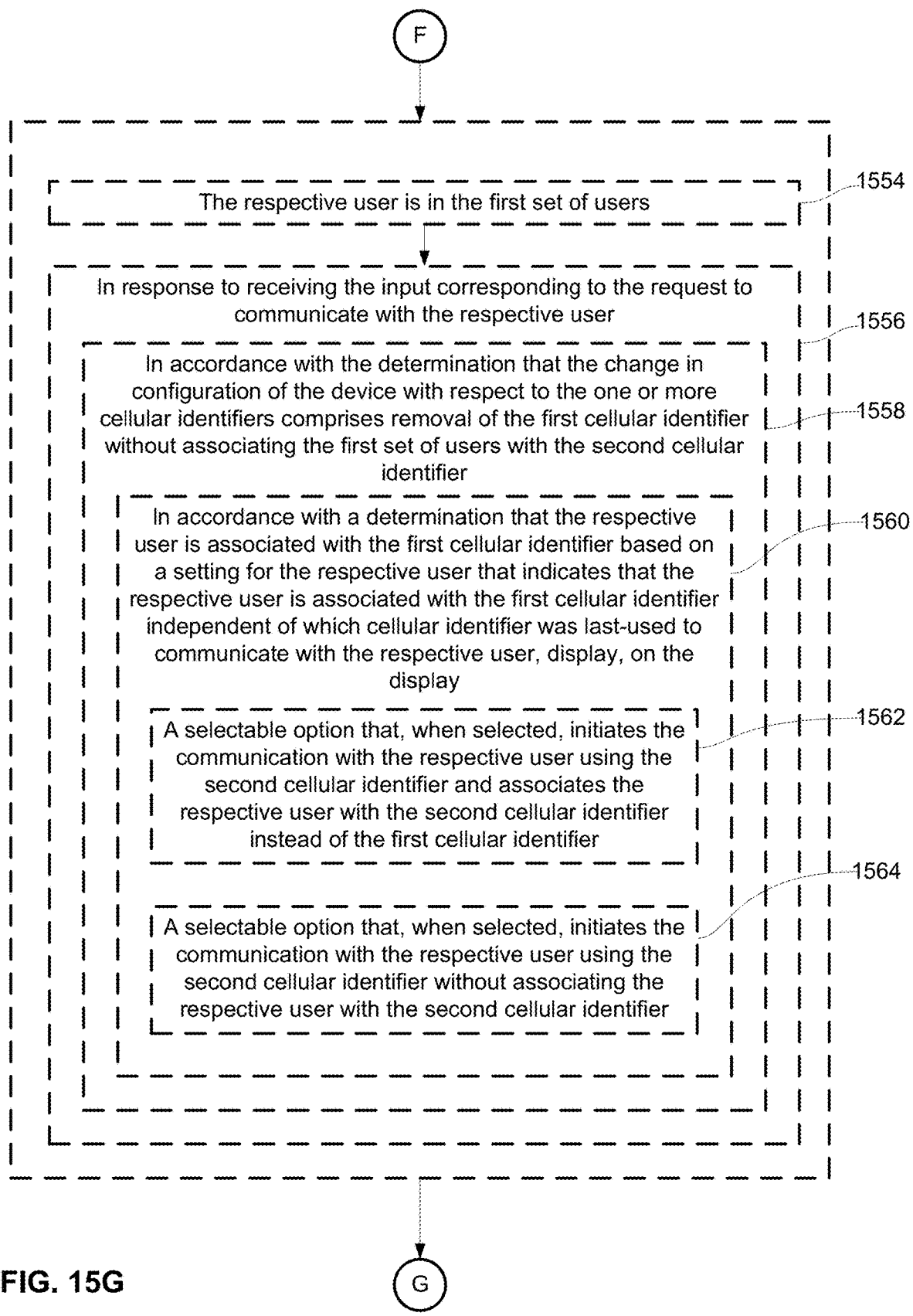
Figure 15H:
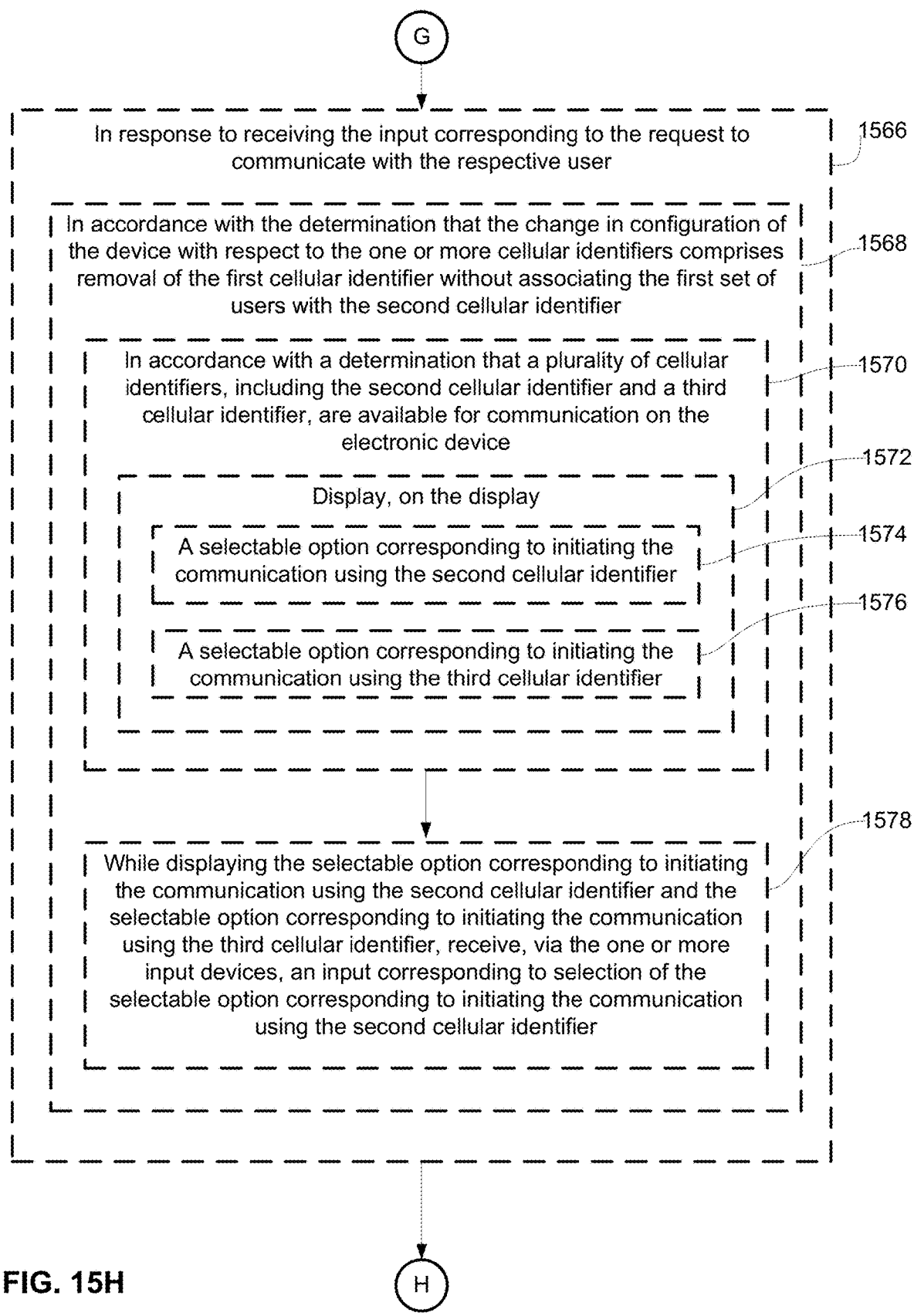
Figure 15I:
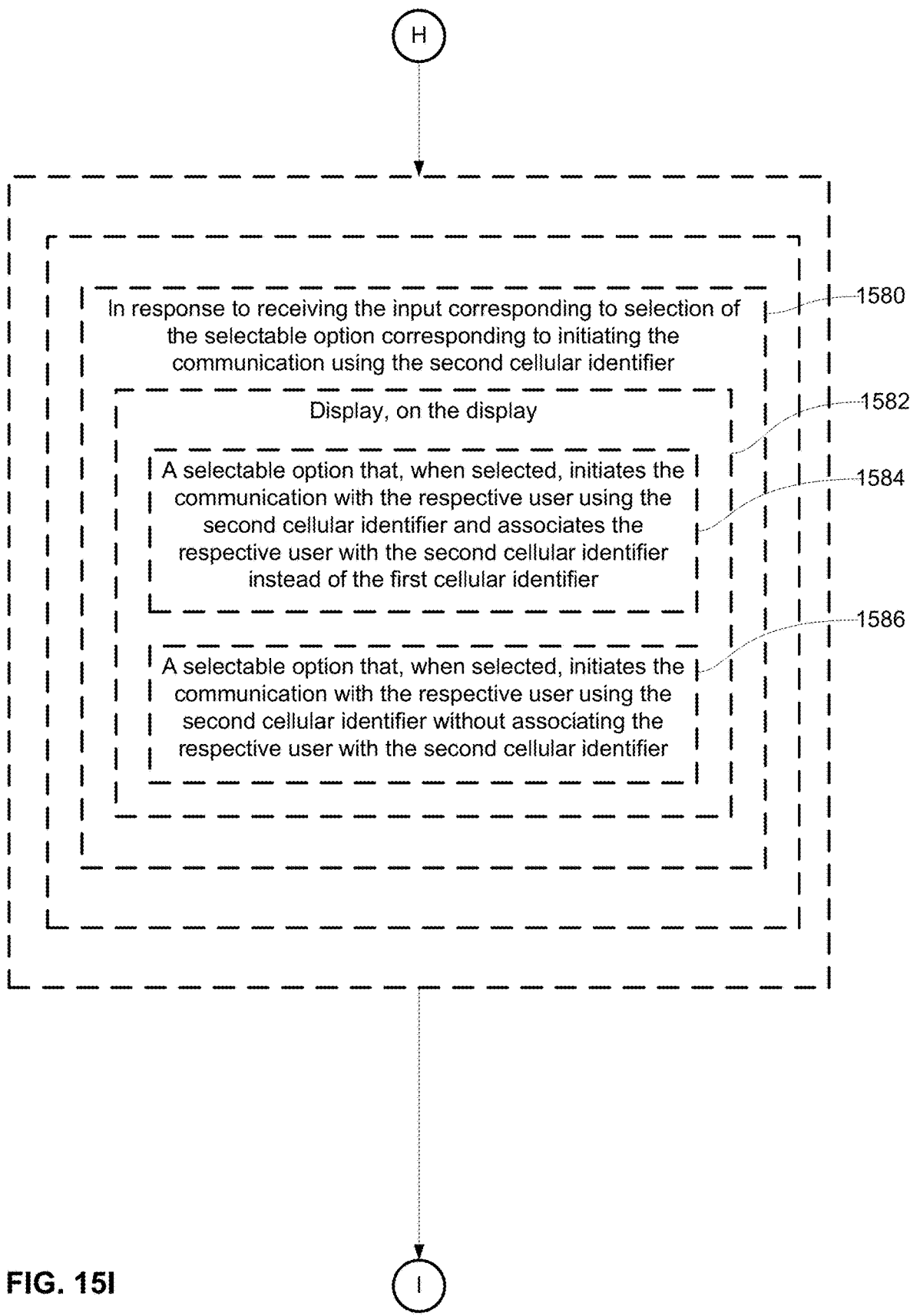
Figure 15J:
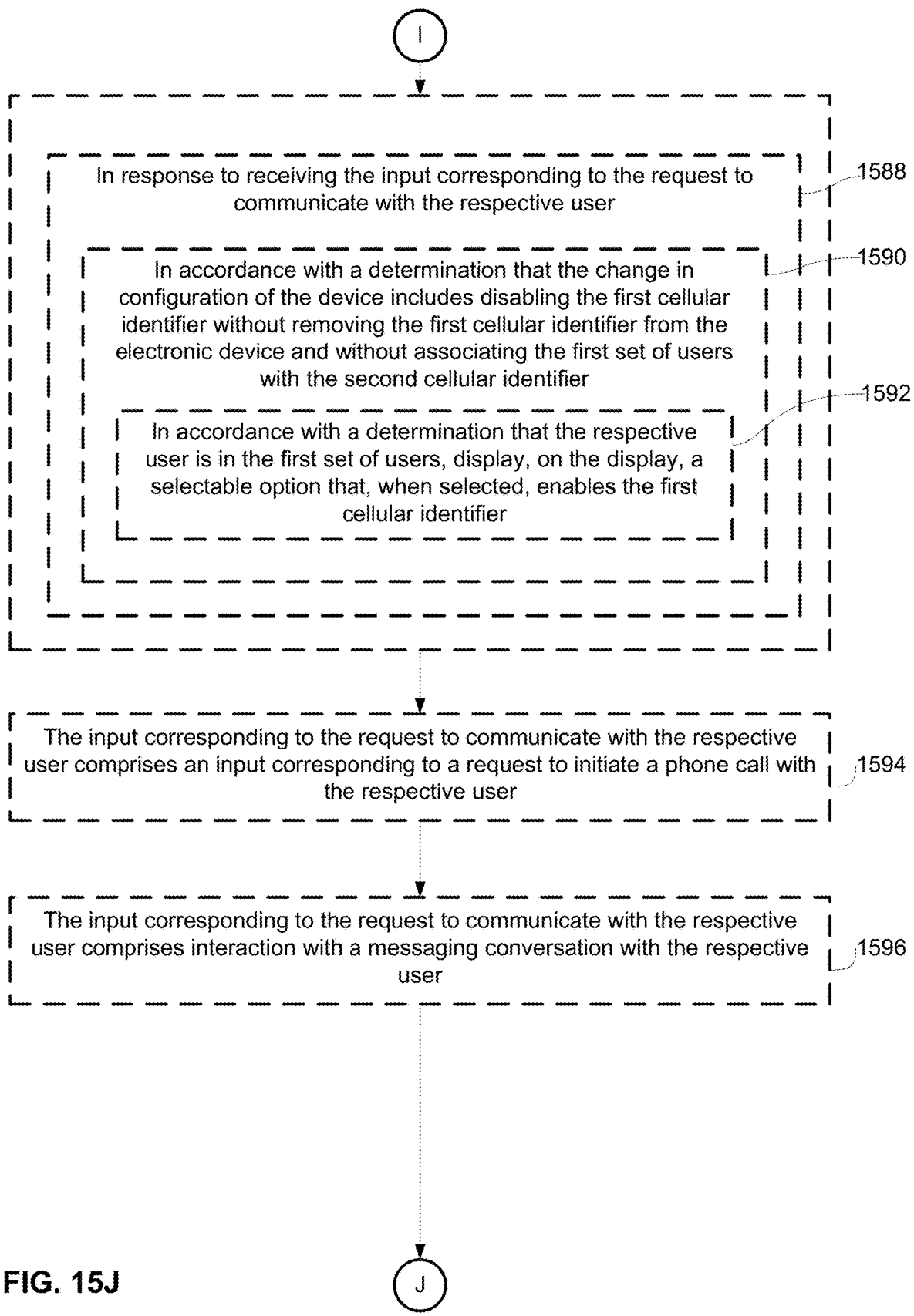
Figure 15K:
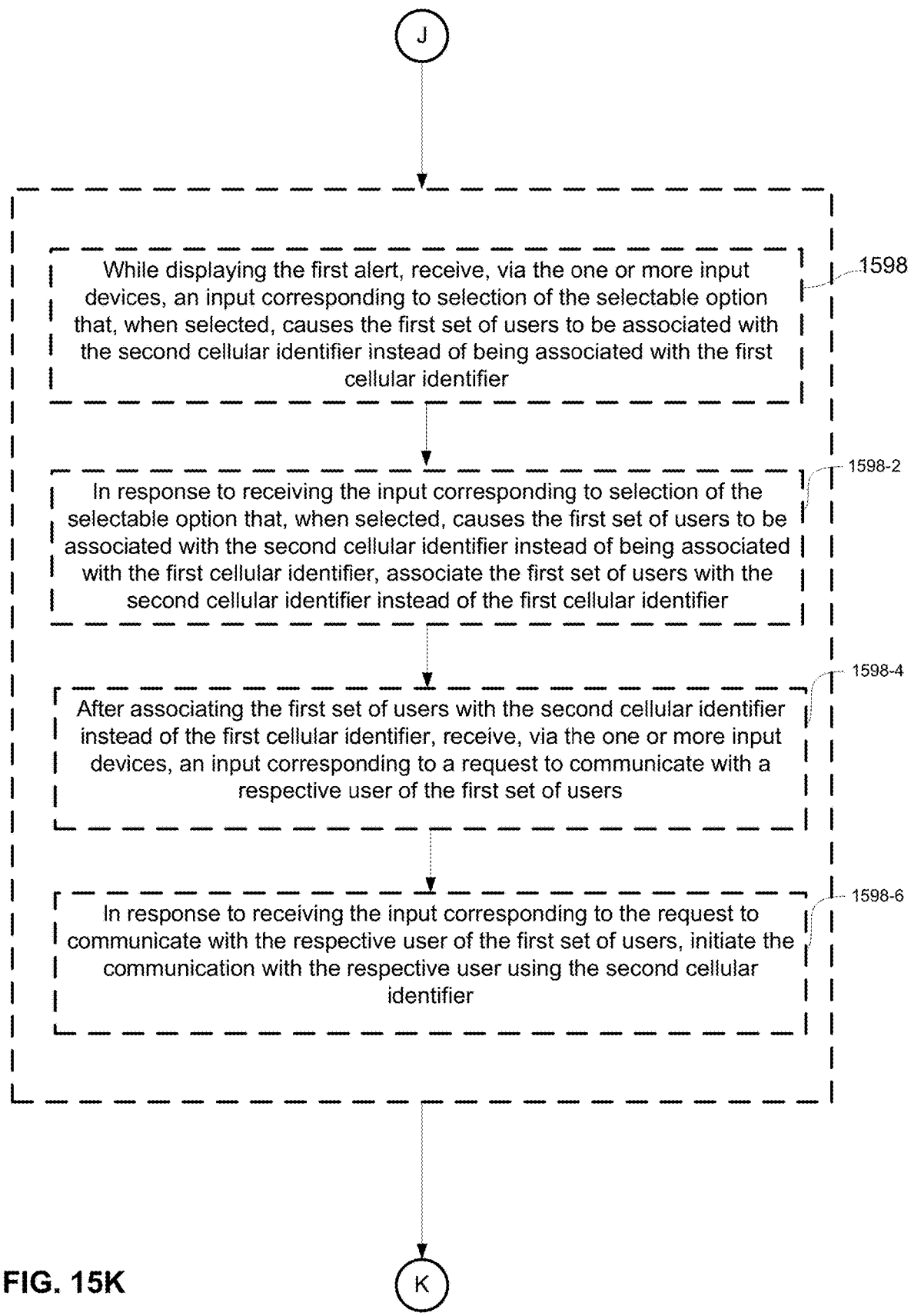
Figure 15L:
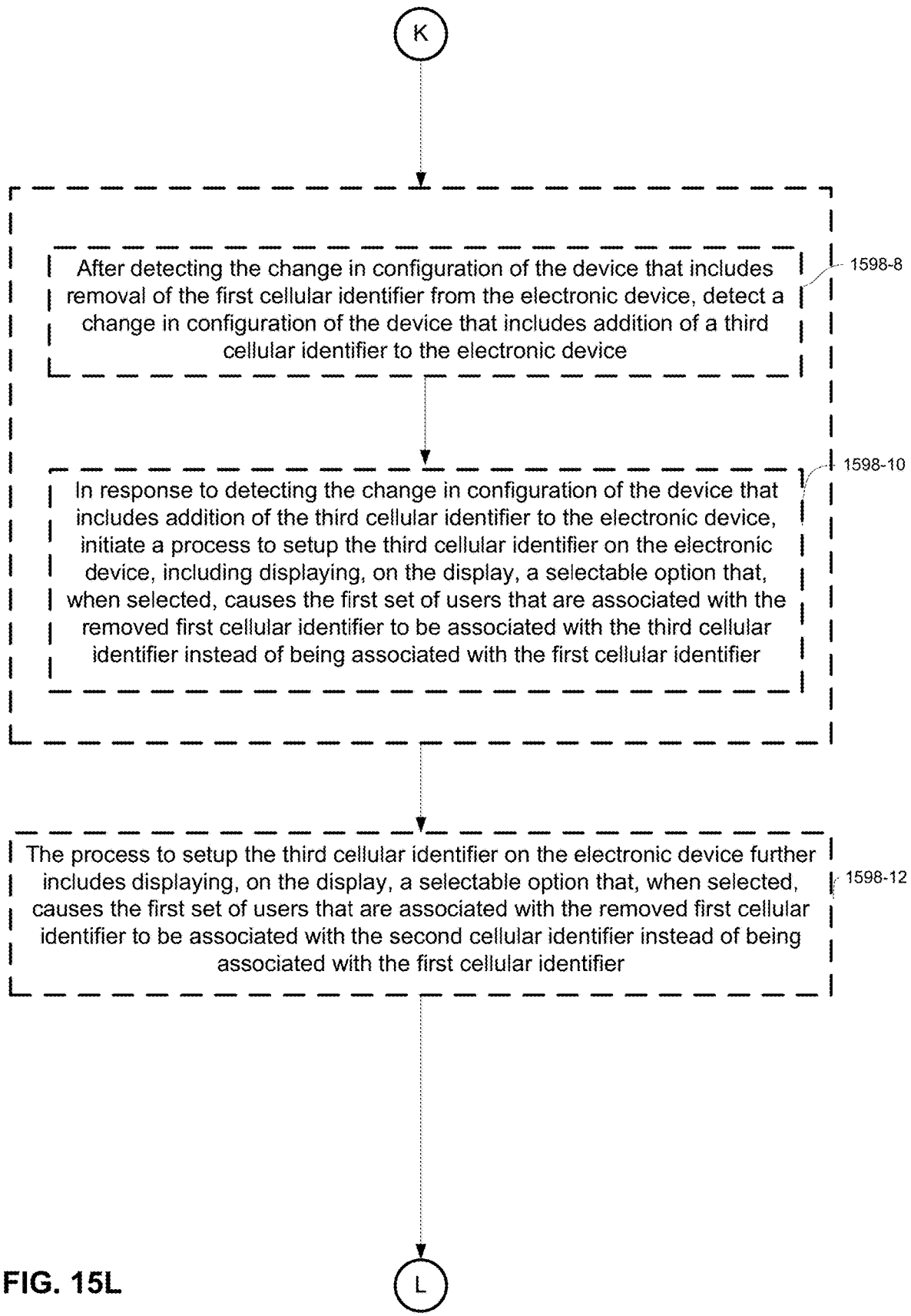
Figure 15M:
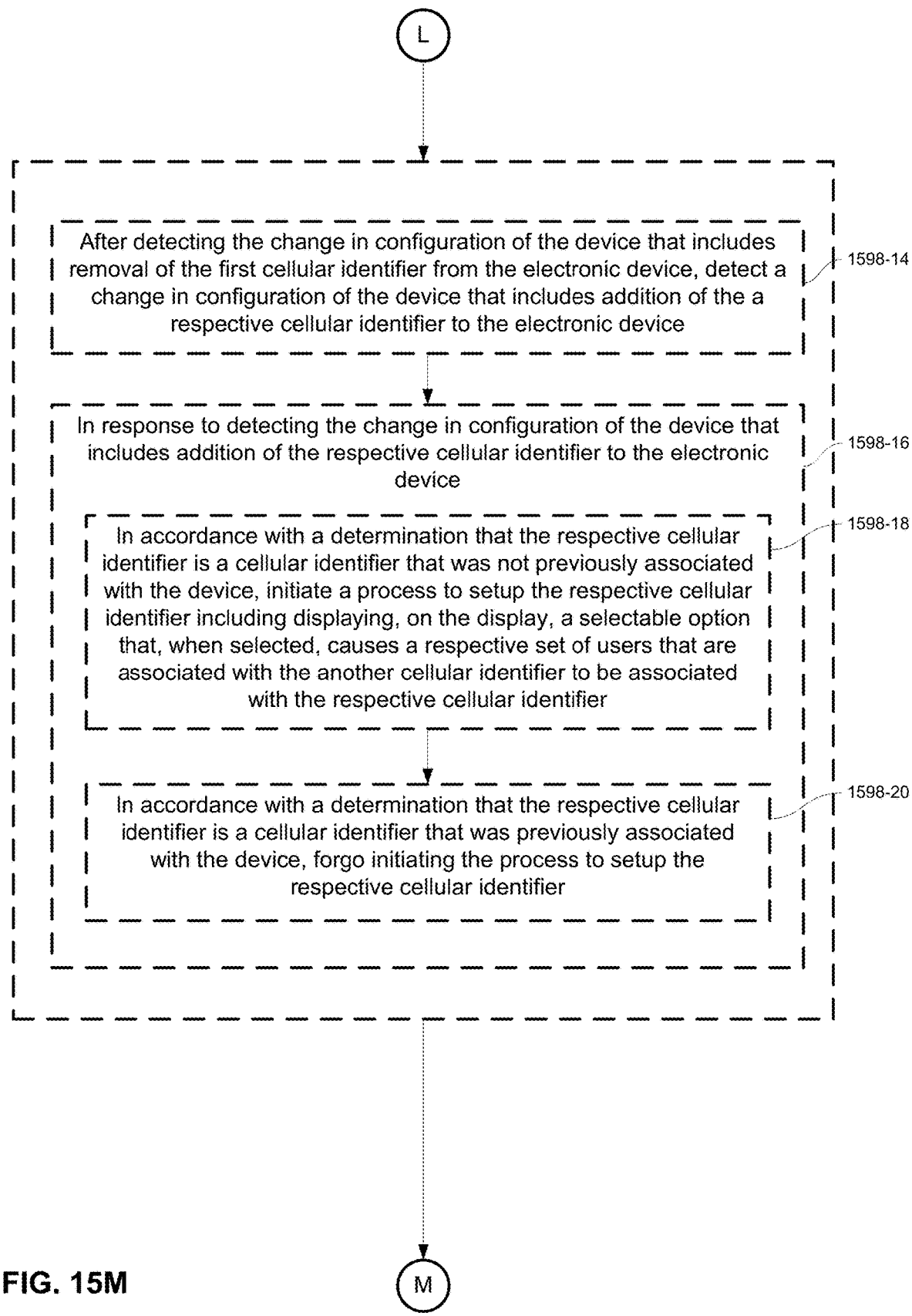
Figure 15N:
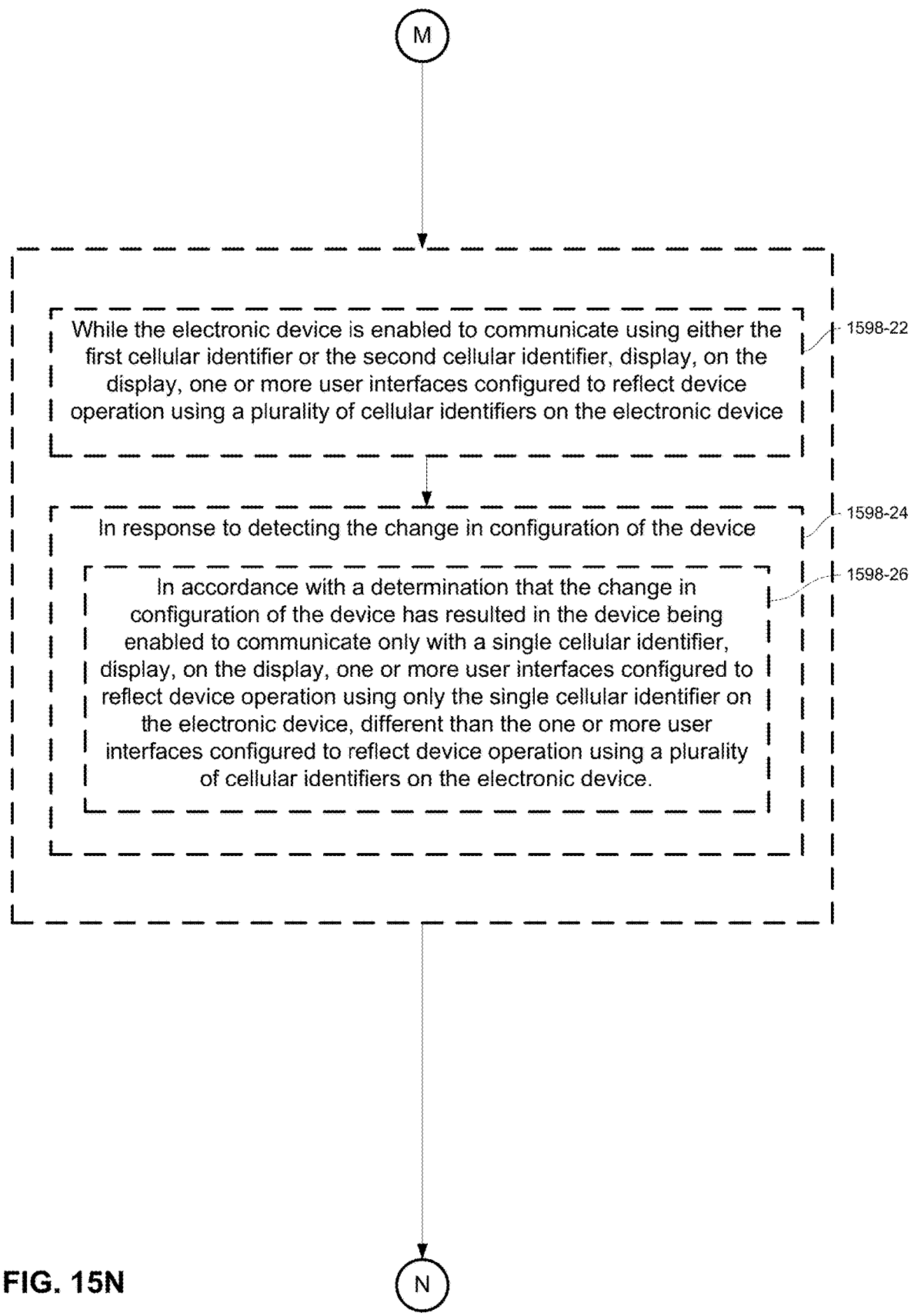
Figure 15O:
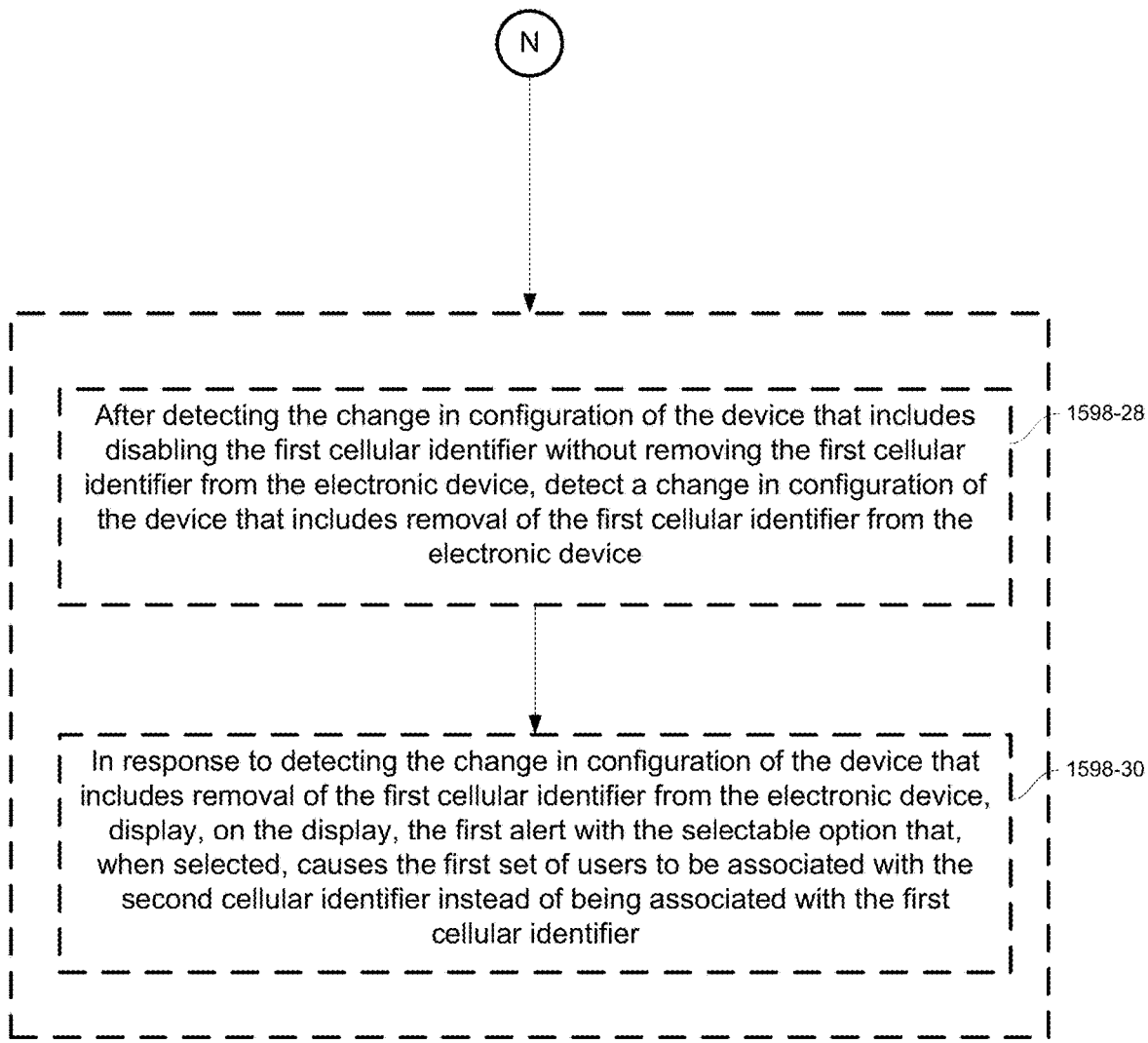

FIGS. 15A-15O are flow diagrams illustrating a method of presenting alerts related to previously-removed cellular identifiers in accordance with some embodiments of the disclosure. The method 1500 is optionally performed at an electronic device such as device 100, device 300, device 500, as described above with reference to FIGS. 1A-1B, 2-3, 4A-4B and 5A-5H. Some operations in method 1500 are, optionally combined and/or order of some operations is, optionally, changed.

As described below, the method 1500 provides ways to present alerts related to previously-removed cellular identifiers. The method reduces the cognitive burden on a user when interaction with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., electronic device 500) is in communication with a display and one or more input devices. The electronic device is enabled to communicate using either a first cellular identifier (e.g., a physical SIM such as a removable or permanent SIM card or eSIM) that is associated with a first set of users or a second cellular identifier that is associated with a second set of users, different from the first set of users. A cellular identifier is optionally associated with a first set of users when the electronic device is configured to use that particular cellular identifier to initiate a communication with each of the users in the set of users in response to a user input for initiating the communication absent a user input for using a different cellular identifier instead. The electronic device optionally detects (1502) a change in configuration of the device with respect to one or more cellular identifiers, such as in FIG. 14B. In some embodiments, one or more cellular identifiers are removed from the electronic device (e.g., a SIM card is physically removed from the device or an eSIM is deleted), disabled/deactivated from the electronic device, or reconfigured to perform a different subset of operations (e.g., a cellular identifier that had been the default number for phone and SMS is reconfigured for data only).

In some embodiments, in response to detecting the change in configuration of the device (e.g., in response to removing/deleting or disabling/deactivating a SIM or in response to reinserting a SIM tray after a SIM card has been removed from the SIM tray) with respect to the one or more cellular identifiers (1504), such as in FIG. 14B, in accordance with a determination that the change in configuration of the device includes removal of the first cellular identifier (e.g., the "Personal" cellular identifier) from the electronic device (e.g., removing a physical SIM card or deleting an eSIM or other virtual SIM), the electronic device displays (1506), on the display, a first alert 1406 with a selectable option 1408a that, when selected, causes the first set of users to be associated with the second cellular identifier instead of being associated with the first cellular identifier, such as in FIG. 14B. In some embodiments, the electronic device is configured to operate with a "Primary" cellular identifier and a "Secondary" cellular identifier. A first plurality of users is optionally associated with the "Primary" cellular identifier and a second plurality of users is optionally associated with the "Secondary" cellular identifier. In response to detecting that the "Secondary" cellular identifier has been removed from the electronic device, the electronic device presents an option to associate the second plurality of users with the "Primary" cellular identifier instead of being associated with the "Secondary" cellular identifier. After associating the second plurality of users with the "Primary" cellular identifier instead of the "Secondary" cellular identifier, the electronic device initiates communications with the second plurality of users with the "Primary" cellular identifier in response to a user input for initiating the communication absent a user input for using a different cellular identifier instead.

In some embodiments, in accordance with a determination that the change in configuration of the device includes removal of the second cellular identifier from the electronic device, such as in FIG. 14D (e.g., removing a physical SIM card or deleting an eSIM or other virtual SIM), the electronic device displays (1508), on the display, a second alert 1406 with a selectable option 1408a that, when selected, causes the second set of users to be associated with the first cellular identifier instead of being associated with the second cellular identifier, such as in FIG. 14E. For example, the electronic device is optionally configured to operate with a "Primary" cellular identifier and a "Secondary" cellular identifier. A first plurality of users is optionally associated with the "Primary" cellular identifier and a second plurality of users is optionally associated with the "Secondary" cellular identifier. In response to detecting that the "Primary" cellular identifier has been deleted from the electronic device, the electronic device presents an option to associate the first plurality of users with the "Secondary" cellular identifier instead of being associated with the "Primary" cellular identifier. After associating the first plurality of users with the "Secondary" cellular identifier instead of the "Primary" cellular identifier, the electronic device initiates communications with the first plurality of users with the "Secondary" cellular identifier in response to a user input for initiating the communication absent a user input for using a different cellular identifier instead. In some embodiments, a cellular identifier is "removed" from the electronic device when a physical SIM card is physically removed from the electronic device or when a virtual SIM or eSIM is deleted from the electronic device. In some embodiments, a cellular identifier is "disabled" or "deactivated" when the electronic device is configured not to use the cellular identifier without removing the physical SIM card or deleting an eSIM or virtual SIM. In some embodiments, the electronic device continues to store information about a cellular identifier (e.g., a list of contacts associated with the cellular identifier and other configuration settings) after the cellular identifier has been removed or deleted. In some embodiments, the electronic device ceases storing information about a deleted or removed cellular identifier when the information is deleted or removed from the electronic device. Information about cellular identifiers is stored, handled and deleted in a manner that protects the privacy of the user of the electronic device and in a manner that protects the cellular identifier information concerning the privacy of other users (e.g., one or more contacts stored on the cellular identifier). In some embodiments, when the electronic device detects removal of a cellular identifier configured as the primary cellular identifier, the primary phone cellular identifier, the primary data cellular identifier, or the cellular identifier associated with enhanced data-based instant messaging and/or video conference calls, the electronic device presents an alert that the functions of the removed cellular identifier will be performed with the cellular identifier that the electronic device continues to have access to.

The above-described manner of presenting an alert with the option to associate a set of users that was associated with the removed cellular identifier with a different cellular identifier allows the electronic device to use the different cellular identifier to perform operations that were previously performed with the removed cellular identifier (e.g., initiating communication with the set of users), which simplifies interactions between the user and the device and enhances operability of the device (e.g., associating the set of users with the different cellular identifier rather than requiring user input for using the different cellular identifier each time the electronic device initiates communication with the set of users), which, additionally, reduces power usage and improves battery life of the device by enabling the user to use the device more quickly and efficiently.

In some embodiments, the first alert 1406 includes an additional option 1408c that, when selected, declines to associate the first set of users with the second cellular identifier (e.g., a selectable affordance or button that when activated causes the device to dismiss the first alert without associating the first set of users with the second cellular identifier) such as in FIG. 14B, and the second alert 1406 includes an additional option 1408c that, when selected, declines to associate the second set of users with the first cellular identifier (1510), such as in FIG. 14E. In some embodiments, a selectable affordance or button that when activated causes the electronic device to dismiss the second alert without associating the second set of users with the first cellular identifier. In some embodiments, the electronic device later presents a cellular identifier settings user interface that includes an affordance or button that when selected causes the electronic device to associate a set of users that had been associated with a cellular identifier that has since been deleted from the electronic device with a different cellular identifier. For example, the electronic device is configured to operate with a "Primary" cellular identifier and a "Secondary" cellular identifier. The "Secondary" cellular identifier is optionally associated with a set of users when it is removed from the electronic device. The user optionally declines to associate the set of users with the "Primary" cellular identifier when the alert including the option to associate the set of users with the "Primary" cellular identifier is presented. Later, the user is able to navigate to the cellular settings user interface to select an affordance or button that when activated causes the electronic device to associate the set of users with the "Primary" cellular identifier, or with a different cellular identifier that the electronic device is configured to operate with.

The above-described manner of presenting an option to decline associating a set of users that was associated with a removed cellular identifier with a different cellular identifier allows the electronic device to save the association of the set of users with the removed cellular identifier, which simplifies interactions between the user and the device and enhances operability of the device (e.g., by maintaining the association between the set of users and the removed cellular identifier in the event the removed cellular identifier is re-introduced to the electronic device), which, additionally, reduces power usage and improves battery life of the device by enabling the user to use the device more quickly and efficiently.

In some embodiments, in response to detecting the change in configuration of the device with respect to the one or more cellular identifiers (1512), such as in FIG. 14O, in accordance with a determination that the change in configuration of the device includes disabling the first cellular identifier without removing the first cellular identifier from the electronic device (e.g., deactivating or disabling a physical SIM card without removing the physical SIM card or deactivating an eSIM or other virtual SIM without deleting the eSIM or virtual SIM), as indicated by the legend 1402 of FIG. 14P, the electronic device forgoes (1514) displaying, on the display, the first alert, such as in FIGS. 14O-14P. In some embodiments, the electronic device displays an alert without the selectable option to cause the first set of users to be associated with the second cellular identifier, or forgoes displaying an alert associated with deactivating the SIM. In some embodiments, the electronic device is able to later present a cellular identifier user interface with an affordance or button that when activated causes the electronic device to associate a set of users associated with the first cellular identifier with a different cellular identifier.

In some embodiments, in accordance with a determination that the change in configuration of the device includes disabling the second cellular identifier without removing the second cellular identifier from the electronic device (e.g., deactivating a physical SIM card without removing the physical SIM card or deactivating an eSIM or other virtual SIM without deleting the eSIM or virtual SIM), such as in FIG. 14W as indicated by legend 1402, the electronic device forgoes (1516) displaying, on the display, the second alert. In some embodiments, the electronic device displays an alert without the selectable option to cause the first set of users to be associated with the second cellular identifier, or forgoes displaying an alert associated with deactivating the cellular identifier. In some embodiments, the electronic device is able to later present a cellular identifier user interface with an affordance or button that when activated causes the electronic device to associate a set of users associated with the second cellular identifier with a different cellular identifier.

The above-described manner of forgoing the display of the option to associate the set of users that was associated with the disabled cellular identifier with a different cellular identifier allows the electronic device to prevent the user from accidentally deleting the association of the set of users with the disabled cellular identifier and maintain the association of users with the disabled cellular identifier such that the association will be in existence when the cellular identifier is enabled, which simplifies interactions between the user and the device and enhances operability of the device (e.g., by enhancing the efficiency of disabling/enabling cellular identifiers by not initiating changes in user-cellular identifier association each time the cellular identifiers are disabled/enabled), which, additionally, reduces power usage and improves battery life of the device by enabling the user to use the device more quickly and efficiently.

In some embodiments, after detecting the change in configuration of the device with respect to the one or more cellular identifiers (e.g., disabling or removing one or more cellular identifiers or configuring the electronic device to perform different functions with one or more cellular identifiers), wherein the change in configuration of the device with respect to the one or more cellular identifiers comprises removal of the first cellular identifier (e.g., removing a physical SIM card from the electronic device or deleting an eSIM or virtual SIM) without associating the first set of users with the second cellular identifier (e.g., the user does not select the selectable option of the first alert for associating the first set of users with the second cellular identifier), and while the first set of users is associated with the first cellular identifier, the electronic device displays (1518), on the display, a cellular settings user interface for the device such as in FIG. 14II. The cellular settings user interface optionally includes a selectable affordance 1404b associated with the first cellular identifier. In some embodiments, the cellular settings user interface includes one or more affordances or buttons associated with the cellular identifiers available to the electronic device, such as the second cellular identifier, and one or more affordances or buttons associated with the cellular identifiers that were previously deleted or removed from the electronic device, such as the first cellular identifier. In some embodiments, when activated, the affordances or buttons associated with cellular identifiers available to the electronic device cause the electronic device to present one or more settings associated with a respective cellular identifier, such as changing the label or indication of the respective cellular identifier, changing the functions performed with the respective cellular identifier, or the option to disable or remove the cellular identifier. In some embodiments, a previously-removed cellular identifier is no longer displayed in the cellular settings user interface in response to a determination that no users are associated with that removed cellular identifier (e.g., configuration information for that cellular identifier is deleted from the device).

In some embodiments, while displaying the cellular settings user interface, the electronic device receives (1520), via the one or more input devices, a sequence of one or more inputs (e.g., contact 1403) corresponding to the selectable affordance 1404*b* associated with the first cellular identifier, such as in FIG. 14II. In some embodiments, the electronic device detects, with a touch screen of the electronic device, a contact at a region of the touch screen including the selectable affordance or button. In some embodiments, the selection is made with a mouse, trackpad, or other pointing and selecting device, via a keyboard input, via a voice input, or via another input device.

In some embodiments, in response to receiving the sequence of one or more inputs, the electronic device displays (1522), on the display, a third alert 1466 with a selectable option 1468*a* that, when selected, causes the first set of users to be associated with the second cellular identifier instead of being associated with the first cellular identifier, such as in FIG. 14JJ. In some embodiments, the electronic device presents the option to associate the first set of users with the second cellular identifier instead of the first cellular identifier in the settings user interface separate from the first alert that was presented in response to detecting that the first cellular identifier was deleted from the electronic device. In response to an input selecting the option to associate the first set of users with the second cellular identifier, the first set of users are no longer associated with the first cellular identifier and are instead associated with the second cellular identifier.

The above-described manner of presenting an option in the settings user interface to associate the first set of users with the second cellular identifier allows the electronic device to be configured to use the second cellular identifier to initiate communication with the first set of users after the user declines to reconfigure the electronic device when the first cellular identifier is removed, which simplifies interactions between the user and the device and enhances operability of the device (e.g., allowing the user to change the configuration of the electronic device after the first cellular identifier was removed and using the second cellular identifier to initiate communication with the first set of users without requiring user input confirming that the second cellular identifier should be used each time communication is initiated), which, additionally, reduces power usage and improves battery life of the device by enabling the user to use the device more quickly and efficiently.

In some embodiments, the change in configuration of the device with respect to the one or more cellular identifiers comprises removal of the first cellular identifier without associating the first set of users with the second cellular identifier (1524), such as in FIG. 14D. Although the first cellular identifier is removed from the electronic device, the first set of users optionally continues to be associated with the first cellular identifier. That is to say, in some embodiments, the first cellular identifier is removed from the electronic device without the electronic device deleting or removing the first cellular identifier data.

In some embodiments, after detecting the change in configuration of the device with respect to the one or more cellular identifiers and while the first set of users is associated with the first cellular identifier, the electronic device detects (1526) addition of the first cellular identifier to the electronic device, such as in FIG. 14U. In some embodiments, the physical SIM is re-inserted into the electronic device or the eSIM or virtual SIM is re-activated on the electronic device.

In some embodiments, after detecting the addition of the first cellular identifier to the electronic device, the electronic device receives (1528), via the one or more input devices, an input (e.g., contact 1403) corresponding to a request to communicate with a respective user of the first set of users (e.g., an input for making a phone call or video conference call, sending a message, etc. absent further input selecting a cellular identifier other than the first cellular identifier associated with the respective user/first set of users to initiate the communication), such as in FIG. 14U.

In some embodiments, in response to receiving the input, the electronic device initiates (1530) communication with the respective user of the first set of users using the first cellular identifier, such as in FIG. 14V. In some embodiments, the first set of users remains associated with the first cellular identifier and when the first cellular identifier is added to the electronic device after having been removed from the electronic device, the first cellular identifier is used to initiate communication with the first set of users absent a user input for using a different cellular identifier to initiate the communication. In some embodiments, the electronic device does not require reconfiguration for the first set of users to remain associated with the first cellular identifier when the first cellular identifier is added to the electronic device after having been removed from the electronic device.

The above-described manner of continuing to associate the first set of users with the first cellular identifier after the first cellular identifier was removed from the electronic device and added to the electronic device after having been removed allows the electronic device to use the first cellular identifier to initiate communication with the first set of users when it is added to the electronic device without requiring further user inputs configuring the first cellular identifier or the first set of users, which simplifies interactions between the user and the device and enhances operability of the device (e.g., reducing the number of inputs required to continue to use the first cellular identifier in the same manner in which it was used before it was removed and added to the electronic device again), which, additionally, reduces power usage and improves battery life of the device by enabling the user to use the device more quickly and efficiently.

In some embodiments, after detecting the change in configuration of the device with respect to the one or more cellular identifiers, the electronic device receives (1532), via the one or more input devices, an input corresponding to a request to communicate with a respective user (e.g., an input for initiating a communication such as a phone call, a video conference, a message, etc), such as in FIG. 14F.

In some embodiments, in response to receiving the input (1534) such as in FIG. 14F, in accordance with a determination that the change in configuration of the device with respect to the one or more cellular identifiers comprises removal of the first cellular identifier without associating the first set of users with the second cellular identifier (1536), such as in FIG. 14E (e.g., the first cellular identifier is removed), in accordance with a determination that the respective user is in the first set of users, the electronic device displays (1538), on the display, an alert 1416 that indicates that communication with the respective user will use the second cellular identifier instead of using the first cellular identifier, wherein the alert includes a selectable option 1418c that, when selected, cancels the communication with the respective user, such as in FIG. 14G. For example, a physical SIM is removed from the electronic device or an eSIM or virtual SIM is deleted. Although the first cellular identifier is removed from the electronic device, the first set of users optionally remains associated with the first cellular identifier, because the user of the device did not initiate association of the first set of users with the second cellular identifier instead of the first cellular identifier.

In some embodiments, if the first cellular identifier was deleted or removed from the electronic device, the alert includes selectable affordances or buttons that when activated cause the electronic device to initiate communication with the second cellular identifier and for canceling the communication. In response to selection of the affordance or button that when activated causes the electronic device to initiate the communication with the second cellular identifier, the electronic device optionally presents an affordance or button that when activated causes the electronic device to initiate the communication with the second cellular identifier and associate the respective user with the second cellular identifier, and an affordance or button that when activated causes the electronic device to initiate the communication with the second cellular identifier without associating the respective user with the second cellular identifier. If the first cellular identifier is disabled on the electronic device (e.g., as opposed to being removed or deleted from the electronic device), the electronic device optionally concurrently presents an affordance or button that when activated causes the electronic device to enable the first cellular identifier with the affordance or button that when activated causes the electronic device to initiate the communication with the second cellular identifier and the affordance or button that when activated causes the electronic device to cancel initiation of the communication. In some embodiments, the alert warns the user that the respective user will possibly be able to see the number associated with the second cellular identifier if the second cellular identifier is used to initiate the communication.

In some embodiments, in accordance with a determination that the respective user is in the second set of users (e.g., the user is associated with the second cellular identifier), the electronic device initiates (1540) the communication with the respective user using the second cellular identifier without displaying the alert that indicates that communication with the respective user will use the second cellular identifier instead of using the first cellular identifier (e.g., by default, communication with the second set of users is performed with the second cellular identifier absent a user input for using a different cellular identifier, such as in FIGS. 14U-V.

The above-described manner of presenting an alert that the second cellular identifier will be used to initiate communication with a respective user in the first set of users allows the electronic device to prevent the user from unintentionally exposing the phone number of the second cellular identifier to the first set of users, which simplifies interactions between the user and the device and enhances operability of the device, which, additionally, reduces power usage and improves battery life of the device by enabling the user to use the device more quickly and efficiently.

In some embodiments, the respective user is in the first set of users (1542), such as in FIG. 14J. In some embodiments, in response to receiving the input (e.g., selection of affordance 1412c with contact 1403 in FIG. 14J) corresponding to the request to communicate with the respective user (1544) such as in FIG. 14J, in accordance with the determination that the change in configuration of the device with respect to the one or more cellular identifiers comprises removal of the first cellular identifier without associating the first set of users with the second cellular identifier (1546) such as in FIG. 14E (e.g., physical removal of a SIM card from the electronic device or deletion of an eSIM or virtual SIM from the electronic device), in accordance with a determination that the respective user is associated with the first cellular identifier based on a setting for the respective user that indicates that the respective user is associated with a cellular identifier last-used to communicate with the respective user (1548) such as in FIG. 14J, the electronic device initiates (1550) the communication with the respective user using the second cellular identifier, such as in FIG. 14L. In some embodiments, the electronic device is configured to initiate communication with the respective user using the cellular identifier that was last used for an incoming or outgoing communication with the respective user, and the cellular identifier that was last used is the first cellular identifier. The first set of users optionally remains associated with the first cellular identifier although the first cellular identifier is removed from the electronic device. If, however, the first cellular identifier is merely disabled on the first electronic device, a different result occurs in some embodiments, as will be described below. In some embodiments, prior to initiating the communication, the electronic device presents an alert 1426 indicating that the second cellular identifier will be used to initiate the communication instead of using the first cellular identifier. The alert 1426 optionally includes an affordance or button 1428c that when activated causes the electronic device to cancel the initiation of the communication, such as in FIG. 14K.

In some embodiments, the electronic device associates (1552) the respective user with the second cellular identifier instead of the first cellular identifier, such as in FIG. 14M. In some embodiments, if the user does not cancel initiation of the communication, the electronic device initiates the communication with the second cellular identifier and associates the respective user with the second cellular identifier without presenting the options to associate the respective user with the second cellular identifier or to use the second cellular identifier without associating the respective user with the second cellular identifier.

The above-described manner of associating the respective user with the second cellular identifier when initiating the communication with the second cellular identifier in accordance with a determination that the user is associated with a last-used cellular identifier and when confirmed by the user allows the electronic device to warn the user that the phone number of the second cellular identifier will be exposed to the respective user once without requiring further user input to continue to use the second cellular identifier when initiating communication with the respective user thereafter, which simplifies interactions between the user and the device and enhances operability of the device (e.g., by reducing the number of inputs required to use the second cellular identifier to communicate with the respective user), which, additionally, reduces power usage and improves battery life of the device by enabling the user to use the device more quickly and efficiently.

In some embodiments, the respective user is in the first set of users (1554), such as in FIG. 14F. In some embodiments, the respective user is associated with the first cellular identifier. In some embodiments, in response to receiving the input corresponding to the request to communicate with the respective user (1556) such as in FIG. 14F (e.g., an input for initiating a phone call, video conference, message, etc), in accordance with the determination that the change in configuration of the device with respect to the one or more cellular identifiers comprises removal of the first cellular identifier without associating the first set of users with the second cellular identifier (1558) such as in FIG. 14E (e.g., removal of a physical SIM from the electronic device or deletion of an eSIM or virtual SIM from the electronic device), in accordance with a determination that the respective user is associated with the first cellular identifier based on a setting for the respective user that indicates that the respective user is associated with the first cellular identifier independent of which cellular identifier was last-used to communicate with the respective user, such as in FIG. 14J, the electronic device displays (1560), on the display (e.g., in the alert that indicates that communication with the respective contact will use the second cellular identifier instead of using the first cellular identifier, or in a subsequent alert that is presented in response to an input to use the second cellular identifier to initiate the communication): a selectable option 1428a that, when selected, initiates the communication with the respective user using the second cellular identifier and associates the respective user with the second cellular identifier instead of the first cellular identifier (1562), as shown in FIG. 14K.

The first set of users optionally remains associated with the first cellular identifier although the first cellular identifier has been removed from the electronic device. In some embodiments, a different result occurs if the first cellular identifier is merely disabled, rather than being removed from the electronic device, as will be described below. The electronic device is optionally configured to, by default, initiate communication with the respective user using the first cellular identifier absent a user input for using a different cellular identifier to communicate with the respective user, regardless of which cellular identifier was last-used to communicate with the respective user. In some embodiments, the electronic device initiates the communication with the second cellular identifier and the electronic device is reconfigured to use the second cellular identifier to initiate communication with the respective user absent further input to use a different cellular identifier.

The electronic device optionally displays a selectable option that, when selected, initiates the communication with the respective user using the second cellular identifier without associating the respective user with the second cellular identifier (1564). Although in the example illustrated in FIG. 14K, the alert 1426 does not include an option to use the second cellular identifier without associating the respective contact with the second cellular identifier, in some embodiments, alert 1426 includes a selectable option similar to selectable option 1422b illustrated in FIG. 14H. In some embodiments, the electronic device initiates the communication with the second cellular identifier and the respective user remains associated with the first cellular identifier.

The above-described manner of presenting options for using the second cellular identifier to initiate communication with the respective contact allows the electronic device to warn the user that the phone number associated with the second cellular identifier will be exposed to the respective user and provide options to reduce the number of inputs required to use the second cellular identifier for subsequent initiations of communication with the respective user or to remain configured to use the first cellular identifier to initiate communication with the respective user in the event the first cellular identifier is added to the electronic device again, which simplifies interactions between the user and the device and enhances operability of the device, which, additionally, reduces power usage and improves battery life of the device by enabling the user to use the device more quickly and efficiently.

In some embodiments, in response to receiving the input corresponding to the request to communicate with the respective user (1566) such as contact 1403 in FIG. 14F (e.g., an input for initiating a phone call, a video conference call, or to send a message): in accordance with the determination that the change in configuration of the device with respect to the one or more cellular identifiers comprises removal of the first cellular identifier without associating the first set of users with the second cellular identifier (1568) such as in FIG. 14E (e.g., removal of a physical SIM from the electronic device or deletion of an eSIM or virtual SIM), in accordance with a determination that a plurality of cellular identifiers, including the second cellular identifier and a third cellular identifier, are available for communication on the electronic device (1570) such as indicated by legend 1402 of FIG. 14G, the electronic device displays (1572), on the display a selectable option 1418a corresponding to initiating the communication using the second cellular identifier (1574) such as in FIG. 14G; and a selectable option 1418b corresponding to initiating the communication using the third cellular identifier (1576) such as in FIG. 14G.

Although the first cellular identifier is removed from the electronic device, the first set of users optionally remains associated with the first cellular identifier. In some embodiments, when the first cellular identifier is disabled on the electronic device, rather than being removed, a different result occurs, as will be described below. In some embodiments, when only one cellular identifier (e.g., only the second cellular identifier or only the third cellular identifier) is available for communication on the electronic device, the electronic device behaves differently than described below.

In some embodiments, the selectable option to initiate the communication with the second cellular identifier and the selectable option to initiate the communication with the third cellular identifier are displayed concurrently with a selectable option that when activated causes the electronic device to cancel the initiation of the communication. In some embodiments, these selectable options are presented together in a pop-up alert that is presented in response to the input for initiating the communication with the user. If only one cellular identifier is available for communication on the electronic device, the electronic device optionally does not present options to initiate the communication with two cellular identifiers, and instead presents one or more options for initiating the communication with the available cellular identifier, as described herein.

In some embodiments, while displaying the selectable option 1418a corresponding to initiating the communication using the second cellular identifier and the selectable option 1418b corresponding to initiating the communication using the third cellular identifier as shown in FIG. 14G, the electronic device receives (1578), via the one or more input devices, an input (e.g., contact 1403) corresponding to selection of the selectable option 1418a corresponding to initiating the communication using the second cellular identifier, such as in FIG. 14G. In some embodiments, the electronic device detects a contact on a touch screen selecting the option for initiating the communication using the second cellular identifier. In some embodiments, the input is received via a mouse, trackpad, keyboard, voice input interface, or another input device in communication with the electronic device.

In some embodiments, in response to receiving the input corresponding to selection of the selectable option 1418a corresponding to initiating the communication using the second cellular identifier (1580) such as in FIG. 14G, the electronic device displays (1582), on the display: a selectable option 1422a that, when selected, initiates the communication with the respective user using the second cellular identifier and associates the respective user with the second cellular identifier instead of the first cellular identifier (1584) such as in FIG. 14H. The electronic device optionally displays a selectable option 1422b that, when selected, initiates the communication with the respective user using the second cellular identifier without associating the respective user with the second cellular identifier (1586) such as in FIG. 14H.

In some embodiments, the electronic device uses the second cellular identifier to initiate the communication, but the respective user remains associated with the first cellular identifier. In some embodiments, the selectable option that when activated causes the electronic device to initiate communication with the second cellular identifier and associate the respective user with the second cellular identifier instead of the first cellular identifier and the selectable option that when activated causes the electronic device to initiate the communication using the second cellular identifier without associating the respective user with the second cellular identifier are concurrently displayed in a second alert that is presented in response to detecting the selection of the selectable option that when activated causes the electronic device to initiate the communication using the second cellular identifier. The second alert optionally further includes a selectable option that when activated causes the electronic device to cancel the initiation of the communication with the second cellular identifier. If, rather than detecting selection of the option that when selected causes the electronic device to initiate the communication with the second cellular identifier, the electronic device detects selection of the option that when activated causes the electronic device to initiate the communication with the third cellular identifier, in some embodiments, the electronic device presents a third alert that includes an option that when activated causes the electronic device to use the third cellular identifier to initiate the communication and associate the respective user with the third cellular identifier and an option that when activated causes the electronic device to use the third cellular identifier to initiate the communication without associating the respective user with the third cellular identifier. The third alert optionally further includes an option to cancel initiation of the communication with the third cellular identifier.

The above-described manner of presenting the user with options for initiating communication with the respective user using a second cellular identifier or a third cellular identifier and then presenting options for using the selected cellular identifier with or without associating the respective user with the selected cellular identifier allows the electronic device to warn the user that the phone number of the selected cellular identifier will be exposed to the respective user and to present options for which cellular identifier to use and whether or not to associate the respective contact with the selected cellular identifier separately which simplifies interactions between the user and the device and enhances operability of the device (e.g., by reducing the number of decisions the user needs to make at once), which, additionally, reduces power usage and improves battery life of the device by enabling the user to use the device more quickly and efficiently.

In some embodiments, in response to receiving the input (e.g., contact 1403 in FIG. 14X) corresponding to the request to communicate with the respective user (1588) (e.g., an input for initiating a phone call, video conference call, message, etc.) such as in FIGS. 14W-X, in accordance with a determination that the change in configuration of the device includes disabling the first cellular identifier without removing the first cellular identifier from the electronic device, as indicated by legend 1402 of FIG. 14X, and without associating the first set of users with the second cellular identifier (1590) such as in FIG. 14W, in accordance with a determination that the respective user is in the first set of users, the electronic device displays (1592), on the display, a selectable option 1446b that, when selected, enables the first cellular identifier such as in FIG. 14Y.

In some embodiments, the electronic device is configured not to use the first cellular identifier, though the first cellular identifier remains accessible to the device. For example, a physical SIM remains inserted in the electronic device or an eSIM or virtual SIM remains accessible to the device (e.g., not removed or deleted). The first set of users optionally remains associated with the first cellular identifier, although it is disabled on the electronic device. The electronic device optionally initiates the communication with the respective contact using the first cellular identifier. In some embodiments, the selectable option that, when activated, causes the electronic device to enable the first cellular identifier is part of the alert that indicates that the communication will be initiated with the second cellular identifier. The alert optionally further includes a selectable option that, when activated, causes the electronic device to initiate the communication with the second cellular identifier.

The above-described manner of presenting an option for re-activating the first cellular identifier when warning the user that the phone number of the second cellular identifier will be exposed to the respective user if the second cellular identifier is used to initiate communication with the respective user allows the electronic device to be reconfigured to use the first cellular identifier to initiate the communication with the respective user, which simplifies interactions between the user and the device and enhances operability of the device (e.g., providing the user with an option to avoid exposing the phone number of the second cellular identifier when initiating communication with the respective user in the user interface for initiating the communication with the respective user), which, additionally, reduces power usage and improves battery life of the device by enabling the user to use the device more quickly and efficiently.

In some embodiments, the input corresponding to the request to communicate with the respective user comprises an input corresponding to a request to initiate a phone call with the respective user (1594), such as selection (e.g., with contact 1403) of affordance 1438a in FIG. 14U. In some embodiments, the input is the selection of a missed call from the respective user, selection of an affordance or button in the respective user's profile that, when activated, causes an electronic device to initiate a phone call with the respective user, or a voice input for initiating the phone call. One of the selections is optionally made via a touchscreen, mouse, trackpad, keyboard shortcut, etc. The voice input is optionally detected while the electronic device presents a digital assistant user interface or while the electronic device presents a communication user interface (e.g., phone user interface, missed calls user interface, contact card user interface, etc).

The above-described manner of presenting the alert in response to an input for initiating a phone call with the respective user allows the electronic device to warn the user about the potential of exposure of the phone number of the second cellular identifier when making phone calls, which simplifies interactions between the user and the device and enhances operability of the device (e.g., preventing accidental exposure of the phone number of the second cellular identifier to the respective user when the electronic device initiates a phone call to the respective user), which, additionally, reduces power usage and improves battery life of the device by enabling the user to use the device more quickly and efficiently.

In some embodiments, the input corresponding to the request to communicate with the respective user comprises interaction with a messaging conversation with the respective user (1596), such as in FIG. 14X. In some embodiments, the input is selection of a text entry field in a messaging user interface, selection of a conversation in a conversation history user interface, selection of a "send" affordance or button in a messaging user interface after entry of text that, when activated, causes the electronic device to send the message, selection of an affordance or button in a user profile of the respective user that, when activated, causes the electronic device to send a message to the respective user, or a voice input for sending a message. One of the selections is optionally made via a touchscreen, mouse, trackpad, keyboard shortcut, etc. The voice input is optionally detected while the electronic device presents a digital assistant user interface or while the electronic device presents a communication user interface (e.g., messaging user interface, conversation history user interface, contact card user interface, etc).

The above-described manner of presenting the alert in response to an interaction with a messaging conversation with the respective user allows the electronic device to warn the user about the potential exposure of the phone number of the second cellular identifier when initiating messaging communications, which simplifies interactions between the user and the device and enhances operability of the device (e.g., preventing accidental exposure of the phone number of the second cellular identifier to the respective user when the electronic device initiates a message to the respective user), which, additionally, reduces power usage and improves battery life of the device by enabling the user to use the device more quickly and efficiently.

In some embodiments, while displaying the first alert, the electronic device receives (1598), via the one or more input devices, an input corresponding to selection of the selectable option that, when selected, causes the first set of users to be associated with the second cellular identifier instead of being associated with the first cellular identifier.

As illustrated in FIGS. 14FF-HH, in some embodiments, in response to receiving the input corresponding to selection (e.g., with contact 1403) of the selectable option 1464*a* that, when selected, causes the first set of users to be associated with the second cellular identifier instead of being associated with the first cellular identifier, the electronic device associates (1598-2) the first set of users with the second cellular identifier instead of the first cellular identifier. In some embodiments, when the first set of users are associated with the second cellular identifier instead of the first cellular identifier, for each user in the first set of users, the electronic device is configured to initiate communication with each of the users using the second cellular identifier, instead of the first cellular identifier, absent a user input for using a different cellular identifier to initiate the communication.

In some embodiments, after associating the first set of users with the second cellular identifier instead of the first cellular identifier, the electronic device receives (1598-4), via the one or more input devices, an input corresponding to a request to communicate with a respective user of the first set of users (e.g., an input for initiating a phone call, video conference call, message, or other form of communication), such as selection (e.g., with contact 1403) of affordance 1412*a* in FIG. 14GG. The input is optionally detected using a touch screen, mouse, keyboard, trackpad, microphone, etc. in communication with the electronic device.

In some embodiments, in response to receiving the input corresponding to the request to communicate with the respective user of the first set of users, the electronic device initiates (1598-6) the communication with the respective user using the second cellular identifier, such as in FIG. 14HH. In some embodiments, the electronic device performs the communication function using the second cellular identifier by default.

The above-described manner of using the second cellular identifier to initiate communication with the first set of contacts after associating the first set of users with the second cellular identifier allows the electronic device to initiate communication with the first set of contacts without requiring further input from the user confirming that the second cellular identifier is to be used to initiate the communication, which simplifies interactions between the user and the device and enhances operability of the device (e.g., by reducing the number of inputs required to initiate communication with the first set of contacts), which, additionally, reduces power usage and improves battery life of the device by enabling the user to use the device more quickly and efficiently.

In some embodiments, after detecting the change in configuration of the device that includes removal of the first cellular identifier from the electronic device (e.g., deactivation of the first cellular identifier, removal of a physical SIM, deletion of an eSIM or virtual SIM, etc), the electronic device detects (1598-8) a change in configuration of the device that includes addition of a third cellular identifier to the electronic device (e.g., insertion of a new physical SIM into the electronic device, activation or configuration of an eSIM or virtual SIM, etc), such as in FIG. 14Z. In some embodiments, the third cellular identifier is a cellular identifier that has never been added to the electronic device before. In some embodiments, the third cellular identifier is a cellular identifier that was previously added to the device, but has since been removed from the device and has had all of its associated configuration information deleted from the device (e.g., including associating all users away from that cellular identifier).

In some embodiments, in response to detecting the change in configuration of the device that includes addition of the third cellular identifier to the electronic device, the electronic device initiates (1598-10) a process to setup the third cellular identifier on the electronic device (e.g., such as one or more processes described above with reference to method 700), including displaying, on the display, a selectable option 1456*b* that, when selected, causes the first set of users that are associated with the removed first cellular identifier to be associated with the third cellular identifier instead of being associated with the first cellular identifier, such as in FIG. 14CC. In some embodiments, the first set of users were not associated with the second cellular identifier instead of the first cellular identifier when the first cellular identifier was removed from the electronic device. In such circumstances, when the new cellular identifier is added to the device, the device prompts the user to associate (or not) the first set of users with the new cellular identifier, thus facilitating re-association of the first set of users with a cellular identifier available on the device. For example, the user is able to remove a "Business" cellular identifier from the electronic device and associate a set of users that were previously associated with the "Business" cellular identifier with a new "Secondary" cellular identifier added to the electronic device. Later, the user is able to remove the "Secondary" cellular identifier from the electronic device and associate the set of users with a new cellular identifier added to the electronic device. In this way, the electronic device is able to continue to communicate with the set of users as cellular identifiers are added to and subsequently removed from the electronic device.

The above-described manner of presenting the option to associate the first set of users that were associated with the removed first cellular identifier with the third cellular identifier allows the electronic device to be configured to use the third cellular identifier to initiate communication with the first set of users without requiring input from the user confirming that the third cellular identifier should be used each time a communication is initiated with one of the first set of users, which simplifies interactions between the user and the device and enhances operability of the device (e.g., requiring fewer inputs to initiate communication with the first set of users, and facilitating re-association of the first set of users with an available cellular identifier), which, additionally, reduces power usage and improves battery life of the device by enabling the user to use the device more quickly and efficiently.

In some embodiments, the process to setup the third cellular identifier on the electronic device further includes displaying, on the display, a selectable option 1456*a* that, when selected, causes the first set of users that are associated with the removed first cellular identifier to be associated with the second cellular identifier instead of being associated with the first cellular identifier (1598-12), such as in FIG. 14CC. In some embodiments, the electronic device concurrently displays a selectable option that, when activated, causes the electronic device to associate the first set of users with the second cellular identifier with the selectable option that, when activated, causes the electronic device to associate the first set of users with the third cellular identifier. Thus the addition of the new cellular identifier to the device optionally triggers a process via which the first set of users is able to be associated with another available cellular identifier (whether new or existing).

The above-described manner of presenting the option to associate the first set of users with the second cellular identifier while presenting the option to associate the first set of users with the new third cellular identifier allows the electronic device to present to the user all of the available options for configuring the electronic device to initiate communication with the first set of users without the first cellular identifier and without further user input confirming which cellular identifier to use each time communication is initiated with the first set of users, which simplifies interactions between the user and the device and enhances operability of the device (e.g., reducing the number of inputs required to associate the first set of contacts with a chosen cellular identifier and subsequently reducing the number of inputs required to initiate communication with the first set of users), which, additionally, reduces power usage and improves battery life of the device by enabling the user to use the device more quickly and efficiently.

In some embodiments, after detecting the change in configuration of the device that includes removal of the first cellular identifier from the electronic device (e.g., removal of a physical SIM from the electronic device, deletion of an eSIM or virtual SIM from the electronic device), the electronic device detects (1598-14) a change in configuration of the device that includes addition of a respective cellular identifier to the electronic device, such as in FIG. 14U. In some embodiments, a previously-removed cellular identifier (e.g., the first cellular identifier) is reintroduced to the electronic device. For example, a physical SIM is optionally reinserted in the electronic device, an eSIM or virtual SIM is reconfigured on the electronic device. In some embodiments, the re-addition of the first cellular identifier occurs while the configuration information for the first cellular identifier is still stored on the device, and not deleted from the device.

In some embodiments, in response to detecting the change in configuration of the device that includes addition of the respective cellular identifier to the electronic device (1598-16), in accordance with a determination that the respective cellular identifier is a cellular identifier that was not previously associated with the device (e.g., a new cellular identifier or cellular identifier that was previously deleted from the device and for which the cellular identifier data was deleted from the electronic device), the electronic device initiates (1598-18) a process to setup the respective cellular identifier including displaying, on the display, a selectable option 1456*b* that, when selected, causes a respective set of users that are associated with the another cellular identifier (e.g., a previously-removed cellular identifier, such as the first cellular identifier) to be associated with the respective cellular identifier such as in FIG. 14CC.

In some embodiments, in accordance with a determination that the respective cellular identifier is a cellular identifier that was previously associated with the device such as in FIG. 14U, the electronic device forgoes (1598-20) initiating the process to setup the respective cellular identifier (e.g., rather than presenting the setup process described with reference to method 700). In some embodiments, the electronic device configures a previously-added cellular identifier, such as the first cellular identifier with the same settings that were configured when the cellular identifier was last available to the electronic device. In some embodiments, this configuration includes continuing to associate the first set of users with the first cellular identifiers if they were not associated with a different cellular identifier when the first cellular identifier was removed from the electronic device.

The above-described manner of forgoing the process to setup the first cellular identifier when it is re-added to the electronic device allows the electronic device to use the first cellular identifier with the same configuration that was used before the first cellular identifier was removed from the electronic device, which simplifies interactions between the user and the device and enhances operability of the device (e.g., reducing the number of inputs needed to use the first cellular identifier when it is re-added to the electronic device), which, additionally, reduces power usage and improves battery life of the device by enabling the user to use the device more quickly and efficiently.

In some embodiments, while the electronic device is enabled to communicate using either the first cellular identifier or the second cellular identifier (e.g., the first cellular identifier and the second cellular identifier are both active on the electronic device for use during data and/or communication operations), the electronic device displays (1598-22), on the display, one or more user interfaces configured to reflect device operation using a plurality of cellular identifiers on the electronic device, such as in FIG. 14U. In some embodiments, the user interfaces include indications of the multiple respective cellular identifiers that are used to perform various communication operations on the electronic device, such as described above with reference to method 1100. For example, a recent calls user interface includes indications of which cellular identifier was used for each recent call. As another example, a contact card of a respective contact includes an indication of the cellular identifier associated with the respective contact. In some embodiments, the user interfaces include a status bar that indicates the status of each of a plurality of cellular identifiers currently available to the electronic device, such as described above with reference to method 1300.

In some embodiments, in response to detecting the change in configuration of the device (1598-24), in accordance with a determination that the change in configuration of the device has resulted in the device being enabled to communicate only with a single cellular identifier such as in FIG. 14T (e.g., only one cellular identifier remains active on the electronic device for use during data and/or communication operations), the electronic device displays (1598-26), on the display, one or more user interfaces configured to reflect device operation using only the single cellular identifier on the electronic device, different than the one or more user interfaces configured to reflect device operation using a plurality of cellular identifiers on the electronic device, such as in FIG. 14T. In some embodiments, the user interfaces are updated to exclude displaying the indications of the cellular identifier used to perform various operations (e.g., the user interfaces are no longer configured for multiple-cellular identifier operation). For example, a recent calls user interface includes indications of recent calls that do not include indications of the cellular identifier used for each call. As another example, a contact card of a respective contact does not include an indication of a cellular identifier associated with the respective contact. In some embodiments, the user interfaces include a status bar that indicates the status of the only one cellular identifier currently available to the electronic device. Although in some embodiments the status bar includes an indication of the carrier of the cellular identifier, the status bar optionally excludes the indication generated from the short nickname of the cellular identifier (e.g., a "B" indicating a "Business" cellular identifier). In some embodiments, when the data associated with one or more previously-removed cellular identifiers is still stored on the electronic device (e.g., the set of contacts associated with the previously-removed cellular identifier is still associated with the previously-removed cellular identifier), the electronic device presents multi-cellular identifier user interfaces. Once there are no contacts associated with a previously-removed cellular identifier, the electronic device presents single-cellular identifier user interfaces.

The above-described manner of switching from multiple-cellular identifier user interfaces to single cellular identifier user interfaces when the electronic device switches to operating with one cellular identifier allows the electronic device to present a more streamlined user interface that excludes indications of the cellular identifier, which simplifies interactions between the user and the device and enhances operability of the device (e.g., by reducing the visual clutter of the user interfaces, allowing the user to more quickly absorb the information being presented by the electronic device, and providing visual feedback to the user that only a single cellular identifier is available on the device), which, additionally, reduces power usage and improves battery life of the device by enabling the user to use the device more quickly and efficiently.

In some embodiments, after detecting the change in configuration of the device that includes disabling the first cellular identifier without removing the first cellular identifier from the electronic device, such as in FIG. 14), (e.g., configuring the electronic device not to use the first cellular identifier without removing the first cellular identifier if it is a physical SIM, or disabling the first cellular identifier if it is an eSIM or virtual SIM), the electronic device detects (1598-28) a change in configuration of the device that includes removal of the first cellular identifier from the electronic device (e.g., removing a physical SIM from the electronic device or deleting an eSIM or virtual SIM after it was previously disabled and while it is currently disabled) such as in FIG. 14Q. In some embodiments, removing or deleting the first cellular identifier does not permanently delete data associated with the first cellular identifier, such as association of the first cellular identifier with the first set of users on the electronic device.

In some embodiments, in response to detecting the change in configuration of the device that includes removal of the first cellular identifier from the electronic device, the electronic device displays (1598-30), on the display, the first alert 1430 with the selectable option 1432*a* that, when selected, causes the first set of users to be associated with the second cellular identifier instead of being associated with the first cellular identifier, such as in FIG. 14R. Disabling the first cellular identifier without removing the first cellular identifier from the electronic device optionally does not cause the first alert to be presented, but then later removing the cellular identifier from the device does cause the first alert to be presented, which facilitates the re-association of users away from the cellular identifier, as described previously.

The above-described manner of presenting the first alert with the option to associate the first set of users with the second cellular identifier in response to the removal of the first cellular identifier after the first cellular identifier had been disabled allows the electronic device to be configured to initiate communication with the first set of contacts using the second cellular identifier when the first cellular identifier is removed from the electronic device, which simplifies interactions between the user and the device and enhances operability of the device (e.g., requiring fewer inputs to initiate communication with the first set of contacts), which, additionally, reduces power usage and improves battery life of the device by enabling the user to use the device more quickly and efficiently.

It should be understood that the particular order in which the operations in FIGS. 15A-15O have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, and 1300) are also applicable in an analogous manner to method 1500 described above with respect to FIGS. 15A-15O. For example, the indications of cellular identifiers described above with reference to method 1500 optionally have one or more of the characteristics of the cellular identifier settings user interfaces, the cellular identifier settings of electronic devices in communication with other electronic devices, and operations performed with cellular identifiers, etc., described herein with reference to other methods described herein (e.g., methods 700, 900, 1100, and 1300). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 15A-15O are, optionally, implemented by components depicted in FIGS. 1A-1B. For example, displaying operations 1506, 1508, 1518, 1522, 1538, 1560, 1572, 1582, 1592, 1598-10, 1598-12, 1598-18, 1598-22, 1598-26, and 1598-30 and receiving operations 1520, 1528, 1532, 1578, and 1580 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to control and/or present device usage information to a user. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to present or control device usage in a meaningful way to the user. Accordingly, use of such personal information data enables users to more personalized delivery of such services. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the user of personal data should be prominent and easily accessible by users, and should be updated as the collection and/or use of data changes. Personal information from users should be collected for legitimate uses only. Further, such collection/sharing should only occur after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of presenting or storing contact information for one or more users associated with one or more cellular identifiers available to an electronic device, inactive on an electronic device, or removed from an electronic device, the present technology can be configured to allow users to select to "opt in" or "opt out" of participation in the collection of personal information data during registration for services or anytime thereafter. In another example, users can select not to store contact information of one or more users that are associated with cellular identifiers that are inactive on or removed from the electronic devices. In addition to providing "opt in" and "opt out" options, the present disclosure contemplates providing notifications relating to the access or use of personal information. For instance, a user may be notified upon removing a cellular identifier that the contact information stored in association with the cellular identifier remains stored on the electronic device until an input is detected to cause the electronic device to delete the data.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, contact information stored in association with a respective cellular identifier can be deleted when the cellular identifier is removed from the electronic device. As another examples, information stored in association with one or more cellular identifiers can be encrypted.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed as new and desired to be protected by Letters Patent of the United States is:

1. A method comprising:
at an electronic device in communication with a display and one or more input devices:
receiving, via the one or more input devices, an input to display a user interface for initiating a messaging conversation with a respective contact, wherein the electronic device is enabled to:
perform a first set of functions, including the communications, using a primary cellular identifier, and
perform a second set of functions, different than the first set of functions, using a secondary cellular identifier; and
in response to the input, displaying the user interface for initiating the messaging conversation with the respective contact, wherein:
in accordance with a determination that the messaging conversation is a new messaging conversation with the respective contact, the user interface includes a visual indication of a respective cellular identifier to be used for the messaging conversation, and
in accordance with a determination that the messaging conversation is not a new messaging conversation with the respective contact, the user interface does not include the visual indication of the respective cellular identifier;
while displaying the user interface for initiating the messaging conversation with the respective contact, receiving a respective input; and
in response to receiving the respective input:
in accordance with a determination that the respective input is an input selecting the visual indication of the respective cellular identifier, selecting a second cellular identifier, different than the respective cellular identifier, to use for the messaging conversation; and
in accordance with a determination that the respective input is an input to initiate the messaging conversation, initiating the messaging conversation using the respective cellular identifier.

2. The method of claim 1, further comprising:
displaying a communications user interface including concurrently displaying a plurality of representations of communication items, including:
a first representation of a communication item associated with the primary cellular identifier,
a second representation of a communication item associated with the secondary cellular identifier that includes a respective visual indication, wherein the respective visual indication distinguishes the second representation from the first representation, and
a third representation of a communication item associated with the secondary cellular identifier that includes the respective visual indication, wherein the respective visual indication distinguishes the third representation from the first representation, wherein the first representation of the communication item associated with the primary cellular identifier includes a visual indication of the primary cellular identifier, different than the respective visual indication included in the second and third representations.

3. The method of claim 1, further comprising:
displaying a communications user interface including concurrently displaying a plurality of representations of communication items, including:
a first representation of a communication item associated with the primary cellular identifier,
a second representation of a communication item associated with the secondary cellular identifier that includes a respective visual indication, wherein the respective visual indication distinguishes the second representation from the first representation, and
a third representation of a communication item associated with the secondary cellular identifier that includes the respective visual indication, wherein the respective visual indication distinguishes the third representation from the first representation, wherein the first representation of the communication item associated with the primary cellular identifier does not include a visual indication of the primary cellular identifier.

4. The method of claim 1, further comprising:
receiving, via the one or more input devices, an input corresponding to a request to display a control region user interface that includes a plurality of controls for controlling a plurality of functionalities of the electronic device, including a first control for controlling cellular identifier functionalities of the electronic device, wherein a third cellular identifier is currently inactive on the electronic device;
in response to receiving the request to display the control region user interface, displaying, on the display, the control region user interface;
while displaying the control region user interface, receiving, via the one or more input devices, an input, associated with the first control, for activating the third cellular identifier on the electronic device; and
in response to receiving the input, associated with the first control, for activating the third cellular identifier on the electronic device, activating the third cellular identifier on the electronic device.

5. The method of claim 1, further comprising:
displaying a communications user interface including concurrently displaying a plurality of representations of communication items, including:
a first representation of a communication item associated with the primary cellular identifier, a second representation of a communication item associated with the secondary cellular identifier that includes a respective visual indication, wherein the respective visual indication distinguishes the second representation from the first representation, and a third representation of a communication item associated with the secondary cellular identifier that includes the respective visual indication, wherein the respective visual indication distinguishes the third representation from the first representation;

while displaying, on the display, the communications user interface, receiving, via the one or more input devices, an input selecting a respective representation of a respective communication item with a respective contact in the communications user interface; and in response to receiving the input selecting the respective representation of the respective communication item:
  in accordance with a determination that the respective representation is the first representation of the communication item associated with the primary cellular identifier, initiating communication with the respective contact using the primary cellular identifier; and
  in accordance with a determination that the respective representation is the second representation of the communication item associated with the secondary cellular identifier, initiating communication with the respective contact using the secondary cellular identifier.

6. The method of claim 1, further comprising:
receiving, via the one or more input devices, an input corresponding to a request to initiate communication with a respective contact that is associated with a respective cellular identifier; and
in response to receiving the input corresponding to the request to initiate communication with the respective contact:
  in accordance with a determination that the respective cellular identifier is available for communication, initiating the communication with the respective contact using the respective cellular identifier; and
  in accordance with a determination that the respective cellular identifier is not available for communication:
    forgoing initiating the communication with the respective contact using the respective cellular identifier; and
    providing a warning that the respective cellular identifier is not available for communication.

7. The method of claim 6, wherein:
providing the warning that the respective cellular identifier is not available for communication includes providing an option for initiating the communication with the respective contact using a second respective cellular identifier, different than the respective cellular identifier.

8. The method of claim 1, further comprising:
receiving, via the one or more input devices, a sequence of one or more inputs corresponding to a request to initiate communication with a respective contact that is associated with a respective cellular identifier; and
in response to receiving the sequence of one or more inputs corresponding to the request to initiate the communication with the respective contact:
  in accordance with a determination that the sequence of one or more inputs includes an input for initiating the communication with a second cellular identifier, different than the respective cellular identifier, initiating the communication with the second cellular identifier; and
  in accordance with a determination that the sequence of one or more inputs does not include the input for initiating the communication with the second cellular identifier, initiating the communication with the respective cellular identifier.

9. The method of claim 1, further comprising:
displaying, in a user interface for initiating a phone call, a visual indication of a respective cellular identifier to be used to initiate the phone call;
while displaying the user interface for initiating the phone call, receiving a respective input; and
in response to receiving the respective input:
  in accordance with a determination that the respective input is an input selecting the visual indication of the respective cellular identifier, selecting a second cellular identifier, different than the respective cellular identifier, to use to initiate the phone call; and
  in accordance with a determination that the respective input is an input to initiate the phone call, initiating the phone call using the respective cellular identifier.

10. The method of claim 1, further comprising:
displaying a communications user interface including concurrently displaying a plurality of representations of communication items, including:
  a first representation of a communication item associated with the primary cellular identifier,
  a second representation of a communication item associated with the secondary cellular identifier that includes a respective visual indication, wherein the respective visual indication distinguishes the second representation from the first representation, and
  a third representation of a communication item associated with the secondary cellular identifier that includes the respective visual indication, wherein the respective visual indication distinguishes the third representation from the first representation, wherein:
the first representation of the communication item associated with the primary cellular identifier is displayed with a visual indication of the primary cellular identifier, and
the respective visual indication displayed with the second representation of the communication item associated with the secondary cellular identifier and the third representation of the communication item associated with the secondary cellular identifier is a visual indication of the secondary cellular identifier.

11. The method of claim 10, wherein:
the communication items associated with the first, second and third representations correspond to a communication type that can be performed with any of a plurality of cellular identifiers,
the communications user interface further includes a fourth representation of a communication item that corresponds to a communication type that can only be performed using a respective cellular identifier, and
the fourth representation of the communication item is not displayed with a visual indication of the respective cellular identifier.

12. The method of claim 1, further comprising:
displaying a communications user interface including concurrently displaying a plurality of representations of communication items, including:
  a first representation of a communication item associated with the primary cellular identifier, a second representation of a communication item associated with the secondary cellular identifier that includes a respective visual indication, wherein the respective visual indication distinguishes the second representation from the first representation, and a third representation of a communication item associated with the secondary cellular identifier that includes the respective visual indication, wherein the respective visual indication distinguishes the third representation from the first representation;

while displaying, on the display, the communications user interface, receiving, via the one or more input devices, a sequence of one or more inputs to initiate a phone call communication using a respective cellular identifier; and in response to receiving the sequence of one or more inputs to initiate the phone call communication using the respective cellular identifier:

initiating the phone call communication using the respective cellular identifier; and while the phone call communication is active, displaying, on the display, a visual indication of the respective cellular identifier.

13. The method of claim 1, further comprising:

receiving, via the one or more input devices, a sequence of one or more inputs to view a contact information user interface corresponding to a respective contact that includes contact information for the respective contact; and in response to receiving the sequence of one or more inputs to view the contact information user interface corresponding to the respective contact, displaying, on the display, the contact information user interface corresponding to the respective contact, wherein:

in accordance with a determination that the respective contact is associated with a first cellular identifier, the contact information user interface corresponding to the respective contact includes a visual indication of the first cellular identifier; and in accordance with a determination that the respective contact is associated with a second cellular identifier, different than the first cellular identifier, the contact information user interface corresponding to the respective contact includes a visual indication of the second cellular identifier.

14. The method of claim 13, further comprising:

while displaying the contact information user interface corresponding to the respective contact, wherein the respective contact is associated with a first respective cellular identifier, receiving, via the one or more input devices, a sequence of one or more inputs for changing the association of the respective contact from being associated with the first respective cellular identifier to being associated with a second respective cellular identifier, different than the first respective cellular identifier; and in response to receiving the sequence of one or more inputs for changing the association of the respective contact from being associated with the first respective cellular identifier to being associated with the second respective cellular identifier:

associating the respective contact with the second respective cellular identifier; and updating the contact information user interface corresponding to the respective contact to include a visual indication of the second respective cellular identifier instead of a visual indication of the first respective cellular identifier.

15. The method of claim 1, further comprising:

receiving, via the one or more input devices, a sequence of one or more inputs to initiate a messaging communication with a contact; and in response to receiving the sequence of one or more inputs to initiate the messaging communication with the contact:

in accordance with a determination that the messaging communication is to be performed using the primary cellular identifier, initiating a data-based messaging communication with the contact; and in accordance with a determination that the messaging communication is to be performed using the secondary cellular identifier, initiating a cellular-messaging-based communication with the contact.

16. The method of claim 1, further comprising:

receiving, via the one or more input devices, a sequence of one or more inputs to initiate a communication with a respective contact, wherein the respective contact is associated with a first cellular identifier;

in response to receiving the sequence of one or more inputs to initiate the communication with the respective contact:

in accordance with a determination that the communication is a communication type that can only be performed using a second cellular identifier, initiating the communication with the respective contact using the second cellular identifier; and in accordance with a determination that the communication is a communication type that can be performed with any of a plurality of cellular identifiers including the first cellular identifier, initiating the communication with the respective contact using the first cellular identifier.

17. The method of claim 1, further comprising:

receiving, via the one or more input devices, a sequence of one or more inputs to display a voicemail user interface; and in response receiving the sequence of one or more inputs to display the voicemail user interface, displaying, on the display, the voicemail user interface that includes:

a first representation of a first voicemail associated with a first cellular identifier, wherein the first representation is displayed with a visual indication of the first cellular identifier; and a second representation of a second voicemail associated with a second cellular identifier, different than the first cellular identifier, wherein the second representation is displayed with a visual indication of the second cellular identifier.

18. The method of claim 17, further comprising:

prior to having setup the voicemail user interface with the first cellular identifier and the second cellular identifier, displaying, on the display, the voicemail user interface, wherein the voicemail user interface includes:

a first affordance for setting up the voicemail user interface with the first cellular identifier; and a second affordance for setting up the voicemail user interface with the second cellular identifier;

while displaying the voicemail user interface with the first and second affordances, receiving, via the one or more input devices, a sequence of one or more inputs including selection of the first affordance for setting up the voicemail user interface with the first cellular identifier;

in response to receiving the sequence of one or more inputs including selection of the first affordance for setting up the voicemail user interface with the first cellular identifier, updating the voicemail user interface to include:
the second affordance for setting up the voicemail user interface with the second cellular identifier; and
one or more representations of one or more voicemails associated with the first cellular identifier, without including one or more representations of one or more voicemails associated with the second cellular identifier;
while displaying the voicemail user interface with the second affordance and the one or more representations of the one or more voicemails associated with the first cellular identifier, receiving, via the one or more input devices, a sequence of one or more inputs including selection of the second affordance for setting up the voicemail user interface with the second cellular identifier; and
in response to receiving the sequence of one or more inputs including selection of the second affordance for setting up the voicemail user interface with the second cellular identifier, updating the voicemail user interface to include:
the one or more representations of the one or more voicemails associated with the first cellular identifier; and
one or more representations of one or more voicemails associated with the second cellular identifier.

19. An electronic device, comprising:
one or more processors;
memory; and
one or more programs, wherein the one or more programs are stored in the memory and configured to be executed by the one or more processors, the one or more programs including instructions for:
receiving, via the one or more input devices, an input to display a user interface for initiating a messaging conversation with a respective contact, wherein the electronic device is enabled to:
perform a first set of functions, including the communications, using a primary cellular identifier, and
perform a second set of functions, different than the first set of functions, using a secondary cellular identifier; and
in response to the input, displaying the user interface for initiating the messaging conversation with the respective contact, wherein:
in accordance with a determination that the messaging conversation is a new messaging conversation with the respective contact, the user interface includes a visual indication of a respective cellular identifier to be used for the messaging conversation, and
in accordance with a determination that the messaging conversation is not a new messaging conversation with the respective contact, the user interface does not include the visual indication of the respective cellular identifier;
while displaying the user interface for initiating the messaging conversation with the respective contact, receiving a respective input; and
in response to receiving the respective input:
in accordance with a determination that the respective input is an input selecting the visual indication of the respective cellular identifier, selecting a second cellular identifier, different than the respective cellular identifier, to use for the messaging conversation; and
in accordance with a determination that the respective input is an input to initiate the messaging conversation, initiating the messaging conversation using the respective cellular identifier.

20. A non-transitory computer readable storage medium storing one or more programs, the one or more programs comprising instructions, which when executed by one or more processors of an electronic device, cause the electronic device to:
receive, via the one or more input devices, an input to display a user interface for initiating a messaging conversation with a respective contact, wherein the electronic device is enabled to:
perform a first set of functions, including the communications, using a primary cellular identifier, and
perform a second set of functions, different than the first set of functions, using a secondary cellular identifier; and
in response to the input, display the user interface for initiating the messaging conversation with the respective contact, wherein:
in accordance with a determination that the messaging conversation is a new messaging conversation with the respective contact, the user interface includes a visual indication of a respective cellular identifier to be used for the messaging conversation, and
in accordance with a determination that the messaging conversation is not a new messaging conversation with the respective contact, the user interface does not include the visual indication of the respective cellular identifier;
while displaying the user interface for initiating the messaging conversation with the respective contact, receive a respective input; and
in response to receiving the respective input:
in accordance with a determination that the respective input is an input selecting the visual indication of the respective cellular identifier, select a second cellular identifier, different than the respective cellular identifier, to use for the messaging conversation; and
in accordance with a determination that the respective input is an input to initiate the messaging conversation, initiate the messaging conversation using the respective cellular identifier.

21. The electronic device of claim 19, wherein the one or more programs further include instructions for:
displaying a communications user interface including concurrently displaying a plurality of representations of communication items, including:
a first representation of a communication item associated with the primary cellular identifier,
a second representation of a communication item associated with the secondary cellular identifier that includes a respective visual indication, wherein the respective visual indication distinguishes the second representation from the first representation, and
a third representation of a communication item associated with the secondary cellular identifier that includes the respective visual indication, wherein the respective visual indication distinguishes the third representation from the first representation, wherein the first representation of the communication item associated with the primary cellular identifier includes a visual indication of the primary cellular identifier, different than the respective visual indication included in the second and third representations.

22. The electronic device of claim 19, wherein the one or more programs further include instructions for:
displaying a communications user interface including concurrently displaying a plurality of representations of communication items, including:
a first representation of a communication item associated with the primary cellular identifier,
a second representation of a communication item associated with the secondary cellular identifier that includes a respective visual indication, wherein the respective visual indication distinguishes the second representation from the first representation, and
a third representation of a communication item associated with the secondary cellular identifier that includes the respective visual indication, wherein the respective visual indication distinguishes the third representation from the first representation, wherein the first representation of the communication item associated with the primary cellular identifier does not include a visual indication of the primary cellular identifier.

23. The electronic device of claim 19, wherein the one or more programs further include instructions for:
receiving, via the one or more input devices, an input corresponding to a request to display a control region user interface that includes a plurality of controls for controlling a plurality of functionalities of the electronic device, including a first control for controlling cellular identifier functionalities of the electronic device, wherein a third cellular identifier is currently inactive on the electronic device;
in response to receiving the request to display the control region user interface, displaying, on the display, the control region user interface;
while displaying the control region user interface, receiving, via the one or more input devices, an input, associated with the first control, for activating the third cellular identifier on the electronic device; and
in response to receiving the input, associated with the first control, for activating the third cellular identifier on the electronic device, activating the third cellular identifier on the electronic device.

24. The electronic device of claim 19, wherein the one or more programs further include instructions for:
displaying a communications user interface including concurrently displaying a plurality of representations of communication items, including:
a first representation of a communication item associated with the primary cellular identifier,
a second representation of a communication item associated with the secondary cellular identifier that includes a respective visual indication, wherein the respective visual indication distinguishes the second representation from the first representation, and
a third representation of a communication item associated with the secondary cellular identifier that includes the respective visual indication, wherein the respective visual indication distinguishes the third representation from the first representation;
while displaying, on the display, the communications user interface, receiving, via the one or more input devices, an input selecting a respective representation of a respective communication item with a respective contact in the communications user interface; and
in response to receiving the input selecting the respective representation of the respective communication item:
in accordance with a determination that the respective representation is the first representation of the communication item associated with the primary cellular identifier, initiating communication with the respective contact using the primary cellular identifier; and
in accordance with a determination that the respective representation is the second representation of the communication item associated with the secondary cellular identifier, initiating communication with the respective contact using the secondary cellular identifier.

25. The electronic device of claim 19, wherein the one or more programs further include instructions for:
receiving, via the one or more input devices, an input corresponding to a request to initiate communication with a respective contact that is associated with a respective cellular identifier; and
in response to receiving the input corresponding to the request to initiate communication with the respective contact:
in accordance with a determination that the respective cellular identifier is available for communication, initiating the communication with the respective contact using the respective cellular identifier; and
in accordance with a determination that the respective cellular identifier is not available for communication:
forgoing initiating the communication with the respective contact using the respective cellular identifier; and
providing a warning that the respective cellular identifier is not available for communication.

26. The electronic device of claim 25, wherein:
providing the warning that the respective cellular identifier is not available for communication includes providing an option for initiating the communication with the respective contact using a second respective cellular identifier, different than the respective cellular identifier.

27. The electronic device of claim 19, wherein the one or more programs further include instructions for:
receiving, via the one or more input devices, a sequence of one or more inputs corresponding to a request to initiate communication with a respective contact that is associated with a respective cellular identifier; and
in response to receiving the sequence of one or more inputs corresponding to the request to initiate the communication with the respective contact:
in accordance with a determination that the sequence of one or more inputs includes an input for initiating the communication with a second cellular identifier, different than the respective cellular identifier, initiating the communication with the second cellular identifier; and
in accordance with a determination that the sequence of one or more inputs does not include the input for initiating the communication with the second cellular identifier, initiating the communication with the respective cellular identifier.

28. The electronic device of claim 19, wherein the one or more programs further include instructions for:
displaying, in a user interface for initiating a phone call, a visual indication of a respective cellular identifier to be used to initiate the phone call;

while displaying the user interface for initiating the phone call, receiving a respective input; and in response to receiving the respective input:

in accordance with a determination that the respective input is an input selecting the visual indication of the respective cellular identifier, selecting a second cellular identifier, different than the respective cellular identifier, to use to initiate the phone call; and in accordance with a determination that the respective input is an input to initiate the phone call, initiating the phone call using the respective cellular identifier.

29. The electronic device of claim 19, wherein the one or more programs further include instructions for:

displaying a communications user interface including concurrently displaying a plurality of representations of communication items, including:

a first representation of a communication item associated with the primary cellular identifier, a second representation of a communication item associated with the secondary cellular identifier that includes a respective visual indication, wherein the respective visual indication distinguishes the second representation from the first representation, and a third representation of a communication item associated with the secondary cellular identifier that includes the respective visual indication, wherein the respective visual indication distinguishes the third representation from the first representation, wherein:

the first representation of the communication item associated with the primary cellular identifier is displayed with a visual indication of the primary cellular identifier, and the respective visual indication displayed with the second representation of the communication item associated with the secondary cellular identifier and the third representation of the communication item associated with the secondary cellular identifier is a visual indication of the secondary cellular identifier.

30. The electronic device of claim 29, wherein:

the communication items associated with the first, second and third representations correspond to a communication type that can be performed with any of a plurality of cellular identifiers, the communications user interface further includes a fourth representation of a communication item that corresponds to a communication type that can only be performed using a respective cellular identifier, and the fourth representation of the communication item is not displayed with a visual indication of the respective cellular identifier.

31. The electronic device of claim 19, wherein the one or more programs further include instructions for:

displaying a communications user interface including concurrently displaying a plurality of representations of communication items, including:

a first representation of a communication item associated with the primary cellular identifier, a second representation of a communication item associated with the secondary cellular identifier that includes a respective visual indication, wherein the respective visual indication distinguishes the second representation from the first representation, and a third representation of a communication item associated with the secondary cellular identifier that includes the respective visual indication, wherein the respective visual indication distinguishes the third representation from the first representation;

while displaying, on the display, the communications user interface, receiving, via the one or more input devices, a sequence of one or more inputs to initiate a phone call communication using a respective cellular identifier; and in response to receiving the sequence of one or more inputs to initiate the phone call communication using the respective cellular identifier:

initiating the phone call communication using the respective cellular identifier; and while the phone call communication is active, displaying, on the display, a visual indication of the respective cellular identifier.

32. The electronic device of claim 19, wherein the one or more programs further include instructions for:

receiving, via the one or more input devices, a sequence of one or more inputs to view a contact information user interface corresponding to a respective contact that includes contact information for the respective contact; and in response to receiving the sequence of one or more inputs to view the contact information user interface corresponding to the respective contact, displaying, on the display, the contact information user interface corresponding to the respective contact, wherein:

in accordance with a determination that the respective contact is associated with a first cellular identifier, the contact information user interface corresponding to the respective contact includes a visual indication of the first cellular identifier; and in accordance with a determination that the respective contact is associated with a second cellular identifier, different than the first cellular identifier, the contact information user interface corresponding to the respective contact includes a visual indication of the second cellular identifier.

33. The electronic device of claim 32, wherein the one or more programs further include instructions for:

while displaying the contact information user interface corresponding to the respective contact, wherein the respective contact is associated with a first respective cellular identifier, receiving, via the one or more input devices, a sequence of one or more inputs for changing the association of the respective contact from being associated with the first respective cellular identifier to being associated with a second respective cellular identifier, different than the first respective cellular identifier; and in response to receiving the sequence of one or more inputs for changing the association of the respective contact from being associated with the first respective cellular identifier to being associated with the second respective cellular identifier:

associating the respective contact with the second respective cellular identifier; and updating the contact information user interface corresponding to the respective contact to include a visual indication of the second respective cellular identifier instead of a visual indication of the first respective cellular identifier.

34. The electronic device of claim 19, wherein the one or more programs further include instructions for:

receiving, via the one or more input devices, a sequence of one or more inputs to initiate a messaging communication with a contact; and in response to receiving the sequence of one or more inputs to initiate the messaging communication with the contact:
  in accordance with a determination that the messaging communication is to be performed using the primary cellular identifier, initiating a data-based messaging communication with the contact; and
  in accordance with a determination that the messaging communication is to be performed using the secondary cellular identifier, initiating a cellular-messaging-based communication with the contact.

35. The electronic device of claim 19, wherein the one or more programs further include instructions for:
receiving, via the one or more input devices, a sequence of one or more inputs to initiate a communication with a respective contact, wherein the respective contact is associated with a first cellular identifier;
in response to receiving the sequence of one or more inputs to initiate the communication with the respective contact:
  in accordance with a determination that the communication is a communication type that can only be performed using a second cellular identifier, initiating the communication with the respective contact using the second cellular identifier; and
  in accordance with a determination that the communication is a communication type that can be performed with any of a plurality of cellular identifiers including the first cellular identifier, initiating the communication with the respective contact using the first cellular identifier.

36. The electronic device of claim 19, wherein the one or more programs further include instructions for:
receiving, via the one or more input devices, a sequence of one or more inputs to display a voicemail user interface; and
in response receiving the sequence of one or more inputs to display the voicemail user interface, displaying, on the display, the voicemail user interface that includes:
  a first representation of a first voicemail associated with a first cellular identifier, wherein the first representation is displayed with a visual indication of the first cellular identifier; and
  a second representation of a second voicemail associated with a second cellular identifier, different than the first cellular identifier, wherein the second representation is displayed with a visual indication of the second cellular identifier.

37. The electronic device of claim 36, wherein the one or more programs further include instructions for:
prior to having setup the voicemail user interface with the first cellular identifier and the second cellular identifier, displaying, on the display, the voicemail user interface, wherein the voicemail user interface includes:
  a first affordance for setting up the voicemail user interface with the first cellular identifier; and
  a second affordance for setting up the voicemail user interface with the second cellular identifier;
while displaying the voicemail user interface with the first and second affordances, receiving, via the one or more input devices, a sequence of one or more inputs including selection of the first affordance for setting up the voicemail user interface with the first cellular identifier;
in response to receiving the sequence of one or more inputs including selection of the first affordance for setting up the voicemail user interface with the first cellular identifier, updating the voicemail user interface to include:
  the second affordance for setting up the voicemail user interface with the second cellular identifier; and
  one or more representations of one or more voicemails associated with the first cellular identifier, without including one or more representations of one or more voicemails associated with the second cellular identifier;
while displaying the voicemail user interface with the second affordance and the one or more representations of the one or more voicemails associated with the first cellular identifier, receiving, via the one or more input devices, a sequence of one or more inputs including selection of the second affordance for setting up the voicemail user interface with the second cellular identifier; and
in response to receiving the sequence of one or more inputs including selection of the second affordance for setting up the voicemail user interface with the second cellular identifier, updating the voicemail user interface to include:
  the one or more representations of the one or more voicemails associated with the first cellular identifier; and
  one or more representations of one or more voicemails associated with the second cellular identifier.

38. The non-transitory computer readable storage medium of claim 20, wherein the instructions further cause the electronic device to:
display a communications user interface including concurrently displaying a plurality of representations of communication items, including:
  a first representation of a communication item associated with the primary cellular identifier,
  a second representation of a communication item associated with the secondary cellular identifier that includes a respective visual indication, wherein the respective visual indication distinguishes the second representation from the first representation, and
  a third representation of a communication item associated with the secondary cellular identifier that includes the respective visual indication, wherein the respective visual indication distinguishes the third representation from the first representation, wherein the first representation of the communication item associated with the primary cellular identifier includes a visual indication of the primary cellular identifier, different than the respective visual indication included in the second and third representations.

39. The non-transitory computer readable storage medium of claim 20, wherein the instructions further cause the electronic device to:
display a communications user interface including concurrently displaying a plurality of representations of communication items, including:
  a first representation of a communication item associated with the primary cellular identifier,
  a second representation of a communication item associated with the secondary cellular identifier that includes a respective visual indication, wherein the respective visual indication distinguishes the second representation from the first representation, and
  a third representation of a communication item associated with the secondary cellular identifier that includes the respective visual indication, wherein the respective visual indication distinguishes the third representation from the first representation, wherein the first representation of the communication item associated with the primary cellular identifier does not include a visual indication of the primary cellular identifier.

40. The non-transitory computer readable storage medium of claim 20, wherein the instructions further cause the electronic device to:
receive, via the one or more input devices, an input corresponding to a request to display a control region user interface that includes a plurality of controls for controlling a plurality of functionalities of the electronic device, including a first control for controlling cellular identifier functionalities of the electronic device, wherein a third cellular identifier is currently inactive on the electronic device;
in response to receiving the request to display the control region user interface, display, on the display, the control region user interface;
while displaying the control region user interface, receive, via the one or more input devices, an input, associated with the first control, for activating the third cellular identifier on the electronic device; and
in response to receiving the input, associated with the first control, for activating the third cellular identifier on the electronic device, activate the third cellular identifier on the electronic device.

41. The non-transitory computer readable storage medium of claim 20, wherein the instructions further cause the electronic device to:
display a communications user interface including concurrently displaying a plurality of representations of communication items, including:
a first representation of a communication item associated with the primary cellular identifier,
a second representation of a communication item associated with the secondary cellular identifier that includes a respective visual indication, wherein the respective visual indication distinguishes the second representation from the first representation, and
a third representation of a communication item associated with the secondary cellular identifier that includes the respective visual indication, wherein the respective visual indication distinguishes the third representation from the first representation;
while displaying, on the display, the communications user interface, receive, via the one or more input devices, an input selecting a respective representation of a respective communication item with a respective contact in the communications user interface; and
in response to receiving the input selecting the respective representation of the respective communication item:
in accordance with a determination that the respective representation is the first representation of the communication item associated with the primary cellular identifier, initiate communication with the respective contact using the primary cellular identifier; and
in accordance with a determination that the respective representation is the second representation of the communication item associated with the secondary cellular identifier, initiate communication with the respective contact using the secondary cellular identifier.

42. The non-transitory computer readable storage medium of claim 19, wherein the instructions further cause the electronic device to:
receive, via the one or more input devices, an input corresponding to a request to initiate communication with a respective contact that is associated with a respective cellular identifier; and
in response to receiving the input corresponding to the request to initiate communication with the respective contact:
in accordance with a determination that the respective cellular identifier is available for communication, initiate the communication with the respective contact using the respective cellular identifier; and
in accordance with a determination that the respective cellular identifier is not available for communication:
forgo initiating the communication with the respective contact using the respective cellular identifier; and
provide a warning that the respective cellular identifier is not available for communication.

43. The non-transitory computer readable storage medium of claim 42, wherein:
providing the warning that the respective cellular identifier is not available for communication includes providing an option for initiating the communication with the respective contact using a second respective cellular identifier, different than the respective cellular identifier.

44. The non-transitory computer readable storage medium of claim 20, wherein the instructions further cause the electronic device to:
receive, via the one or more input devices, a sequence of one or more inputs corresponding to a request to initiate communication with a respective contact that is associated with a respective cellular identifier; and
in response to receiving the sequence of one or more inputs corresponding to the request to initiate the communication with the respective contact:
in accordance with a determination that the sequence of one or more inputs includes an input for initiating the communication with a second cellular identifier, different than the respective cellular identifier, initiate the communication with the second cellular identifier; and
in accordance with a determination that the sequence of one or more inputs does not include the input for initiating the communication with the second cellular identifier, initiate the communication with the respective cellular identifier.

45. The non-transitory computer readable storage medium of claim 20, wherein the instructions further cause the electronic device to:
display, in a user interface for initiating a phone call, a visual indication of a respective cellular identifier to be used to initiate the phone call;
while displaying the user interface for initiating the phone call, receive a respective input; and
in response to receiving the respective input:
in accordance with a determination that the respective input is an input selecting the visual indication of the respective cellular identifier, select a second cellular identifier, different than the respective cellular identifier, to use to initiate the phone call; and
in accordance with a determination that the respective input is an input to initiate the phone call, initiate the phone call using the respective cellular identifier.

46. The non-transitory computer readable storage medium of claim 20, wherein the instructions further cause the electronic device to:
display a communications user interface including concurrently displaying a plurality of representations of communication items, including:
a first representation of a communication item associated with the primary cellular identifier,
a second representation of a communication item associated with the secondary cellular identifier that includes a respective visual indication, wherein the respective visual indication distinguishes the second representation from the first representation, and
a third representation of a communication item associated with the secondary cellular identifier that includes the respective visual indication, wherein the respective visual indication distinguishes the third representation from the first representation, wherein:
the first representation of the communication item associated with the primary cellular identifier is displayed with a visual indication of the primary cellular identifier, and
the respective visual indication displayed with the second representation of the communication item associated with the secondary cellular identifier and the third representation of the communication item associated with the secondary cellular identifier is a visual indication of the secondary cellular identifier.

47. The non-transitory computer readable storage medium of claim 46, wherein:
the communication items associated with the first, second and third representations correspond to a communication type that can be performed with any of a plurality of cellular identifiers,
the communications user interface further includes a fourth representation of a communication item that corresponds to a communication type that can only be performed using a respective cellular identifier, and
the fourth representation of the communication item is not displayed with a visual indication of the respective cellular identifier.

48. The non-transitory computer readable storage medium of claim 20, wherein the instructions further cause the electronic device to:
display a communications user interface including concurrently displaying a plurality of representations of communication items, including:
a first representation of a communication item associated with the primary cellular identifier,
a second representation of a communication item associated with the secondary cellular identifier that includes a respective visual indication, wherein the respective visual indication distinguishes the second representation from the first representation, and
a third representation of a communication item associated with the secondary cellular identifier that includes the respective visual indication, wherein the respective visual indication distinguishes the third representation from the first representation;
while displaying, on the display, the communications user interface, receive, via the one or more input devices, a sequence of one or more inputs to initiate a phone call communication using a respective cellular identifier; and
in response to receiving the sequence of one or more inputs to initiate the phone call communication using the respective cellular identifier:
initiate the phone call communication using the respective cellular identifier; and
while the phone call communication is active, display, on the display, a visual indication of the respective cellular identifier.

49. The non-transitory computer readable storage medium of claim 20, wherein the instructions further cause the electronic device to:
receive, via the one or more input devices, a sequence of one or more inputs to view a contact information user interface corresponding to a respective contact that includes contact information for the respective contact; and
in response to receiving the sequence of one or more inputs to view the contact information user interface corresponding to the respective contact, display, on the display, the contact information user interface corresponding to the respective contact, wherein:
in accordance with a determination that the respective contact is associated with a first cellular identifier, the contact information user interface corresponding to the respective contact includes a visual indication of the first cellular identifier; and
in accordance with a determination that the respective contact is associated with a second cellular identifier, different than the first cellular identifier, the contact information user interface corresponding to the respective contact includes a visual indication of the second cellular identifier.

50. The non-transitory computer readable storage medium of claim 49, wherein the instructions further cause the electronic device to:
while displaying the contact information user interface corresponding to the respective contact, wherein the respective contact is associated with a first respective cellular identifier, receive, via the one or more input devices, a sequence of one or more inputs for changing the association of the respective contact from being associated with the first respective cellular identifier to being associated with a second respective cellular identifier, different than the first respective cellular identifier; and
in response to receiving the sequence of one or more inputs for changing the association of the respective contact from being associated with the first respective cellular identifier to being associated with the second respective cellular identifier:
associate the respective contact with the second respective cellular identifier; and
update the contact information user interface corresponding to the respective contact to include a visual indication of the second respective cellular identifier instead of a visual indication of the first respective cellular identifier.

51. The non-transitory computer readable storage medium of claim 20, wherein the instructions further cause the electronic device to:
receive, via the one or more input devices, a sequence of one or more inputs to initiate a messaging communication with a contact; and
in response to receiving the sequence of one or more inputs to initiate the messaging communication with the contact:
in accordance with a determination that the messaging communication is to be performed using the primary cellular identifier, initiate a data-based messaging communication with the contact; and in accordance with a determination that the messaging communication is to be performed using the secondary cellular identifier, initiate a cellular-messaging-based communication with the contact.

52. The non-transitory computer readable storage medium of claim 20, wherein the instructions further cause the electronic device to:
  receive, via the one or more input devices, a sequence of one or more inputs to initiate a communication with a respective contact, wherein the respective contact is associated with a first cellular identifier;
  in response to receiving the sequence of one or more inputs to initiate the communication with the respective contact:
    in accordance with a determination that the communication is a communication type that can only be performed using a second cellular identifier, initiate the communication with the respective contact using the second cellular identifier; and
    in accordance with a determination that the communication is a communication type that can be performed with any of a plurality of cellular identifiers including the first cellular identifier, initiate the communication with the respective contact using the first cellular identifier.

53. The non-transitory computer readable storage medium of claim 20, wherein the instructions further cause the electronic device to:
  receive, via the one or more input devices, a sequence of one or more inputs to display a voicemail user interface; and
  in response receiving the sequence of one or more inputs to display the voicemail user interface, display, on the display, the voicemail user interface that includes:
    a first representation of a first voicemail associated with a first cellular identifier, wherein the first representation is displayed with a visual indication of the first cellular identifier; and
    a second representation of a second voicemail associated with a second cellular identifier, different than the first cellular identifier, wherein the second representation is displayed with a visual indication of the second cellular identifier.

54. The non-transitory computer readable storage medium of claim 53, wherein the instructions further cause the electronic device to:
  prior to having setup the voicemail user interface with the first cellular identifier and the second cellular identifier, display, on the display, the voicemail user interface, wherein the voicemail user interface includes:
    a first affordance for setting up the voicemail user interface with the first cellular identifier; and
    a second affordance for setting up the voicemail user interface with the second cellular identifier;
  while displaying the voicemail user interface with the first and second affordances, receive, via the one or more input devices, a sequence of one or more inputs including selection of the first affordance for setting up the voicemail user interface with the first cellular identifier;
  in response to receiving the sequence of one or more inputs including selection of the first affordance for setting up the voicemail user interface with the first cellular identifier, update the voicemail user interface to include:
    the second affordance for setting up the voicemail user interface with the second cellular identifier; and
    one or more representations of one or more voicemails associated with the first cellular identifier, without including one or more representations of one or more voicemails associated with the second cellular identifier;
  while displaying the voicemail user interface with the second affordance and the one or more representations of the one or more voicemails associated with the first cellular identifier, receive, via the one or more input devices, a sequence of one or more inputs including selection of the second affordance for setting up the voicemail user interface with the second cellular identifier; and
  in response to receiving the sequence of one or more inputs including selection of the second affordance for setting up the voicemail user interface with the second cellular identifier, update the voicemail user interface to include:
    the one or more representations of the one or more voicemails associated with the first cellular identifier; and
    one or more representations of one or more voicemails associated with the second cellular identifier.

* * * * *